US009540963B2

(12) United States Patent
Harif

(10) Patent No.: US 9,540,963 B2
(45) Date of Patent: Jan. 10, 2017

(54) GENERATOR

(71) Applicant: GERSHON MACHINE LTD., Holon (IL)

(72) Inventor: Gershon Harif, Ramat Gan (IL)

(73) Assignee: GERSHON MACHINE LTD., Holon (IL)

( * ) Notice: Subject to any disclaimer, the term of this patent is extended or adjusted under 35 U.S.C. 154(b) by 180 days.

(21) Appl. No.: 14/351,322

(22) PCT Filed: Oct. 11, 2012

(86) PCT No.: PCT/IL2012/050404
§ 371 (c)(1),
(2) Date: Apr. 11, 2014

(87) PCT Pub. No.: WO2013/054333
PCT Pub. Date: Apr. 18, 2013

(65) Prior Publication Data

US 2014/0238021 A1 Aug. 28, 2014

Related U.S. Application Data

(63) Continuation-in-part of application No. 13/271,385, filed on Oct. 12, 2011, now Pat. No. 8,800,280, which
(Continued)

(51) Int. Cl.
*F01K 25/00* (2006.01)
*F01K 15/02* (2006.01)
(Continued)

(52) U.S. Cl.
CPC ............. *F01K 25/005* (2013.01); *F01K 13/00* (2013.01); *F01K 15/02* (2013.01); *F01K 15/04* (2013.01);
(Continued)

(58) Field of Classification Search
CPC ........ F01K 25/00; F01K 25/002; F22B 1/006; Y02B 30/52
(Continued)

(56) References Cited

U.S. PATENT DOCUMENTS 3,100,965 A 8/1963 Blackburn
3,608,311 A 9/1971 Roesel, Jr.
(Continued)

FOREIGN PATENT DOCUMENTS

CN 2164465 5/1994
CN 1786466 6/2006
(Continued)

OTHER PUBLICATIONS

U.S. Appl. No. 61/324,446, filed Apr. 15, 2010, Harif.
(Continued)

*Primary Examiner* — Hoang Nguyen
(74) *Attorney, Agent, or Firm* — Dorsey & Whitney LLP

(57) ABSTRACT

A generator comprising: a heat differential module with a first, high temperature source configured for providing a work medium at high temperature, a second, low temperature source configured for providing a work medium at low temperature, and a heat mechanism in fluid communication with the first and second sources, configured for maintaining a temperature difference therebetween by at least one of: providing heat to the work medium at said first source, and removing heat from the work medium at said second source; a pressure module comprising a pressure medium which is in selective fluid communication with the work medium from the first, high temperature source and the work medium from the second, low temperature source, for alternately peifonning a heat exchange process with the high/low temperature work medium, to have its temperature fluctuate between a minimal operative temperature and a maximal
(Continued)

operative temperature corresponding to the high and low temperature of the respective work medium; a conversion module in mechanical communication with the pressure medium, configured for utilizing temperature fluctuation of the pressure medium for the production of output energy; and a heat recovery arrangement in thermal communication with at least one of the heat differential module and the pressure module, configured for receiving at least a portion of the heat energy of the high and low temperature work medium which was not transferred to the pressure medium during said heat exchange process, and redirecting said heat energy back to one of the heat differential module and the pressure module; wherein provision of heat to the work medium is performed by way of a heat exchange process with an auxiliary high temperature fluid.

25 Claims, 247 Drawing Sheets

Related U.S. Application Data is a continuation-in-part of application No. PCT/IL2011/000305, filed on Apr. 14, 2011.

(51) Int. Cl.

| | |
|---|---|
| ***F01K 13/00*** | (2006.01) |
| ***F01K 15/04*** | (2006.01) |
| ***F01K 25/02*** | (2006.01) |
| ***F01K 27/00*** | (2006.01) |
| ***F22B 1/00*** | (2006.01) |
| ***F22B 1/18*** | (2006.01) |

(52) U.S. Cl.
CPC ............... *F01K 25/00* (2013.01); *F01K 25/02* (2013.01); *F01K 27/005* (2013.01); *F22B 1/006* (2013.01); *F22B 1/18* (2013.01); *Y02B 30/52* (2013.01)

(58) Field of Classification Search
USPC ........................................................... 60/676
See application file for complete search history.

(56) References Cited

U.S. PATENT DOCUMENTS

| | | | |
|---|---|---|---|
| 3,699,769 | A | 10/1972 | Bondurant |
| 3,803,847 | A | 4/1974 | McAlister |
| 3,830,065 | A | 8/1974 | McAlister |
| 3,901,033 | A | 8/1975 | McAlister |
| 4,041,706 | A | 8/1977 | White |
| 4,195,481 | A | 4/1980 | Gregory |
| RE30,766 | E | 10/1981 | Bentz |
| 4,441,318 | A | 4/1984 | Theckston |
| 4,637,211 | A | 1/1987 | White et al. |
| 5,029,444 | A | 7/1991 | Kalina |
| 5,548,957 | A | 8/1996 | Salemie |
| 7,420,141 | B2 | 9/2008 | Kitano et al. |
| 9,140,273 | B2 | 9/2015 | Stroganov |
| 2003/0042007 | A1 | 3/2003 | Sandu et al. |
| 2004/0088985 | A1 | 5/2004 | Brasz et al. |
| 2005/0198960 | A1* | 9/2005 | Marnoch .................. F01K 3/12 60/645 |
| 2006/0059912 | A1 | 3/2006 | Romanelli et al. |
| 2006/0213502 | A1 | 9/2006 | Baker |
| 2008/0127648 | A1 | 6/2008 | Corcoran |
| 2008/0127657 | A1 | 6/2008 | Fang et al. |
| 2008/0236166 | A1 | 10/2008 | Burrows |
| 2009/0077961 | A1 | 3/2009 | Baker |
| 2010/0251711 | A1 | 10/2010 | Howes et al. |
| 2012/0079825 | A1 | 4/2012 | Harif |

FOREIGN PATENT DOCUMENTS

| | | |
|---|---|---|
| CN | 1892023 | 1/2007 |
| CN | 101476495 | 7/2009 |
| CN | 101484683 | 7/2009 |
| CN | 201334928 | 10/2009 |
| DE | 3232497 | 2/1983 |
| DE | 3619016 | 12/1987 |
| DE | 3624357 | 1/1988 |
| DE | 3723289 | 7/1988 |
| DE | 3939779 | 6/1991 |
| DE | 4015879 | 11/1991 |
| FR | 2453289 | 10/1980 |
| FR | 2453991 | 11/1980 |
| FR | 2523221 | 9/1983 |
| GB | 1536437 | 12/1978 |
| RU | 2434159 | 9/2011 |
| SU | 1420192 | 8/1988 |
| SU | 1516611 | 10/1989 |
| WO | 89/12748 | 12/1989 |
| WO | 98/30786 | 7/1998 |
| WO | 2005/071232 | 8/2005 |
| WO | 2006/113902 | 10/2006 |
| WO | 2009/035326 | 3/2009 |
| WO | 2009/064378 | 5/2009 |
| WO | 2009/082773 | 7/2009 |
| WO | 2009/118342 | 10/2009 |
| WO | 2009/132289 | 10/2009 |
| WO | 2010/022184 | 2/2010 |
| WO | 2010/027511 | 3/2010 |
| WO | 2011/128898 | 10/2011 |

OTHER PUBLICATIONS

U.S. Appl. No. 61/391,850, filed Oct. 11, 2010, Harif.
U.S. Appl. No. 61/425,009, filed Dec. 20, 2010, Harif.
International Search Report for PCT/IL2011/000305 mailed on Jan. 3, 2012.
Partial International Search Report for PCT/IL2012/050404 dated Dec. 19, 2013.
"Absorption Heat Pump", available as early as Oct. 21, 2012.
ElectraTherm's Products Rewrite The Economics of Recycled Energy, available as early as Oct. 21, 2012.
Growth and Collapse of a Vapor Bubble in a Narrow Tube, available as early as Oct. 21, 2012.
Kalina Cycle, available as early as Oct. 21, 2012.
Mechanism of AQSOA® Adsorption Heat Pump, available as early as Oct. 21, 2012.
Organic Rankine Cycle, available as early as Oct. 21, 2012.
Radioisotope Thermoelectric Generators (RTG)—The Nuclear Battery, available as early as Oct. 21, 2012.
Recovery of Waste Heat in Cogeneration and Trigeneration Power Plants, available as early as Oct. 21, 2012.
Stirling Engine, available as early as Oct. 21, 2012.
Thermal and Compressed-Air Storage (TACAS): The Next Generation of Energy Storage Technology, available as early as Oct. 21, 2012.

* cited by examiner

Geometry core 30x15 Diameter 100mm
Titanium holes 5.3 mm
Water convection coeff. 100,000 W/m²K
EB convection coeff. 100,000 W/m²K
EB convection coeff. on Tiianium 500 W/m²K

| Multiplication | f [cycle/min] | T | Amp. |
|---|---|---|---|
| 15.2 | 4.0 | 15.0 | 3.8 |
| 15.7 | 2.7 | 22.5 | 5.9 |
| 16.0 | 2.0 | 30.0 | 8.0 |
| 15.9 | 1.3 | 45.0 | 11.9 |
| 15.2 | 1.0 | 60.0 | 15.2 |

800

| Physical Properties | Metric | English | Comments |
|---|---|---|---|
| Density | 3.10 g/cc | 0.112 lb/in³ | |

| Mechanical Properties | Metric | English | Comments |
|---|---|---|---|
| Modulus of Elasticity | 410 GPa | 59500 ksi | |
| Compressive Strength | 4600 MPa | 667000 psi | |
| Poissons Ratio | 0.140 | 0.140 | |
| Fracture Toughness | 4.60 MPa-m½ | 4.19 ksi-in½ | |

| Thermal Properties | Metric | English | Comments |
|---|---|---|---|
| Specific Heat Capacity | 0.670 J/g-°C | 0.160 BTU/lb-°F | |
| Thermal Conductivity | 77.5 W/m-K<br>@Temperature 400 °C | 538 BTU-in/hr-ft²-°F<br>@Temperature 752 °F | |
| | 125.6 W/m-K<br>@Temperature 200 °C | 871.7 BTU-in/hr-ft²-°F<br>@Temperature 392 °F | |

Fig. 26A

| Physical Properties | Metric | English | Comments |
|---|---|---|---|
| Density | 3.10 g/cc | 0.112 lb/in³ | |
| Open Porosity | 0.000 % | 0.000 % | |
| Weibull Modulus | 10.0 | 10.0 | |

| Mechanical Properties | Metric | English | Comments |
|---|---|---|---|
| Hardness, Mohs | 9.00 | 9.00 | |
| Tensile Strength, Ultimate | 390 MPa | 56600 psi | |
| Modulus of Elasticity | 410 GPa | 59500 ksi | |
| Flexural Strength | 400 MPa | 58000 psi | |
| Compressive Strength | 2000 MPa | 290000 psi | |
| Poissons Ratio | 0.240 | 0.240 | |
| Shear Modulus | 165 GPa | 23900 ksi | Calculated |

| Thermal Properties | Metric | English | Comments |
|---|---|---|---|
| CTE, linear | 4.30 µm/m-°C | 2.39 µin/in-°F | |
| | @Temperature 20.0 °C | @Temperature 68.0 °F | |
| Specific Heat Capacity | 1.10 J/g-°C | 0.263 BTU/lb-°F | |
| Thermal Conductivity | 160 W/m-K | 1110 BTU-in/hr-ft²-°F | |
| Maximum Service Temperature, Air | 1350 °C | 2460 °F | |

Fig. 26B

GENERATOR

TECHNICAL FIELD

This subject matter of the present application relates to energy generating systems, more particularly, systems adapted for the generation of electrical energy utilizing heating/cooling and corresponding expansion/compression of a material.

BACKGROUND

Generation of electrical power is a process in which one form of energy is converted into electricity, and a great plurality of processes is known and used today for performing the same. Some of these processes involve turning one form of energy into mechanical energy allowing the movement/rotation of a mechanical element within a magnetic field for the generation of electricity.

Some of these processes are as follows:

- burning coal in order to turn water into steam and allowing the steam to expand within and revolve a turbine, the turbine being the mechanical element;
- using solar energy in order to turn water into steam and implementing the same;
- using the power of a waterfall for driving a turbine;
- burning gas within a combustion chamber to drive a piston (for example in an internal combustion engine);

In addition, there also exist processes for the generation of electricity which rely on the compression/expansion of a medium, entailing reciprocation/movement of a mechanical element. In some of these processes, compression/expansion of the medium is performed by heating/cooling thereof.

Such systems are disclosed, for example, in the following publications: GB1536437, WO2009064378A2, US2008236166A1, US2005198960A1, US2006059912A1 etc.

SUMMARY

According to the subject matter of the present application, there is provided a generator configured for extracting heat from and medium, and utilizing said heat in a process for the generation electrical energy. In particular, said heat can be utilized for reciprocating/rotating a mechanical element for the generation of said electricity.

According to one aspect of the subject matter of the present application, there is provided a generator comprising a heat differential module configured for providing a first reservoir and a second reservoir having a temperature difference therebetween, a pressure module containing a pressure medium configured for performing an alternate heat exchange process with the reservoirs of the heat differential module so as to fluctuate its temperature, and a conversion module configured to utilize the fluctuation of the pressure module for the generation of energy.

In particular, said generator can comprise:

- a heat differential module comprising at least:
  - a first, high temperature reservoir configured for containing a work medium at high temperature and being in selective thermal communication with the pressure medium of said pressure module;
  - a second, low temperature reservoir configured for containing a work medium at low temperature and being in selective thermal communication with the pressure medium of said pressure module; and

- a heat mechanism configured for maintaining a temperature difference between the reservoirs;
- a pressure module comprising a pressure medium configured for alternately performing a heat exchange process with the high/low temperature work medium so as to fluctuate its temperature between a minimal operative temperature and a maximal operative temperature corresponding to the high and low temperature of the reservoirs; the pressure medium being in mechanical communication with the conversion module so as to operate it
- a conversion module configured for converting temperature fluctuation of the pressure medium into output energy; and
- a heat recovery arrangement configured transferring heat from the pressure module back to the heat differential module or to the pressure module.

It is appreciated that the term 'medium' is used herein to describe any of the following: solids, fluids—liquids and gasses. For example, the pressure medium can even be a solid, or, for example, even a substance which solidifies under pressure.

It is also appreciated that the terms 'high' and 'low' temperature refer to two different temperatures, $T_H$ and $T_C$ (can also be referred to herein as $T_L$), so that $T_H>T_C$. According to different examples, the temperatures $T_R$ and $T_C$ can vary as follows:

- both $T_H$ and $T_C$ are above ambient temperature;
- both $T_H$ and $T_C$ are below ambient temperature; and
- $T_H$ is above ambient temperature and $T_C$ is below ambient temperature.

The term 'ambient' is used herein to define the average temperature of the external environment in which at least the heat differential module of the generator is located. In particular, while in general this environment is simply ambient air, the generator can also be configured to be immersed in any desired medium, whereby the term 'ambient' will refer to the average temperature of that medium.

The heat differential module can be constituted by a work medium sub-system comprising the high temperature reservoir and the low temperature reservoir. In particular, each of the high/low temperature reservoirs can be provided with an inlet line configured for providing selective fluid communication between the reservoirs and an inlet access end of the pressure module, and an outlet line configured for providing selective fluid communication between an outlet access end of the pressure module and the reservoirs.

The respective inlet/outlet lines of the heat differential module are configured for alternately providing high/low temperature work medium to the pressure module so as to perform a heat exchange process with the pressure medium.

The work medium sub-system can comprise a heat pump having an evaporator end and a condenser end, the heat pump being configured for withdrawing an amount of heat Q from the evaporator end towards the condenser end under the provision thereto of input power W. As a result of operation of the heat pump, the condenser end is constantly provided with heat, so that the temperature of the condenser end exceeds that of the evaporator end.

The arrangement is such that at least one of the high temperature reservoir and the low temperature reservoir is thermally associated with one of said evaporator end and condenser end of the beat pump. For example, the high temperature reservoir can be thermally associated with the condenser end of the heat pump and/or the low temperature reservoir can be associated with the evaporator end of the heat pump. Thus, the heat pump can operate as a cooling unit to maintain the low temperature reservoir at a desired 'low' temperature, while heat expelled from the air heat pump during cooling is used to maintain the high temperature reservoir at a desired 'high' temperature.

Thermal association between the evaporator/condenser end of the heat pump and the high/low temperature reservoir can be achieved via direct/indirect contact between the evaporator/condenser end of the heat pump and the work medium contained within the high/low temperature reservoir, allowing for a heat exchange process between the former and the latter. According to a specific example, such contact is achieved via emersion of the evaporator/condenser end of the heat pump within the high/low work medium.

According to one specific design, the high temperature reservoir is in direct thermal communication with the condenser side of the heat pump while the low temperature reservoir is associated with the outside environment (i.e. exposed to ambient temperature). According to a specific example of this design, the low temperature reservoir, though exposed to the outside environment can also be fitted with an element providing thermal association of the low temperature reservoir with the evaporator end of the heat pump.

According to another design, the high temperature reservoir is in direct thermal communication with the condenser side of the heat pump while the low temperature reservoir is in direct thermal communication with the evaporator side of the heat pump.

The pressure module can comprise a vessel containing the pressure medium and at least one conduit (referred herein as 'conduit' or 'core') having an inlet end and an outlet end, constituting the respective inlet and outlet access ends of the pressure module. Thus, said conduit can be configured for being in selective fluid communication with said high/low temperature reservoirs, to allow passage of high/low temperature work medium therethrough.

The generator is configured such that high/low temperature work medium can be alternatively passed through the conduit of the vessel (using selective fluid communication with the reservoirs) so as to perform a heat-exchange process with the pressure medium. Thus, the high temperature work medium is used to bring the pressure medium to said maximal operative temperature and said low temperature work medium is used to bring said pressure medium to said minimal operative temperature.

As a result, the pressure medium is configured to fluctuate between a maximal operative temperature and a minimum operative temperature thereof, said fluctuation causing a respective increase/decrease of the volume of said pressure medium, which can be utilized by the conversion module for the production of energy.

With respect to the pressure module, the following features can be used (individually or in combination with one another):

- the vessel can be a pressure vessel in which the pressure medium is pre-loaded to constitute a high-pressure medium. The advantages of pre-loading the pressure medium will become apparent when discussing the operation of the generator in further detail;
- the vessel can comprise more than one cores passing therethrough, each being configured for selective fluid communication with reservoirs of the heat differential module;
- the cores can be in selective fluid communication with one another, so as to allow them to assume at least a first, linear configuration in which the cores form a long single flow path for the work medium and a second, parallel configuration in which the cores are configured for simultaneous flow of work medium therein;
- the core/s can be made of materials having high resistance to compression/pressure forces, a low heat capacity and high heat transfer coefficient. For example, such materials can be Silicon Carbide, Tungsten Carbide, Titanium etc.;
- the length L of the pressure vessel can be considerably longer than a diameter D thereof, whereby several supports may be require within the pressure vessel to support the cores passing therethrough;
- the pressure vessel can comprise one or more cores which are co-aligned, having connection points at the supports;
- at least one of the cores can be fitted with a dissipation arrangement being in contact with the pressure medium and configured for increasing the efficiency of heat transfer into the pressure medium, consequently increasing the efficiency of the heat exchange process between the work medium and the pressure medium;
- the dissipation arrangement can be integral with the core or can be a separate arrangement fitted thereto. In the former case, the core can be formed with increased surface area in the form of ribs/spikes or the like, and in the latter case the core can be fitted with at least one dissipation member mounted thereon (e.g. ribs/wings/blades etc.);
- one or more cores can be configured for revolving about their own axis, or all the cores can be configured to revolve about a mutual axis (e.g. a central axis of the pressure vessel;
- the separate dissipation arrangement can also be configured to revolve about the cores on which it is mounted;
- the separate dissipation arrangement can be configured to be driven by a motor. The arrangement may also be such that the dissipation arrangements of several cores are simultaneously driven by a single motor;
- the motor driving the dissipation arrangement can be located outside the pressure vessel;
- a drive shaft of the motor can be configured to extend from both sides of the pressure vessel, and even be driven by two motors, one engaged with the drive shaft at each end. It is appreciated that is the drive shaft only protrudes from one end of the pressure vessel, i.e. having its second end within the pressure vessel, the pressure within the vessel can apply a great load on the drive shaft attempting to push it out of the pressure vessel. This effect may be so severe that the drive shaft is in danger of being 'shot out' of the vessel;
- each core can also be fitted with an inner arrangement configured for increasing heat transfer within the work medium, thereby increasing the efficiency of the heat exchange process between the pressure medium and the work medium;
- according to one example, the inner arrangement can be a static arrangement, i.e. simply located within the core. According to another example, the inner arrangement can be a dynamic arrangement configured for displacing/revolving within the core so as to circulate the work medium passing through the core;
- the inner arrangement can also be configured for actively displacing the work medium along the core (e.g. similar to an Archimedes' screw);
- for relatively long pressure vessels, the pressure vessel can comprise two or more cores which are co-linearly connected with one another, and also be provided with sealed supports at the junction points between two adjacent cores;

the pressure medium within said vessel can be pre-loaded and contained under pressure in the range of 2000-8000 atm., more particularly of 3000-7500 atm., even more particularly of 4000-7000 atm. and ever more particularly of 5000-6500 atm. It is appreciated that providing suitable materials from which the pressure vessel is made, even higher pre-loading of the pressure medium is possible;

the pressure medium can have a heat expansion coefficient in the range of 100-1200, more particularly of 250-1100, even more particularly of 500-1000 and ever more particularly of 600-900; and the pressure medium can be selected from a group of: Ethyl Bromide, water, N-Pentene, Diethyl ether, Methanol, Ethanol, Mercury and acids.

In addition, at least one or more of the components of the generator through which a heat transfer process takes place (e.g. cylinders, tubes, surfaces etc.) can be formed with a heat transferring surface which has an increased surface area. Specifically, said surface can be formed with a plurality of elements increasing its surface area, e.g. bulges, protrusions etc. According to one particular example, the elements can be micro-structures having geometric shapes such as cubes, pyramids, cones etc. According to another example, the elements can be ridges (either parallel or spiraling).

In the latter case, such ridge elements yield that in cross-section of the pipes taken along a central axis thereof, the surface appears undulating (between peaks and troughs). In case the ridges are formed both on the internal and on the external surface of the pipe, the arrangement can be such that a peak on the inner surface faces a trough on the outer surface and vise verse, thereby maintaining a generally constant material thickness in each cross-section perpendicular to the central axis.

It is appreciated that whereas pre-forming an outer surface of a cylindrical component (as mentioned above) with said micro-structures is fairly simple, pre-forming an inner surface of said cylindrical component poses a more complex problem. For this purpose, the steps of a method for pre-forming an inner surface of a cylindrical component with micro-structures are presented below:

(a) providing a generally planar plate having a first face and an opposite second face;

(b) pre-forming said micro-structures on said first face;

(c) providing a mold formed with a non-through going cavity corresponding in size and shape to said plate, said cavity having a base surface and an opening at a surface of the mold;

(d) placing said plate in said cavity such that said second face is mated against said base surface and said first faces facing the opening of the cavity, such that there remains a space between said first face and said opening;

(e) introducing a filler material into the cavity so as to fill said space, including spaced formed between the micro-structures;

(f) letting said filler material solidify so as to form a single plate constituted by said plate and solidified filler material, having a first face constituted by said filler material and a second face constituted by the second face of the original plate;

(g) deforming said single plate to obtain at least a partially cylindrical shape, such that the second face of said single plate constitutes and outer surface of said cylinder and the first face of said single plate constituted an inner surface of said cylinder;

(h) removing said filler material from said single plate, thereby resulting in the original plate having micro-structures formed on the inner surface thereof; and (i) performing a final finish on the inner surface with the micro-structures.

The conversion module of the generator can comprise a dynamic arrangement being in mechanical communication with the pressure medium so as to be driven thereby. In particular, the dynamic arrangement can comprise a movable member configured to reciprocate in correspondence with the fluctuation of the pressure medium from said maximal operative temperature and said minimal operative temperature.

According to a specific example, the dynamic arrangement can be constituted by a piston assembly, comprising a housing with a piston located therein, the piston sealingly dividing the housing into a first, input chamber being in mechanical communication with the pressure medium and the second, output chamber being in mechanical communication with a motor assembly configured for generating output energy.

The piston of the conversion module can be configured for reciprocating within the housing respective to volumetric fluctuations of the pressure medium. Specifically, as the temperature of the pressure medium increases, its volume increases correspondingly, thereby displacing the piston so that the volume of the input chamber increases and the volume of the output chamber decreases. Respectively, as the temperature of the pressure medium decreases, its volume decreases correspondingly, thereby displacing the piston so that the volume of the input chamber decreases and the volume of the output chamber increases. This reciprocation can be used by the motor assembly for the production of output energy.

According to one example, the motor assembly comprises a crank shaft arrangement so that reciprocation of the piston is configured for generating revolution of the crank shaft about is axis. This revolution can be converted, by known means, for the production of output energy.

According to another example, the piston can be associated with a linear shaft which is configured to be meshed with a gear assembly, which in turn is configured for converting the linear reciprocation of the shaft into rotational movement. This rotational movement can be converted, by known means, for the production of output energy.

According to a specific design embodiment, there can be provided an intermediary device between the piston and the motor, for example, the piston can be adapted to drive a utility piston via pressure on an intermediary substance such as oil.

The generator of the present application can further comprise at least one auxiliary heat exchanger which is in thermal communication at least with one of the outlet lines of the high temperature reservoir and the low temperature reservoir. The heat exchanger can be configured for performing a heat exchange process between the work medium within said outlet lines and the outside environment and/or a medium in which the heat exchanger is immersed.

Thus, the heat exchanger can be configured to respectively cool down/heat up the work medium heated up/cooled down during the heat exchange process with the pressure medium of the pressure module, upon its exit from the pressure vessel.

Several examples of various constructional configurations of the generator, as well as methods for operation of each configuration will now be described, in some of which configurations the generator may comprise additional elements, members, modules and/or arrangements. It should be appreciated that while each configuration may be used independently, different features of the various configurations can also be combined together to produce new configurations of the generator.

Basic Configuration

According to a basic configuration of the above described generator, the heat differential module comprises a high temperature reservoir which is in thermal communication with a condenser end of a heat pump, and a low temperature reservoir which is in thermal communication with the outside environment.

It is appreciated that under this configuration, the evaporator end of the heat pump is also exposed to the outside environment, so that, in operation, the evaporator end constantly withdrawn heat from the environment, and the heat pump constantly withdrawn heat from the evaporator end to the condenser end.

The pressure module comprises a single pressure vessel containing therein a pressure medium which is pre-loaded to high pressure (approx. 6000 atm.), and having at least one conduit passing therethrough. The pressure vessel is further provided with an inlet valve associated with an inlet end of the conduit and an outlet valve associated with an outlet end of the conduit. The pressure vessel can also be provided with an output line which is in fluid communication with a dynamic arrangement of the conversion module.

Each of the high/low temperature reservoirs comprises an inlet line providing selective fluid communication between the reservoir and the inlet valve and an outlet line providing selective fluid communication between the reservoir and the outlet valve.

There is thus provided a method for generating output energy using the generator of the above example, said method comprising the steps of:

a) selectively opening the inlet and outlet valve to provide fluid communication between the high temperature reservoir and the pressure vessel and passing high temperature work medium from the high temperature reservoir into inlet valve, through the conduit and out of the outlet valve back into the high temperature reservoir. As a result of a heat exchange process between the high temperature work medium and the pressure medium, the former cools down while the latter heats up to a maximal operative temperature thereof. When heating up, the pressure medium increases its volume and causes displacement of the piston in one direction; and b) selectively opening the inlet and outlet valve to provide fluid communication between the low temperature reservoir and the pressure vessel and passing low temperature work medium from the low temperature reservoir into inlet valve, through conduit and out of the outlet valve back into the low temperature reservoir. As a result of a heat exchange process between the low temperature work medium and the pressure medium, the former heats up while the latter cools down to a minimal operative temperature. When cooling down, the pressure medium decreases in volume and causes displacement of the piston in an opposite direction.

Performing the above steps repeatedly provides reciprocation of the piston back and forth, thereby allowing generation of electricity by the generator.

It is pointed out that higher the pressure of the high-pressure medium, the more efficient the thermodynamic operation of the generator (providing that mechanical integrity of the generator is maintained). More specifically, the piston has a predetermined resistance which requires a predetermined threshold pressure of the high-pressure medium to overcome this resistance and displace the piston. In the event a low-pressure medium is used, heating thereof will first result in a pressure increase of the low-pressure medium to the threshold pressure and only then displacement of the piston.

In light of the above, pre-loading the medium within the pressure vessel to a high pressure (exceeding that of the threshold pressure) ensures that upon heating of the pressure medium will directly entail displacement of the piston and will not go to waste for pressuring the medium to the threshold pressure.

The following should also be noted:

- when returning to the high temperature reservoir, the cooled down high temperature work medium can be free to absorb further heat from the condenser end of the heat pump so as to bring it back to its original high temperature;
- when returning to the low temperature reservoir, the heated up low temperature work medium can emit at least some heat into the outside environment so as to cool down and bring its temperature back to its original low temperature;
- when switching from step (a) to step (b) and depending on the length of the conduit, it can be beneficial, after the selective switching of the position of inlet valve to provide fluid communication with the low temperature reservoir, to delay selective switching of the position of the outlet valve to provide fluid communication with the low temperature reservoir. In this way, upon beginning the performing of step (b), the high temperature work medium contained within the conduit can be first be pushed through its outlet line into the high temperature reservoir, and only then will the outlet valve be selectively switched to provide fluid communication with the low temperature reservoir. The same holds true when switching from step (b) to step (a);

The above method can further include an additional step (c) in which the heated up low temperature work medium is passed through the auxiliary heat exchanger in order to allow more efficient emission of heat from the work medium to the outside environment.

Direct Recovery Configuration

According to the above configuration, the outlet line of the low temperature reservoir is not returned directly back into the low temperature reservoir upon exiting the pressure vessel, but rather is first passed through the evaporator end of the heat pump. In this manner, instead of its heat being emitted to the environment and re-absorbed by the heat pump at the evaporator end, it is directly returned to the evaporator end of the heat pump, thereby increasing the efficiency of the operation of the generator.

Cooled Reservoir Configuration

According to the above configuration of the generator is shown demonstrating a cooled reservoir arrangement in which the first, high temperature reservoir is in thermal communication with the condenser end of the heat pump (as in previous examples), while the low temperature reservoir is in thermal communication with the evaporator end of the heat pump.

Under the above arrangement, the low temperature work medium recovers a partial amount of heat from the pressure medium upon a heat exchange process therewith, and a remaining amount of heat from the environment to provide an overall amount of heat from the evaporator end to the condenser end of the heat pump HP.

Dual Operation

The generator can comprise two pressure vessels, each of which is connected to the high and the low temperature reservoir via corresponding inlet/outlet valves. In addition, the pressure medium of each of the pressure vessels is in fluid mechanical communication with a respective piston.

Using two pressure vessels allows for at least two modes of operation of the generator:

a) simultaneous cycle—both the pressure vessels perform steps (a) and (b) above in parallel. In other words, at any time point throughout the generator cycle, the temperature of the pressure medium in one pressure vessel is similar to that of the pressure medium in the other pressure vessel, i.e. both pressure mediums heat up simultaneously and cool down simultaneously. Under this arrangement, the generator can be provided with two motor assemblies, each being driven by its respective piston;

b) alternating cycle—the pressure vessels perform steps (a) and (b) at an offset, e.g. when one pressure vessel performs step (a) of the cycle, the other pressure vessel performs step (b) of the cycle. In other words, when the pressure medium in one pressure vessel undergoes heating, the pressure medium in the other pressure vessel undergoes cooling and vise versa. Under this arrangement, the generator can be provided with one motor assembly, which is driven by two pistons (i.e. both pistons can reciprocate in synchronization with one another).

Intermediate Reservoir Configuration

Under the above configuration, the generator can comprise three reservoirs: a high temperature reservoir, a low temperature reservoir and an intermediate temperature reservoir. This arrangement is based on the cooled reservoir configuration, wherein an additional intermediate reservoir is added containing intermediate temperature work medium. The intermediate temperature reservoir is configured to contain an intermediate temperature work medium, the term 'intermediate' referring to a temperature between said high temperature and said low temperature. Each of the high/intermediate/low temperature reservoirs is in selective fluid communication with the pressure vessel.

Under this arrangement, two additional steps (a') and (b') are performed on top of steps (a) and (b) described with respect to the basic configuration, as follows:

(a') [performed after step (a)] passing intermediate temperature work medium from the intermediate temperature reservoir through the conduit of the pressure vessel, thereby reducing the temperature of the pressure medium (via heat exchange process therewith) from the maximal operative temperature to an intermediate operative temperature (between the maximal operative temperature and the minimal operative temperature); and (b') [performed after step (b)] passing intermediate temperature work medium from the intermediate temperature reservoir is passed through the conduit of the pressure vessel, thereby increasing the temperature of the pressure medium (via heat exchange process therewith) from the minimal operative temperature to an intermediate operative temperature (between the maximal operative temperature and the minimal operative temperature).

Specifically, during steps (a') and (b') above, the intermediate temperature work medium is used for cooling/heating of the pressure medium between the cooling/heating thereof by high/tow temperature work medium respectively. Thus, each cooling/heating step is divided into two stages, the first being performed by intermediate work medium and the second being performed by high/low work medium.

Under the above arrangement, it is appreciated that the high/low temperature work medium is practically used to provide heating/cooling within a reduced temperature range (i.e. between intermediate and high and/or between intermediate and low), thereby making the operation of the generator more effective.

With respect to the above arrangement, it is appreciated that the intermediate temperature reservoir can be in thermal communication with the outside environment, while the high/low temperature reservoirs are in thermal communication with the condenser/evaporator ends of the heat pump respectively.

In addition, any one of the outlet lines of the high/intermediate/low temperature reservoirs can be passed through the auxiliary heat exchanger upon exiting the pressure vessel. According to a particular example of this arrangement, the intermediate outlet line can pass through the auxiliary heat exchanger so as to respectively convey to/absorb from the atmosphere the required amount of heat gained/lost during the heat exchange process with the pressure medium before returning to its reservoir. To the contrary, the outlet lines of the high/low temperature reservoirs can return the work medium directly to its respective reservoir without necessarily passing through the heat exchanger.

Cross-Over Configuration

According to the above configuration, the generator comprises two pressure vessels (similar to the dual operation arrangement), and each of the outlet valve is also in selective fluid communication with the inlet valves.

Specifically, each outlet valve O is also provided with a cross-over line COL which provides fluid communication between the outlet valve of one pressure vessel and the inlet valve of the other pressure vessel. Under this arrangement, it is possible to perform additional cross-over steps as explained below:

(a") [performed after step (a')] in which the intermediate work medium WM, upon exiting the conduit of one pressure vessel PV is provided, via cross-over line COL to the inlet valve of the other pressure vessel PV in order to begin heating the pressure medium therein and only then back to the intermediate temperature reservoir via the other outlet valve; and (b") [performed after step (b)] in which the intermediate work medium WM, upon exiting the conduit of one pressure vessel PV is provided, via cross-over line COL to the inlet valve of the other pressure vessel PV in order to begin cooling the pressure medium therein and only then back to the intermediate temperature reservoir via the other outlet valve.

The above arrangement provides for a more significant heat recovery from the pressure medium. More specifically, instead of emitting/withdrawing a certain amount of heat to/from the environment during its return to the intermediate temperature reservoir, the intermediate temperature work medium now emits/withdraws a portion of that amount of heat in a heat exchange with the pressure medium, thereby increasing the efficiency of the generator.

Heat Gradient Recovery Configuration

Under the above configuration, the generator also comprises one pressure vessel (similar to the basic arrangement), and at least one gradient tank associated with the outlet valve.

The gradient tank can comprise an arrangement configured for preventing mixing of portions of work medium contained therein, thereby considerably reducing heat transfer between the portions and the speed with which these portions reach a thermal equilibrium. In particular, the gradient tank, when used in the present generator, can contain a first portion of work medium at a temperature T1, a second portion of work medium at temperature T2 and so forth so that T1≠T2≠ and so forth.

Specifically, under operation of the generator as will now be explained, the gradient tank allows for maintaining the work medium contained therein at a temperature gradient so that T1>T2> . . . >Tn, or alternatively, T1<T2< . . . <Tn.

Thus, the portions of the heated/cooled intermediate temperature work medium entering the gradient tank have different temperatures, and, as will be explained in detail later, it can be beneficial to maintain a temperature gradient between these portions within the gradient tanks. For this purpose, the gradient tank can further comprise a non-mix mechanism, configured for maintaining a temperature gradient within the reservoir by preventing different portions of the work medium from mixing with one another. In other words, the non-mix mechanism is configured for slowing down the work medium received within the gradient tank from reaching a uniform temperature.

The non-mix mechanism can be any mechanism formed with a flow path such that the cross-sectional area for heat transfer between consecutive portions of the work medium entering the gradient tank is small enough to considerably slow down the heat transfer. The term 'small enough' refers to a cross-sectional area defined by a nominal cross-sectional dimension D which is considerably smaller than the length L of the path.

Examples of such a non-mix mechanism can be:

- a long tube of length L and cross-sectional D<<L;
- a spiraling tube having similar characteristics;
- a spiraling surface located within the reservoir so as to form a flow path of the above properties; and
- a confining labyrinth formed with a plurality of flow paths, each adhering to the above properties.

In all of the above examples, the flow path can be made out of a material having isolating properties, i.e. having poor heat conduction. One example for such a material can be plastic.

In operation, several additional steps are added to the basic operation steps (a) and (b) as explained with respect to the basic configuration, as follows:

(b''') [performed before step (b)] in which low temperature work medium is passed through the conduit of the pressure vessel to be heated via a heat exchange process with the pressure medium, but instead of being returned to the low temperature reservoir is introduced into the gradient tank. It is appreciated that the first portion of the low temperature work medium to exit the pressure vessel with reach the gradient at a higher temperature than the last portion (as the pressure medium gradually cools down during this heat exchange process). The design of the gradient tank allows maintaining these portions each at their own respective temperature, so that eventually, the uppermost portion in the gradient tank is the of the highest temperature while the lower-most portion in the gradient tank is the of the lowest temperature.

(b'''') [performed after step (b)] in which the work medium in the gradient tank is re-circulated back through the pressure vessel in a LIFO (Last In First Out) order, thereby gradually heating up the pressure medium to an intermediate temperature, and only then commencing step (a) of the operation.

In essence, these steps of the operation of the generator describe a "stall" operation in which the work medium WM in the gradient tank is held therein (stalled) until the right time, and then released into the piping of the generator to perform the required heat exchange process.

It is appreciated that each portion of the intermediate temperature work medium passing through the heated/cooled pressure vessel is emitted therefrom having a different temperature. For example, if operation of the system is observed in a quantified manner, when the intermediate temperature work medium of temperature $T_{INTERMEDIATE}$ begins circulating through the heated pressure vessel containing the pressure medium at the high temperature $T_{HOT}>T_{INTERMEDIATE}$, the first portion of the intermediate temperature work medium will be emitted from the pressure vessel at a temperature $T_{HOT}'$ such that $T_{INTERMEDIATE}<T_{HOT}'<T_{HOT}$, the second portion of the work medium will be emitted from the pressure vessel at a temperature $T_{HOT}''$, such that $T_{INTERMEDIATE}<T_{HOT}''<T_{HOT}'<T_{HOT}$ etc. A similar process occurs with the intermediate temperature work medium passing through the cooled pressure vessel, only $T_{INTERMEDIATE}>T_{COLD}''>T_{COLD}'>T_{COLD}$. The temperatures $T_{HOT}$, $T_{INTERMEDIATE}$ and $T_{COLD}$ correspond to the high/intermediate/low temperature of the work medium in the respective high/intermediate/low temperature reservoirs.

The above arrangement provide for another way of performing heat recovery in the generator, thereby further increasing its efficiency. It is also appreciated that the use of the LIFO configuration allows the pressure medium to be gradually heated (starting from the lowest temperature portion first), making better use of the amount of heat of each portion of the work medium.

It is also appreciated that the gradient tank can be used both for the heated low temperature work medium and the cooled high temperature work medium. According to specific examples as will be described in detail later, the generator can comprise more than one gradient tank. For example, each pressure vessel can be provided with its own gradient tank and/or gradient tanks are provided for high/low temperature work medium.

According to a specific arrangement, the heat gradient recovery configuration can be combined with the dual operation configuration, wherein the operation of the generator can be described as follows:

At a first stage, similar to the previously described example (without gradient tanks), high temperature work medium at temperature $T_{HOT}$ is passed through one pressure vessel to heat up the pressure medium contained therein, while, simultaneously, low temperature work medium at temperature $T_{COLD}$ is passed through the other pressure vessel to cool down the pressure medium contained therein. After this stage, the pressure medium in one pressure vessel is heated up to a temperature TROT'<$T_{HOT}$ and the pressure medium in the other pressure vessel is cooled down to a temperature $T_{COLD}'>T_{COLD}$.

Thereafter, a return step is performed, during which intermediate temperature work medium at temperature INTERMEDIATE is passed through both pressure vessels in order to cool down/heat up the pressure medium therein. Specifically, the intermediate temperature work medium passing through the heated pressure vessel performs a heat transfer process with the latter and cools it down to a temperature closer to $T_{INTERMEDIATE}$, while the intermediate temperature work medium passing through the cooled pressure vessel performs a heat transfer process with the latter and heats it up to a temperature closer to $T_{INTERMEDIATE}$ (however, not reaching $T_{INTERMEDIATE}$).

However, contrary to the previous example in which the intermediate temperature work medium, after passing through the pressure vessels was returned back to the intermediate reservoir via the radiator, in the present example, the intermediate temperature work medium flows into the gradient tanks in a two-beat sequence.

During the first beat of the sequence, the first portion of the heated intermediate temperature work medium to exit the pressure vessel is at a temperature $T_{HEATED}$ such that $T_{INTERMEDIATE}<T_{HEATED}<T_{HOT}'$, the second portion of the work medium will be emitted from the pressure vessel at a temperature $T_{HOT}'$ such that $T_{INTERMEDIATE}<T_{HEATED}'<T_{HEATED}<T_{HOT}'$ etc. The heated work medium is passed into the gradient tank of its respective pressure vessel such that the gradient tank contains therein the different portions of the heated work medium and maintains a temperature gradient therebetween.

Simultaneously, the first portion of the cooled intermediate temperature work medium to exit the pressure vessel is at a temperature $T_{COOLED}$ such that $T_{INTERMEDIATE}>T_{COOLED}>T_{COOL}'$, the second portion of the work medium will be emitted from the pressure vessel at a temperature $T_{COOLED}'$ such that $T_{INTERMEDIATE}>T_{COOLED}'>T_{COOLED}>T_{COOL}'$ etc. The cooled work medium is passed into the gradient tank of its respective pressure vessel such that the gradient tank contains therein the different portions of the cooled work medium and maintains a temperature gradient therebetween.

In any case, it is important to note that since the heated pressure medium within the heated pressure vessel never reaches $T_{INTERMEDIATE}$ during this step, the intermediate temperature work medium passing therethrough also never leaves the pressure vessel at a temperature INTERMEDIATE, but rather always slightly hotter. In other words, each portion of the heated intermediate temperature work medium is at a temperature $T_{HEATED}''$ such that $T_{INTERMEDIATE}<T_{HEATED}''<T_{HOT}$. At the same time, since the cooled pressure medium within the cooled pressure vessel also never reaches $T_{INTERMEDIATE}$ during this step, the intermediate temperature work medium passing therethrough also never leaves the pressure vessel at a temperature $T_{INTERMEDIATE}$, but rather always slightly cooler. In other words, each portion of the cooled intermediate temperature work medium is at a temperature $T_{COOLED}''$ such that $T_{INTERMEDIATE}>T_{COOLED}''>T_{COOL}$. Due to the non-mix mechanism in each of the gradient tanks, the work medium in each of the gradient tanks is maintained with a temperature gradient, slowing down mixing between the different portions of the heated/cooled intermediate temperature work medium.

When the first beat of the sequence is complete, the majority of each of the gradient tanks is filled with a heated/cooled intermediate temperature work medium at a varying temperature across the reservoir. At this point, the second beat of the sequence is performed, also referred to as the cross-over step:

work medium from the gradient tank of the heated pressure vessel (i.e. the gradient tank containing the heated intermediate temperature work medium used during the first beat) is passed through the opposite (cooled) pressure vessel containing the pressure medium previously cooled down by the low temperature work medium to a temperature $T_{COLD}'$, and work medium from the gradient tank of the cooled pressure vessel (i.e. the gradient tank containing the cooled intermediate temperature work medium used during the first beat) is passed through the opposite pressure vessel containing the pressure medium previously heated up by the high temperature work medium to a temperature $T_{HOT}'$.

In addition, the work medium from the gradient tanks flows to the opposite pressure vessels in a First In Last Out (FILO) order, i.e. the last portion of the heated up intermediate temperature work medium to enter the gradient tank (which is also the coolest portion of the heated intermediate temperature work medium) will be the first portion to be passed through the opposite pressure vessel. In this way, the temperature of the work medium passed through the now low/high temperature pressure vessel during the cross-over step constantly and gradually increases/decreases.

It is noted that the even the coolest portion of the heated up work medium is at a temperature $T_{HOT}''>T_{INTERMEDIATE}>T_{COLD}'$, and even the hottest portion of the cooled down intermediate temperature work medium is at a temperature $T_{COLD}''<T_{INTERMEDIATE}<T_{HOT}'$. Therefore, it is appreciated that the temperature difference between the cooled/heated pressure medium $T_{COLD}'/T_{HOT}'$ and the coolest/hottest portion of the heated/cooled intermediate temperature work medium $T_{HOT}''/T_{COLD}''$ is much greater than the previous temperature difference between the former and the intermediate temperature work medium at $T_{INTERMEDIATE}$.

It is also noted that one of the reason for performing the cross-over step at a LIFO order is that if a First In First Out (FIFO) order were used, the hottest/coolest portion of the heated/cooled intermediate temperature work medium would perform such an intense heat transfer process with the pressure medium that the coolest/hottest portion of the heated/cooled intermediate temperature work medium would have little effect on the heat transfer process. Using LIFO order allows better utilization of each portion of the work medium.

During the above step (switch step), a heat transfer takes place between the heated up intermediate temperature work medium and the cooled pressure medium resulting in an average temperature of the cooled down pressure medium which is relatively $T_{AV\_C}=(T_{COLD}'+T_{HEATED}'')/2$. Simultaneously, a heat transfer takes place between the cooled down intermediate temperature work medium and the heated pressure medium resulting in an average temperature of the cooled down pressure medium which is relatively $T_{AV\_H}=(T_{HOT}'+T_{COOLED}'')/2$.

It should be noted that due to the temperature difference discussed above (i.e. $T_{INTERMEDIATE}<T_{HEATED}''<T_{HOT}'$ and $T_{INTERMEDIATE}>T_{COOLED}''>T_{COLD}'$), the temperatures $T_{AV\_C}$ and $T_{AV\_H}$ are hotter/cooler than a corresponding average temperature $T_{AV\_C}'$ and $T_{AV\_H}$ that would have been achieved if only intermediate temperature work medium at $T_{INTERMEDIATE}$ was used to cool/heat the pressure medium.

After the pressure mediums of both pressure vessels finish the heat transfer process and reach the temperatures of $T_{AV\_C}$ and $T_{AV\_H}$, the main cycle (steps (I) and (III)) repeats itself but with high temperature work medium now flowing to the previously cooled pressure vessel and the low temperature work medium now flowing to the previously heated pressure vessel.

The switch step thus provides an improvement over the previously described example of the generator allowing for a more efficient heat transfer process with the pressure medium, so that the heated/cooled pressure medium returns, after heating/cooling to a temperature much closer to $T_{INTERMEDIATE}$, and can even reach a temperature which is lower/higher than $T_{INTERMEDIATE}$.

In both beats of the sequence, intermediate temperature work medium (although not necessarily at temperature $T_{INTERMEDIATE}$) is passed through the radiator, allowing it to perform a heat transfer process with the outside environment (usually ambient air but can be any other medium in which the radiator is immersed).

Throughout the operation of the generator, due to thermodynamic performance of the work medium and pressure medium, the generator constantly produces heat, which is, in turn, emitted to the ambient environment through the radiator. More particularly, the arrangement is such that the increase in temperature of the heated intermediate temperature work medium is slightly greater than the decrease in temperature of the cooled intermediate temperature work medium. This difference in increase/decrease is expressed by slight overheating of the intermediate temperature work medium, i.e. excess heat being generated. However, it is compensated by the eviction of the excess heat via the radiator.

It should also be noted that the entire generator, and more particularly, all the piping of the generator configured for passing high/low/intermediate temperature work medium is always under constant pressure (i.e. there is always work medium present in each section of the pipe, whether circulating or not). Thus, in an initial position of the system, the gradient tanks contain therein intermediate temperature water (i.e. water at temperature $T_{INTERMEDIATE}$). During the first beat of the sequence, when heated/cooled intermediate temperature work medium enters the gradient tanks, the work medium previously contained therein is emitted and re-circulated back into the auxiliary storage reservoir containing intermediate temperature work medium at temperature $T_{INTERMEDIATE}$.

During the switch step (second beat of the sequence), in order to pump the work medium contained in the gradient tanks into the proper pressure vessels, intermediate temperature work medium is circulated into the gradient tanks, thus pushing the heated/cooled intermediate temperature work medium out of the reservoir and into the desired pressure vessel. It is noted that during the second beat of the sequence, the reservoirs (high/low/intermediate) are shut off from the circulating fluid so that, in fact, only intermediate temperature work medium is circulated through the piping of the generator.

The generator can also comprise one or more thermostats configure for providing control over high/low/intermediate temperature work medium as well as heated/cooled pressure medium. For example, the thermostats can be configured for maintaining the intermediate temperature work medium at a temperature generally equal to that of the ambient environment (air, water etc.) the generator is surrounded by.

Accumulator Configuration

According to the above configuration, the generator can further comprise an accumulator unit containing a storage work medium. The accumulator unit is provided with a heating arrangement which is configured to be operated by output power provided by the generator.

The accumulator unit can be in selective fluid communication with the pressure vessel via corresponding inlet and outlet lines which are connected to the inlet and outlet valve respectively.

In operation, a portion of the output power of the generator can be used to operate the heating arrangement, so that it heats up the work medium contained within the accumulator unit. Thus, at a required moment, the high temperature reservoir can be shut-off, and the accumulator unit can provide the necessary high temperature work medium. Under this arrangement, any excess output power which is not used can be provided to the accumulator unit, thereby operating, de facto, as an accumulator.

According to a specific example, the heating element can be a heating coil or any other element which is configured to be heated so as to heat the storage work medium. Alternatively, the heating arrangement can be constituted by an auxiliary heat pump (not shown), and the accumulator unit can comprise two compartments, one being in thermal communication with the evaporator side of the auxiliary heat pump and the other in thermal communication with the condenser side of the auxiliary heat pump.

In particular, each of the compartments can have a respective inlet to which corresponding inlet and outlet lines are attached respectively. The arrangement can be such that the outlet is located at a top end of the high temperature compartment, while the inlet is located at a bottom end of the high compartment. In contrast, the outlet of the low temperature compartment can be located at a bottom end of the compartment while the inlet thereof can be located at a top end of the compartment.

The above arrangement allows for withdrawing high temperature work medium from a high temperature zone of the high temperature compartment, and returning the work medium to a low temperature zone of the high temperature compartment. Correspondingly, this arrangement allows withdrawing low temperature work medium from a low temperature zone of the low temperature compartment, and returning the temperature work medium to a high temperature zone of the low temperature compartment.

In operation, once the auxiliary work medium in the compartments and reaches temperatures which are similar to those of the high/low temperature reservoirs respectively, it can be used in operation of the generator while the main heat pump temporarily ceases its operation.

It is appreciated that the accumulator can comprise both a heat pump and direct heating elements (e.g. coil), and work in combination with both. Specifically, the high temperature compartment can be provided with heaters which are configured for directly heating the storage fluid contained within the compartment. It is appreciated that during operation of the auxiliary heat pump, the storage medium within the high/low temperature compartment can reach a heating/cooling limit (i.e. reaching a maximal/minimal temperature limit). In such an event, the operation of the auxiliary heat pump can be interrupted, and the heaters are then used to further heat the storage medium in the high temperature compartment.

Under the above arrangement, once the auxiliary heat pump is interrupted, the work medium in the high temperature compartment can be used as a high temperature work medium, while the work medium in the low temperature compartment is used as the low/intermediate work medium.

In all of the above aspects of the subject matter of the present application, the A/C unit used for generating the heat/cold source for the respective high/low temperature reservoir can be in the form of a cascade arrangement, comprising several grades, each of which operates as a basic A/C compression/expansion manner.

In particular, the cascade arrangement can comprise a first end-grade configured for providing the heat for the high temperature reservoir and a second end-grade configured for providing the necessary cold for the low temperature reservoir.

Each of the grades comprises an evaporator section, a compressor, an expansion member and a condenser section, and contains a fluid (gas or liquid) configured for undergoing corresponding compression and expansion to provide a high temperature source at the condenser and a low temperature source at the evaporator as known per se.

Specifically, the fluid in each of the grades is configured to have an evaporator temperature $T_{EVAP(n)}$ and a condenser temperature $T_{COND(n)}$, where $T_{COND(n)}>T_{EVAP(n)}$, and n denotes the number of the grade.

The cascade arrangement is designed such that the condenser section of one grade is configured for performing a heat exchange process with the evaporator section of the subsequent grade. In particular, the design can be such that the temperature of compressed fluid in the condenser of the one grade is higher than the temperature of the expanded fluid in the evaporator of the subsequent grade with which the heat exchange process takes place.

Each of the grades can operate in a closed-loop, i.e. the fluid of each grade does not come in contact with the fluid of a subsequent grade. Specifically, the heat exchange process between two subsequent grades can be performed via an intermediate member, e.g. a heat conducting surface.

According to a specific example, the heat exchange process between two subsequent grades takes place in a heat exchanger comprising an inner tube of diameter $D_1$ passing through an outer tube of diameter $D_2<D_1$. The inner tube constitutes the condenser of the one grade while the outer tube constitutes the evaporator of the subsequent grade.

Thus, in operation, compressed fluid of one grade, heated due to compression thereof to a temperature $T_{COND(n)}$, flows through the inner tube an expanded fluid of the subsequent grade, cooled due to expansion thereof to a temperature $T_{EVAP(n+1)}<T_{COND(n)}$, flows through the outer tube (so as to flow around the inner tube). As a result, a heat exchange process takes place via the wall of the inner tube—the heated fluid coming in contact with an inner surface of the inner tube and the cooled fluid coming in contact with an outer surface of the inner tube. In this heat exchange process, heat is emitted from the fluid flowing within the inner tube to the fluid flowing in the outer tube.

It should be noted that the design of the heat exchanger can be such that the volume defined by the inner tube is smaller than the volume defined between the external surface of the inner tube and the internal surface of the outer tube. In particular, while the inner surface of the outer tube is essentially round in cross-section taken perpendicular to a longitudinal axis of the tube, while the inner and/or outer surfaces of the inner tube can be of a more convoluted shape in the same cross-section.

The flow direction within the condensing portion and evaporator portion can either be parallel, i.e. both the compressed fluid and the expanded fluid flow in the same direction (as in a parallel heat exchanger). Alternatively, the flow direction can be opposite, i.e. i.e. the compressed fluid and the expanded fluid flow in opposite directions (as in a counterflow heat exchanger).

Each of the grades can contain a different fluid, and is configured for operation at a different temperature range. In particular, within the same grade the difference between the high temperature $T_{COND}$ of the fluid in the condenser and the low temperature $T_{EVAP}$ of the fluid in the evaporator can be generally similar between all the grades. For example, the temperature difference can be about 30° C.

According to a specific example, the cascade arrangement can comprise seven grades, each operating at a temperature range Δ of about 30° C., with the temperature of the fluid at the evaporator of the first grade $T_{EVAP(1)}$ is as low as 0° C., and the temperature of the fluid at the condenser of the seventh grade $T_{EVAP(7)}$ is as high as 245° C.

It is noted that in all the grades, the temperature of the expanded fluid in the evaporator of one grade is always lower than the condensation temperature of compressed fluid in the condenser of the subsequent grade. In other words, $T_{EVAP(n)}<T_{COND(n+1)}$.

The generator can also comprise a controller configured for regulating the operation of the compressor and/or the expansion valve of each grade so as to maintain a desired difference between the compression temperature of a fluid in one grade and the expansion temperature of fluid in a subsequent grade.

As previously described, each grade can comprise a compressor configured for compressing the fluid circulating in the grade during its progression between the evaporator to the condenser. In order to maintain a generally similar temperature range between the condenser and the evaporator in each grade, the compressors of the grades can have different power consumptions so that each grade is configured for operating at a different COP.

The reasoning for this is that the COP for heating/cooling is calculated as the temperature difference divided by the high/low temperature. Therefore, a grade having a 30° C. condenser/evaporator difference between 27° C. and 57° C. yields a COP which is different than that of a grade having a 30° C. condenser/evaporator difference between 90° C. and 120° C.

Alternatively, each grade can be fitted with the same compressor (i.e. providing the same power). However, under this arrangement, the temperature difference between the condenser/evaporator in each grade (from low to high) will gradually be reduced. For example, the Δ for the first grade can be 30° C. for the first grade, 24° C. for the second grade, 20° C. for the third grade and so forth.

It is appreciated that by using a cascade arrangement having several grades, each contributing to the overall temperature difference between $T_{HOT}$ of the high temperature reservoir and $T_{COLD}$ of the low temperature reservoir. As in the above example, each of the seven grades can contribute about 30° C., thereby yielding a temperature difference of 240° C.

It should be understood that a single compression/expansion cycle having a temperature difference of 240° C. has a COP which is much lower than that of seven compressors, each contributing to its own compression/expansion cycle. As a result, the energy going to waste in the single compression/expansion cycle is greater than that of the cascade arrangement, making the latter more efficient for the presently described generator.

As previously described, the generator can comprise a radiator configured for allowing the work medium to perform a heat exchange process with the environment after heating/cooling the pressure fluid within the pressure vessels.

According to a particular design, the high work medium, after heating the pressure fluid (and subsequently cooling down) is provided directly back into the high temperature reservoir, while the low temperature work medium, after cooling the pressure fluid (and subsequently heating up) passes through the radiator in order to be cooled down by the environment.

The radiator unit can be configured for being controlled according to the temperature of the environment and the resulting temperature of the low temperature work medium, so that the low temperature work medium leaves the radiator unit at a generally constant and predetermined temperature.

More particularly, the radiator unit can comprise a control element configured for determining the cooling rate provided by the radiator, and a sensing unit configured, on the one hand, for measuring the temperature of the low temperature work medium leaving the radiator unit, and, on the other hand, providing the data to the control unit.

For example, if it is desired that the low temperature work medium leaves the radiator unit and enters the low temperature reservoir at a predetermined temperature T, the sensing unit measures the temperature T' of the low temperature work medium leaving the radiator unit and:

(a) if T'>T, the sensing unit provides this reading to the control unit, which, in turn, increases the cooling rate of the radiator unit (for example by increasing the revolution speed of a cooling fan), to reduce the temperature T'; and (b) if T'<T, the sensing unit provides this reading to the control unit, which, in turn, decreases the cooling rate of the radiator unit (for example by decreasing the revolution speed of a cooling fan), to increase the temperature T'.

With reference to the above, when using the cascade arrangement, the configuration is such that the heat exchange process within the radiator takes place with the low temperature work medium entering the first grade of the cascade arrangement associated with the low temperature reservoir. In particular, this heat exchange process brings the low temperature work medium (which is now heated after passing through the pressure vessel) to a temperature $T' \approx T_{ENV}$, while $T_{COND} > T_{ENV} > T_{EVAP}$, where $T_{COND}$ is the high temperature of the compressed fluid at the condenser of the first grade and $T_{EVAP}$ is the low temperature of the expanded fluid at the evaporator of the first grade.

It should be noted that each grade (depending on its compressor) is designed for a predetermined temperature range, i.e. it is configured to remove a predetermined amount of heat from the cold end (evaporator). If the evaporator is located at an environment providing it with more heat than the compressor can withdraw in the compression/expansion cycle of the grade, the grade becomes less efficient (i.e. the compressor cant cope with removing heat from the evaporator).

Thus, the cascade arrangement can further be configured for adjusting its operation, and its overall temperature range, in accordance with the temperature of the environment. More particularly, if the temperature of the environment increases such that $T_{ENV} > T_{COND} > T_{EVAP}$, and the first grade of the cascade arrangement becomes less efficient (as described above), the cascade arrangement can be configured for bypassing the first grade and connecting the low temperature reservoir to the second grade.

Under the above arrangement, instead of operating between a low temperature of $T_{EVAP(1)}$ and a high temperature of $T_{COND(7)}$, the cascade arrangement now operates between as low temperature of $T_{EVAP(2)}$ and a high temperature of $T_{COND(7)}$. Thus, the overall temperature difference between the high and low temperature reservoir decreases, but the efficiency of the cascade arrangement remains generally the same.

In order to perform the above adjustment, the cascade arrangement can have a bypass module comprising an evaporator associated to the second grade and located within the low temperature reservoir. The bypass module can further comprise valves allowing shutting off the first grade completely, and directing the compressed fluid of the second grade to expand within the evaporator of the bypass module instead of in the original evaporator of the second grade.

According to a specific design of the generator, it can include the following features:

Multiple pressure vessels—each side (left/right) of the generator comprises four pressure vessels, each being of similar structure to the pressure vessels described with respect to previous examples;

Linear core connection—each vessels comprises six cores, but contrary to previous examples, the cores are connected linearly to one another so as to form a long work medium flow path (six times as long in comparison to a parallel connection as previously disclosed);

Linear vessel connection (work medium)—the cores of the four pressure vessels of each side are linearly connected to one another so as to form an even longer work medium flow path;

Linear vessel connection (pressure medium)—the compartments of the four pressure vessels on each side containing the high pressure medium are also in fluid communication with one another via high-pressure connections, thereby forming a long pressure medium flow path;

External low temperature reservoir—the low temperature reservoir constituted by the evaporator of the A/C unit is exposed to the environment and is not used for circulation of work medium therethrough.

In operation, a full cycle of one side of the generator can include the following steps (taking into account that the opposite side undergoes the same steps only at a shift):

a) High temperature work medium is passed from the condenser end of the A/C unit along the length of twenty four cores (six cores in each of the four pressure vessels), thereby increasing the temperature of the pressure medium to its maximal operating temperature, and simultaneously being cooled down to a lower temperature;

b) From the last core of the fourth pressure vessel, the cooled down high temperature work medium is returned to the condenser end of the A/C unit after passing through a radiator for expelling therefrom at least an additional part of the heat remained therein;

c) Intermediate temperature work medium at an ambient temperature from the intermediate reservoir is passed through all twenty four cores of the four pressure vessels, thereby lowering the temperature of the pressure medium below the maximal operating temperature, and simultaneously being heated to a higher temperature;

d) From the last core, the intermediate work medium flows into the gradient tanks to be stored there, so that the first portion of intermediate temperature work medium to enter the gradient tank is at the highest temperature and the last portion to enter the gradient tank is at the lowest temperature;

e) Intermediate temperature work medium at an ambient temperature from the intermediate reservoir is passed through all twenty four cores of the four pressure vessels, thereby further lowering the temperature of the pressure medium to the minimal operative temperature, and simultaneously being heated to a higher temperature;

f) From the last core, the intermediate work medium flows back into the intermediate work reservoir, passing through the radiator to expel any additional heat to the environment;

g) Heated intermediate temperature work medium from the gradient tank is passed through the cores of the four pressure vessels, thereby gradually heating the pressure medium to a temperature above the minimal operative temperature yet still below the maximal operative temperature. Gradual heating is achieved by using a LIFO arrangement where the last portion to enter the gradient tank (which is also of the lowest temperature) is first to flow through the cores;

h) From the last core, the intermediate temperature work medium flows into the intermediate reservoir while passing through the radiator unit to expel any additional heat to the environment;

i) Repeating from step (a).

In particular, steps (a) and (b), and (e) and (f) can last for a first period of time and steps (c) and (d), and (g) and (h) can last for a second period of time which is greater than the first period of time. Specifically, the second period of time can be twice as long as the first period of time. Under a particular example, the first period of time can be about 5 seconds and the second period of time can be about 10 seconds.

The generator can be utilized in a variety of power-requiring systems, e.g. households, vehicles (for example cars, boats, plains, submarines etc.), industrial systems etc. In particular, in the example of systems configured for operation when at least partially submerged in a medium other than ambient air, the generator can be configured to use this particular medium as the work medium. For example, in case the generator is used on a boat for sailing at sea, the work medium can be sea water.

With respect to the pressure medium, the following should be noted:

When pre-loading the pressure medium, the heat transfer coefficient thereof increases;

When pre-loading the pressure medium, the volumetric expansion coefficient of the pressure medium decreases;

When pre-loading the pressure medium, the density of the pressure medium increases;

The higher the density of the pressure medium, the lower is its susceptibility to volumetric changes under pressure;

When pre-loading the pressure medium, the density of the pressure medium increases;

When pre-loading the pressure medium, the heat capacity decreases; and

When pre-loading the pressure medium, the viscosity of the pressure medium increases.

In addition to the above, the generator of the present application can incorporate the following features:

During operation of the generator, when switching from one step of operation to the subsequent step, it can be beneficial to delay the selective opening of the outlet valves with respect to the selective opening of the inlet valves. For example, during step (a), high temperature work medium is passed through the cores so that both the inlet and the outlet valve are in fluid communication with the high temperature reservoir, and during step (b), low temperature work medium is passed through the cores so that both the inlet and the outlet valve are in fluid communication with the low temperature reservoir. When switching from (a) to (b), it can be beneficial to delay selective switching of the outlet valve so that it remains in fluid communication with the high temperature reservoir until all the high temperature work medium contained within the core is first fully returned to the high temperature reservoir, and only then switching the outlet valve to be in fluid communication with the low temperature reservoir;

The static spiral within the core can be made of a material having very low heat transfer coefficient, so as not to absorb heat from the work medium. Example of such a material can be fiberglass, having a heat transfer coefficient of about 0.1;

The generator can comprise several gradient tanks, some being designated for use solely with high temperature work medium while others are designated for use solely with low temperature work medium;

The core can be formed with strengthening ribs, providing the core with increased resistance to pressure. Increased resistance can allow for reducing the thickness of the core wall, thereby increasing heat transfer between the work medium and the pressure medium;

The accumulator can also be pre-loaded, so as to raise the boiling point of the work medium contained therein, thereby allowing it to absorb more heat;

The accumulator can itself be used as a backup for the work medium sub-system;

The generator can comprise a controller configured for performing optimization of the operation of the generator, including control of the compressor and thereby control of the COP of the air conditioning unit, operation of the valves etc.;

The accumulator can comprise two compartments, one for containing high temperature storage medium and the other for containing low temperature storage medium;

The compartment of the accumulator can have a vertical orientation, so as to allow a heat gradient therein, similar to the gradient tanks;

A generator for producing about 1 MW can have a weight of about 30 ton. And occupy an area of about 100 square meters;

The accumulator can be used as a direct source of hot/cold water supply for houses/offices/factories etc.;

The use of an accumulator unit can reduce the overall power capacity of the generator by as much as 66% (when the accumulator operates using a heat pump), thereby allowing to reduce the dimensions of the generator system by as much as a ⅔.

In accordance with another aspect of the present application there is provided a core for incorporation into the pressure vessel of the generator, said core comprising an inner tube and an outer tube, each of which is individually rotatable and configured so that, when said core is displaced within said pressure vessel, a first medium is contained between the inner tube and the outer tube and a second medium is contained within the inner tube and between the outer tube and said pressure vessel.

BRIEF DESCRIPTION OF THE DRAWINGS

In order to understand the invention and to see how it can be carried out in practice, embodiments will now be described, by way of non-limiting examples only, with reference to the accompanying drawings, in which:

FIGS. 26A and 26B are respective schematic tables showing the properties of two materials which can be used in construction of the generator shown in the above figures;

FIGS. 46B to 46D are schematic enlarged isometric views of portions of the pressure vessel shown in FIG. 46A;

FIG. 47 is a schematic isometric view of a mechanism of a gear arrangement used in the generator shown in FIGS. 36A and 36B, according to another example of the subject matter of the present application;

FIG. 48A is a schematic isometric view of a work medium sub-system used in the generator of the subject matter of the present application;

FIGS. 48B and 48C are schematic respective isometric lateral and longitudinal cross-sectional views of the sub-system shown in FIG. 49A, taken along planes A-A and B-B respectively;

FIG. 49A is a schematic isometric view of a pressure vessel used in the generator shown in FIGS. 36A to 36D;

FIGS. 49B to 49E are schematic enlarged views of details shown in FIG. 49A;

FIG. 49F is a schematic isometric view of a bracing arrangement used in the pressure vessel shown in FIG. 49A and holding a single core thereof;

FIG. 49G is a schematic isometric view of the bracing arrangement shown in FIG. 49F;

FIG. 49H is a schematic isometric enlarged view of a detail shown in FIG. 49G;

FIG. 50A is a schematic isometric view of a generator system comprising a generator according to another example according to the subject matter of the present application;

FIG. 50B is a schematic isometric view of the generator shown in FIG. 50A;

FIG. 51 is a schematic isometric partial cross-sectional view of a pressure vessel of the generator shown in FIG. 50;

Figure 50A:
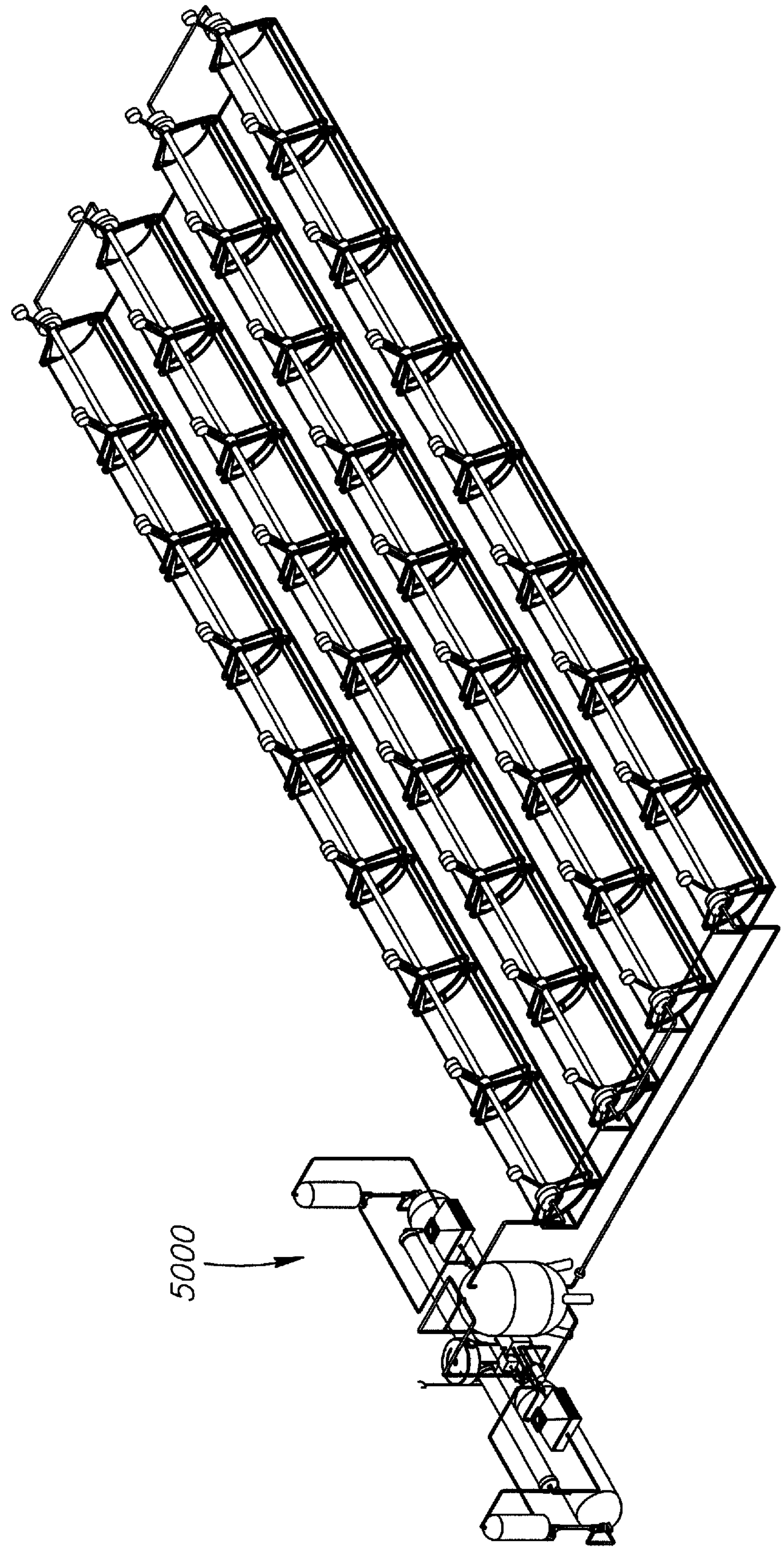
Figure 50B:
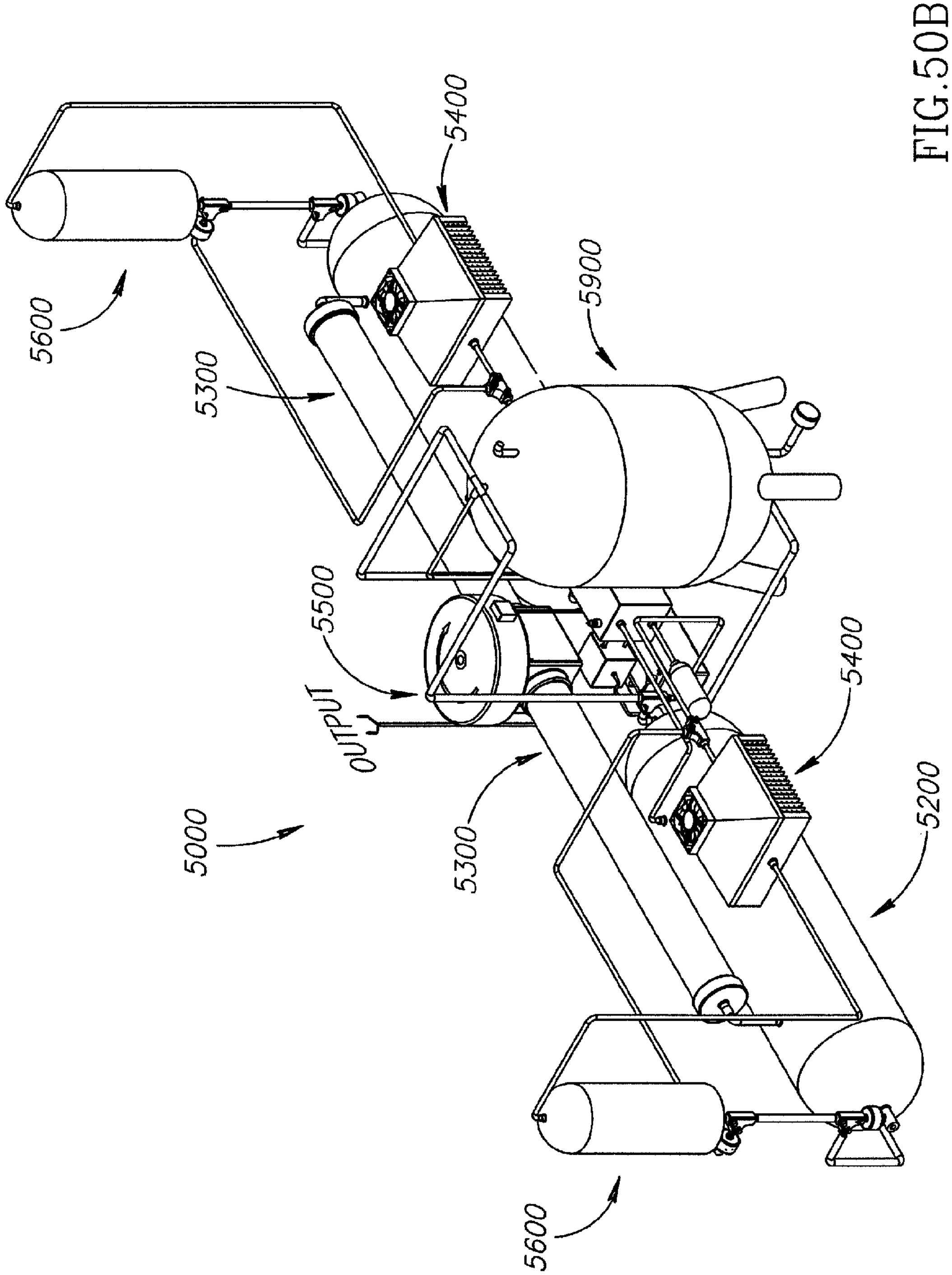
Figure 51:
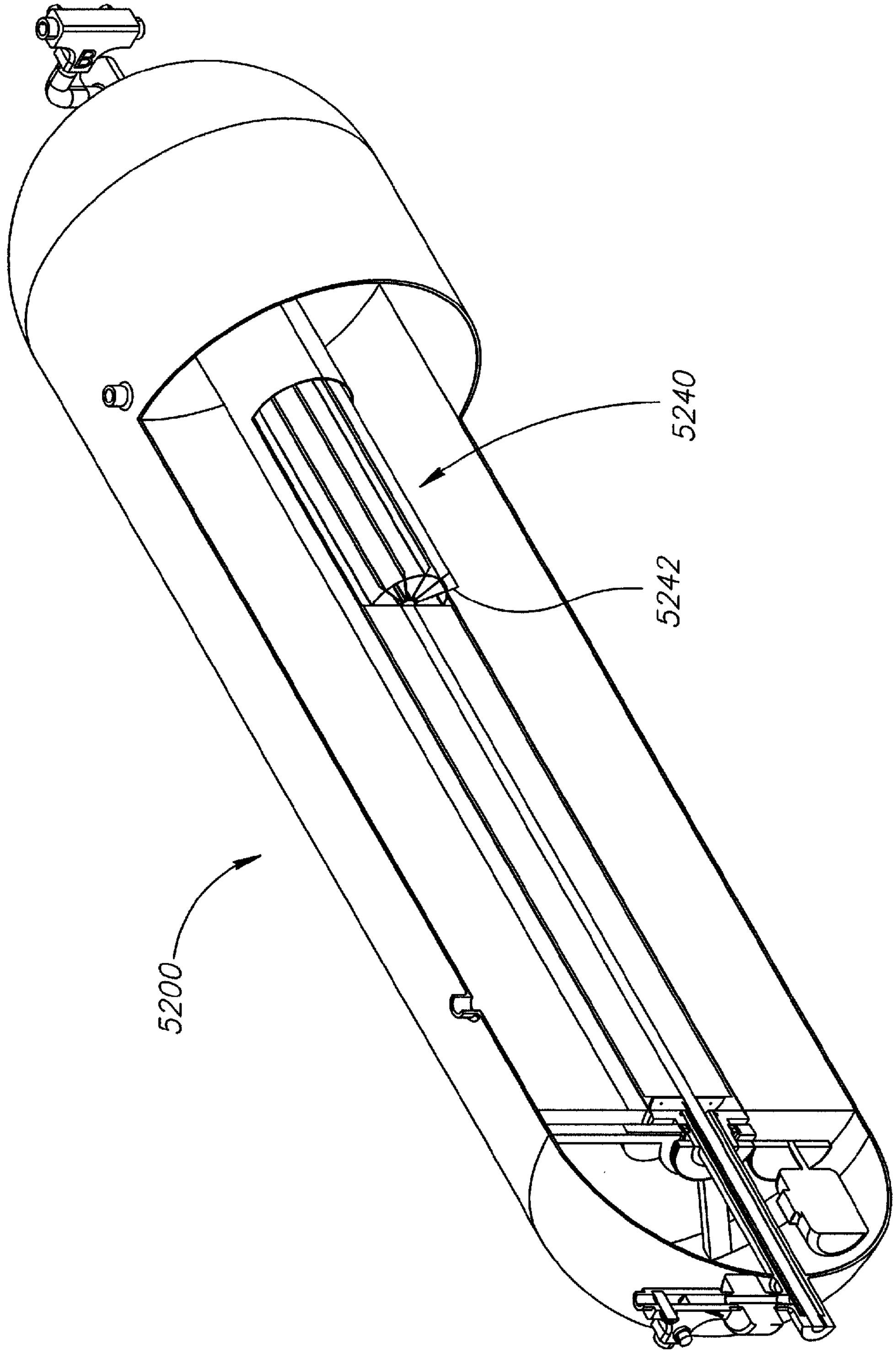
Figure 52A:
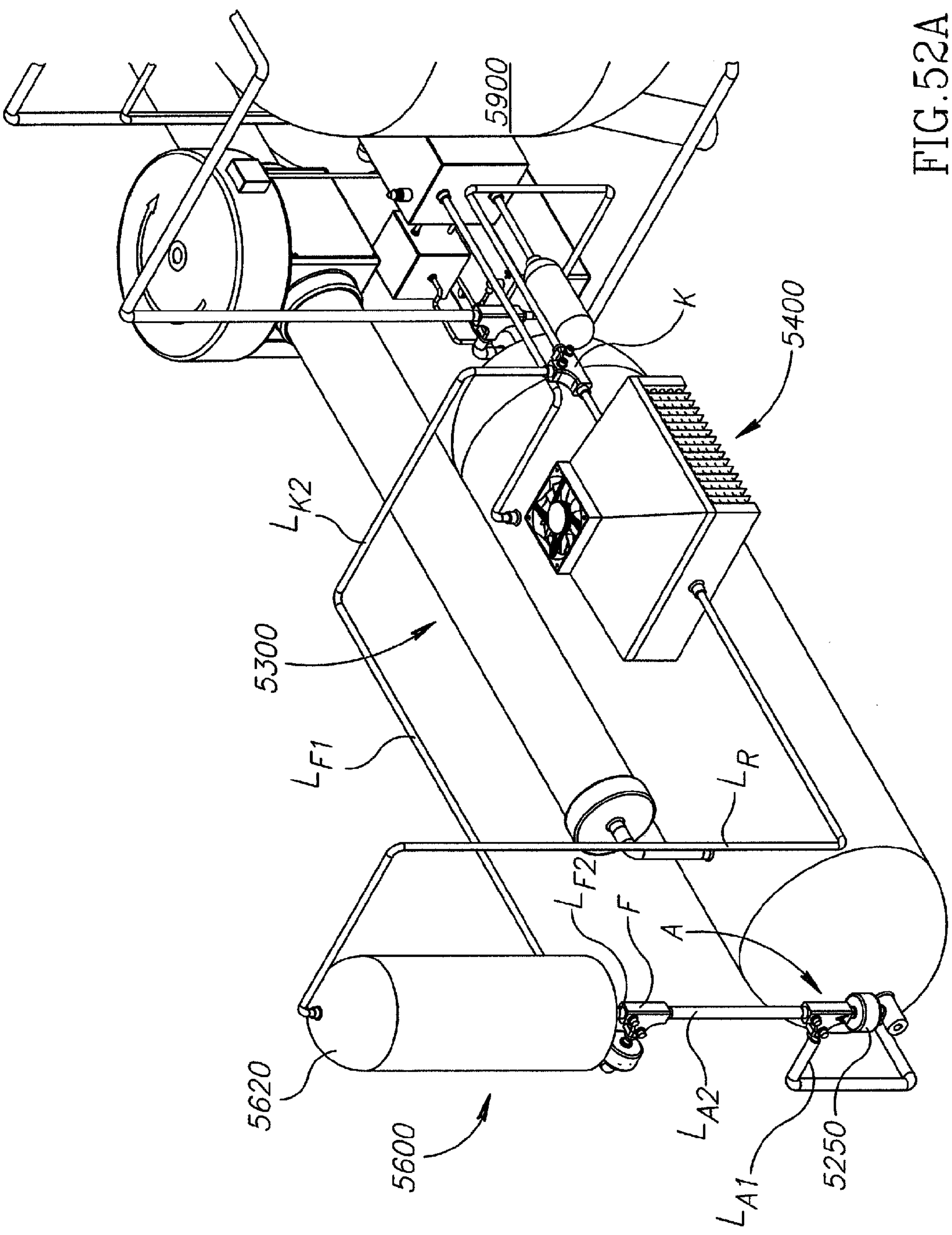
Figure 52B:
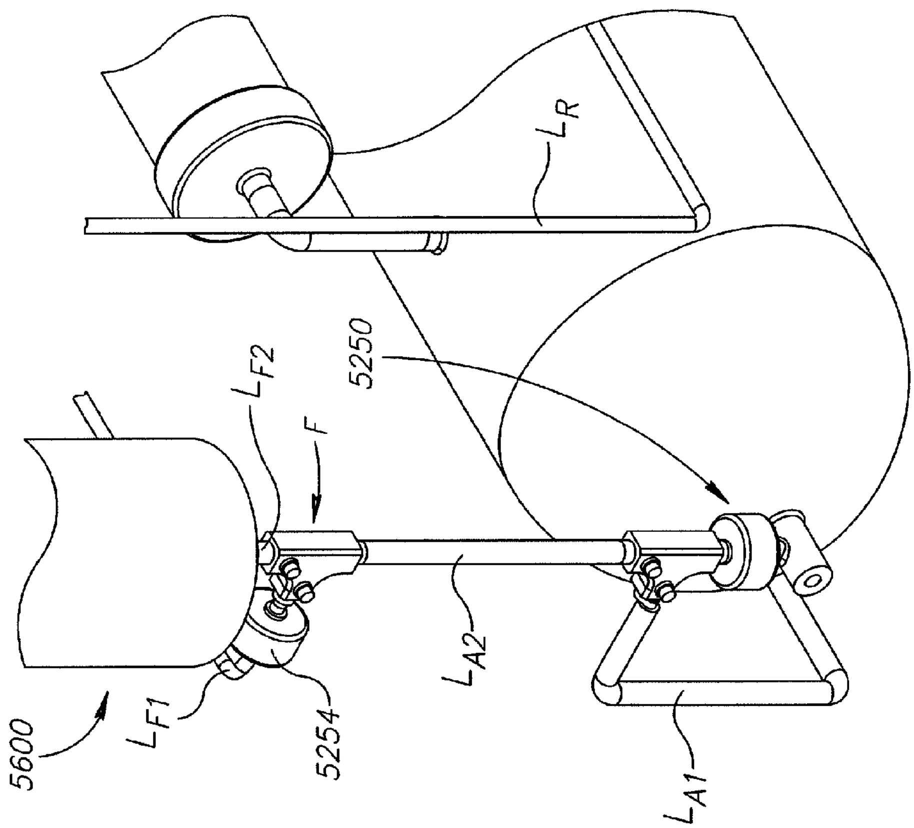
Figure 52C:
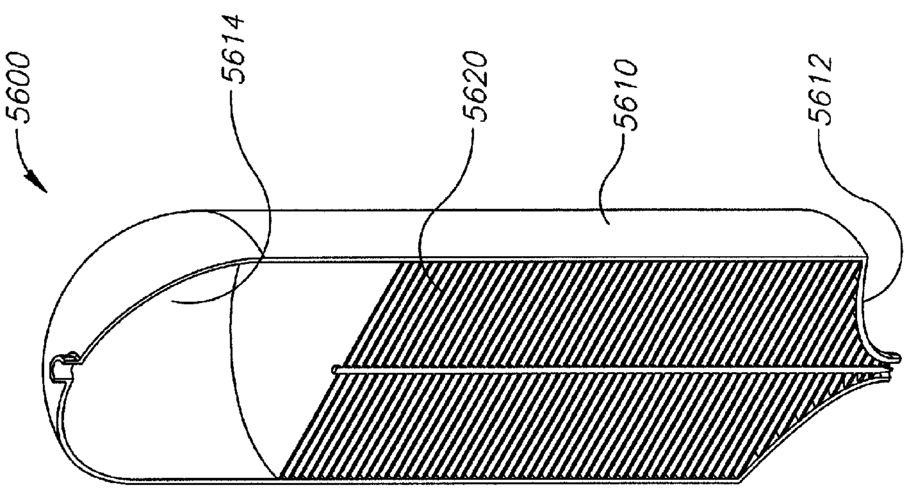
Figure 53A:
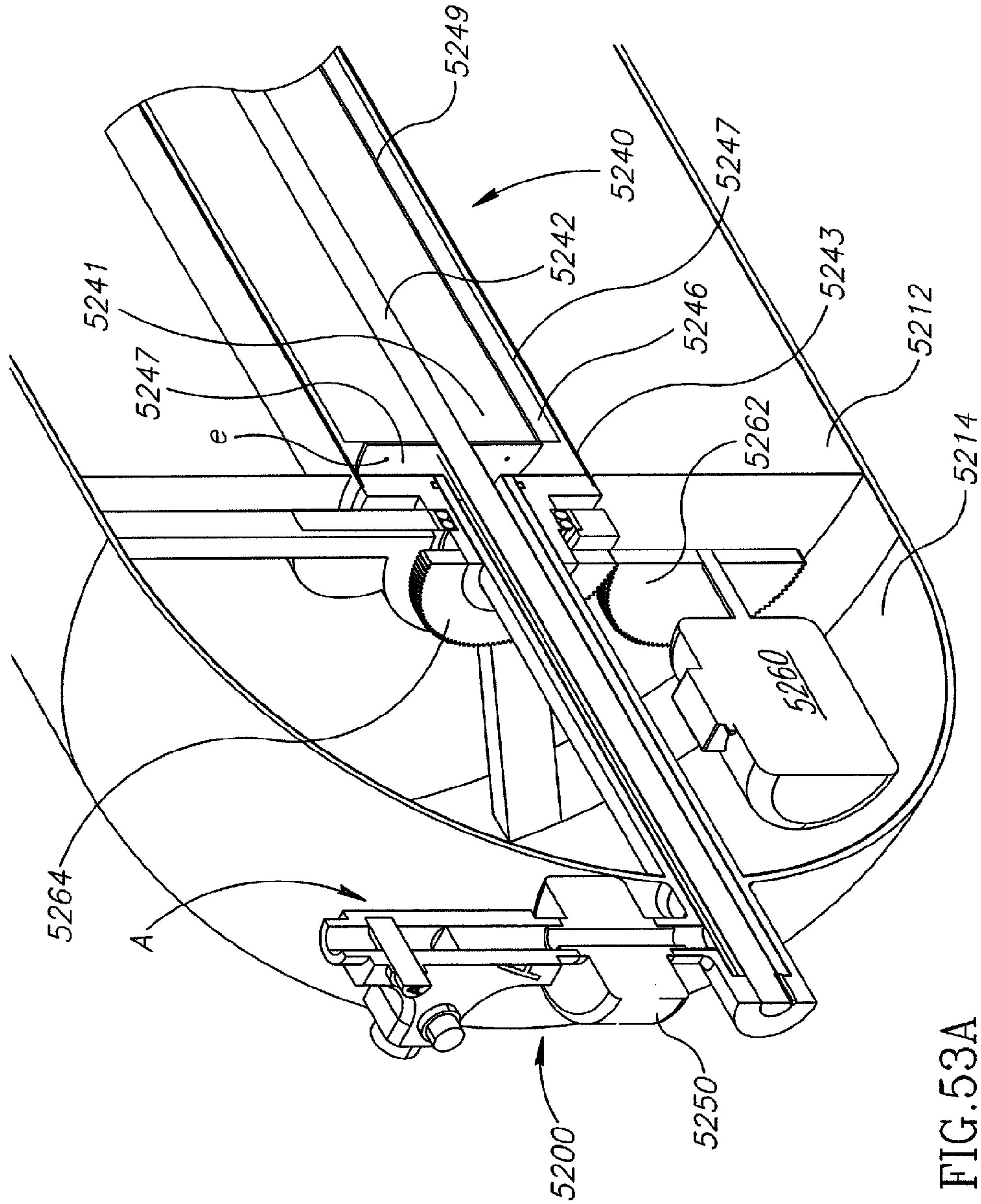
Figure 53B:
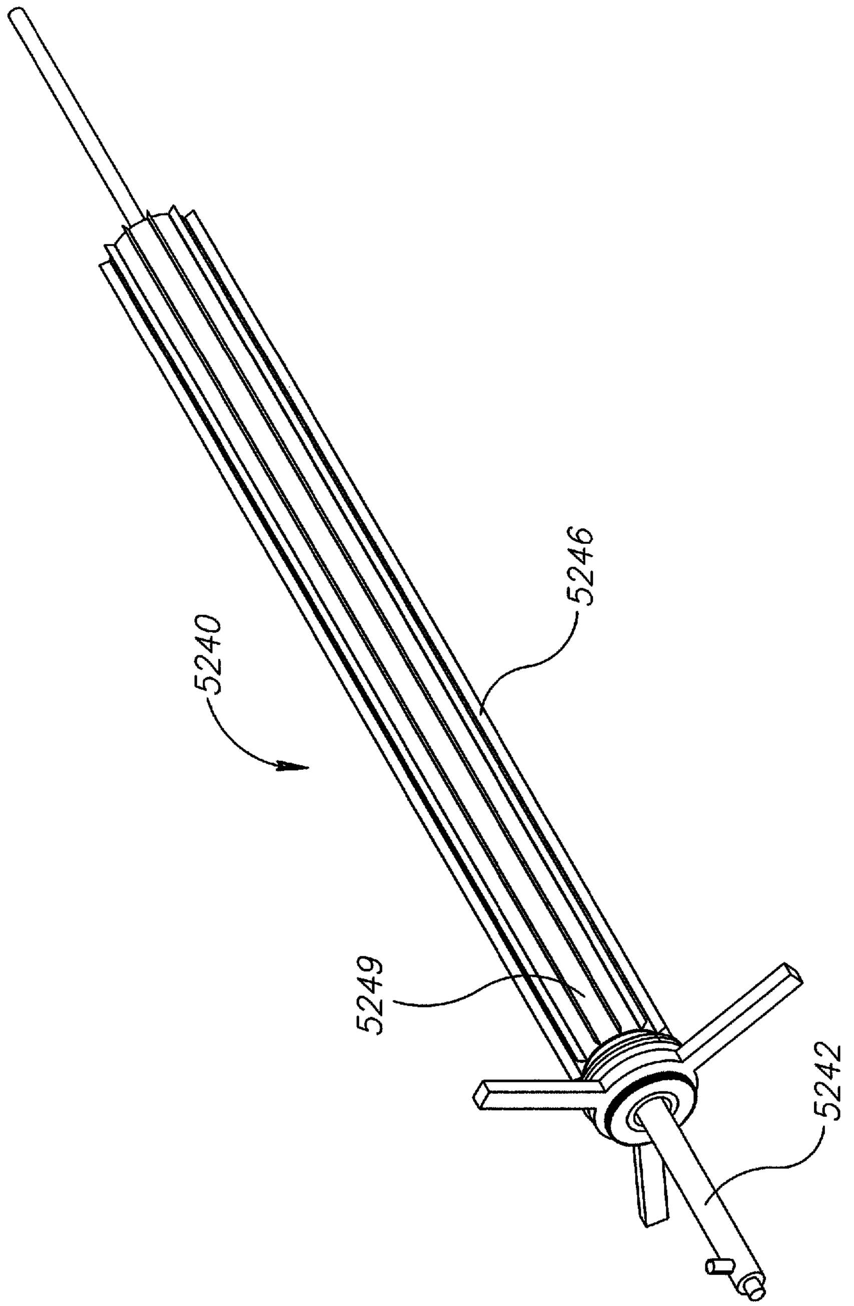
Figure 53D:
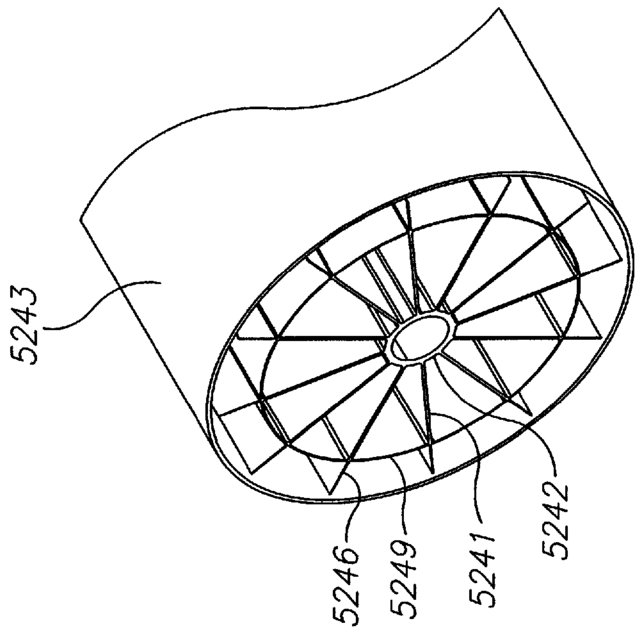
Figure 53C:
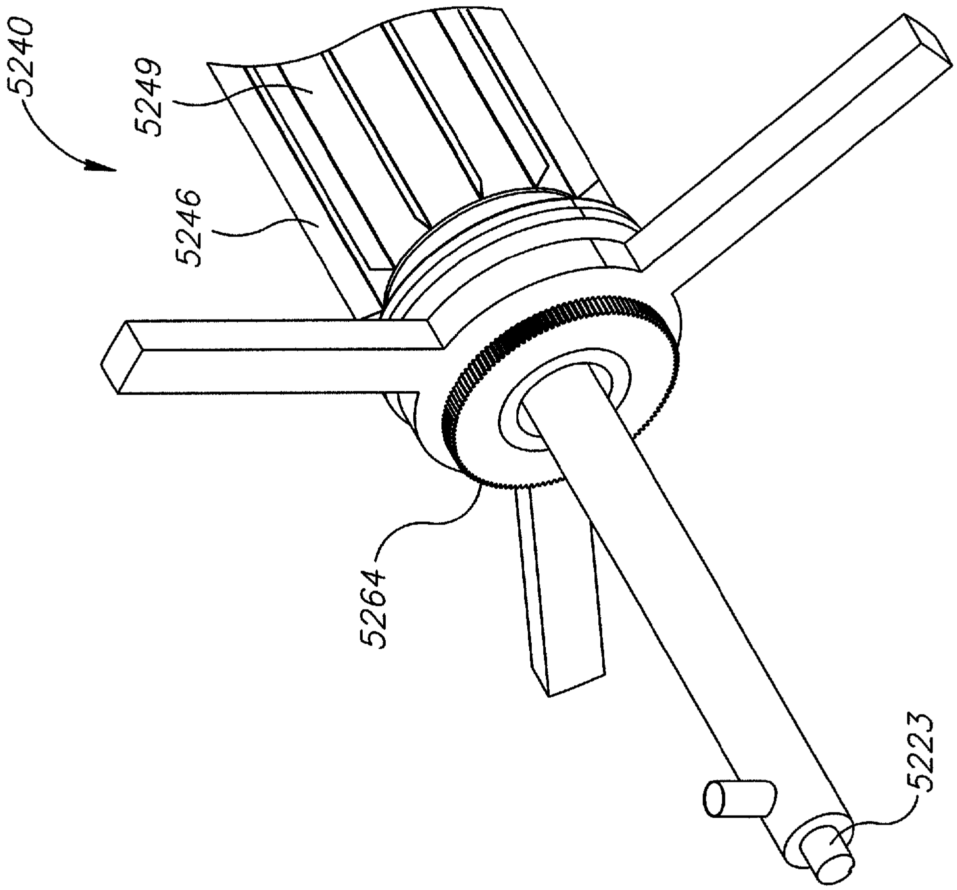
Figure 53E:
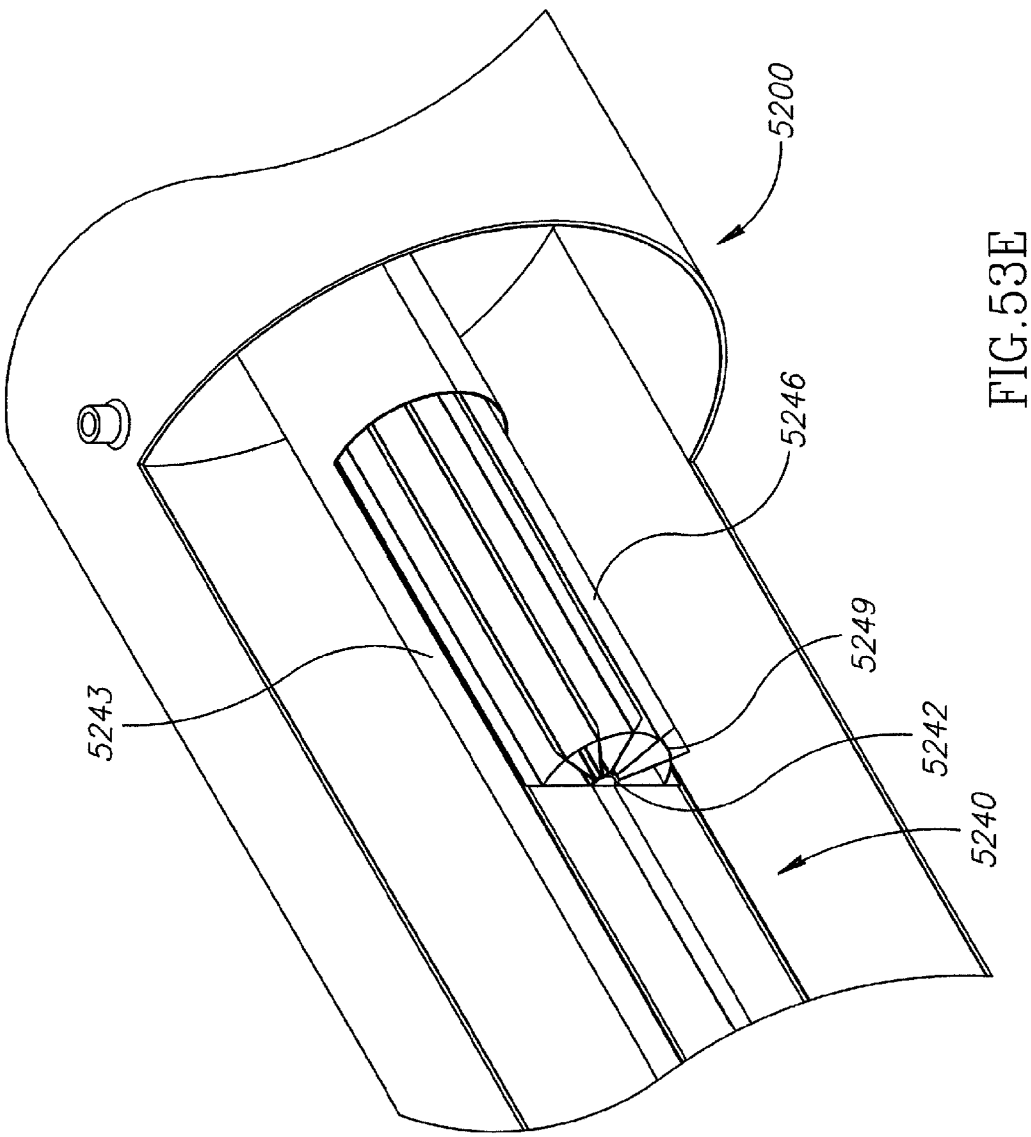
Figure 54A:
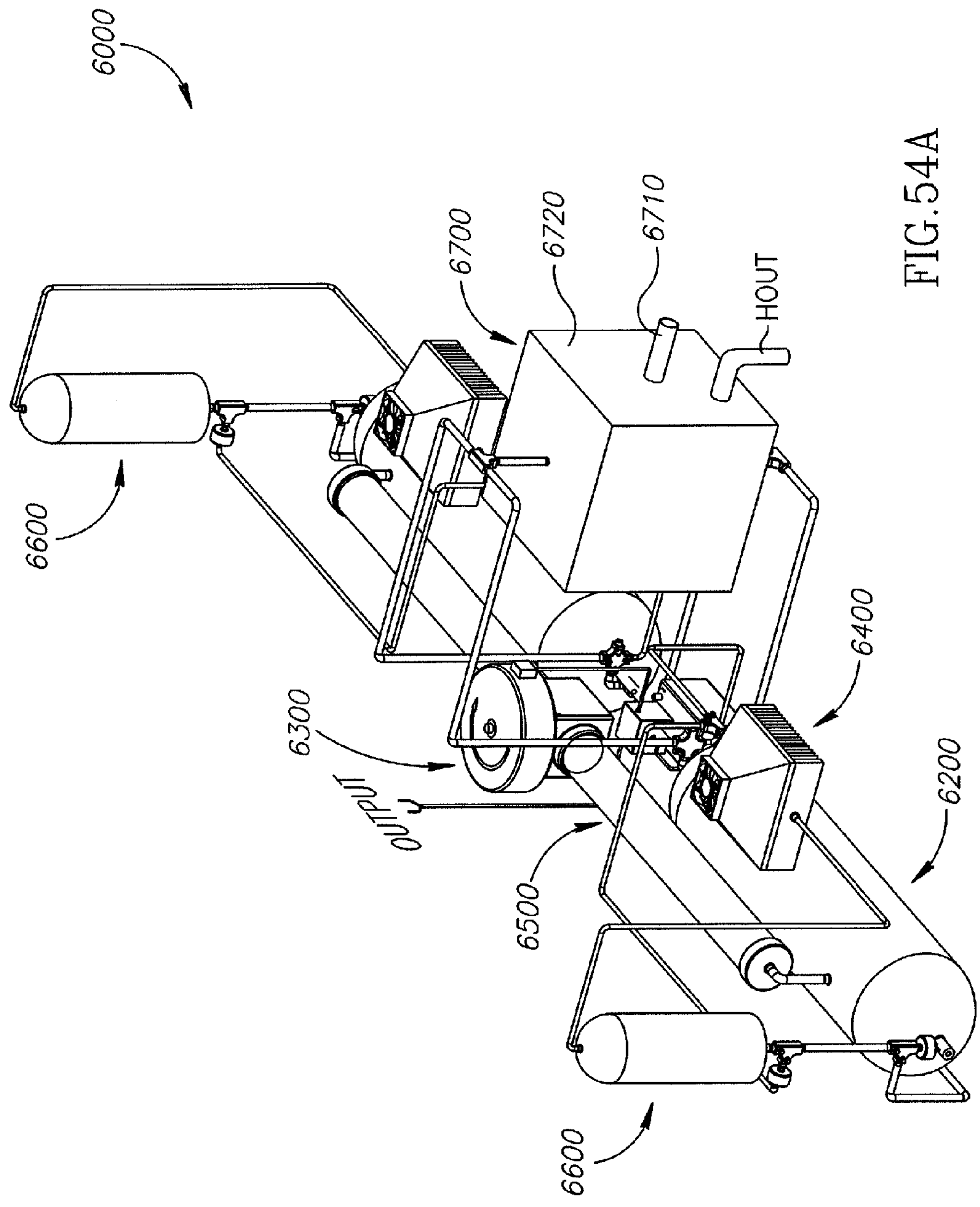
Figure 54B:
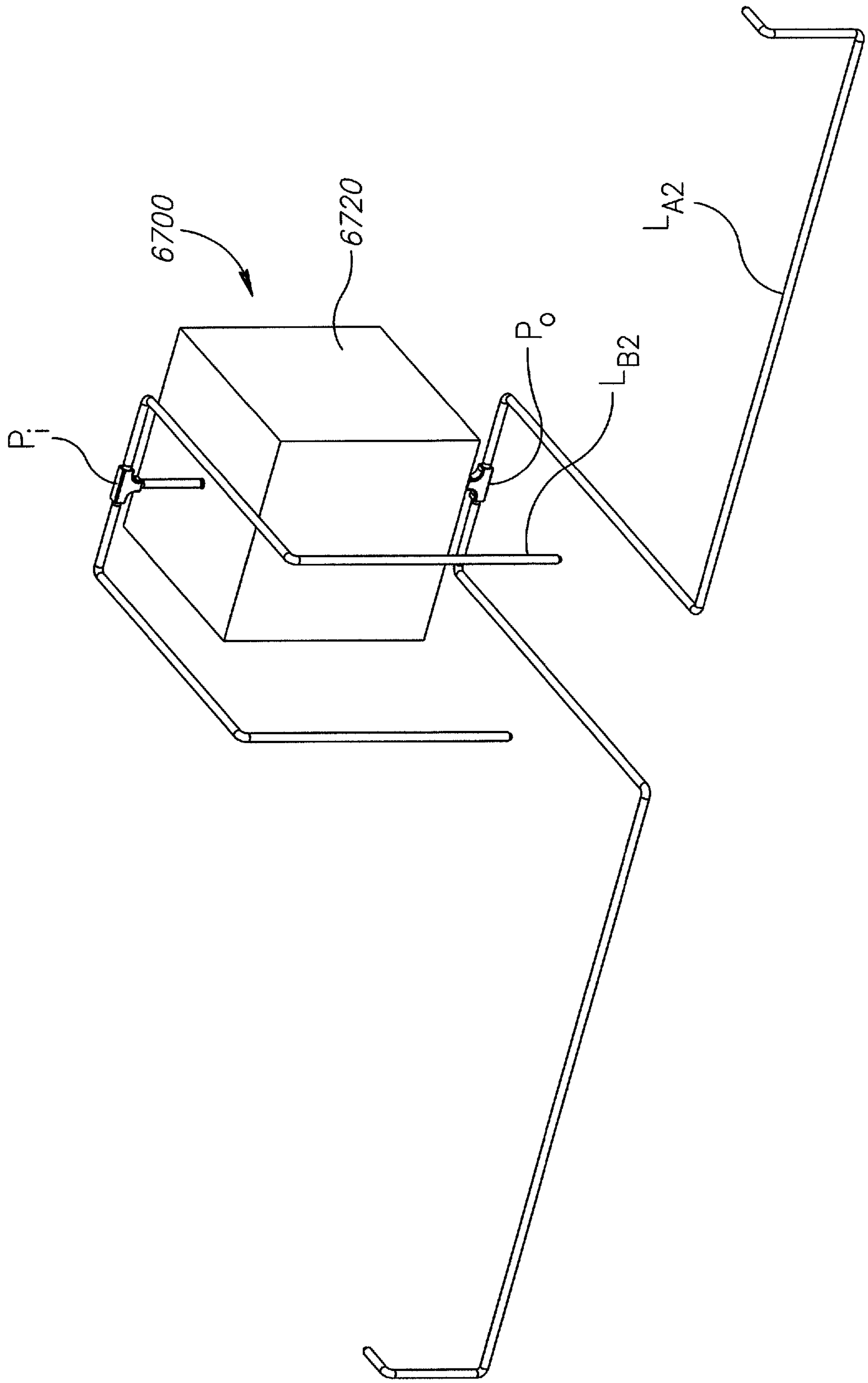
Figure 55A:
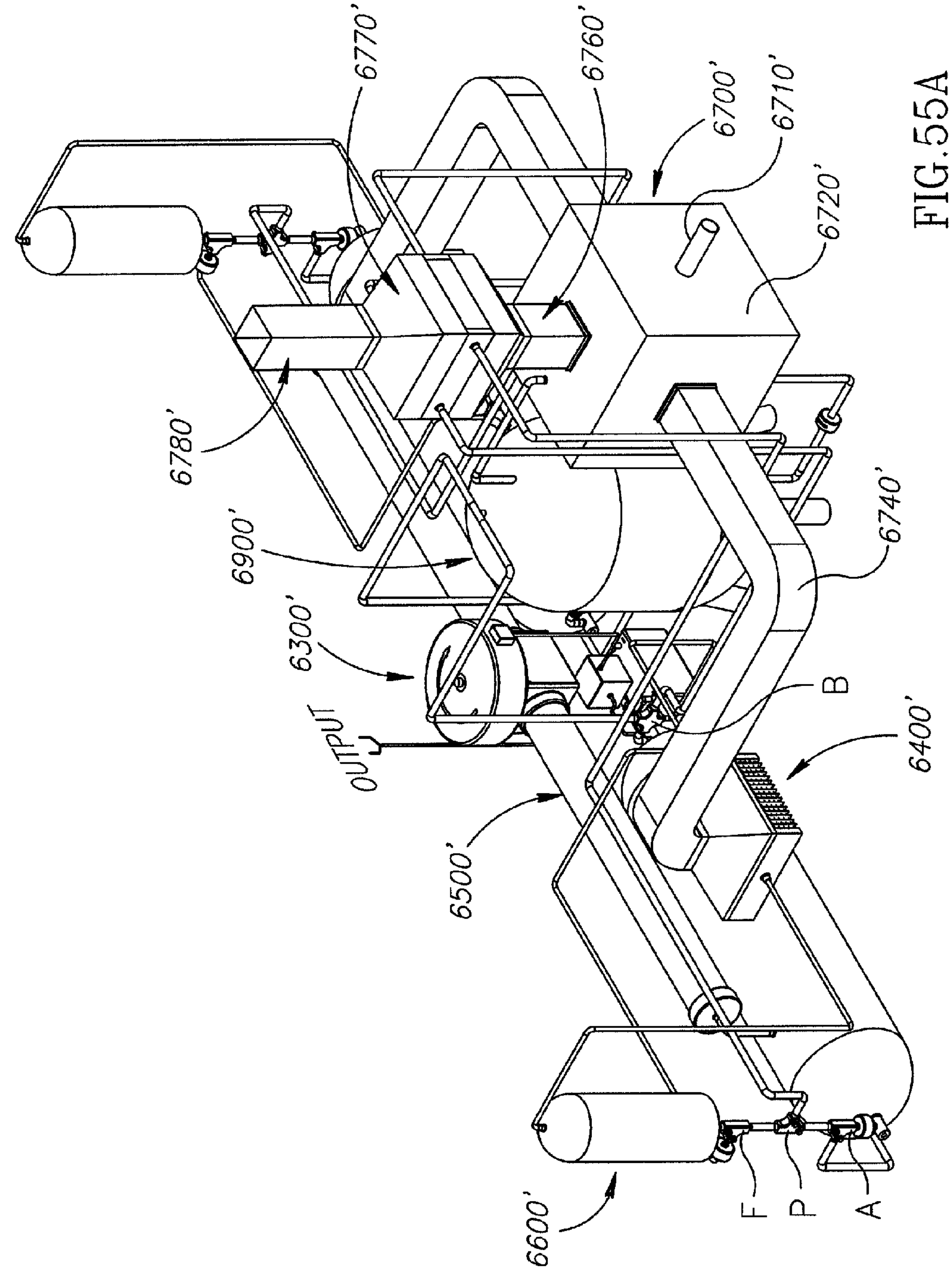
Figure 55B:
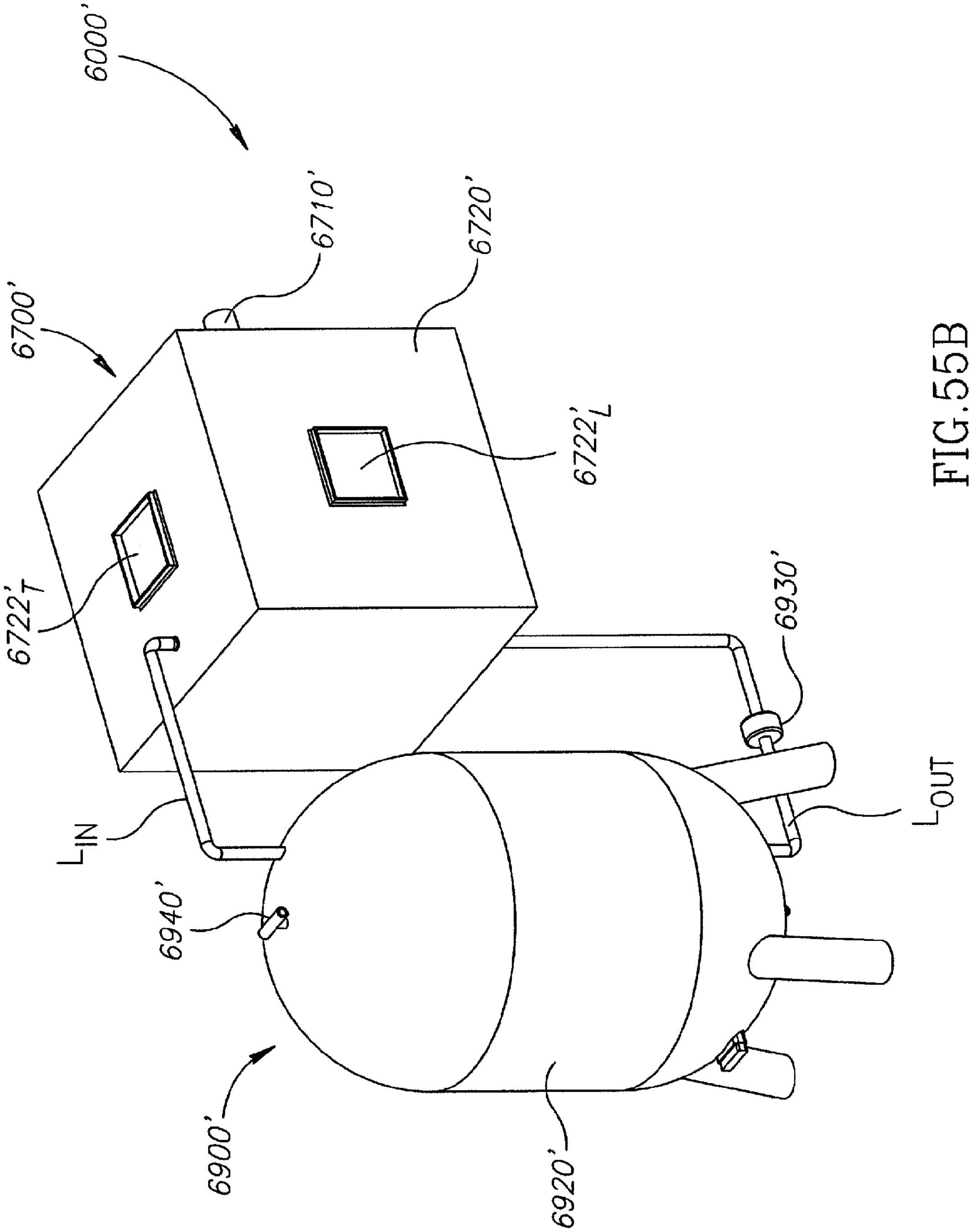
Figure 55C:
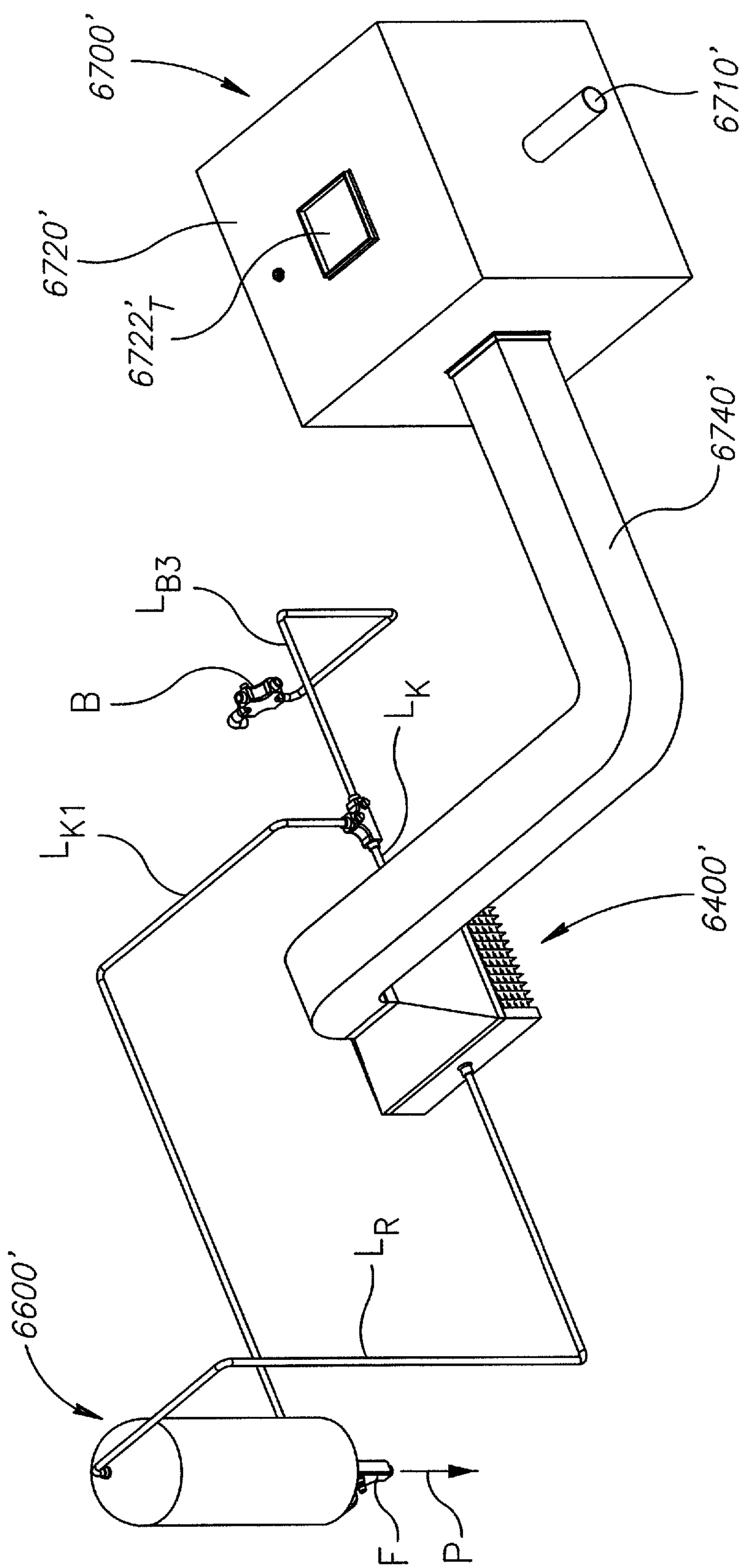
Figure 55D:
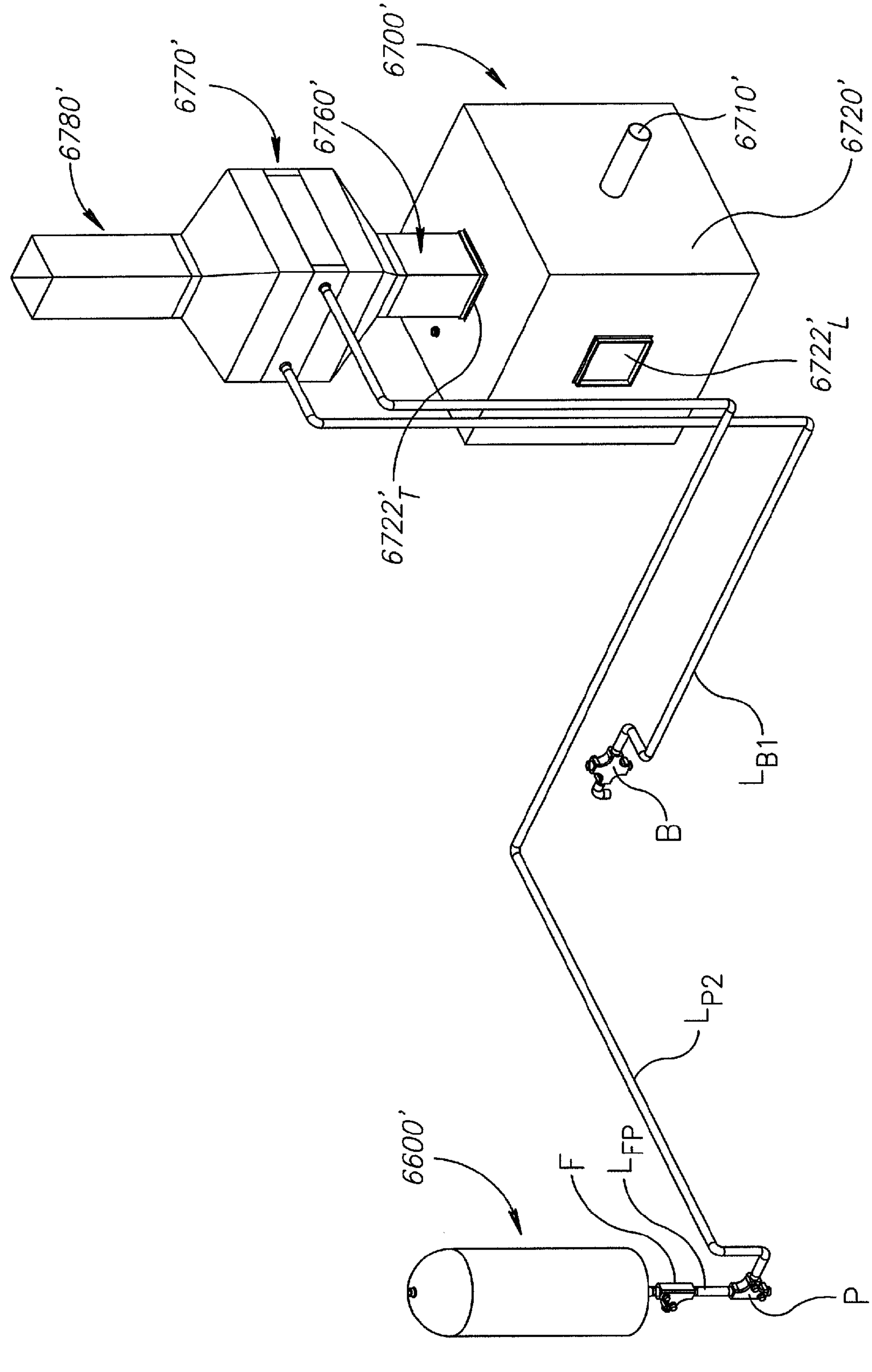
Figure 56A:
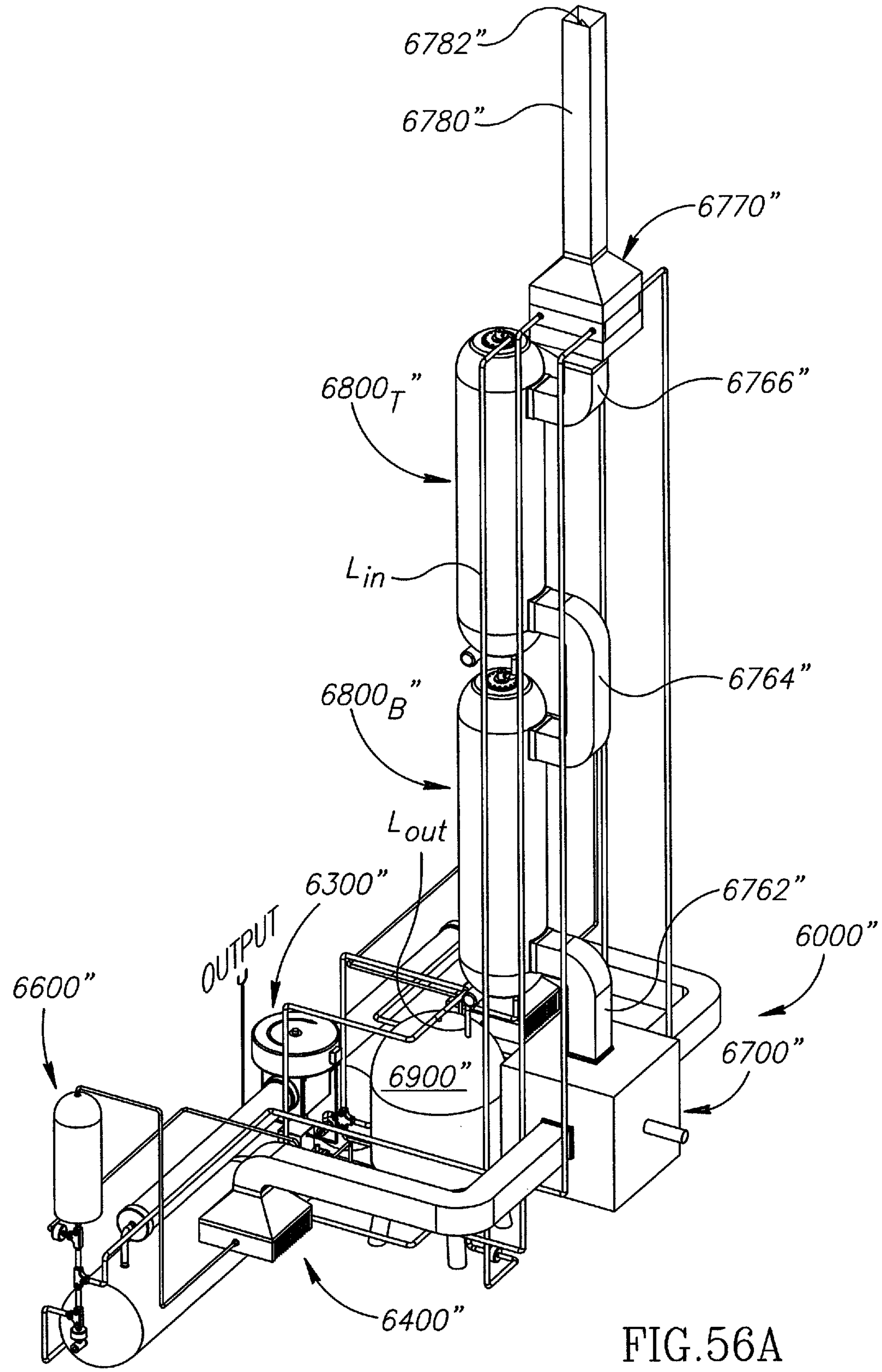
Figure 56B:
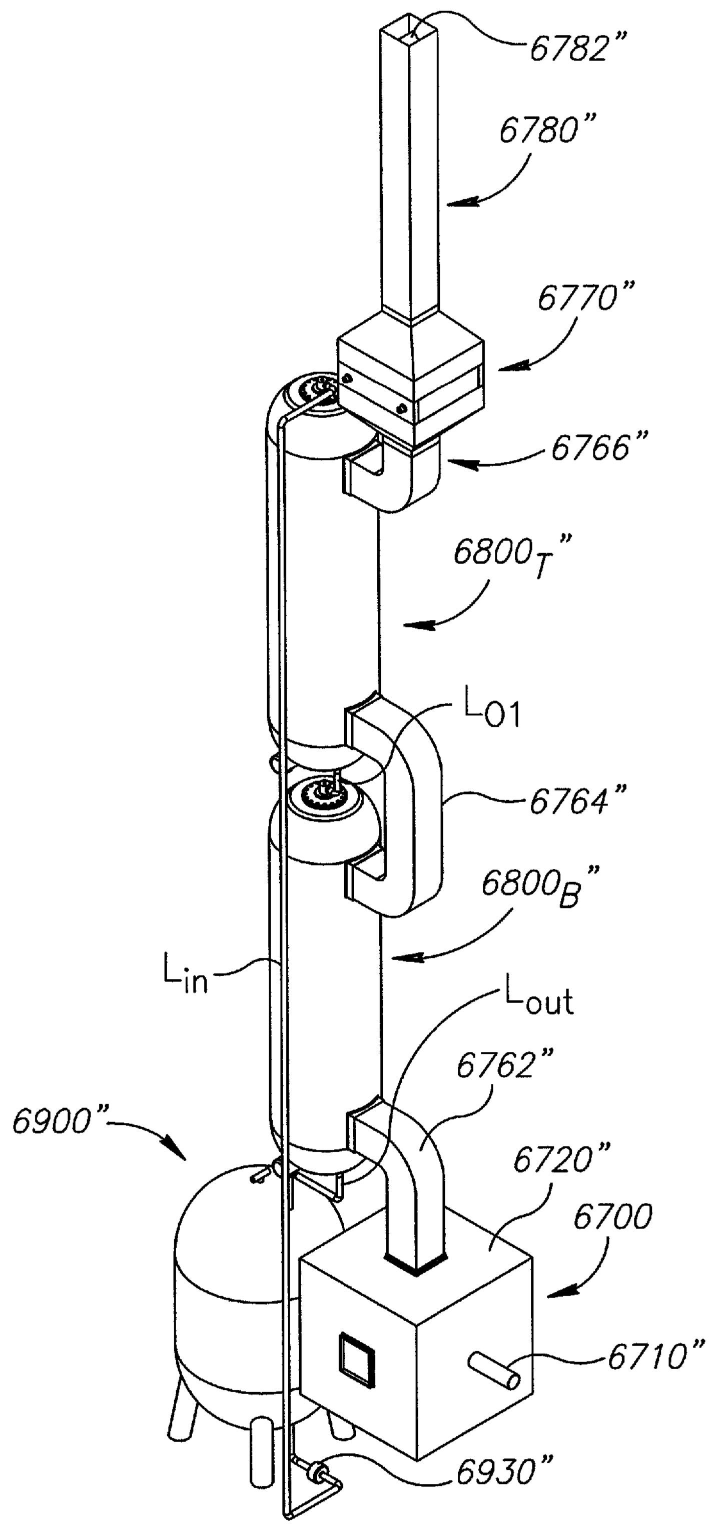
Figure 56C:
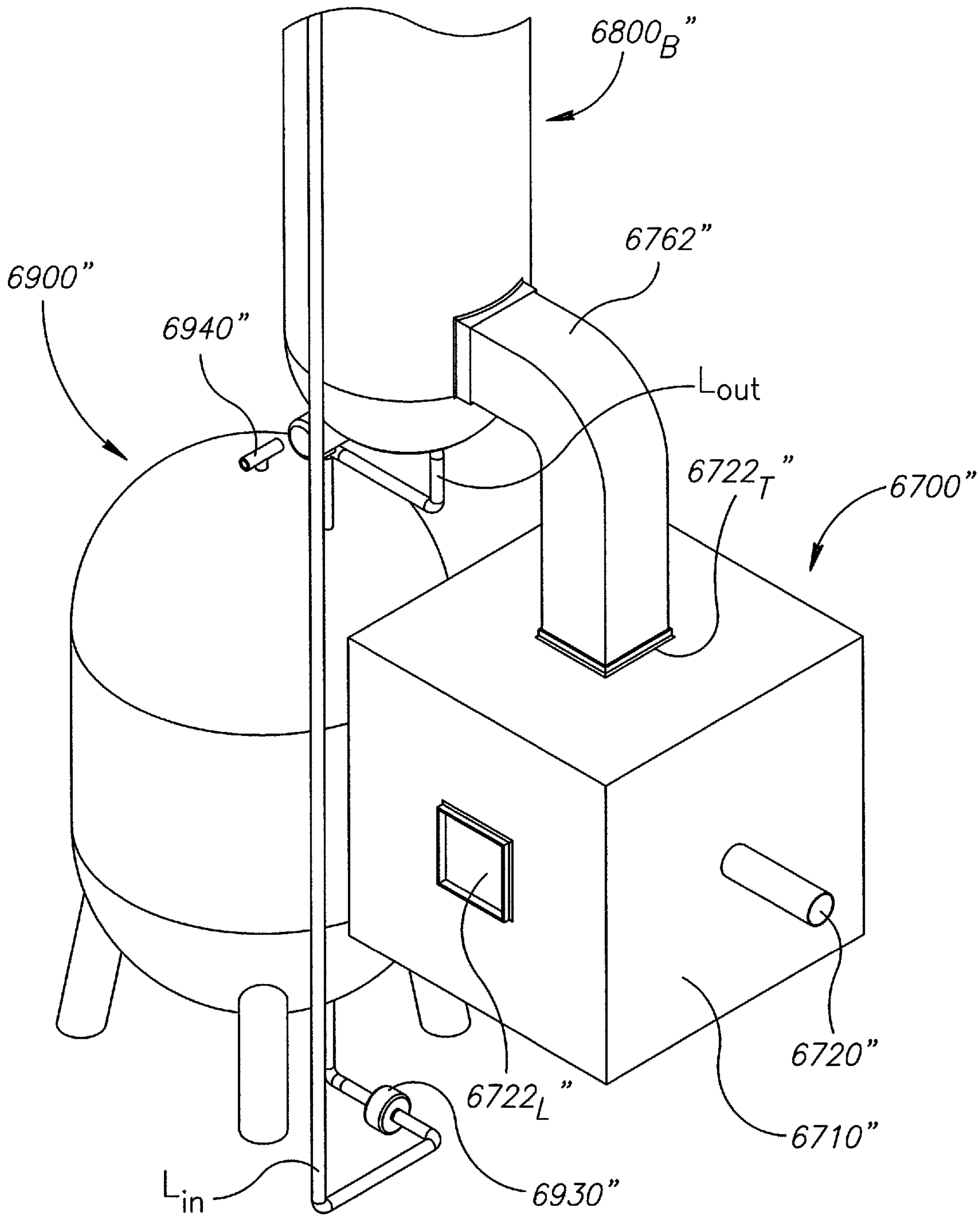
Figure 56D:
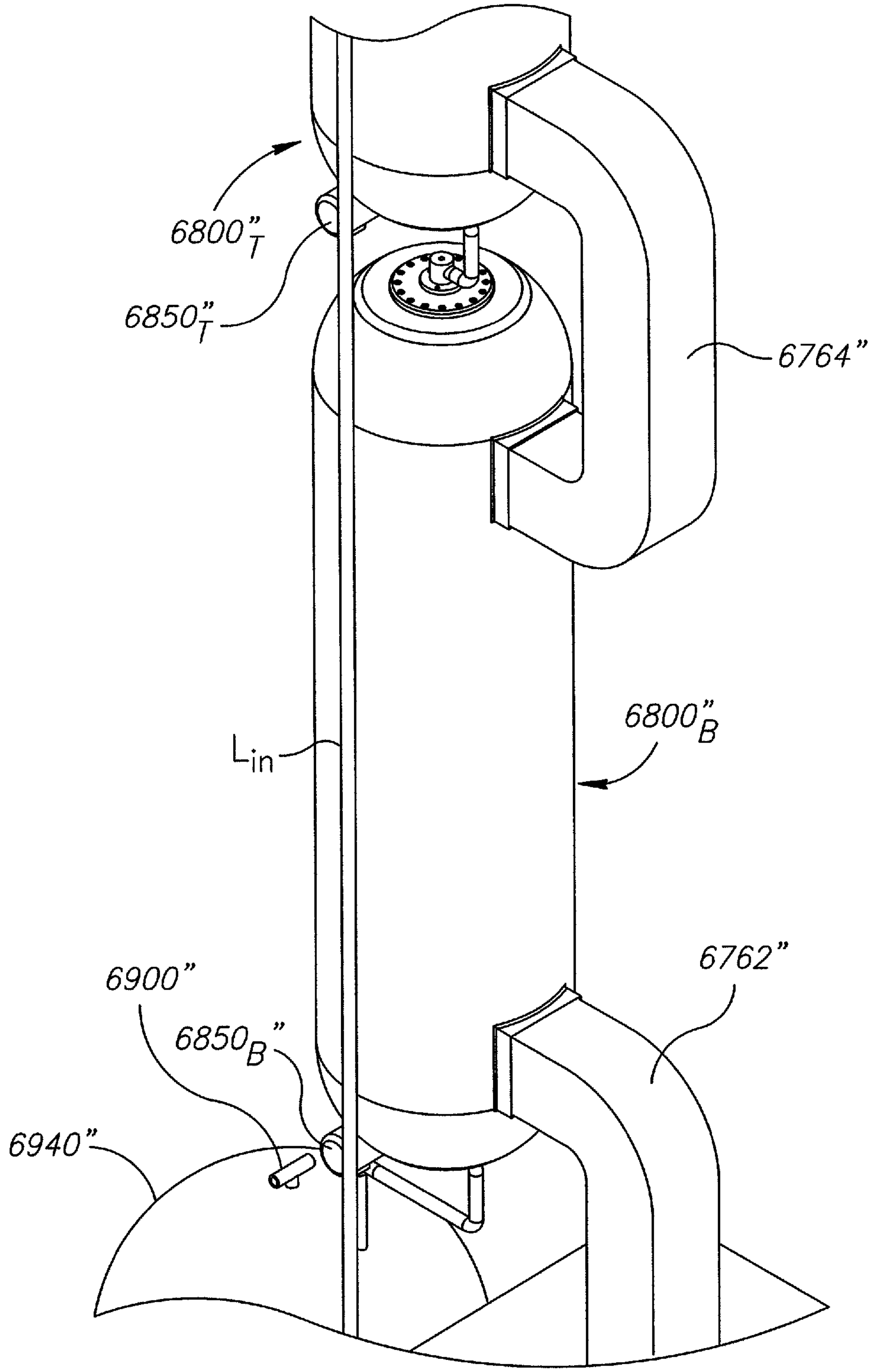
Figure 56E:
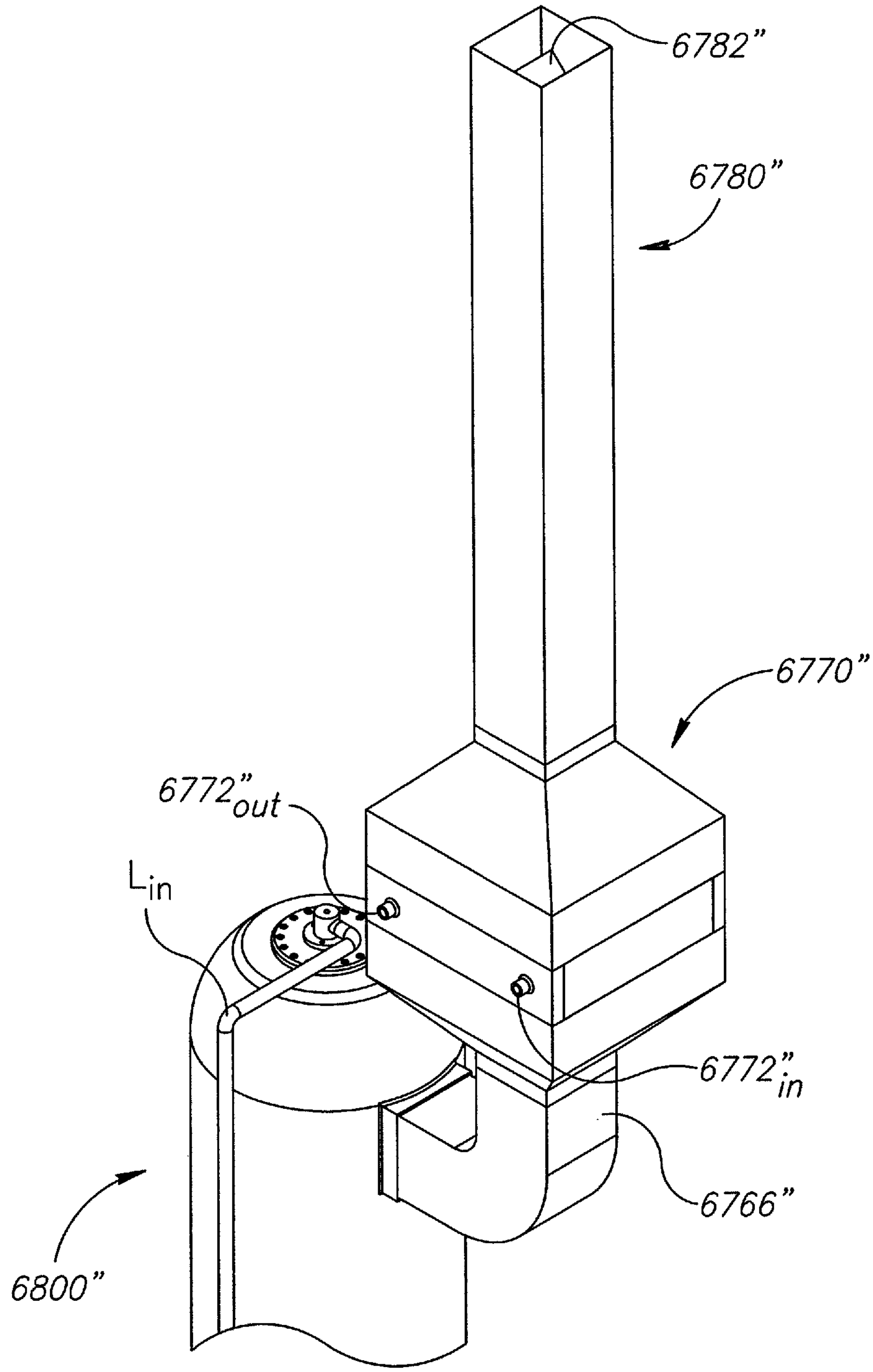
Figure 57A:
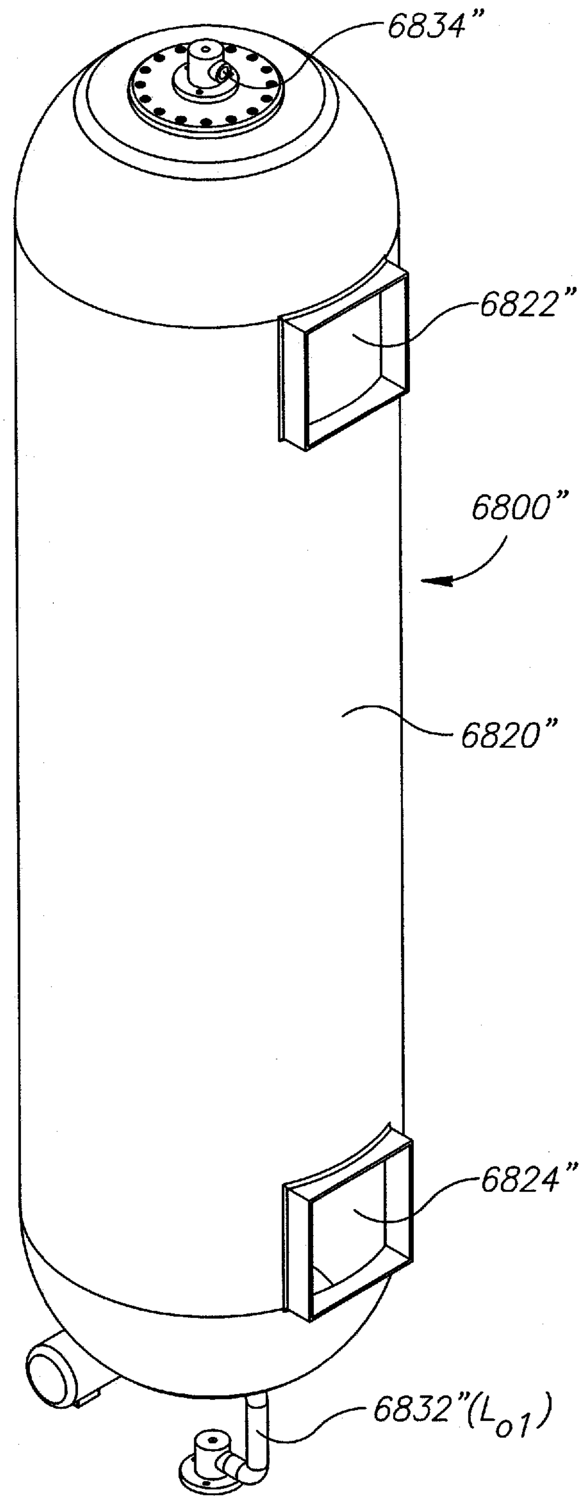
Figure 57B:
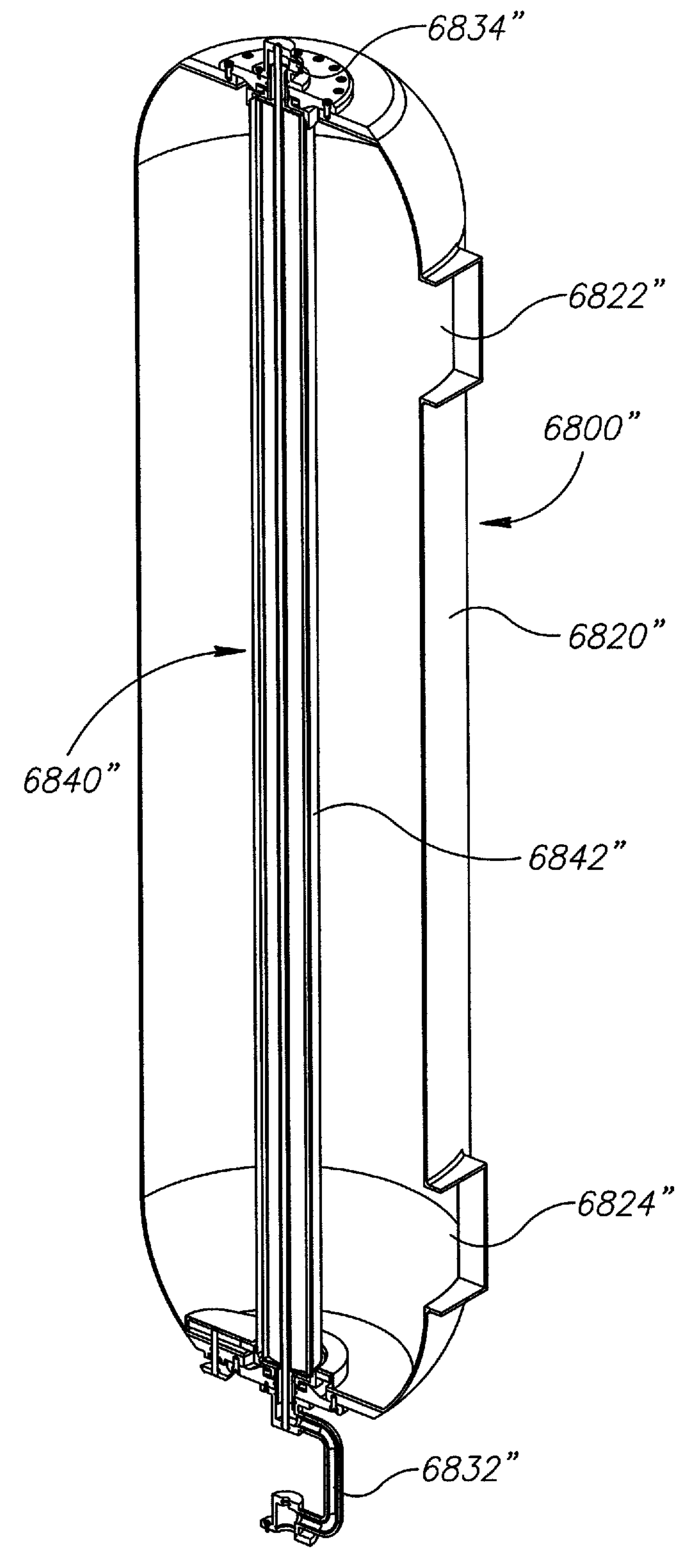
Figure 57C:
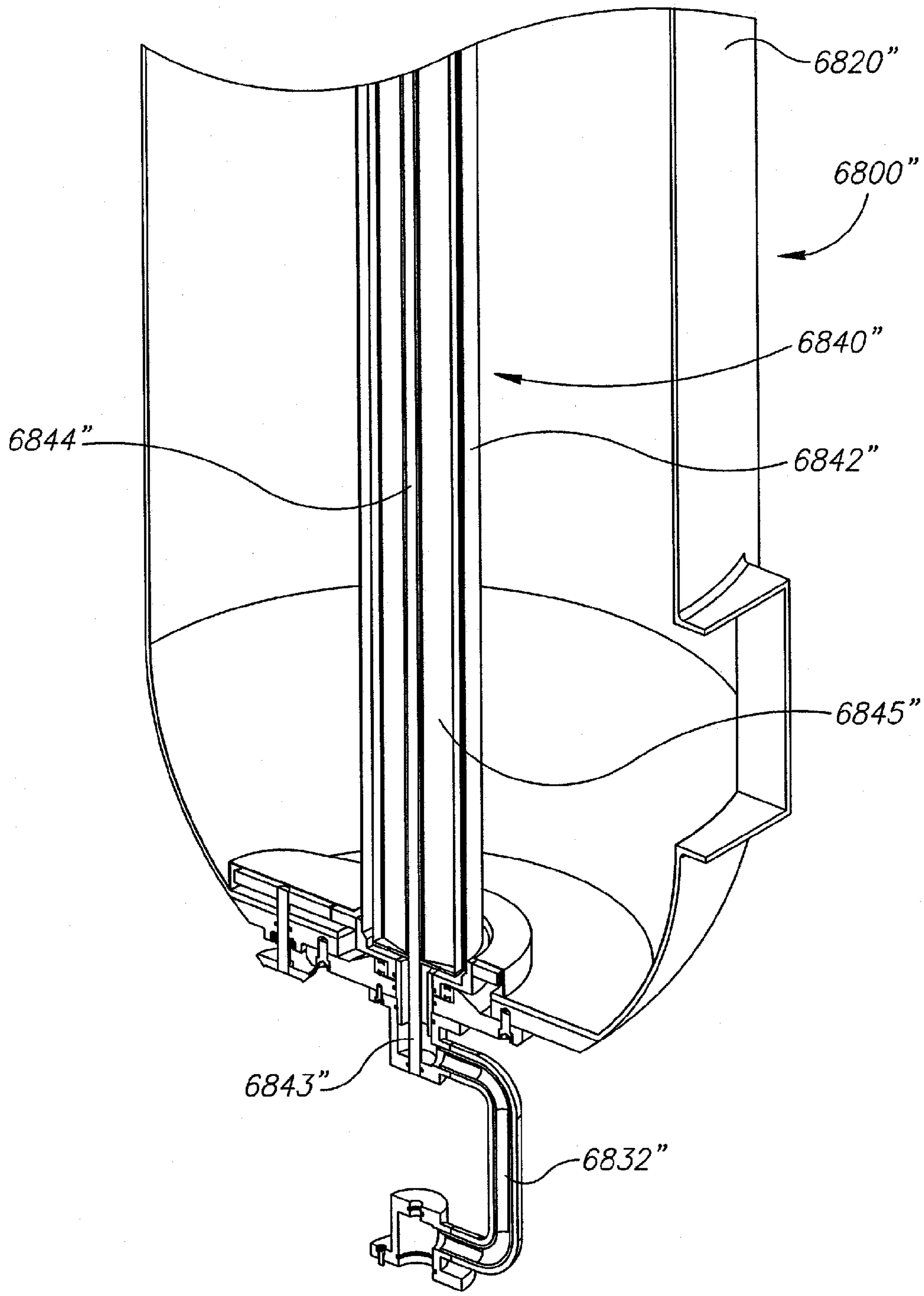
Figure 57D:
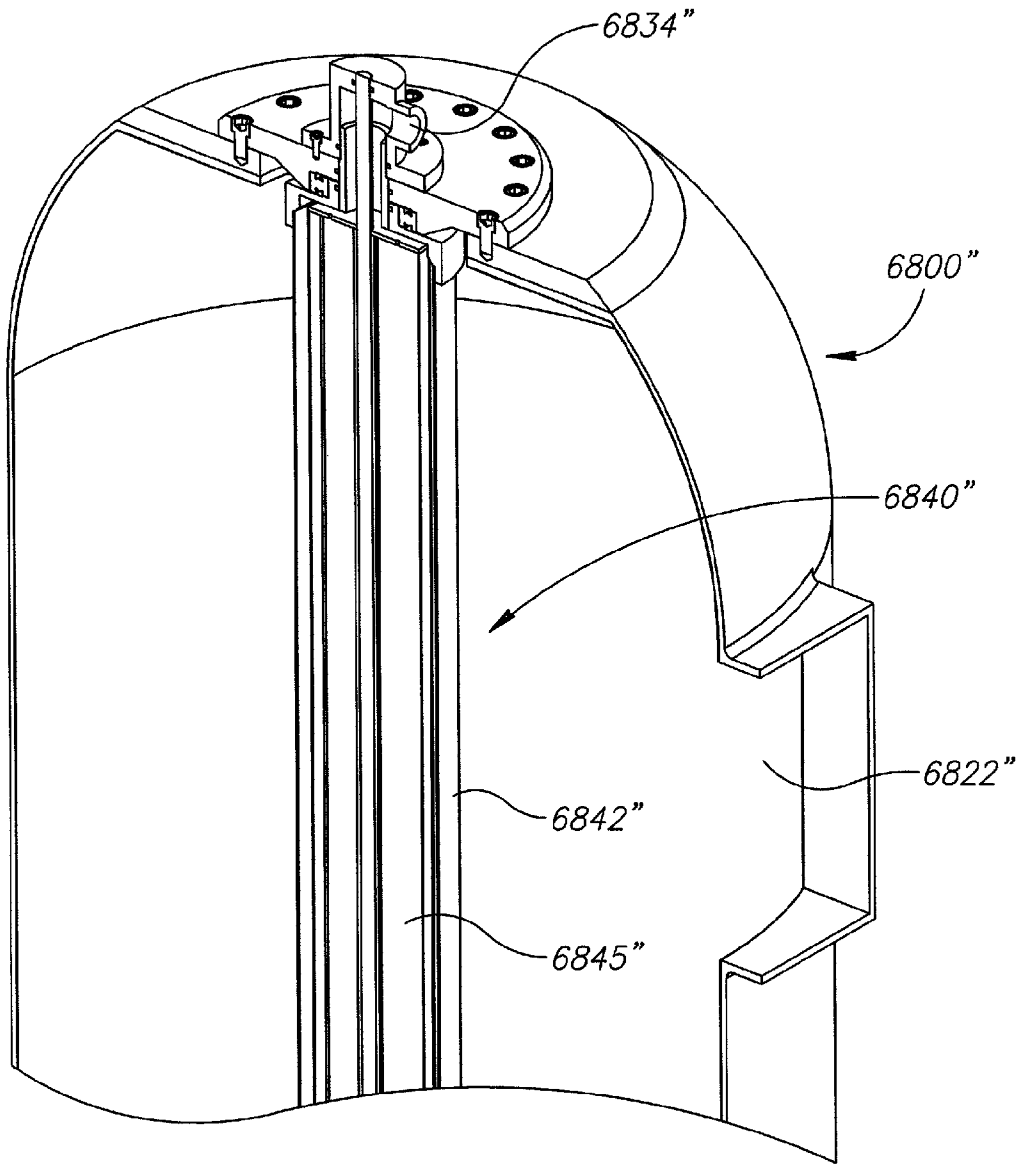
Figures 57E, 58:
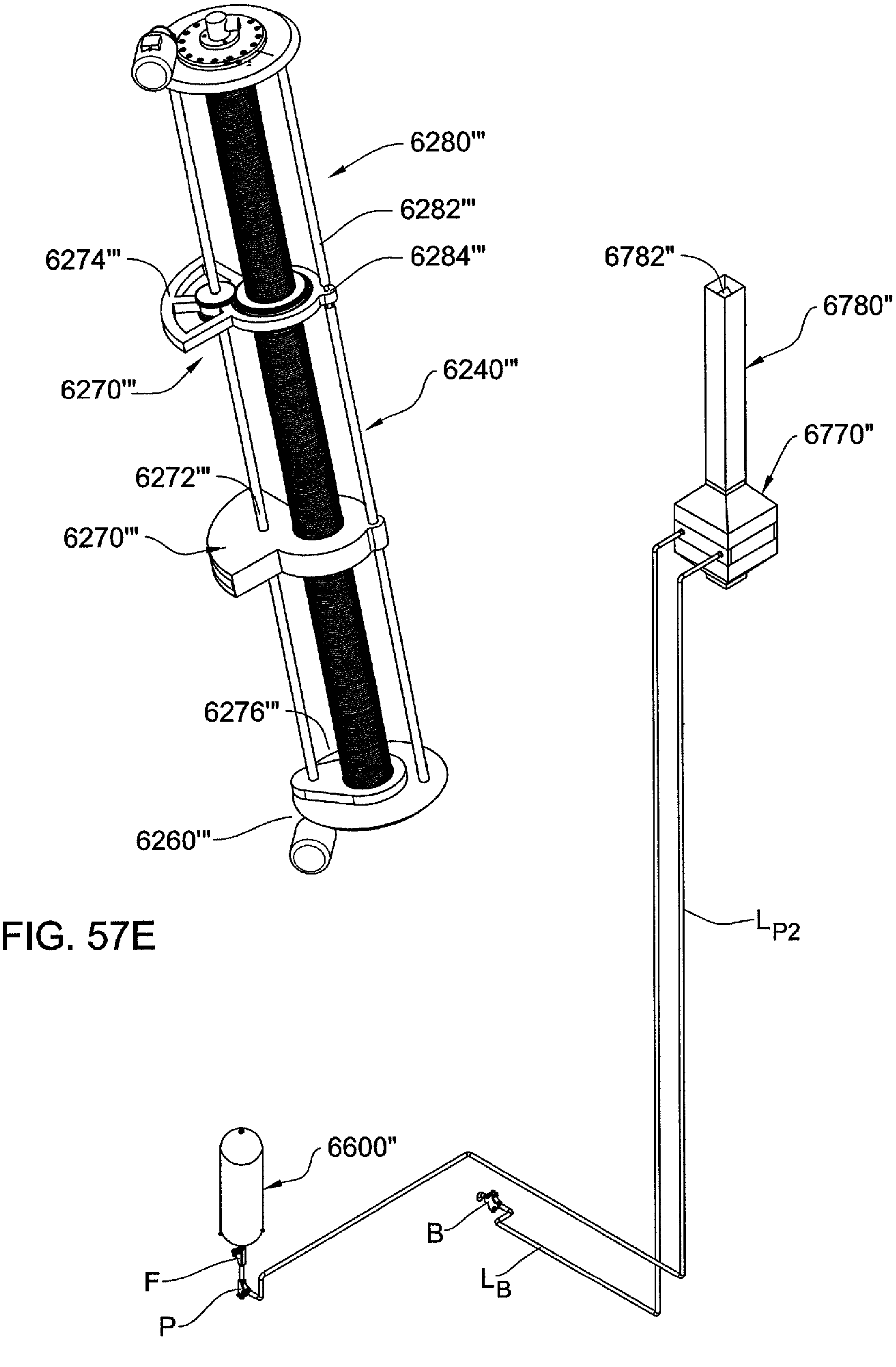
Figure 59A:
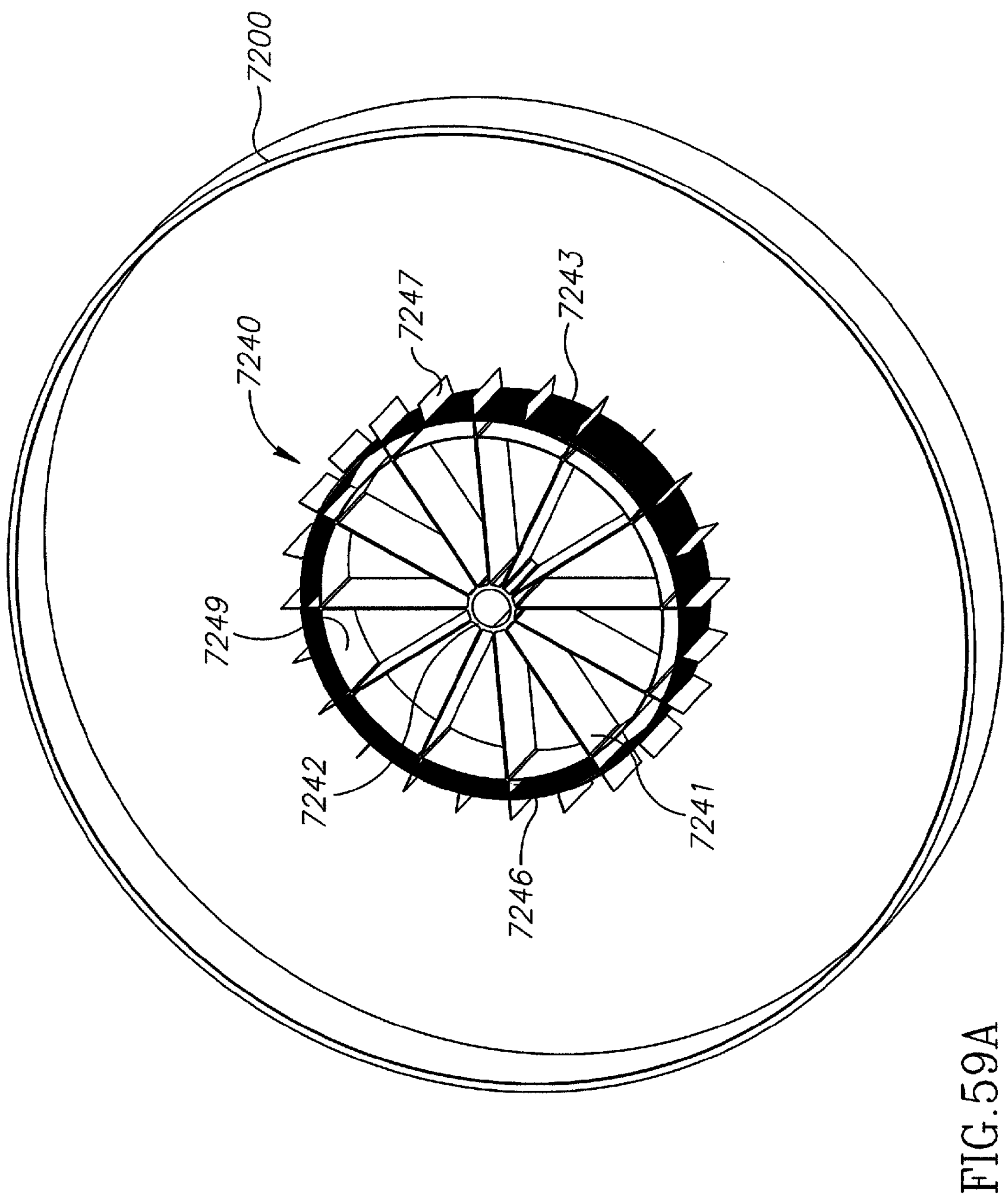
Figure 59B:
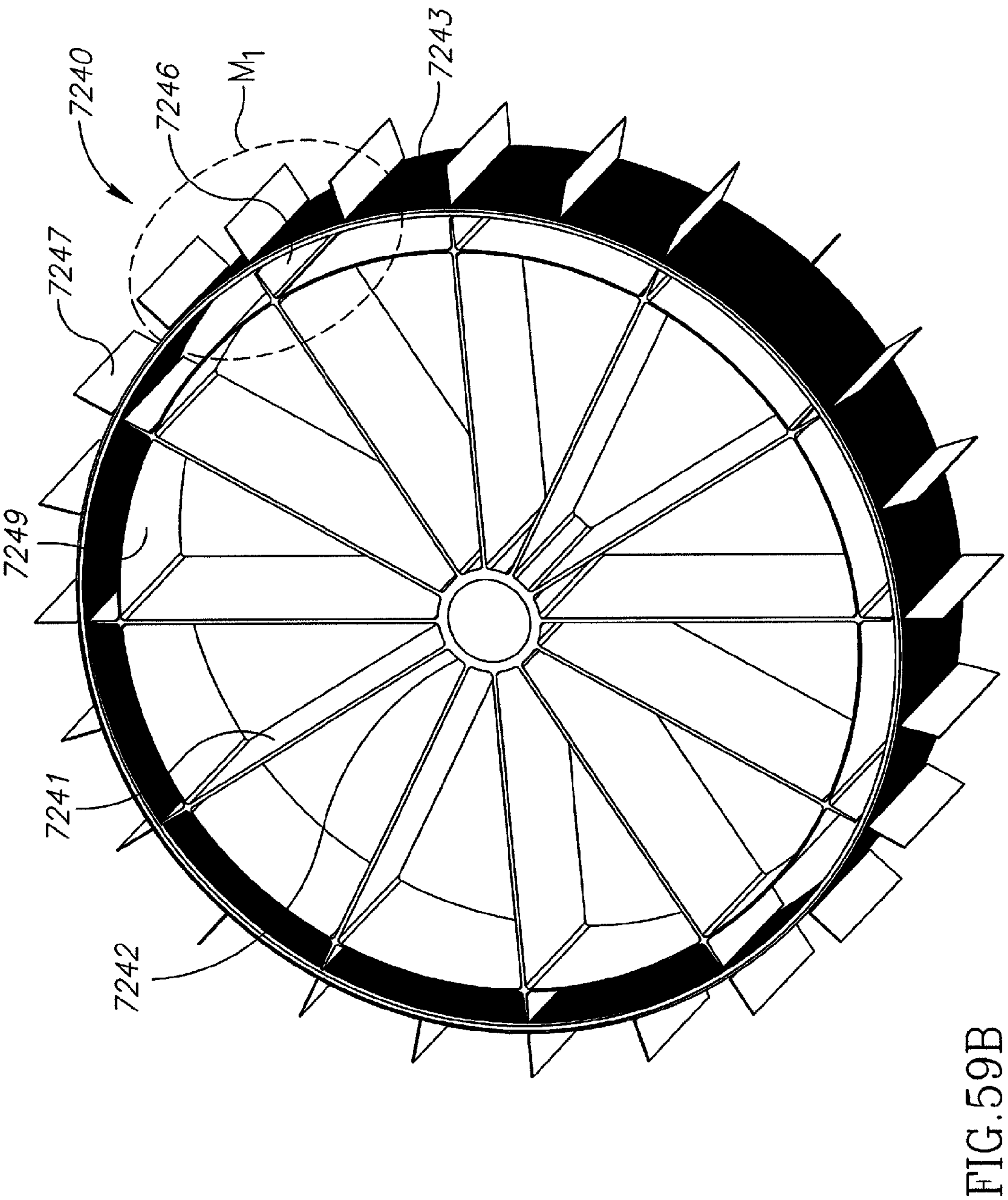
Figure 59C:
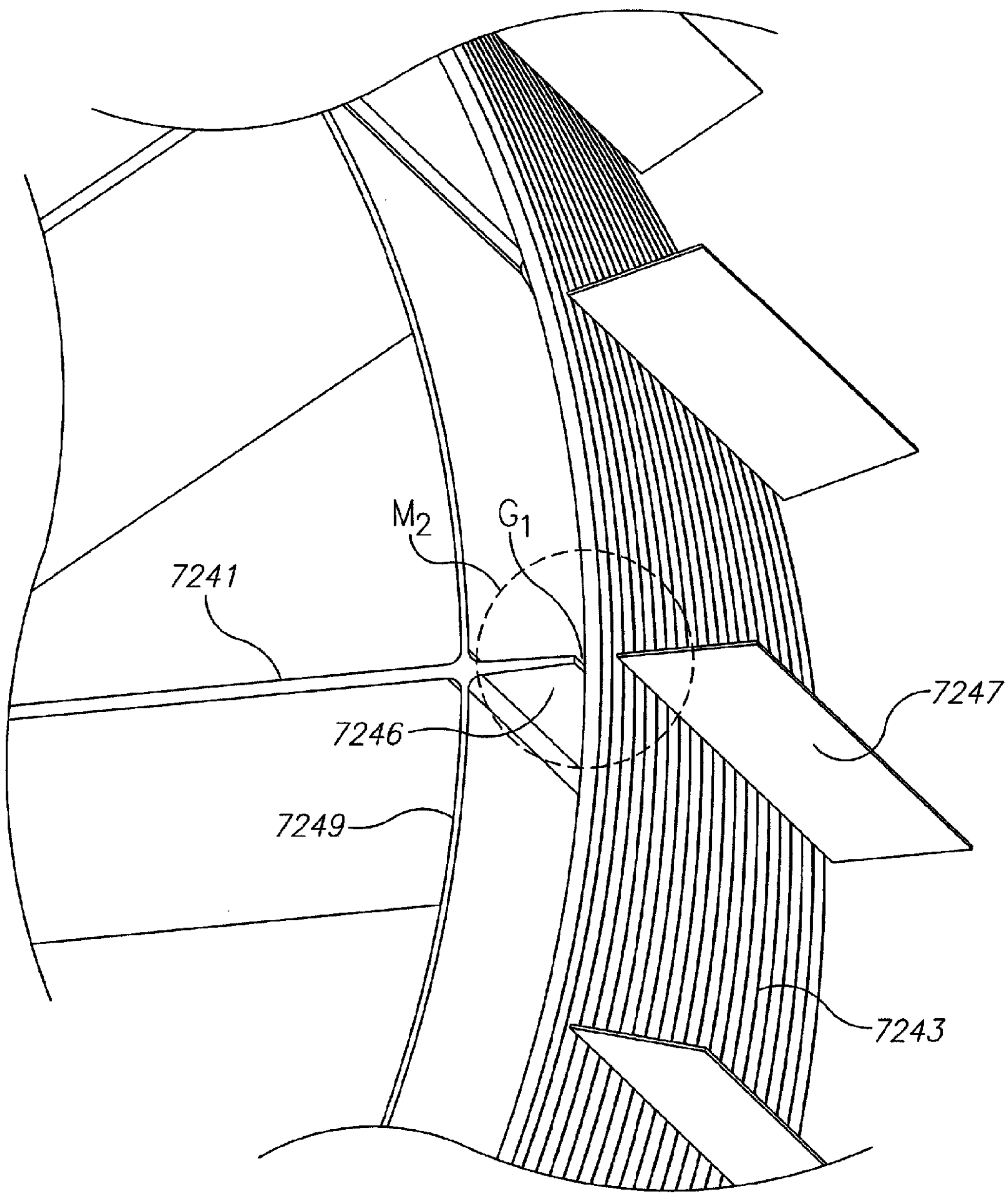
Figure 59D:
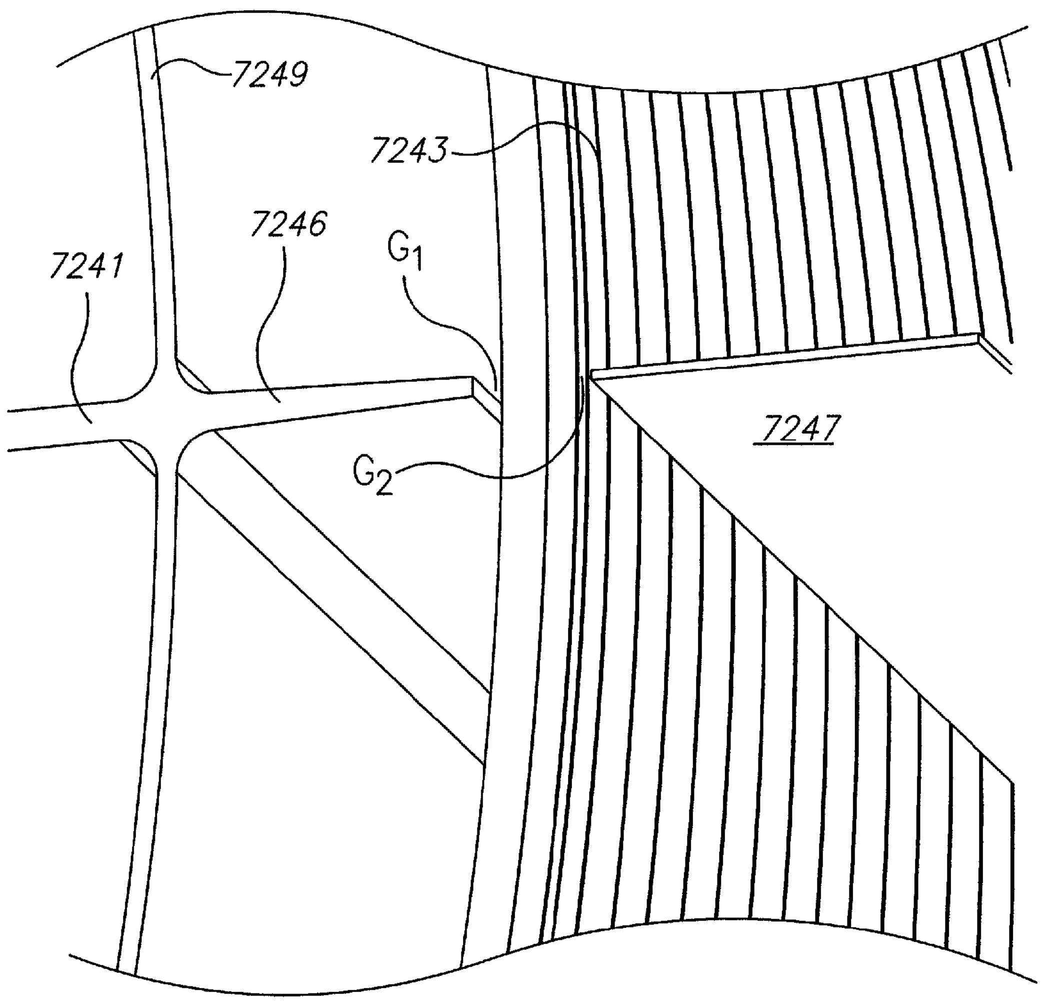
Figure 59E:
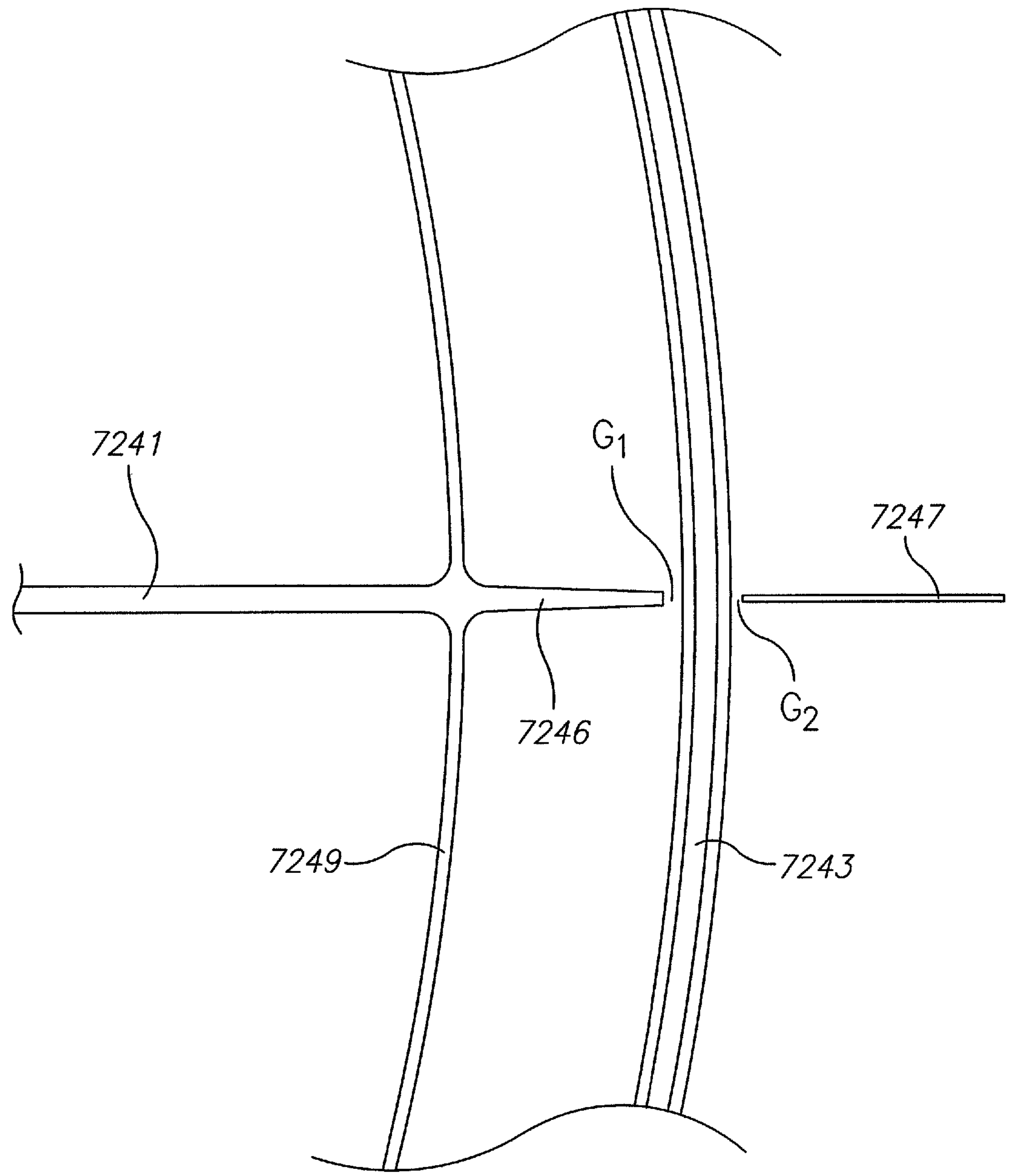
Figure 60A:
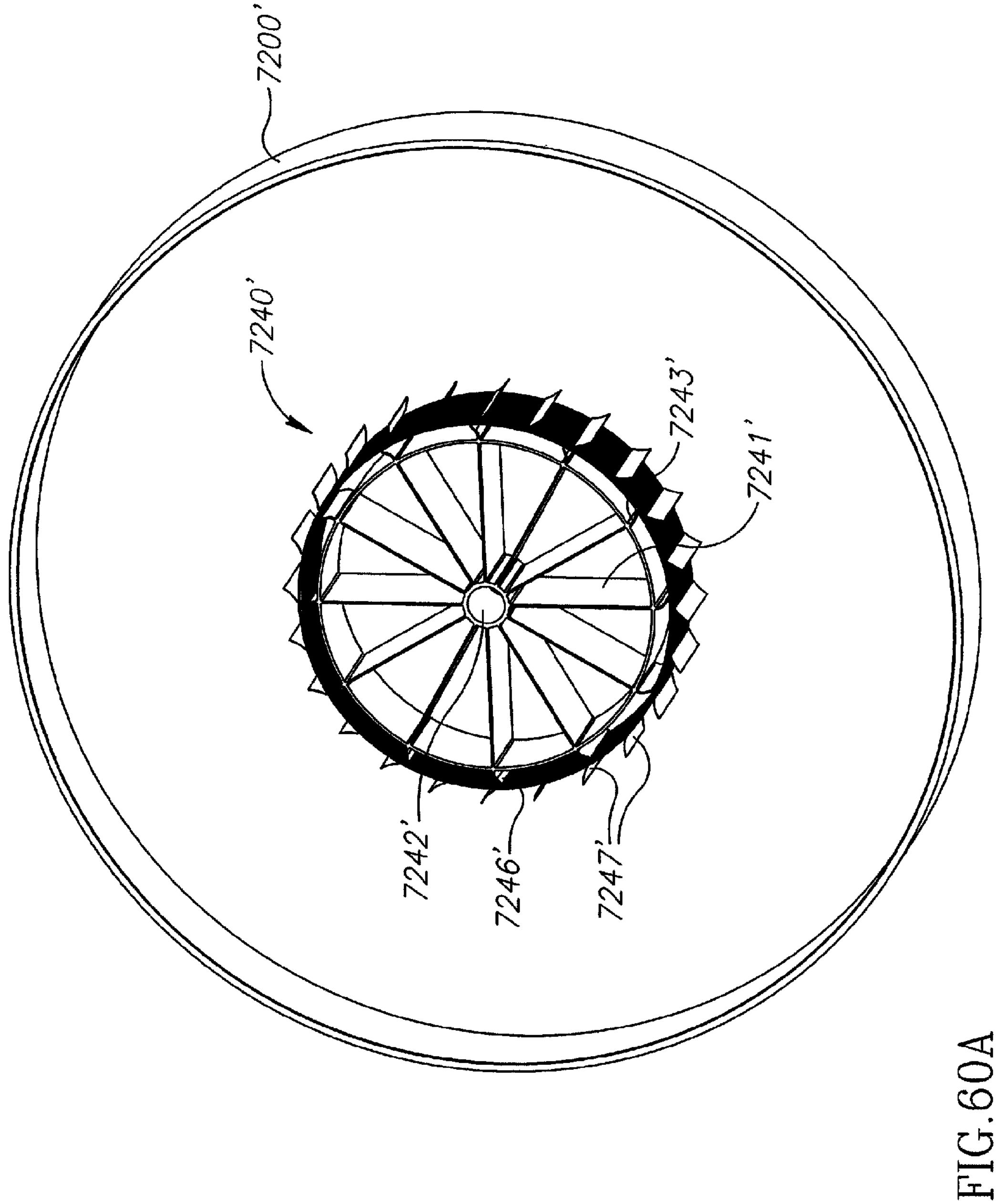
Figure 60B:
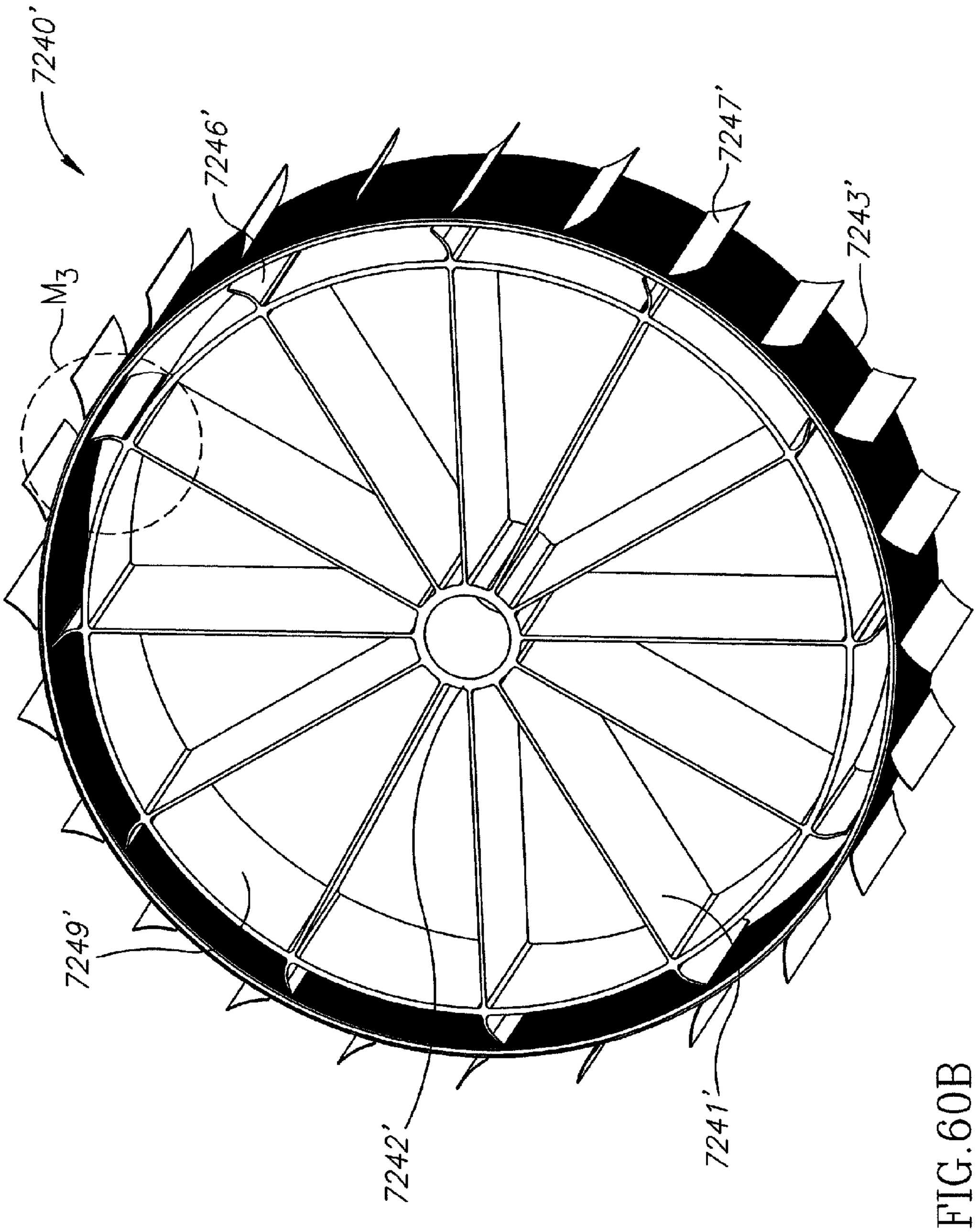
Figure 60C:
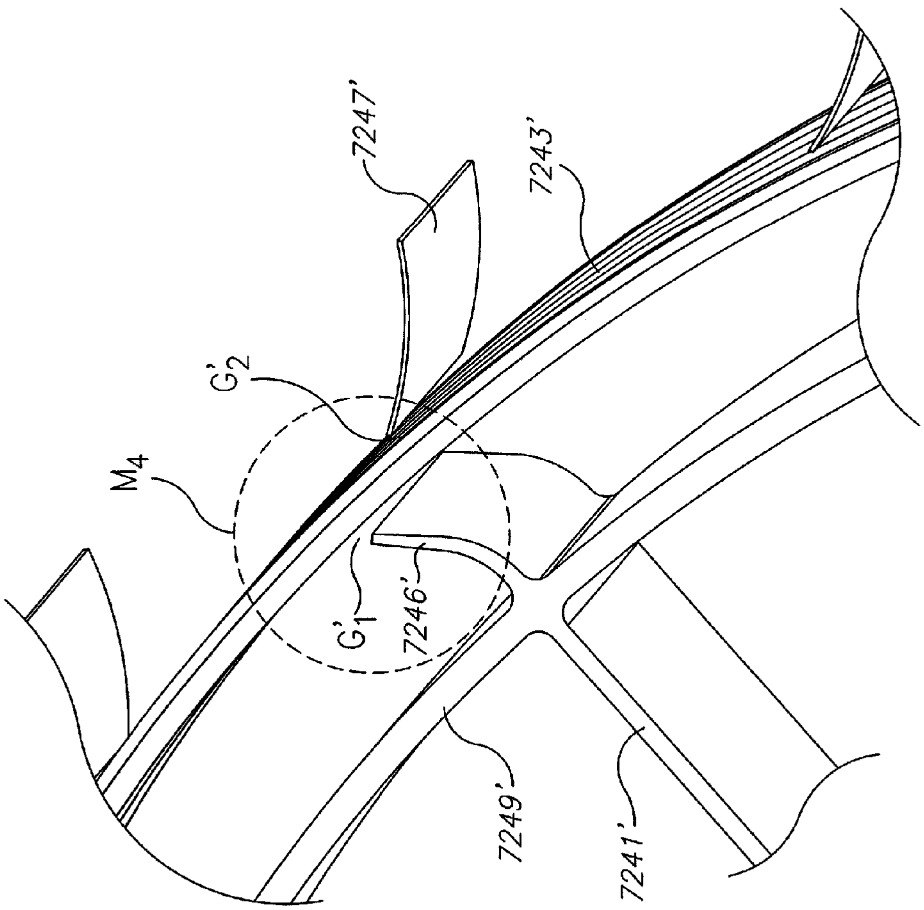
Figure 60D:
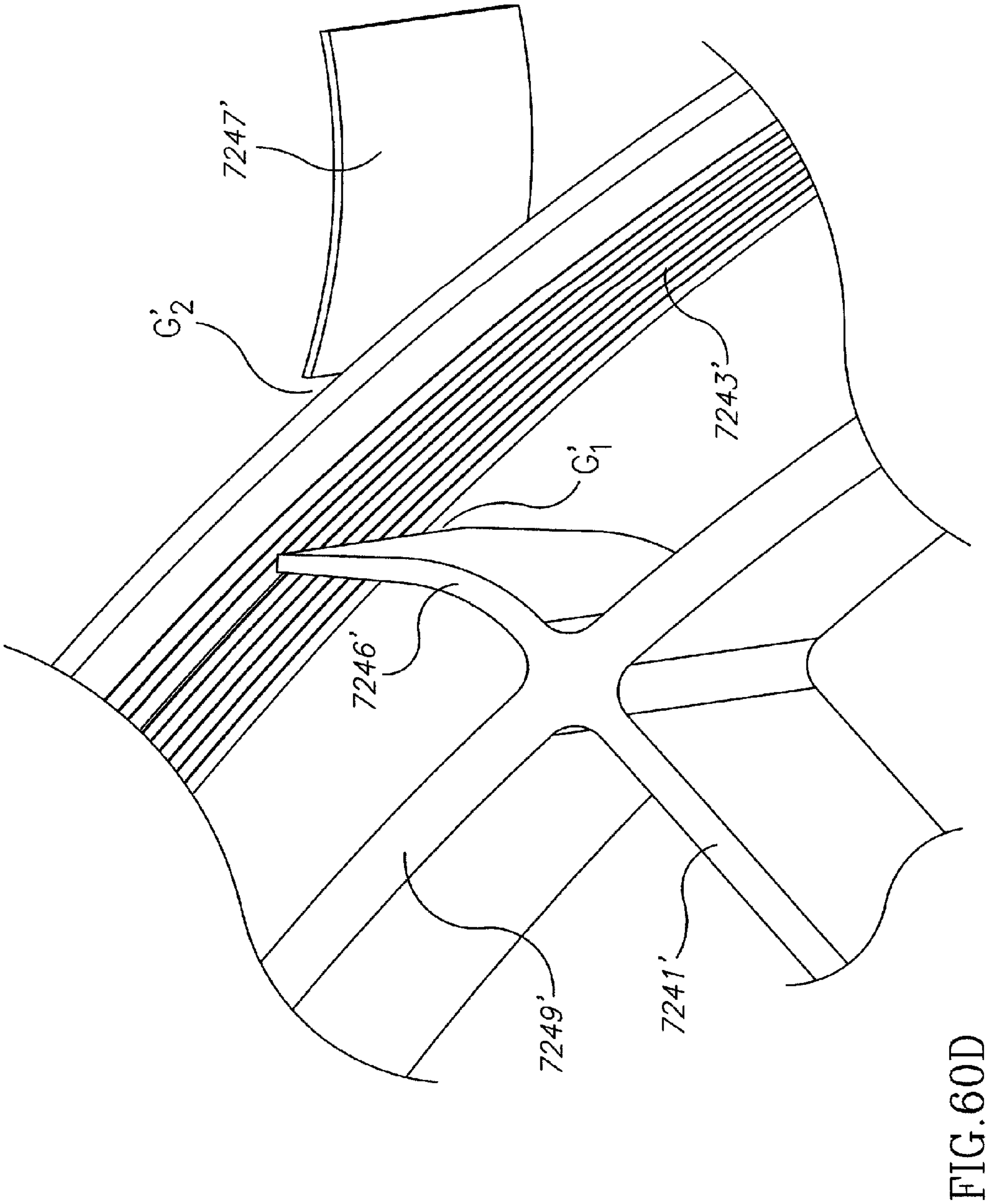
Figure 60E:
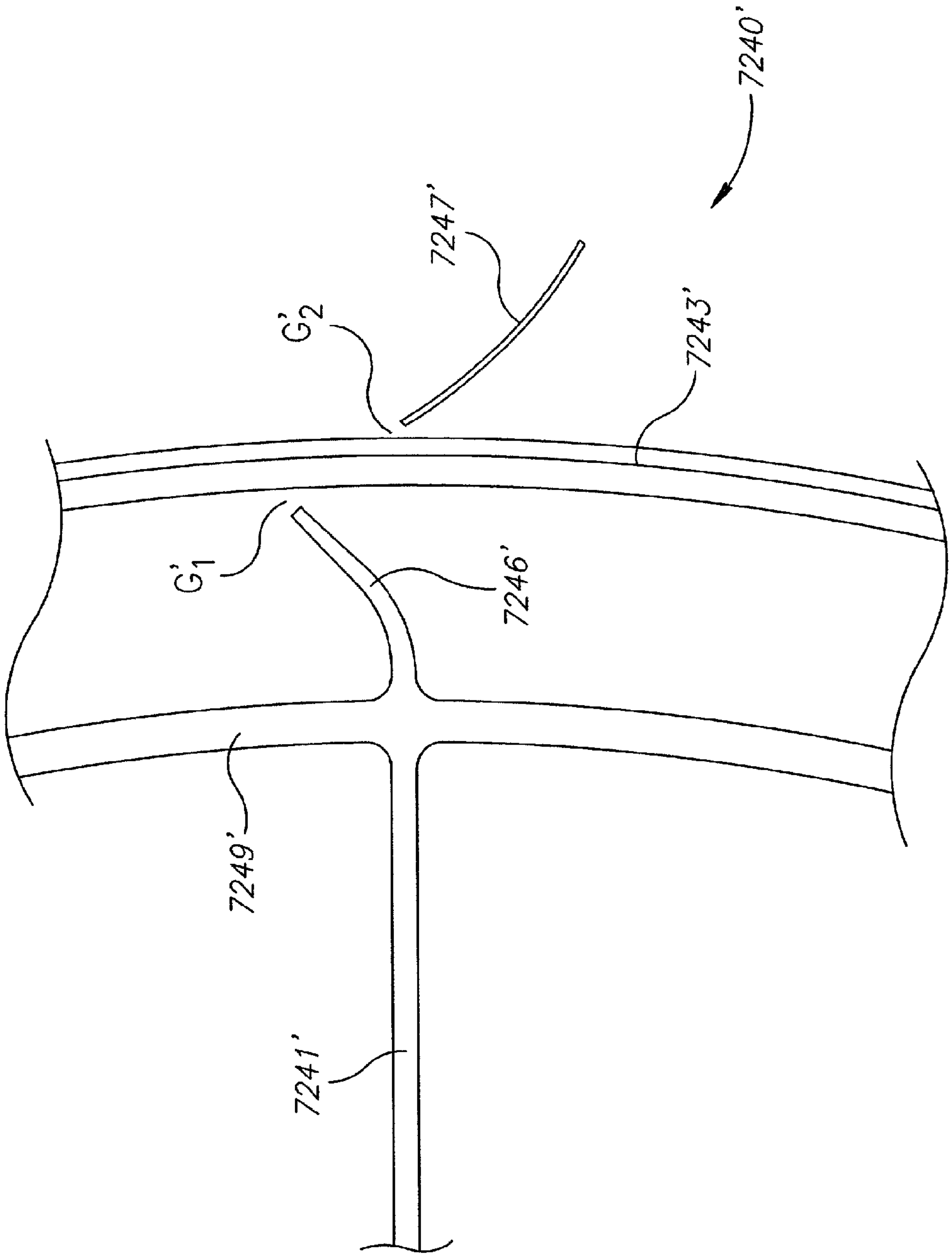
Figure 61A:
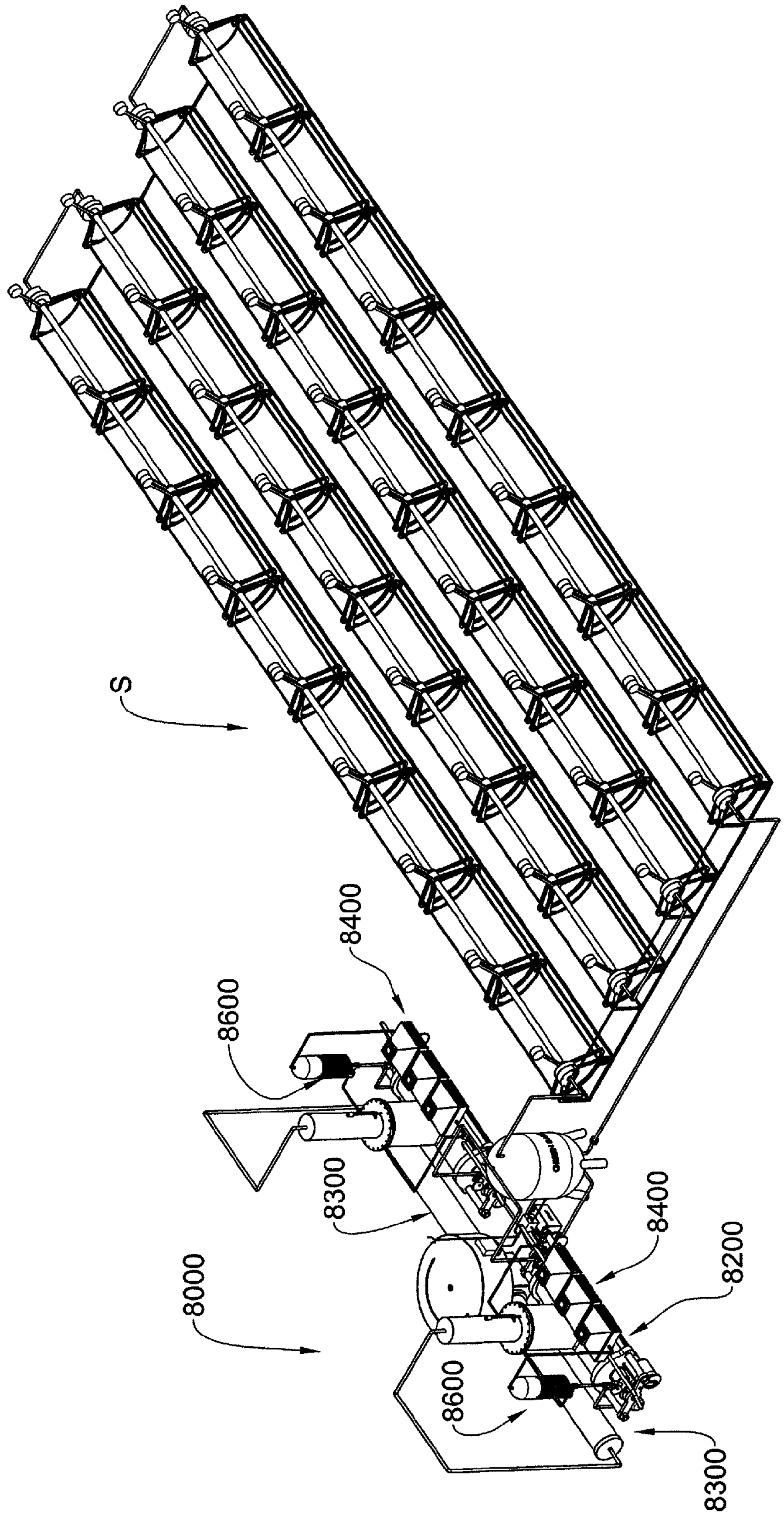
Figure 61B:
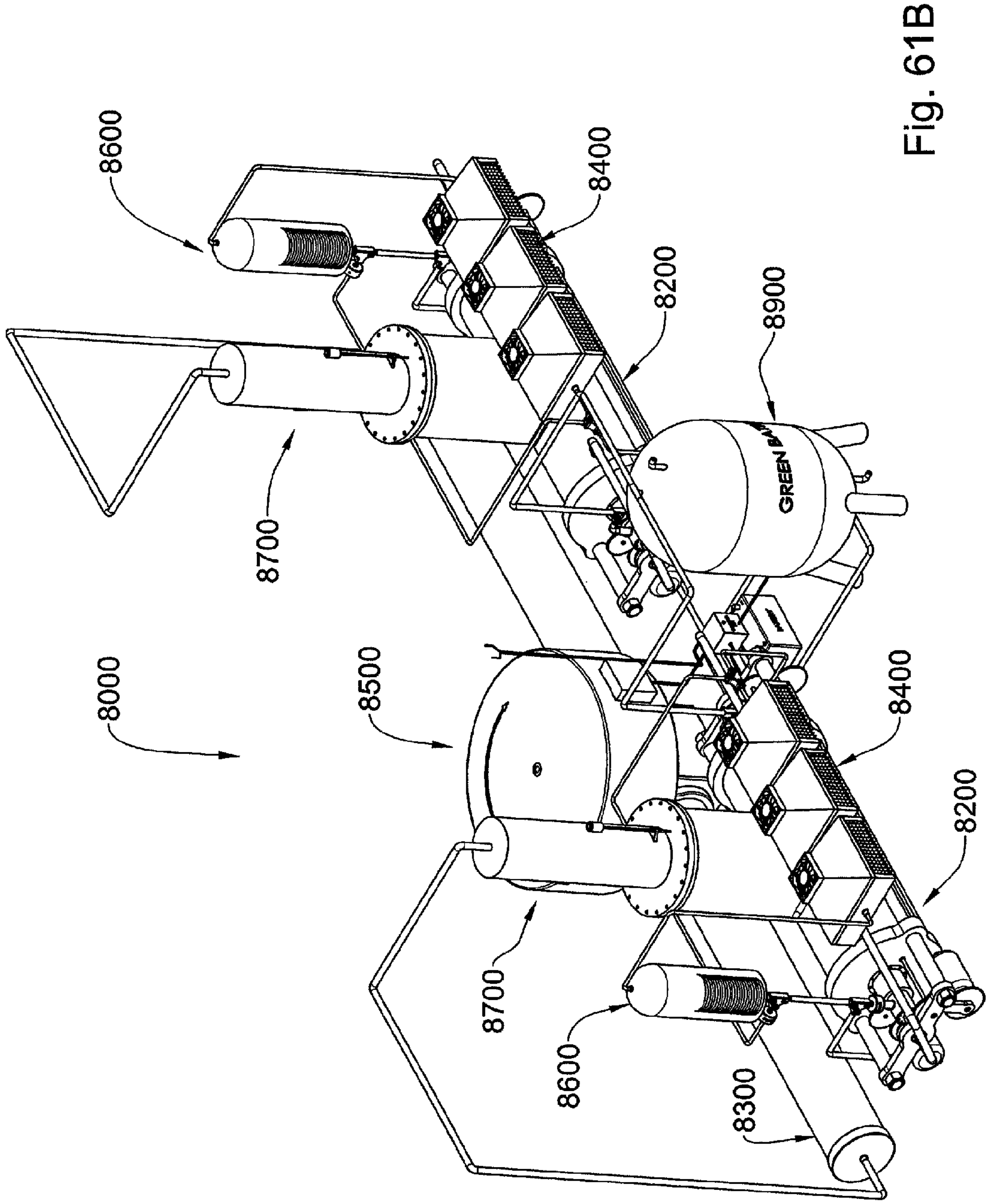
Figure 61C:
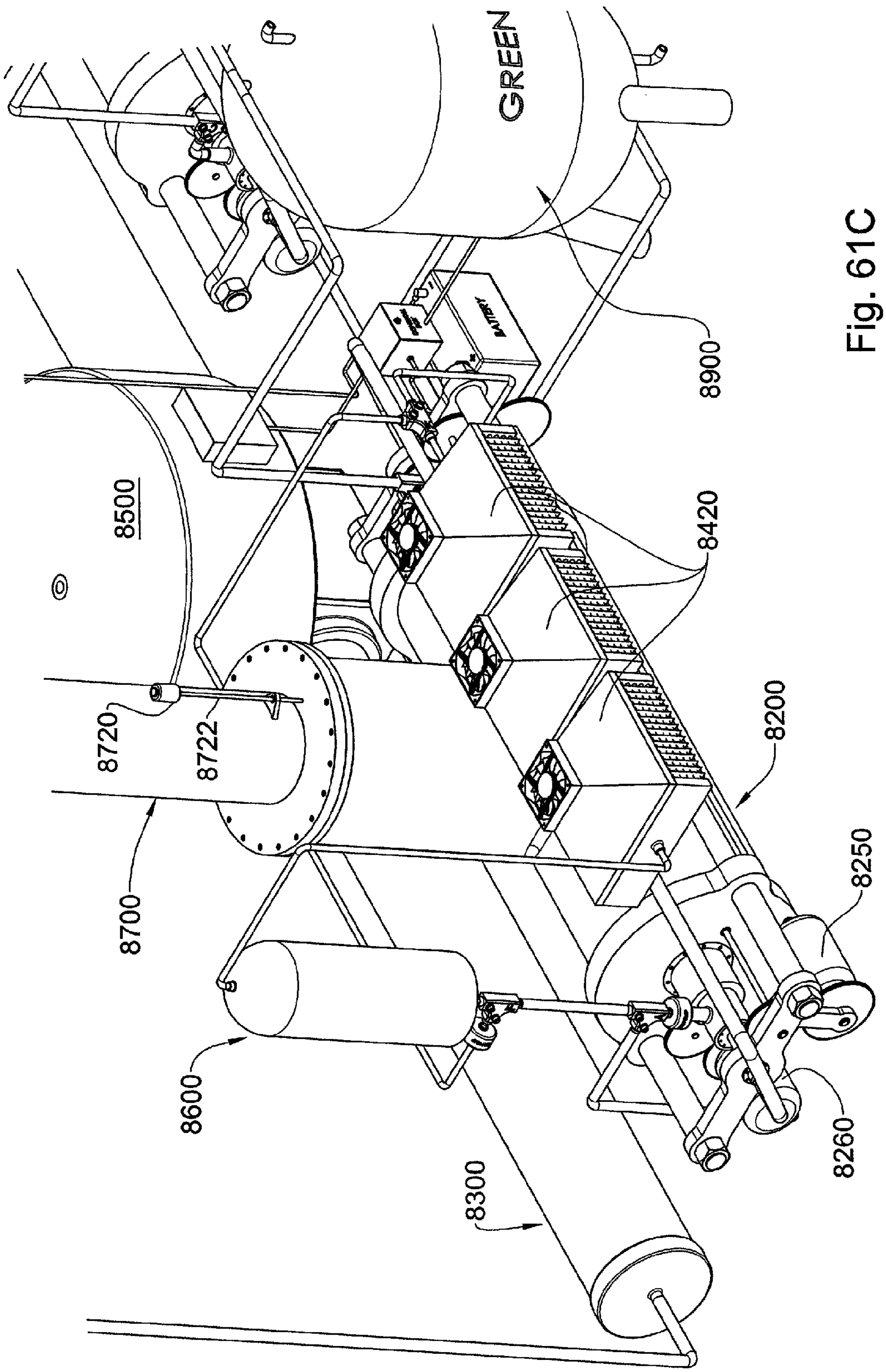
Figure 62A:
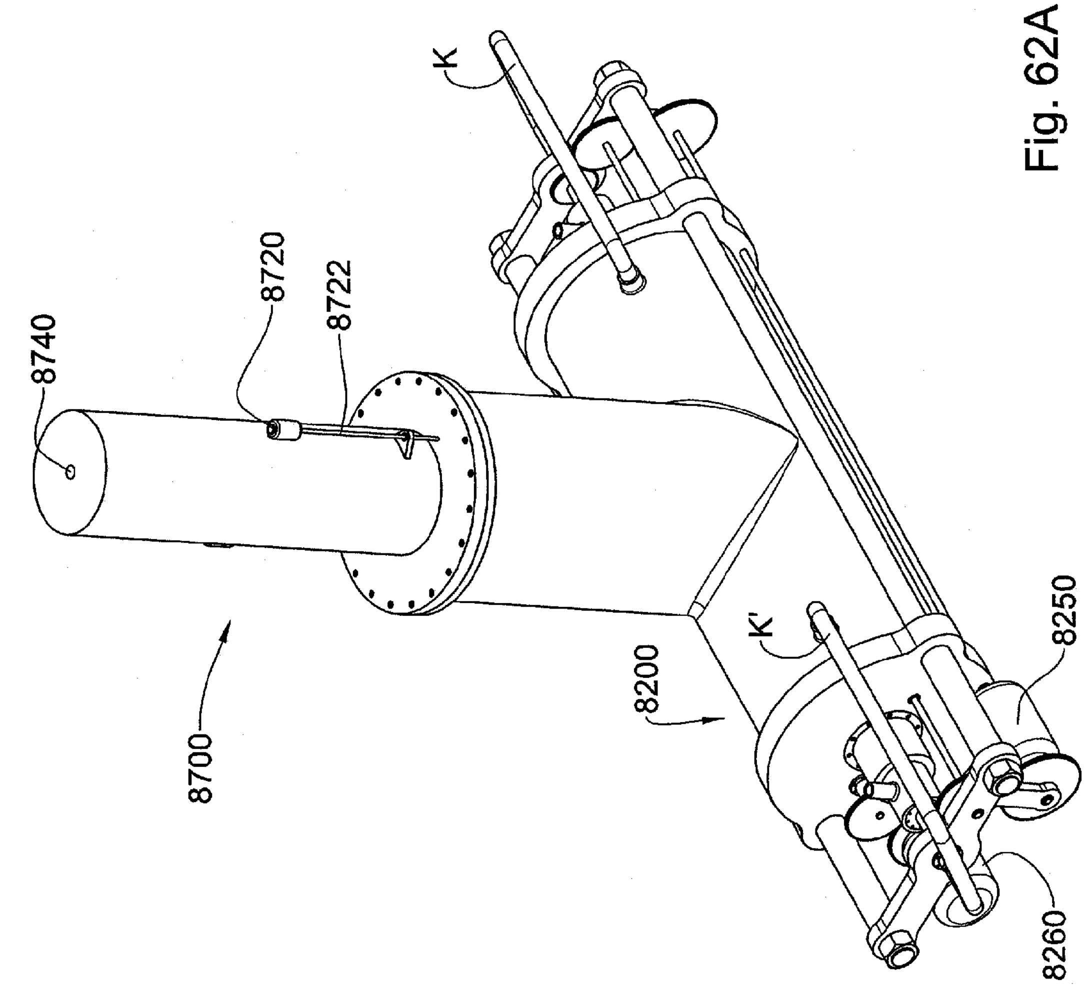
Figure 62B:
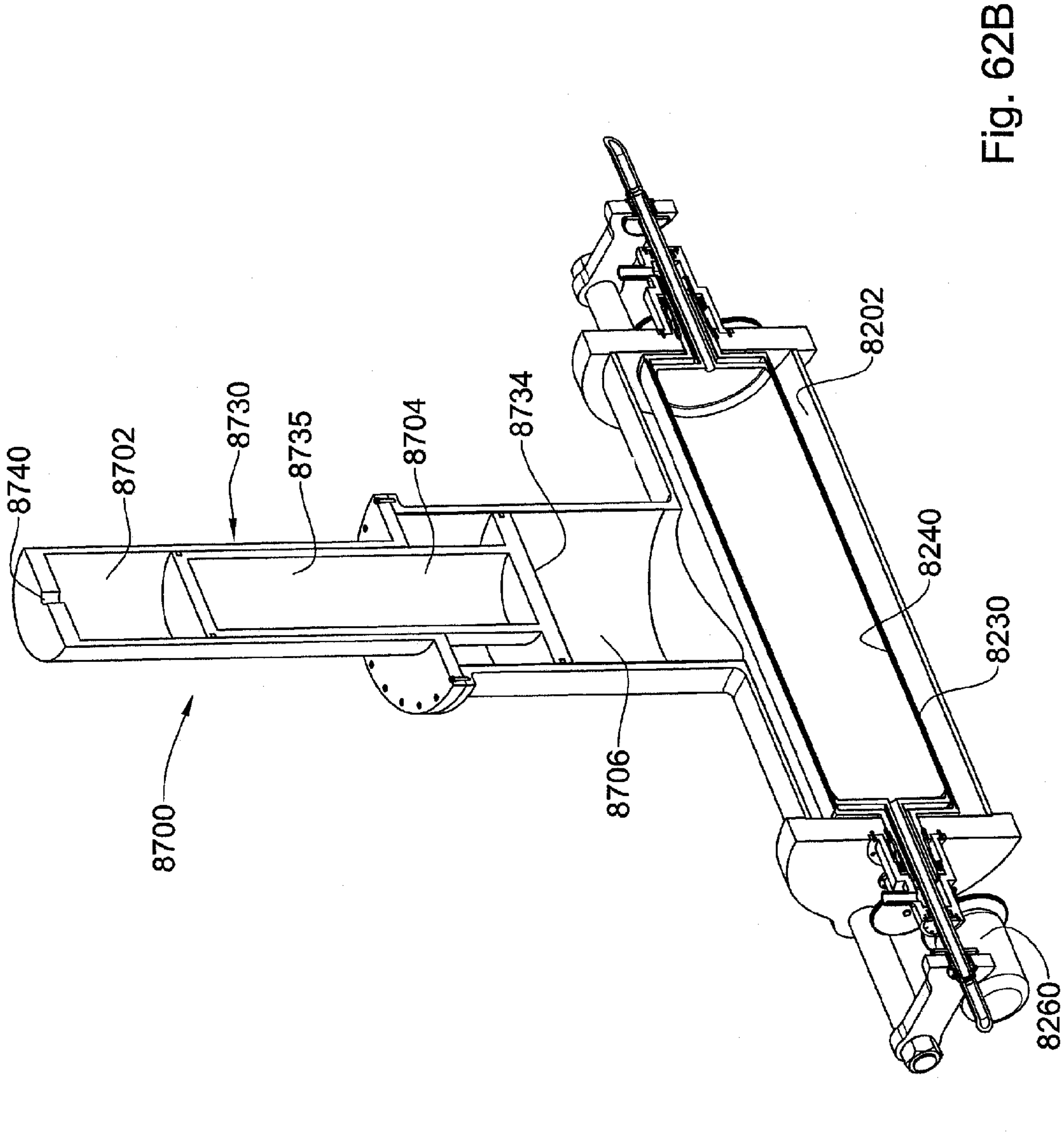
Figure 62C:
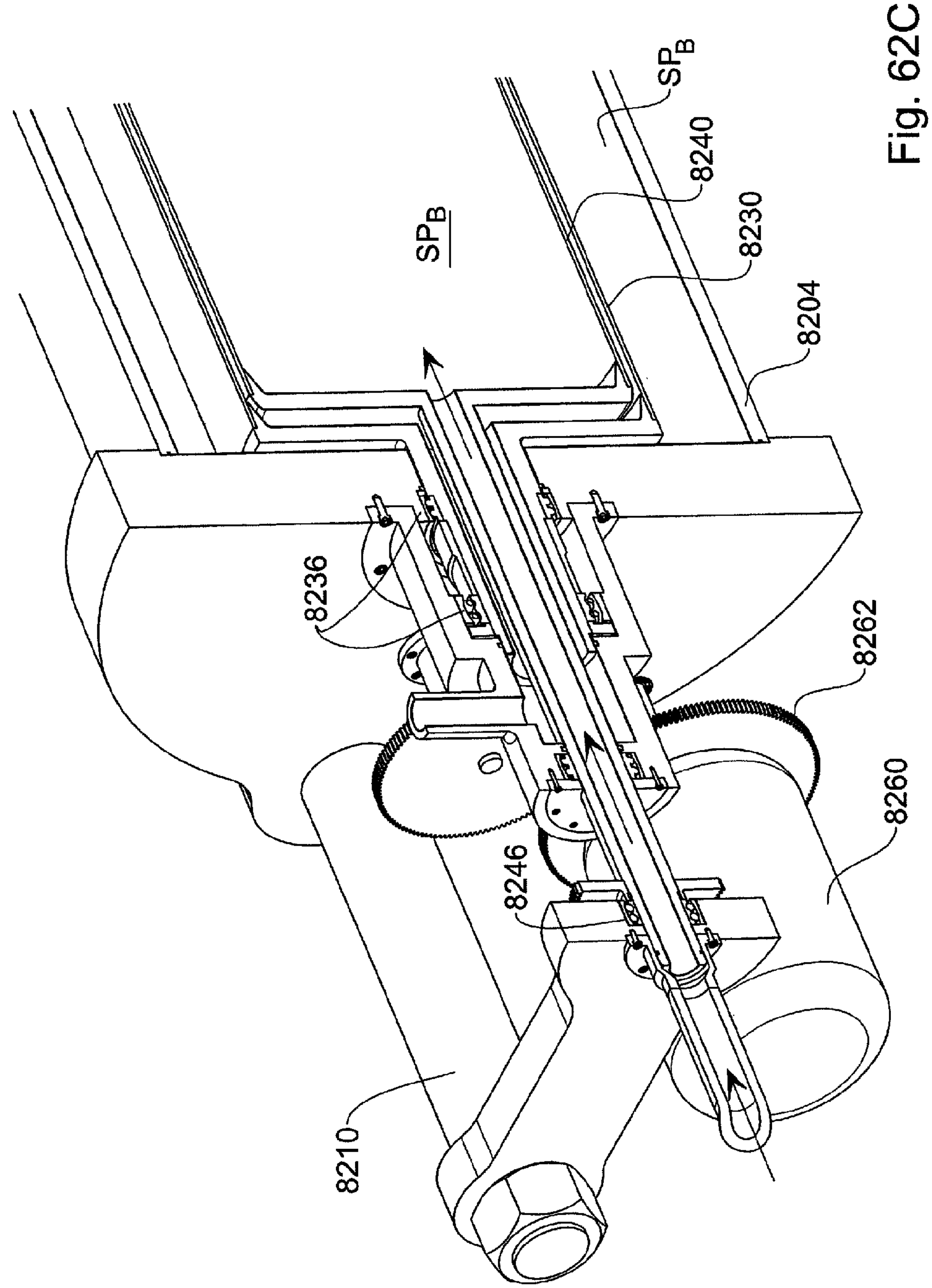
Figure 62D:
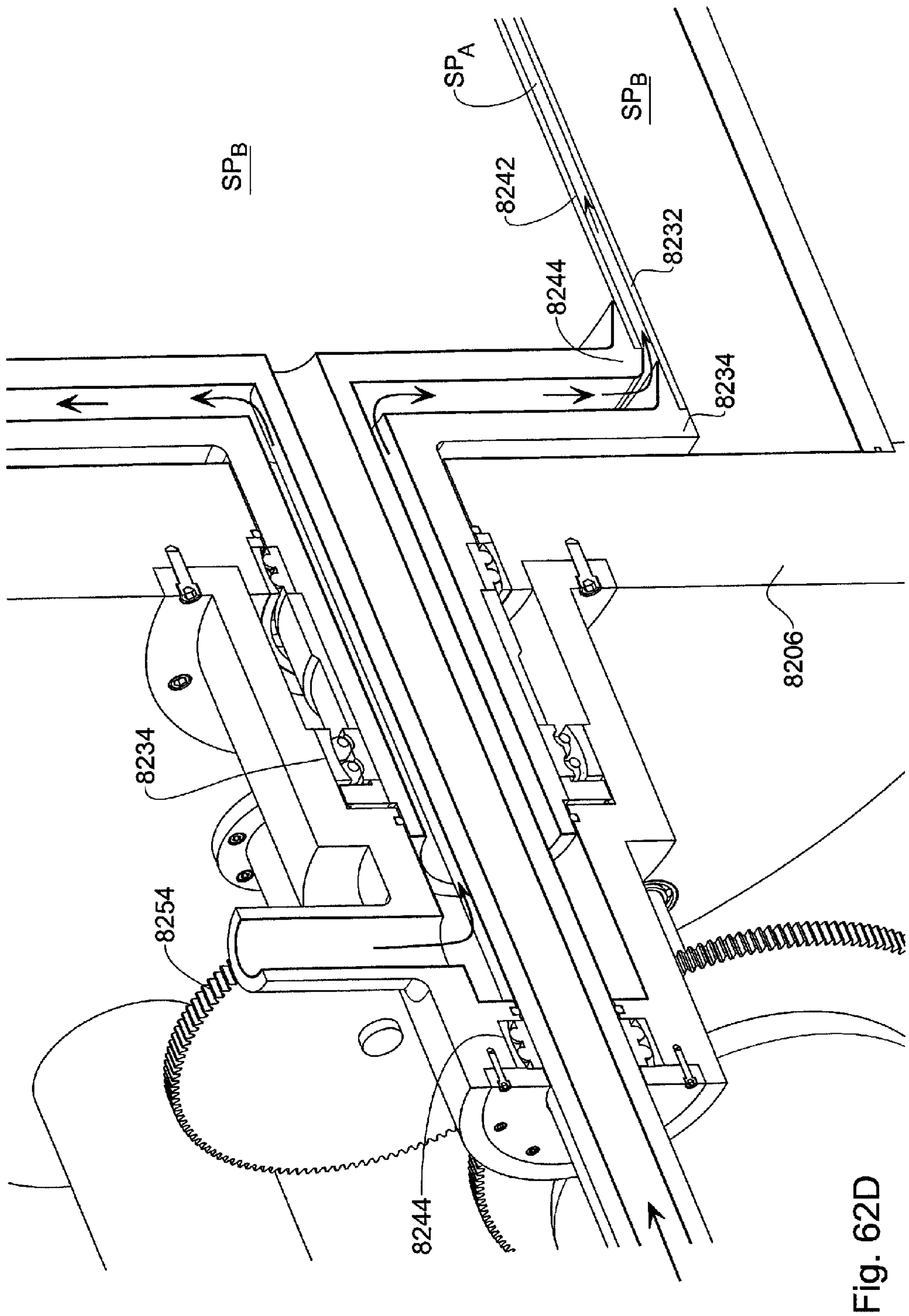
Figure 63A:
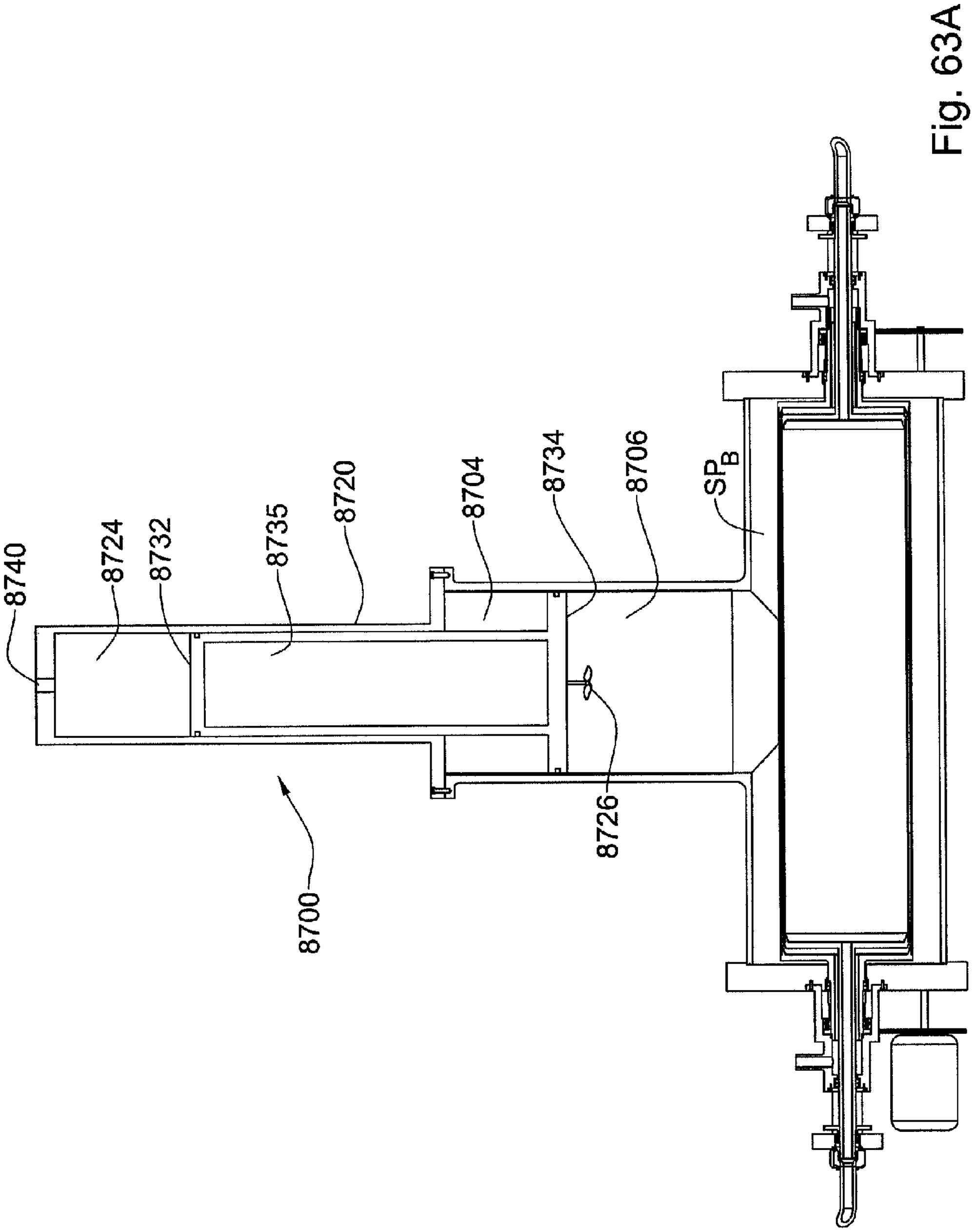
Figure 63B:
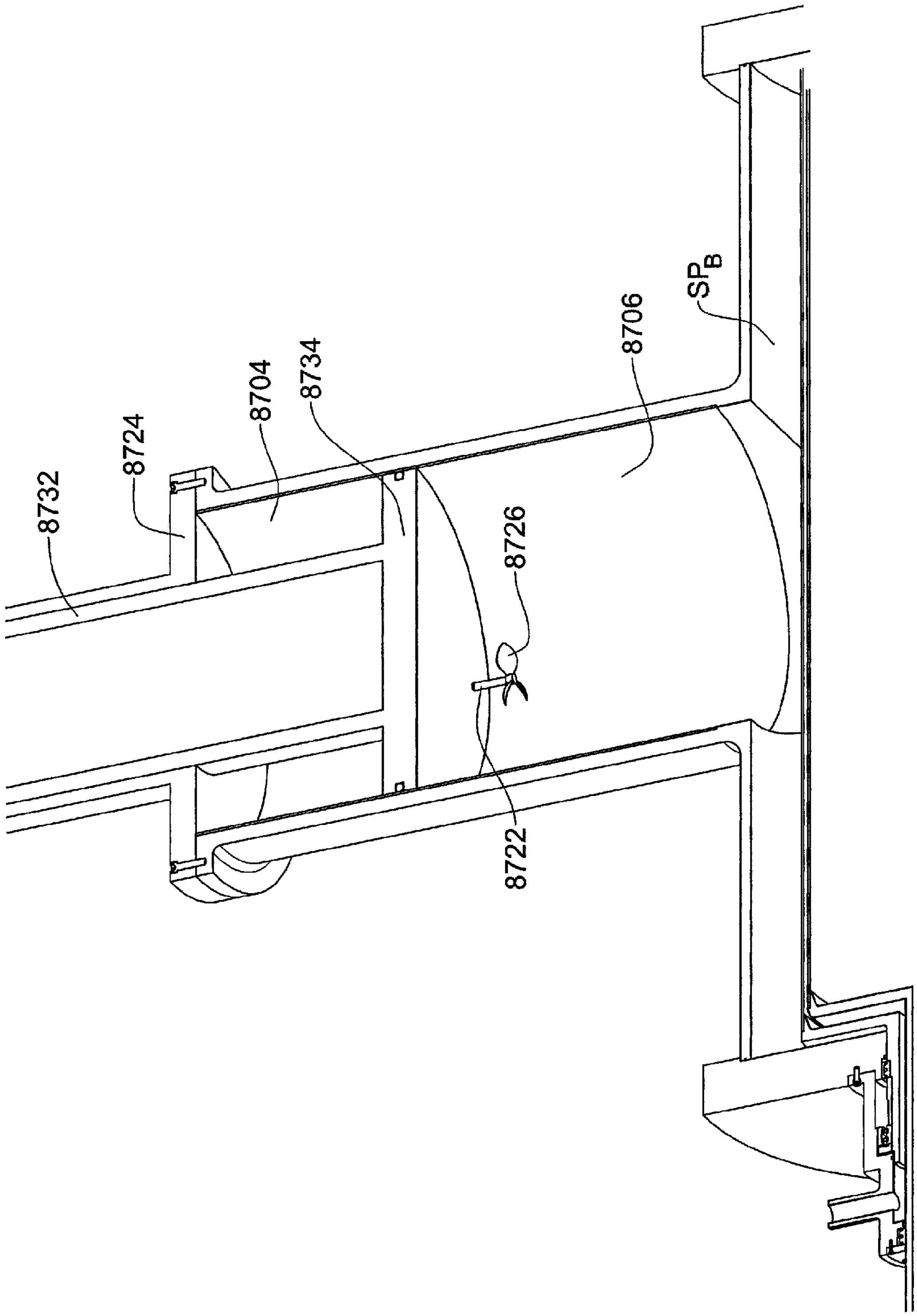
Figure 64:
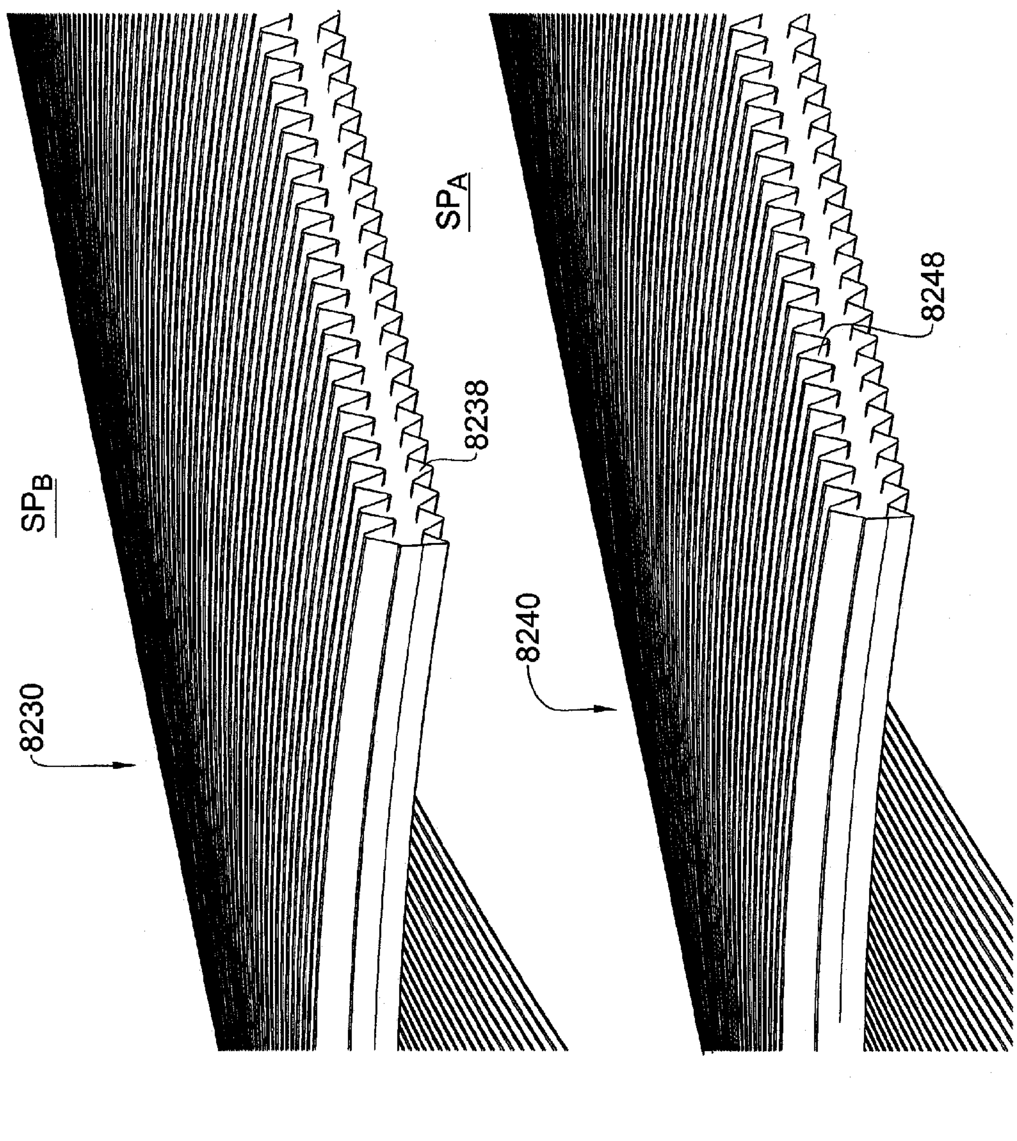
Figure 65A:
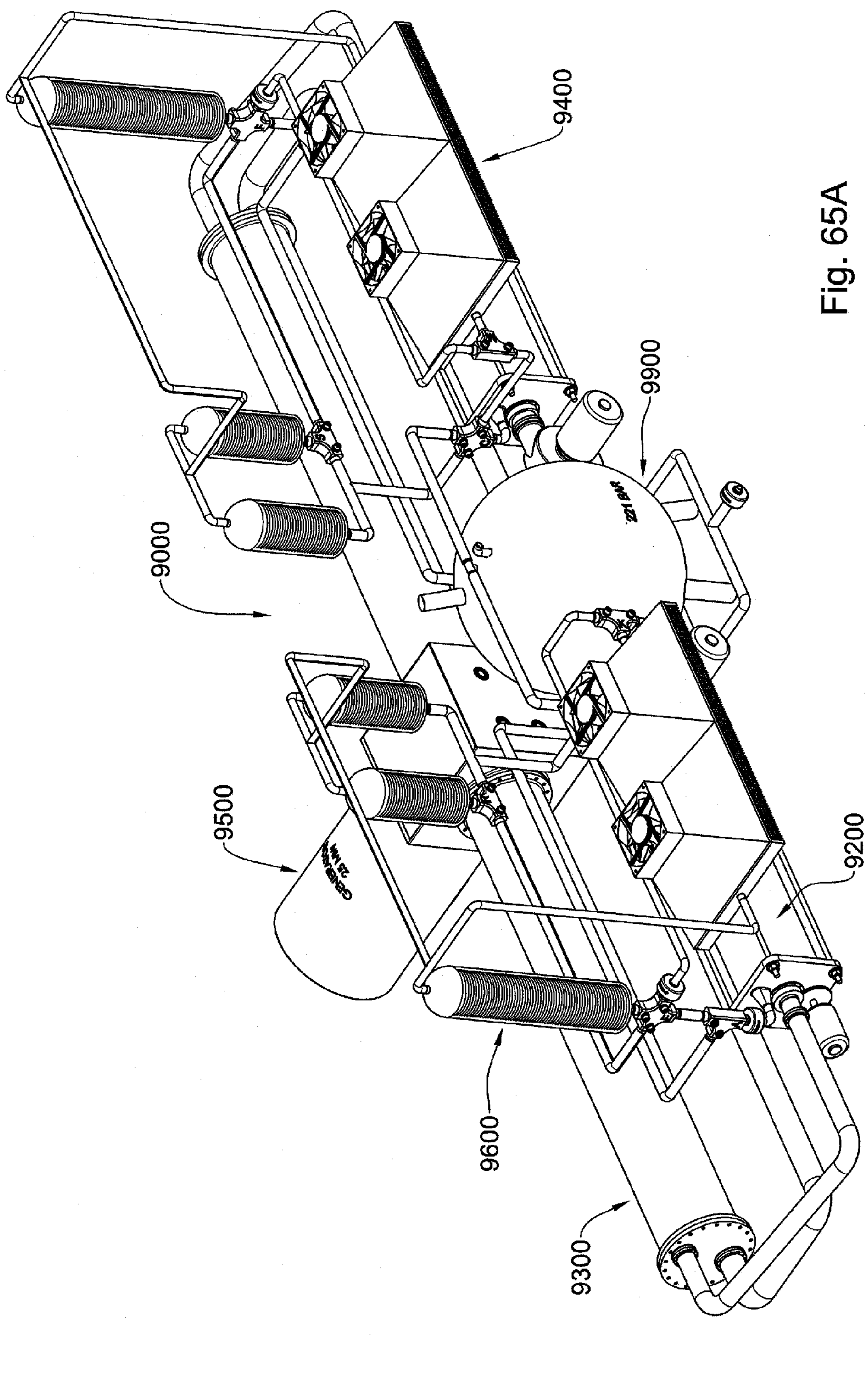
Figure 65B:
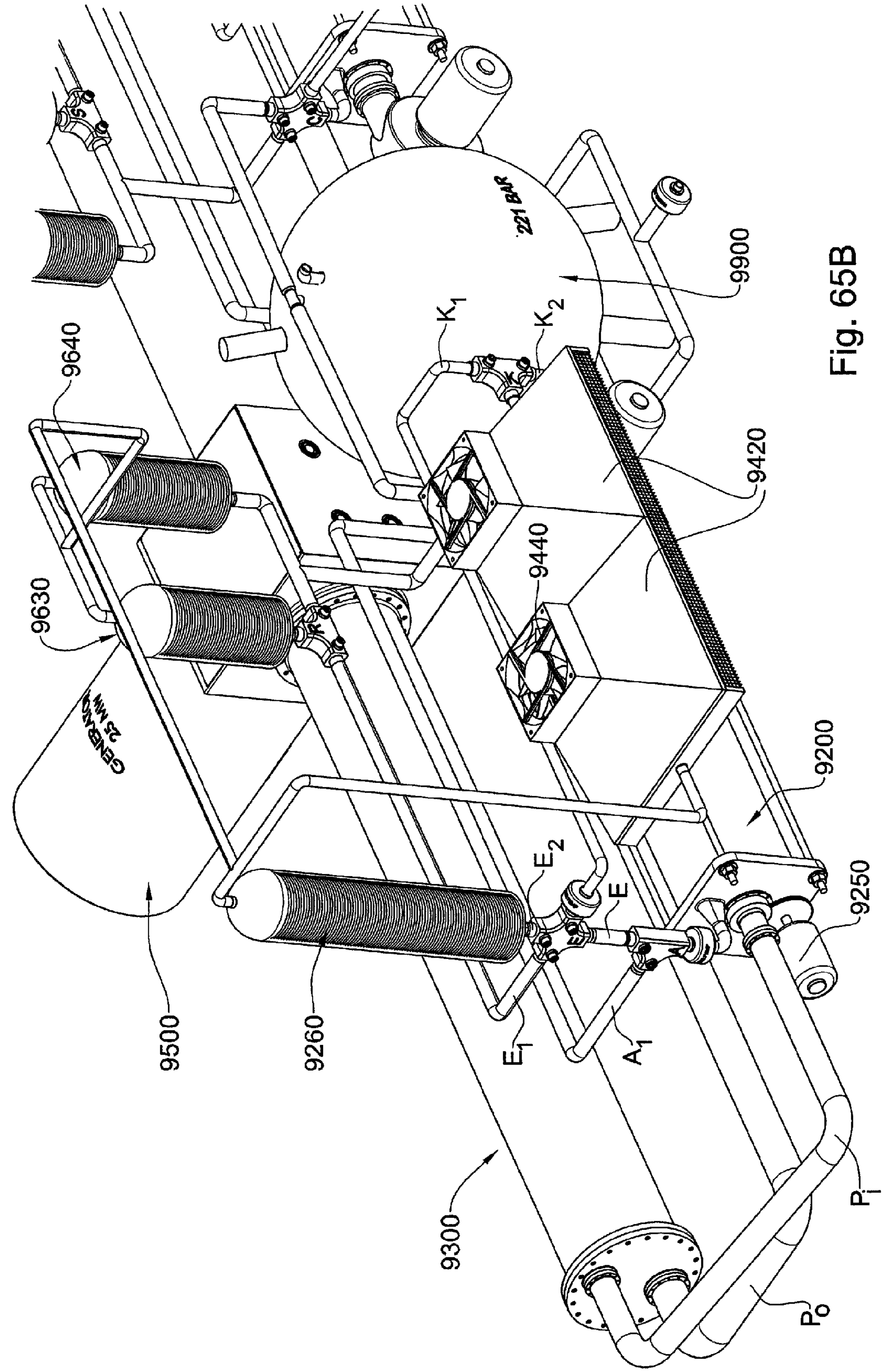
Figure 66A:
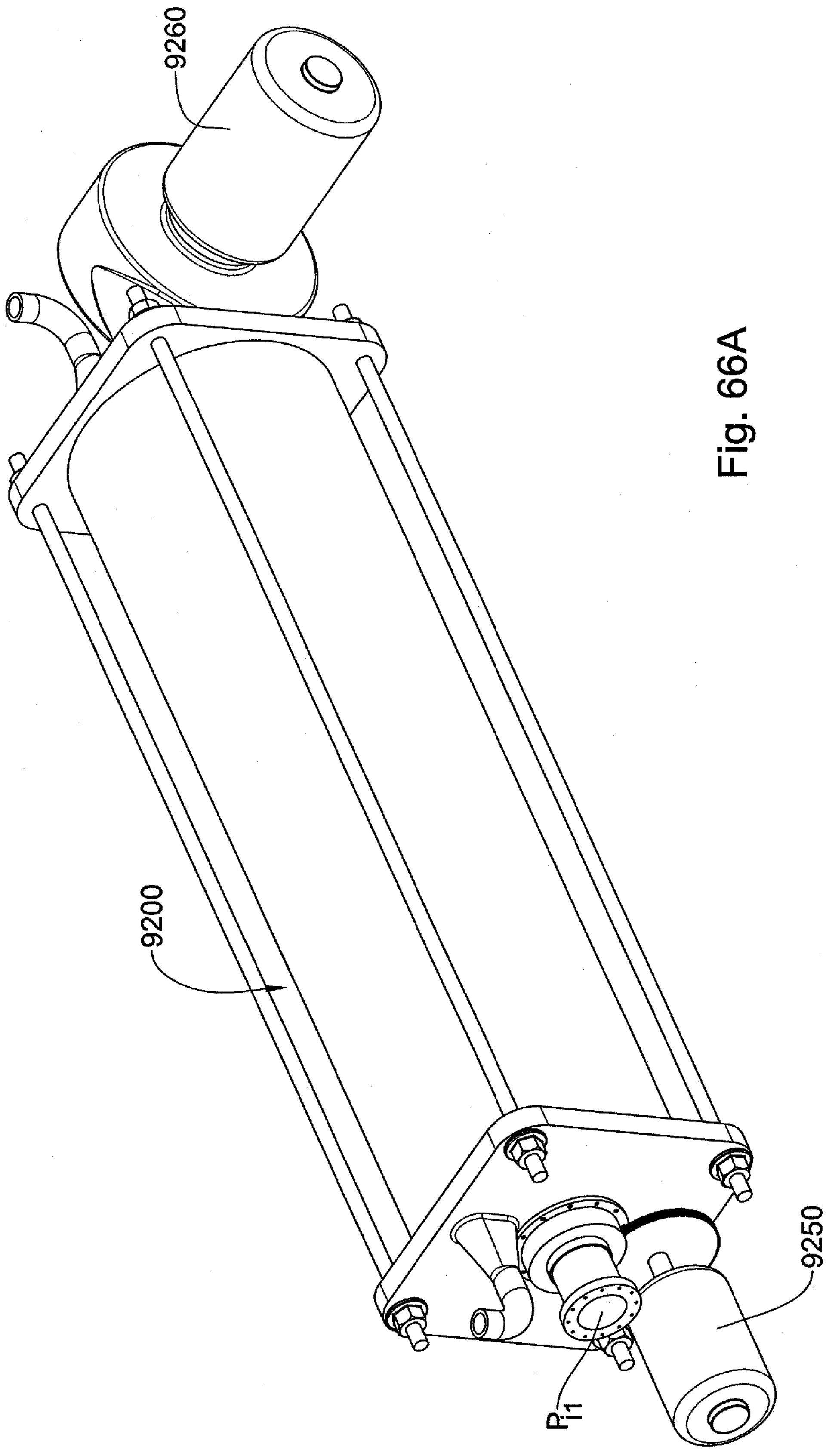
Figure 66B:
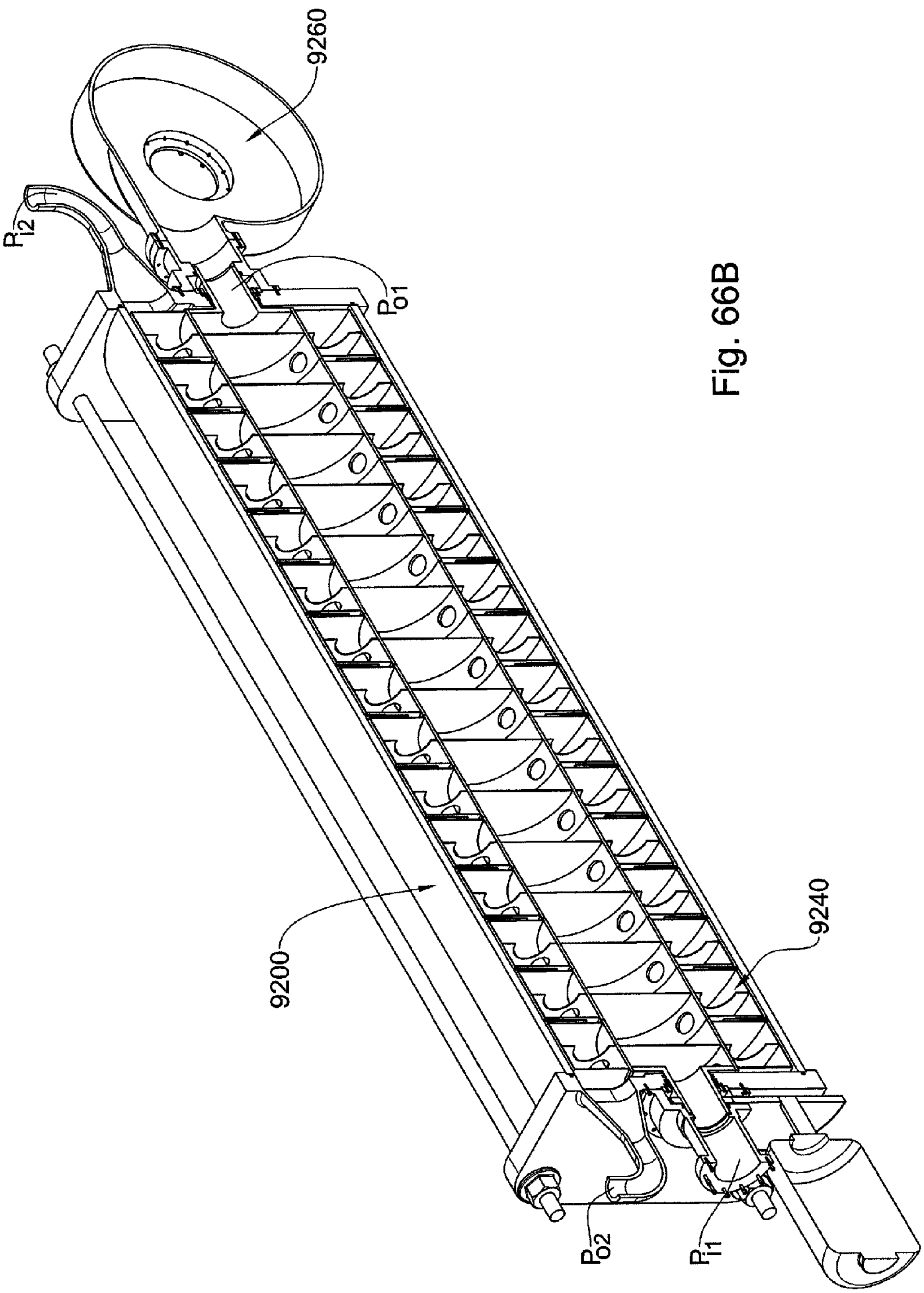
Figure 66C:
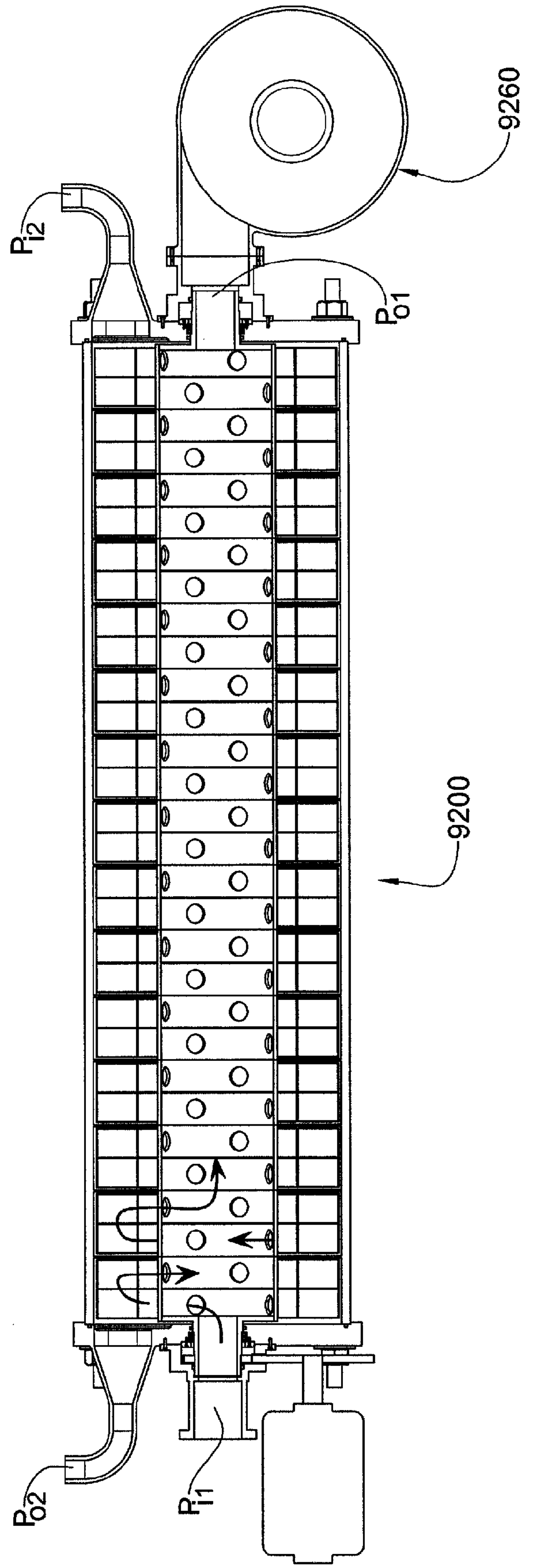
Figure 66D:
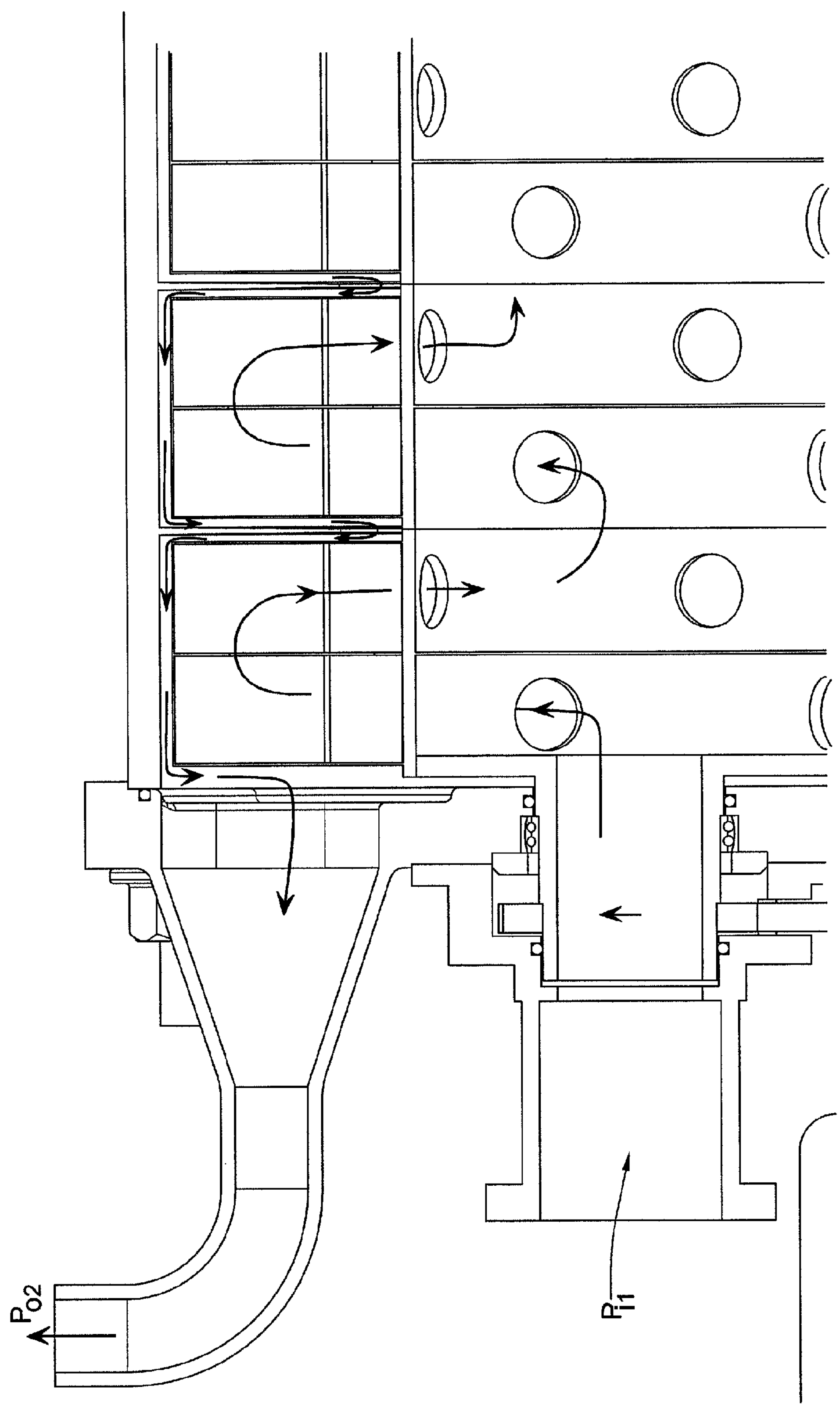
Figure 66E:
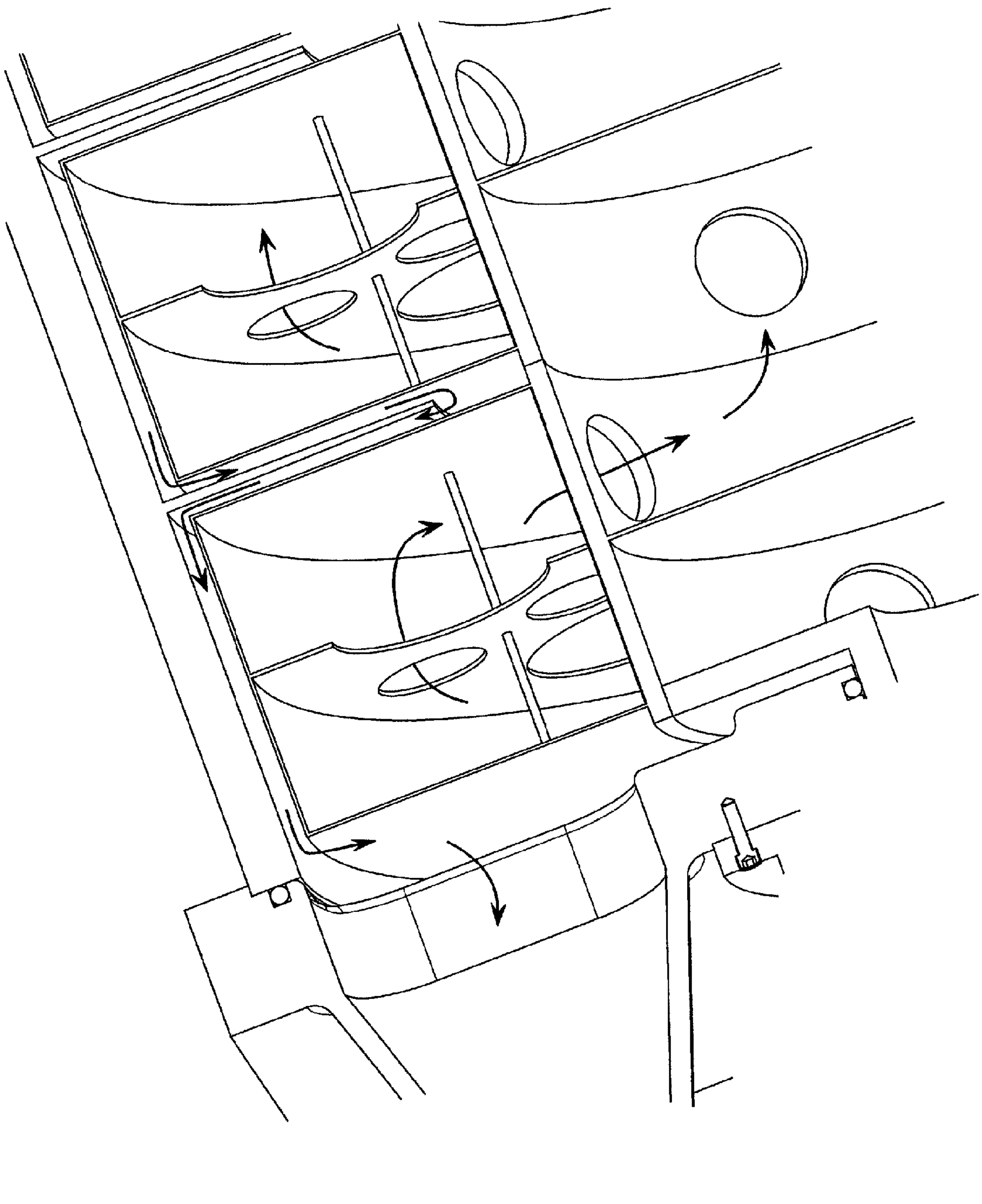
Figure 67A:
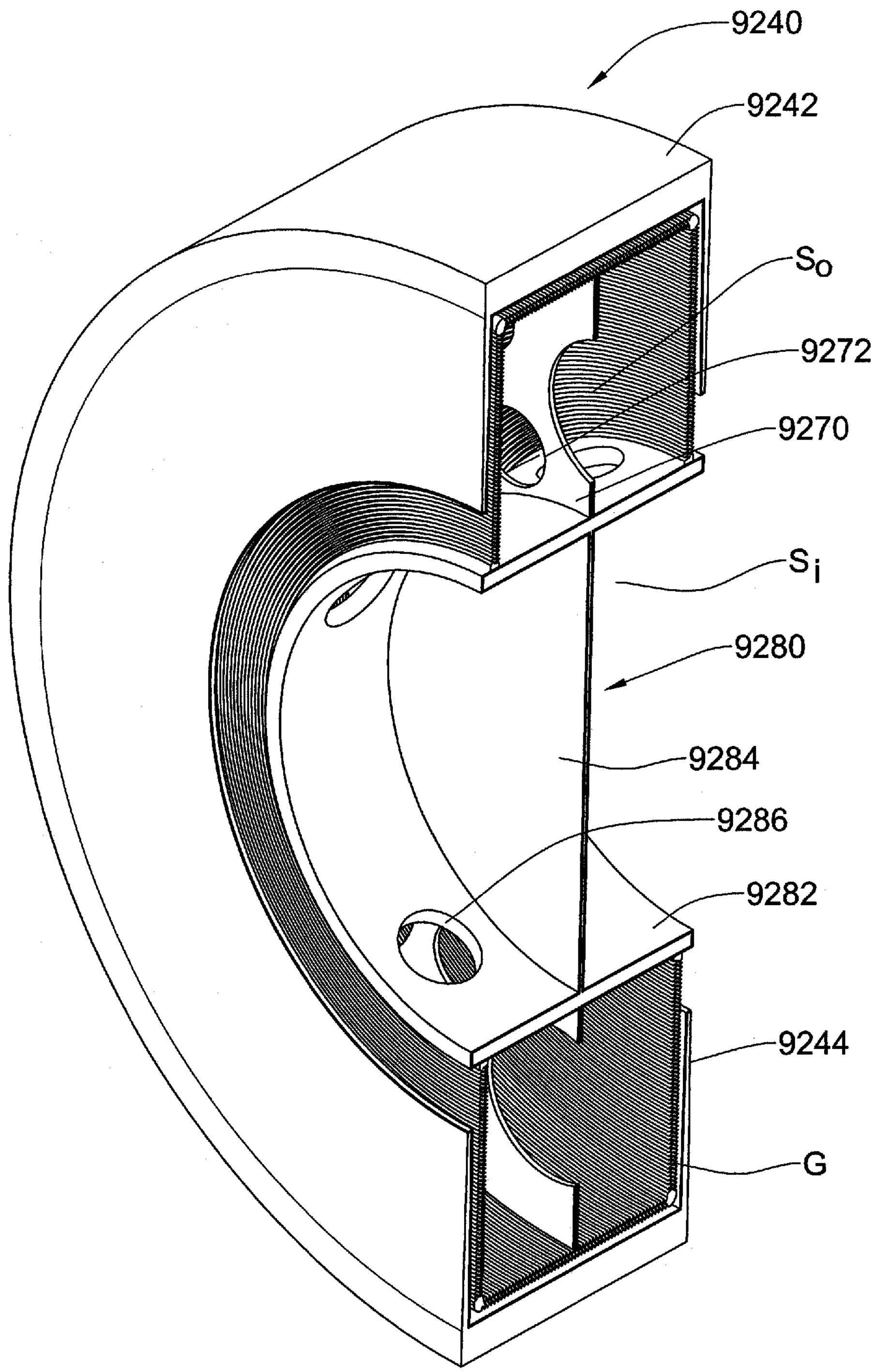
Figure 67B:
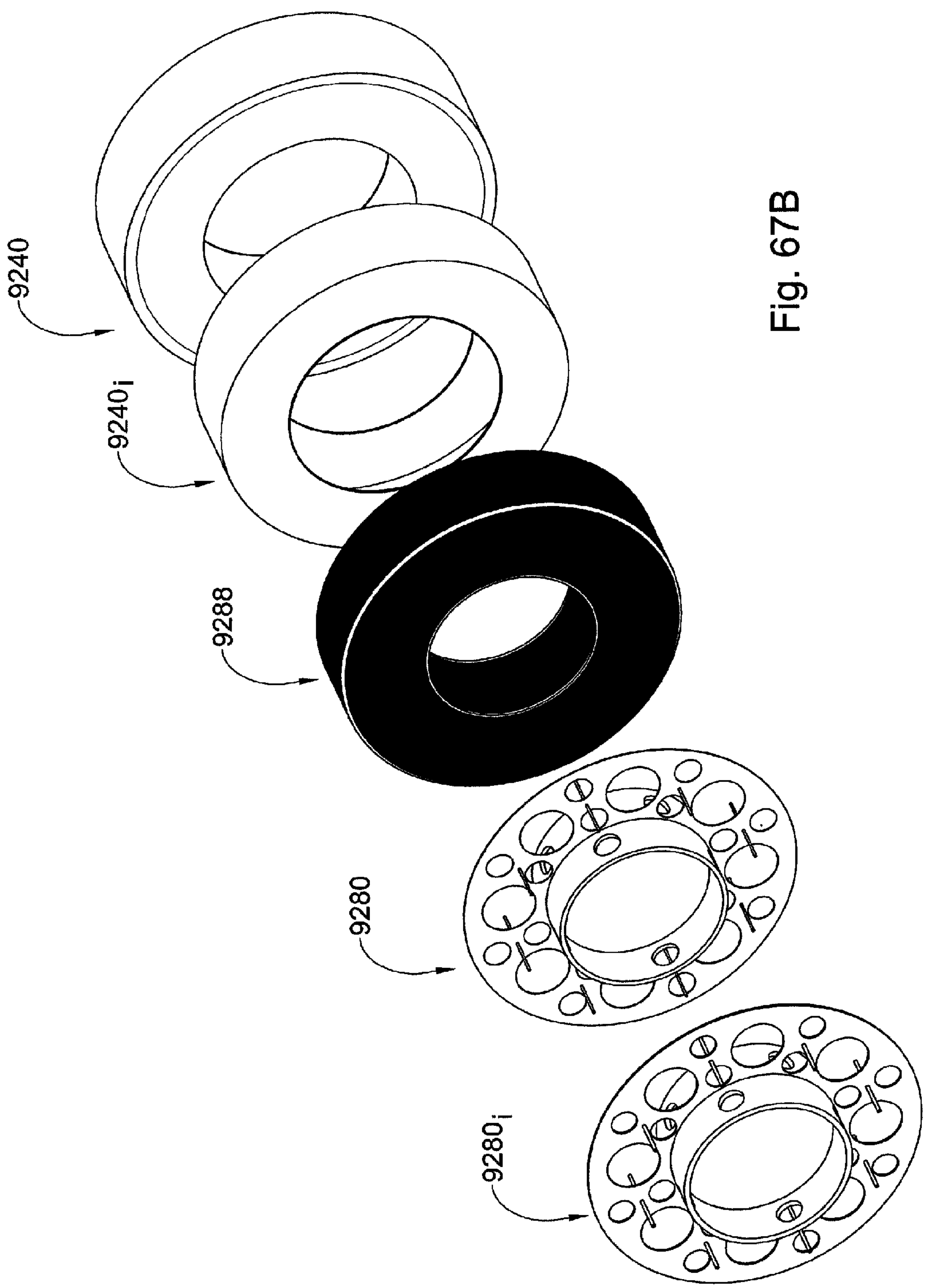
Figure 67C:
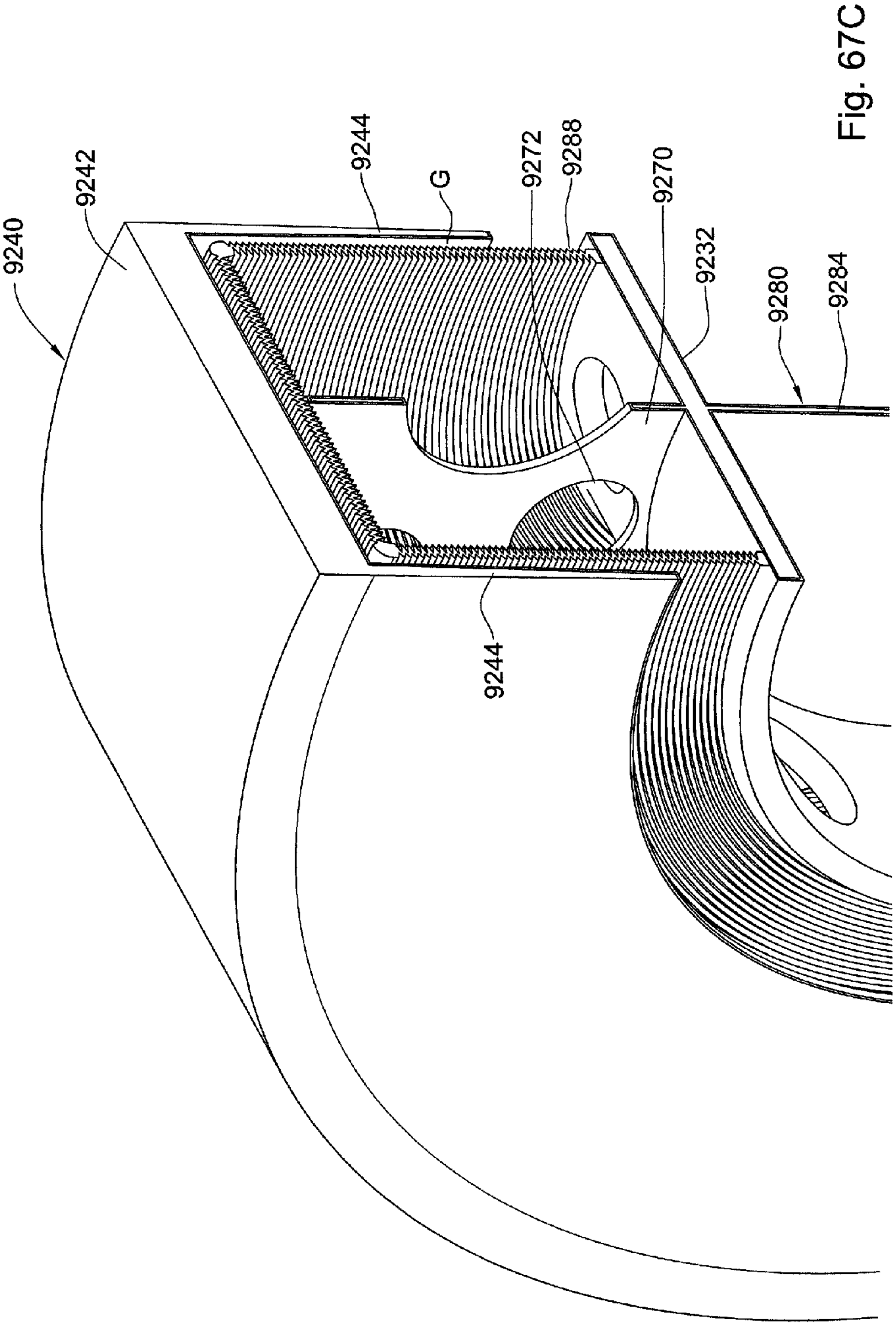
Figure 68A:
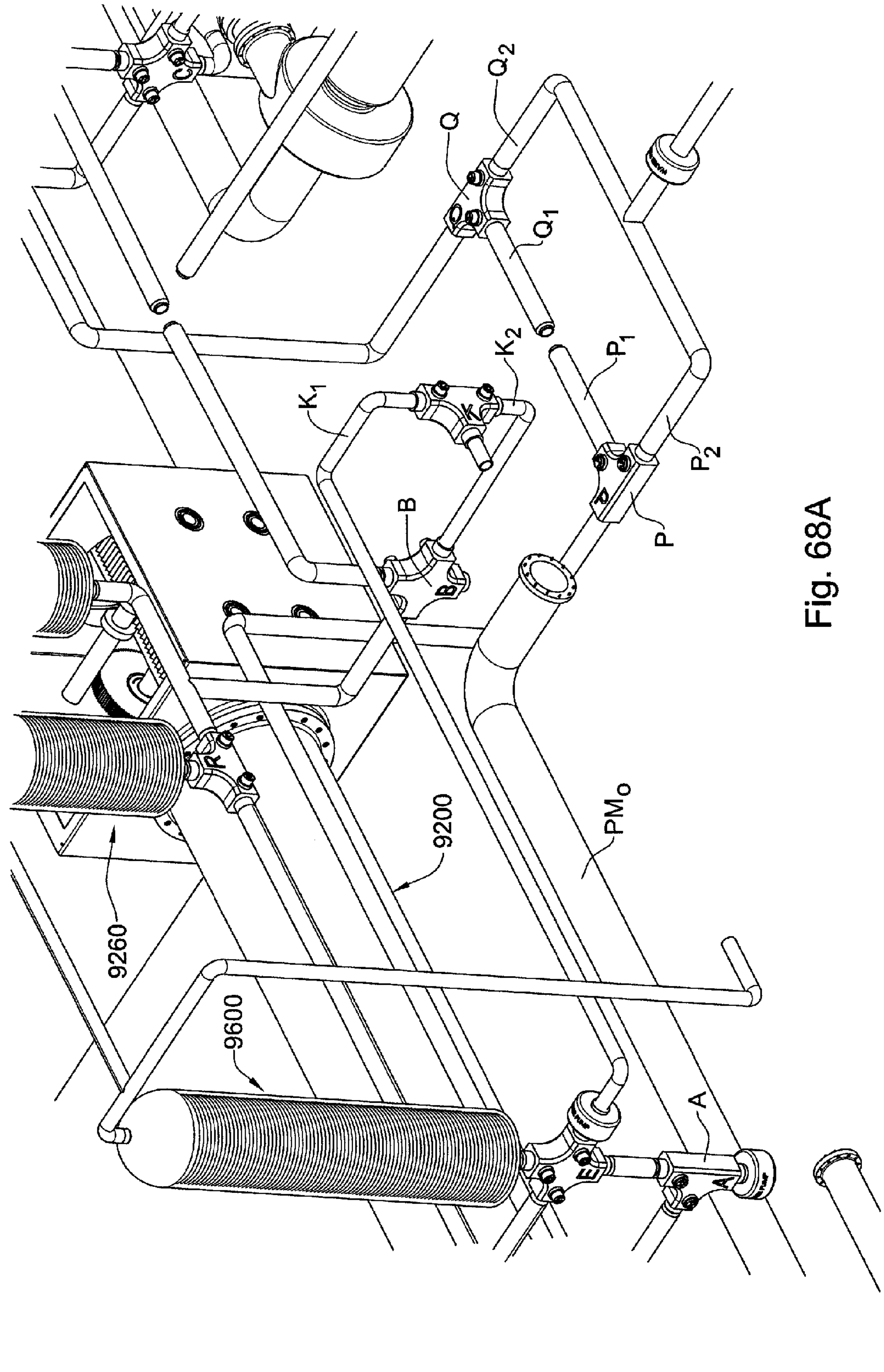
Figure 69:
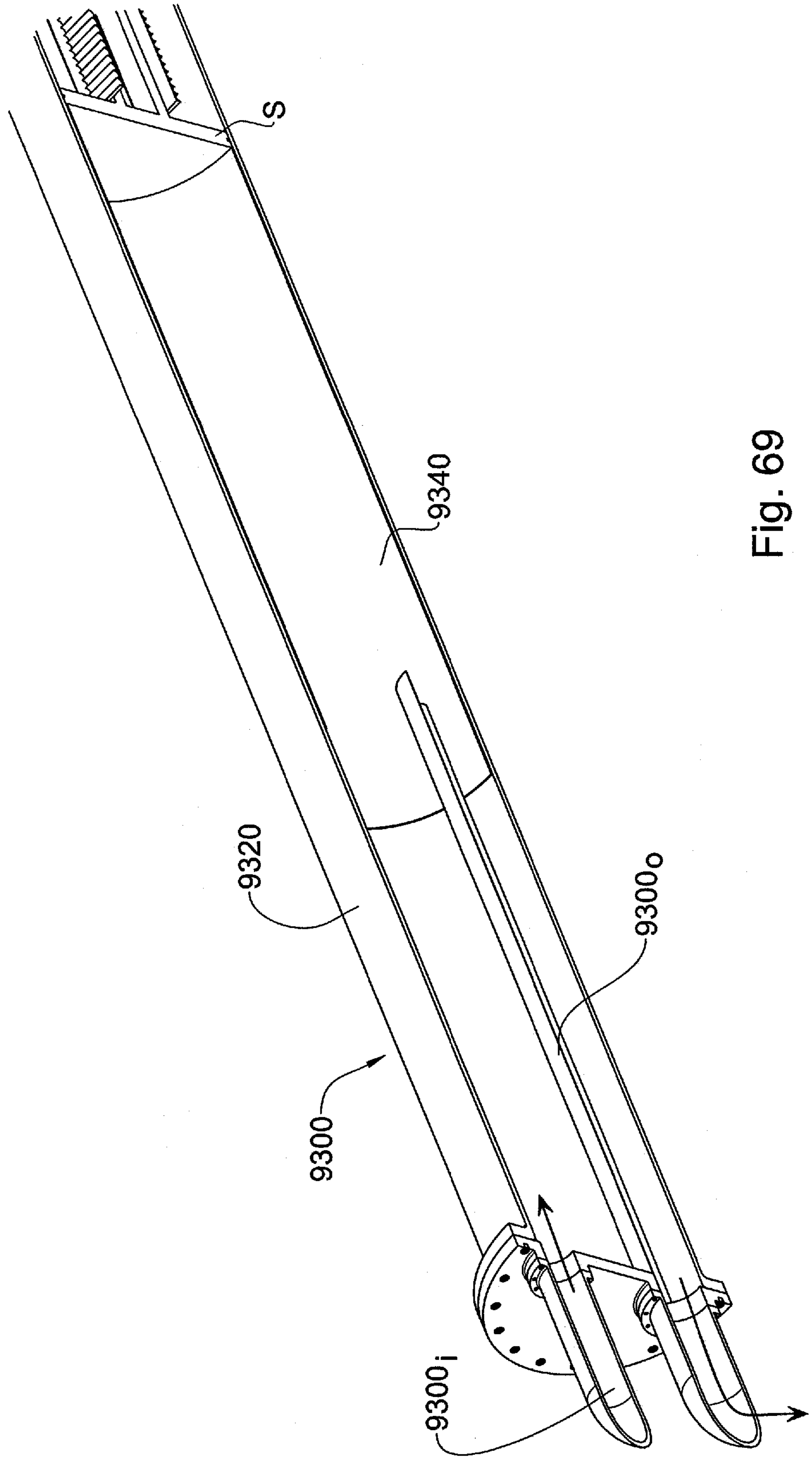
Figure 70A:
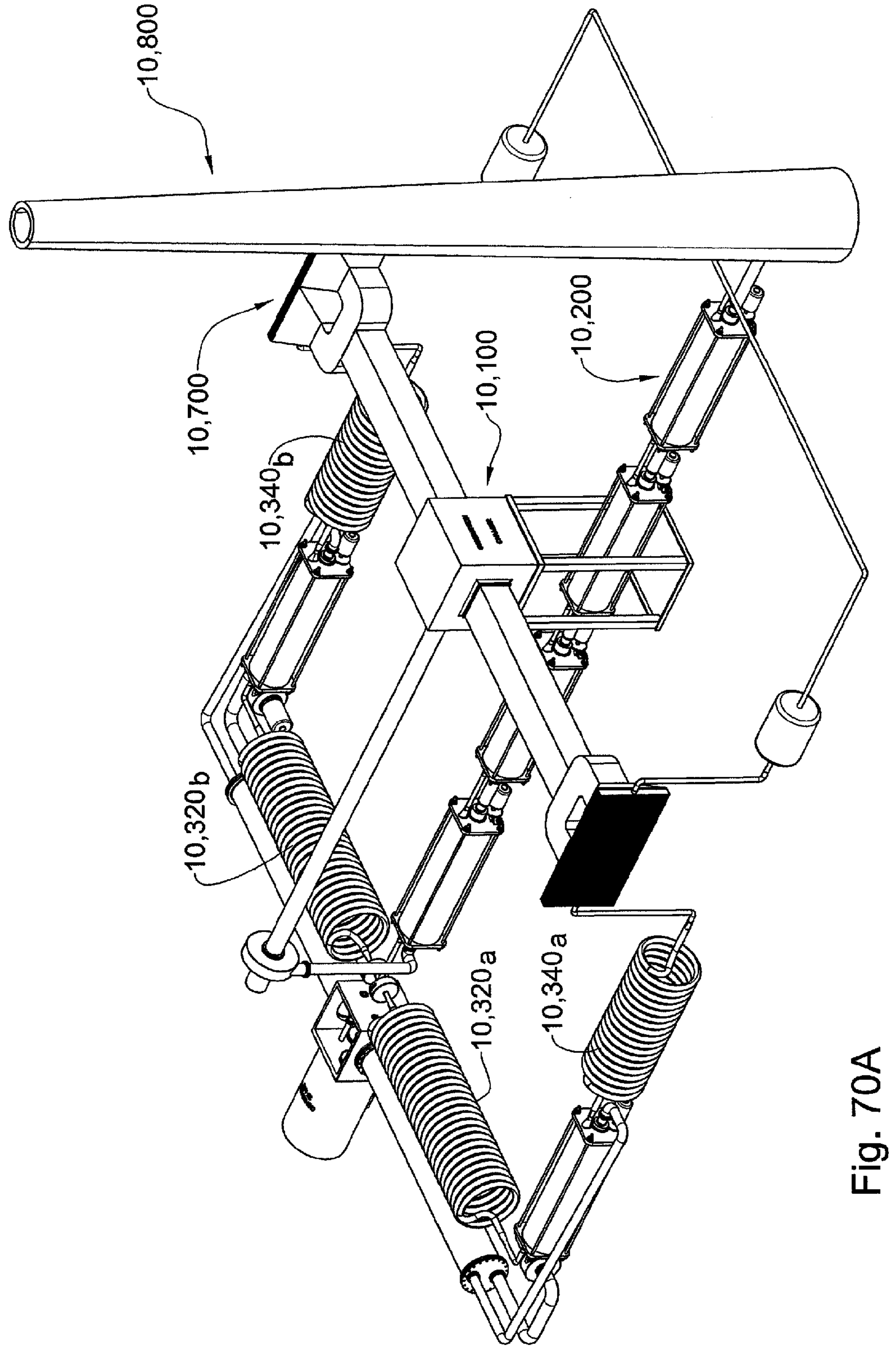
Figure 70B:
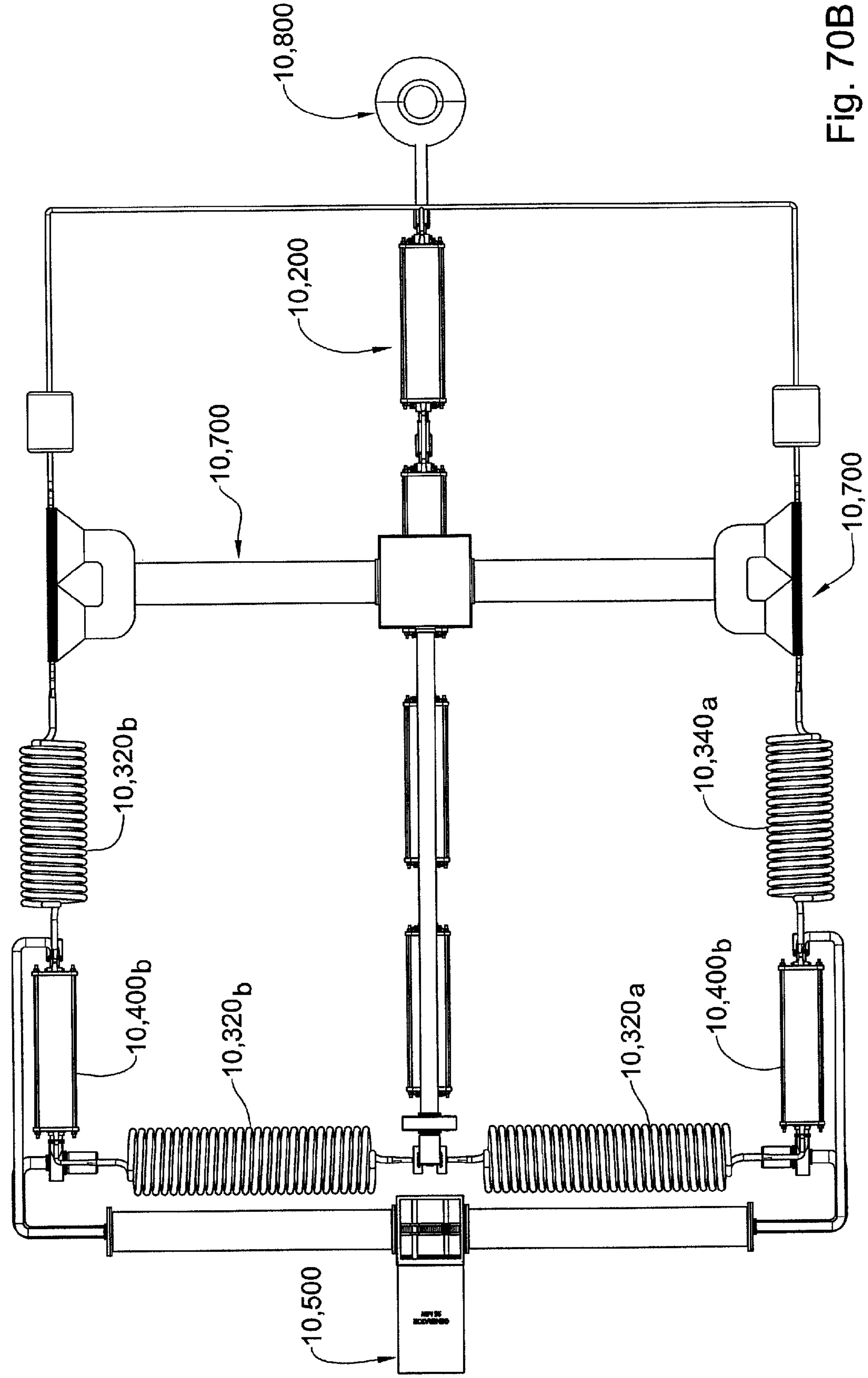
Figure 70C:
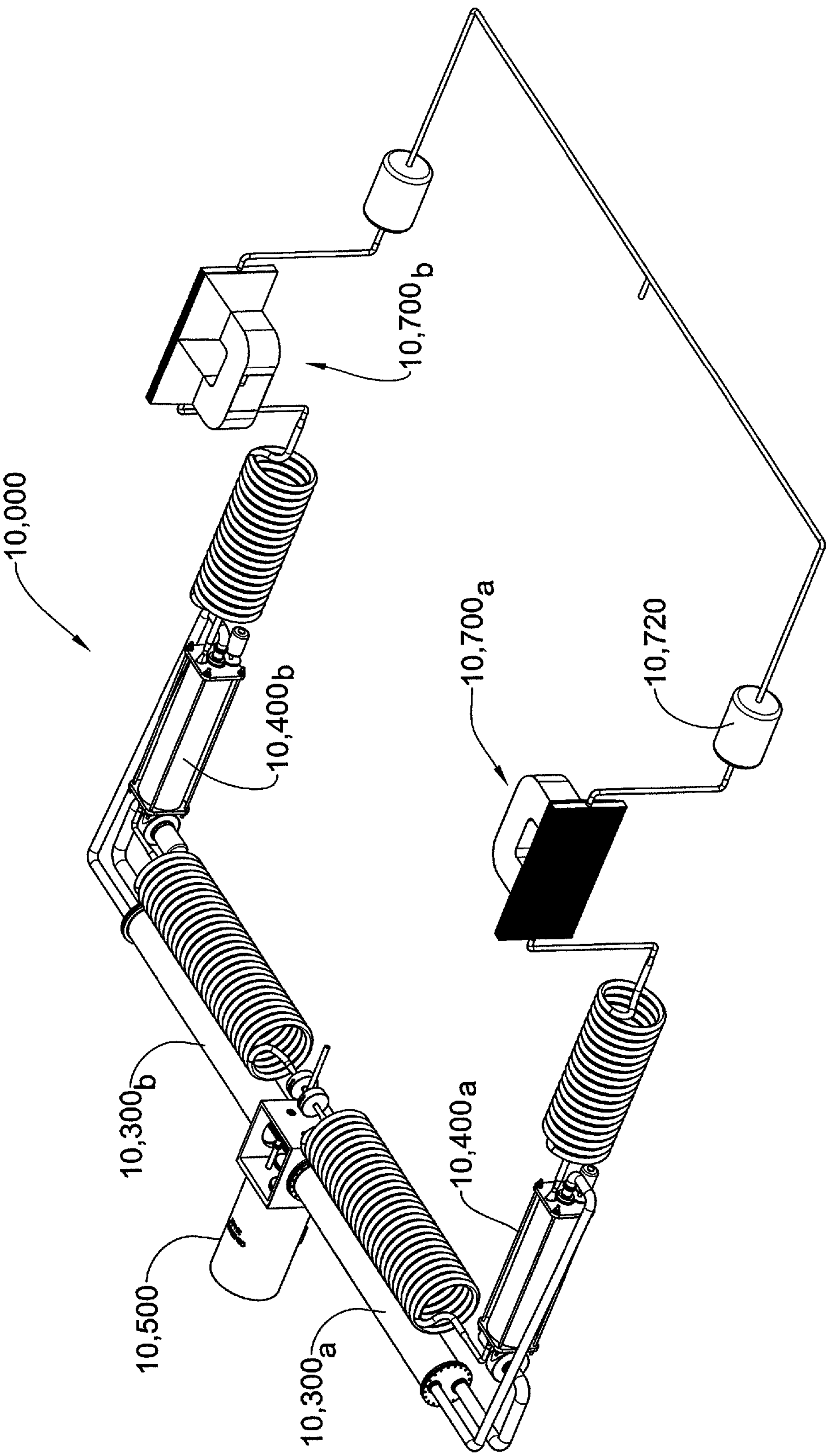
Figure 70D:
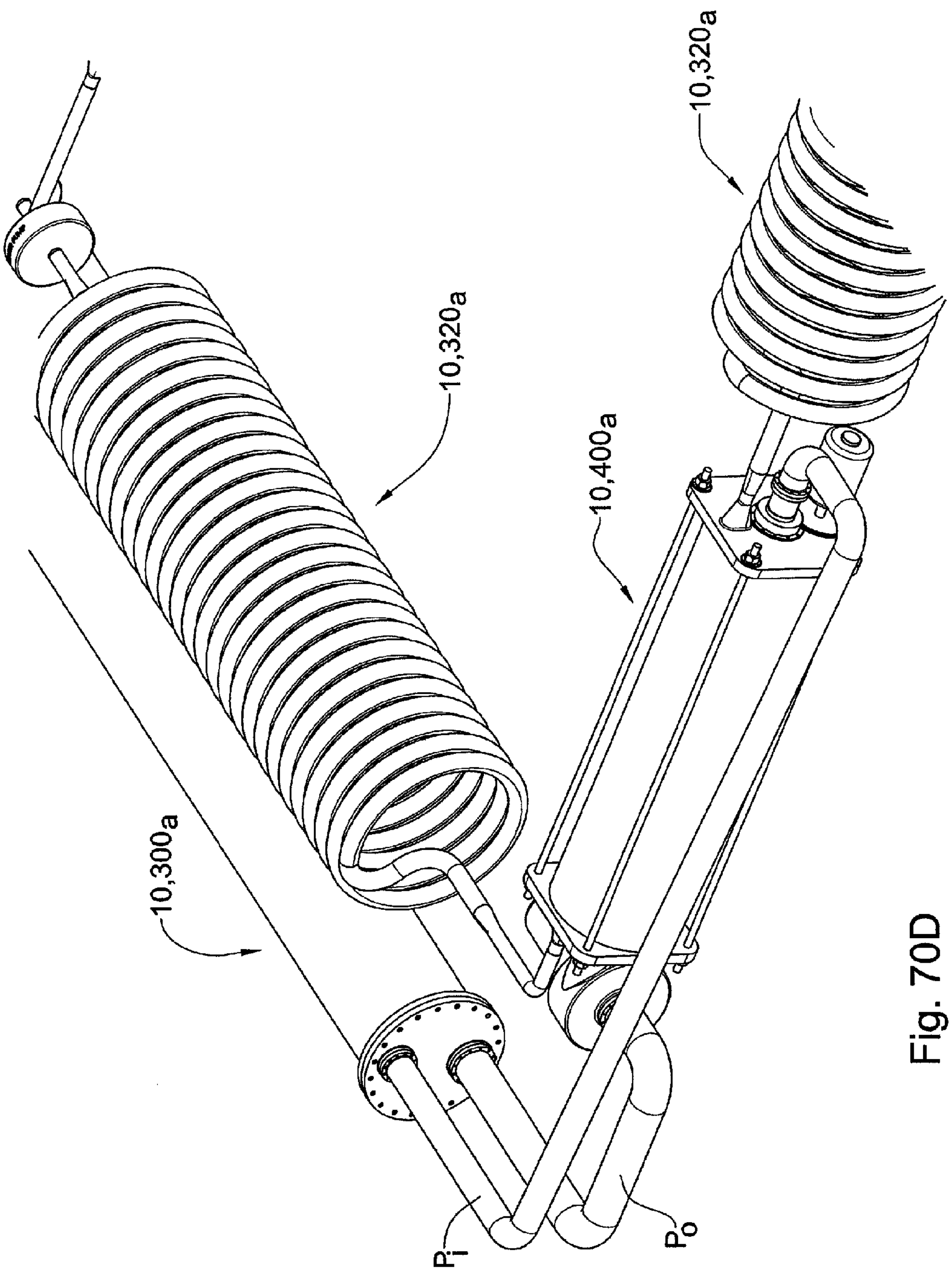
Figure 70E:
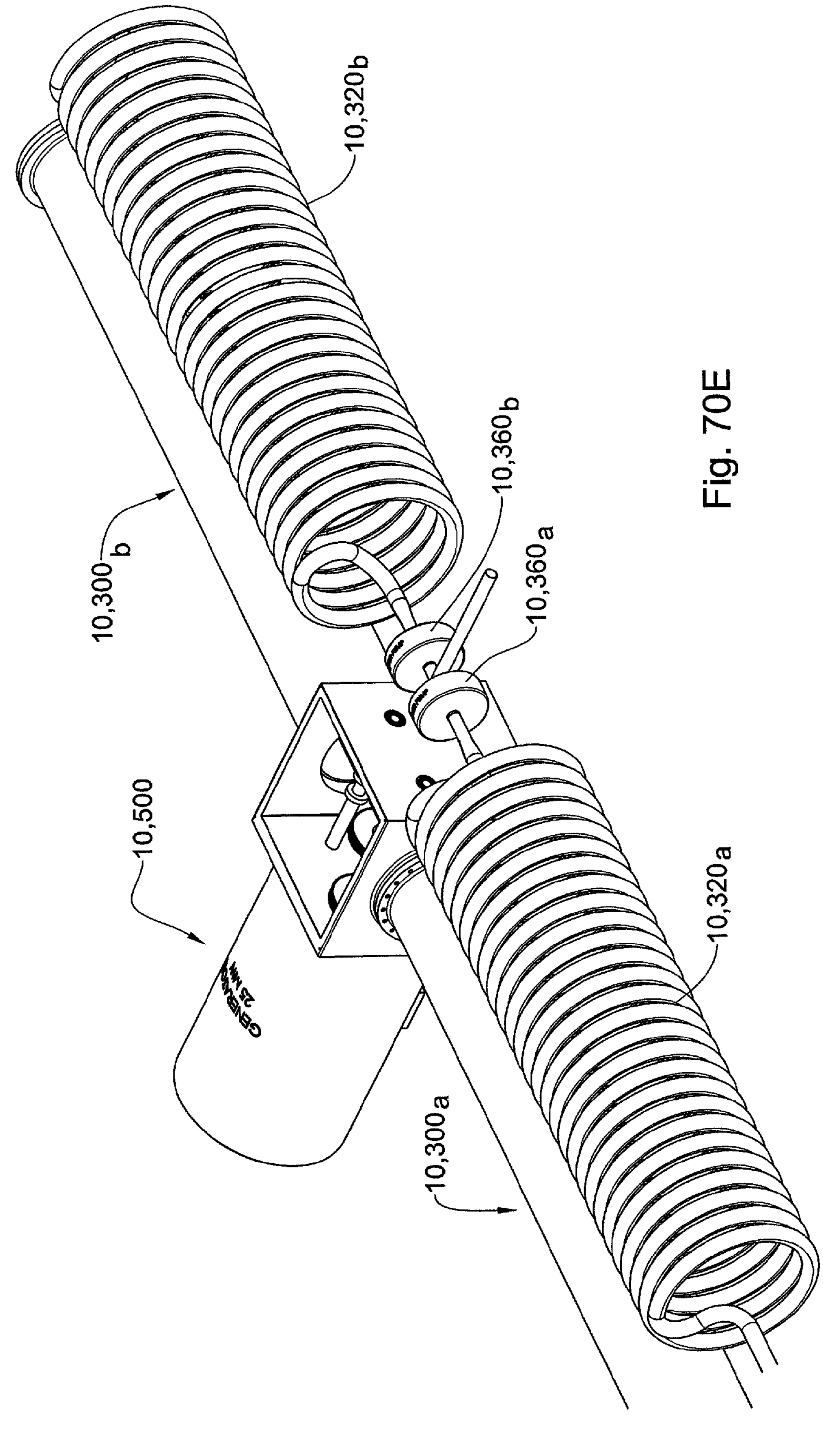
Figure 71A:
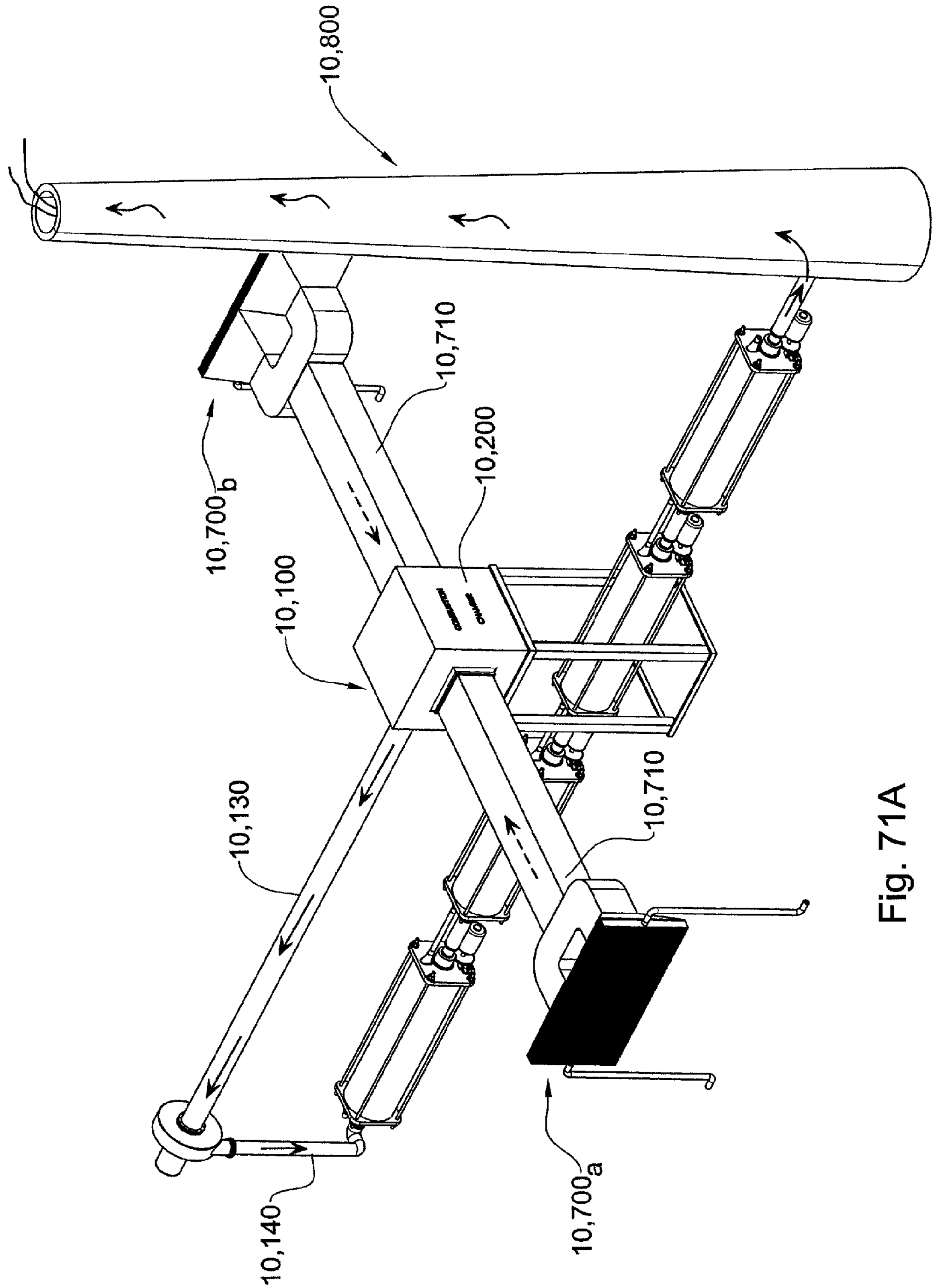
Figure 71B:
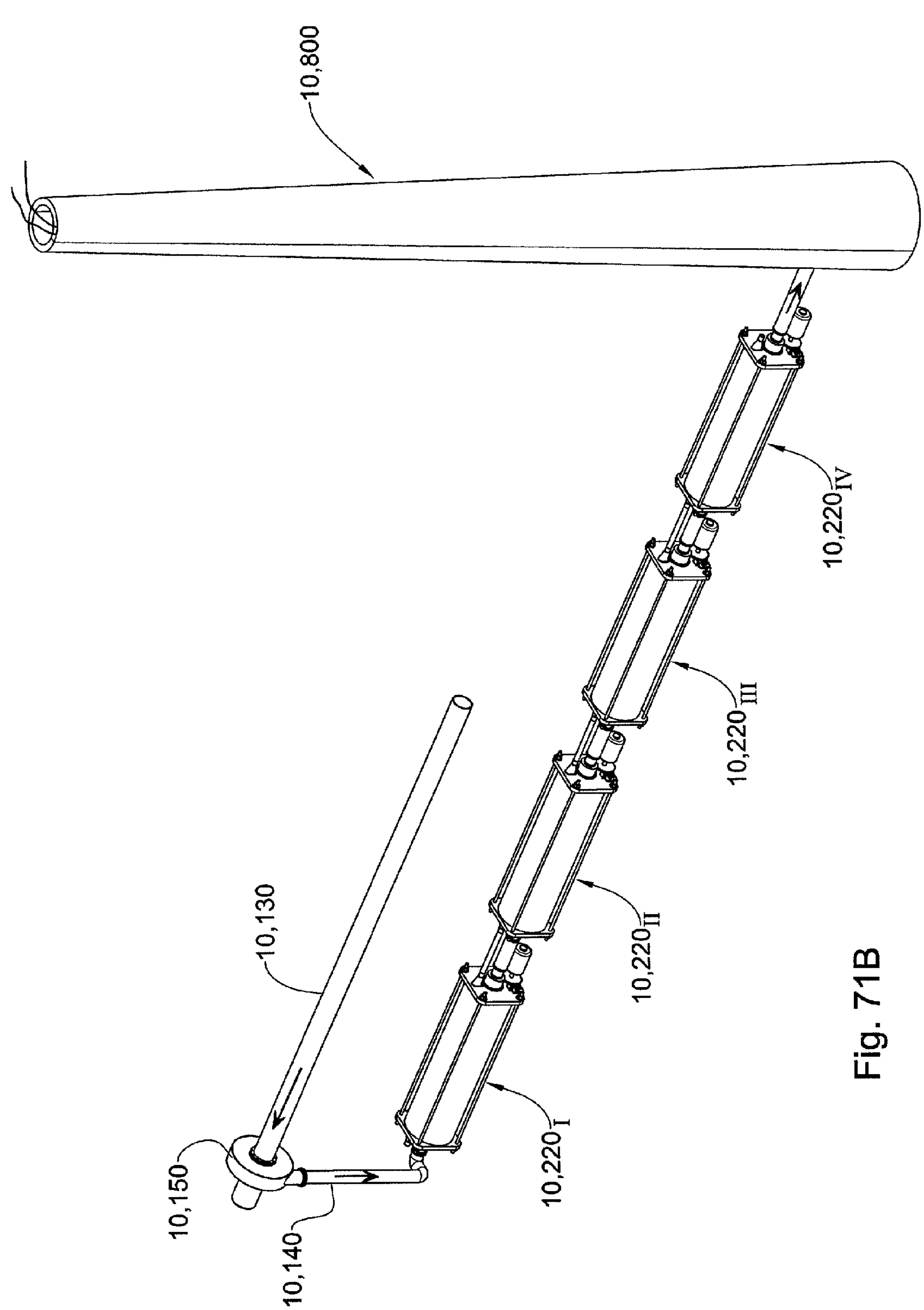
Figure 72A:
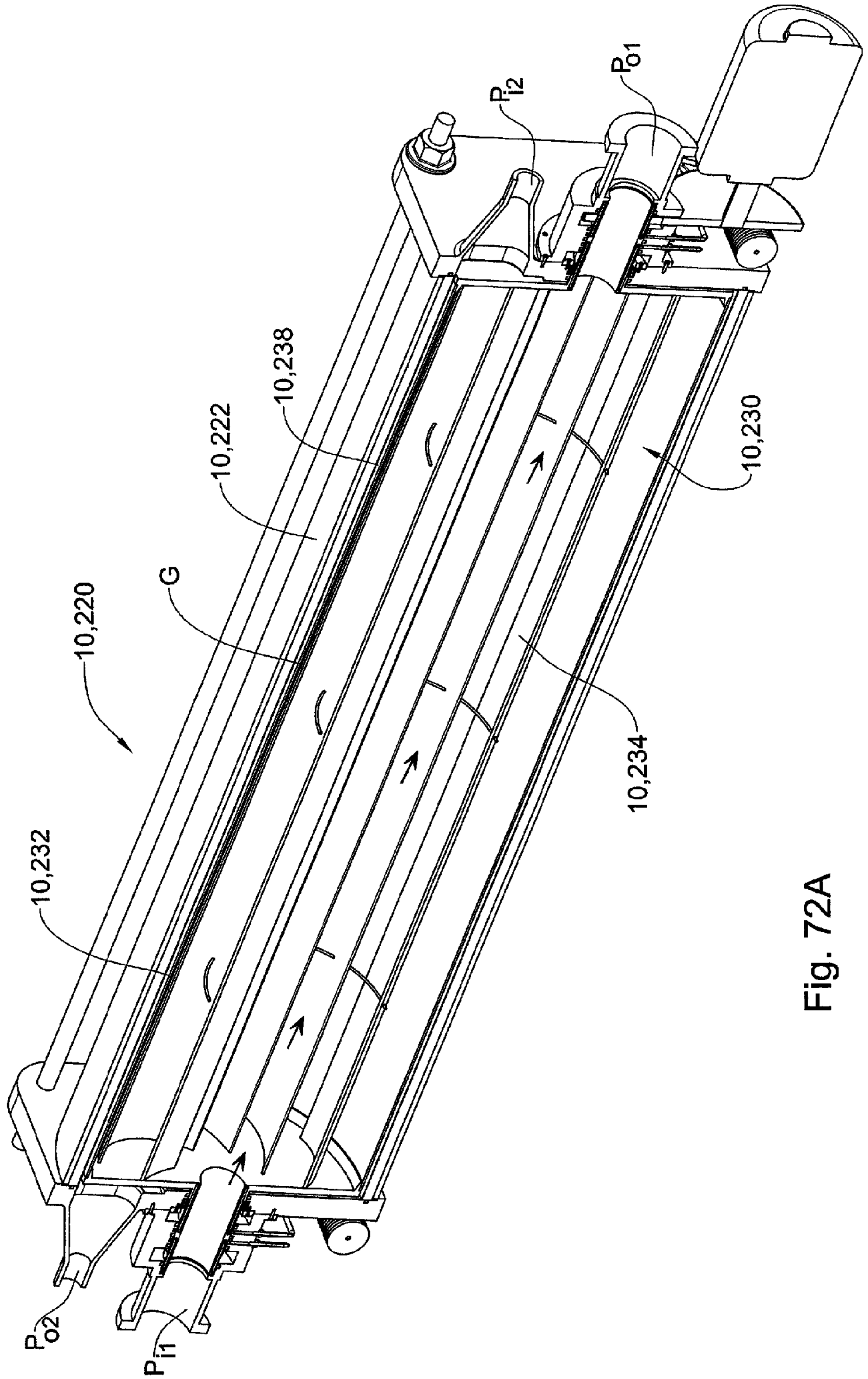
Figure 72B:
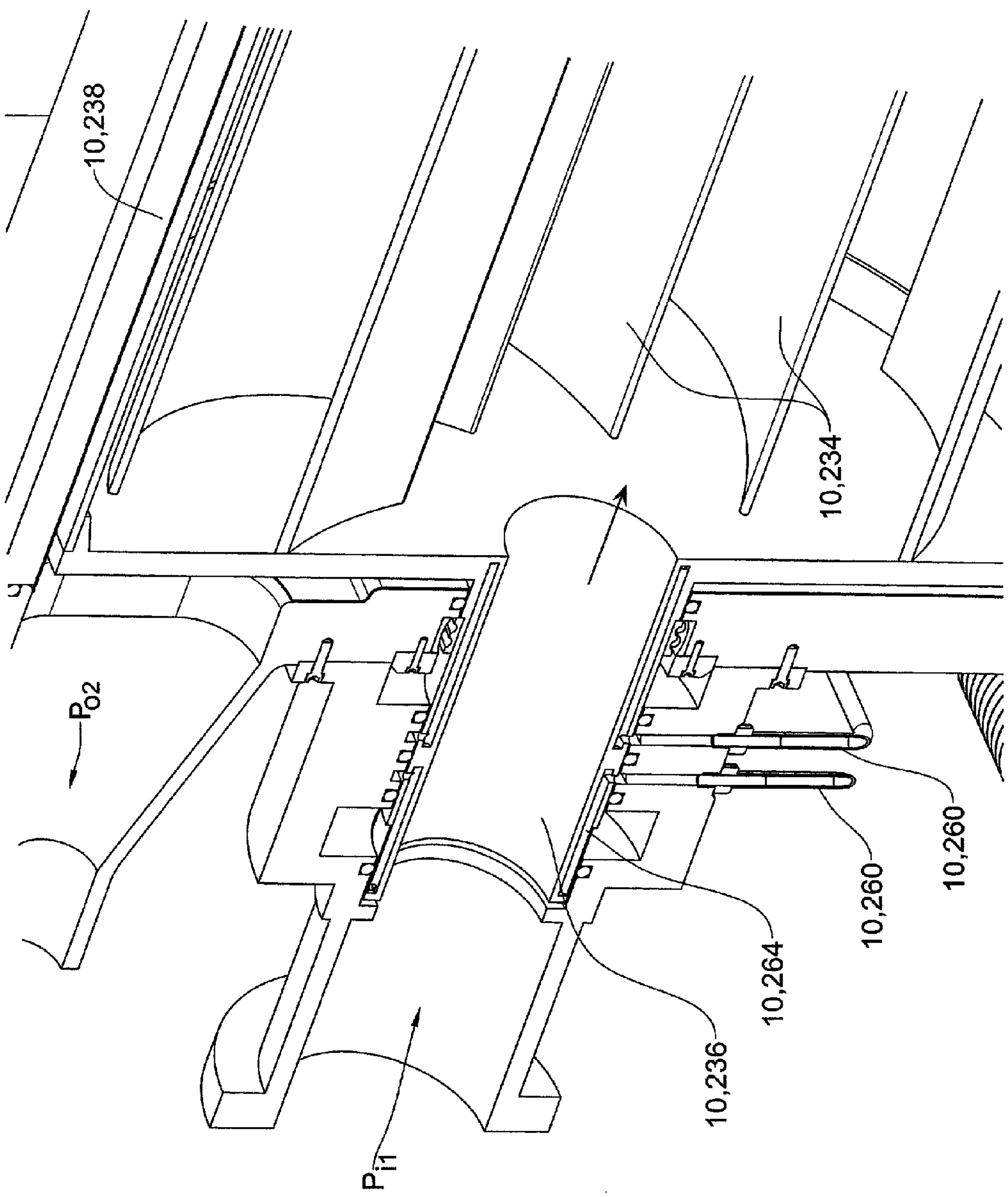
Figure 72C:
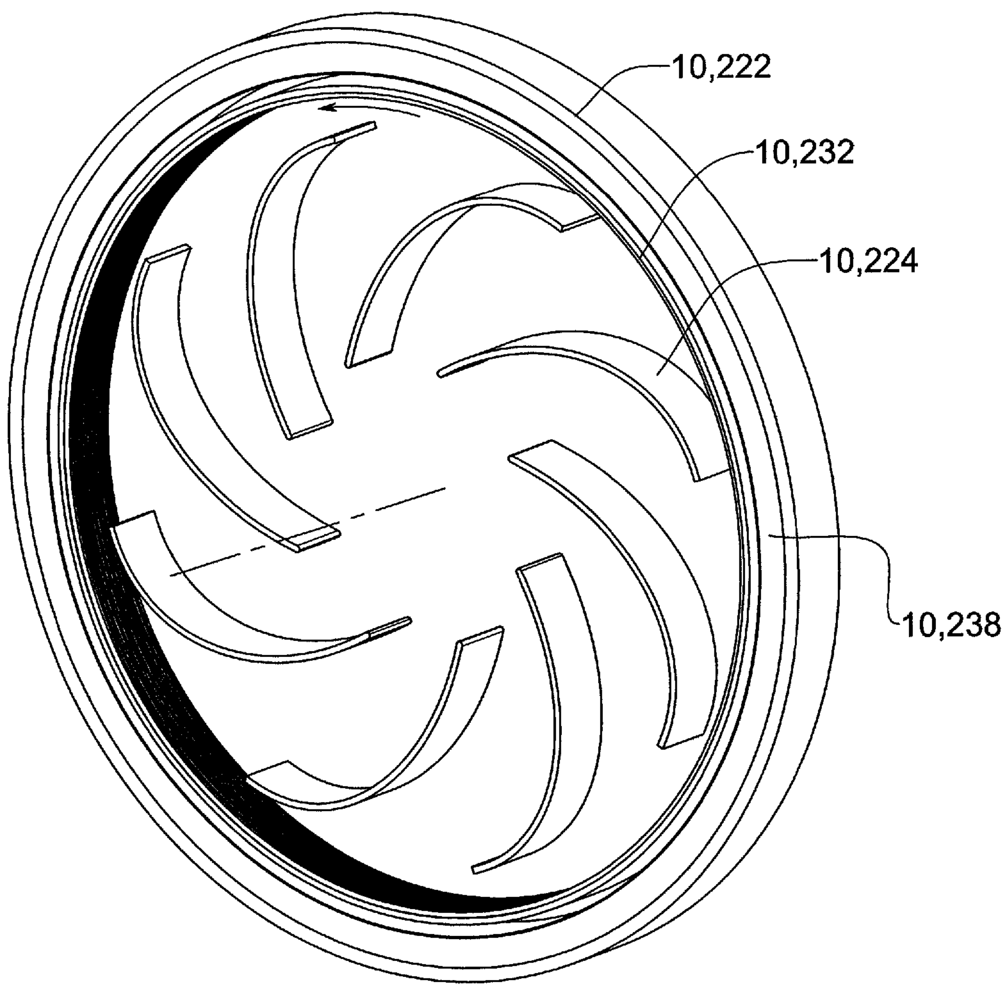
Figure 72D:
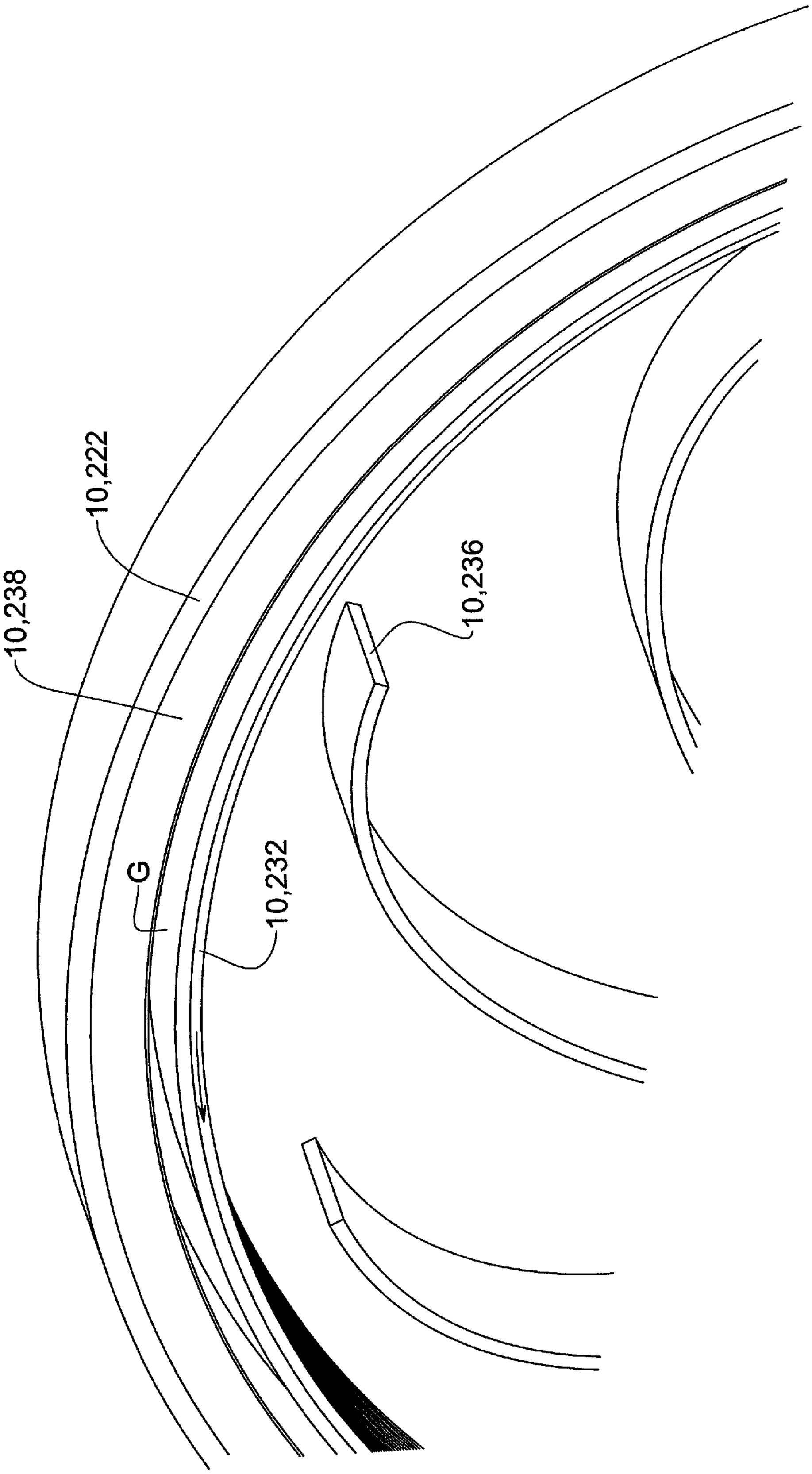
Figure 73A:
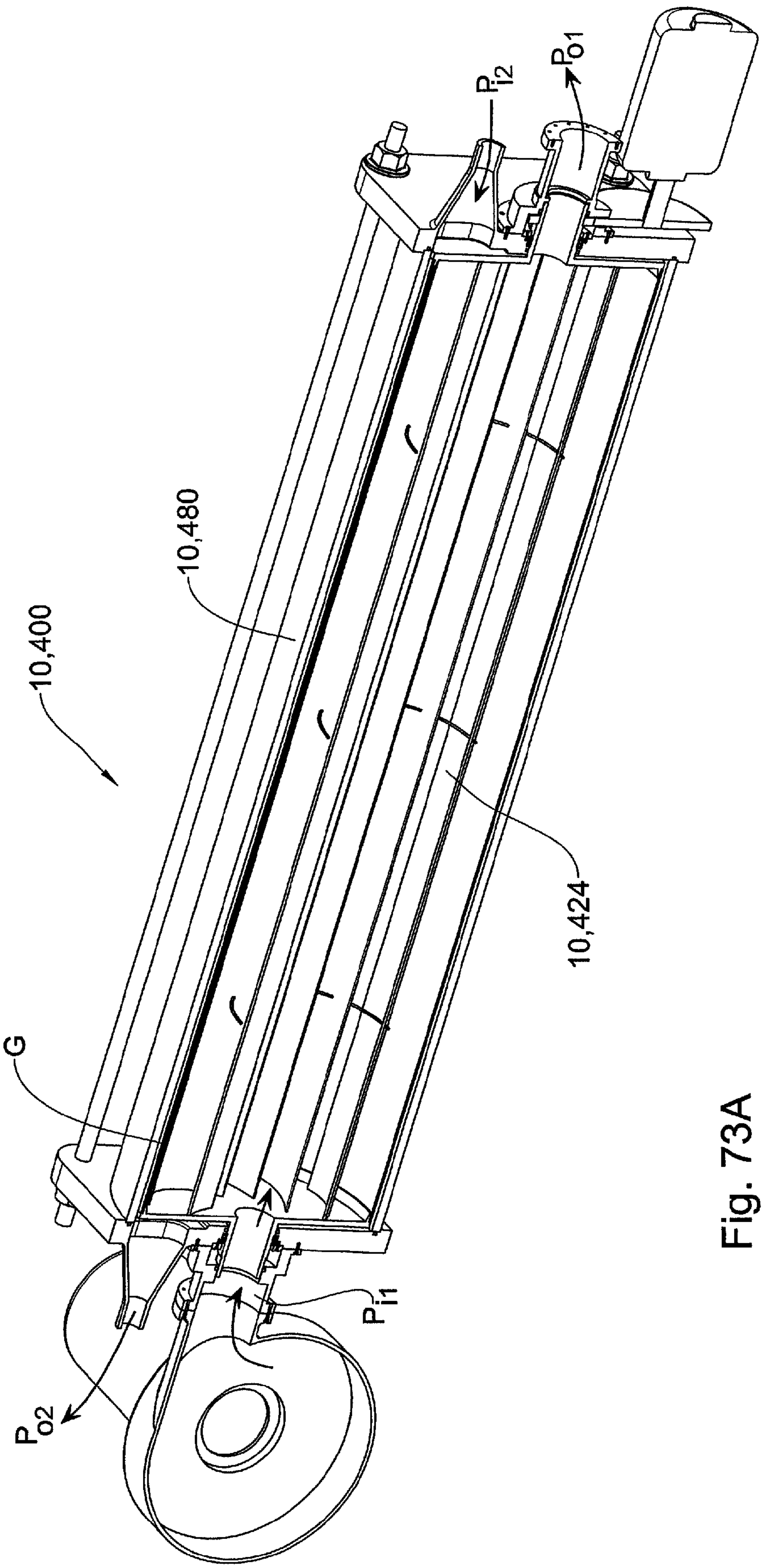
Figure 73B:
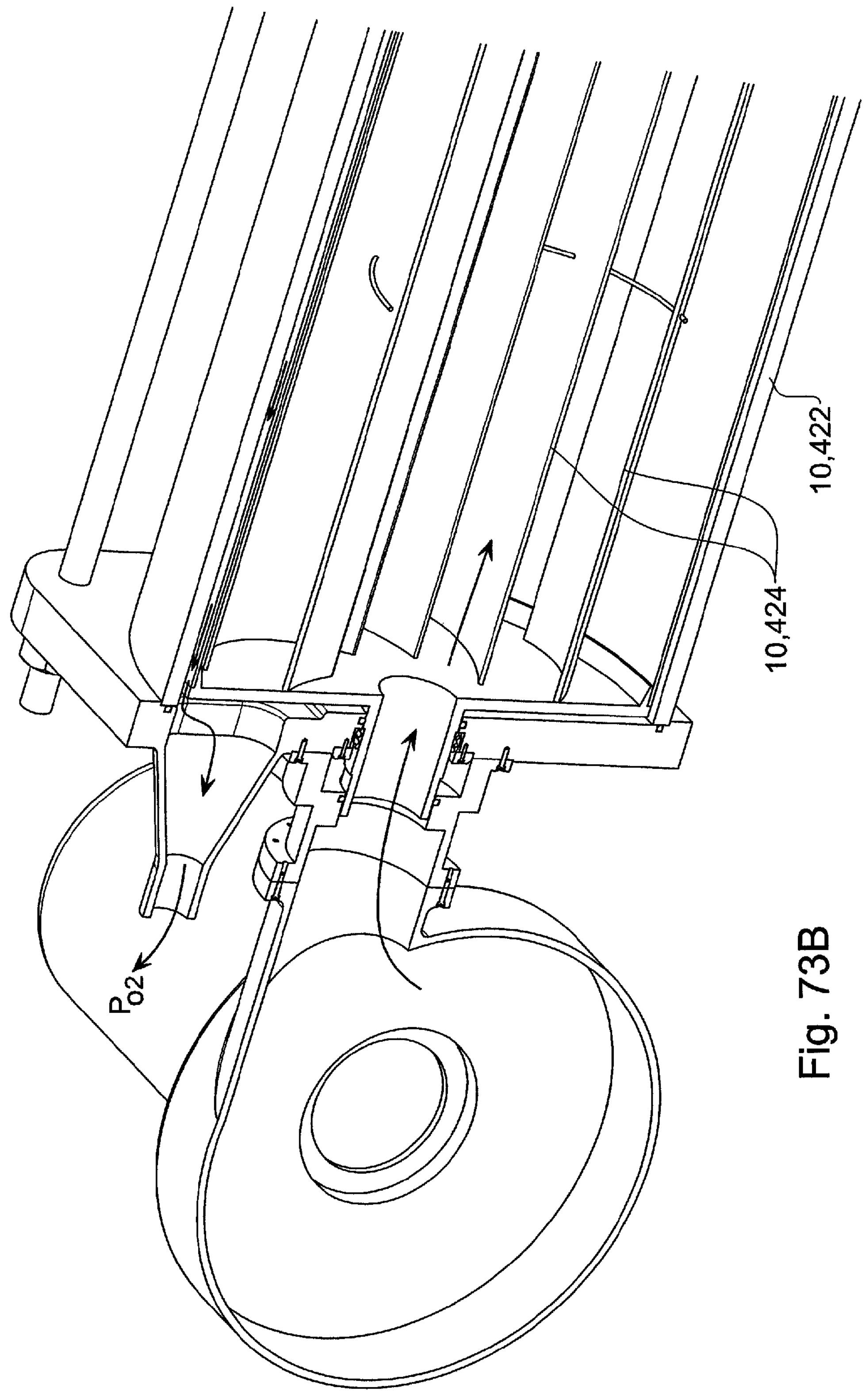
Figure 73C:
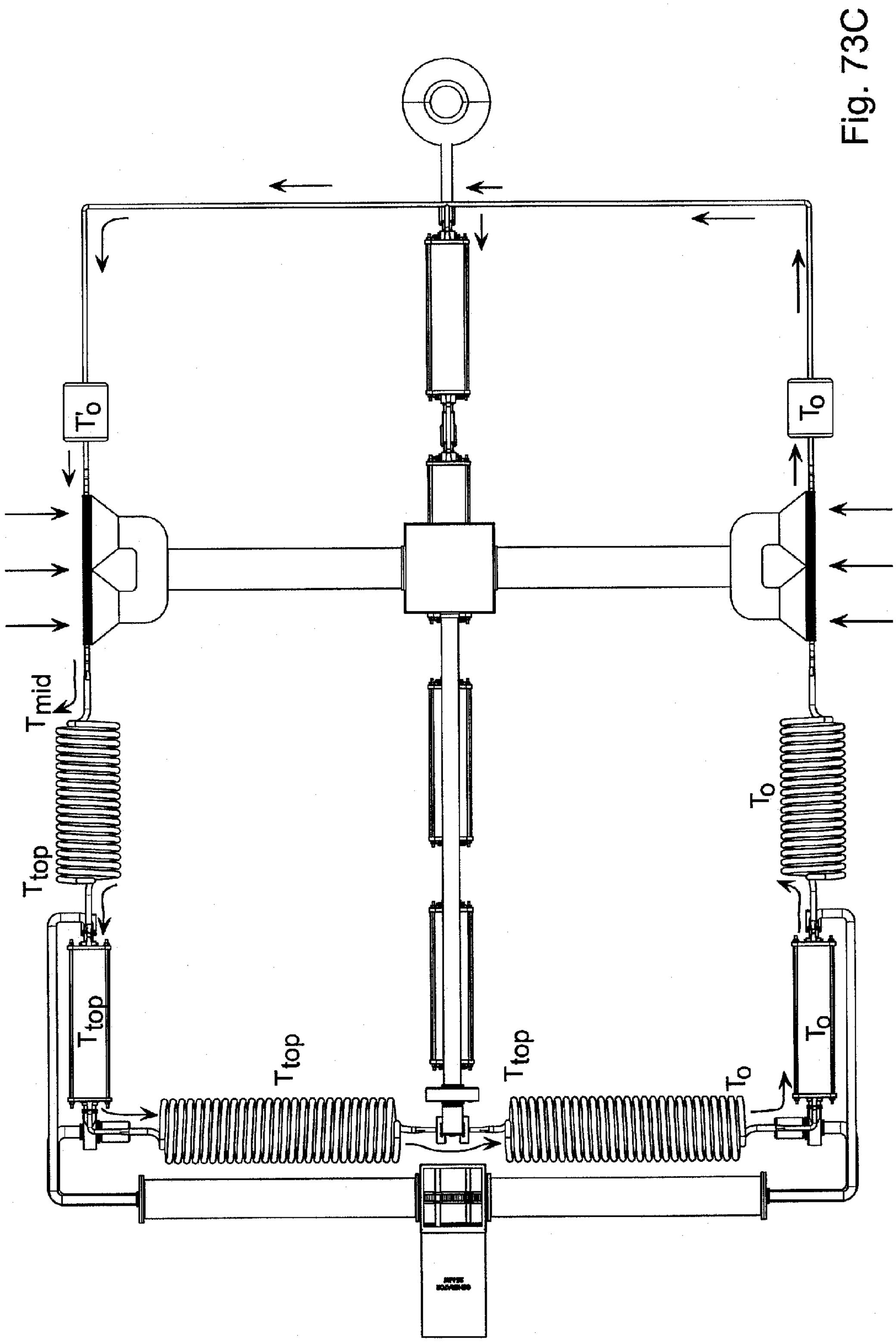
Figure 73D:
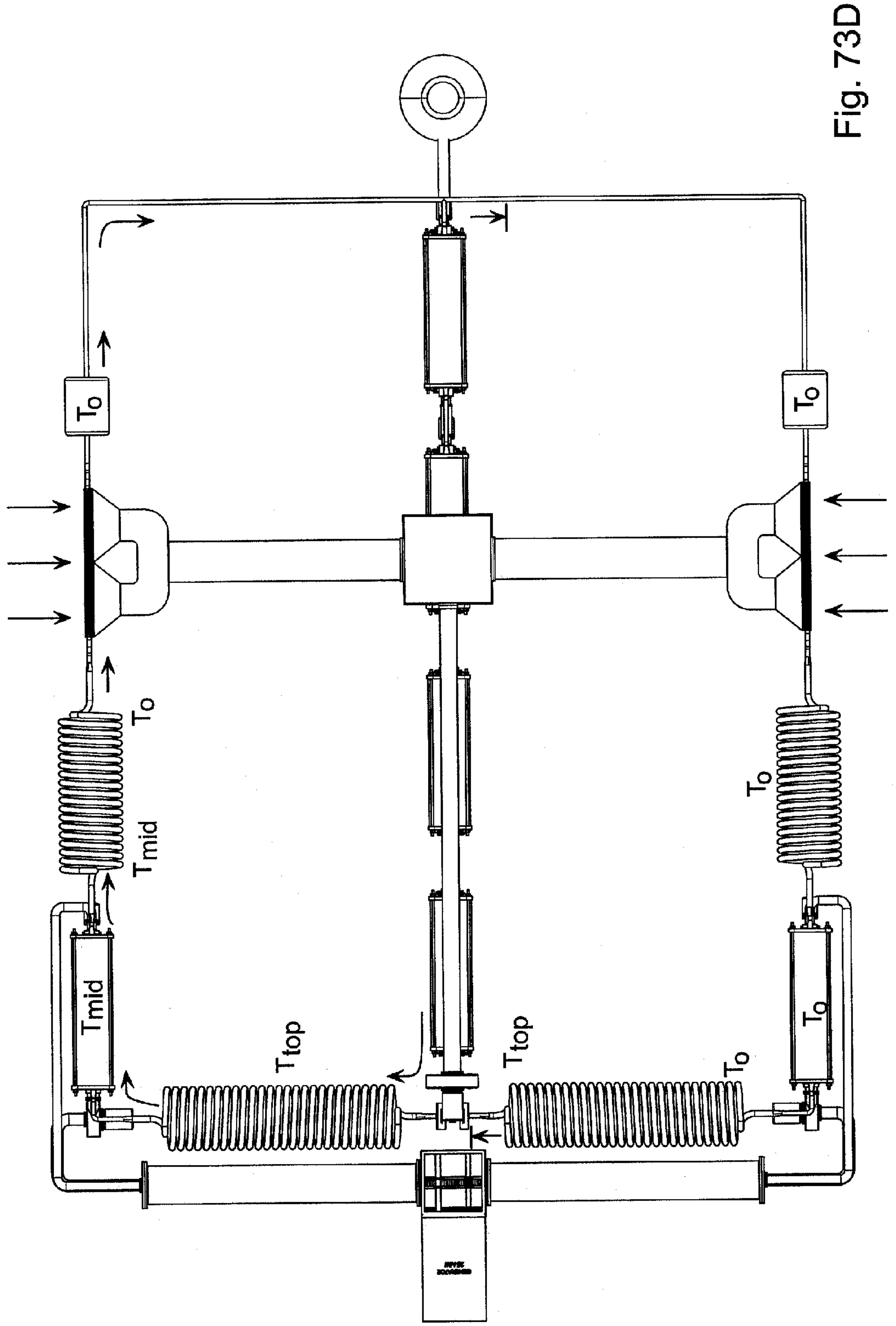
Figure 73E:
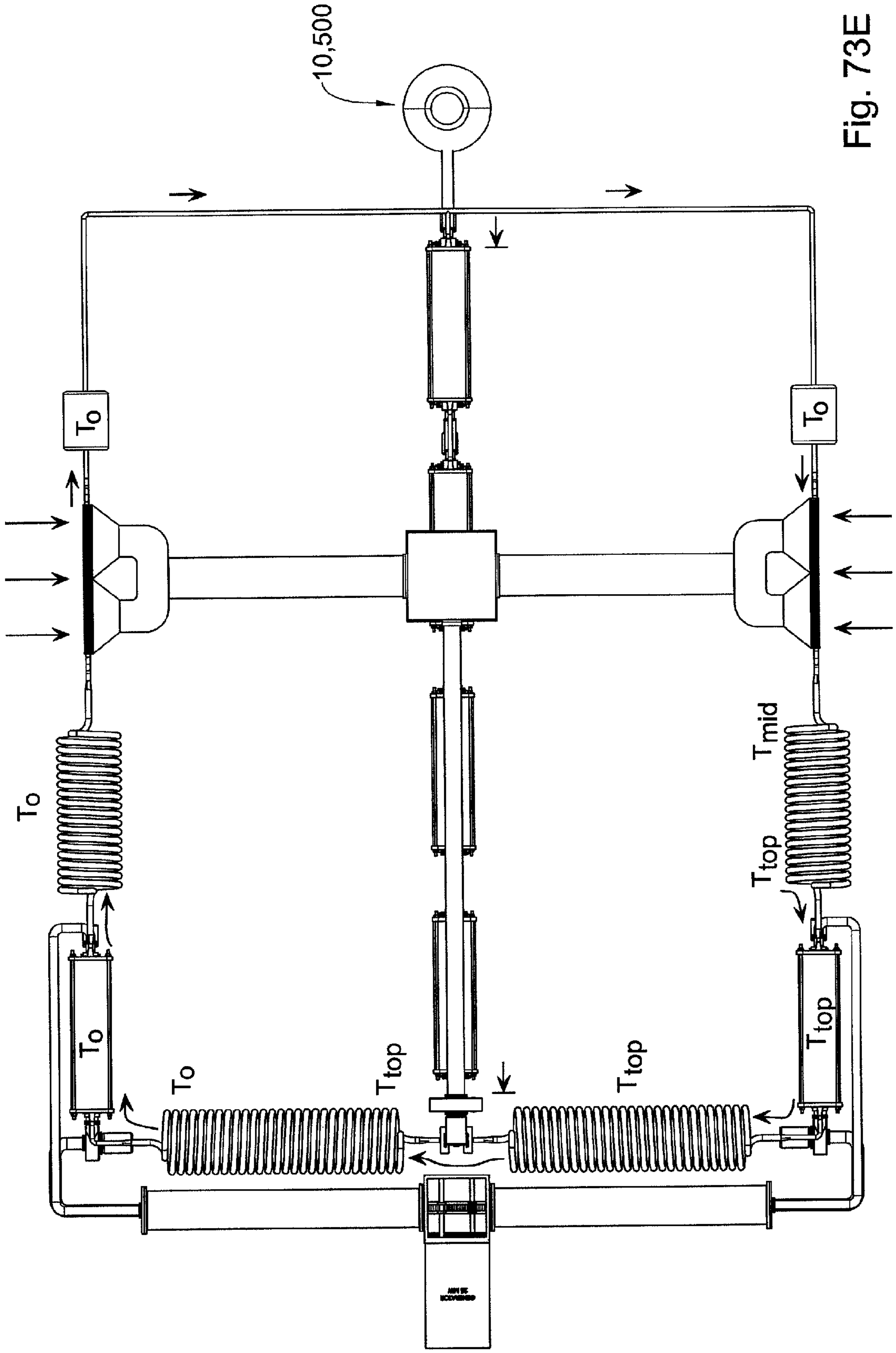
Figure 73F:
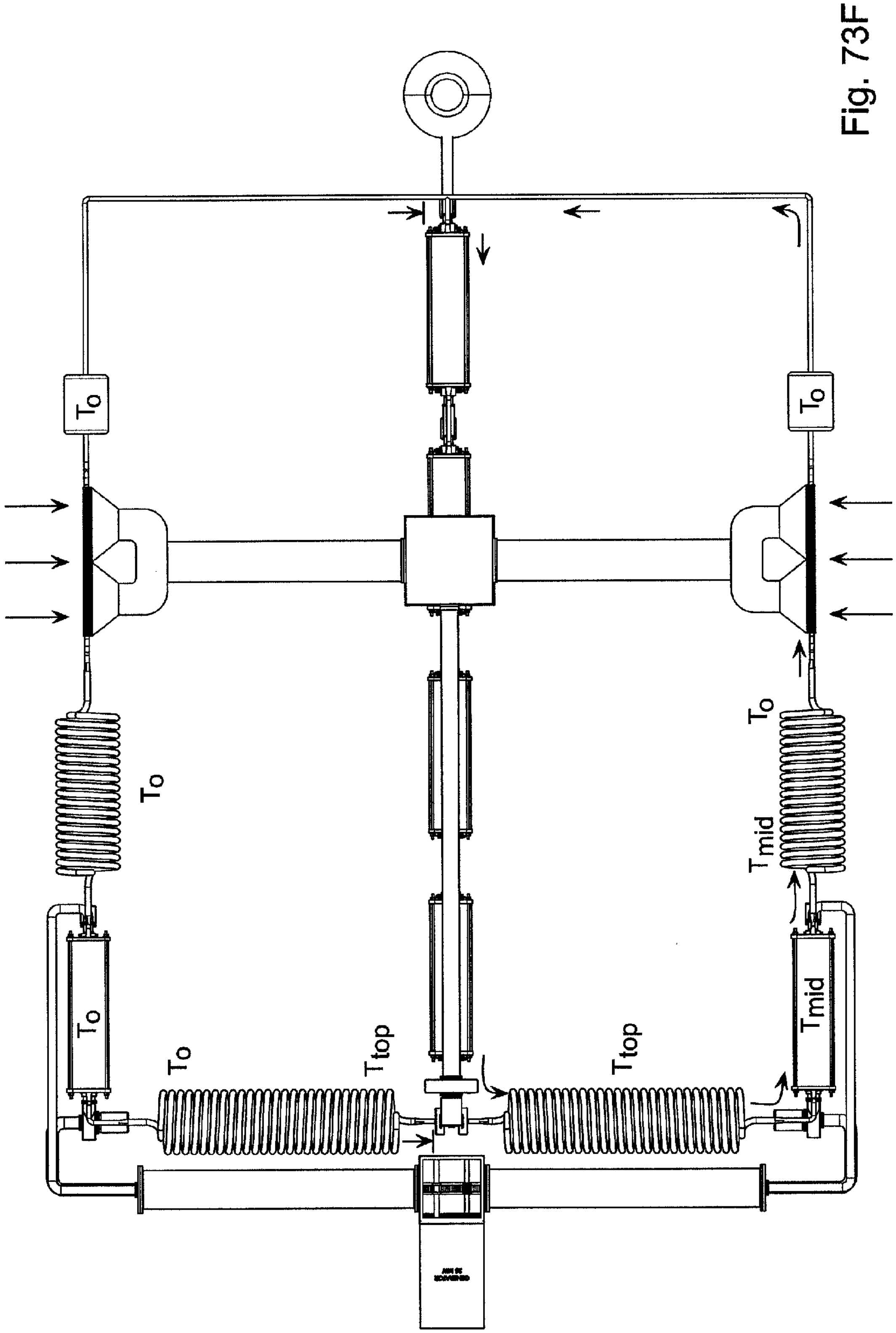
Figure 74A:
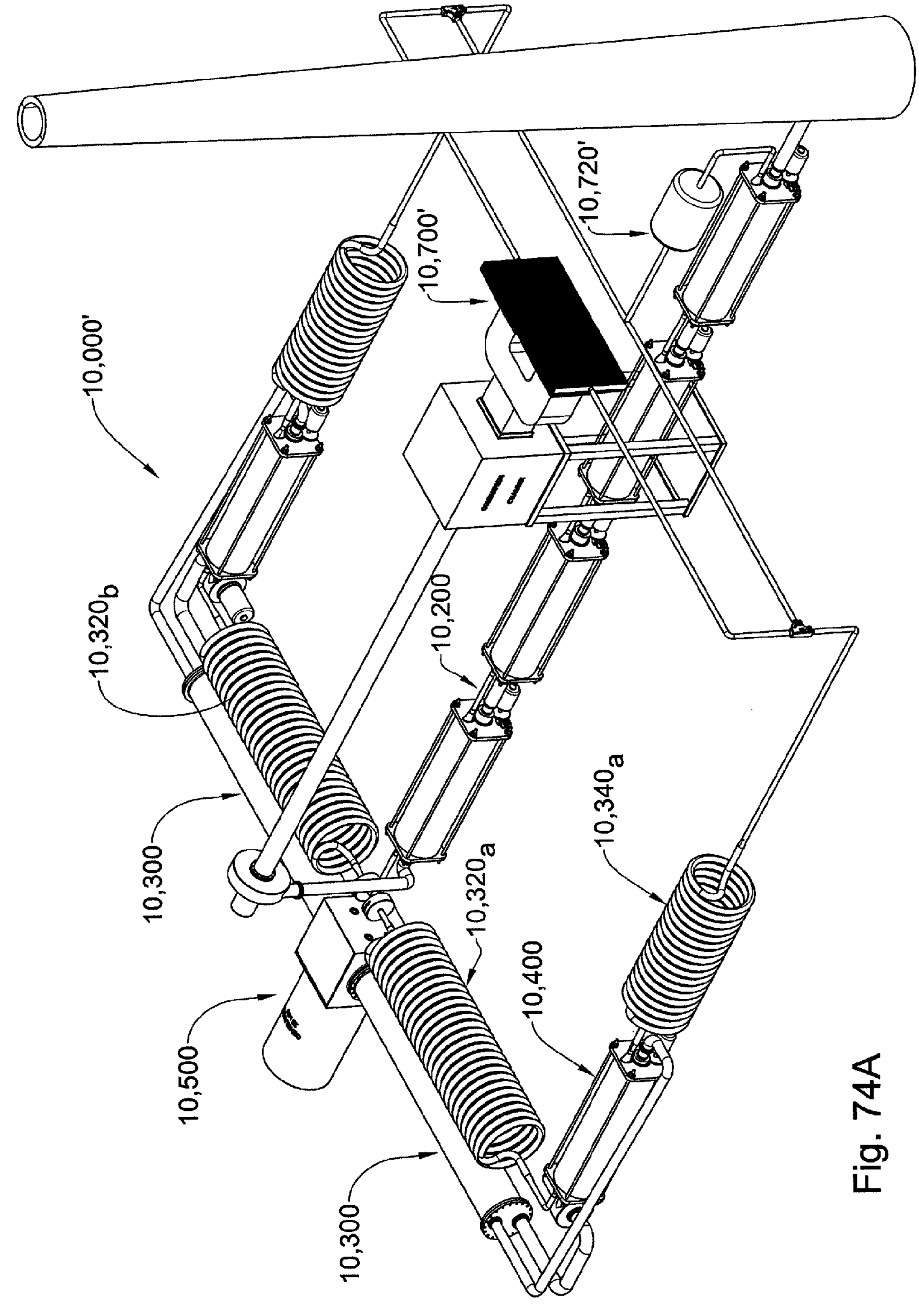
Figure 74B:
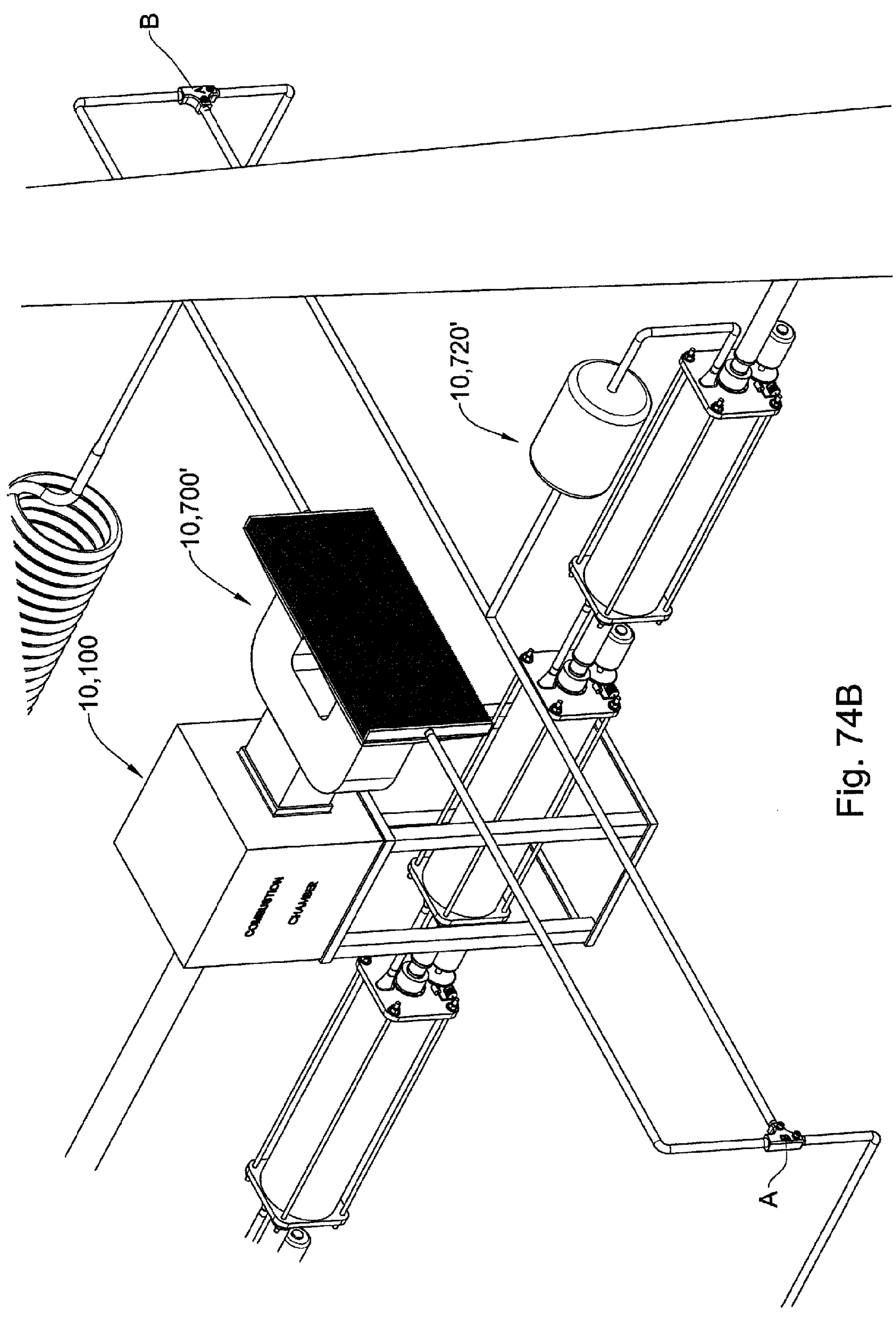
Figure 75A:
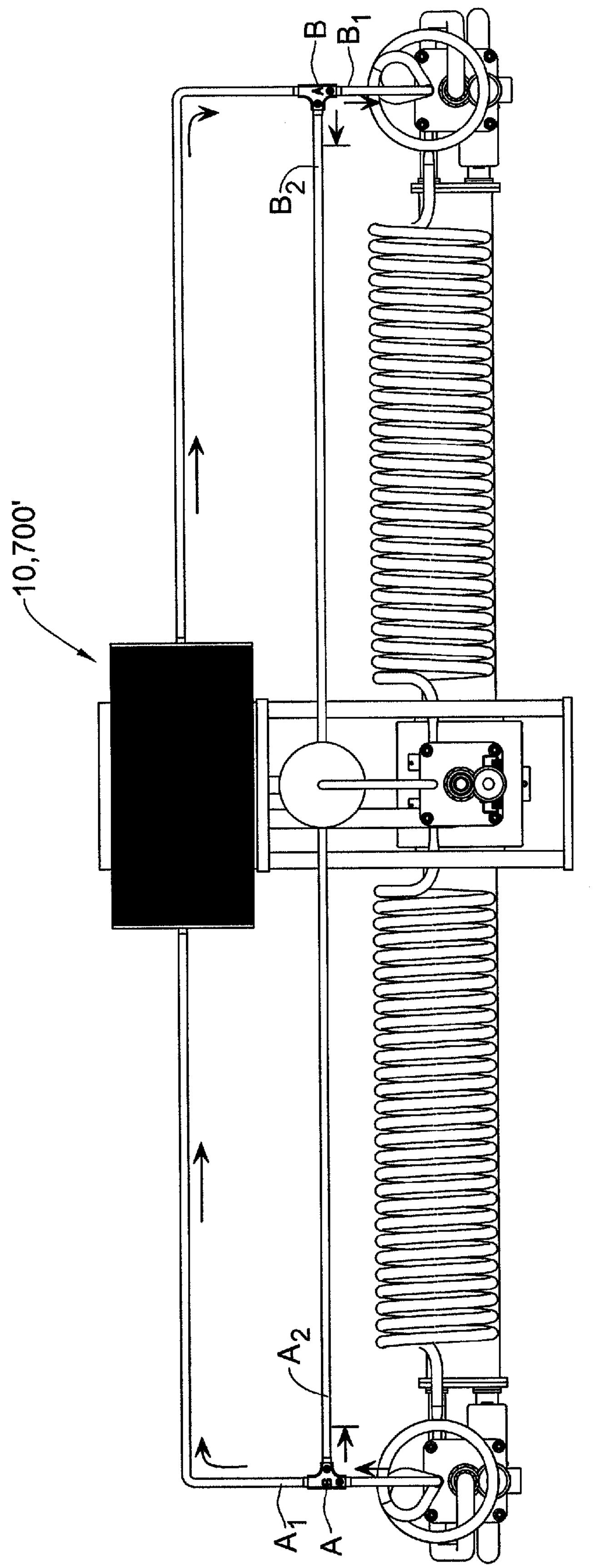
Figure 75B:
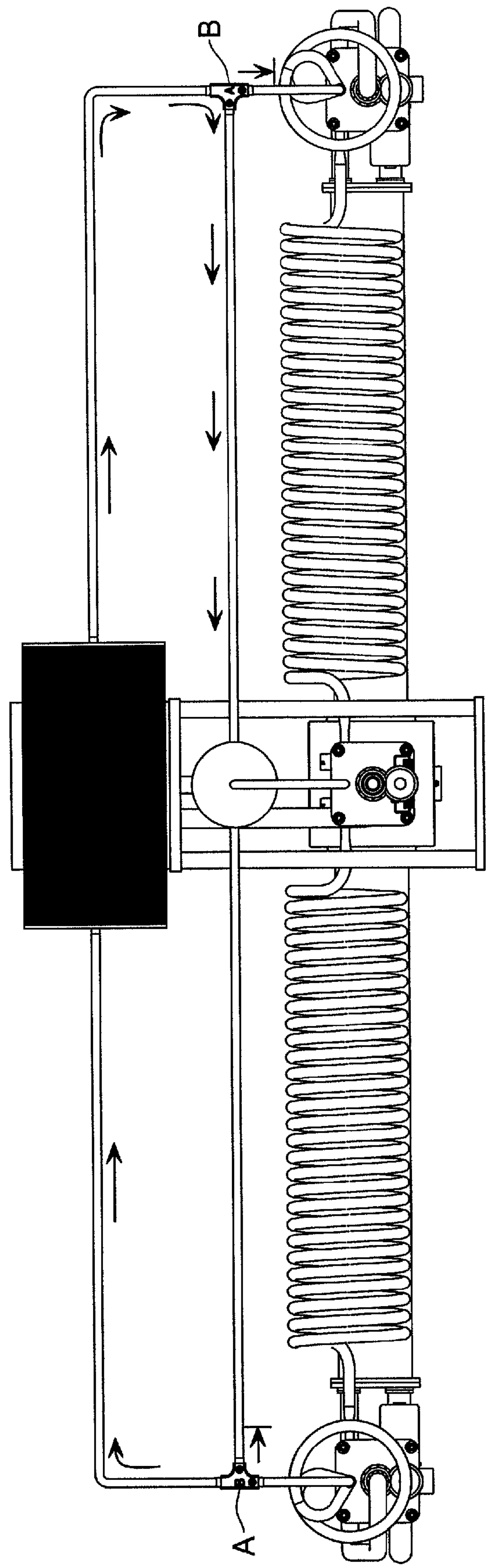
Figure 76A:
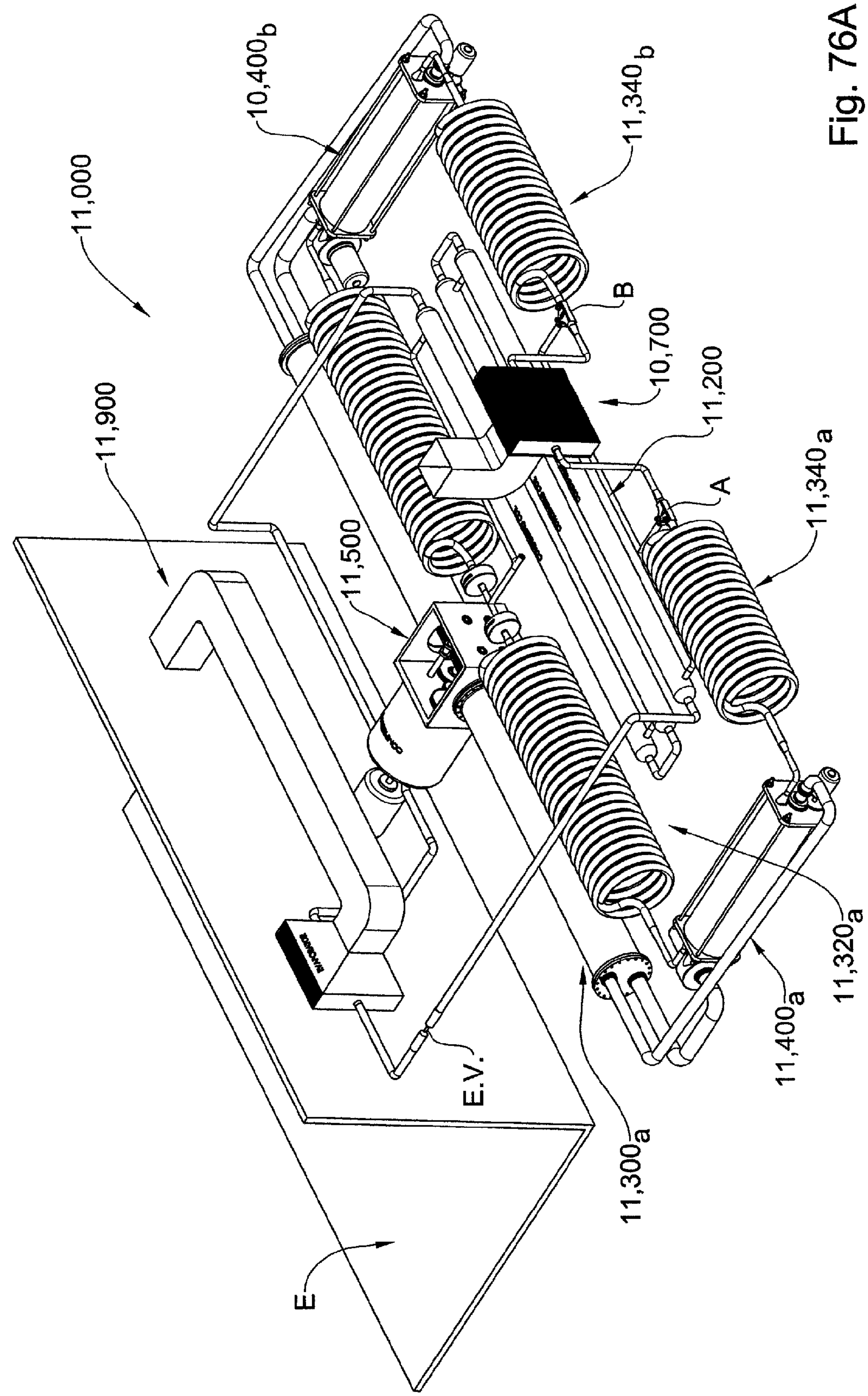
Figure 76B:
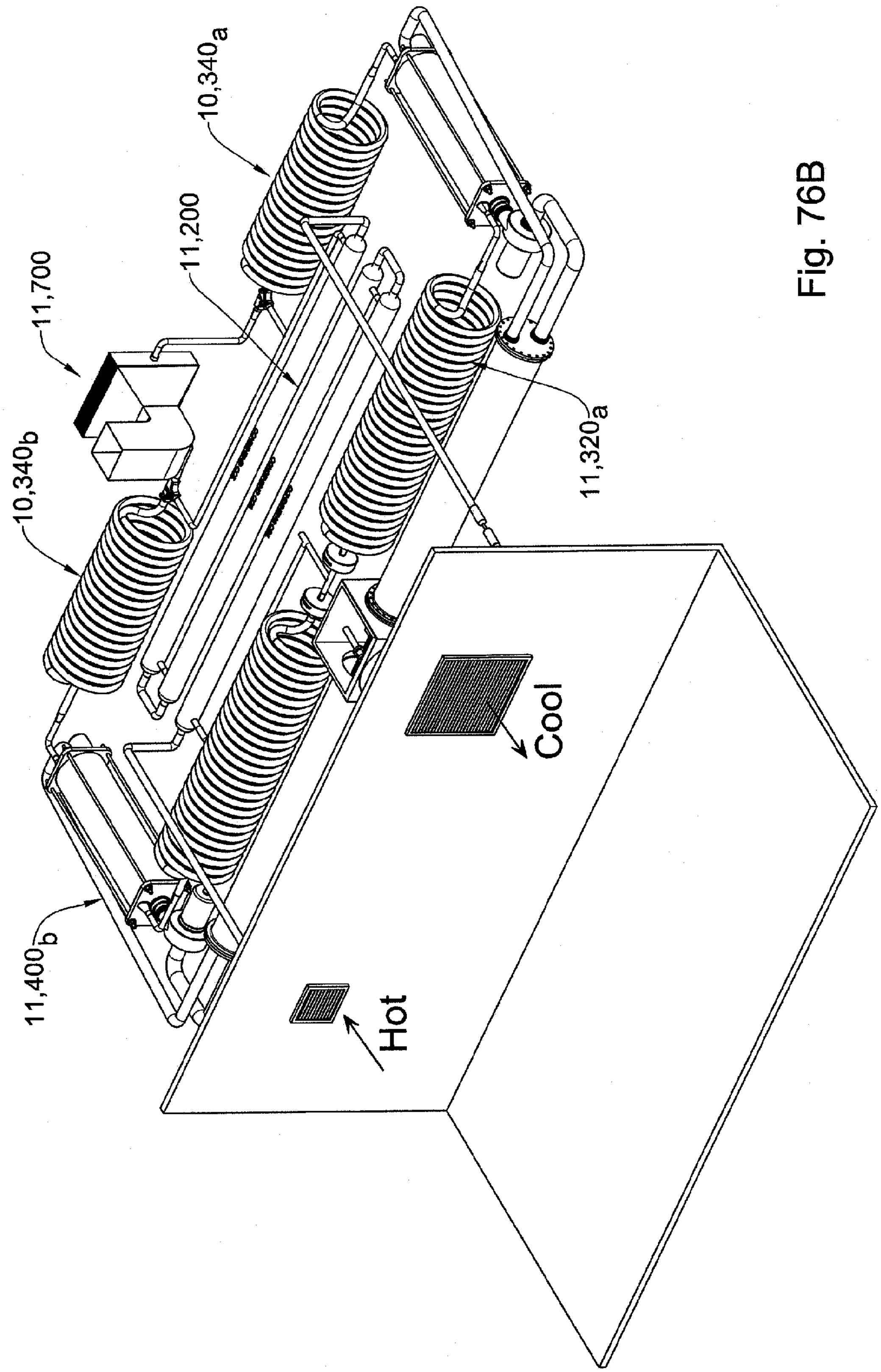
Figure 76C:
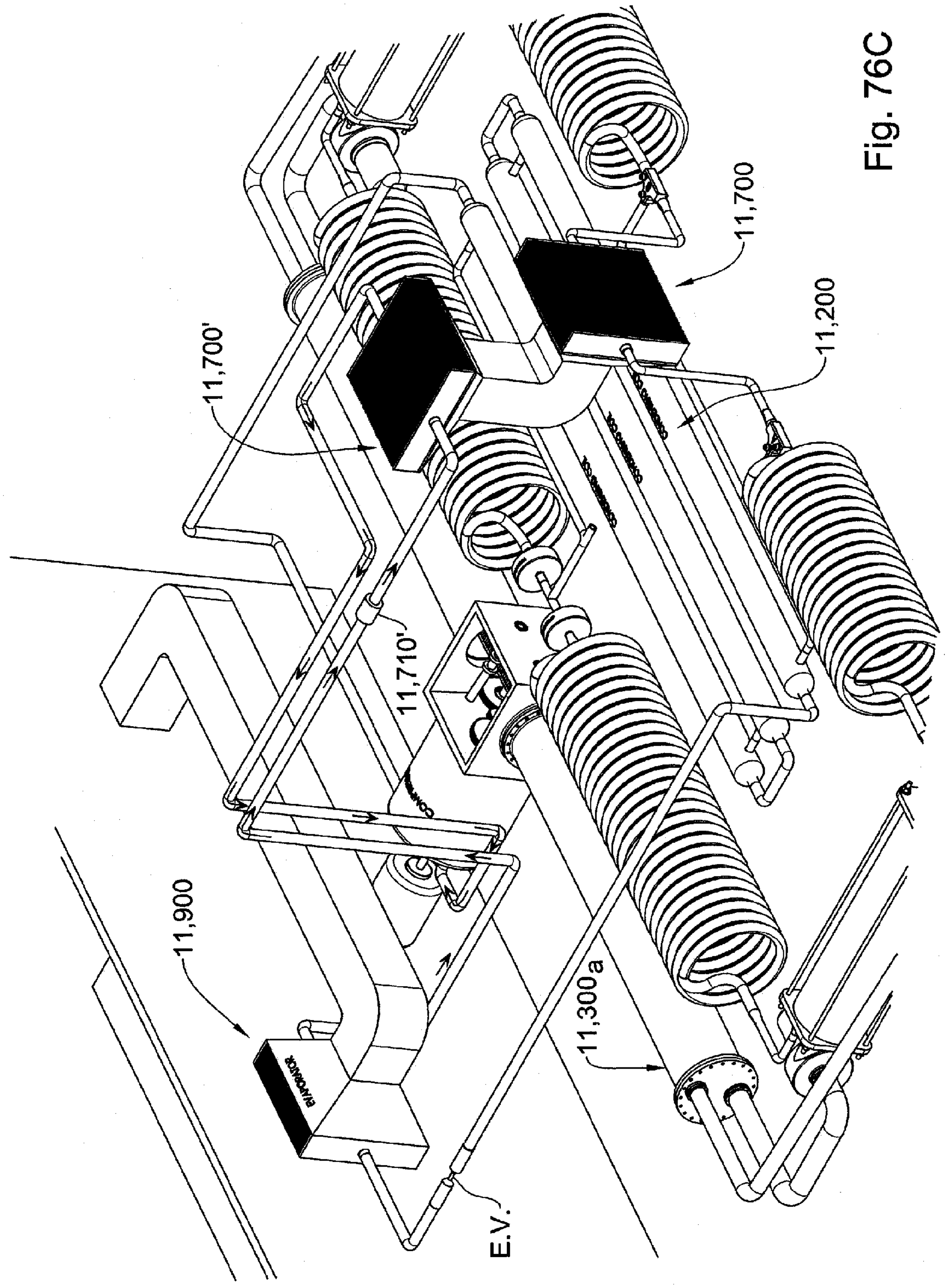
Figure 76D:
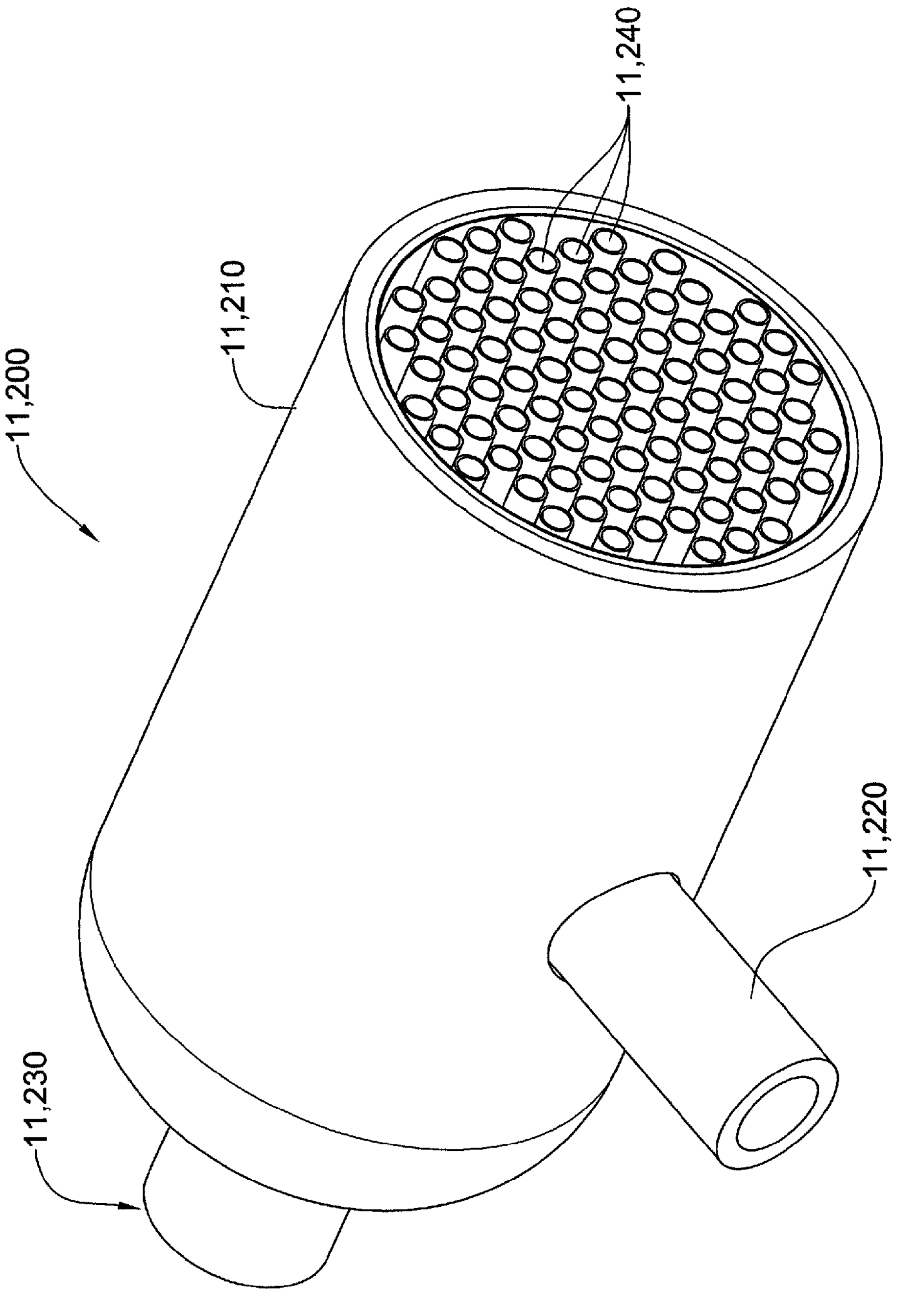
Figure 77A:
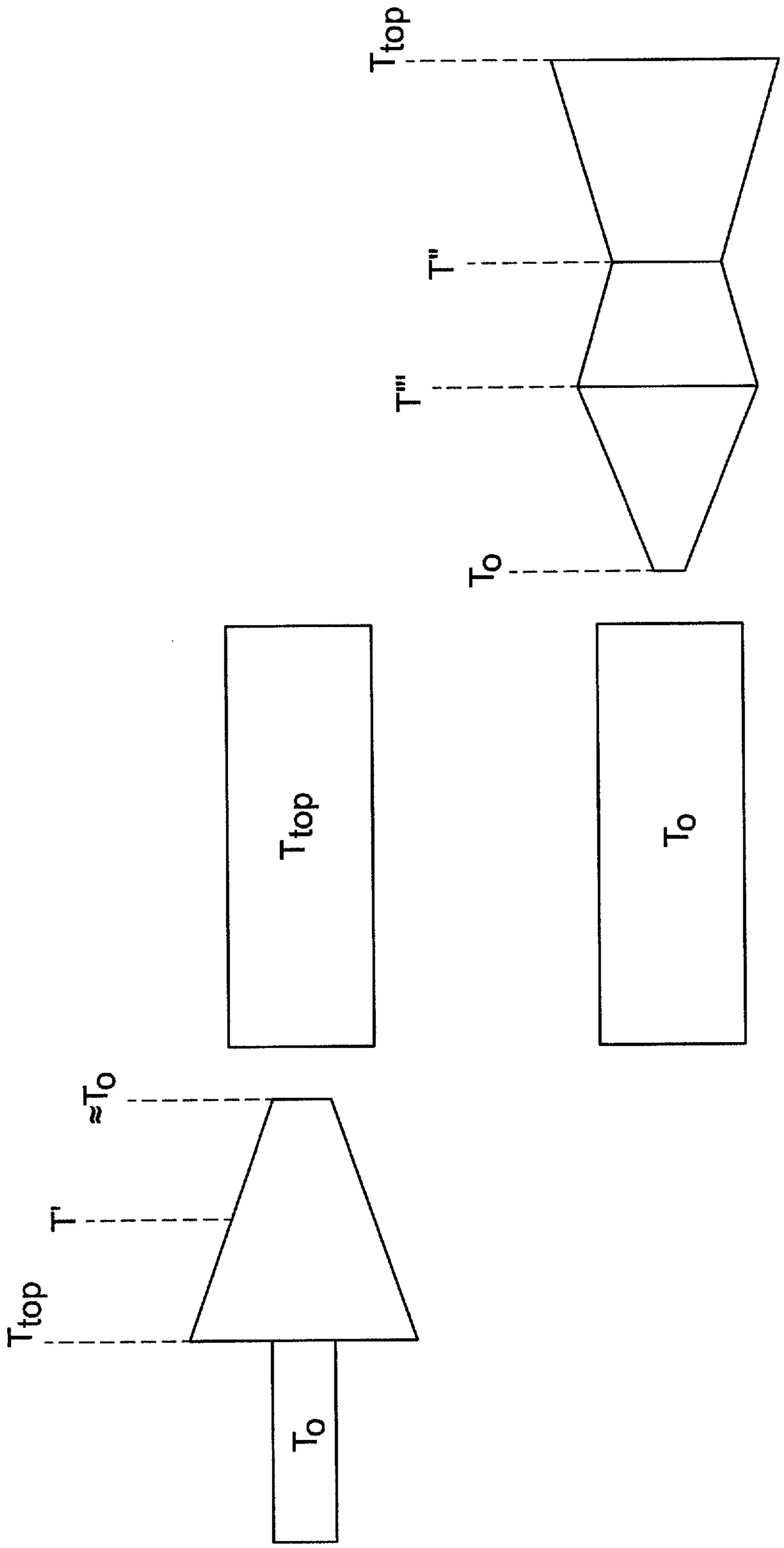
Figure 77B:
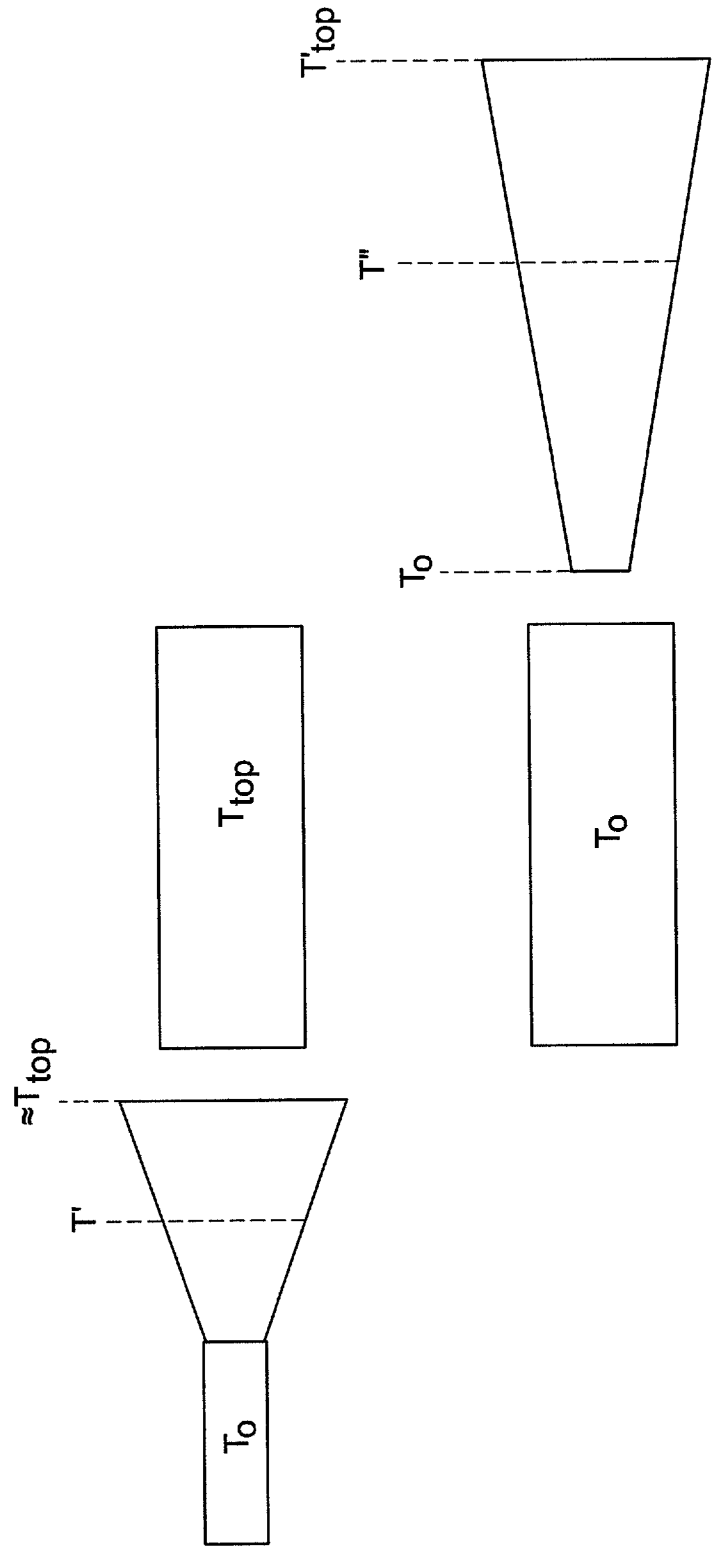

FIG. 52A is a schematic isometric view of the pressure vessel shown in FIG. 51 with complementary piping and a gradient tank;

FIG. 52B is a schematic enlarged view of a detail shown in FIG. 52A;

FIG. 52C is a schematic cross-sectional isometric view of a gradient tank used in the generator shown in FIGS. 50A and 50B;

FIG. 53A is a schematic enlarged view of a detail shown in FIG. 51;

FIG. 53B is a schematic view of the pressure vessel shown in FIG. 53A with the housing thereof being removed for illustration purposes;

FIG. 53C is a schematic enlarged view of a detail shown in FIG. 53B;

FIG. 53D is a schematic cross-sectional view of the pressure vessel shown in FIG. 51 taken along a plane perpendicular to a central axis of the pressure vessel;

FIG. 53E is a schematic enlarged partial cross-sectional view of the core of the pressure vessel shown in FIG. 53E;

FIG. 54A is a schematic isometric view of a generator according to still a further example of the subject matter of the present application;

FIG. 54B is a schematic isometric view of a heating cycle used in the generator shown in FIG. 54A;

FIG. 55A is a schematic isometric view of a generator according to yet a further example of the subject matter of the present application;

FIG. 55B is a schematic isometric view of a heating cycle used in the generator shown in FIG. 55A;

FIG. 55C is a schematic isometric view of an air heating cycle used in the generator shown in FIG. 55A;

FIG. 55D is a schematic isometric view of a residual heating cycle used in the generator shown in FIG. 55A;

FIG. 56A is a schematic isometric view of a generator according to an additional example of the subject matter of the present application;

FIG. 56B is a schematic isometric view of a heating cycle used in the generator shown in FIG. 55A;

FIGS. 56C to 56E are schematic isometric enlarged views of portions of the heating cycle shown in FIG. 56B;

FIG. 57A is a schematic isometric view of a heating vessel used in the heating cycle shown in FIGS. 56C to 56E;

FIG. 57B is a schematic isometric cross-sectional view of the heating vessel shown in FIG. 57A;

FIGS. 57C and 57D are schematic isometric enlarged views of top and bottom portions of the heating vessel shown in FIG. 57B;

FIG. 57E is a schematic isometric view of a core used in a pressure vessel according to another example of the subject matter of the present application;

FIG. 58 is a schematic isometric view of a residual heating cycle used in the generator shown in FIG. 57A;

FIG. 59A is a schematic isometric view of a cross-sectional slice of a pressure vessel and core used in a generator according to the subject matter of the present application;

FIG. 59B is a schematic isometric view of the core shown in FIG. 59A;

FIG. 59C is a schematic enlarged view of detail M1 shown in FIG. 59B;

FIG. 59D is a schematic enlarged view of detail M2 shown in FIG. 59C;

FIG. 59E is a schematic front view of detail M2 shown in FIG. 59D;

FIG. 60A is a schematic isometric view of a cross-sectional slice of a pressure vessel and core used in a generator according to another example of the subject matter of the present application;

FIG. 60B is a schematic isometric view of the core shown in FIG. 60A;

FIG. 60C is a schematic enlarged view of detail M3 shown in FIG. 60B;

FIG. 60D is a schematic enlarged view of detail M4 shown in FIG. 60C;

FIG. 60E is a schematic front view of detail M4 shown in FIG. 60D;

FIG. 61A is a schematic isometric view of another example of a generator system according to the subject matter of the present application associated with a solar field;

FIG. 61B is a schematic isometric view of the generator system shown in FIG. 61A;

FIG. 61C is a schematic view of a portion of the generator system shown in FIG. 61A;

FIG. 62A is a schematic isometric view of a pressure module used in the generator shown in FIGS. 61A to 61C;

FIG. 62B is a schematic isometric cross-sectional view of the pressure module shown in FIG. 62A;

FIGS. 62C and 62D are schematic enlarged views of details shown in FIG. 62B;

FIG. 63A is a schematic front view of the pressure module shown in FIG. 62B;

FIG. 63B is a schematic isometric view of a portion of the pressure module shown in FIG. 63A;

FIG. 64 is a schematic enlarged view of a portion of a core used in the pressure vessel shown in FIGS. 62A to 63B;

FIG. 65A is a schematic isometric view of another example of a generator system according to the subject matter of the present application;

FIG. 65B is a schematic isometric enlarged view of a detail shown in FIG. 65A;

FIG. 66A is a schematic isometric view of a pressure vessel used in the generator shown in FIGS. 65A and 65B;

FIG. 66B is a schematic cross-sectional view of the pressure vessel shown in FIG. 66A;

FIG. 66C is a schematic front view of the vessel shown in FIG. 66B;

FIG. 66D is a schematic enlarged view of a detail of the vessel shown in FIG. 66C;

FIG. 66E is a schematic isometric view of the details shown in FIG. 66D;

FIG. 67A is a schematic isometric cross-sectional view of a core unit used in the vessel shown in FIG. 66A;

FIG. 67B is a schematic exploded view of the core shown in FIG. 67A;

FIG. 67C is a schematic enlarged view of a detail shown in FIG. 67B;

FIG. 68A is a schematic isometric view of piping and junctions of the generator system shown in FIG. 65A;

FIG. 69 is a schematic isometric cross-section view of a piston used in the generator shown in FIG. 65A;

FIG. 70A is a schematic isometric view of a generator system according to yet another example of the present application;

FIG. 70B is a schematic top view of the system shown in FIG. 70A;

FIG. 70C is a schematic isometric view of a portion of the generator show in FIG. 70A;

FIG. 70D is a schematic enlarged view of a detail of the generator shown in FIG. 70C;

FIG. 70E is a schematic enlarged view of another detail of the generator shown in FIG. 70C;

FIG. 71A is a schematic isometric view of a first heating arrangement of the system shown in FIG. 70A;

FIG. 71B is a schematic isometric view of the first heating system shown in FIG. 71A, with a fuel chamber removed for clarity;

FIG. 72A is a schematic cross-sectional view of a heating core used in the system shown in FIG. 70A;

FIG. 72B is a schematic enlarged view of a detail of the core shown in FIG. 72A;

FIG. 72C is a schematic isometric view of a portion of the core shown in FIG. 72A;

FIG. 72D is a schematic enlarged view of a detail of the core shown in FIG. 72C;

FIG. 73A is a schematic cross-sectional view of a second heating system used in the generator shown in FIG. 70A;

FIG. 73B is a schematic enlarged view of a detail of the heating system shown in FIG. 73A;

FIGS. 73C to 73F are schematic top views of the system, showing various stages of operation of the system shown in FIG. 70A;

FIG. 74A is a schematic isometric view of a variation of the generator system shown in FIGS. 70A to 73F;

FIG. 74B is a schematic enlarged view of a detail of the generator shown in FIG. 74A;

FIGS. 75A and 75B are schematic rear views of the generator shown in FIGS. 74A and 74B, showing two stages of operation of the generator;

FIG. 76A is a schematic isometric view of a generator system according to still another example of the present application;

FIG. 76B is a schematic rear isometric view of the generator shown in FIG. 76A;

FIG. 76C is a schematic enlarged view of a modification of the generator shown in FIGS. 76A and 76B;

FIG. 76D is a schematic isometric view of a portion of a condenser arrangement used in the generator shown in FIGS. 76A to 76C; and FIGS. 77A and 77B are schematic diagrams of heat exchange processes which can be implemented in the generator examples of the present application.

DETAILED DESCRIPTION OF EMBODIMENTS

Figure 78A:
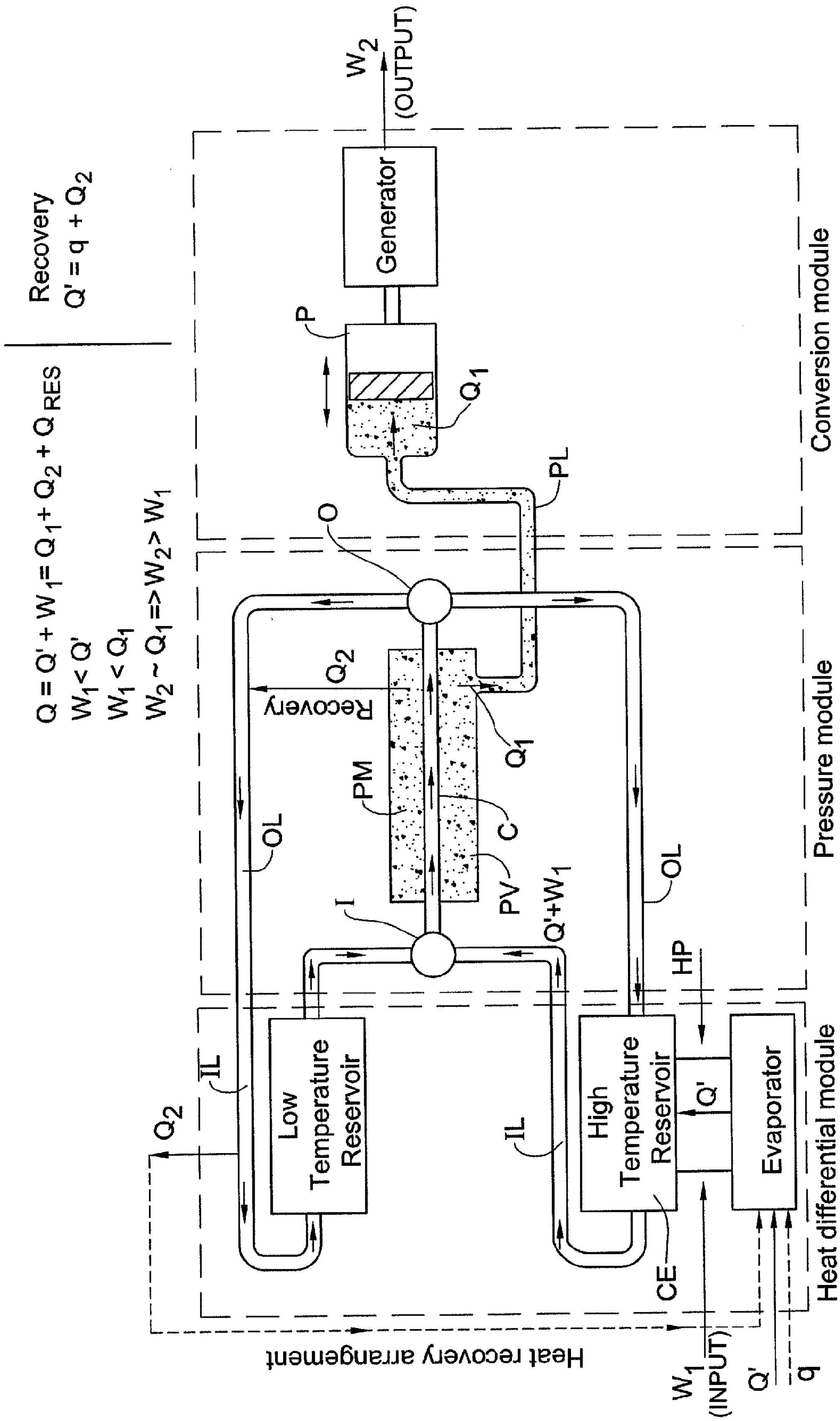
FIGS. 78A to 78H are schematic diagrams of examples of different variations of the generator according to the subject matter of the present application.

With reference to FIG. 78A, a schematic diagram is shown demonstrating a basic arrangement of the generator of the present invention comprising a heat differential module, a pressure module and a conversion module.

The heat differential module comprises a first, high temperature reservoir and a second, low temperature reservoir, each containing therein a work medium WM (not shown) at a respective high/low temperature. The first, high temperature reservoir is thermally associated with a condenser end CE of a heat pump HP, so that operation of the heat pump HP (under provision of power $W_1$) provides heat Q to the condenser end so as to maintain the work medium WM in the first reservoir at high temperature. The second, low temperature reservoir is thermally associated with the environment.

Each of the reservoirs is provided with an inlet line IL which is in selective fluid communication with an inlet of the pressure vessel PV of the pressure module via an inlet valve I and an outlet line OL which is in selective fluid communication with an outlet of the pressure vessel PV via an outlet valve O.

The pressure vessel PV contains therein a pressure medium PM and is formed with a central conduit C passing therethrough which is in fluid communication with the inlet valve I and with an outlet valve O, allowing the passage therethrough of the work medium WM from the reservoirs.

The pressure vessel PV is provided with a pressure line PL being in fluid communication with the pressure medium PM, which is in fluid communication with the conversion module. The conversion module, in turn, comprises a piston P which is in fluid communication with the pressure line PL, and with a generator. The piston in configured for reciprocation which is utilized by the generator for the generation of output power $W_2$.

In operation, high/low temperature work medium WM is selectively provided into the pressure vessel, entailing expansion and shrinkage of the pressure medium PM, consequently entailing reciprocation of the piston P. Specifically, the following steps are performed:

a) passing high temperature work medium WM from the high temperature reservoir into inlet valve I, through conduit C and out of outlet valve O back into the high temperature reservoir. As a result of a heat exchange process between the high temperature work medium WM and the pressure medium PM, the former cools down while the latter heats up to a maximal operative temperature. When heating up, the pressure medium PM increases its volume and causes displacement of the piston P to the right; and b) passing low temperature work medium WM from the low temperature reservoir into inlet valve I, through conduit C and out of outlet valve O back into the low temperature reservoir. As a result of a heat exchange process between the low temperature work medium WM and the pressure medium PM, the former heats up while the latter cools down to a minimal operative temperature. When cooling down, the pressure medium PM decreases in volume and causes displacement of the piston P to the left.

Performing the above steps repeatedly will provide reciprocation of the piston P back and forth, thereby allowing generation of electricity by the generator.

The following should be noted:

- when returning to the high temperature reservoir, the cooled down high temperature work medium WM is free to absorb further heat from the condenser end of the heat pump so as to bring it back to its original high temperature;
- when returning to the low temperature reservoir, the heated up low temperature work medium WM emits at least some heat into the outside environment so as to cool down and bring its temperature back to its original low temperature;
- depending on the length of the conduit C, it can be beneficial, after the selective switching of the position of inlet valve I to provide fluid communication with the low temperature reservoir, to delay selective switching of the position of the outlet valve O to provide fluid communication with the low temperature reservoir. In this way, upon beginning the performing of step (b), the high temperature work medium WM contained within the conduit C will first be pushed through its outlet line OL into the high temperature reservoir, and only then will the outlet valve O be selectively switched to provide fluid communication with the low temperature reservoir. The same holds true when switching from step (b) to step (a);

In terms of the thermodynamic operation, the heat pump HP withdraws an amount of heat Q' (heat absorbed from the environment with which the evaporator is in thermal communication) from the evaporator end thereof into the condenser end by applying an amount of work $W_1$. Thus, the amount of heat Q contained within the high temperature work medium WM of the high temperature reservoir $Q=Q'+W_1$.

In operation, the amount of heat Q is provided to the pressure medium PM via the heat exchange process, so that a portion $Q_1$ of the amount Q of heat is used for displacing the piston P, and at least a portion amount $Q_2$ of heat is absorbed by the low temperature work medium WM via heat exchange with the pressure medium PM.

An amount of heat $Q_2$ is released back to the outside environment during passage of the heated low temperature work medium WM via outlet line OL, and from the environment, is free to be re-drawn into the evaporator end of the heat pump HP. Such an arrangement provides for a certain amount of heat $Q_2$ to be recovered by the generator (i.e. a recovery arrangement).

It is appreciated that the amount of heat $Q_2$ is less than the amount of heat Q' participating in the thermodynamic process of the heat pump HP, and thus the heat pump constantly withdraws additional heat from the environment (on top of $Q_2$) to allow provision of a full amount Q' to the condenser end.

The amount of output work $W_2$ provided by the generator of the conversion unit depends on the amount $Q_1$ of heat which is converted into energy thereby. The arrangement is such that the amount $Q_1$ of heat is greater than the amount $Q'+W_1$, so that the output energy $W_2$ produced is greater than $W_1$.

Specifically, since a heat pump HP is used in order to circulate heat within the generator, it is appreciated that an amount of input work $W_1$ is sufficient for displacing an amount of heat $Q'>W_1$, depending on the COP (Coefficient of performance) of the heat pump. For example, under COP=3, the heat pump will withdrawn Q'=2 KW of heat from the evaporator to the condenser under the application of $W_1=1$ KW. Thus, the amount of heat $Q_1$ can be greater than $W_1$, thereby producing an output energy $W_2>W_1$.

Figure 78B:
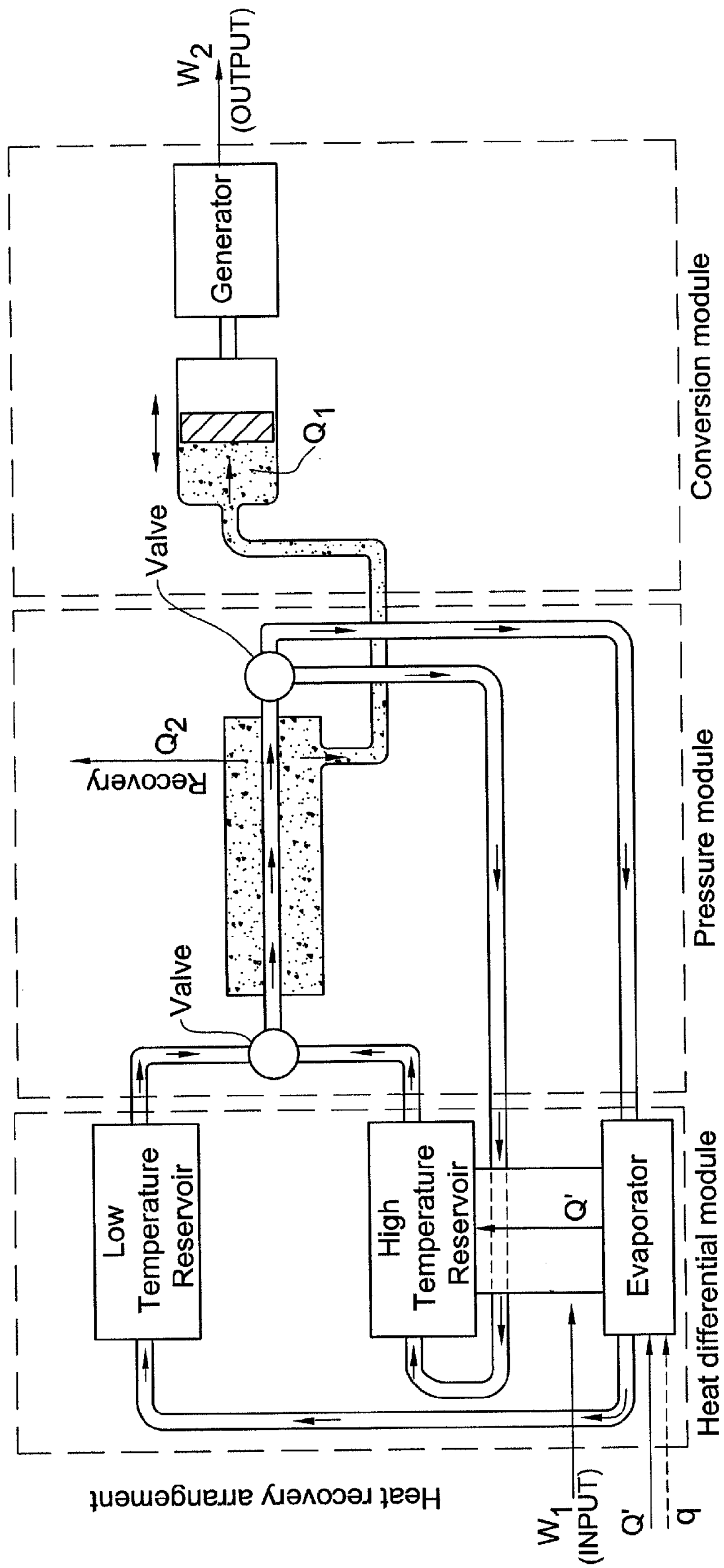

Turning now to FIG. 78B, an alternative arrangement is shown, demonstrating direct heat recovery arrangement. Under this arrangement, the outlet line LO of the low temperature reservoir is not returned directly back into the low temperature reservoir upon exiting the pressure vessel, but rather is first passed through the evaporator end of the heat pump HP. In this manner, instead of the heat $Q_2$ being emitted to the environment and re-absorbed by the heat pump from the evaporator end, it is directly returned to the evaporator end of the heat pump HP, thereby increasing the efficiency of the operation of the generator.

Figure 78C:
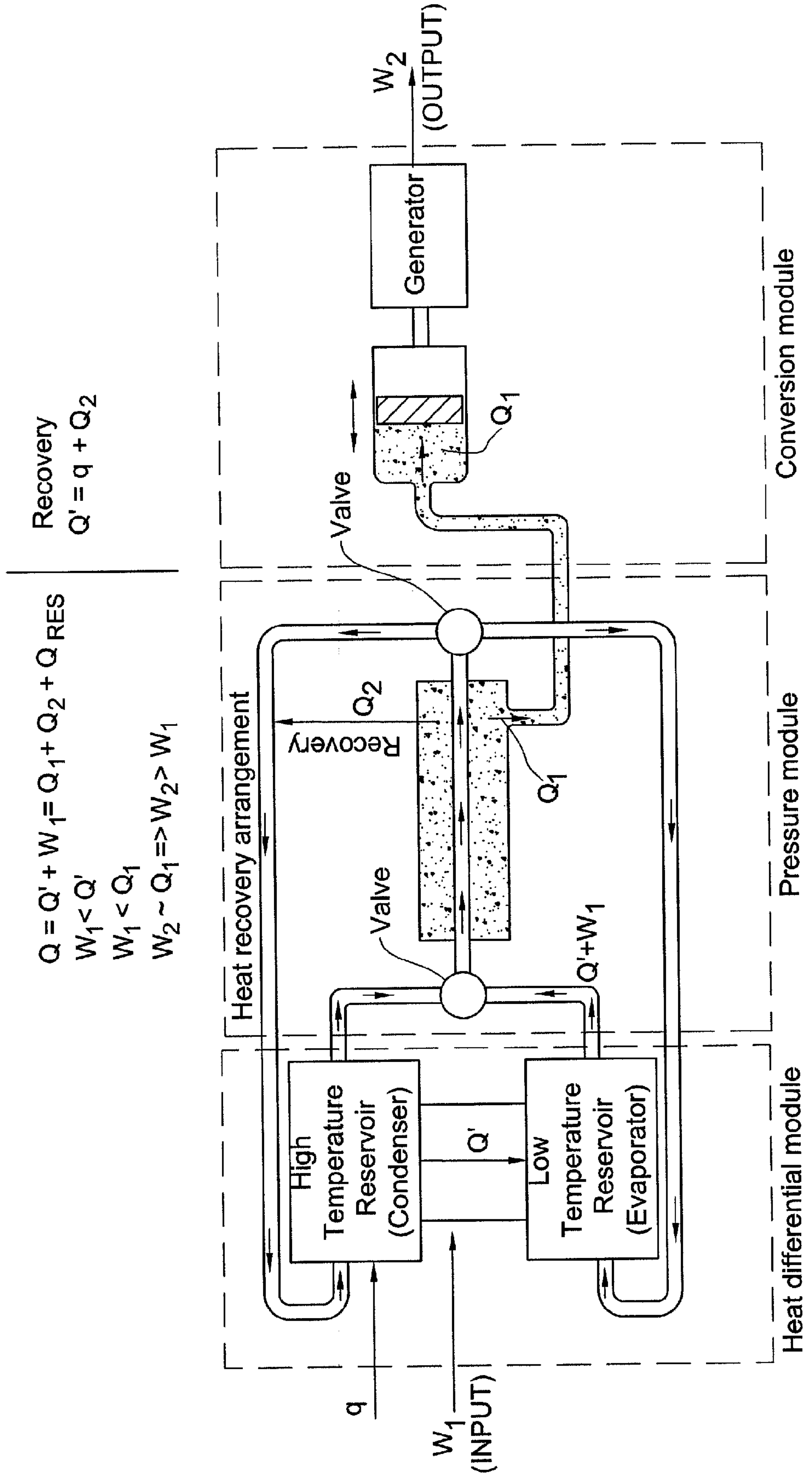

Turning now to FIG. 78C, yet another alternative arrangement of the generator is shown demonstrating a cooled reservoir arrangement in which the first, high temperature reservoir is in thermal communication with the condenser end of the heat pump HP (as in previous examples), while the low temperature reservoir is in thermal communication with the evaporator end of the heat pump HP.

Under the above arrangement, the low temperature work medium WM recovers a partial amount of heat $Q_2$ from the pressure medium PM upon a heat exchange process therewith, and a remaining amount of heat q from the environment to provide an amount of heat Q' form the evaporator end to the condenser end of the heat pump HP.

Figure 78D:
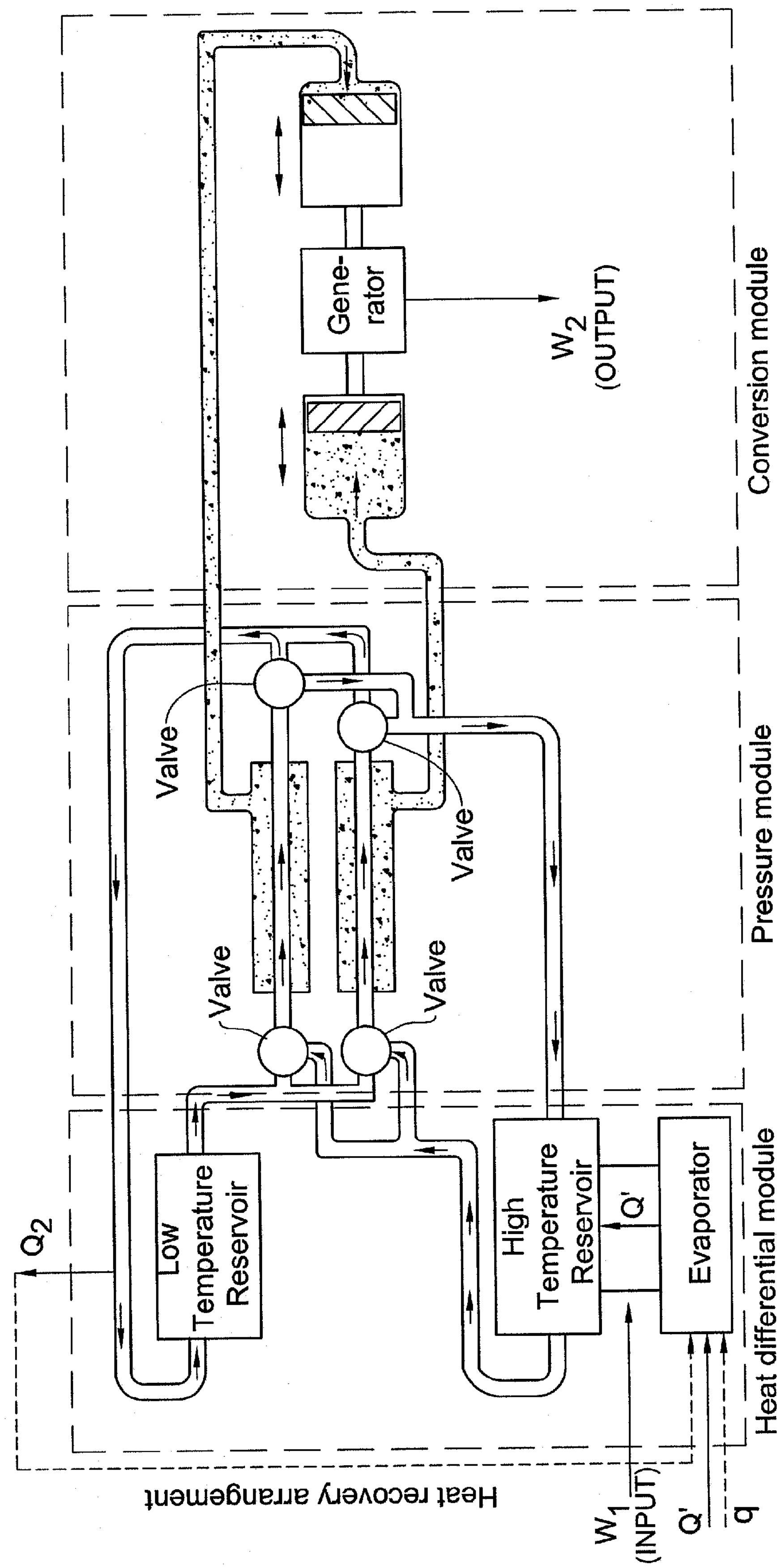

Turning now to FIG. 78D, another arrangement of the generator is shown, demonstrating dual operation of pressure vessels. In particular, it is observed that the pressure module comprises two pressure vessels, each being in selective fluid communication with the high/low temperature reservoirs on the one hand, and on the other hand being in fluid communication with its own piston arrangement. The arrangement is further such that each of the pistons is in mechanical connection with the generator, so that reciprocation of both pistons is used by the generator for the generation of output power.

Under the above arrangement, when one pressure vessel is in fluid communication with the high temperature reservoir, the other pressure vessel is in fluid communication with the low temperature reservoir and vise versa. Thus, when the pressure medium PM in one pressure vessel is heated, the pressure medium PM in the other pressure vessel is cooled down and vise verse.

Under the above arrangement, reciprocation of the pistons is coordinated so that when both pistons displace generally in the same direction generally at the same time. In other words, when the pressure medium PM of the bottom pressure vessel increases its volume and pushes its piston to the right, the pressure medium PM of the top pressure vessel decreases it volume, displacing the piston to the left and vise versa. It is noted that the terms 'top' and 'bottom' are used solely for descriptive purposes—as it will be shown in later arrangements, the pistons can also be positioned side-by-side. It is also appreciated that the above arrangement provides for the use of a plurality of pressure vessels (not only two) which are interconnected with each other.

Figure 78E:
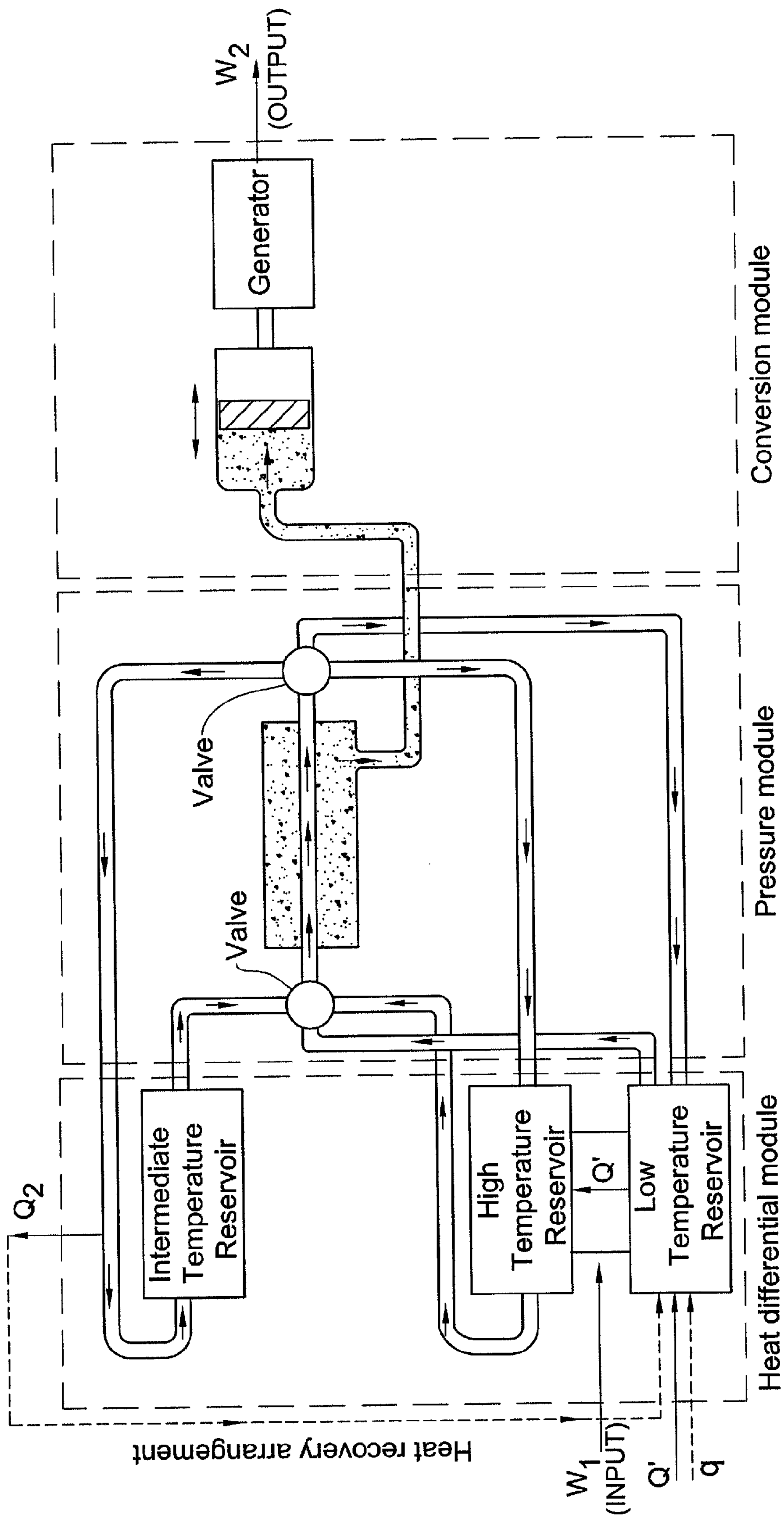

Attention is now drawn to FIG. 78E, in which yet another example of the generator is shown demonstrating an intermediate reservoir arrangement in which the generator comprises three reservoirs: a high/intermediate/low temperature reservoir. This arrangement is a combination of the cooled reservoir arrangement shown in FIG. C, wherein an additional intermediate reservoir has been added containing intermediate temperature work medium. Each of the high/intermediate/low temperature reservoirs is in selective fluid communication with the pressure vessel.

Under this arrangement, two additional steps (a') and (b') are performed on top of steps (a) and (b) described with respect to FIG. 78A as follows:

(a') [performed after step (a)] during which intermediate temperature work medium WM from the intermediate temperature reservoir is passed through the conduit of the pressure vessel, thereby reducing the temperature of the pressure medium PM (via heat exchange process therewith) from the maximal operative temperature to an intermediate operative temperature (between the maximal operative temperature and the minimal operative temperature); and (b') [performed after step (b)] during which intermediate temperature work medium WM from the intermediate temperature reservoir is passed through the conduit of the pressure vessel, thereby increasing the temperature of the pressure medium PM (via heat exchange process therewith) from the minimal operative temperature to an intermediate operative temperature (between the maximal operative temperature and the minimal operative temperature).

With respect to the above arrangement, it is appreciated that the intermediate temperature reservoir can be in thermal communication with the outside environment, while the high/low temperature reservoirs are in thermal communication with the condenser/evaporator ends of the heat pump HP respectively.

Figure 78F:
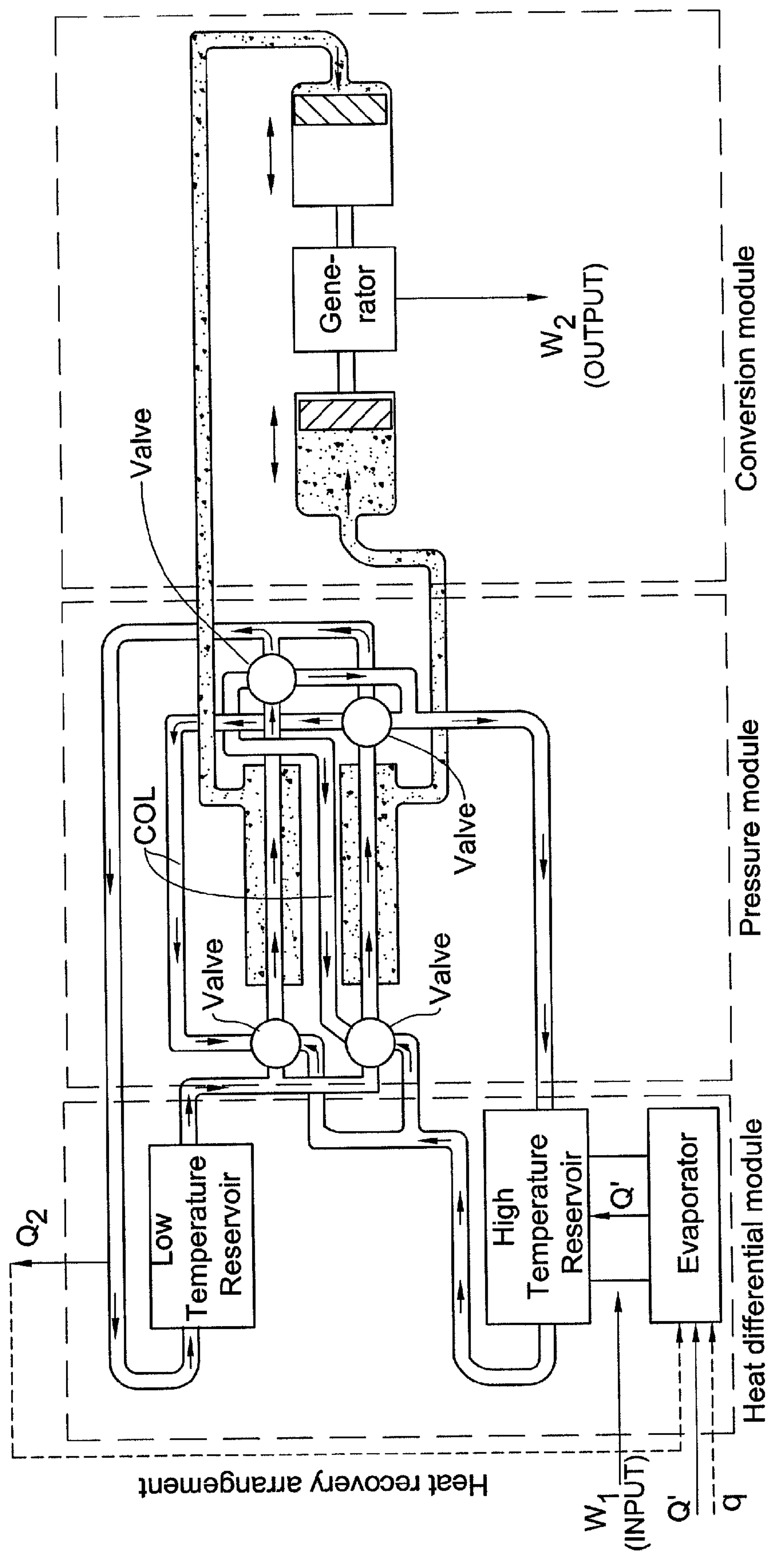

Turning now to FIG. 78F, still another example of the generator is shown demonstrating a cross-over arrangement in which the generator comprises two pressure vessels (similar to the dual operation arrangement), and each of the outlet valve is also in selective fluid communication with the inlet valves.

Specifically, each outlet valve O is also provided with a cross-over line COL which provides fluid communication between the outlet valve of one pressure vessel and the inlet valve of the other pressure vessel. Under this arrangement, it is possible to perform additional cross-over steps as explained below:

(a") [performed after step (a')] in which the intermediate work medium WM, upon exiting the conduit of one pressure vessel PV is provided, via cross-over line COL to the inlet valve of the other pressure vessel PV in order to begin heating the pressure medium therein and only then back to the intermediate temperature reservoir via the other outlet valve; and (b") [performed after step (b')] in which the intermediate work medium WM, upon exiting the conduit of one pressure vessel PV is provided, via cross-over line COL to the inlet valve of the other pressure vessel PV in order to begin cooling the pressure medium therein and only then back to the intermediate temperature reservoir via the other outlet valve.

The above arrangement provides for a more significant heat recovery from the pressure medium PM. More specifically, instead of emitting/withdrawing a certain amount of heat to/from the environment during it return to the intermediate temperature reservoir, the intermediate temperature work medium WM now emits/withdraws a portion of that amount in a heat exchange with the pressure medium PM, thereby increasing the efficiency of the generator.

Figure 78G:
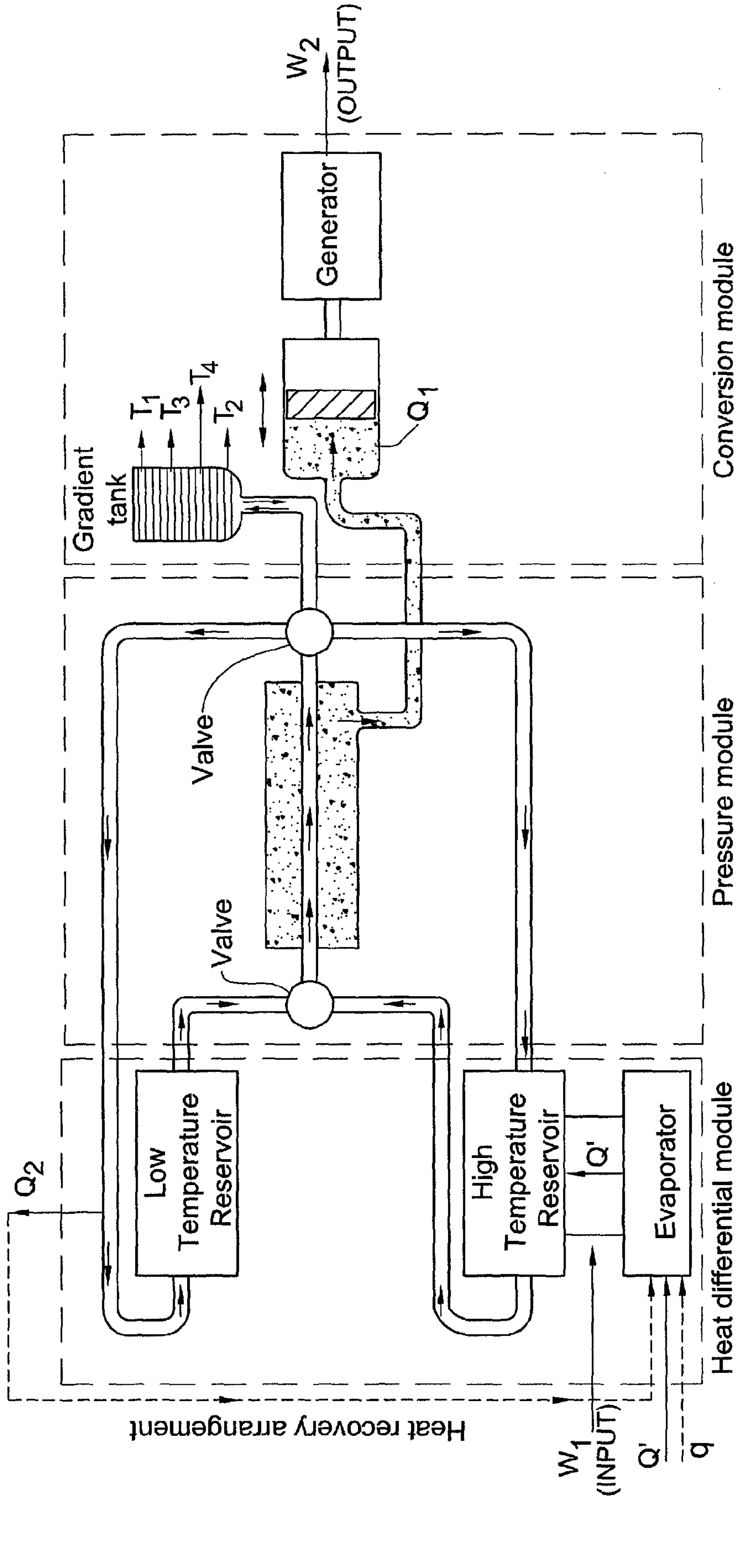

Turning now to FIG. 78G, still a further example of the generator is shown demonstrating a heat gradient arrangement in which the generator comprises one pressure vessel (similar to the basic arrangement), and a gradient tank associated with the outlet valve O.

The gradient tank comprises an arrangement configured for preventing mixing of portions of work medium contained therein, thereby considerably reducing heat transfer between the portions and the speed with which these portions reach a thermal equilibrium. In particular, the gradient tank, when used in the present generator, can contain a first portion of work medium at a temperature $T\mathbf{1}$, a second portion of work medium at temperature $T\mathbf{2}$ and so forth so that $T\mathbf{1} \neq T\mathbf{2} \neq$ and so forth.

Specifically, under operation of the generator as will now be explained, the gradient tank allows for maintaining the work medium contained therein at a temperature gradient so that $T\mathbf{1} > T\mathbf{2} > \ldots > Tn$, or alternatively, $T\mathbf{1} < T\mathbf{2} < \ldots < Tn$.

In operation, several additional steps are added to the basic operation steps (a) and (b) as explained with respect to FIG. 78A, as follows:

(b"') [performed before step (b)] in which low temperature work medium WM is passed through the conduit of the pressure vessel PV to be heated via a heat exchange process with the pressure medium, but instead of being returned to the low temperature reservoir is introduced into the gradient tank. It is appreciated that the first portion of the low temperature work medium to exit the pressure vessel with reach the gradient at a higher temperature than the last portion (as the pressure medium PM gradually cools down during this heat exchange process). The design of the gradient tank allows maintaining these portions each at their own respective temperature, so that eventually, the upper-most portion in the gradient tank is the of the highest temperature while the lower-most portion in the gradient tank is the of the lowest temperature.

(b"") [performed after step (b)] in which the work medium in the gradient tank is re-circulated back through the pressure vessel in a LIFO (Last In First Out) order, thereby gradually heating up the pressure medium to an intermediate temperature, and only then commencing step (a) of the operation.

In essence, these steps of the operation of the generator describe a "stall" operation in which the work medium WM in the gradient tank is held therein (stalled) until the right time, and then released into the piping of the generator to perform the required heat exchange process.

The above arrangement provide for another way of performing heat recovery in the generator, thereby further increasing its efficiency. It is also appreciated that the use of the LIFO configuration allows the pressure medium to be gradually heated (starting from the lowest temperature portion first), making better use of the amount of heat of each portion of the work medium.

It is also appreciated that the gradient tank can be used both for the heated low temperature work medium WM and the cooled high temperature work medium WM. According to specific examples as will be described in detail later, the generator can comprise more than one gradient tank. For example, each pressure vessel can be provided with its own gradient tank and/or gradient tanks are provided for high/low temperature work medium.

Figure 78H:
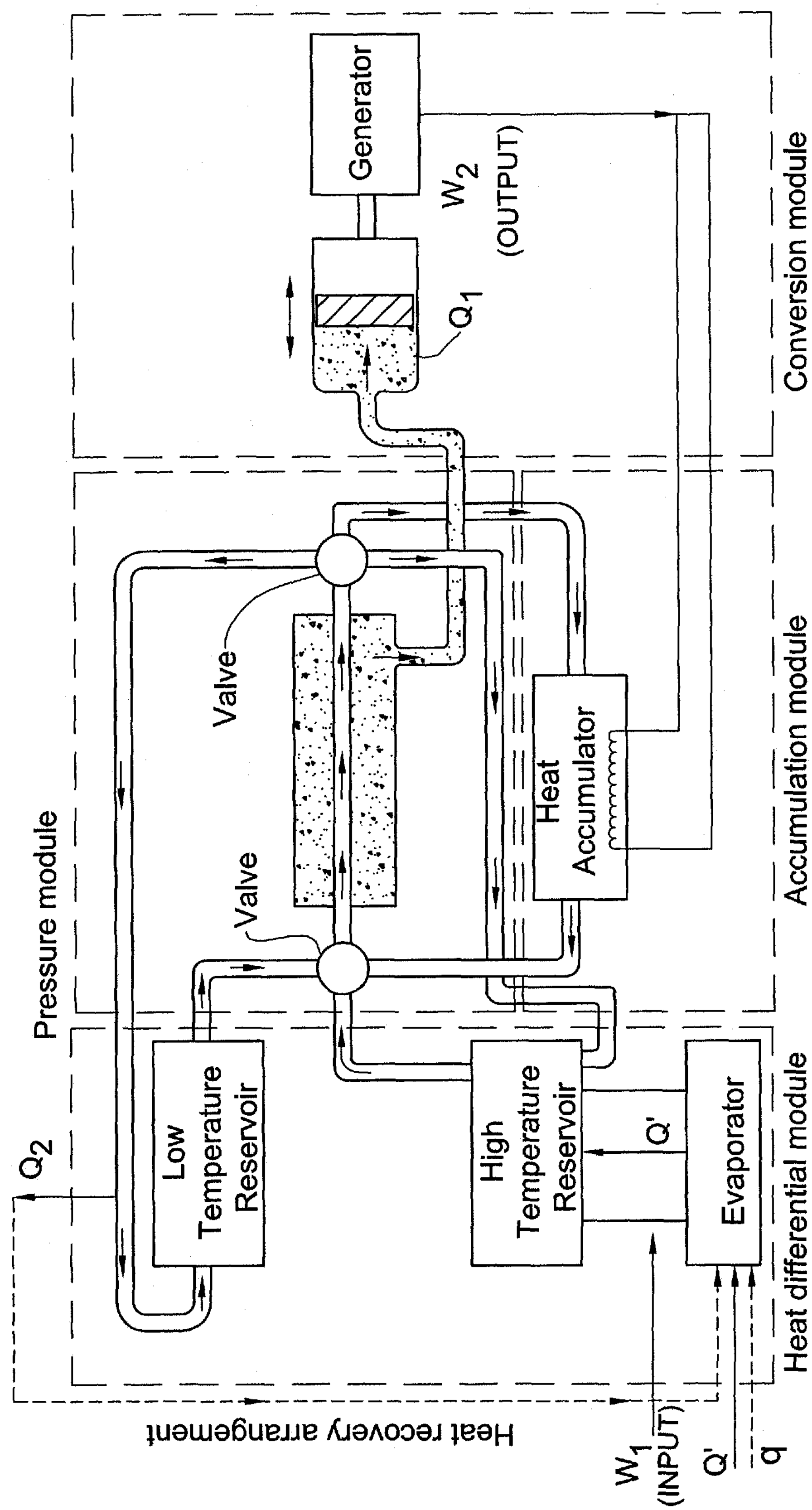

Turning now to FIG. 78H, still a further example of the generator is shown demonstrating an accumulator (green battery) arrangement in which the generator further comprises an accumulator unit containing a storage work medium. The accumulator unit is provided with a heating arrangement which is configured to be operated by output power $W_2$ provided by the generator.

The accumulator unit is in selective fluid communication with the pressure vessel PV via corresponding inlet and outlet lines which are connected to the inlet and outlet valve respectively.

In operation, a portion of the output power of the generator is used to operate the heating arrangement, so that it heats up the work medium contained within the accumulator unit. Thus, at a required moment, the high temperature reservoir can be shut-off, and the accumulator unit can provide the necessary high temperature work medium.

Under the above arrangement, any excess output power which is not used can be provided to the accumulator unit, thereby operating, de facto, as an accumulator.

According to a specific example, the heating element can be a heating coil or any other element which is configured to be heated so as to heat the storage work medium. Alternatively, the heating arrangement can be constituted by an auxiliary heat pump (not shown), and the accumulator unit can comprise two compartments, one being in thermal communication with the evaporator side of the auxiliary heat pump and the other in thermal communication with the condenser side of the auxiliary heat pump.

Figure 1A:
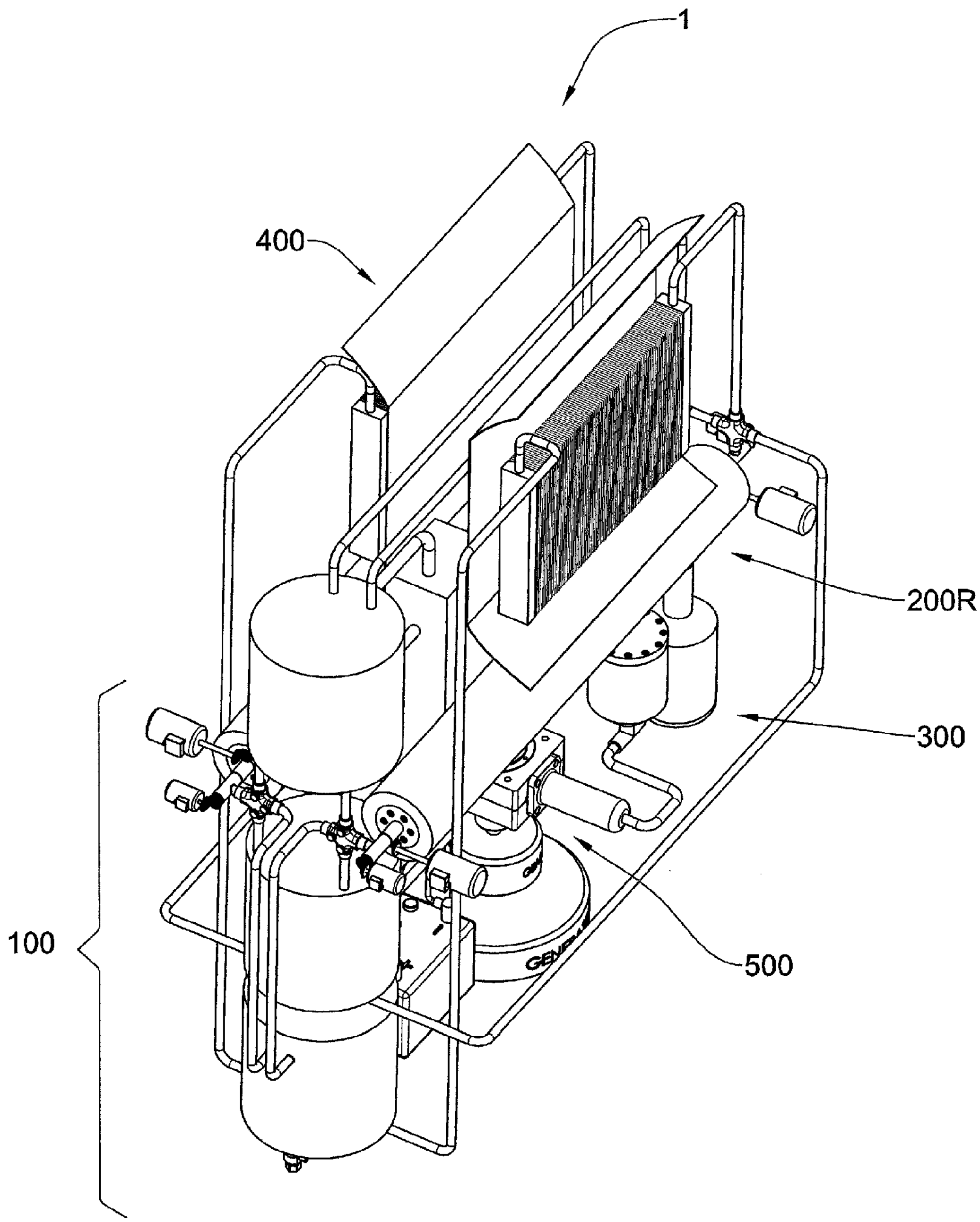
FIGS. 1A to 1D are respective schematic isometric, front, side and cross-section views of the generator of the disclosed subject matter.

With reference to FIG. 1A, there is shown a generator generally designated 1, comprising an air conditioning unit 10 connected to a work medium sub-system 100, two pressure vessels 200, a mechanical power assembly 300, a radiator unit 400, a power generator unit 500, an accumulator unit 50 and output.

In general, each of the vessels 200 contains a pressurized fluid, and the generator operates on the principle of periodic increase/decrease of the volume of the pressurized liquid to be used for mechanical back and forth displacement of a piston for generating electricity.

Figure 3A:
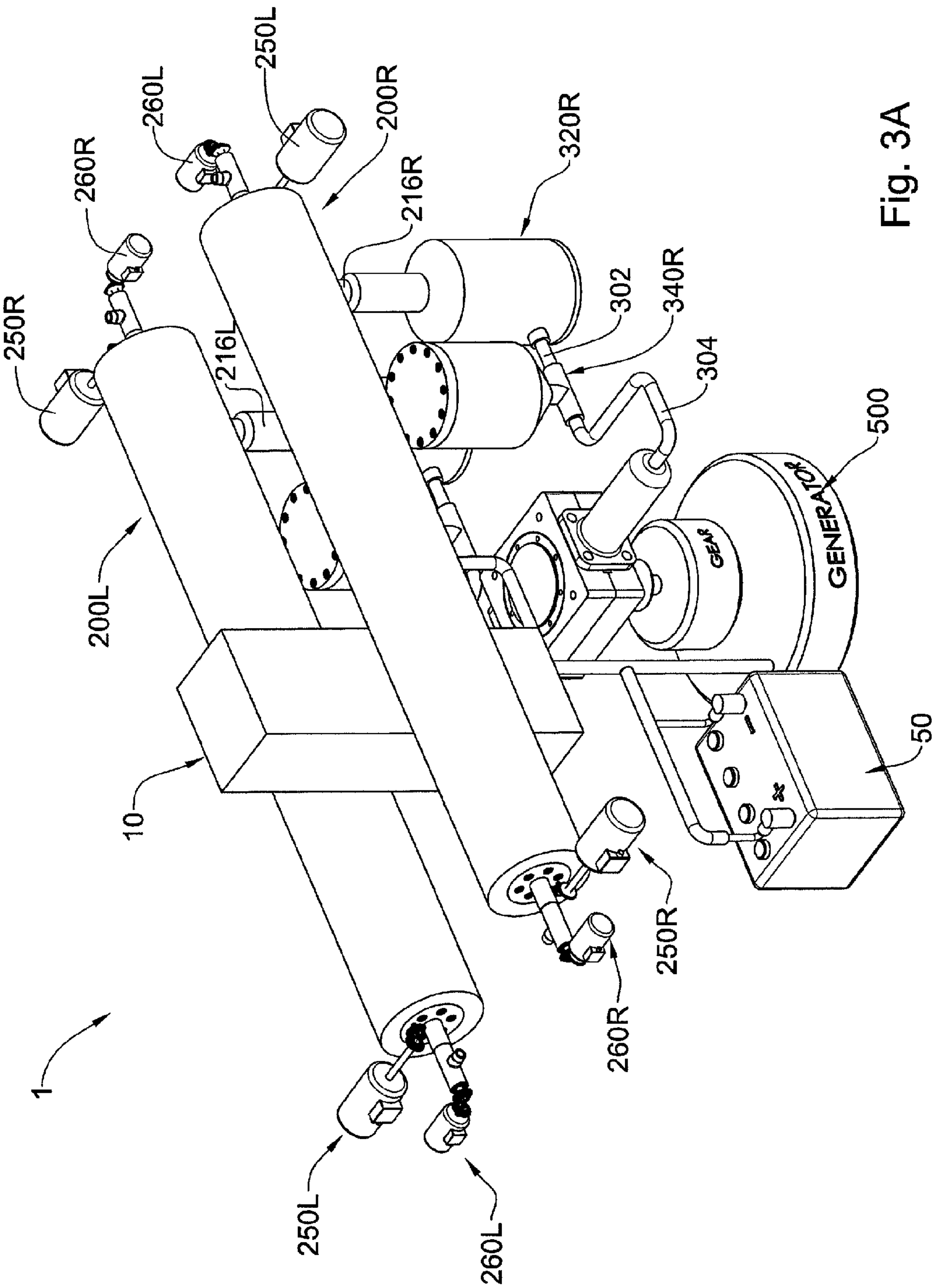
FIG. 3A is a schematic isometric view of the pressure vessels and energy generation units of the generator of FIG. IA.
Figure 3B:
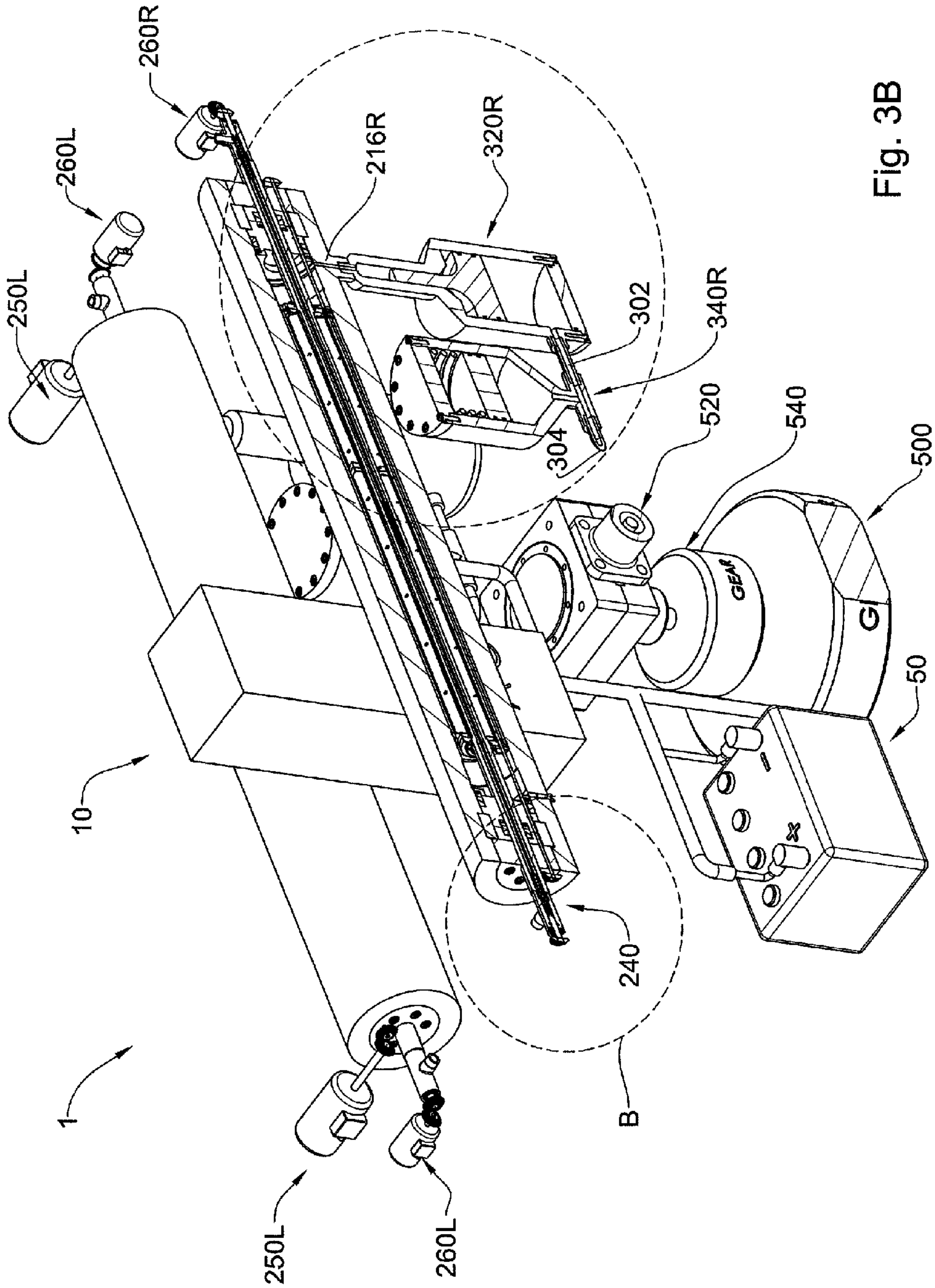
FIG. 3B is a schematic cross-section of the pressure vessels shown in FIG. 3A.
Figure 3C:
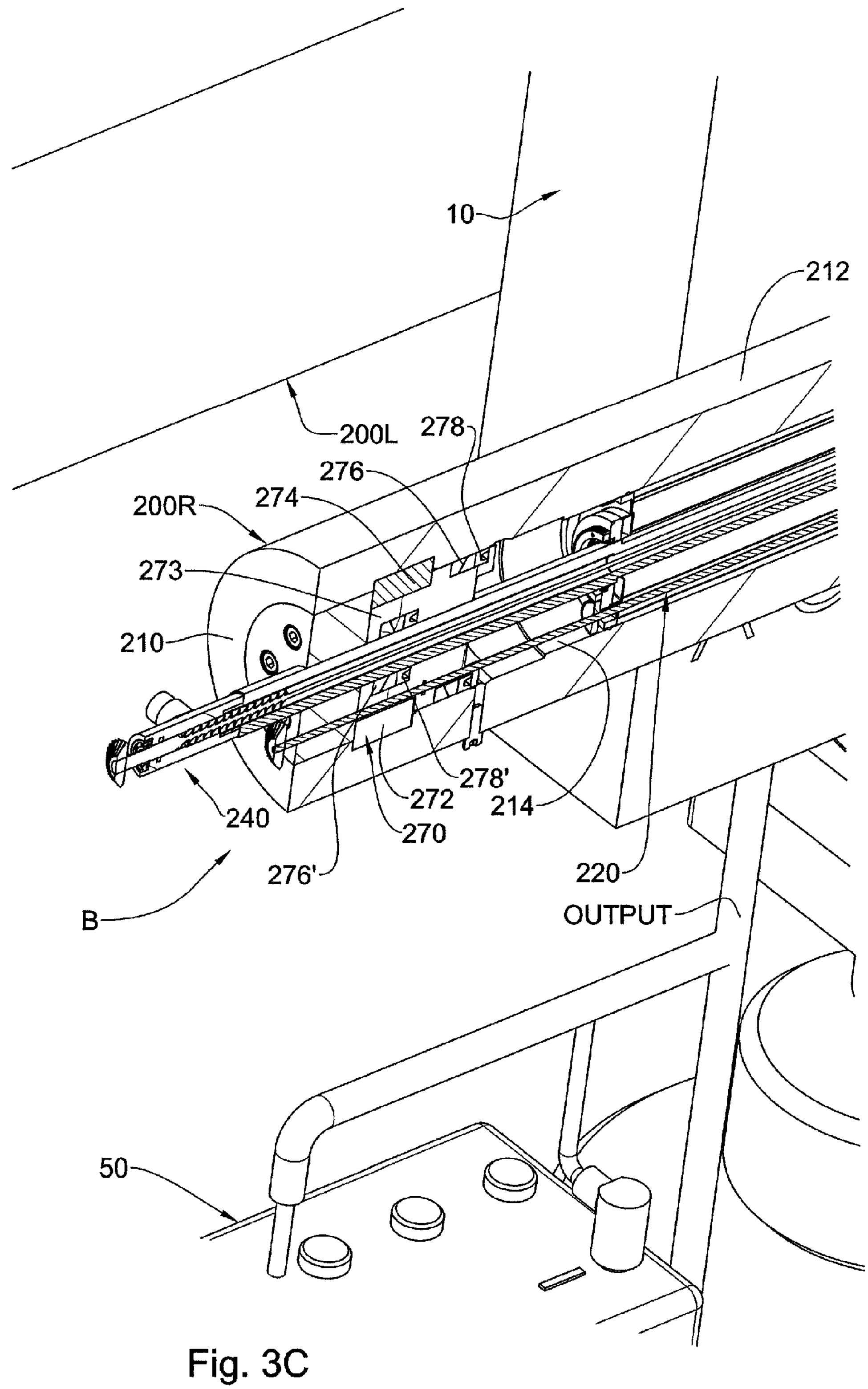
FIG. 3C is a schematic enlarged view of detail B shown in FIG. 3B.
Figure 3D:
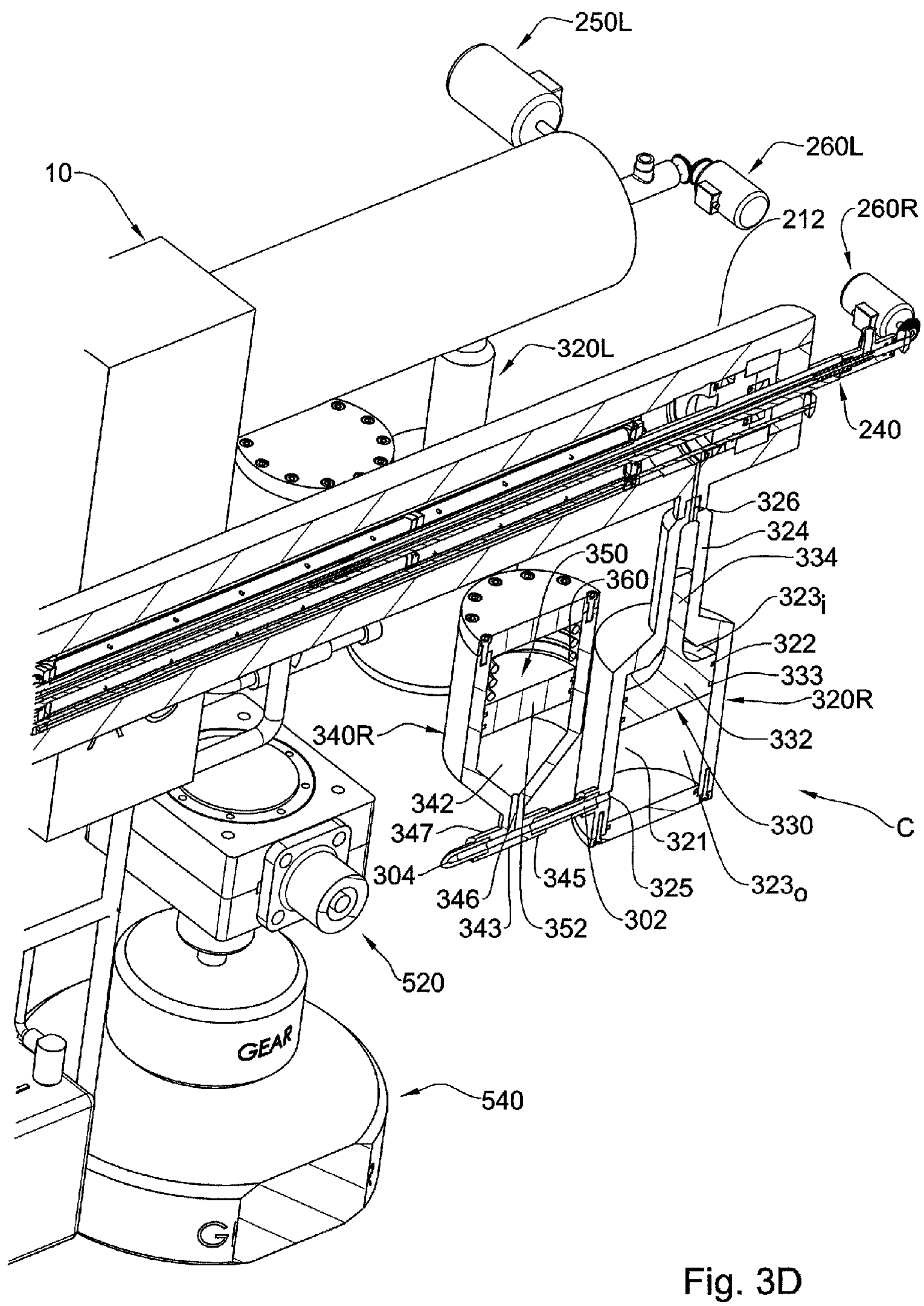
FIG. 3D is a schematic enlarged view of detail C shown in FIG. 3B.
Figure 3E:
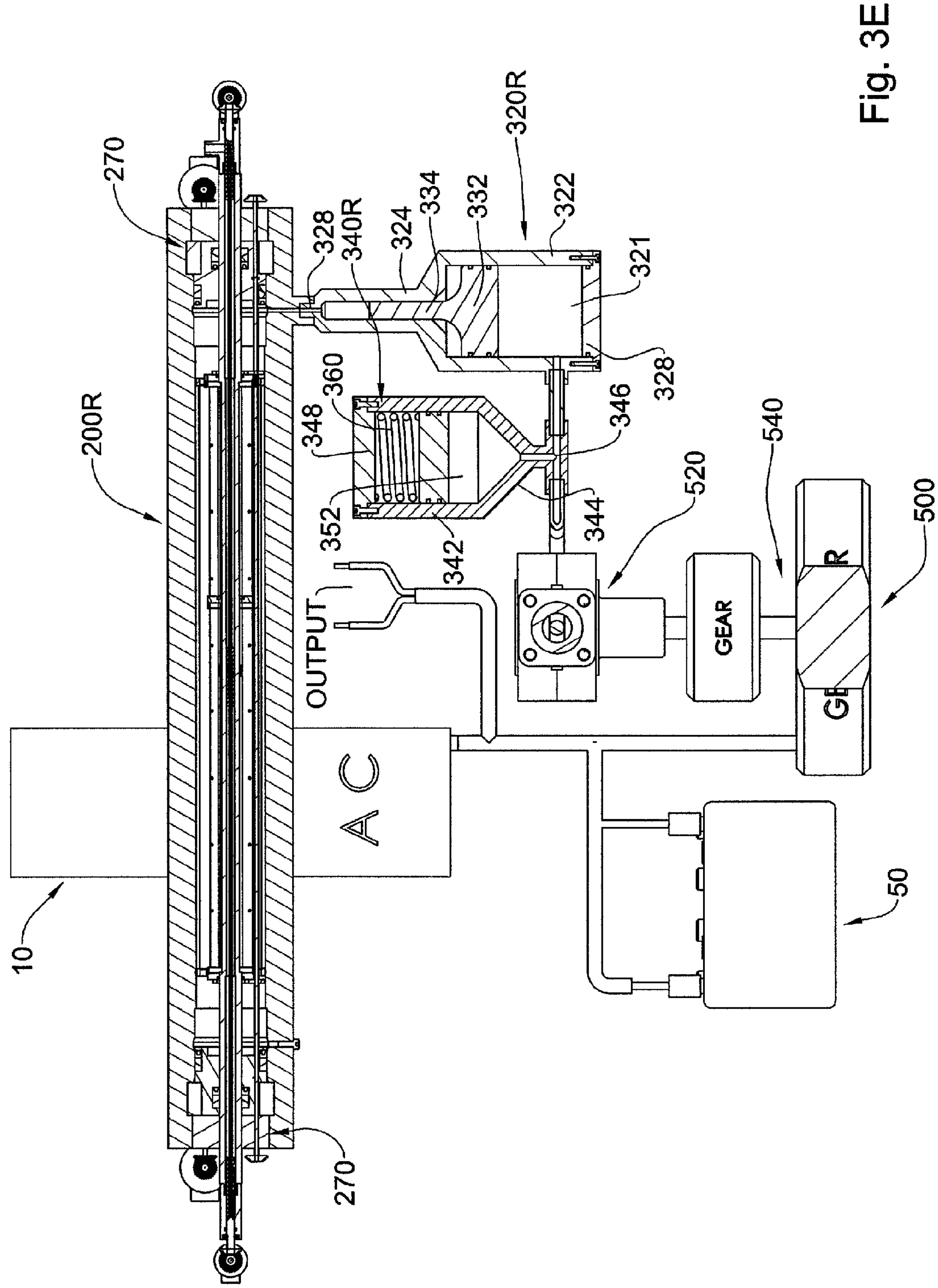
FIG. 3E is a schematic front view of the cross-section shown in FIG. 3B.

With further reference to FIG. 3C, the pressure vessel 200 has a hollow cylinder body 210, and a hollow central core 240 passing therethrough, such that there is formed a cavity between the outer surface 242 of the central core 240 and the inner surface 214 of the cylinder body 210, which is adapted to contain the pressurized fluid. The inner space 243 of the hollow central core 240 is adapted to received therethrough a high/intermediate/low temperature work medium from the work medium sub-system 100, in order to manipulate the temperature of the pressurize fluid.

With reference to FIGS. 1A to 1D, the work medium sub-system 100 comprises a high temperature reservoir 110, a low temperature reservoir 120 and a reservoir 130 of intermediate temperature water at room temperature. The terms 'high', 'low' and 'intermediate' refer in this specific example to the corresponding temperatures: about 40° C., about 10° C. and about 25° C. The work medium sub-system is in fluid communication on one side with an air conditioning unit 10, and on the other side with the pressure vessels 200.

Each of the reservoirs 110, 120 and 130 is connected to both of the pressure vessels 200 via distribution valves 140. Since the generator 1 comprises two pressure vessels 200, and is generally symmetric about a central plane passing therethrough, left (L) and right (R) designations are used where applicable. The manner of connection between the work medium sub-system 100 and the right pressure vessels 200R will now be explained in detail (it should be noted that the manner of connection to the second pressure vessel 200 is essentially similar):

The high temperature reservoir 110 is connected to the distribution valve 140R via inlet 111R and to the outlet of the pressure vessel 200R via line 112R. Correspondingly, low temperature reservoir 120 is connected to the distribution valve 140R via inlet 121R and to the outlet of the pressure vessel 200R via line 122R. The reservoir 130 is connected to the distribution valve 140R via inlet 131R and to the outlet of the pressure vessel 200R via line 132R. The line 132R is then connected to a cooling element 410R of the radiator unit 400, and the outlet of the cooling element 410 is connected back to the reservoir 130 via line 133R.

The reservoirs 110 and 120 as well as the piping connecting them to the pressure vessels 200L, 200R, and the radiator unit 400 can be applied with thermal insulation in order to prevent heat losses to the piping itself. Similarly, the distribution valves 140L, 140R can also be made of low conductivity materials (e.g. Titanium or plastic) or covered with thermal insulation.

To the contrary, the piping connecting the reservoir 130 to the pressure vessels 200L, 200R, and the radiator unit 400 can be made of materials having high heat transfer coefficients (for example copper) and be exposed to the environment, allowing the temperature of the 'intermediate' water to be as equalized as possible with that of the surrounding environment.

In general, the piping described above can be constructed such that it has an in-built water pressure (and no air), that is maintained throughout the operation of the generator 1. Furthermore, the intermediate temperature water reservoir 130 can be connected to the household water pressure (consumer pressure) via faucet 135 (FIG. 1C), such that in case of a drop of pressure in the system, additional water can be provided to the system to re-build the pressure.

The general operation of the generator 1 will now be described (it should be noted that operation is described herein with respect to the vessel 200R, however, a similar operation takes place simultaneously in the vessel 200L).

At an initial position, the vessels 200 are filled with the pressure medium, which is pressurized to about 5000 Atm. The cores 240 as well as all of the above connecting lines are filled with the work medium at a standard household pressure (consumer pressure). In this position, the temperature of the pressure medium is equal to the room temperature (e.g.

about 25° C.), and correspondingly, the piston of the motor is at an intermediary position.

At a first stage of operation, the distribution valve 140R opens the port for line 111R, and high temperature water from the high temperature reservoir begins circulating through the core 240 of the vessel 200R. While passing through the core 240, a heat exchange process takes place between the high temperature water (at about 40° C.) and the pressure medium (at about 25° C.), causing the pressure medium to be heated up. As a result of heating, the pressure medium increases its volume (expands), consequently displacing the piston towards a first end point thereof.

The high temperature water, now of slightly reduced temperature, now exits the pressure vessel 200R via line 112R, and is returned to the high temperature reservoir. This process takes place until the pressure medium is heated (and expanded) to a desired/sufficient amount, i.e. until the piston is displaced to its desired first end position. Typically, the pressure medium is not heated to be the same temperature as the high temperature water, but rather several degrees below, e.g. 32-35° C.

Thereafter, the distribution valve 140R closes the port for the high temperature water inlet, and opens the port for line 131R of the intermediate temperature water reservoir. Intermediate temperature water (i.e. at 25° C.) then flow through the pressure vessel 200R, causing a reverse heat transfer process to take place, in which the heated pressure medium (at about 32-35° C.) gives away its heat to the intermediate temperature water. As a result, the pressure medium is cooled and the intermediate temperature water is heated.

The cooling down of the pressure medium causes its volume to consequently be reduced, entailing mechanical displacement of the piston towards its initial position. This process continues until the pressure medium is cooled to a desired/sufficient amount, i.e. until the piston is displaced back to its initial (intermediary) position.

The heated intermediate temperature water leaves the pressure vessel 200R via line 132R, and enters the cooling element 410R of the radiator unit 400. In the cooling element 410R, the heated intermediate temperature water undergoes another heat exchange process in which it emits to the surrounding atmosphere the heat absorbed from the heated pressure medium. Thus, the intermediate temperature water returns to the intermediate temperature water reservoir 130 via line 133R at a temperature close to its initial temperature within the reservoir (at about 25° C.).

The above concludes the first part of the generator cycle.

Following the first part of the cycle, the second part takes place, in which a similar operation is performed using the low temperature water as follows: the distribution valve 140R shuts off the water from the intermediate temperature water reservoir 130, and opens for fluid communication with line 121R incoming from the low temperature reservoir. Low temperature water is then passed through the core 240 of the vessel 200R. While passing through the core 240, a heat exchange process takes place between the low temperature water (at about 10° C.) and the pressure medium (which is now, after the first part of the cycle, back to about 25° C.), causing the pressure medium to be cooled down. As a result of cooling, the pressure medium decreases its volume (compresses), consequently displacing the piston towards a second end point thereof.

The low temperature water, now of slightly elevated temperature, exits the pressure vessel 200R via line 122R, and is returned to the low temperature reservoir. This process takes place until the pressure medium is cooled (and compressed) to a desired/sufficient amount, i.e. until the piston is displaced to its desired second end position. Typically, the pressure medium is not cooled down to be the same temperature as the low temperature water, but rather several degrees below, e.g. 15-18° C.

Thereafter, the distribution valve 140R closes the port for the low temperature water inlet, and re-opens the port for line 131R of the intermediate temperature water reservoir. Intermediate temperature water (i.e. at 25° C.) then flows through the pressure vessel 200R, causing a reverse heat transfer process to take place, in which the cooled pressure medium (at about 15-18° C.) absorbs heat from the intermediate temperature water. As a result, the pressure medium is heated up and the intermediate temperature water is cooled down.

The heating of the pressure medium causes its volume to consequently be increased, entailing mechanical displacement of the piston towards its initial position. This process continues until the pressure medium is heated to a desired/sufficient amount, i.e. until the piston is displaced back to its initial (intermediary) position.

The cooled intermediate temperature water leaves the pressure vessel 200R via line 132R, and enters the cooling element 410R of the radiator unit 400. In the cooling element 410R, the cooled intermediate temperature water undergoes another heat exchange process in which it absorbs from the surrounding atmosphere the heat lost to the heated pressure medium. Thus, the intermediate temperature water returns to the intermediate temperature water reservoir 130 via line 133R at a temperature close to its initial temperature within the reservoir (at about 25° C.).

This concludes the second part of the generator cycle.

In summary, during the full generator cycle can be described as follows:

I) the pressure medium is first heated up (by high temperature water from the high temperature reservoir 110) from about 25° C. to about 32-35° C., displacing the piston from its initial position to a first end position;

II) the pressure medium is cooled back down (by intermediate temperature water from the intermediate temperature water reservoir 130) from 32-35° C. to about 25° C., displacing the piston back to its initial position;

III) the pressure medium is cooled down (by low temperature water from the low temperature reservoir 120) from about 25° C. to about 15-18° C., displacing the piston from its initial position to a second end position;

IV) the pressure medium is heated back up (by intermediate temperature water from the intermediate temperature water reservoir 130) from 15-18° C. to about 25° C., displacing the piston back to its initial position;

It should be noted that while the low/high temperature water, after passing through the pressure vessel 200R, is returned directly to their respective reservoirs 120, 110, the intermediate temperature water, after passing through the pressure vessel 200R, is passed through the cooling element 410 of the radiator unit 400, in order to respectively convey to/absorb from the atmosphere the required amount of heat gained/lost during the heat exchange process with the pressure medium.

Figure 1B:
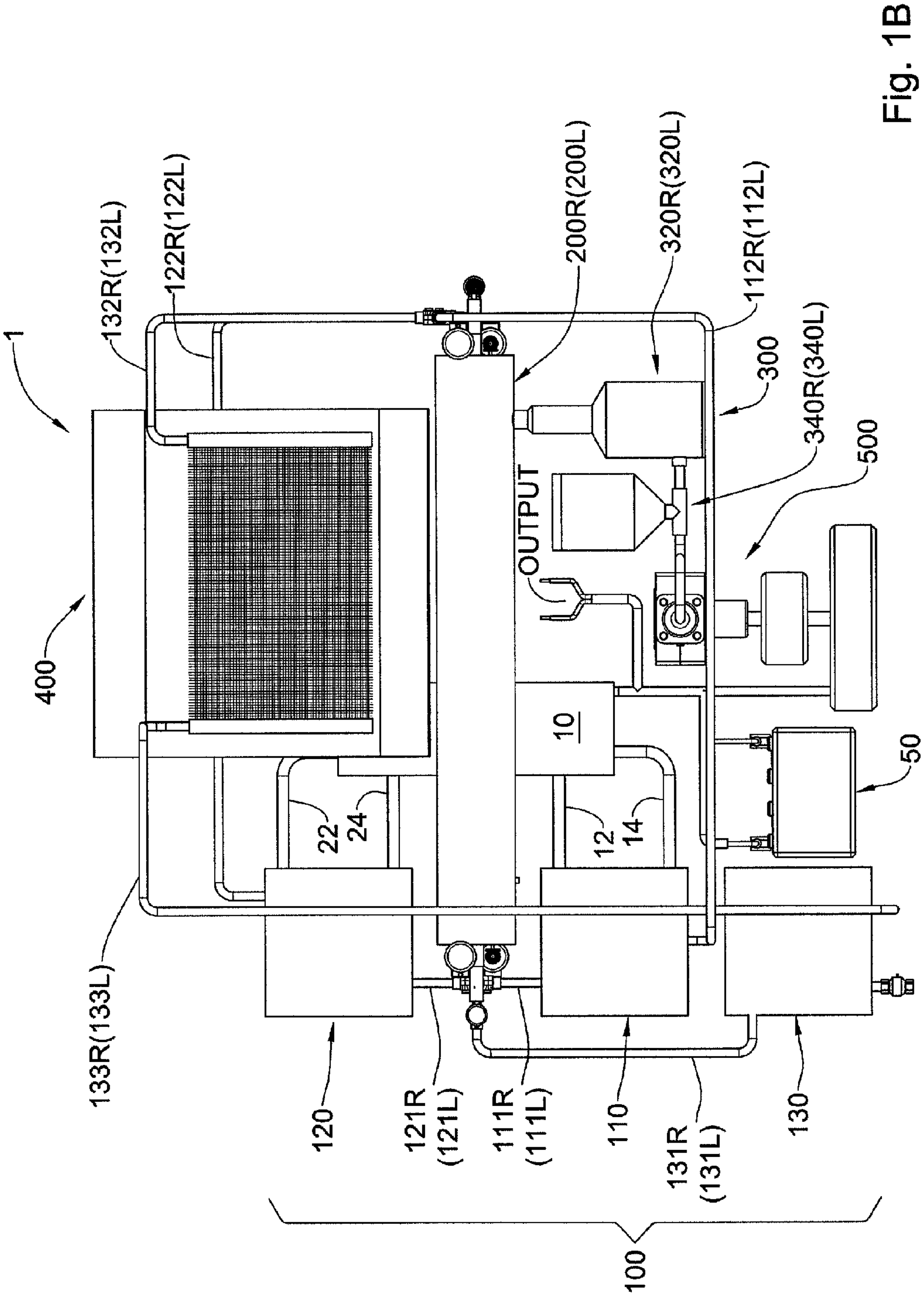
Figure 1C:
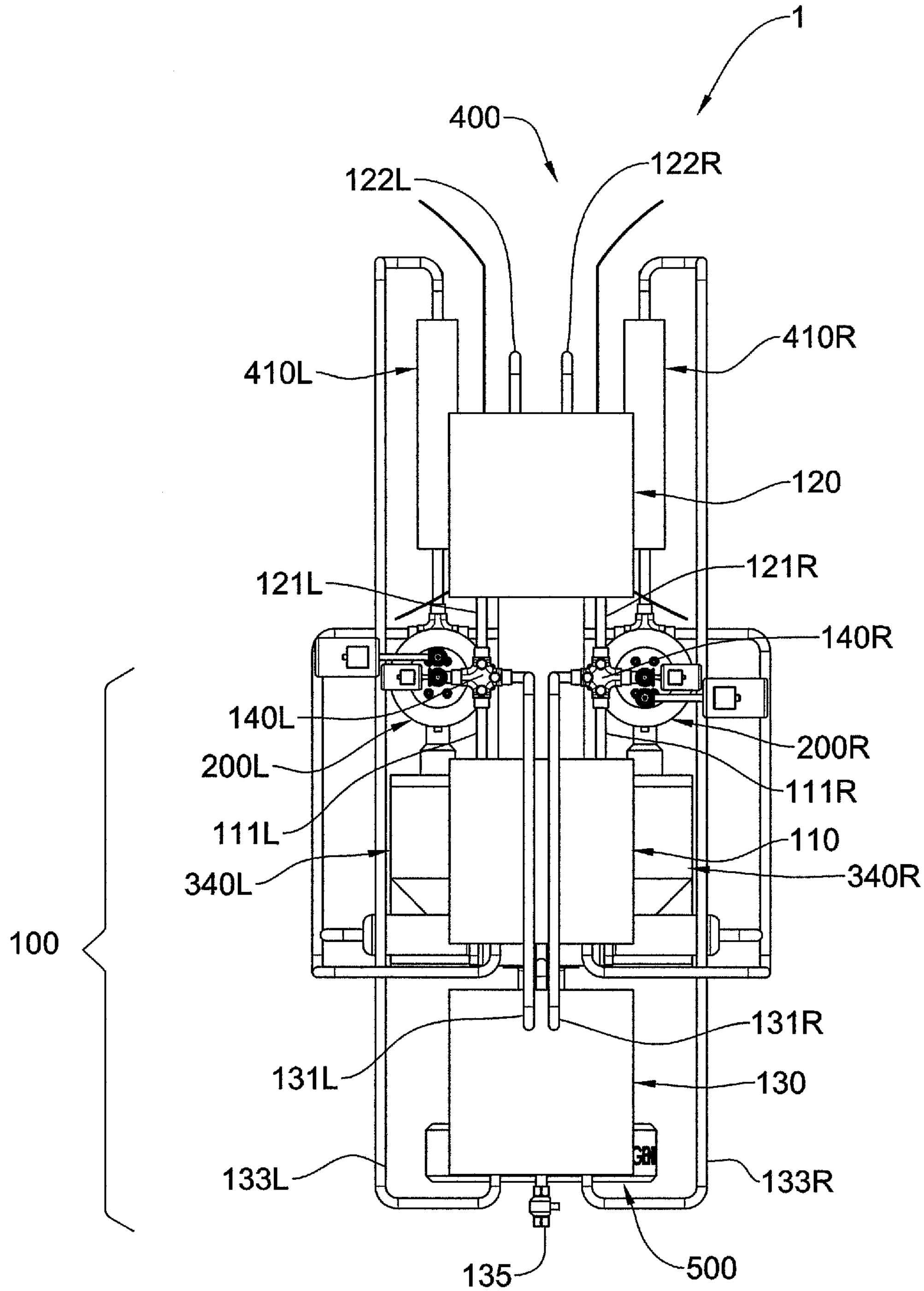
Figure 1D:
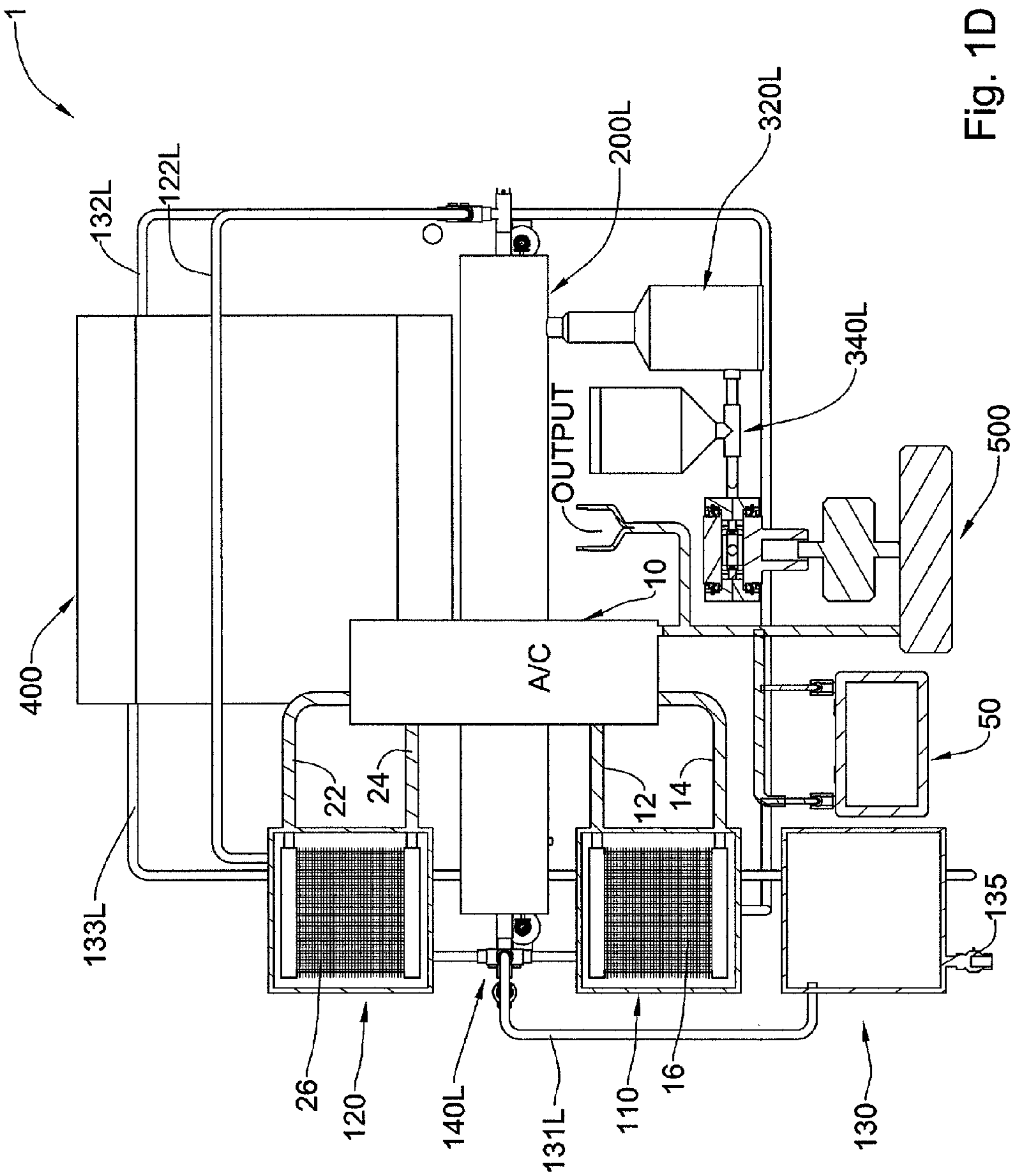
Figure 2A:
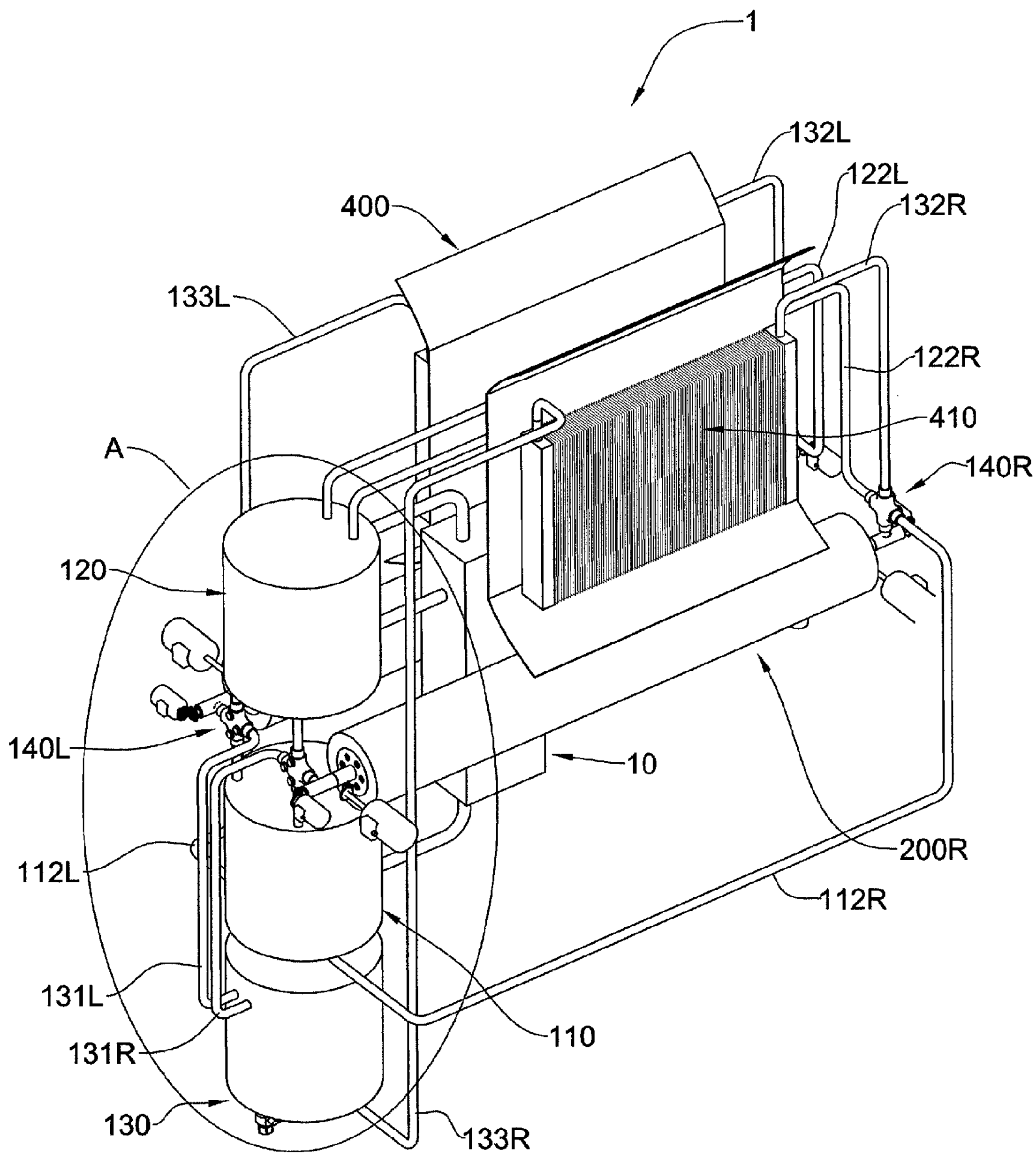
FIG. 2A is a schematic isometric view of the generator shown in FIG. 1A, without the mechanical power units and the energy generation unit.
Figure 2B:
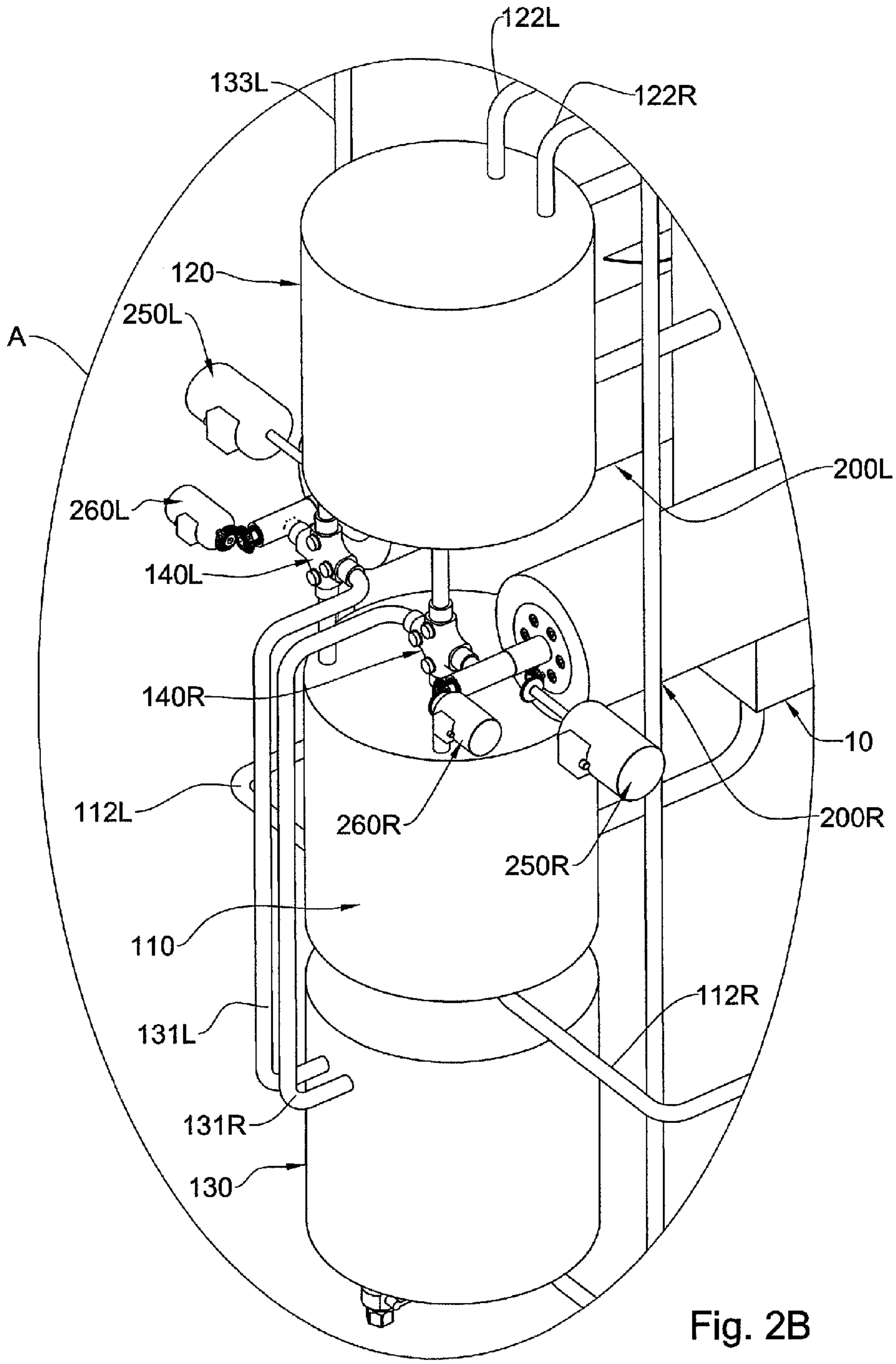
FIG. 2B is a schematic enlarged view of detail A shown in FIG. 2A.

In construction, the high temperature reservoir 110 and the low temperature reservoir 120 constitute part of the air conditioning unit 10, as is observed from FIG. 1D. Each of the reservoirs 110, 120 has fully immersed therein a tube array adapted to receive an operating fluid of the air conditioning unit 10, e.g. Freon gas.

In particular, the air conditioning unit 10 has a compressor (not shown) adapted to compress the Freon gas into the tubes of the high temperature reservoir 110 through line 12, such that the heated Freon gas conveys the heat to the water of the high temperature reservoir. The cooled Freon gas then leaves the high temperature reservoir 110 via line 14 back to the air conditioning unit 10. The cooled Freon gas is then provided to the low temperature reservoir 120 via inlet 22, in the tubes of which it is allowed to expand, thereby cooling the water of the low temperature reservoir 120, and leaving it via line 24 back into the air conditioning unit 10. This process takes place repeatedly in order to provide a high temperature water reservoir in the high temperature reservoir 110, and a low temperature water reservoir in the low temperature reservoir 120.

It is appreciated that the above operation was described with respect only to the right pressure vessel 200R, however, a similar operation can be simultaneously performed on the left pressure vessel 200L. Thus, two main operational cycles can be performed as follows:

a) simultaneous cycle—both the left and the right pressure vessel 200L, 200R perform steps (I) to (IV) above in parallel. In other words, at any time point throughout the generator cycle, the temperature of the pressure medium in the right pressure vessel 200R is similar to that of the pressure medium in the left pressure vessel 200L, i.e. both pressure mediums heat up simultaneously and cool simultaneously;

b) alternating cycle—the pressure vessels 200L, 200R perform steps (I) to (IV) at an offset, e.g. when the right pressure vessel 200R performs step (I) of the cycle, the left pressure vessel 200L performs step (III) of the cycle. In other words, when the pressure medium in the right pressure vessel 200R undergoes heating, the pressure medium in the left pressure vessel 200L undergoes cooling and vise versa.

In general, the pressurized fluid within the pressure vessels 200L, 200R should be chosen such that it has good heat expansion properties (expands considerably under heating), as well as sufficient heat transfer capabilities. Examples of materials used for the pressurized fluid can be (yet not limited to): water, N-Pentene, Diethyl ether, Ethyl Bromide, Methanol, Ethanol, Mercury, acids and others. It should also be understood that the pressurized fluid is not limited to a liquid medium and can be constituted also by a gas material.

The work medium passing through the core 240 should be chosen such that it has sufficient heat transfer properties and a density allowing easy propulsion thereof through the generator 1. Examples of materials used for the pressurized fluid can be (yet not limited to): water, Mercury, Freon and others. It should also be understood that the work medium is not limited to a liquid medium and can be constituted also by a gas material (e.g. Freon in gas form).

Turning now to FIGS. 2A to 4A to 4F, unique construction of the pressure vessels 200 and the cores 240 will be described in detail.

Each of the pressure vessel 200L, 200R comprises an external shell 210 made of a material which is both strong enough and thick enough to sufficiently withstand the pressure of the pressurized fluid, i.e. about 5000 atm. An example of such a material can be steel.

Within the pressure vessel 200L, 200R, there passes a core 240 through which the work medium is adapted to pass. The core 240 can be made, on the one hand of a material which is also able to withstand the high pressure within the pressure vessel 200L, 200R, and on the other hand has sufficient heat capacity and heat transfer properties in order to provide an effective heat transfer process between the work medium and the pressurized fluid. Examples of such a material can be Copper-Beryllium, 4340 steel etc.

Figure 4A:
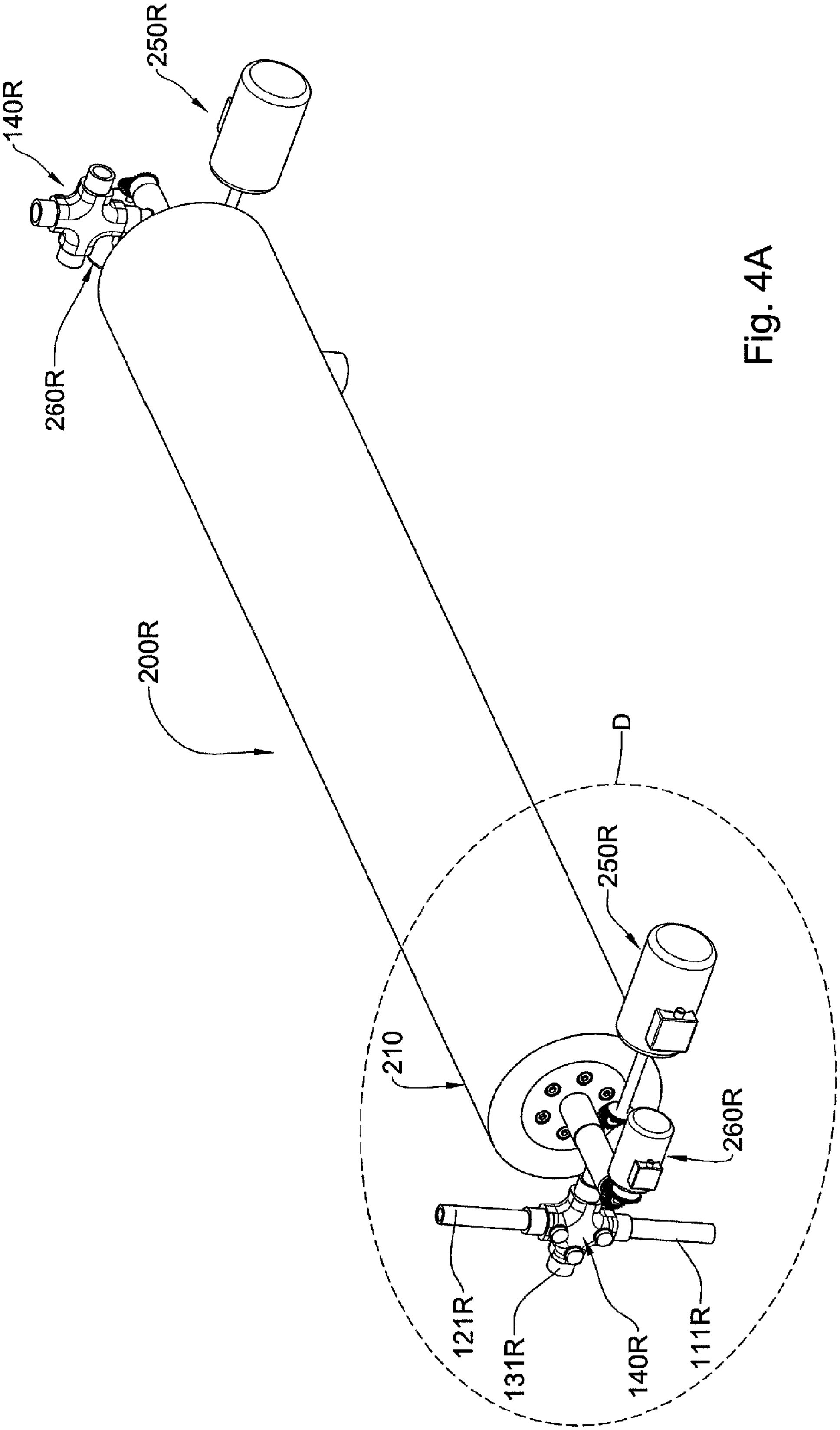
FIG. 4A is a schematic isometric view of a pressure vessel of the generator shown in FIG. 1A.
Figure 4B:
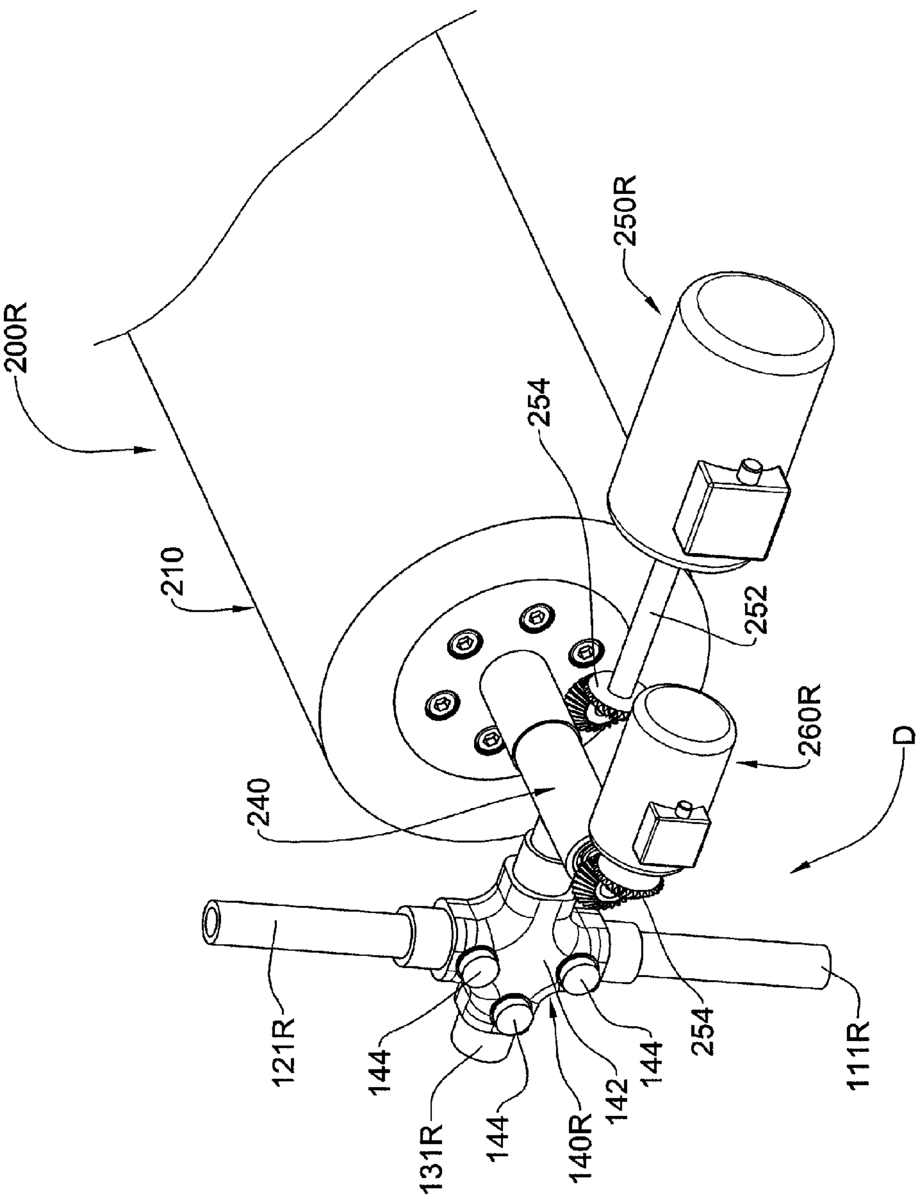
FIG. 4B is a schematic enlarged view of detail D shown in FIG. 4A.
Figure 4C:
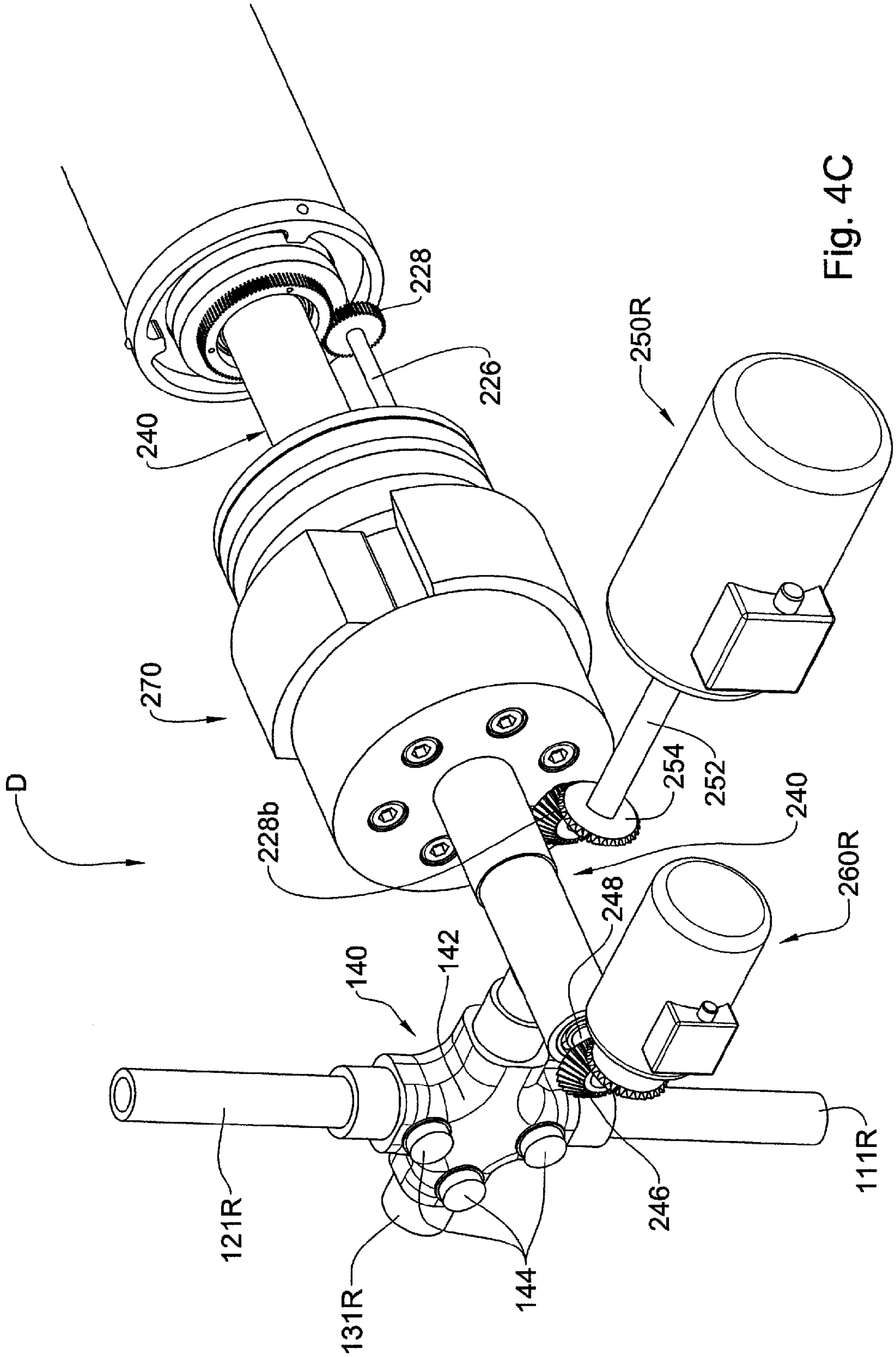
FIG. 4C is a schematic isometric view of detail D shown in FIG. 4A, with the shell of the pressure vessel being stripped away.
Figure 4D:
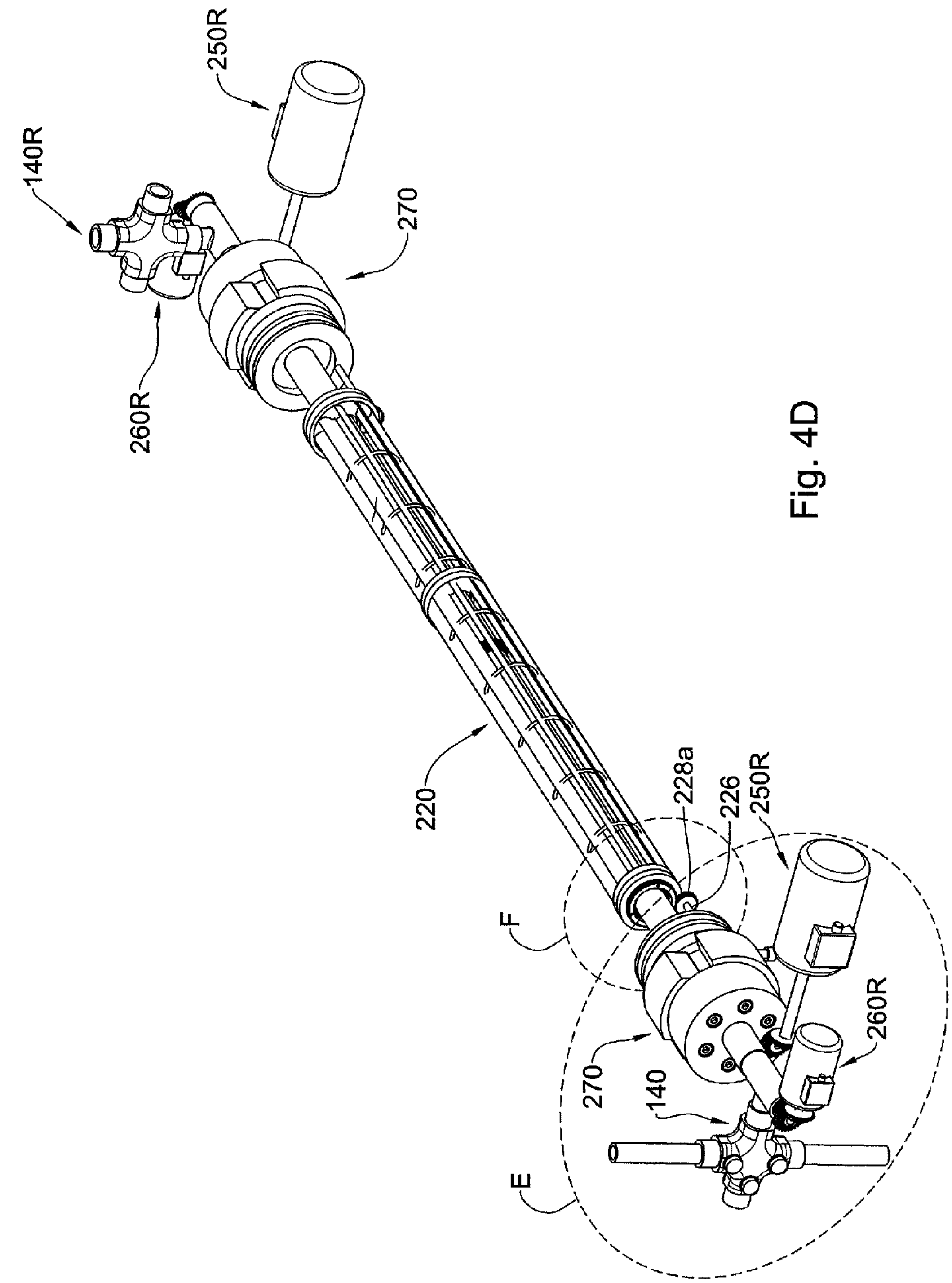
FIG. 4D is a schematic isometric view of the pressure vessel shown in FIG. 4A with the shell being stripped away.

Particular reference is drawn to FIG. 4B, in which a segment of the core 240 is shown. It is observed that the inner and outer surfaces of the core are formed with surface elements 247 in the form of pyramids. The purpose of the surface elements 247 is to increase the contact area with the work medium and the pressurized fluid, thereby increasing the effectiveness of the heat transfer between the core 240 and the work medium/pressurized fluid. Forming of the elements 247 can be performed by gradual sand spraying on the outside, and on the inside using a designated finishing head (not shown). In this manner, the surface area of the core 240 can be increased by almost 20 times (compared to a smooth inner/outer surface).

Figure 4E:
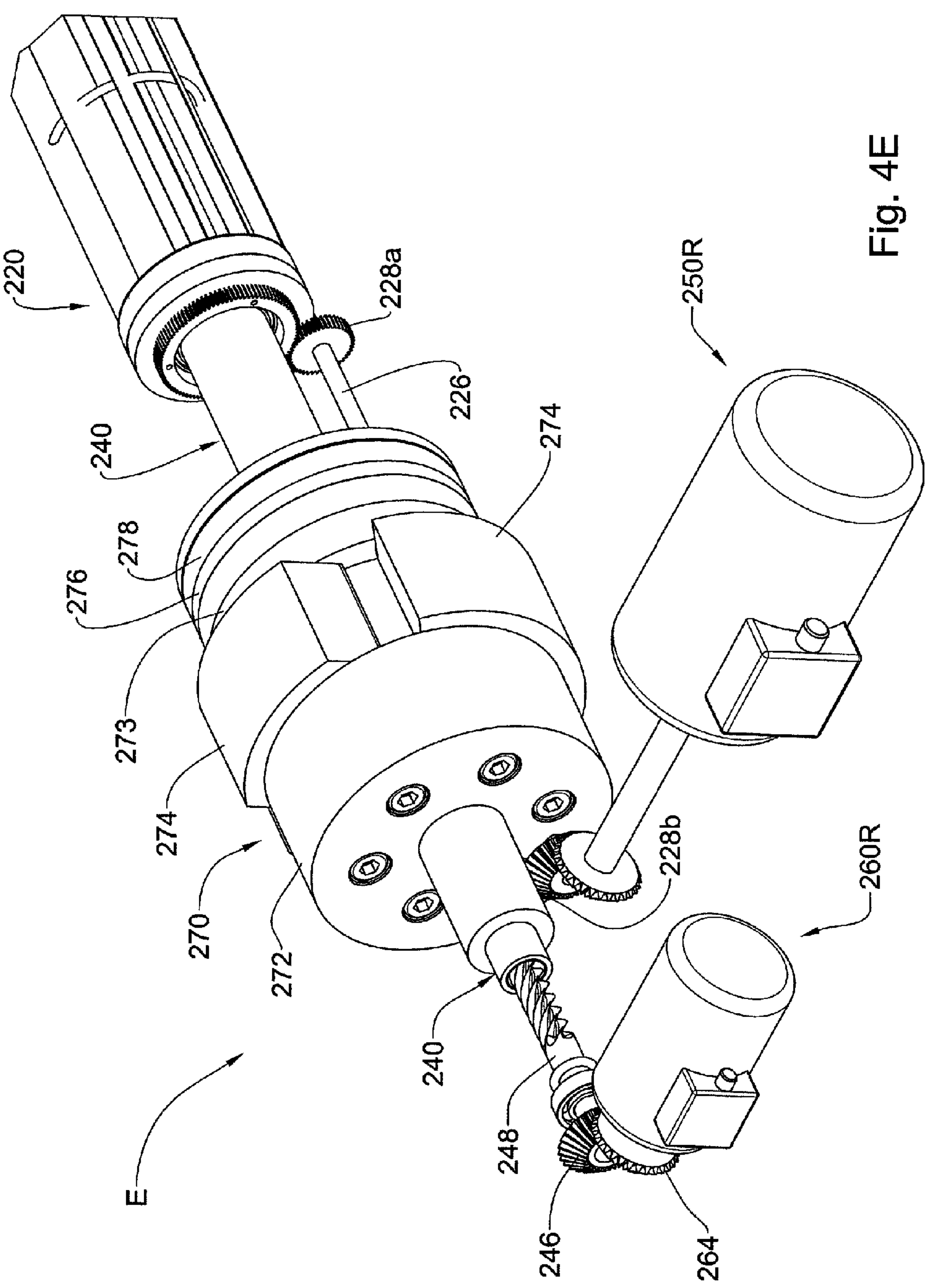
FIG. 4E is a schematic enlarged view of detail E with several other components being stripped away.
Figure 4F:
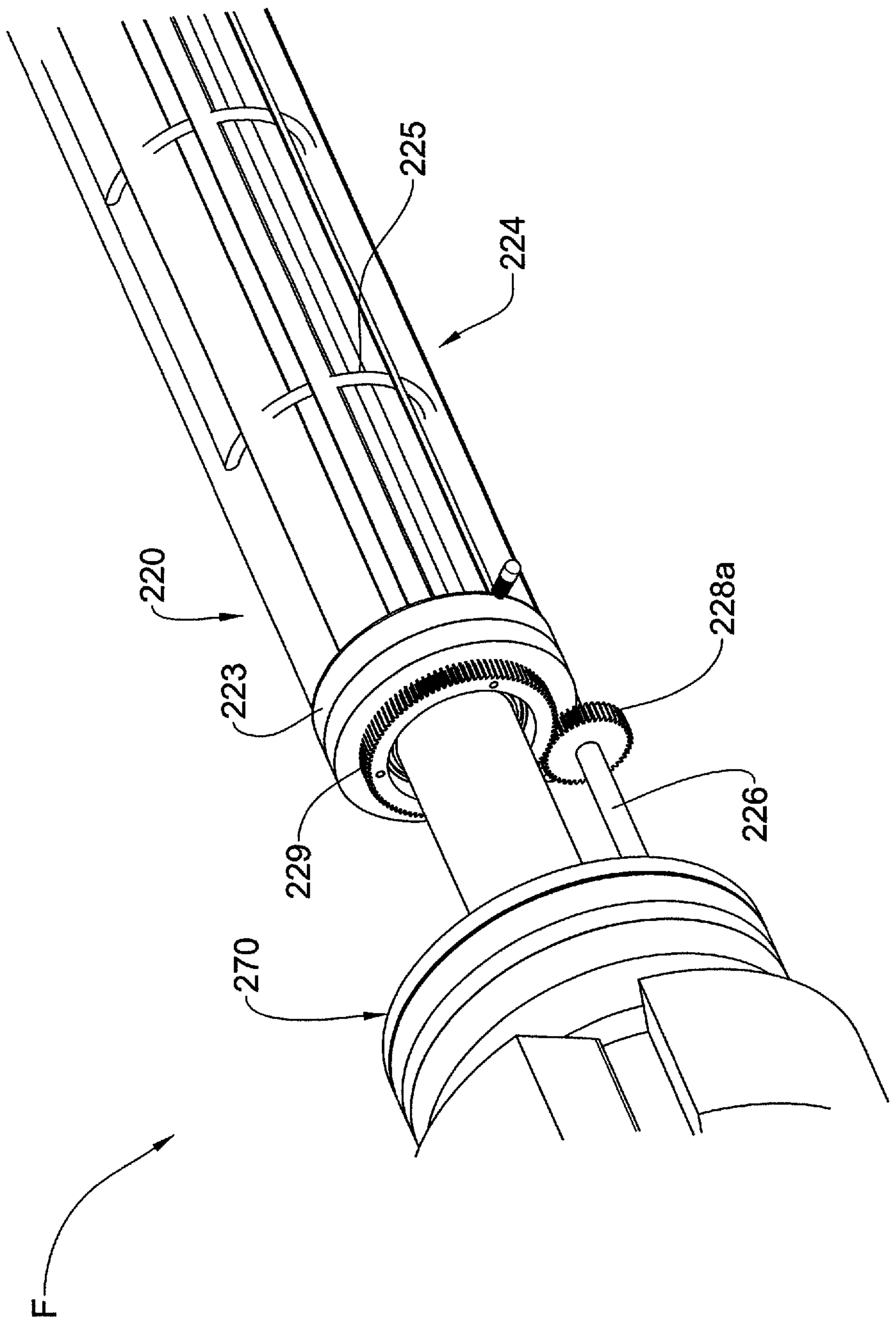
FIG. 4F is a schematic enlarged view of detail F. shown in FIG. 4A.

With particular reference to FIG. 4F, on the core there is mounted a mixing unit 220 adapted for mixing the pressurized fluid during operation of the generator in order to increase its effectiveness. The mixing unit 220 has a central axis X extending in the direction of the core 240 and comprises a plurality of fan blades 224 spread about the central axis X, connected to one another using rings 225. The mixing unit 220 is delimited on each side by a limit ring 223. The fan blades 224 can be made of a material having sufficient insulation properties so as to reduce heat losses to the blades 224 themselves, having low heat capacity to reduce heat absorption and lightweight to minimize the required drive power. Such a material can be, for example, Titanium.

The limit ring 223 is fitted with a spur-gear 229 adapted to mesh with a gear 228*a* mounted on a driving rod 226. The driving rod 226 is driven by an external motor 205L, 250R, the connection being between a gear 228*b* mounted on the driving rod 226 and a corresponding gear 254 of the driving motor 250R.

It should be noted that according to a particular design, the motor can be located within the pressure vessel, not necessarily outside the vessel—saves on energy required for overcoming dynamic resistance of the shaft and the forces acting in conjunction with the seal. Another option is revolving the shaft using a magnetic mechanism—eliminating the need for complex dynamic seals.

Figure 7B:
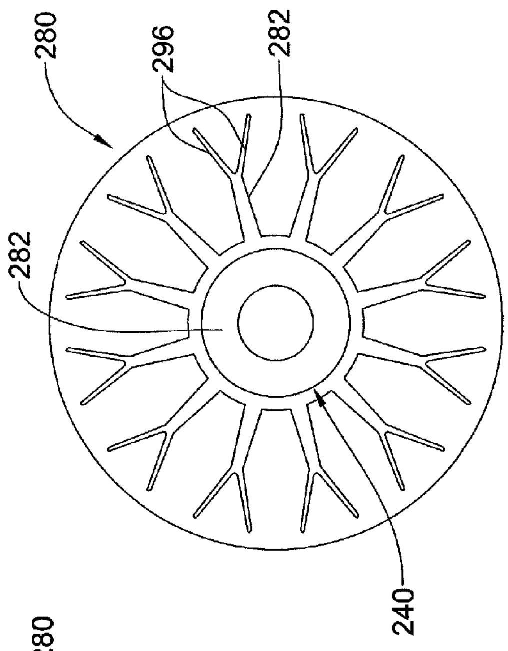
FIGS. 7A to 7C are respective schematic front views of heat dissipation units used in the pressure vessel.
Figure 7A:
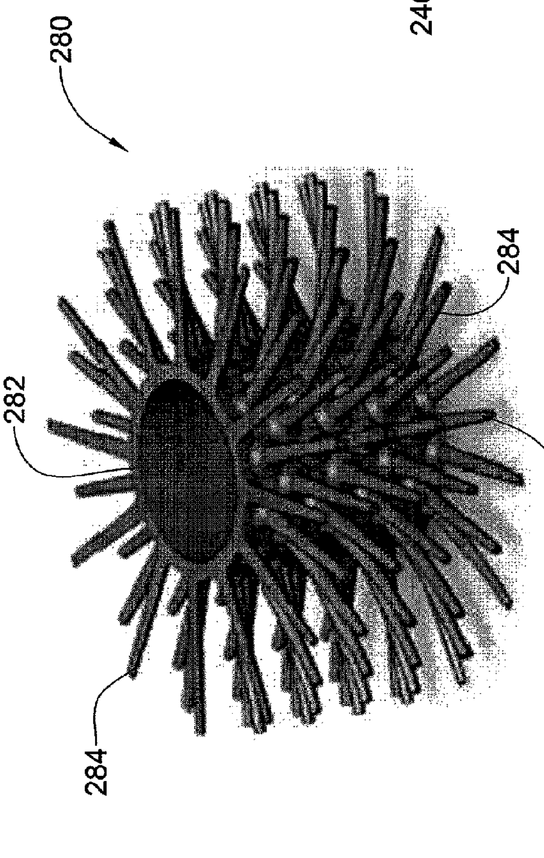
Figure 7C:
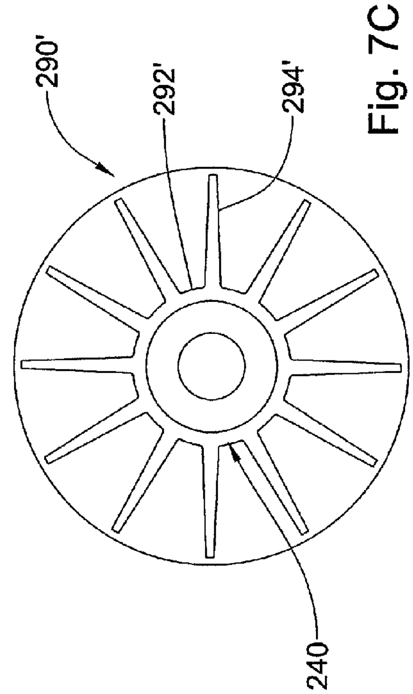
Figure 8A:
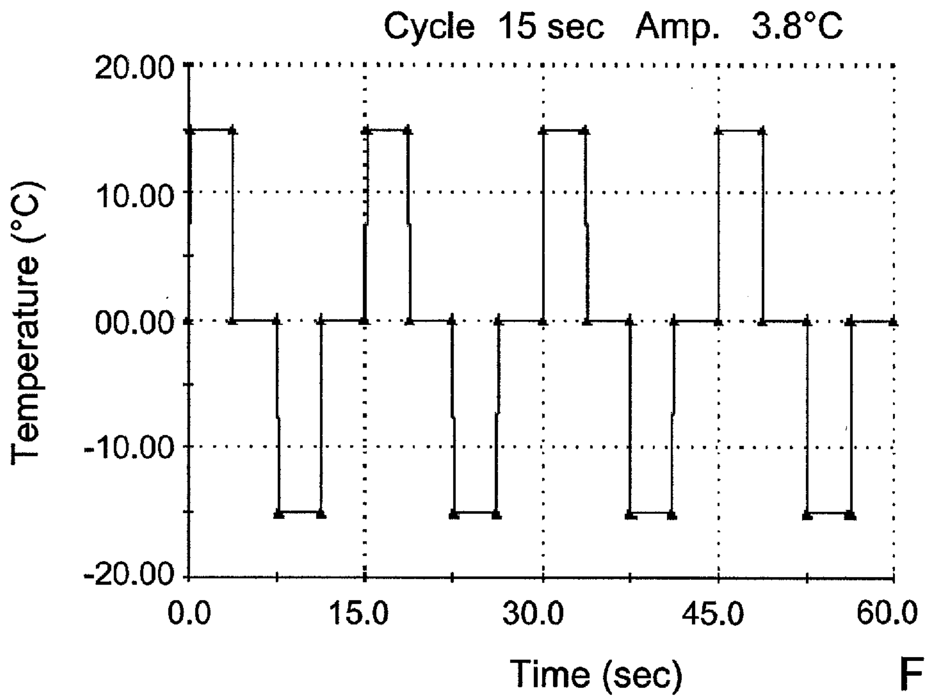
FIGS. 8A to 8F are respective schematic diagrams of analysis of operation of the generator.
Figure 8A:
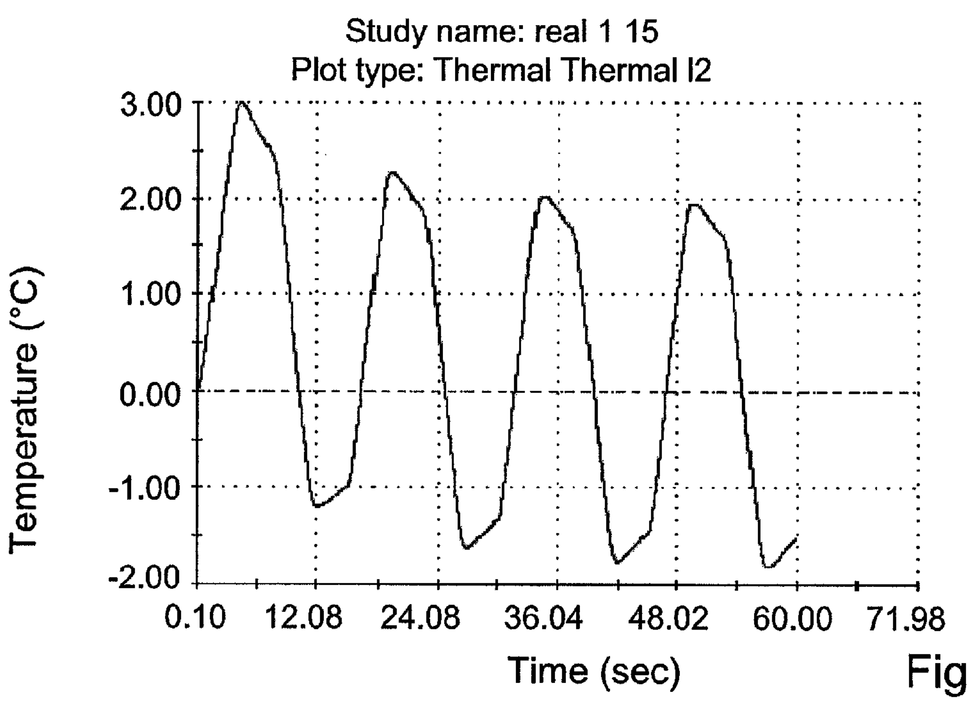
Figure 8B:
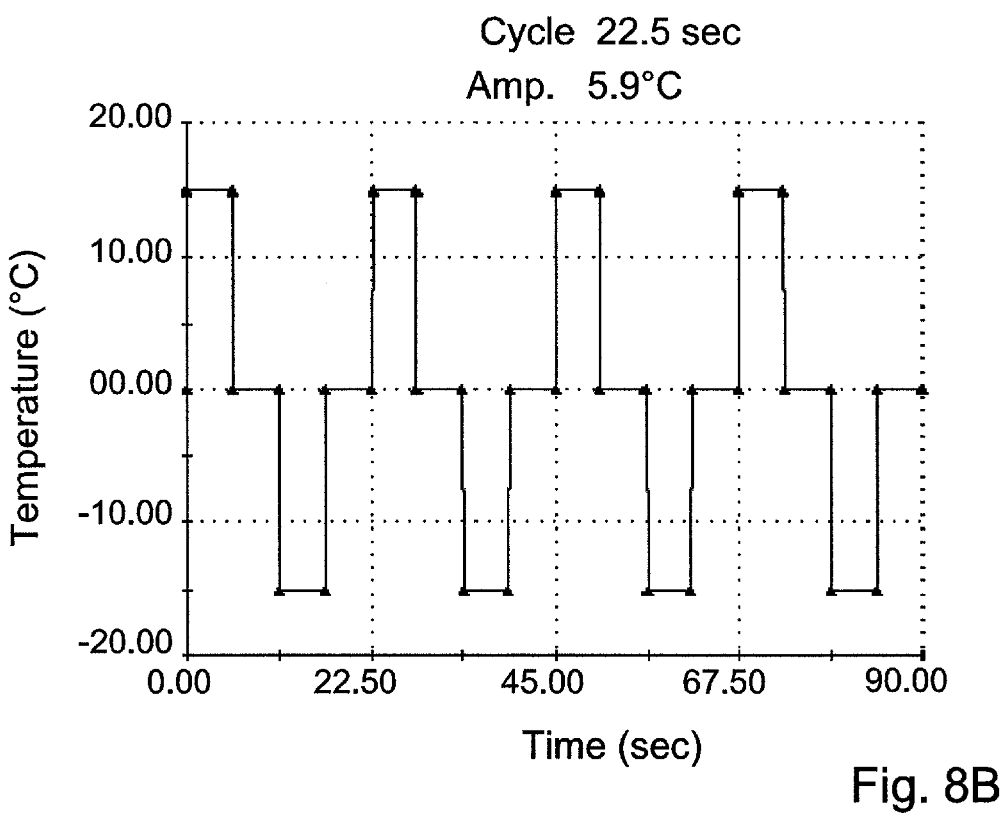
Figure 8B:
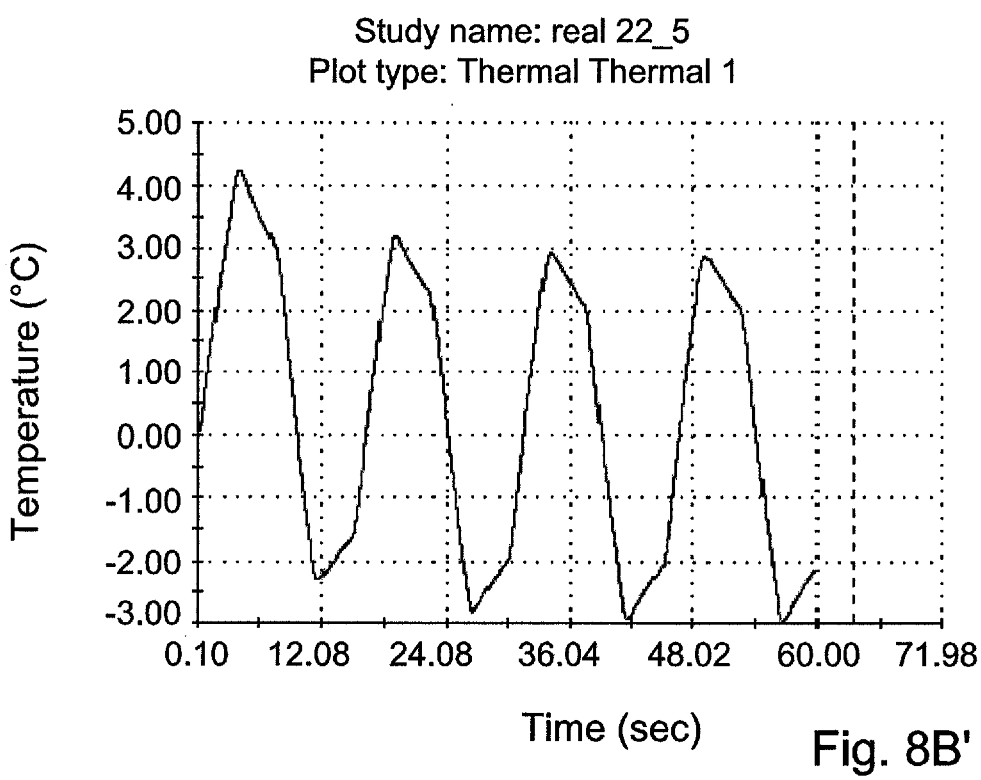
Figure 8C:
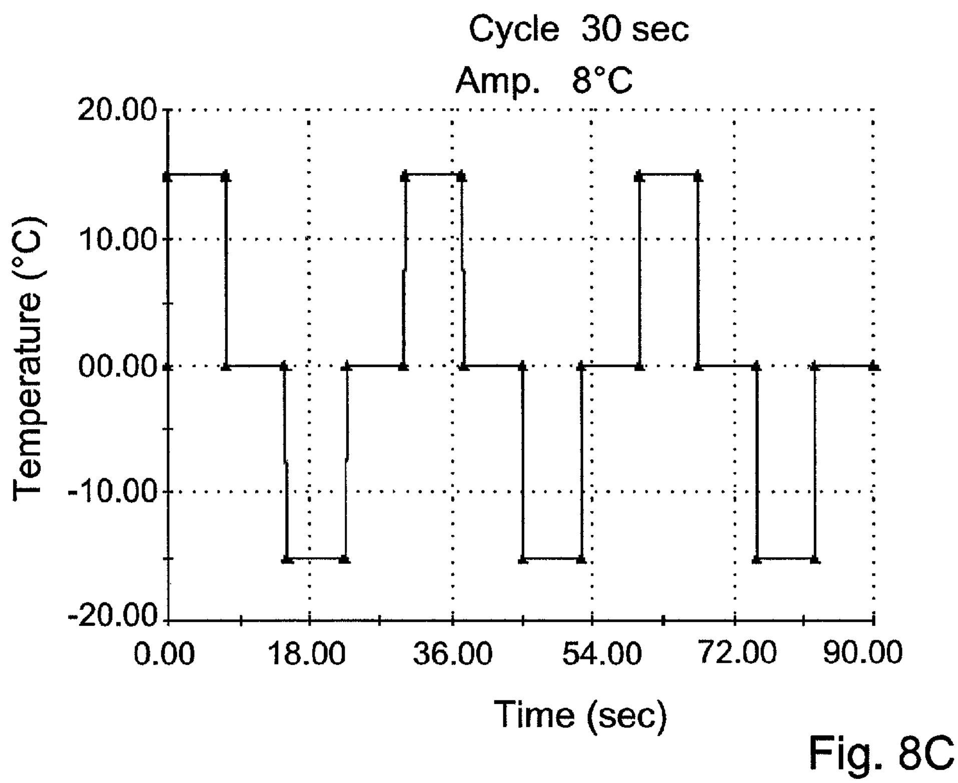
Figure 8C:
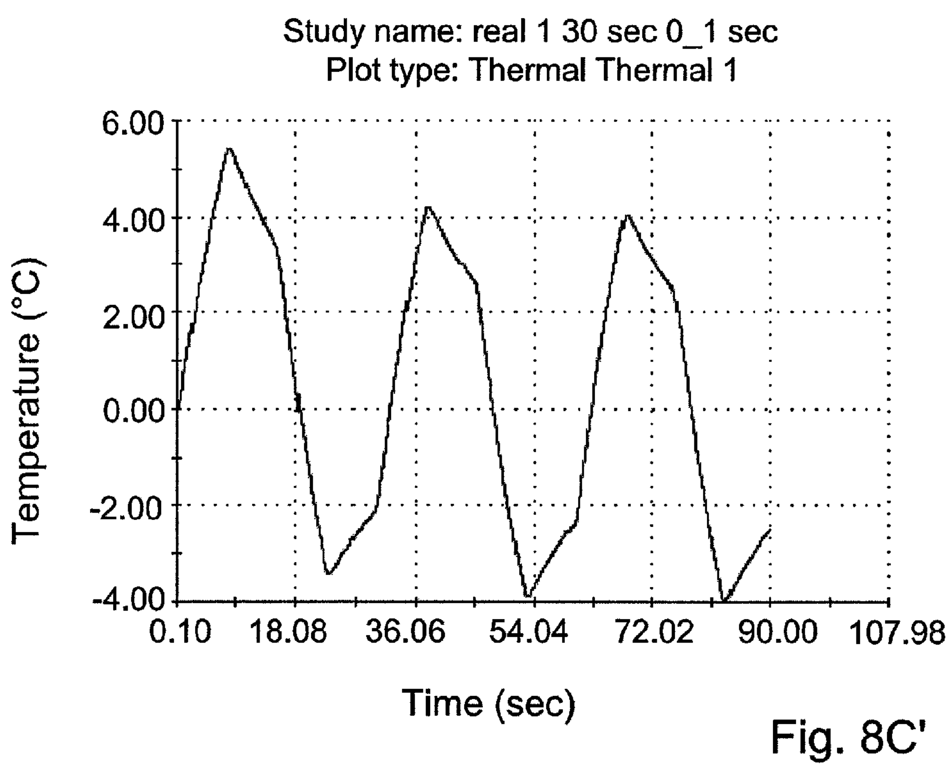
Figure 8D:
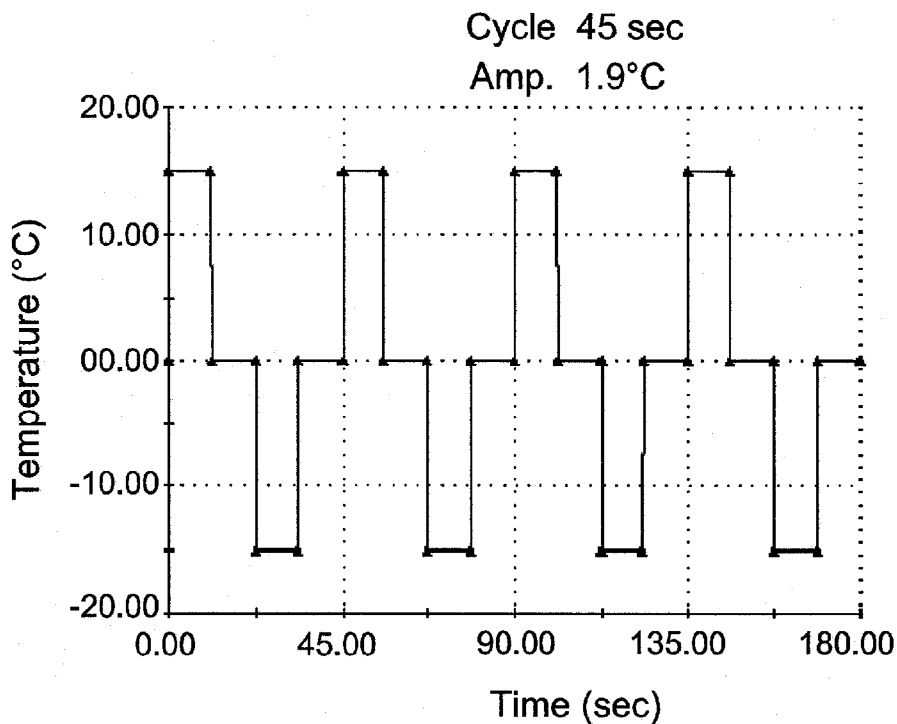
Figure 8D:
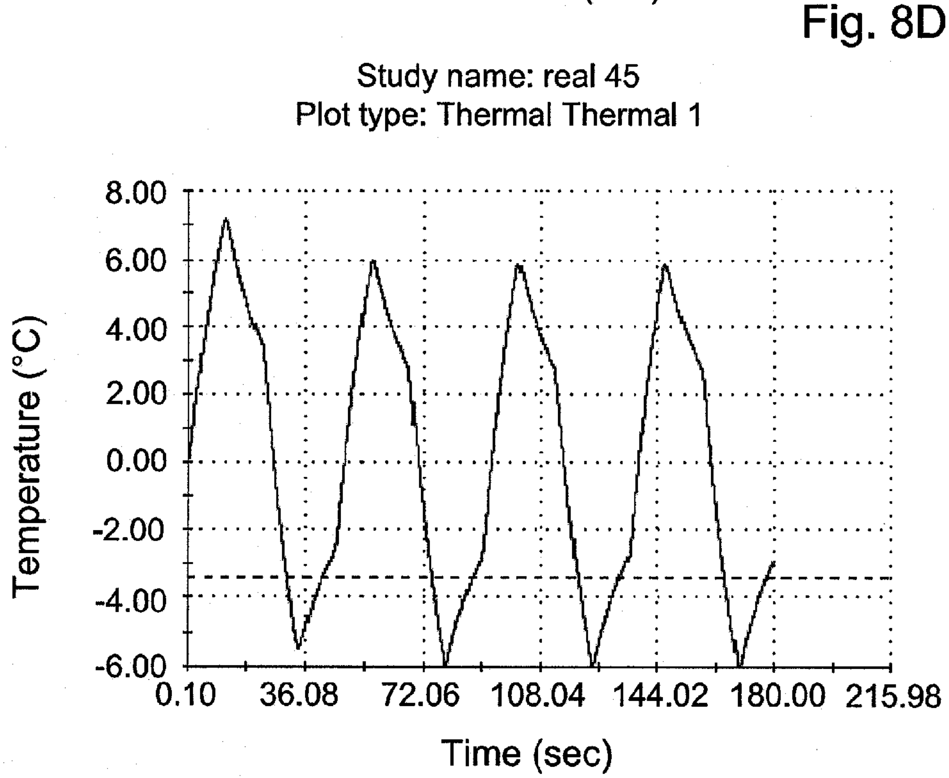
Figure 8E:
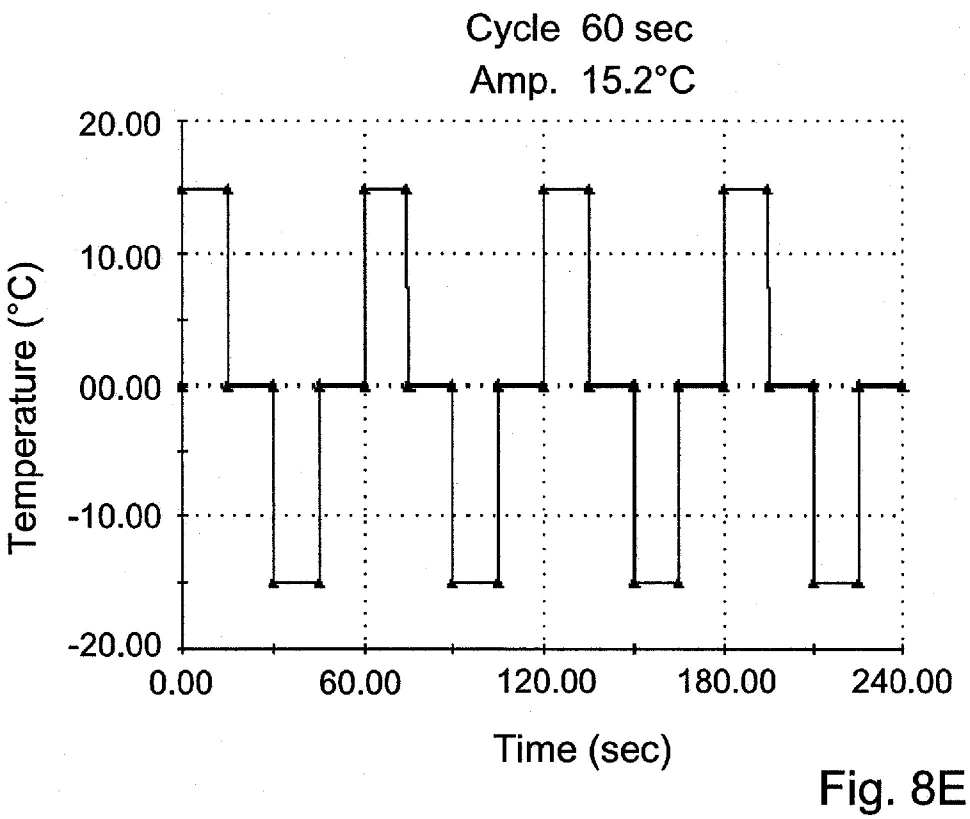
Figure 8E:
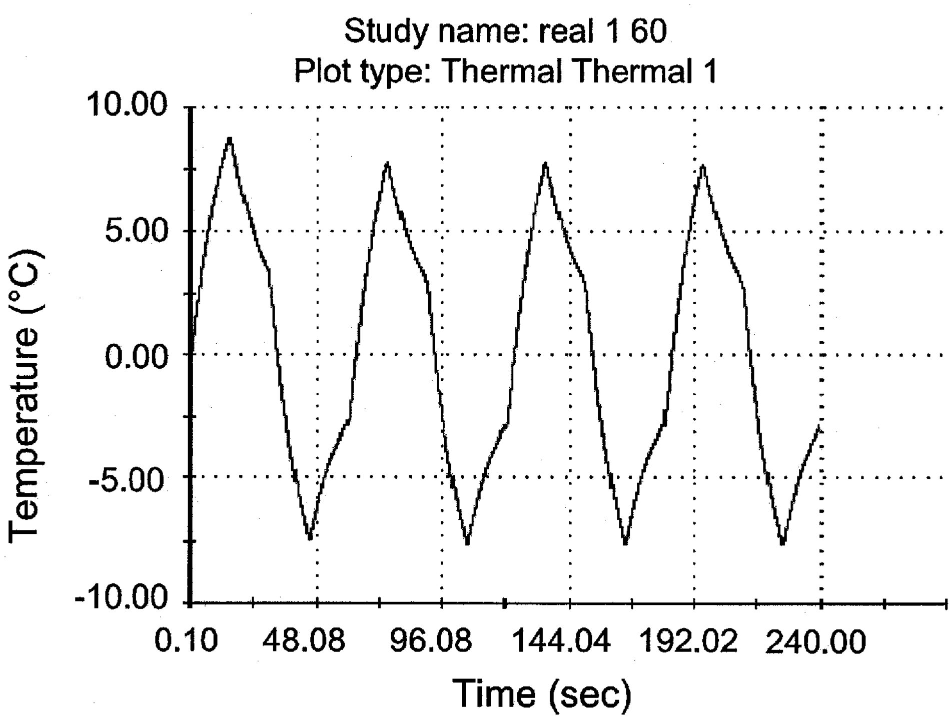
Figure 8F:
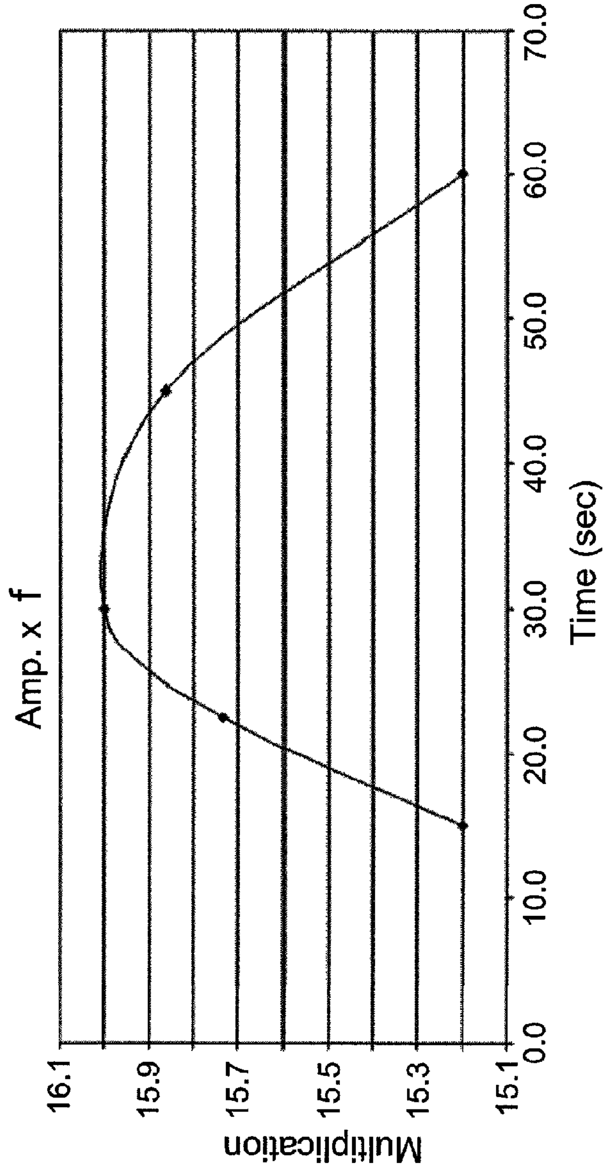

As an alternative to the mixing unit 220 described above, attention is drawn to FIGS. 7A to 7C, where three variations of passive heat dissipation units 280, 290 and 290' are shown. The heat dissipation unit 280 is in the form of a sleeve 282 from which a plurality of heat dissipating elements 284 extend radially, adapted for increasing the heat transfer between the core 240 and the pressurized fluid. The heat dissipation unit 290 has a central sleeve 292 with radial heat dissipation elements 294 extending therefrom. The heat dissipation unit 290' is generally similar with the difference being in that each of the heat dissipation elements 294' is formed with additional extension 296' for increased heat transfer.

The heat dissipation units 280, 290 and 290' are firmly attached to the core 240 so as to have a maximal surface contact therewith, allowing for better conduction heat transfer.

Figure 5A:
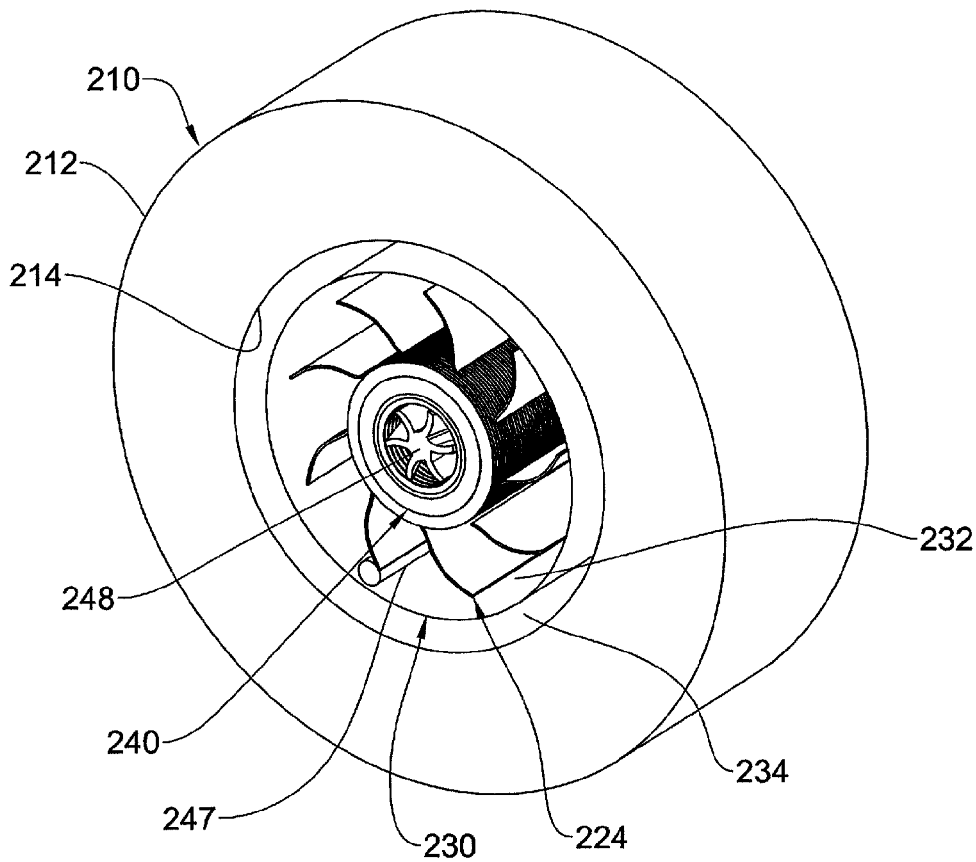
FIG. 5A is a schematic isometric cross-section view of the pressure vessel.
Figure 5B:
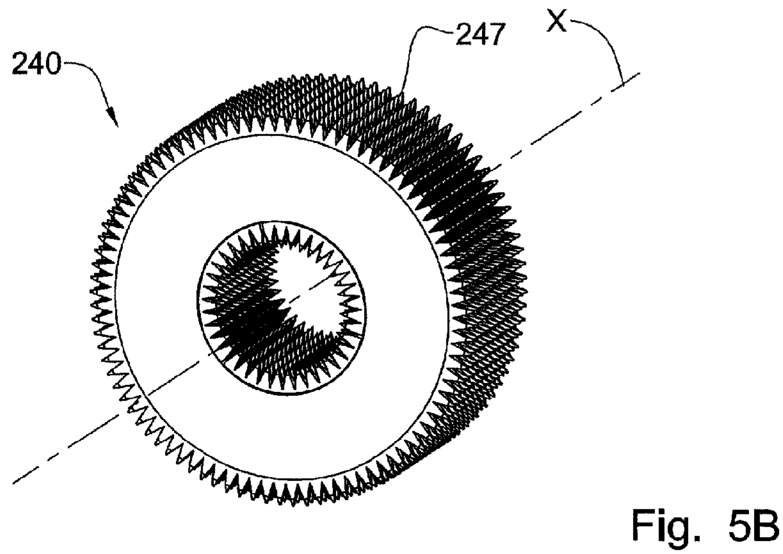
FIG. 5B is a schematic isometric view of a segment of the core of the pressure vessel.
Figure 5C:
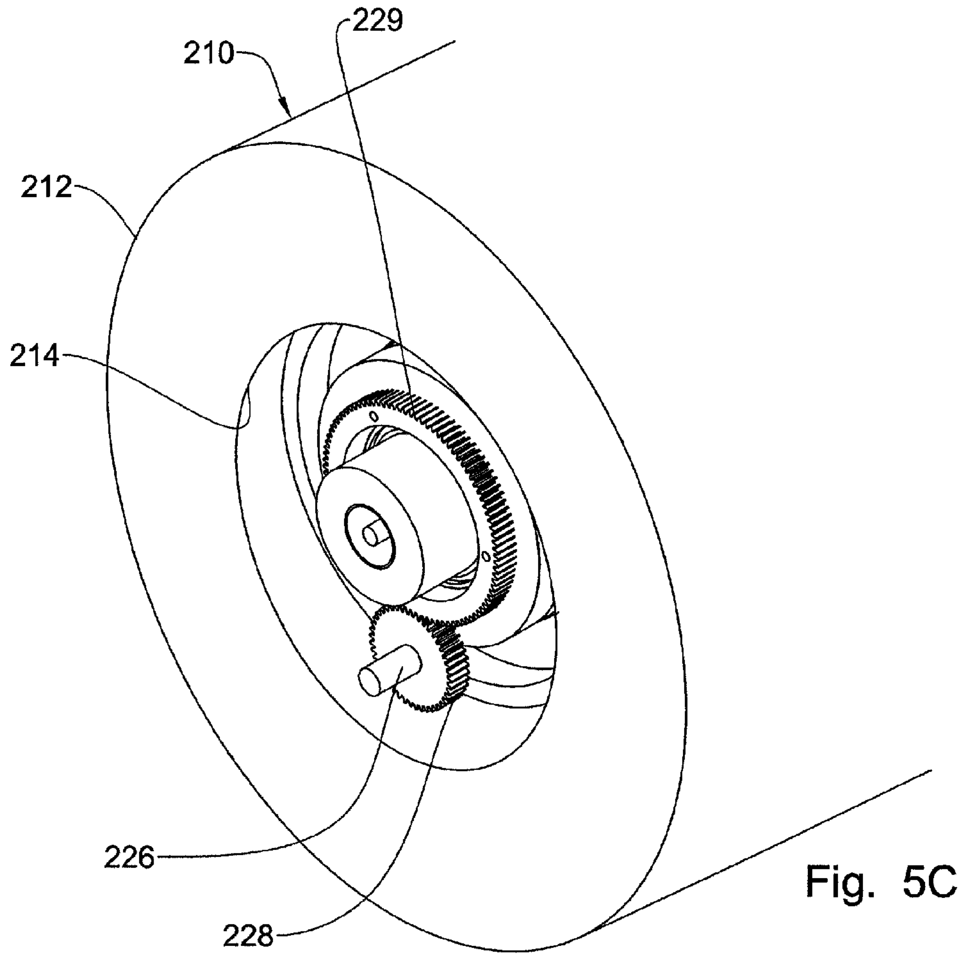
FIG. 5C is an additional isometric cross-sectional view of the pressure vessel.

With particular reference being drawn to FIG. 5A, the pressure vessel 200L, 200R further comprises an inner shell 230 having a diameter smaller than that of the inner surface 214 of the shell 210, and greater than that of the mixing unit 220. Thus, the shell 230 divides the inner space of the pressure vessel 200L, 200R into an inner chamber 232 between the shell 230 and the mixing unit 220, and an outer chamber 234 between the shell 230 and the inner surface 214 of the pressure vessel 200L, 200R. The shell 230 can be made of a material having sufficient insulation properties so as to reduce heat losses to the shell 230 itself, for example, Titanium.

It should be noted that the inner chamber 232 and the outer chamber 234 are in fluid communication with one another since the shell 230 is open at both ends. In operation of the generator 1, separation to an inner chamber 232 and an outer chamber 234 facilitates insulation of the pressurized fluid of the inner chamber 232 by the pressurized fluid in the outer chamber 234 (despite the face they are in fluid communication with one another). Insulation of the pressurized fluid increases the efficiency of the generator 1 by reducing the heat losses to the external steel shell 210. It should also be noted that the circulation created by the mixing unit 240 hardly effects that pressurized fluid contained between the shell 230 and the inner surface of shell 210.

Figure 14A:
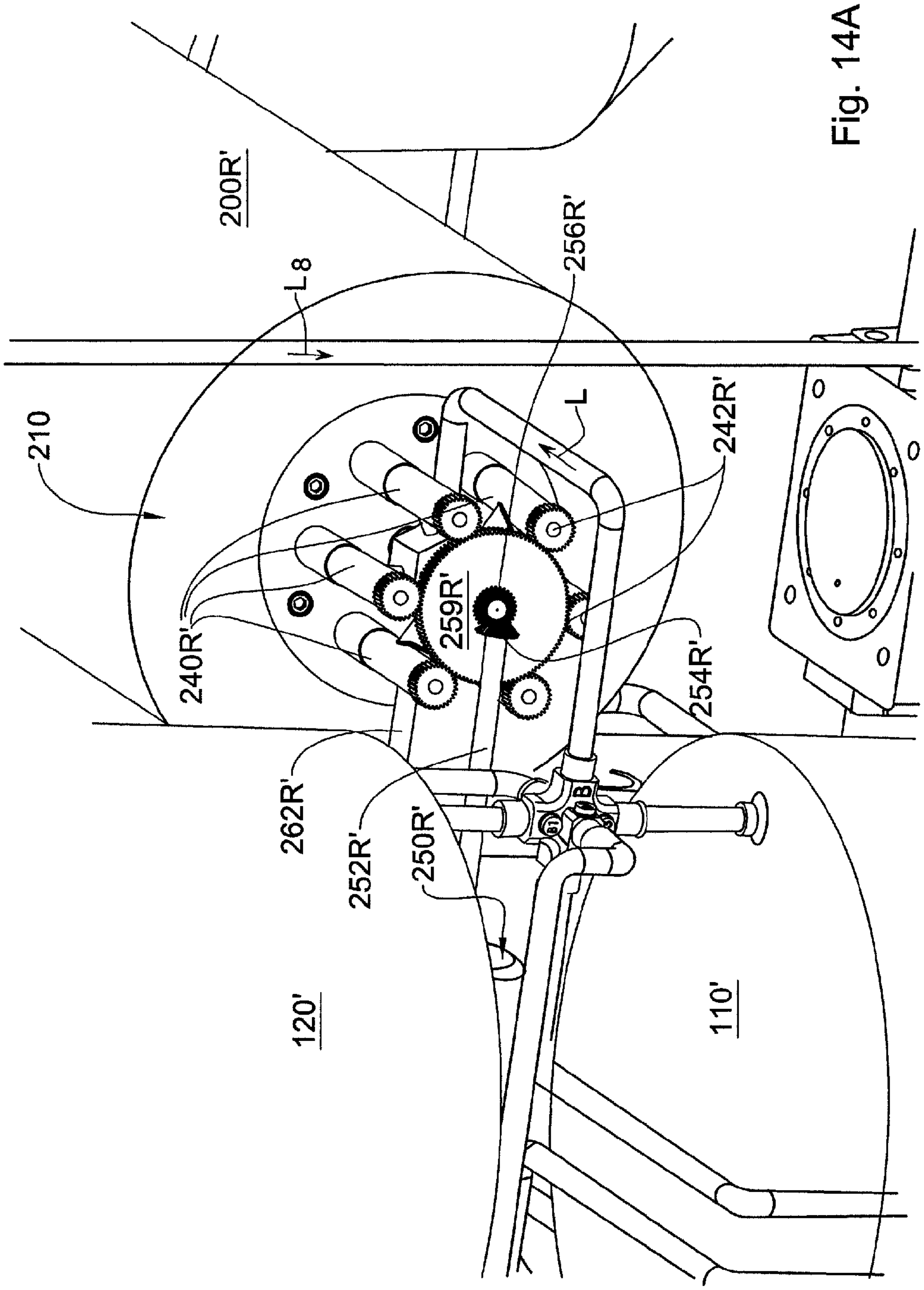
FIG. 14A is a schematic isometric view of a mixing mechanism used in the generator shown in FIGS. 11A and 11B.
Figure 14B:
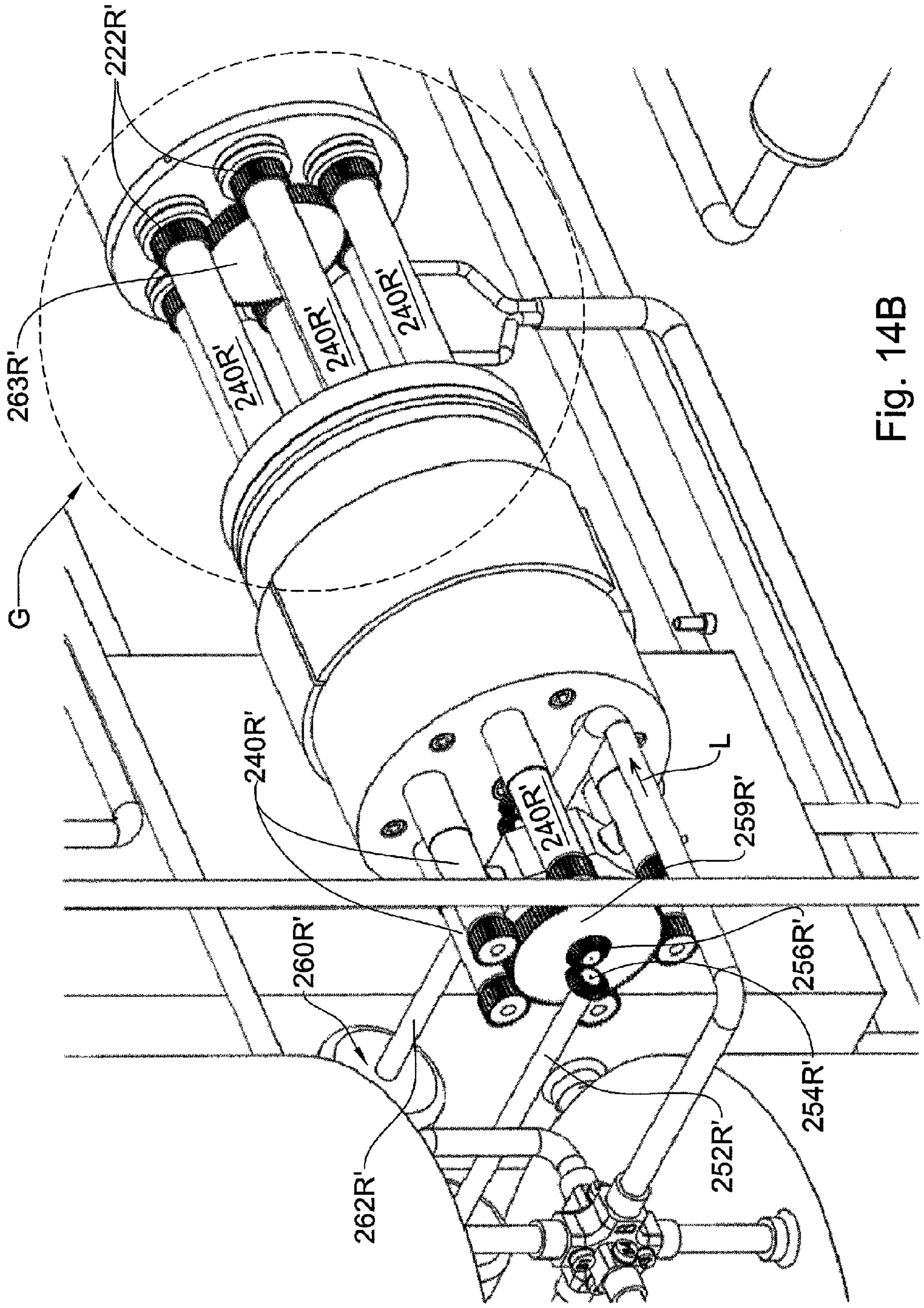
FIG. 14B is a schematic isometric view of the mixing mechanism shown in FIG. 14A, with the several components of the generator being removed.
Figure 14C:
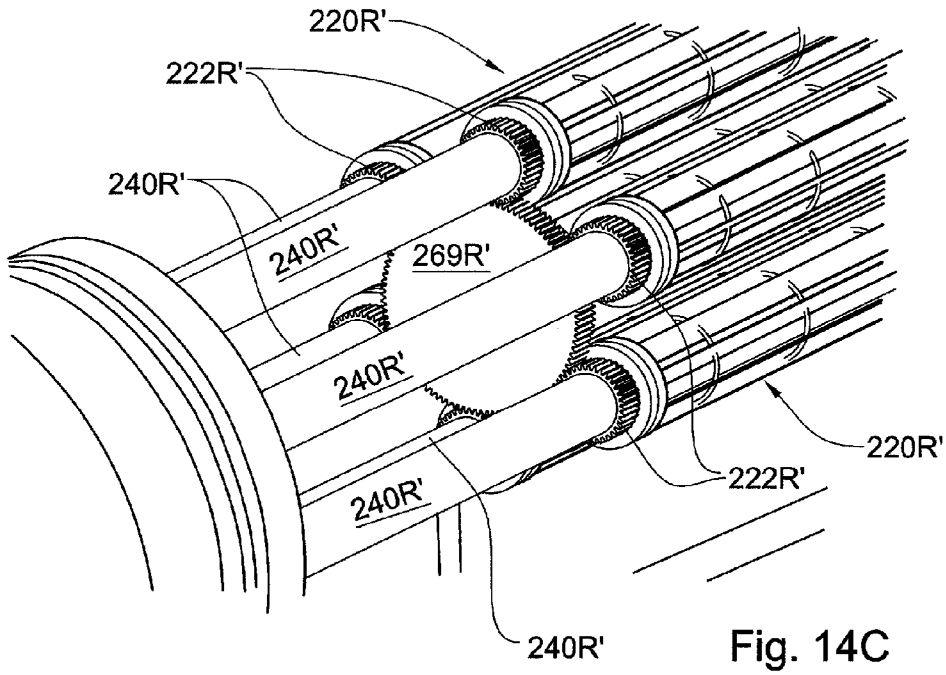
FIG. 14C is a schematic enlarged view of detail G shown in FIG. 14B.
Figure 14D:
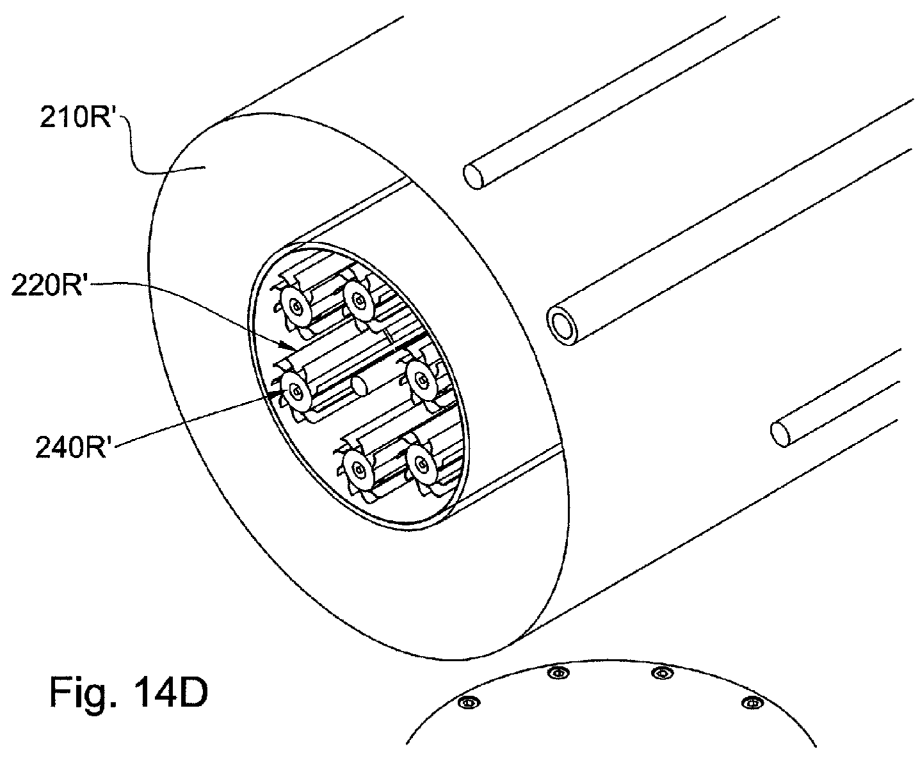
FIG. 14D is a schematic cross-sectional view of a pressure vessel used in the generator shown in FIGS. 11A and 11B, taken along a plane perpendicular to the central axis of the pressure vessel.

Reverting to FIG. 4F, the core 240 is fitted therein with a drive-screw 248 adapted to revolve about itself in order to propel the work medium through the core 240 (working on a principle similar to the Archemedes screw). The drive-screw 248 is driven by an external motor 260L, 260R, and is connected thereto via meshing of the gear 246 with the gear 264 of the motor 260L, 260R. The drive-screw 248 can be made of a material having sufficient insulation properties so as to reduce heat losses to the drive-screw 248 itself. Examples of such a material can be Titanium or high-strength plastic. It is noted that over variations of the drive screw 248 can be used, as will be evident from FIGS. 14F and 14G to be later discussed.

With reference to FIGS. 3C and 4E, each of the pressure vessels 200R, 200L is fitted at both ends thereof with a sealing assembly 270, comprising a head seal 272 fastened by bolts, a main seal body 273 onto which three sealing members 274 are mounted, an auxiliary seal assembly 276 and a soft sealing member 278. In addition, there are provided two seals 276', 278' of similar design (shown FIG. 3C), used for sealing the space between the main seal body 273 and the core 240.

Turning now to FIGS. 3A to 3E, the mechanical power assembly 300 and the power generator unit 500 will now be described in detail. Each of the pressure vessels 200L, 200R is fitted at one end thereof with a mechanical power assembly 300L, 300R. Since both mechanical power assemblies 300L, 300R are essentially similar, only one of them will now be described in detail, understanding that the description holds true for the other assembly as well.

The mechanical power assembly 300R is in maintained in fluid communication with the pressure vessel 200R via an outlet port 216R. The mechanical power assembly 300R comprises a piston unit 320R, and a pressure regulator 340R.

The piston unit 320R has a hollow housing 322 and a neck portion 324 articulated to the port 216 of the pressure vessel 200R. The neck portion 324 is formed with an inlet orifice 326 providing fluid communication between the pressure vessel 200R and the neck portion 324.

Within the housing 322 there is contained a displaceable piston 330 having a head portion 332 snugly and sealingly received within the housing 322 by o-rings 333, and a neck portion 334 snugly received within the neck portion 324. Thus, the housing 322 is divided into an inlet chamber $\mathbf{323}_I$ being in fluid communication with the pressure vessel 200R to receive therein the pressure medium, and an outlet chamber $\mathbf{323}_O$, the chambers being isolated from one another by the heat portion 332.

The design of the piston unit 320 is such that the inlet chamber $\mathbf{323}_I$ is adapted to contain therein some of the pressure medium and the outlet chamber $\mathbf{323}_O$ is adapted to contain therein an auxiliary work medium, adapted for operating the generator unit 500. Such a fluid can be, for example, machine oil or the like. The housing 322 is further formed with an outlet port 325 through which the auxiliary fluid can leave the piston unit towards the generator unit 500.

In operation, during stage (I) of the generator cycle, the pressure medium heat up and its volume increases, thereby flowing into the inlet chamber $\mathbf{323}_I$, pushing the head portion 332 of the piston 330 towards the bottom 328 of the housing 322. As a result, the auxiliary work medium contained within the outlet chamber $\mathbf{323}_O$ is pressured out through the outlet port 325 and into line 302.

During stages (II) and (III) of the cycle, the pressure medium cools down and its volume decreases, thereby flowing from the inlet chamber $\mathbf{323}_I$ back into the pressure vessel 200R, pulling the head portion 332 of the piston 330 towards the neck portion 324 of the housing 322. As a result, the auxiliary work medium is sucked back into the outlet chamber $\mathbf{323}_O$.

The piston 330 is designed such that the cross-sectional area of the head portion 322 is 20 times greater than that of the cross-sectional area of the neck portion 324, thereby reducing the pressure in the outlet chamber $\mathbf{323}_O$ from 5000 atm. to about 250 atm. The back and forth movement of the auxiliary fluid is used for operating a piston of the motor 520 (FIGS. 6A and 6B), which is in turn used for the generation of electricity.

In addition, the auxiliary work medium is also in fluid communication with the pressure regulator 340 situated between the piston unit 320 and the generator unit 500. The pressure regulator 340 is formed with a housing 342 holding therein a piston 350 biased by a compression spring 360. According to alternative examples the piston 350 can be biased by a compresses gas, e.g. Nitrogen. The pressure regulator 340 is formed with a T-junction member 343 having an inlet port 345 adapted to receive line 302, a housing inlet 346 and an outlet port 347 connected to line 304.

In operation, most of the auxiliary fluid leaving the outlet chamber $\mathbf{323}_O$ of the piston unit 320 via line 302 flows directly, through the T-junction 343 into line 304 via outlet 345, while the remainder of the auxiliary fluid flows into the pressure regulator 340. Thus, upon an undesired increase of pressure, the piston 350 of the pressure regulator 340 is pushed against the biasing force of the spring 360, whereby the pressure of the auxiliary fluid within line 304 leading to the generator unit 500 is maintained at a desire pressure.

The pressure regulator also functions as a synchronizer of the piston movement in the following manner: if the expansion of the pressure medium in one pressure vessel is too great, and the piston of the other pressure vessel has no room to "retreat", the gas piston will absorb the additional pressure, and will return it upon reciprocation of the mechanism. More particularly, any additional pressure provided to the piston which should not be expressed in movement of the opposite piton is absorbed by the gas piston 340, and alternatively, upon a shortage of pressure, the gas piston 340 compensates for the above shortage.

Figure 6A:
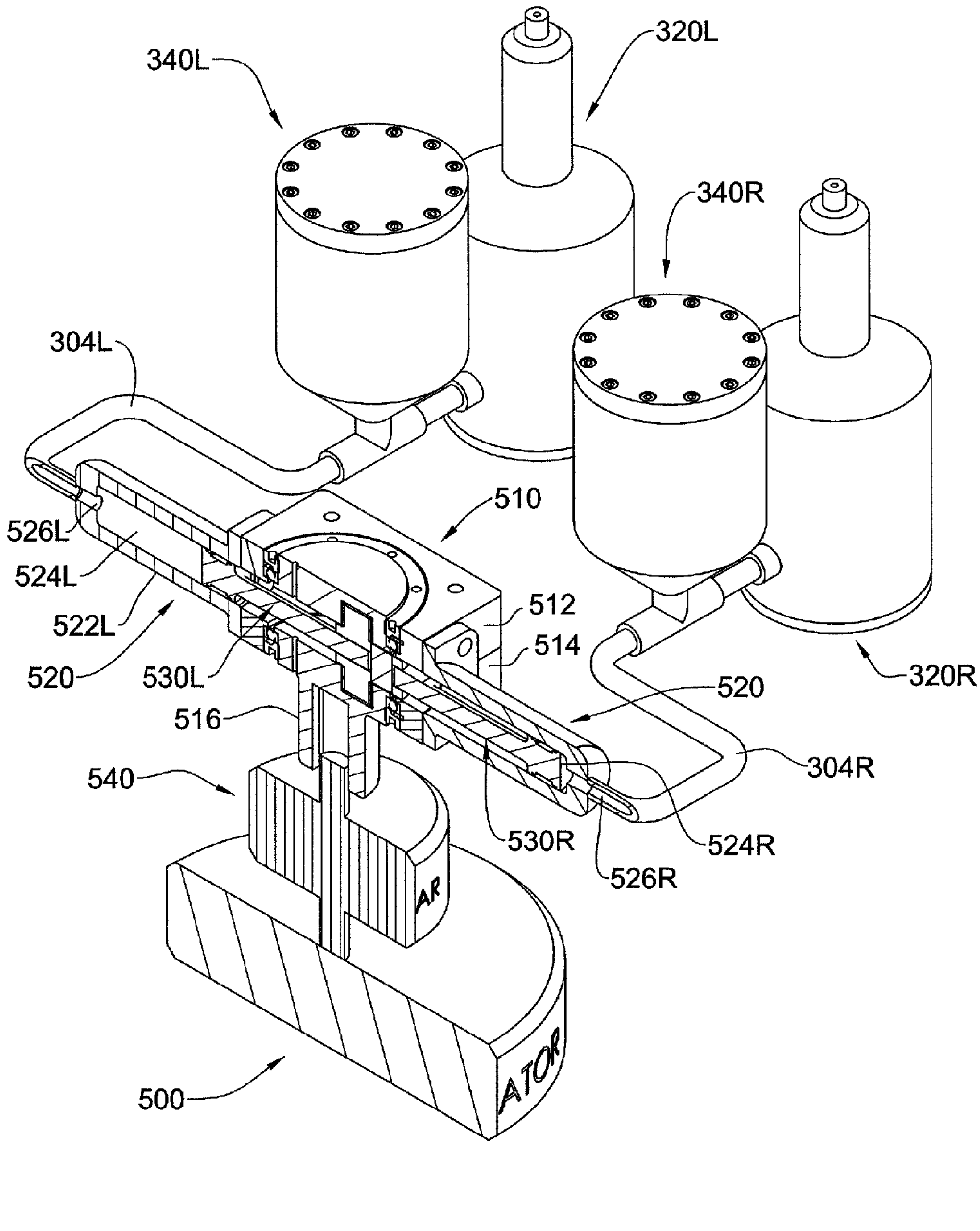
FIGS. 6A to 6C are respective schematic isometric view of the power generation unit of the generator shown in FIG. 1A.
Figure 6B:
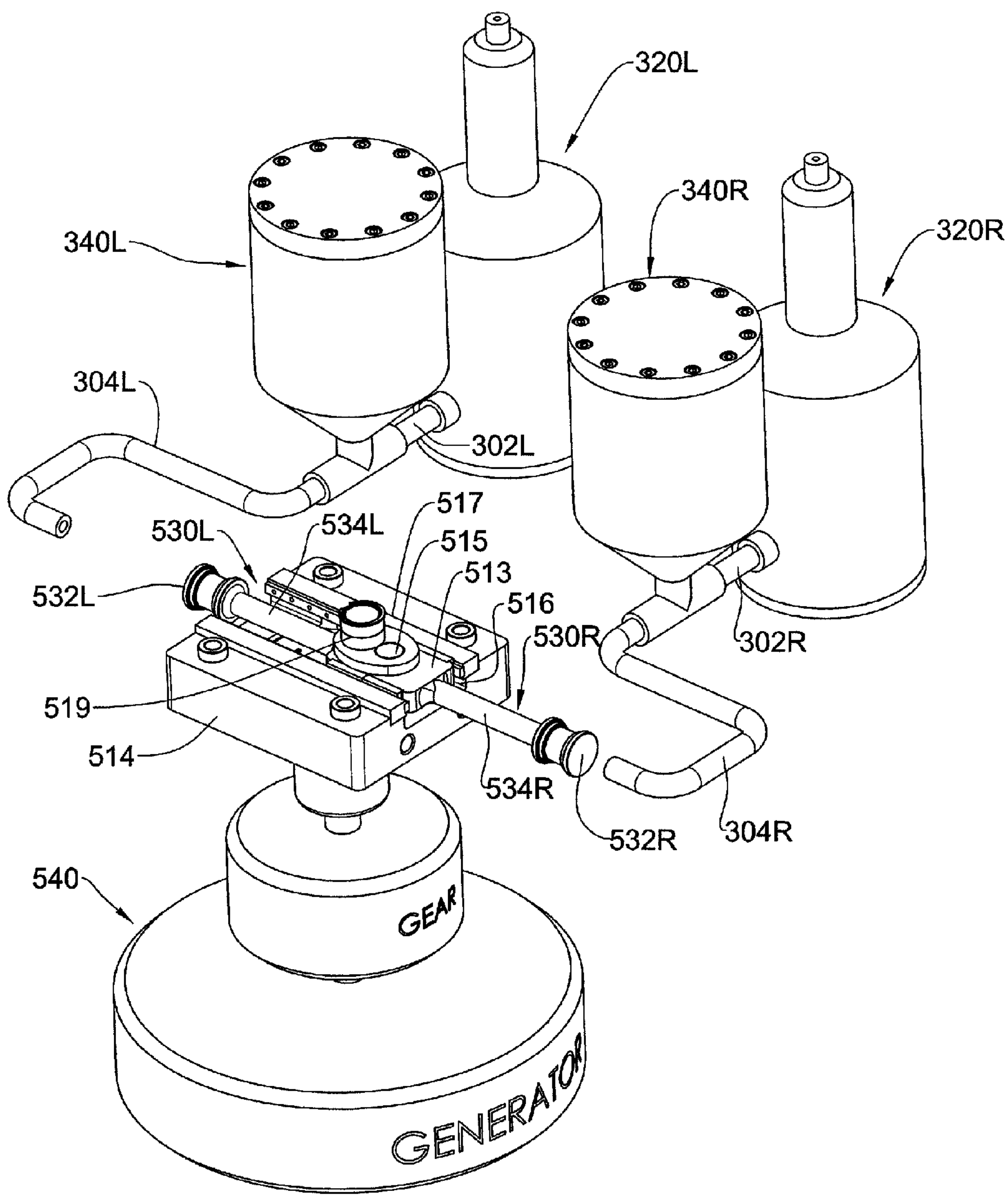
Figure 6C:
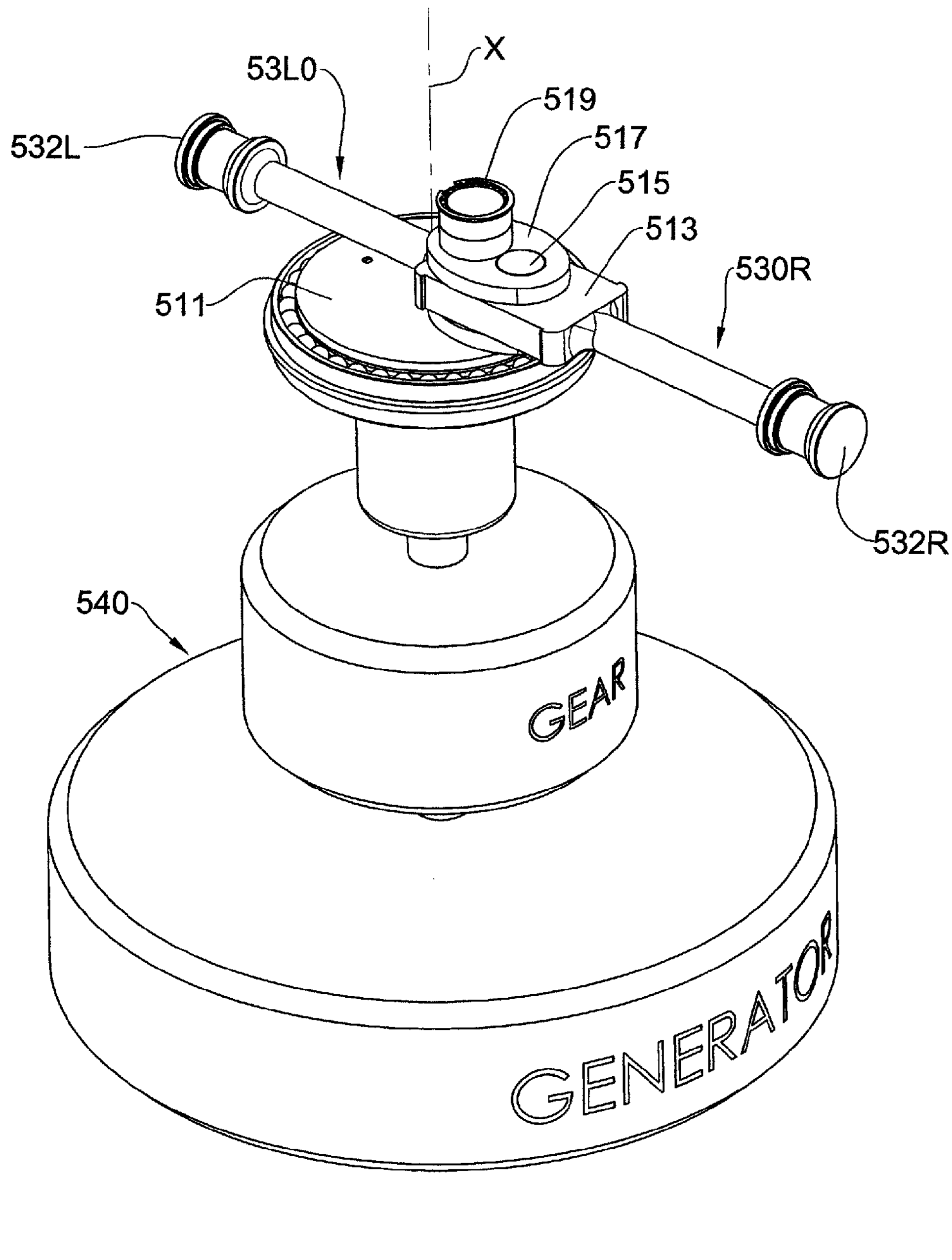

Turning now to FIGS. 6A and 6C, the generator unit 500 will now be described in detail. The generator unit 500 comprises a motion converter 520 and a power unit 540. The motion converter 520 comprises a base housing 510, and two piston housings 522R, 522L, each connected at one end to the main conversion unit and at the other end to line 304.

The base housing is formed of a top member 512 and a bottom member 514 (of similar design), each member being formed with a channel 516 such that when the two members are attached, there is formed a space 518 (not shown) in which a center plate 513 is adapted to reciprocate.

The center plate 513 is fitted with a cam follower 517 via stud 515. The cam follower 517 is adapted to revolve about a second stud 519 under reciprocation of the center plate 513. The cam follower 517 is fixedly attached to plate 511, such that revolution of the cam follower 517 about the stud 519 entails revolution of the plate 511 about its central axis X. A fly wheel (not shown) can also be provided between the gear and the generator in order to overcome top/bottom "dead points".

The housing 522R (only one will be described since they are both of similar design), comprises a piston 530R adapted to reciprocate therein, forming in the housing 522R an inlet chamber 524R. The housing 522R is formed with an inlet 526R providing fluid communication between the inlet chamber 524R and the auxiliary work medium incoming from line 304. The pistons 530R and 530L are formed at one end with a head portion 532R, 532L, located closer to the inlets 526R, 526L respectively, and at the other, opposite end, are integrally formed with the center plate 513.

In operation, for example under an alternating cycle as described above, during stage I of the cycle, the pressurized fluid in the right chamber 200R heats up and increases in volume, the pressurized fluid in the left chamber 200L cools down and decreases in volume. As a result, the auxiliary work medium in the right piston unit 320R is urged towards the piston 530R pushing on it, while the auxiliary work medium in the left piston unit 320R is sucked in, pulling on the piston 530L. During this stage, the movement of the pistons 530R, 530L displaced the center plate 513 in one direction.

Thereafter, during stages II and III of the cycle, a reverse operation takes place, i.e. the pressurized fluid in the left chamber 200L heats up and increases in volume, the pressurized fluid in the right chamber 200R cools down and decreases in volume. As a result, the auxiliary work medium in the left piston unit 320R is urged towards the piston 530L, pushing on it. The movement of the pistons 530R, 530L displaced the center plate 513 in the other direction, as seen in FIGS. 6B and 6C.

Reciprocation of the center plate 513 entails revolution of the cam follower 517 resulting in revolution of the plate 511 about its central axis. This rotational movement is converted into electrical energy by the power unit 540.

Reverting to FIG. 1B, a part of the electrical power generated by the power unit 540 is provided to the output, a part for the air conditioning unit 10, and the remainder is provided to a battery 50. The battery 50 can be used for jump starting the system.

It is appreciated, that the above described system 1 can produce at least up to 4 times the amount of electricity used for its operation, i.e. if the generator 1 requires 1 kwh (kilowatts per hour) for its operation, it can produce at least up to 4 kwh of electricity. It should also be understood that this profit in electricity is gained by performing a heat exchange process with the environment, i.e. using the surrounding medium (air, water) to absorb/convey heat to the water running through the radiator 400.

In particular, the use of an air conditioning unit 10 allows for the significant gain in electricity production. As opposed to intermediate air conditioning systems in which, the heat produced during cooling of a space (e.g. a room) is expelled to the outside environment (heat emitted to the outside of the room by the air conditioning system), in the present generator, this heat does not go to waste and is used for heating the water in the high temperature reservoir.

Experimental analysis of the generator 1 are disclosed in FIGS. 8A to 8F, showing diagrams of the temperature fluctuation of the work medium and of the pressurized fluid under different cycle times.

Figure 9:
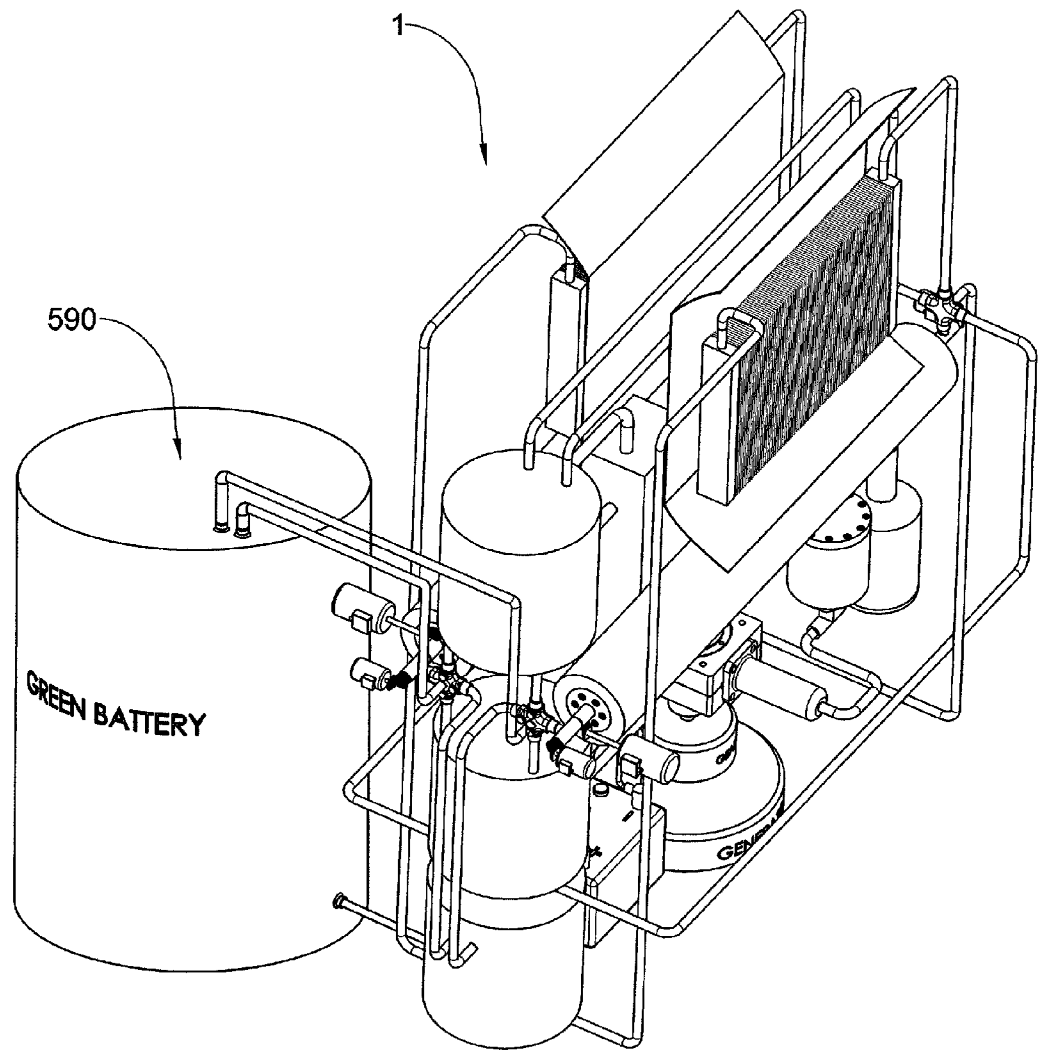
FIG. 9 is a schematic isometric view of the generator of FIG. 1A when used in conjunction with an accumulator arrangement.
Figure 10:
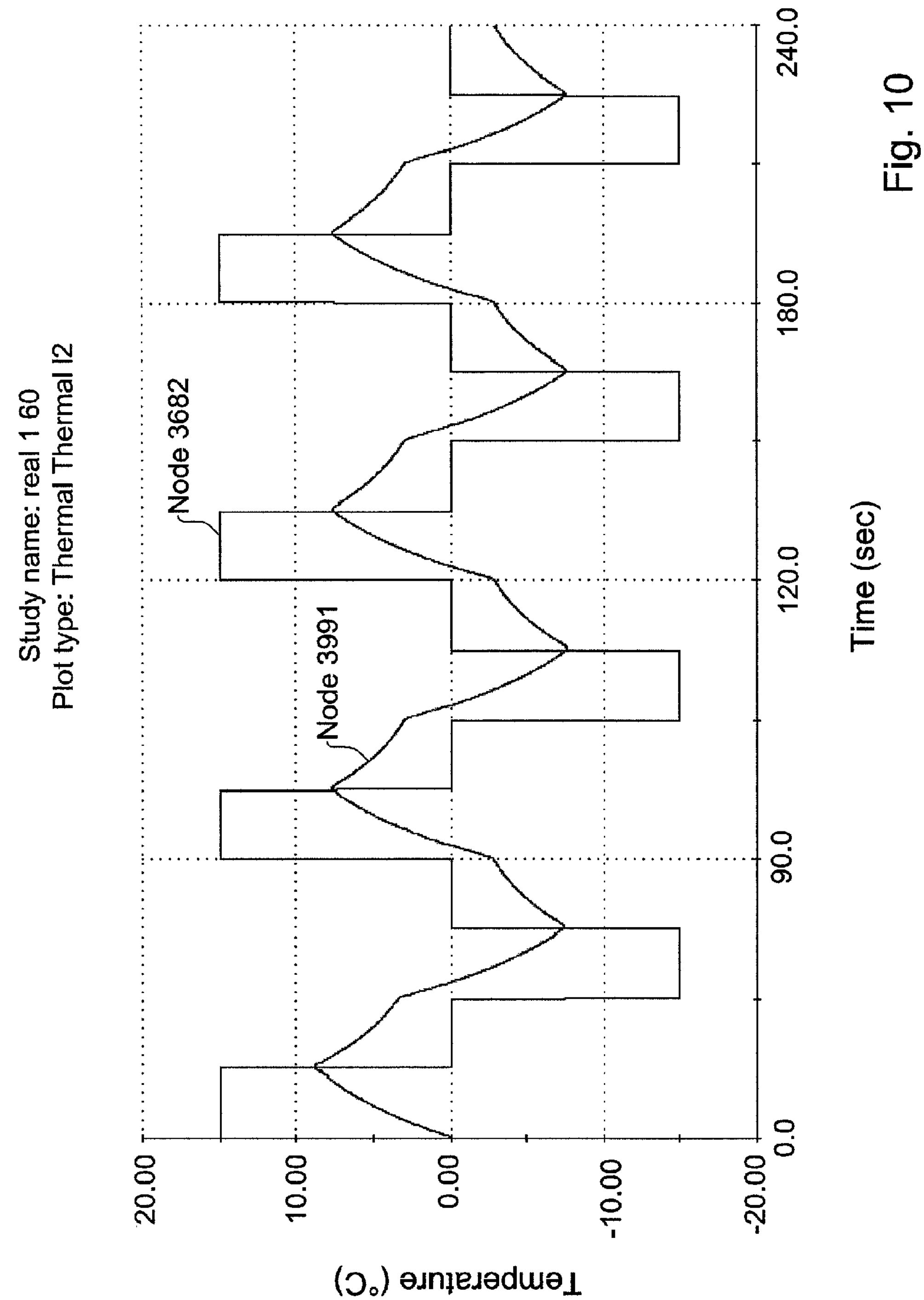
FIG. 10 is an additional schematic diagram of analysis of operation of the generator.

Turning to FIG. 9 The generator 1 can also comprise an accumulator arrangement 590 filled with a storage medium, e.g. water, where, in the event that an excess amount of electricity is produced by the generator 1, this excess amount will be diverted to a heating body used for heating the water within the accumulator arrangement 590. In this manner, the accumulator arrangement 590 can function as a battery.

For example, when the water in the accumulator arrangement 590 is heated to a desired degree, e.g. to a temperature similar to the temperature of the high temperature reservoir 110, the high temperature water for the operation of the generator 1 can be provided by the accumulator arrangement 590 instead of by the high temperature reservoir 110. As a result, the operation of the air conditioning unit 10 can be reduced (or even be completely interrupted), allowing it to consume less electricity.

Once the amount of electricity produced by the generator 1 is commensurate to the desired consumption, the air conditioning unit 10 returns to normal operation and the water in the accumulator arrangement 590 will gradually be cooled down. In addition, increased pressure within the accumulator arrangement can allow heating it above the boiling point of the work medium, in order to accumulate more heat. For example: water at 5 atm (standard household pressure) can boil at 150° C.

Furthermore, the accumulator arrangement 590 can comprise a heating element configured for directly heating up the water in the accumulator arrangement in order to maintain therein a desired temperature.

The generator 1 can also comprise a controller (not shown) adapted to monitor the temperature of the pressurized fluid, the work medium, the temperature of the water in the accumulator arrangement 590, the displacement of the pistons 330R, 330L, 530R, 530L, the pressure within the pressure regulator 340, the displacement of the center plate 513 etc. The controller can be used to control the operation of the distribution valves 140, the operation of the motors 250, 260, the displacement of the pistons etc.

Figure 11A:
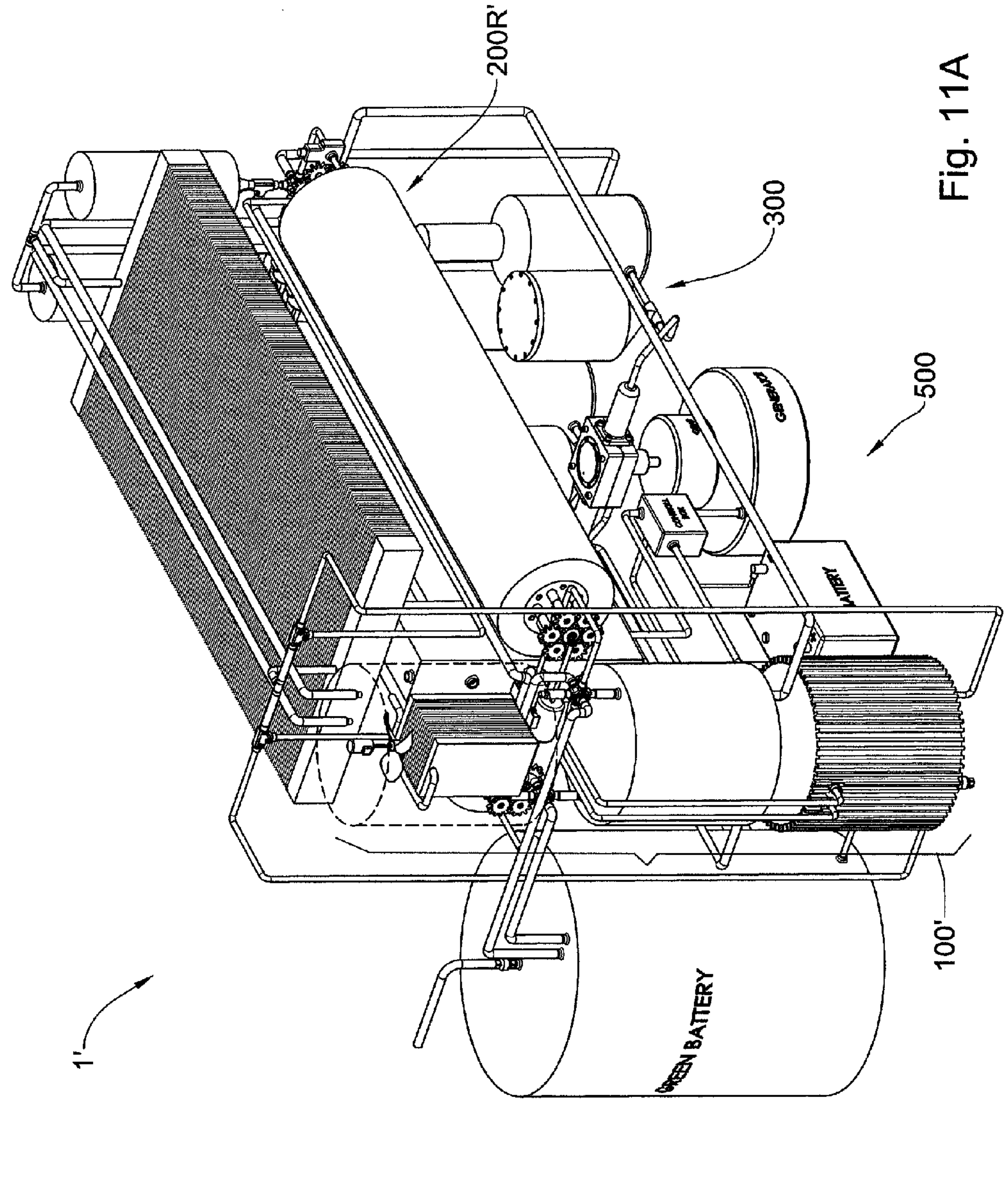
FIG. 11A is a front schematic isometric view of another example of the generator shown in FIGS. 1A to 1D.
Figure 11B:
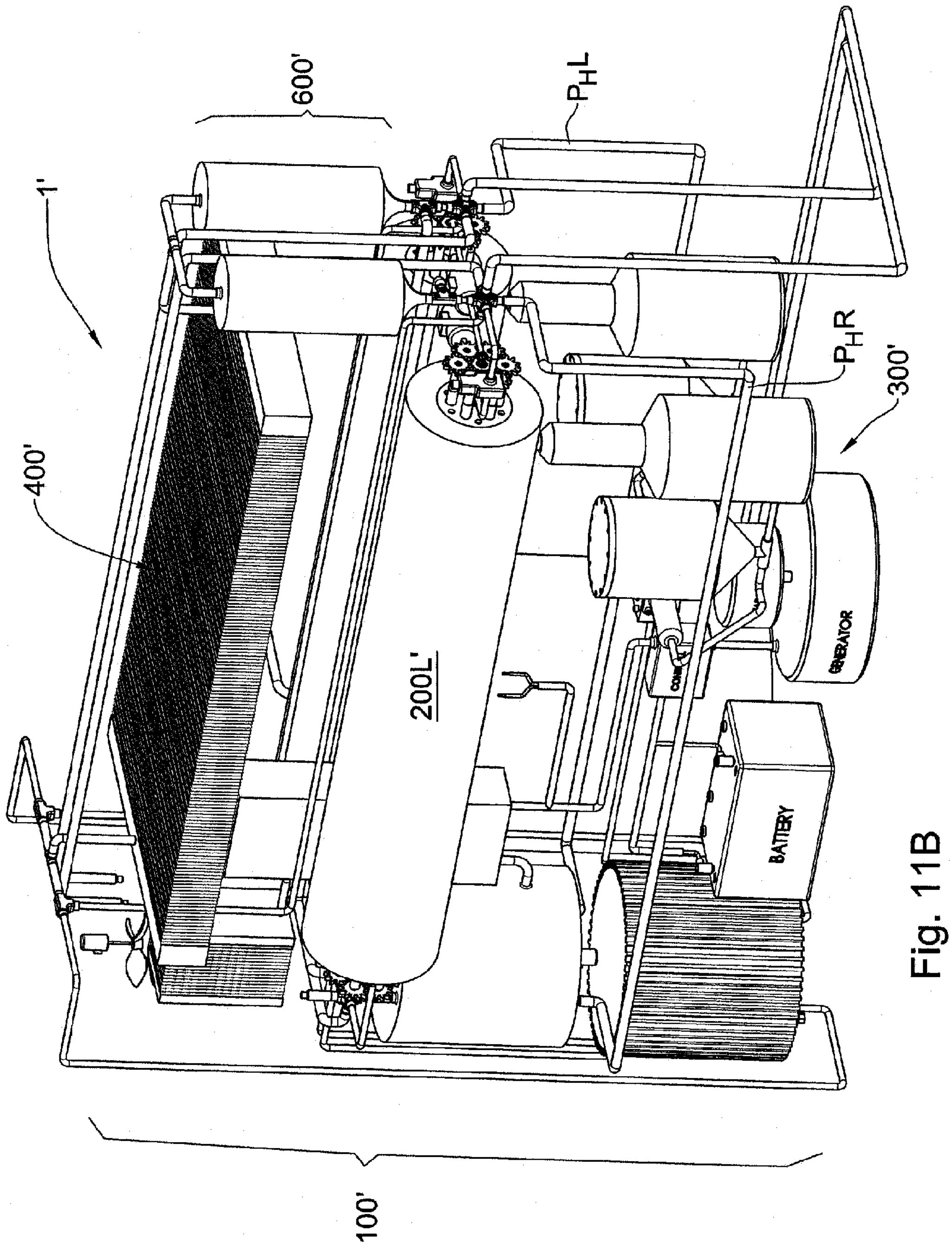
FIG. 11B is a schematic rear isometric view of the generator shown in FIG. 11A.

Turning now to FIGS. 11A and 11B, another example of the generator is shown, generally designated as 1', and comprising an air conditioning unit 10 connected to a work medium sub-system 100', two pressure vessels 200', a mechanical power assembly 300, a radiator unit 400, a power generator unit 500, a gradient assembly 600, an accumulator unit 50 and output.

In principle, the generator 1' is similar in design to the generator 1 previously described, with the difference being in the design and number of the cores passing through the pressure vessels 200', a different design of the radiator unit 400', the additional gradient assembly 600, and corresponding valves and piping associating various components of the generator to one another.

Firstly, the gradient assembly 600 and its utilization in the generator 1' will be described in detail with respect to FIGS. 12A to 12D:

At an initial position of the generator (when the generator is at rest), the piping of the generator are filled with work medium at a predetermined pressure, the work medium being at an intermediate temperature. Consequently, the pressure medium is also at the intermediate temperature.

Figure 17A:
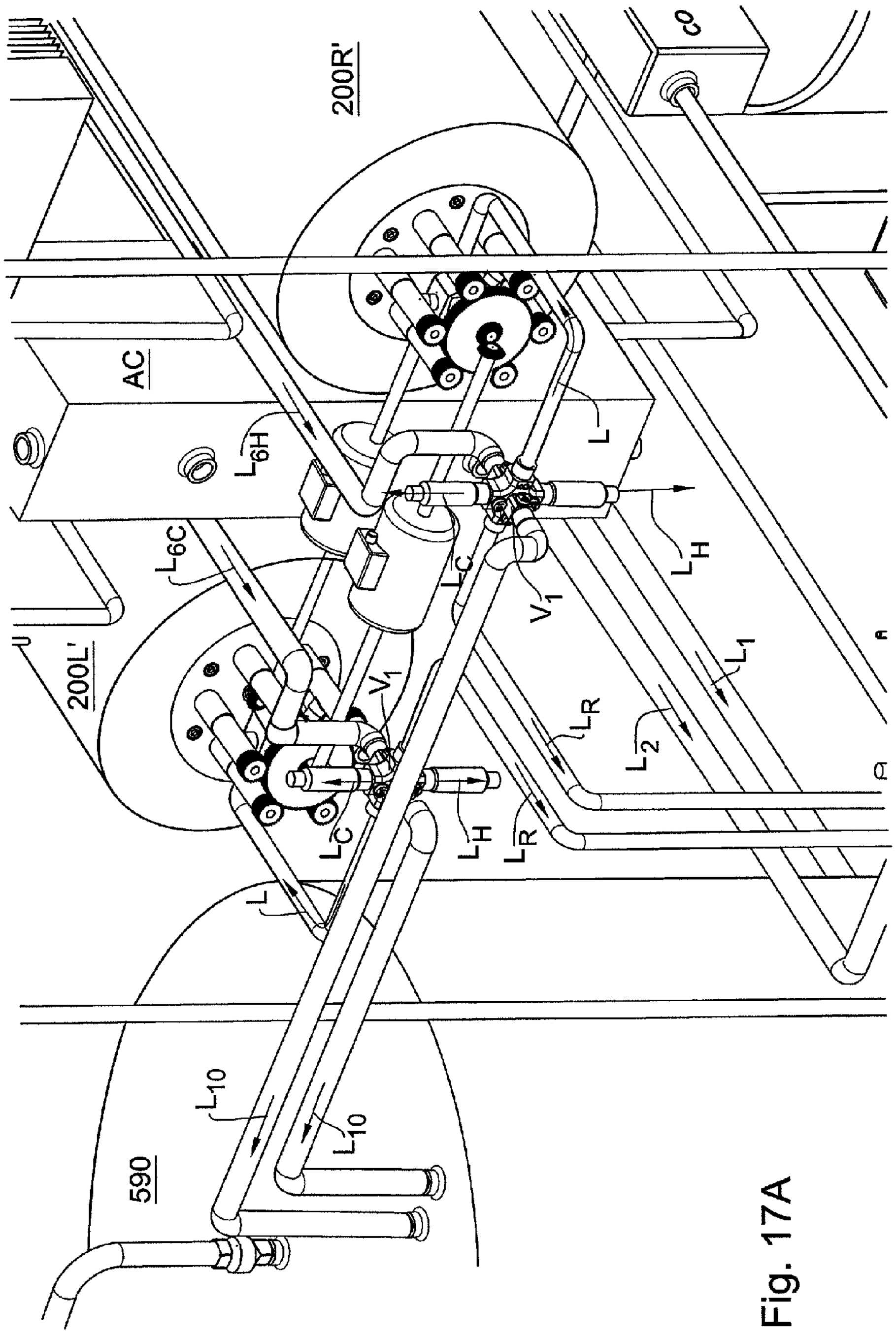
FIGS. 17A to 17D are respective schematic isometric views of piping junctions of the generator shown in FIGS. 11A and 11B.
Figure 17B:
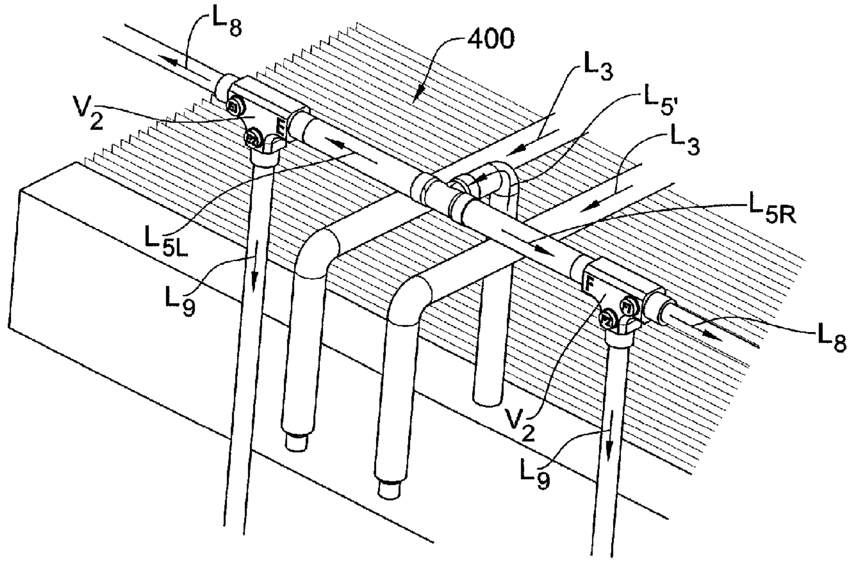
Figure 17D:
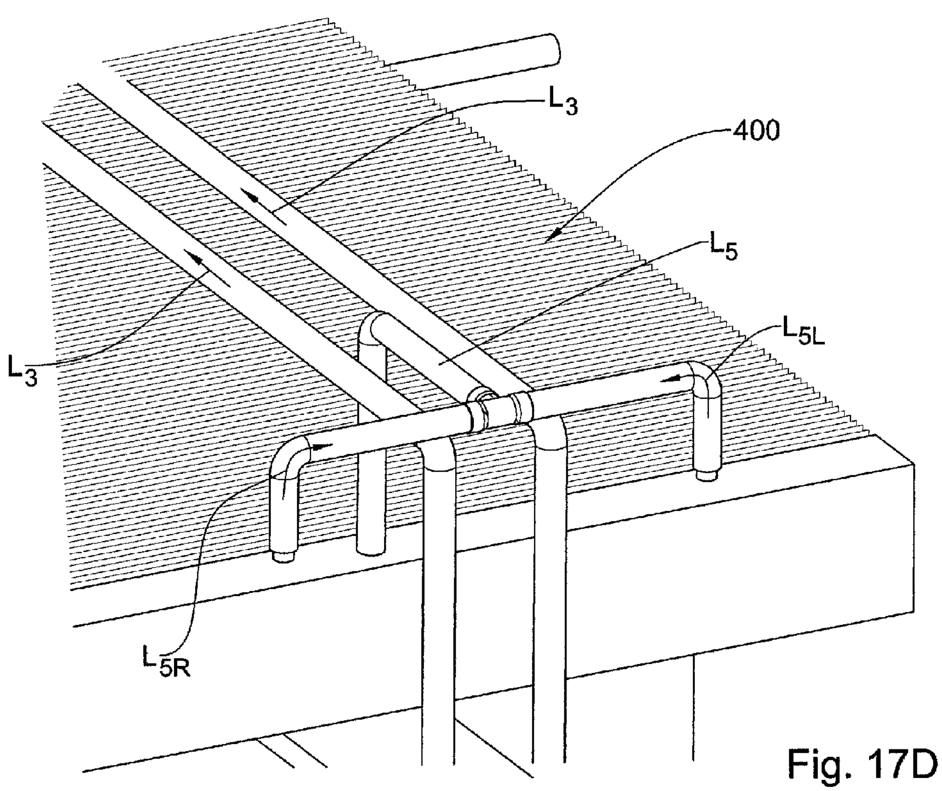
Figure 17C:
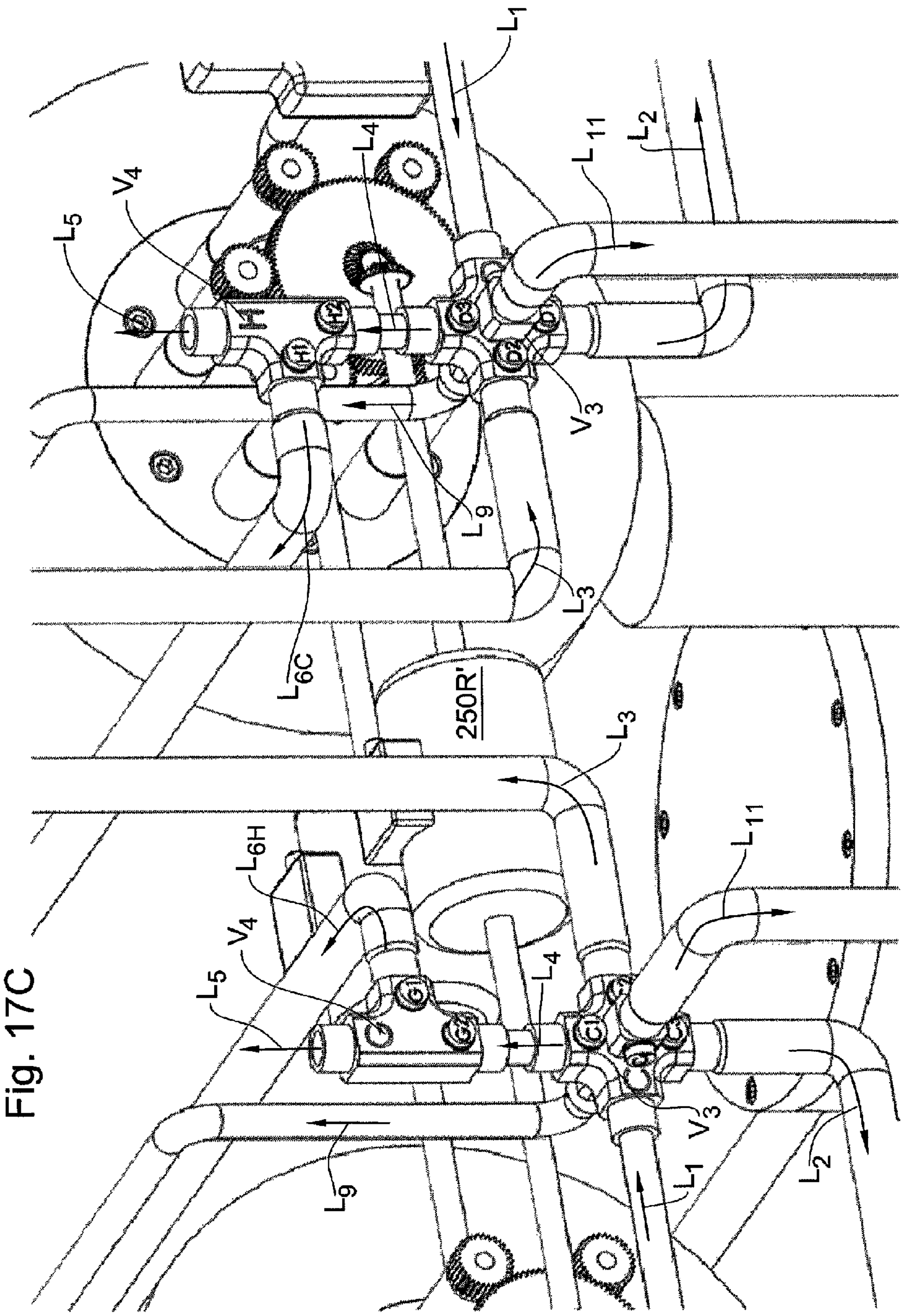

During a first stage of operation of the generator, the air conditioning unit AC begins its operation, heating up the work medium in the high reservoir 110' and cooling down the work medium in the low temperature reservoir 120'. The intermediate reservoir 130' has working medium remaining at intermediate temperature. Once the work medium in the high/low temperature reservoirs 110', 120' respectively has reached its desired temperature, the driving mechanisms 250', 260' begin their operation as follows:

(a) (i) high temperature work medium from the high reservoir 110' is passed through the right pressure vessel 200R so as to heat up the pressure medium, and is re-circulated through lines $P_H$R back into the high temperature reservoir 110' (lines $L_1$, $L_2$);

(ii) simultaneously, low temperature work medium from the high temperature reservoir 120' is passed through the left pressure vessel 200L so as to cool down the pressure medium, and is re-circulated through lines $P_C$R back into the low temperature reservoir 120' (lines $L_1$, $L_3$);

(iii) step (a) continues until the pressure medium in each pressure vessel 200R', 200L' reaches a desired high temperature $T_{HOT}/T_{COLD}$ respectively;

(b) (i) work medium at intermediate temperature from the intermediate reservoir 130' is passed through pressure vessel 200R' so as to be heated up by the hot pressure medium, thereby removing heat therefrom;

(ii) simultaneously, work medium at intermediate temperature from the intermediate reservoir 130' is passed through pressure vessel 200L' so as to be cooled down by the cold pressure medium, thereby providing heat thereto;

(c) (i) the heated intermediate temperature work medium is passed into the gradient tank 600R (lines $L_1$, $L_4$), having a temperature gradient therein, so that the top portion of the gradient tank 600R contains a hotter heated intermediate temperature work medium than the bottom portion of the gradient tank 600R;

(ii) simultaneously, the cooled intermediate temperature work medium is passed into the gradient tank 600L (lines $L_1$, $L_4$), having a temperature gradient therein, so that the top portion of the gradient tank 600R contains a cooler cooled intermediate temperature work medium than the bottom portion of the gradient tank 600L;

(iii) this stage continues until the intermediate temperature work medium reaches a desired temperature in each of the gradient tanks 600R, 600L;

(d) (i) heated intermediate temperature work medium is passed from the gradient tank 600R to the front of the generator, where it re-enters the left pressure vessel 200L' (see lines $L_{6H}$, $L_{7C}$ in FIG. 17A), thereby further providing heat to the cold pressure medium and heating it up back to a temperature close to $T_{INTERMEDIATE}$;

(ii) Simultaneously, cooled intermediate temperature work medium is passed from the gradient tank 600L to the front of the generator, where it re-enters the right pressure vessel 200R' (lines $L_{6C}$, $L_{7H}$ in FIG. 17A) thereby further removing heat from the hot pressure medium and cooling it down back to a temperature close to $T_{INTERMEDIATE}$;

(iii) this step continues until the pressure medium in both pressure vessels 200R' and 200L' is at a temperature of $T_{INTERMEDIATE}$;

Steps (a) to (d) then repeat themselves but in an opposite manner, i.e. high temperature work medium is now passed through the left pressure vessel 200L' and low temperature work medium is passed through the right pressure vessel 200R', and so on.

It is appreciated that the first portion of the heated intermediate temperature work medium entering the gradient tank 600R is the hotter than the next portion of intermediate temperature work medium passing into the gradient tank 600R, and respectively, the first portion of the cooled intermediate temperature work medium entering the gradient tank 600L is the cooler than the next portion of intermediate temperature work medium passing into the gradient tank 600L.

This cross-over step provides for many advantages, one of which is a better heat transfer process with the pressure medium. In particular, it is noted that in each vessel, the pressure medium first performs a heat transfer process with intermediate temperature work medium at temperature $T_{INTERMEDIATE}$ (steps (b)(i) and (b)(ii)), and thereafter an additional heat transfer process with a heated/cooled intermediate temperature work medium (steps (c)(i) and (c)(ii)).

It is noted that during steps (b)(i) and (b)(ii), the intermediate temperature work medium contained in the gradient tanks 600R, 600L, flows through lines $L_{5R}$, $L_{5L}$, and $_{L5}$ into the radiator, where any accumulated heat of the generator can be removed via a heat transfer process with the outside environment.

Figure 12A:
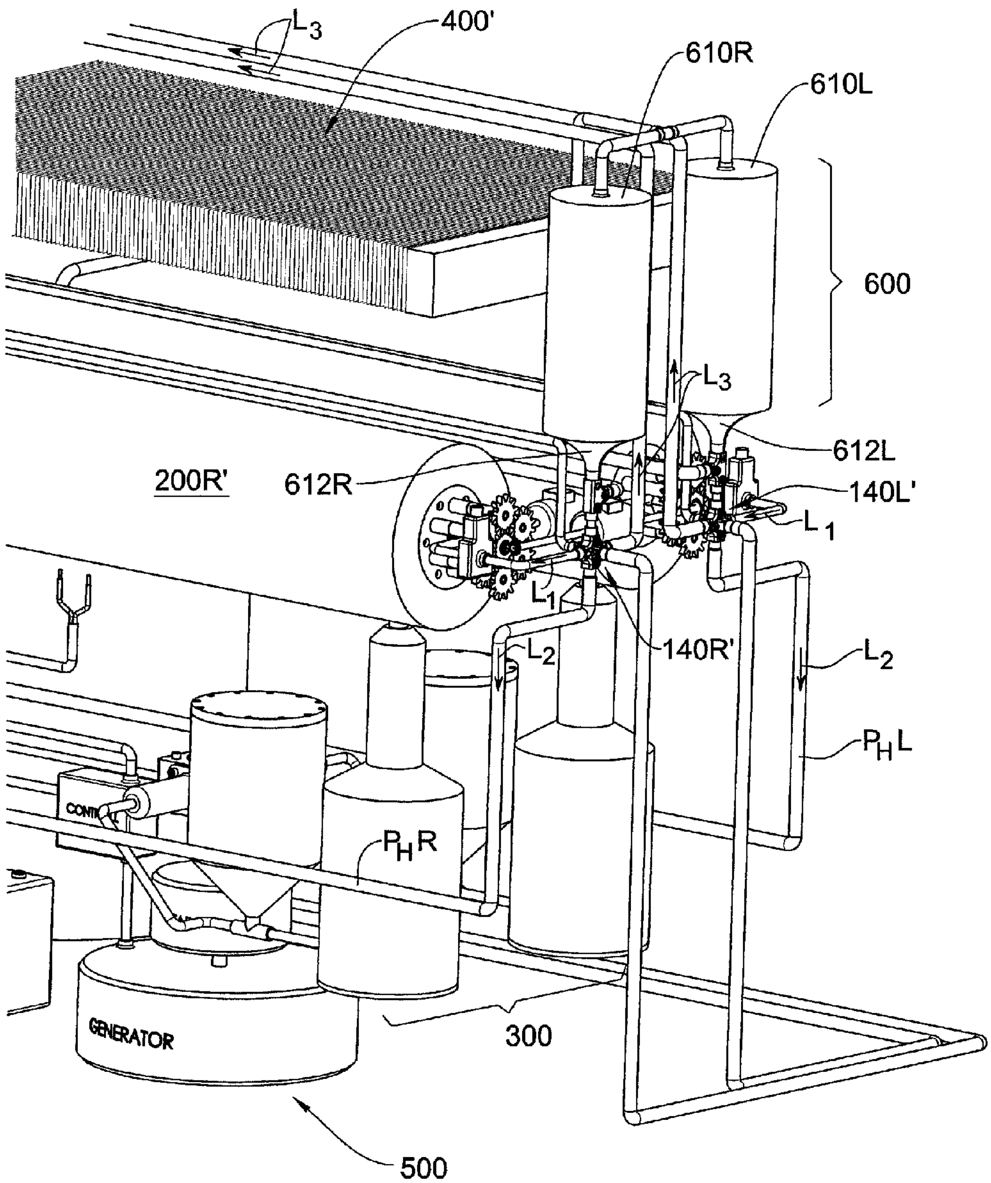
FIG. 12A is a schematic isometric view of a gradient system used in the generator shown in FIGS. 11A and 11B.
Figure 12B:
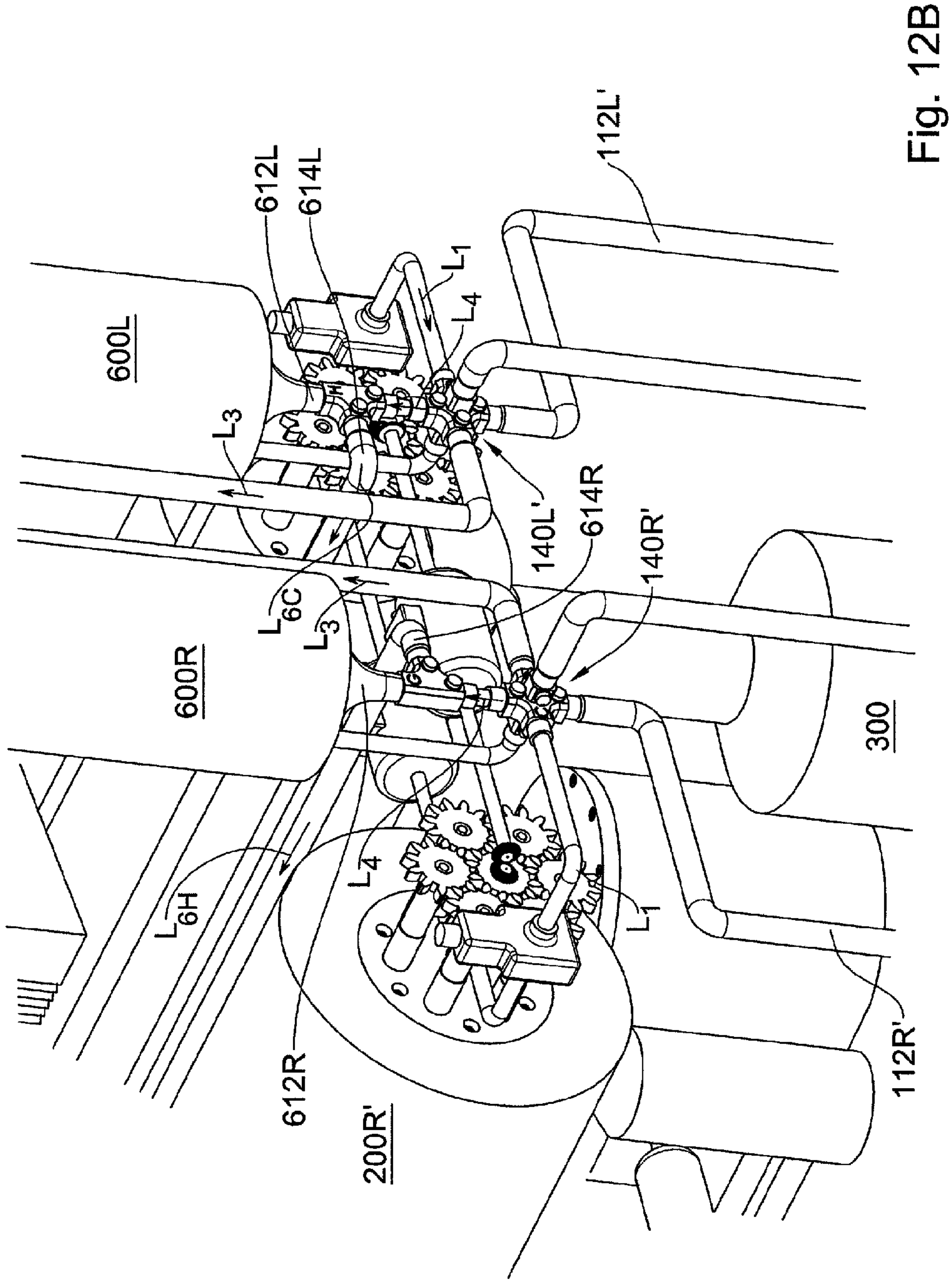
FIG. 12B is a schematic enlarged view of the gradient system shown in FIG. 12A.
Figure 12C:
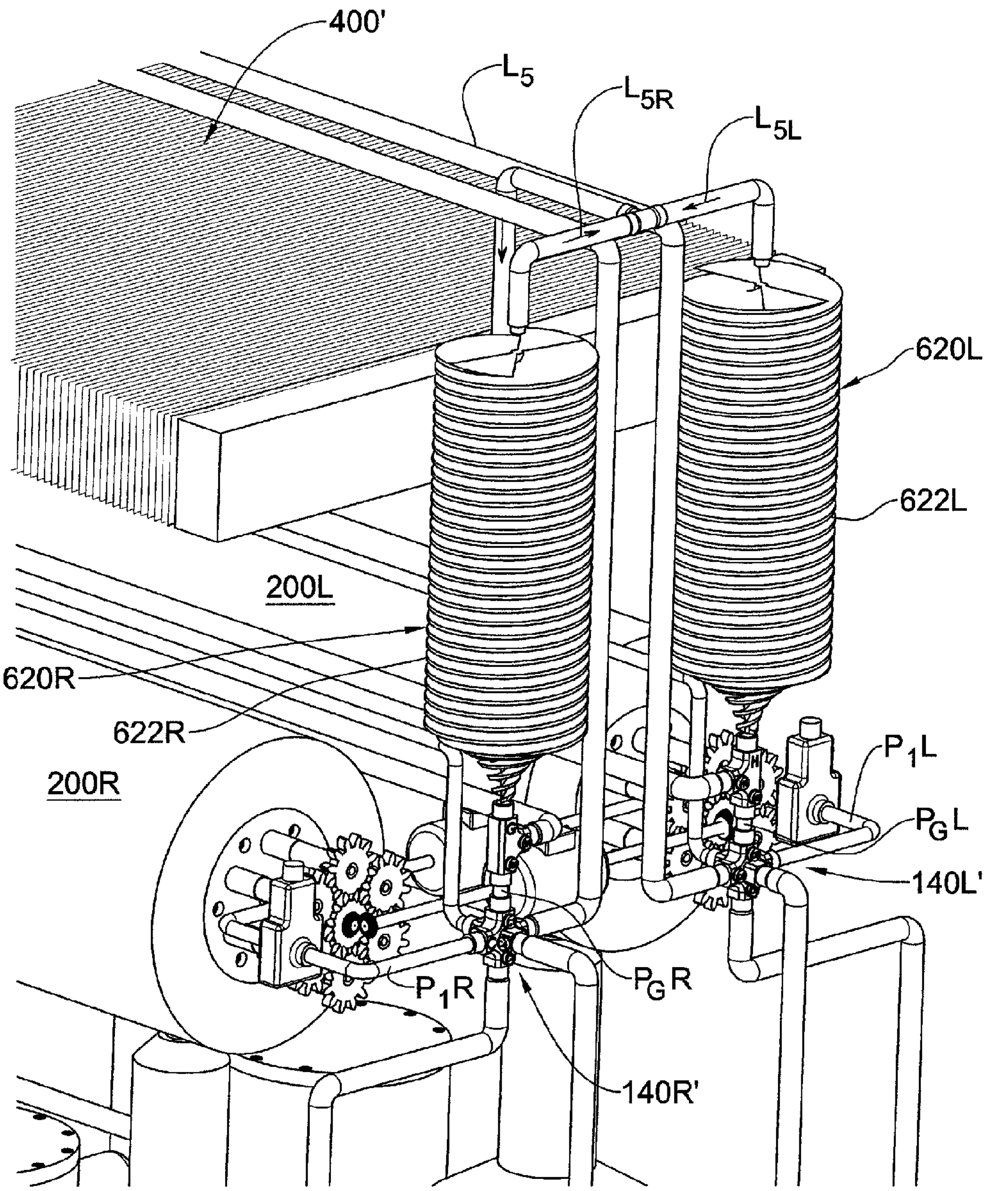
FIG. 12C is a schematic isometric view of the gradient system shown in FIG. 12A, with several components thereof being removed.
Figure 12D:
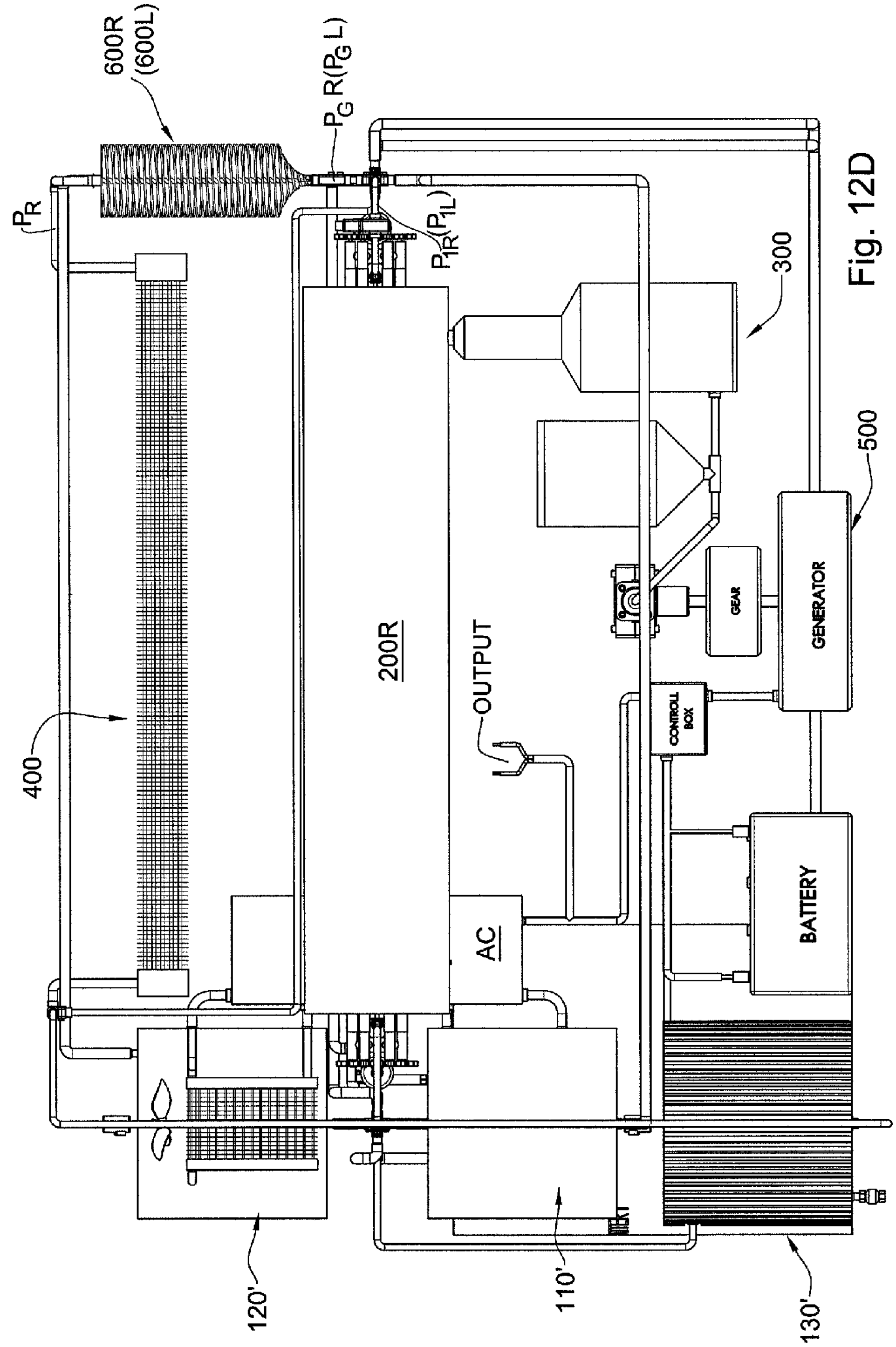
FIG. 12D is a schematic side view of the generator as shown in FIG. 12C.

With particular reference being drawn to FIG. 12C, the gradient tanks 600R, 600L are formed with a spiral structure 620R, 620L, configured for preventing the different portions of the heated/cooled intermediate work medium from performing a heat exchange process therebetween, and thus maintaining a temperature gradient within the reservoirs 600R, 600L.

Figure 13A:
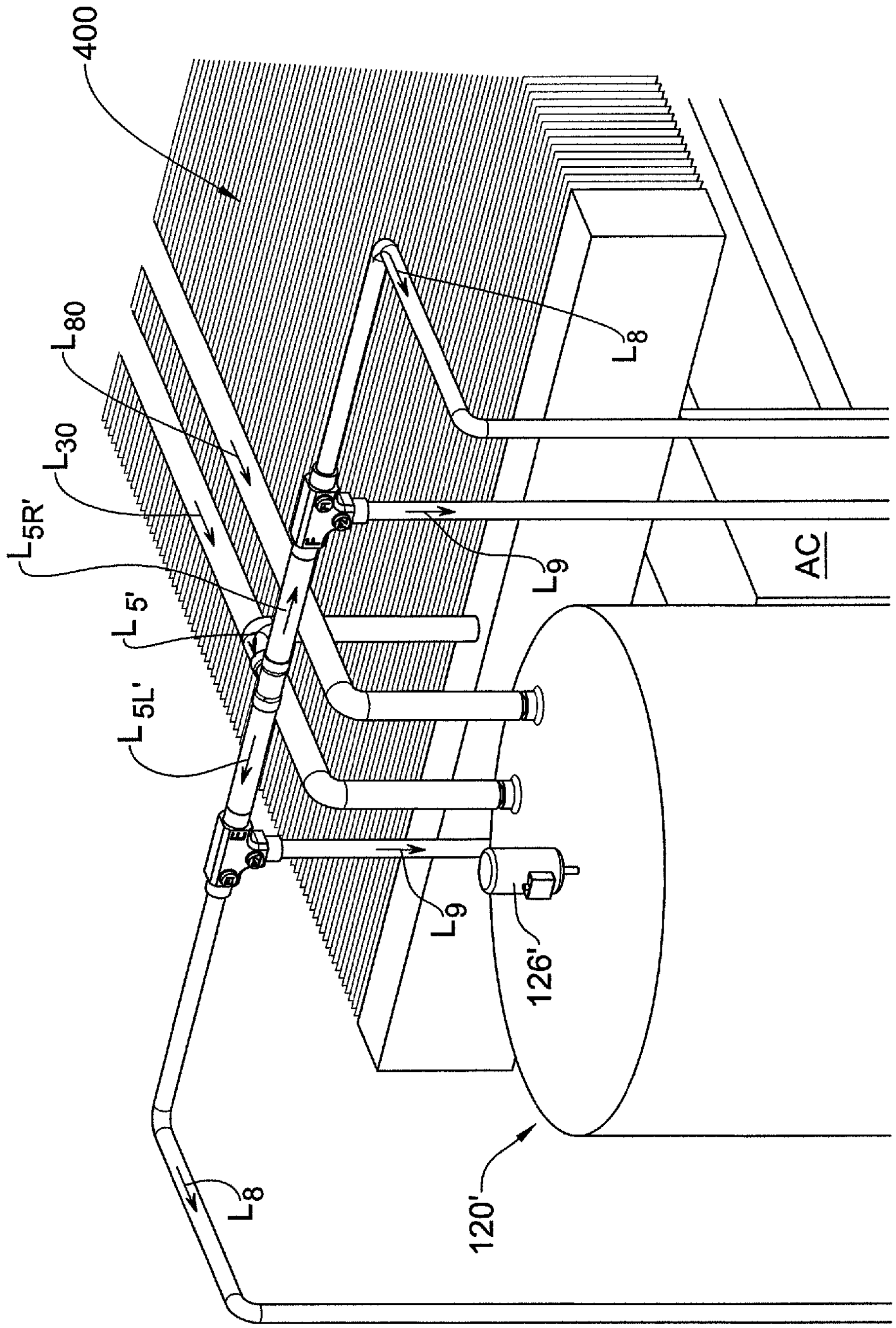
FIG. 13A is a schematic isometric view of a radiator section used in the generator shown in FIGS. 11A and 11B.

Turning now to FIG. 13A, further piping arrangements of the generator are shown, in particular:

$L_3$—leading low temperature water which has passed through the pressure vessel back to the low temperature reservoir 120';

$L_5'$, $L_{5R}'$, $L_{5L}'$—leading intermediate temperature water after passing through the radiator back into the intermediate reservoir 130';

$L_8$—leading intermediate temperature work medium back to the intermediate reservoir 130; and $L_9$—leading intermediate temperature water back to the rear of the generator towards the gradient tanks 600R, 600L.

Figure 13B:
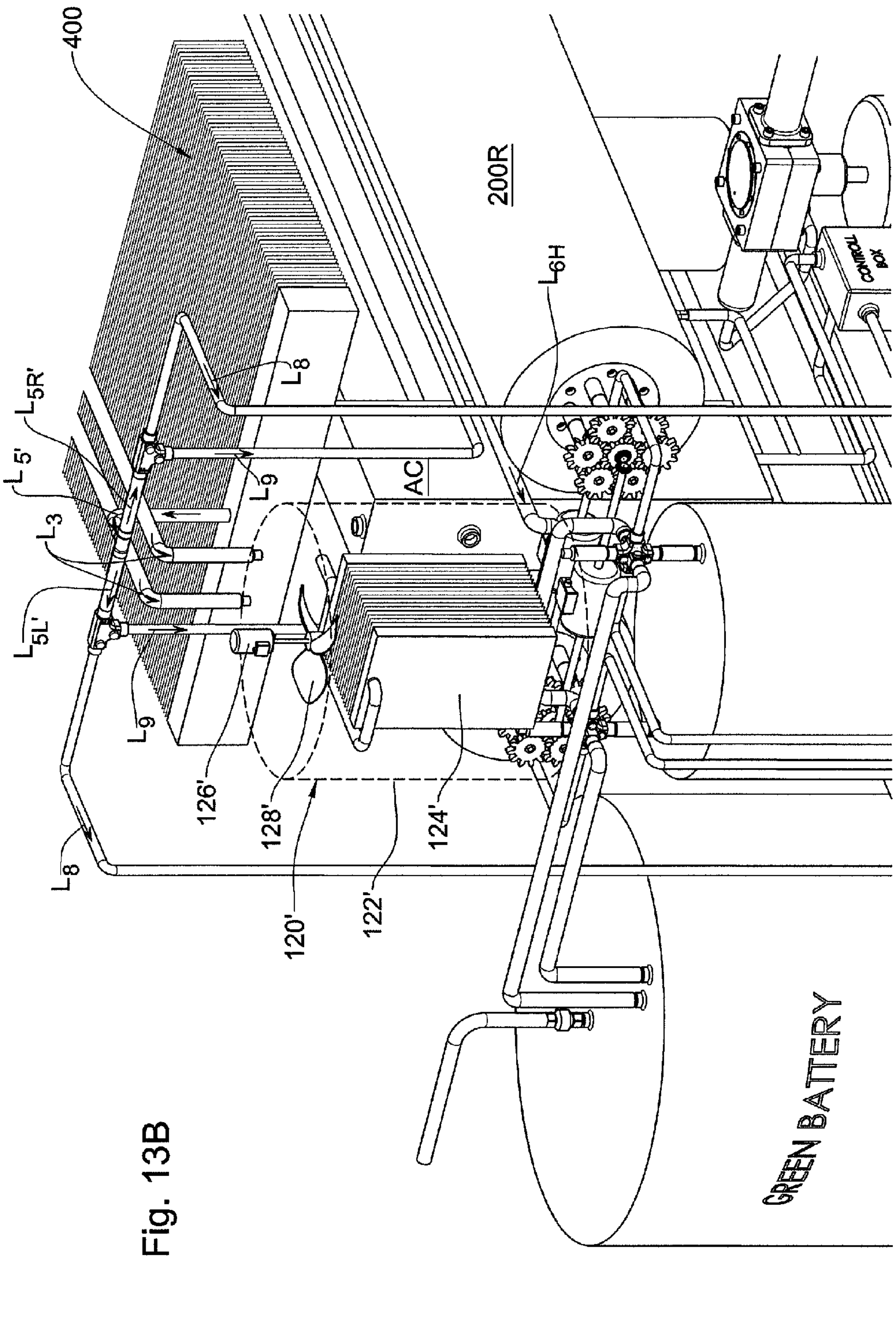
FIG. 13B is a schematic isometric view of a work medium reservoir used in the generator shown in FIGS. 11A and 11B, with the casing thereof being transparent.

With reference to FIG. 13B, it is observed that the low temperature reservoir 120' comprises a heat transfer element 124' configured for cooling the work medium in the reservoir 120' by constituting a condenser of the air conditioning unit AC. The reservoir 120' further comprises a fan 128' driven by an external motor 126', configured for maintaining a uniform temperature within the reservoir 120'.

Turning now to FIGS. 14A to 14D, the driving mechanism of the work medium and the cores of the pressure vessels 200R', 200L' will be described:

It is observed that, whereas the previously described generator 1 only has one core 240 per vessel, the presently described generator 1' has six cores 240' per vessel, each having a design similar to that of the previously described core 240.

In order to circulate the work medium through all cores 240 simultaneously, a motor 250' is provided, configured for driving a gear 254' meshing with a gear 256', which in turn drives a mutual gear 259', meshing with the respective gears 242' of each of the cores 240. The gears 242' are responsible for the rotation of the drive screw (not shown) which propels the work medium through the entire generator piping system.

In addition, there is provided a secondary drive motor 260', configured for revolving the cores 240' the fan arrangement 220' of each of the cores 240' about the axis of the cores (it is noted that in some application, even the cores themselves can revolve about their axis). The drive motor 260' is configured to be meshed with the mutual drive wheel 269', which, in turn, meshes with the gears 222' of the fan arrangement 220'.

It is noted that the generator further comprises an additional array of driving motors 250', 260' located at a rear side of the generator, i.e. at the other end of the pressure vessels 200R', 200L'. In this manner, the driving load is distributed between the front array and the rear array of motors.

Figure 14E:
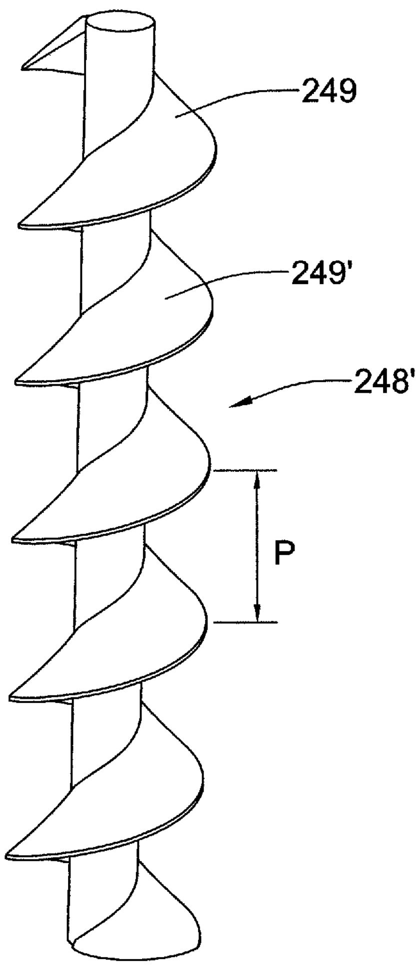
FIGS. 14E and 14F are respective schematic isometric and isometric cross-sectional views of a drive screw used in the generator shown in FIGS. 11A and 11B.
Figure 14F:
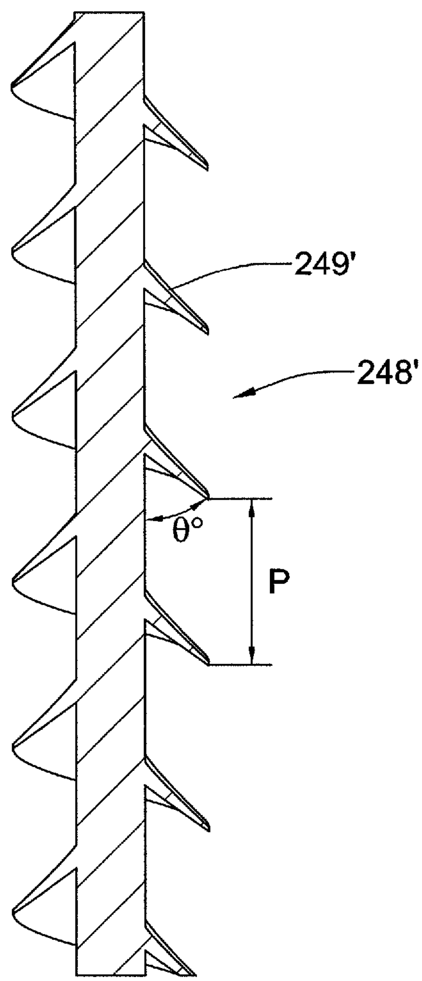

With particular reference being drawn to FIGS. 14E and 14F, the drive screw used in the presently described generator can be of a different design, the difference lying in the pitch angle of the screw (70 deg.), which further contributes to circulation of the work medium through the core 240' and to pushing the work medium towards the inner surface of the core 240'.

Figure 15A:
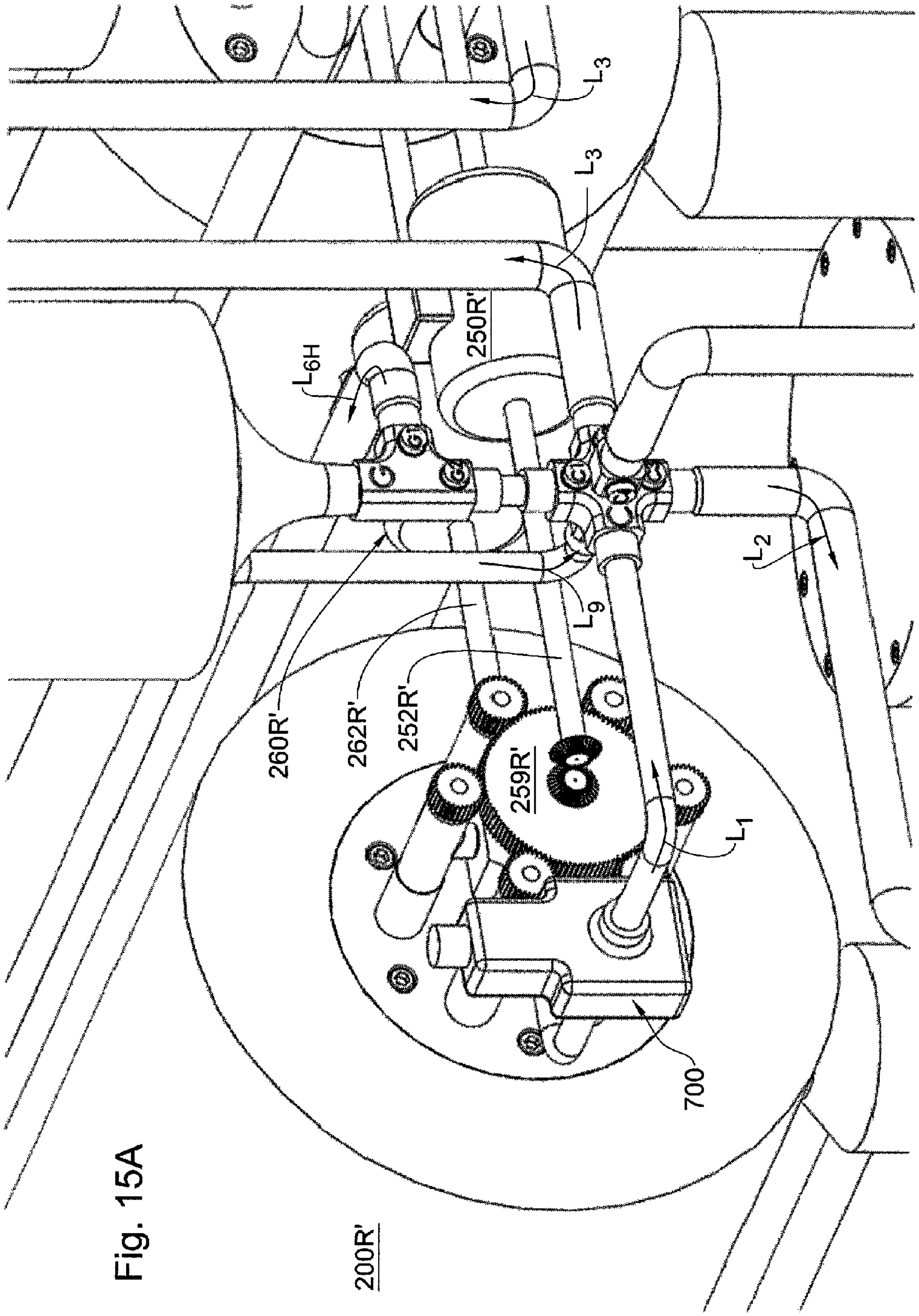
FIG. 15A is a schematic isometric view of a flow regulator used in the generator shown in FIGS. 11A and 11B.
Figure 15B:
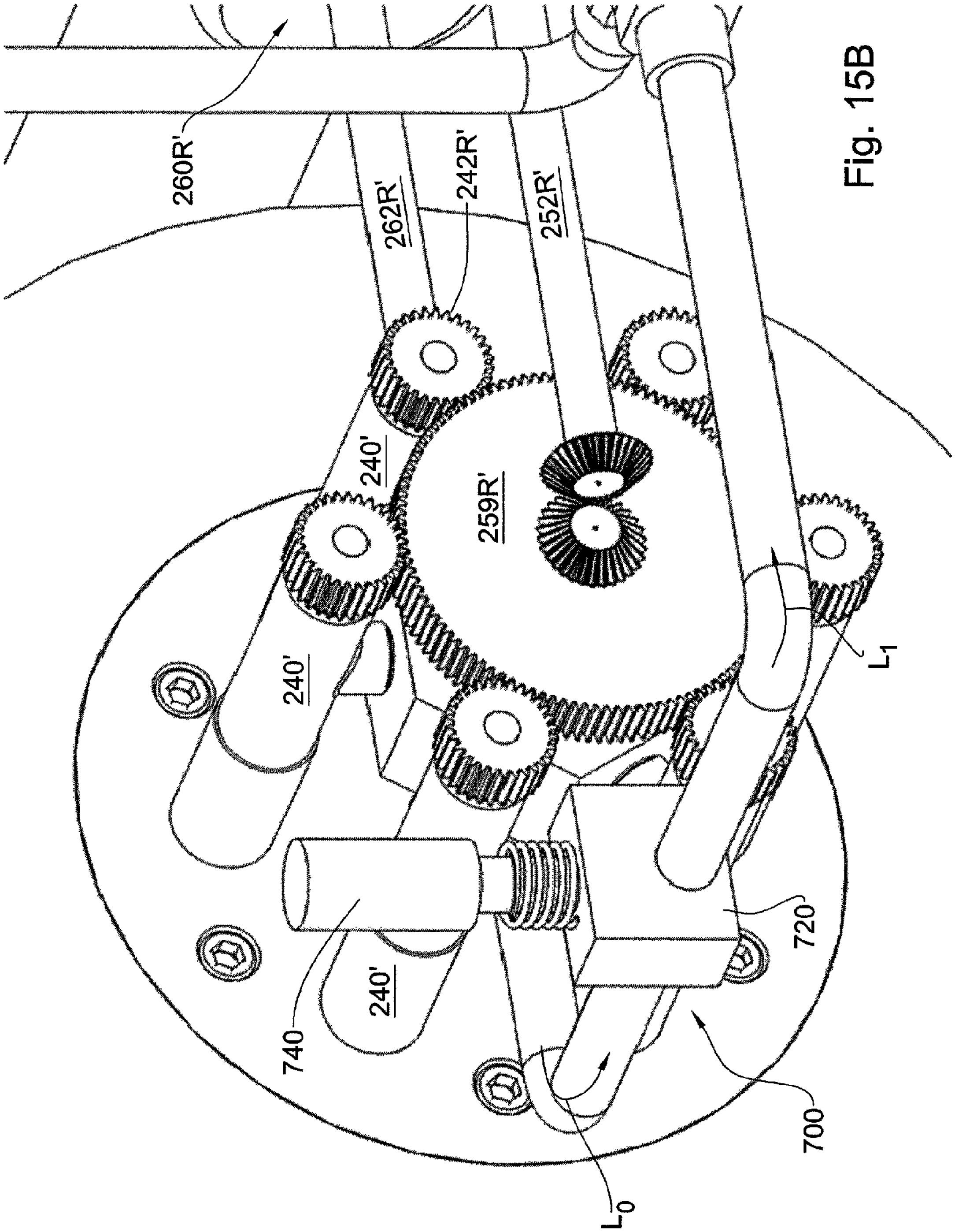
FIG. 15B is a schematic enlarged view of the regulator shown in FIG. 15A, with the cover thereof being transparent.
Figure 15C:
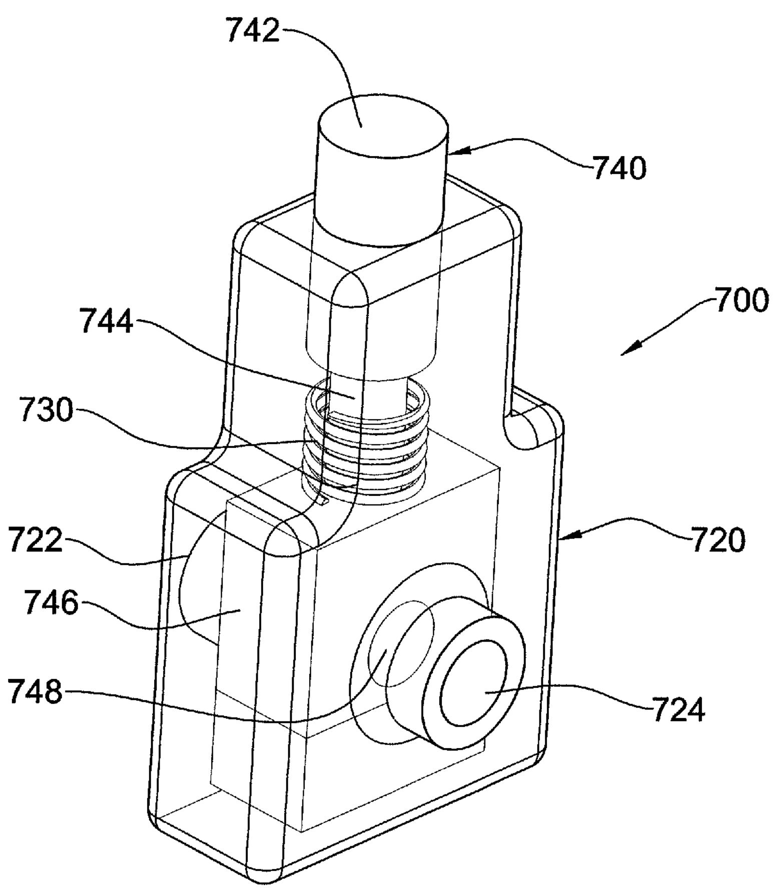
FIG. 15C is a schematic view of the flow regulator shown in FIG. 15B.

Turning now to FIGS. 15A to 15C, a controller of the generator 1' is shown, generally designated as 700. The controller 700 is positioned so as to interject between line $L_0$ exiting the pressure vessel 200' and line $L_1$ leading to the valve 140'. The purpose of the controller 700 is to regulate the flow rate Q from the pressure vessel 200', by controlling the cross-sectional area through which the work medium is passed.

With particular reference to FIG. 15C, the controller 700 comprises a casing 720 formed with an inlet hole 722 in fluid communication with line $L_0$, and an outlet hole 724 in fluid communication with line $L_1$. The controller 700 further comprises a plunger 740 formed with a top portion 742, a neck portion 744 and a main block 746. The main block 746 is formed with a passageway 748, and a spring is mounted onto the neck portion 744, pressing against the casing, so as to bias the plunger 740 downwards.

Thus, when the passageway 748 is aligned with the inlet/outlet holes 722, 744, a maximal cross-sectional flow area is provided. When the plunger is shifted, and the passageway 748 is misaligned, the cross-sectional flow area reduces. By controlling the load of the spring, e.g. by any conventional means such as screws (not shown), it can be possible to regulate the flow rate through the generator 1'.

Figure 16A:
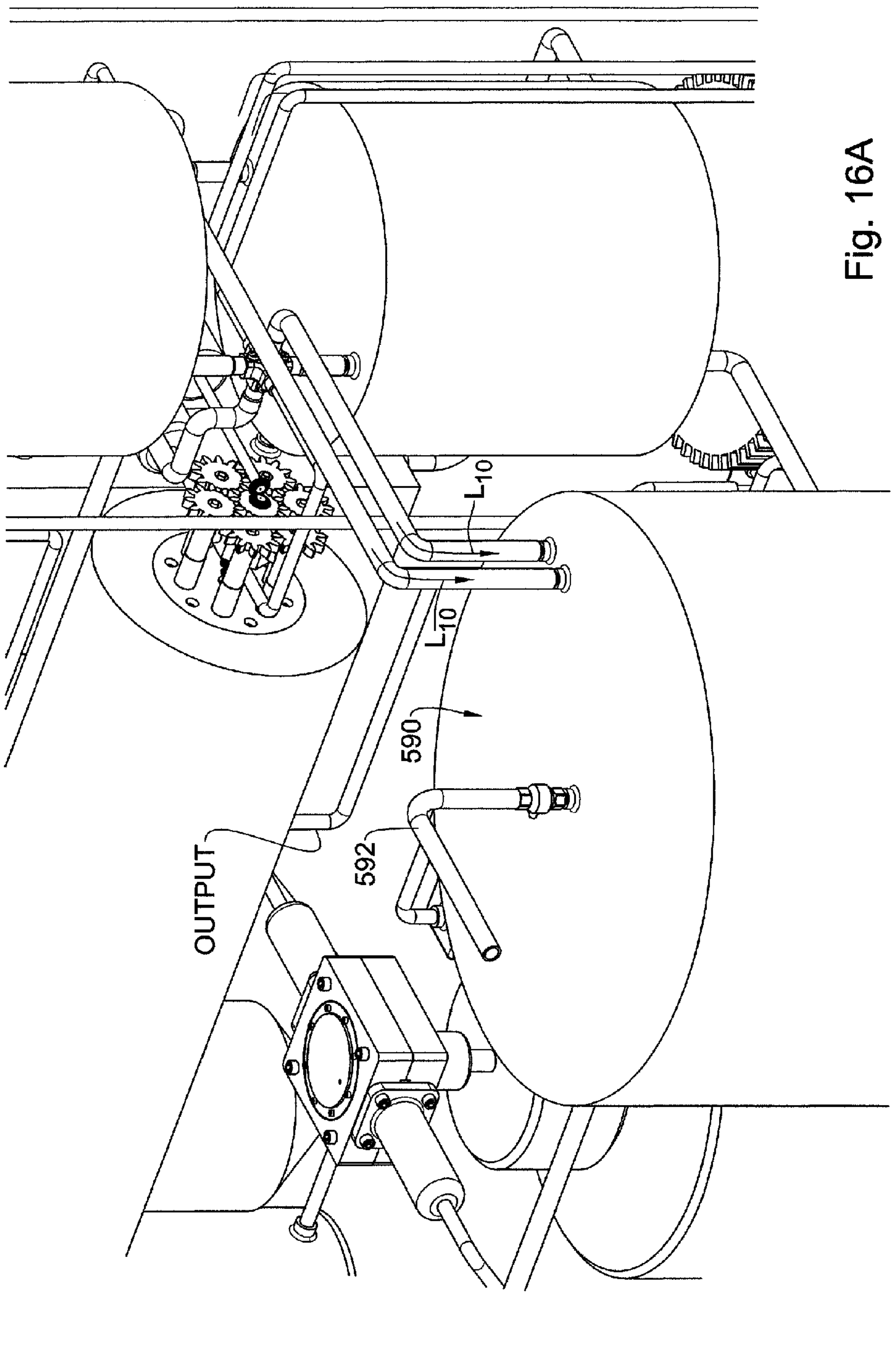
FIG. 16A is a schematic isometric view of an accumulator arrangement used in the generator shown in FIGS. 11A and 11B.
Figure 16B:
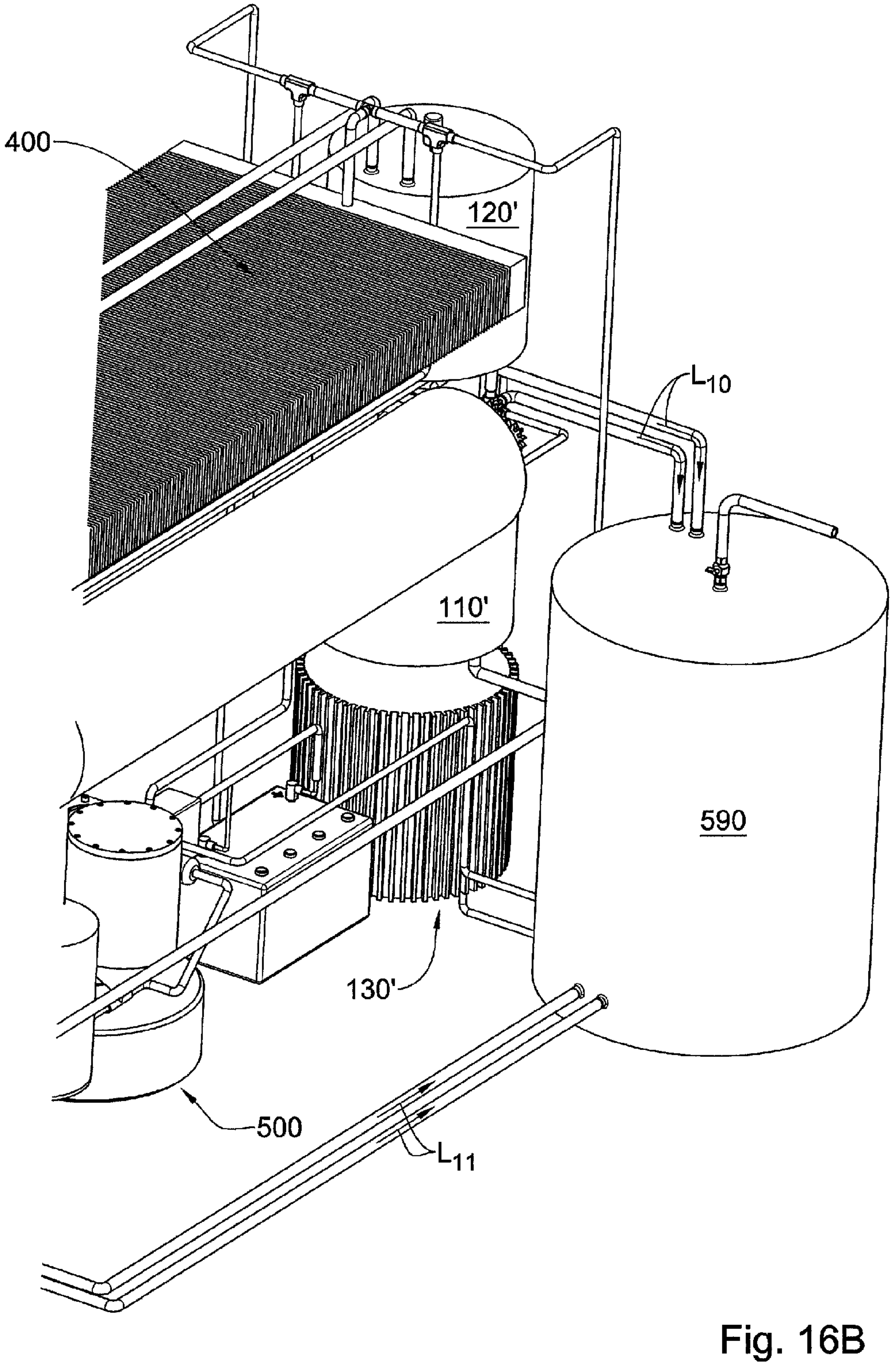
FIG. 16B is a schematic rear isometric view of an accumulator arrangement shown in FIG. 16A.

Turning now to FIGS. 16A and 16B, the accumulator arrangement 590 is shown when used in the generator 1' described above. The reservoir 590 has two lines $L_{10}$ leading thereto, one from each pressure vessel 200'. In addition, the accumulator arrangement 590 further has lines $L_{11}$ leading thereto from the rear side of the generator 1'. The storage reservoirs also have an outlet line 592 leading to a user port (not shown). The accumulator arrangement 590 may, as previously described, comprise a heating element therein, configured for heating up the work medium contained therein.

In general, the accumulator arrangement 590 can be used to accumulate excess energy produced by the generator 1'. More specifically, any additional energy generated by the generator 1' (i.e. energy not consumed by a user) can be diverted to heating up the work medium contained in the accumulator arrangement 590. The heated work medium of the accumulator arrangement 590 can later be used instead of the high temperature work medium produced in the high temperature reservoir 110' by the air conditioning unit AC, thereby saving on the power of the AC.

Alternatively, the pressure of the work medium in the accumulator arrangement 590 can be increased (greater than that required to the end user of line 592) so that the boiling point of the work medium increases, thereby allowing the work medium in the accumulator arrangement to absorb more energy.

Turning now to FIGS. 17A to 17D, the valves and piping system of the generator 1' are displayed:

$V_1$—main front valve, having inlets/outlets to the following lines:

$L_H$—outlet pipe from the high temperature reservoir 110';

$L_C$—outlet pipe from the low temperature reservoir 120';

$L_{10}$—outlet pipe leading to the accumulator arrangement 590;

L—main core line leading work medium into the pressure vessels 200'; and $L_{6C}$, $L_{6H}$—cross-over lines, leading work medium from a gradient tank 600 to an opposite pressure vessel 200'.

$V_2$—auxiliary front valve, having inlets/outlets to the following lines:

$L_{5L}'$, $L_{5R}'$ (splitting from $L_5'$)—lines leading intermediate temperature work medium at intermediate temperature from the gradient tanks 600;

$L_8$—leading intermediate temperature work medium back to the intermediate reservoir 130'; and $L_9$—leading intermediate temperature work medium to the rear of the generator 1' to provide pressure.

$V_3$—main rear valve, having inlets/outlets to the following lines:

$L_1$—leading work medium from the core of the pressure vessels 200';

$L_2$—leading high temperature work medium back to the high temperature reservoir 110';

$L_3$—leading low temperature work medium back to the low temperature reservoir 120';

$L_4$—leading intermediate temperature work medium to the gradient tank 600; and $L_9$—leading intermediate temperature work medium to the rear of the generator 1' to provide pressure.

$V_4$—auxiliary rear valve, having inlets/outlets to the following lines:

$L_4$—leading intermediate temperature work medium to the gradient tank 600;

$L_5$—leading intermediate temperature work medium to the gradient tank 600; and $L_{6C}$, $L_{6H}$—cross-over lines, leading work medium from a gradient tank 600 to an opposite pressure vessel 200'.

Figure 17E:
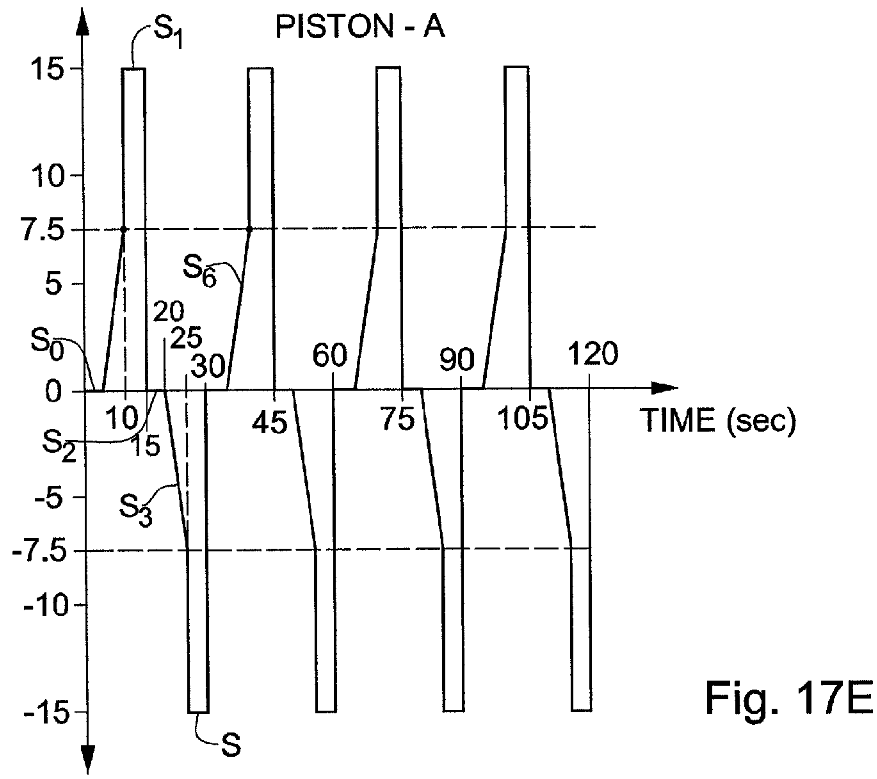
FIGS. 17E and 17E' are a schematic charts of the temperature of the work medium of the generator shown in FIGS. 11A and 11B.
Figure 17E:
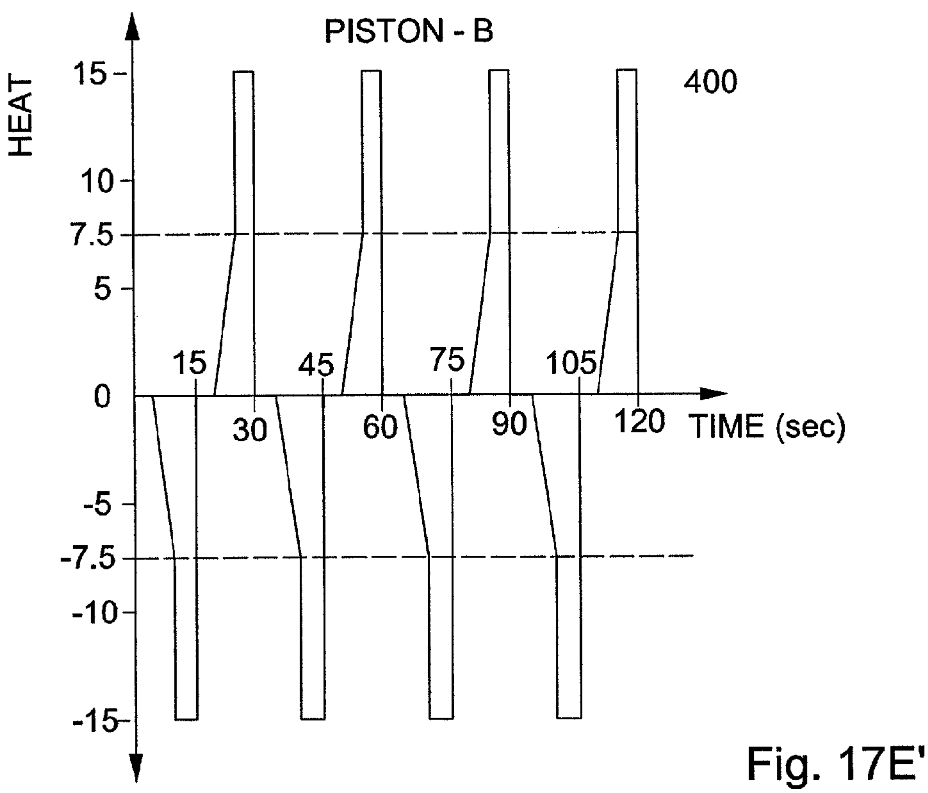
Figure 18A:
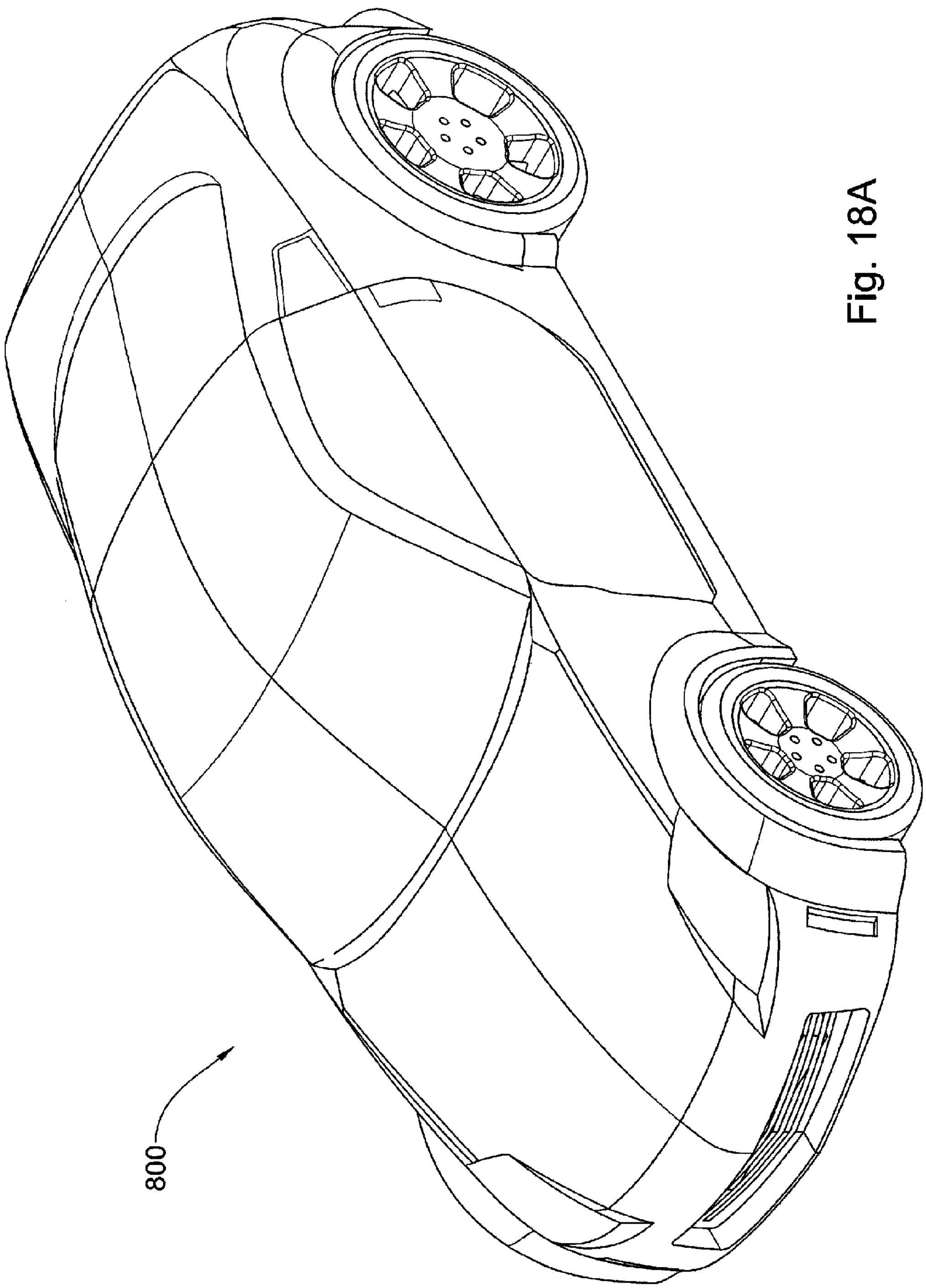
FIG. 18A is a schematic isometric view of a vehicle comprising the generator shown in FIGS. 11A and 11B.
Figure 18B:
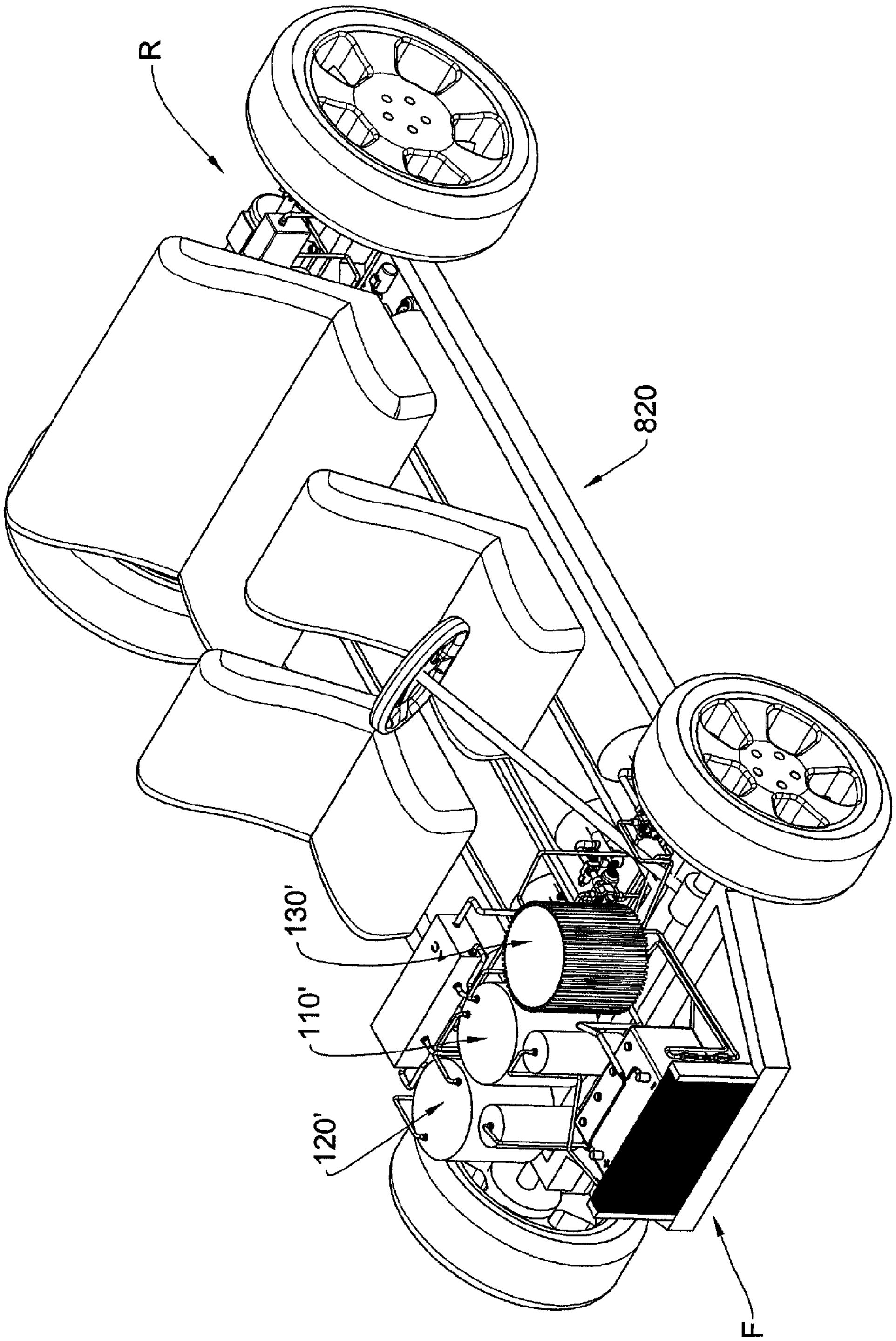
FIG. 18B is a schematic isometric view of the vehicle shown in FIG. 18A, with several components thereof being removed.
Figure 18C:
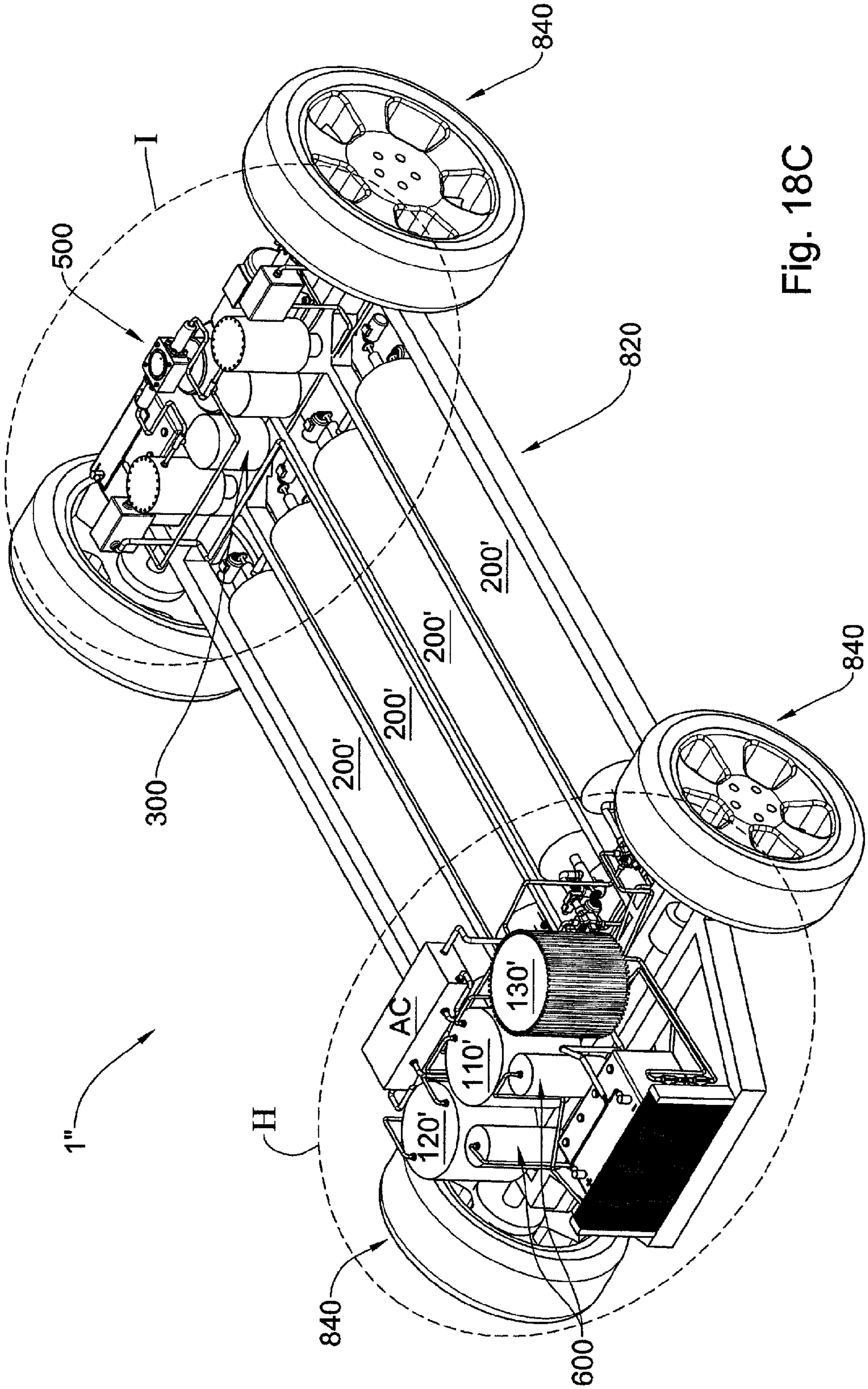
FIG. 18C is a schematic isometric view of the vehicle shown in FIG. 18B, with further components thereof being removed.
Figure 18D:
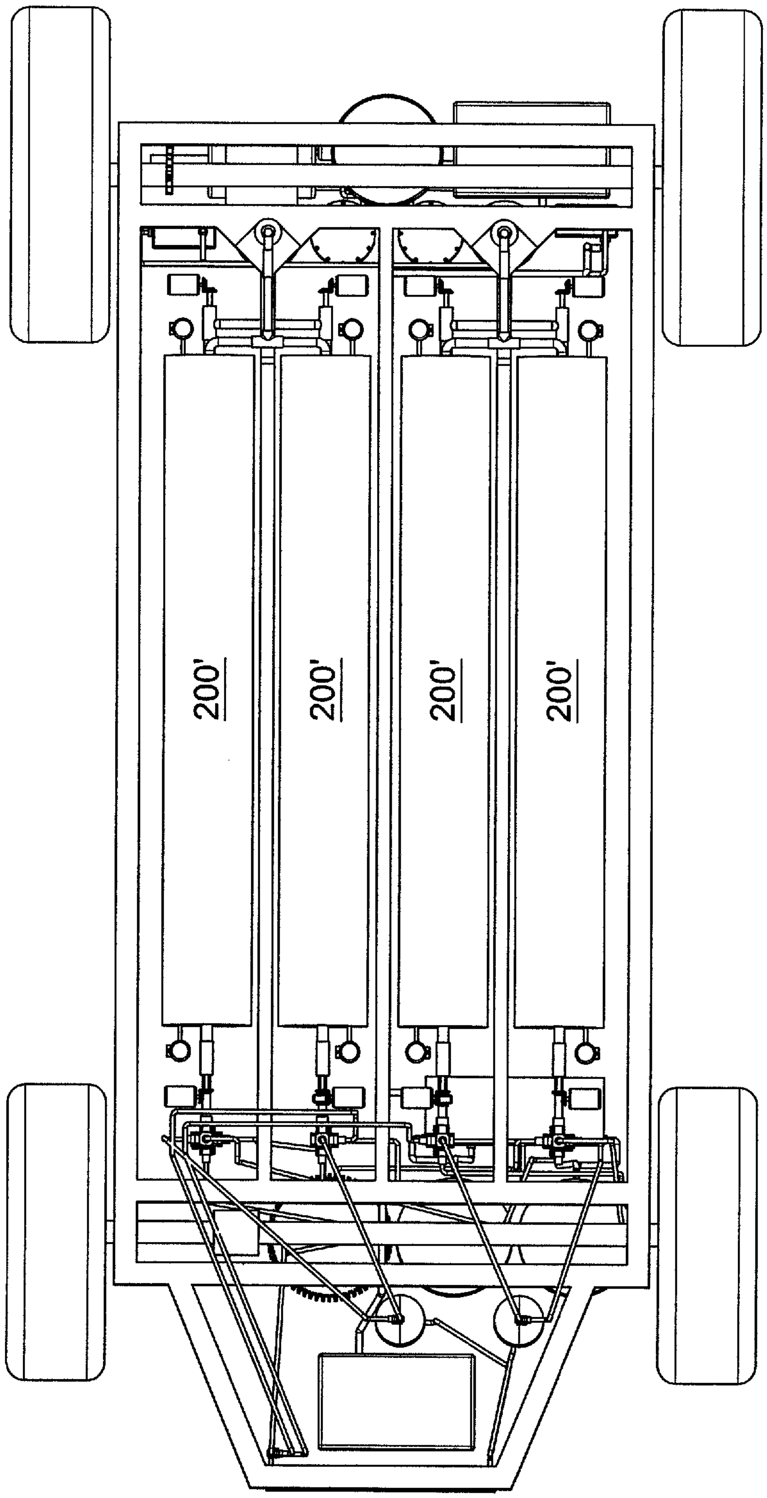
FIGS. 18D and 18E are respective schematic top and bottom views of the vehicle shown in FIG. 18C.
Figure 18E:
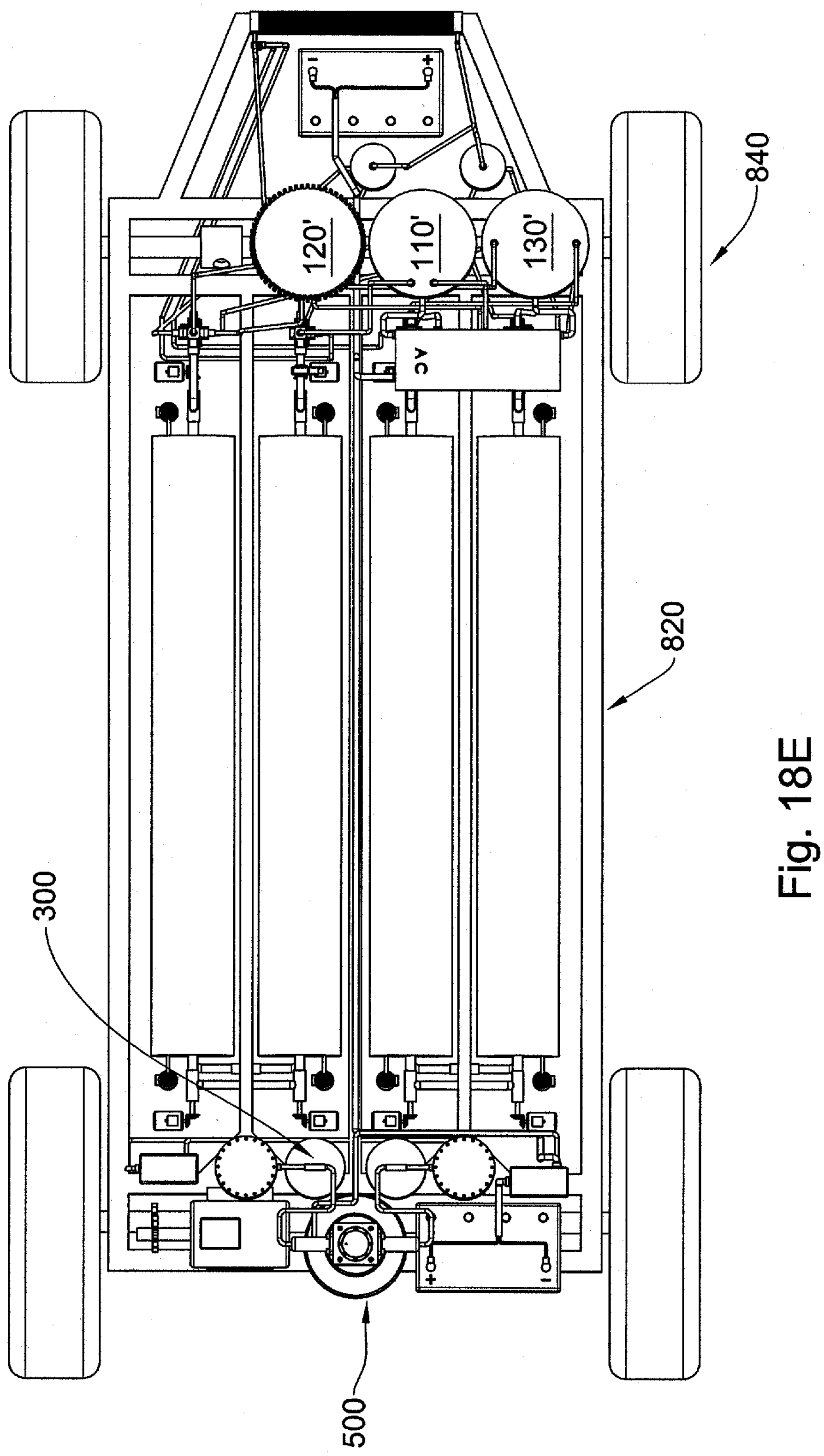
Figure 18F:
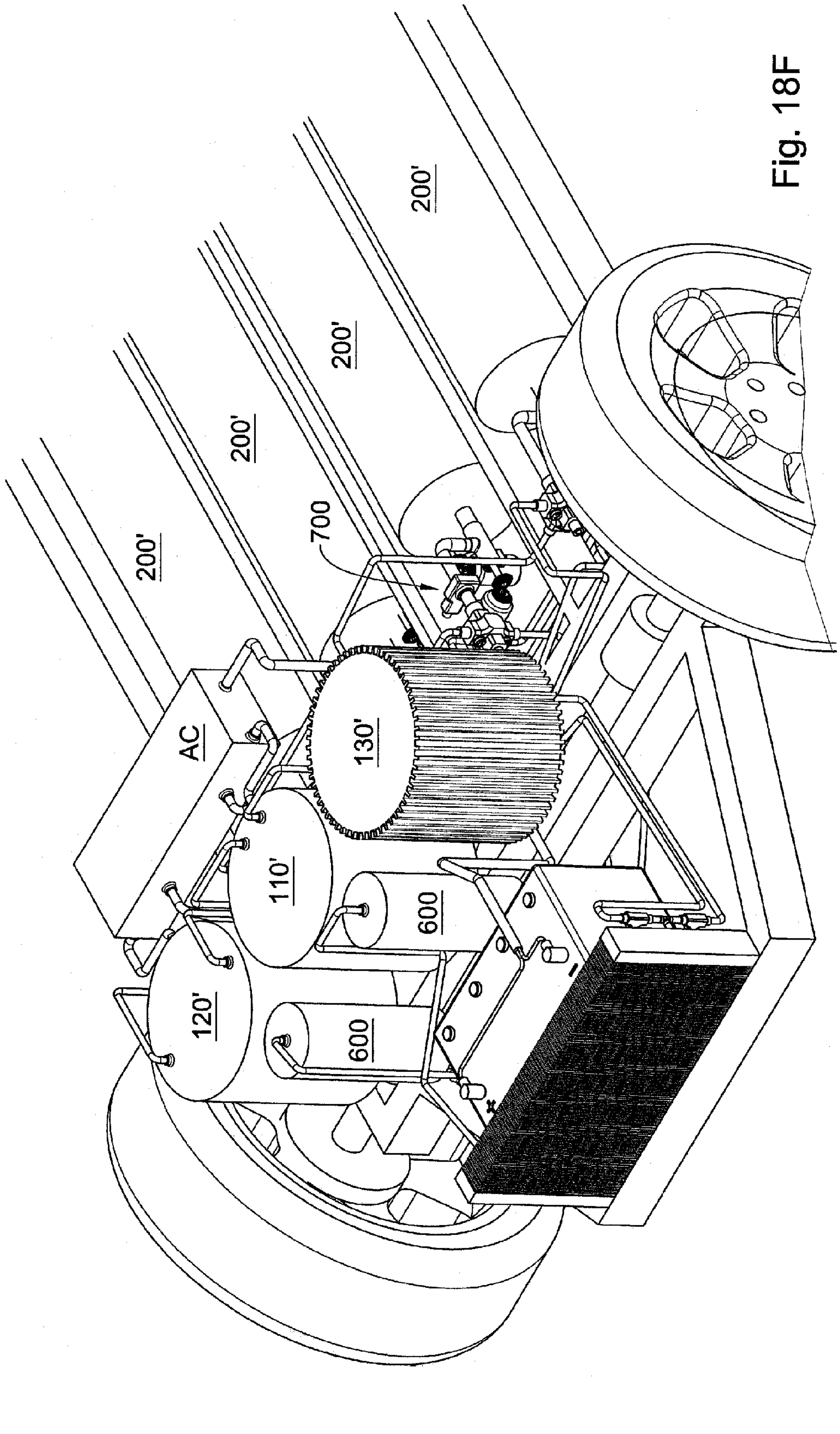
FIGS. 18F and 18G are respective schematic enlarged views of details H and I shown in FIG. 1 SC respectively.
Figure 18G:
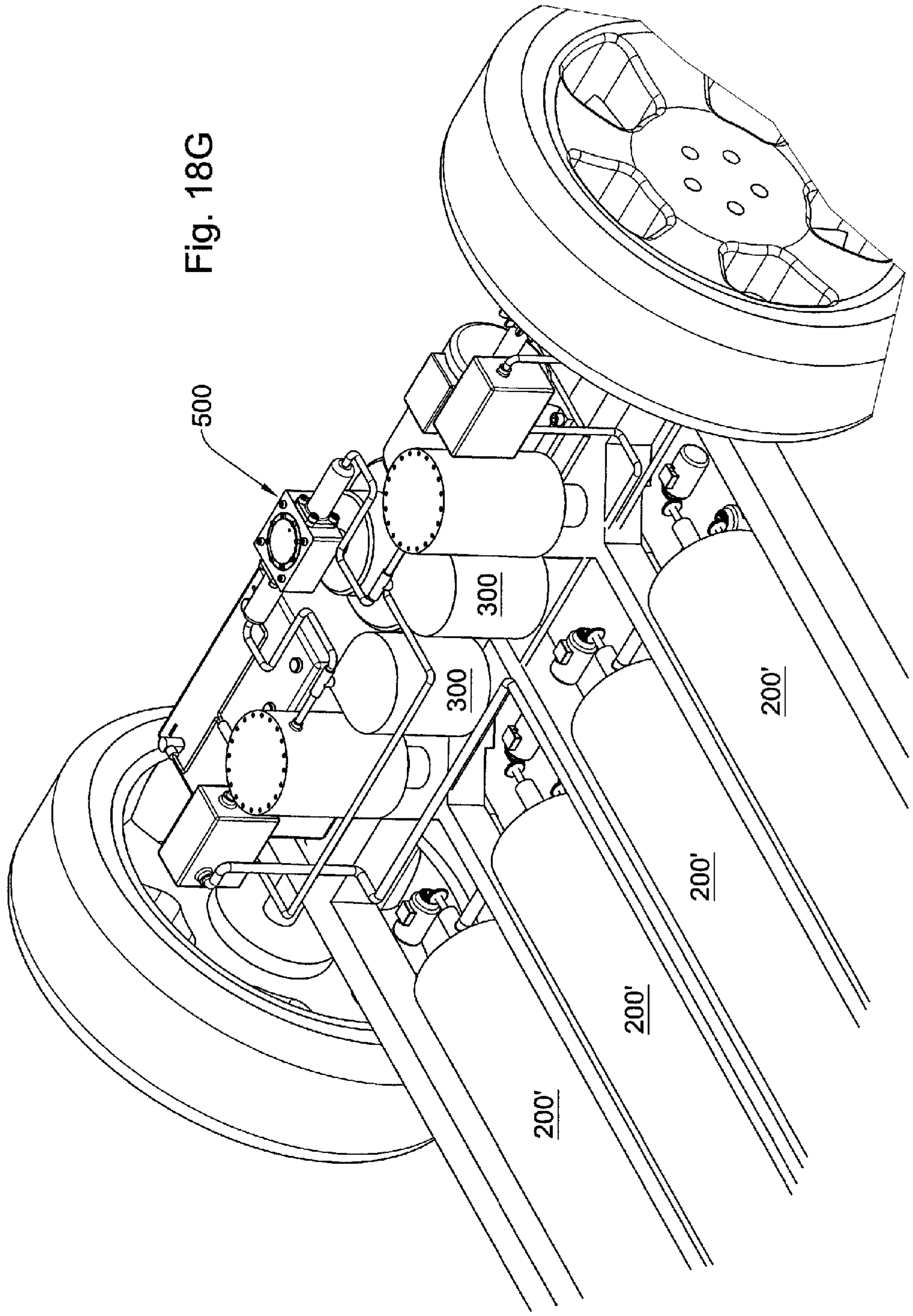
Figure 19A:
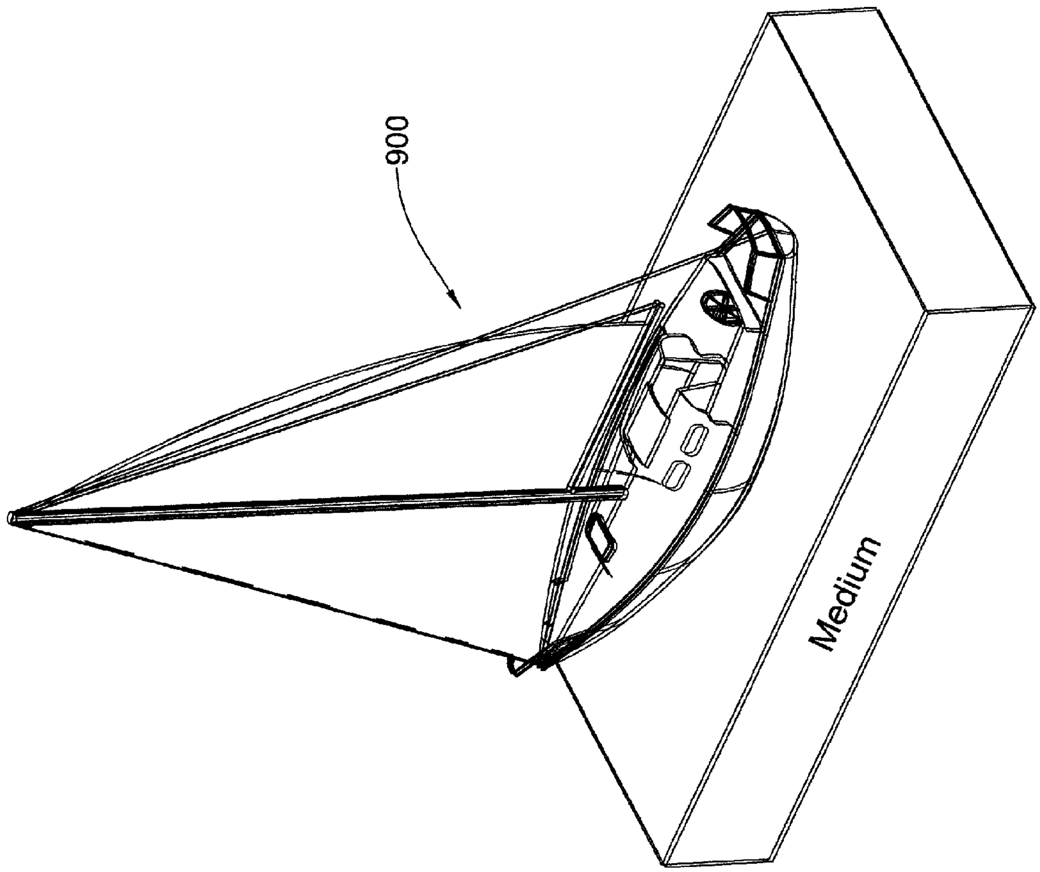
FIG. 19A is a schematic isometric view of a marine vessel comprising the generator shown in FIGS. 11A and 11B.
Figure 19B:
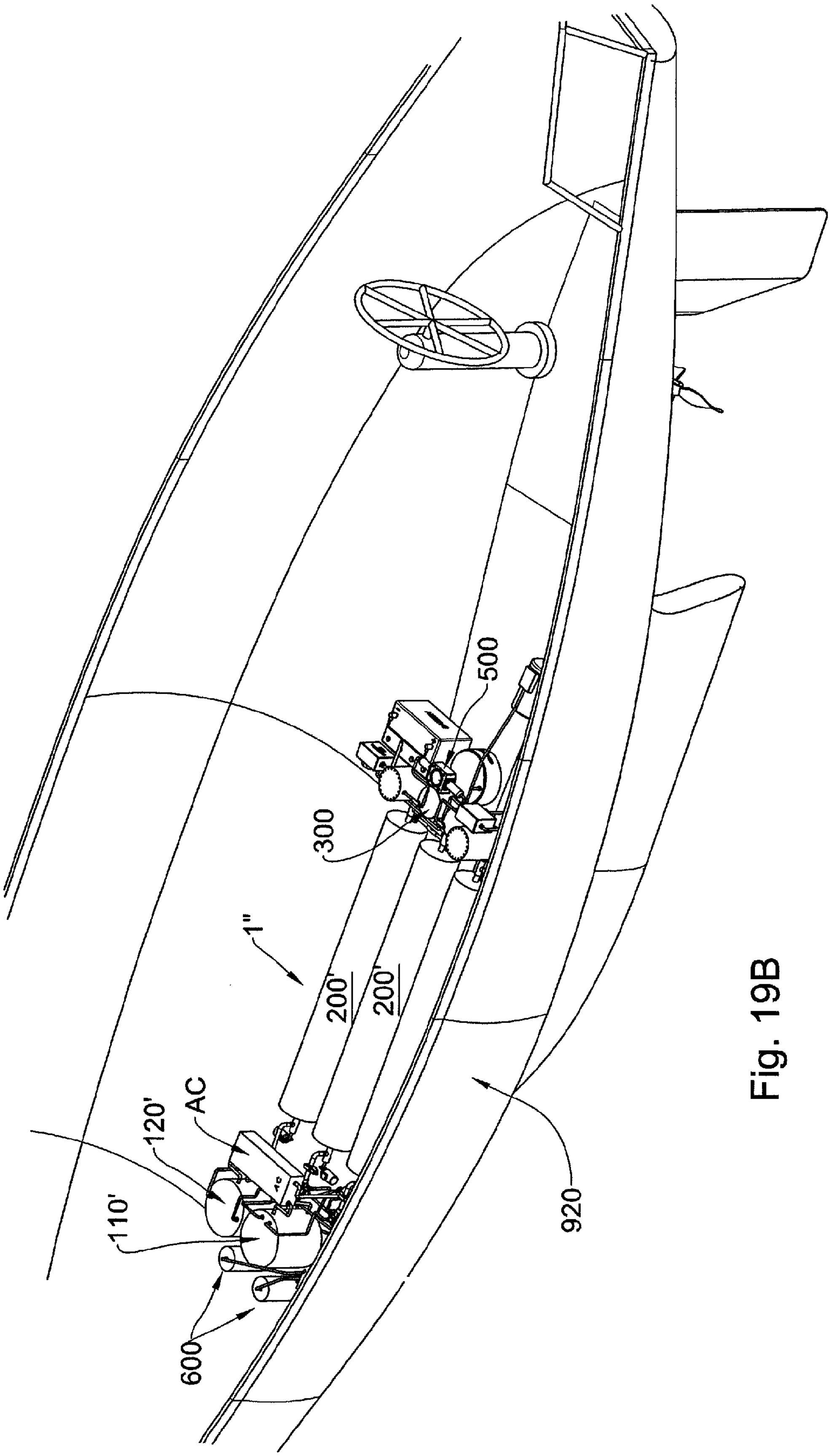
FIG. 19B is a schematic isometric view of the marine vessel shown in FIG. 19A, with several components thereof being removed.
Figure 19C:
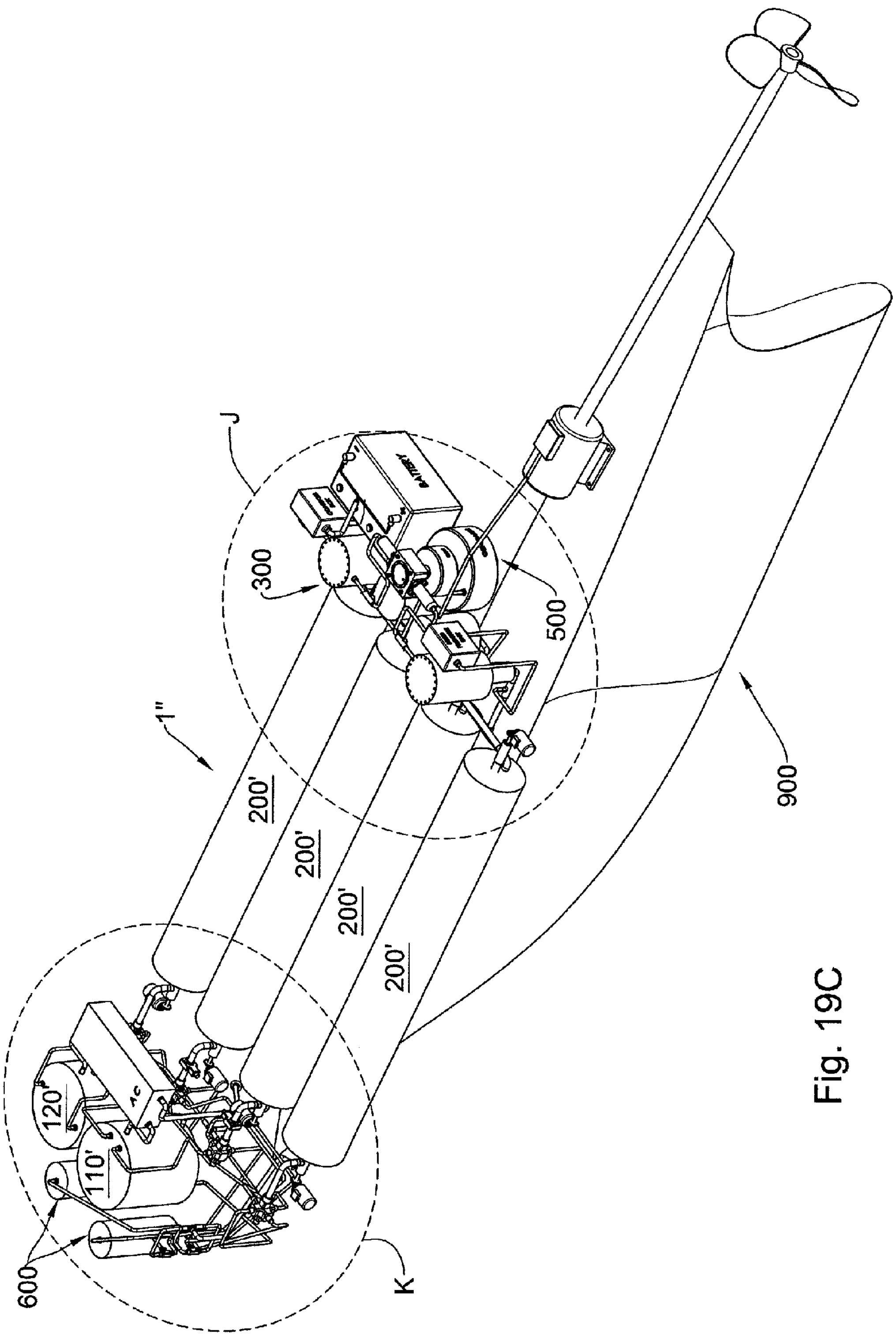
FIG. 19C is a schematic isometric view of the marine vessel shown in FIG. 19B, with further components thereof being removed.
Figure 19D:
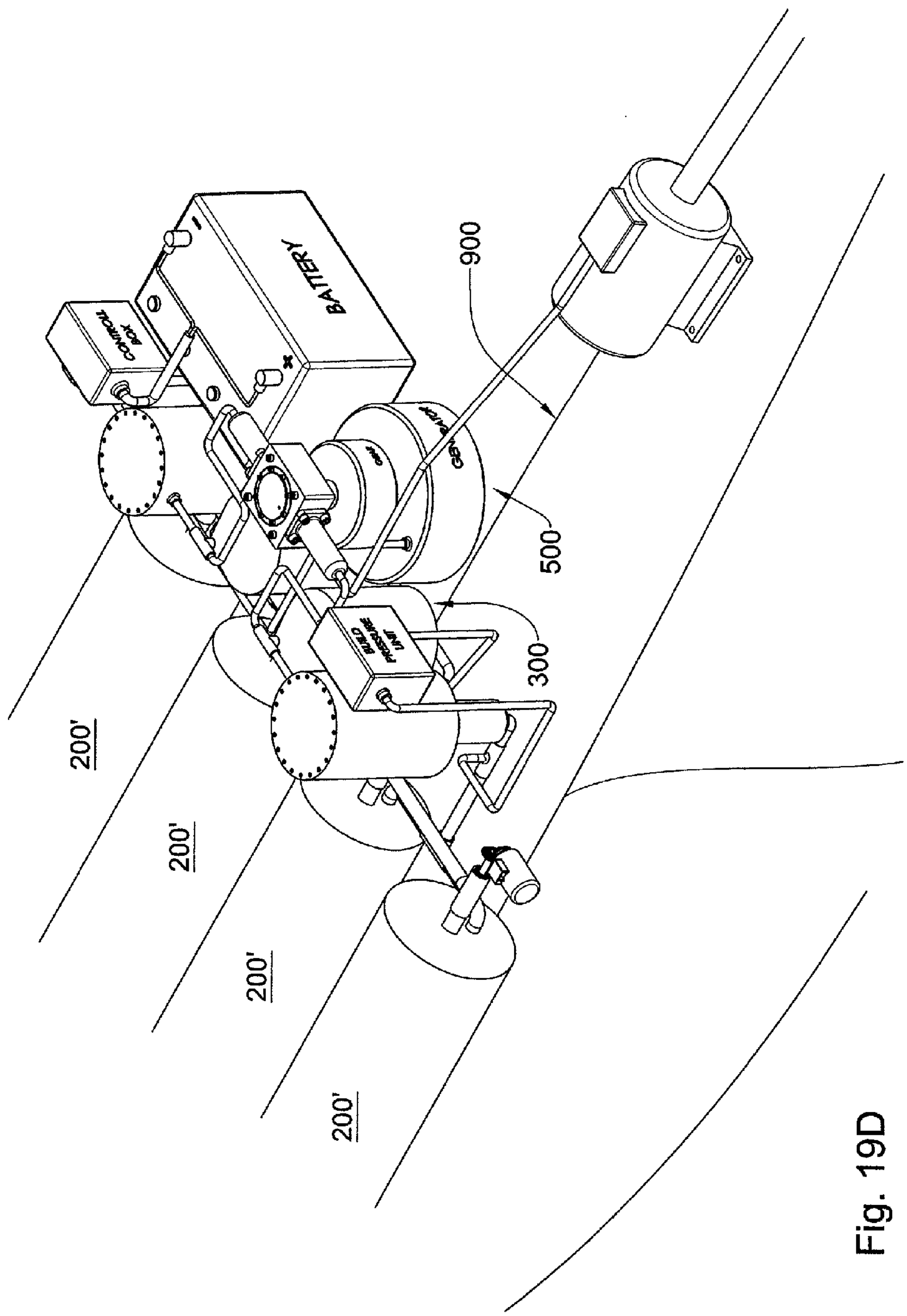
FIGS. 19D to 19F are respective schematic enlarged views of details J, K and L shown in FIG. 19C respectively.
Figure 19E:
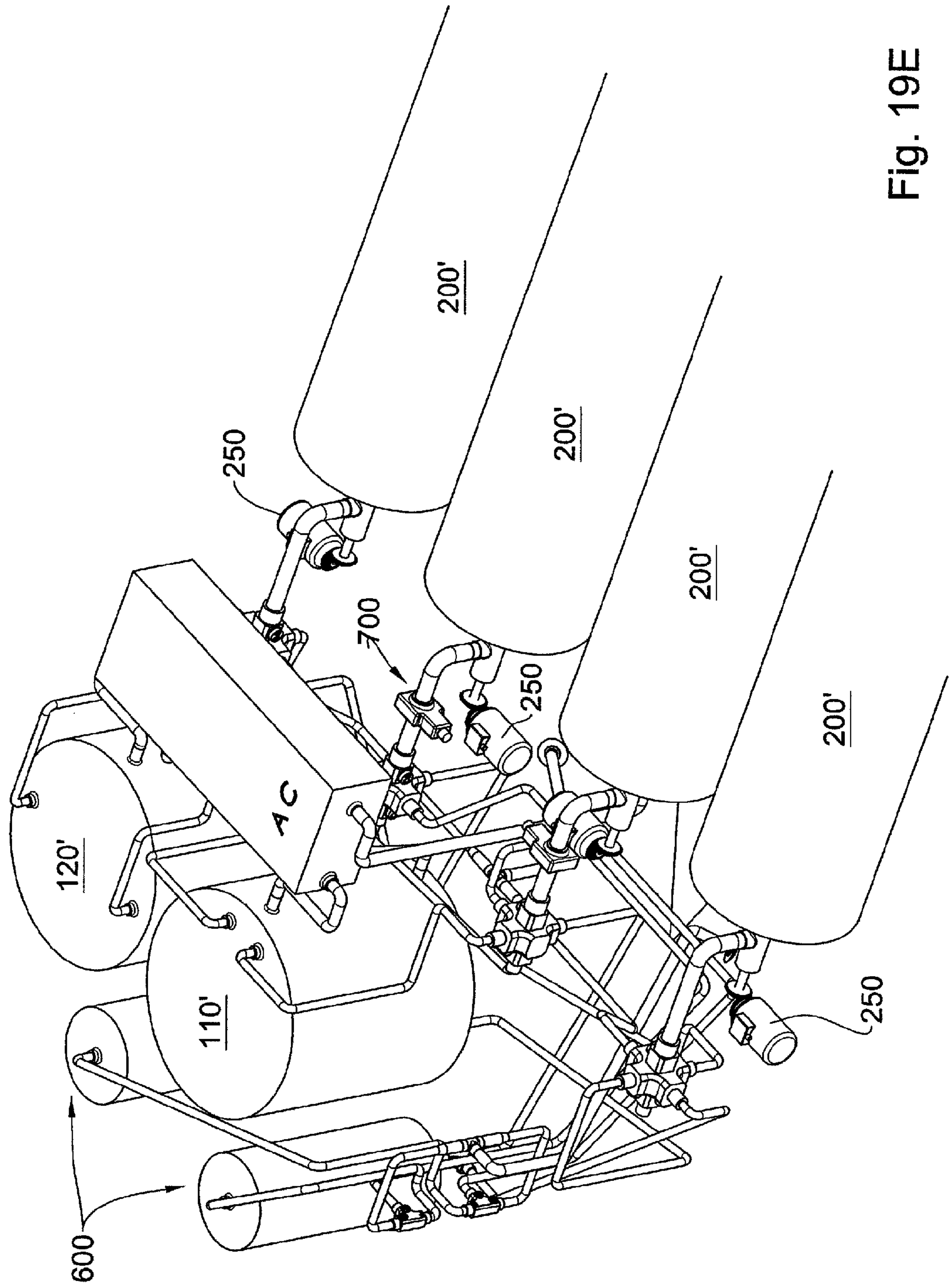
Figure 19F:
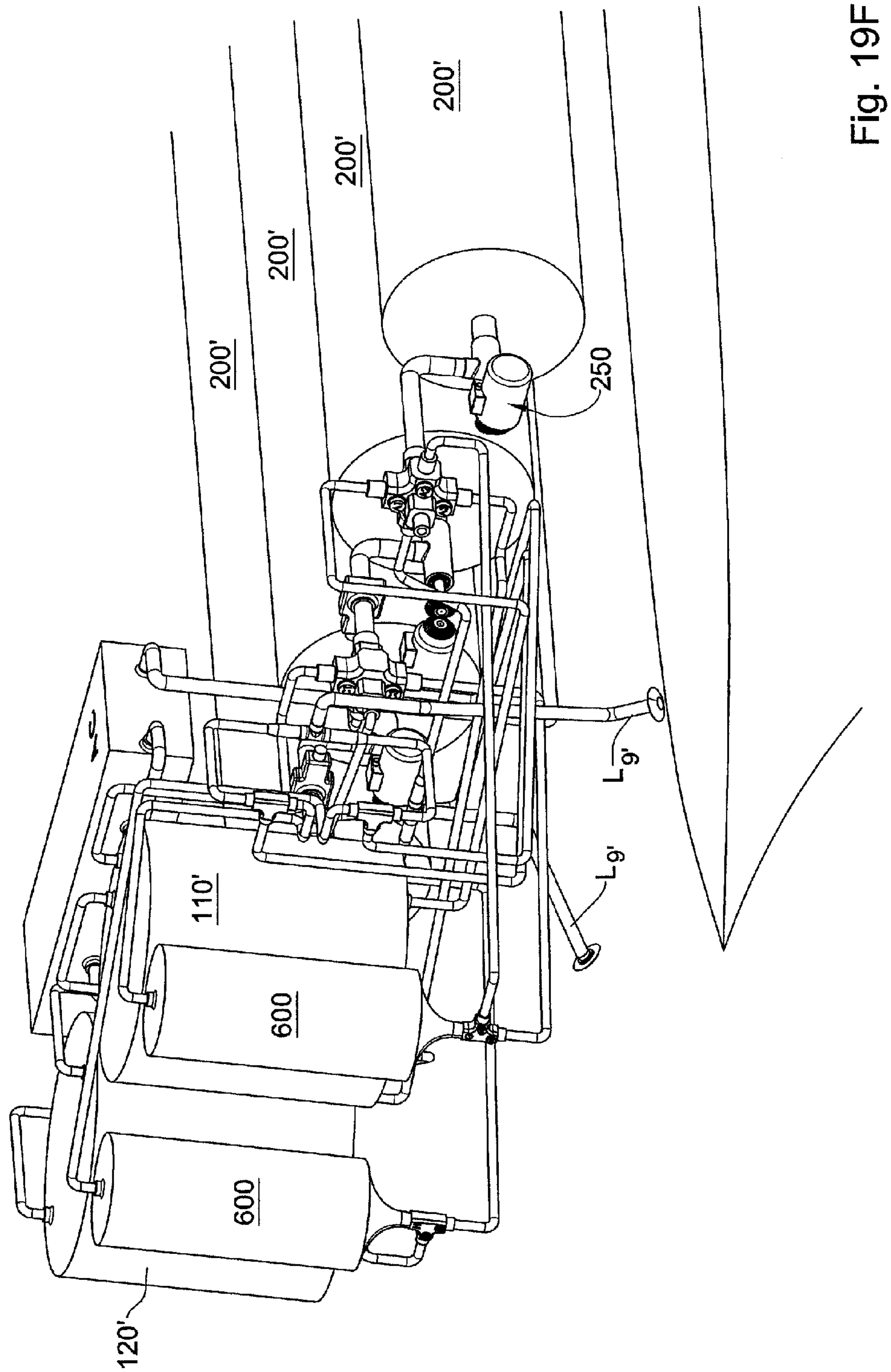

Turning now to FIG. 17E, a schematic chart of the temperature of the work medium passing through the core is shown, one for each of the pressure vessels 200R', 200L'. The chart can be divided into the following sections:

$S_1$—equivalent to step (a)(i) of a first half-cycle described above—high temperature work medium at temperature $T_{HOT}$ of 15° C. is passed through the core from t≈10 sec to t=15 sec;

$S_2$—equivalent to step (b)(i) of a first half-cycle described above—intermediate temperature work medium at temperature $T_{INTERMEDIATE}$ are passed through the core from t=15 sec to t≈20 sec;

$S_3$—equivalent to step (d)(i) of a first half-cycle described above—cooled intermediate temperature work medium at a gradient temperature from the gradient tank 600 of the opposite pressure vessel 200' is passed through the core from t≈20 sec to t≈25 sec;

$S_4$—equivalent to step (a)(i) of a second half-cycle described above, where the pressure vessels trade place—low temperature work medium at TCOLD is passed through the core from t≈25 sec to t≈30 sec;

$S_5$—equivalent to step (b)(i) of a second half-cycle described above—intermediate temperature work medium at $T_{INTERMEDIATE}$ is passed through the pressure vessels 200' from t≈30 sec to t≈35 sec; and $S_6$—equivalent to step (d)(i) of a second half-cycle described above—heated intermediate temperature work medium at a gradient temperature from the gradient tank 600 of the opposite pressure vessel 200' is passed through the core from t≈35 sec to t≈40 sec;

This concludes a full cycle of the generator 1'. It is appreciated that the lower chart depicts the temperature of the work medium passing through the core of the opposite pressure vessel. Thus, the above stages are applicable to the lower chart, with the changing of the index from (i) to (ii), e.g. step (b)(ii) instead of step (b)(i).

Turning now to FIGS. 18A to 18G, a vehicle is shown, generally designated as 800, in which a modified version of generator 1' is employed, generally designated as 1". It is observed that the containers of the work medium are disposed at the front F of the vehicle 800 while all the movement generating mechanisms are located at the rear R of the vehicle 800. The pressure vessels 200' are disposed horizontally along the chassis 820 of the vehicle, connecting between the front F and the rear R.

Unlike the generator 1' described above, in the present generator, the gradient tanks 600 are located on the same side f the pressure vessels 200' as the work medium reservoirs 110', 120' and 130'.

It is also appreciated that the disposition of the pressure vessels 200' provides the vehicle 800 with extra stability due to the weight of the pressure vessels 200'. It is also appreciated that since the vehicle 800 is usually in movement when the generator 1' is active, the efficiency of the operation of the radiator 400 can be considerably improved due to the increase in the heat transfer coefficient between the moving vehicle 800 and the ambient air.

Turning now to FIGS. 19A to 19F. a marine vessel generally designated 900 is shown comprising a modified version of the previously described generator 1', generally designated as 1'".

It is noted that in the generator 1'", the intermediate reservoir 130' is missing. The reason for this is that the generator 1'" uses the water it is submerged in as its main work medium, and therefore, the reservoir holding the water in which it is submerged (lake, ocean, pool) replaces the reservoir 130'. In order to utilize the medium, two lines $L_9'$ are provided, allowing the generator to withdraw water from the above medium into the generator 1'".

Figure 20A:
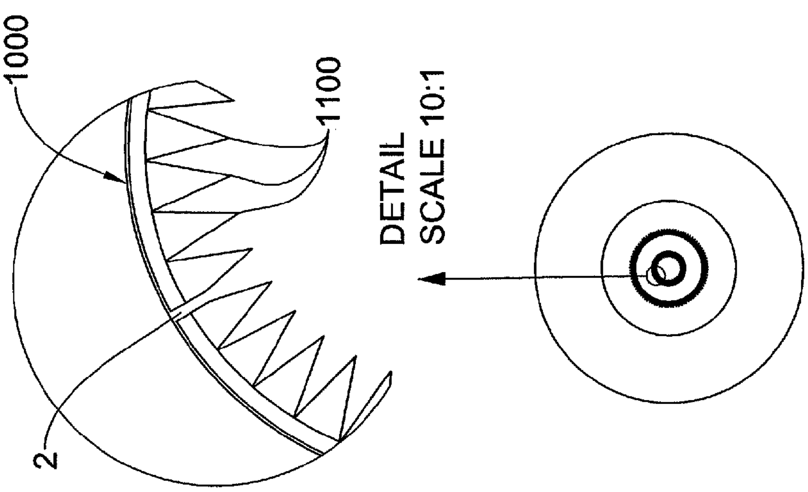
FIGS. 20A and 20B are respective schematic cross-sectional views of a cylindrical component of the generator shown in FIGS. 11A and 11B.
Figure 20B:
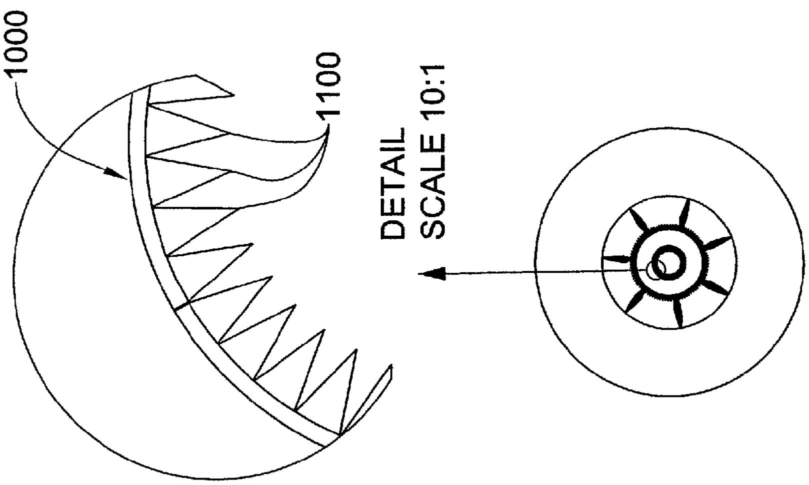

Turning now to FIGS. 20A and 20B, there is shown a cross-section of a core of the pressure vessel 200' when without pressure and when pressure is applied thereto respectively. It is observed that the inner surface of the core is lined with an inner layer 1000 having an increased surface area due to micro-structures 1100 formed thereon. Increasing the surface area is desired in order to increase the heat transfer coefficient between the inner layer and the work medium flowing through the core.

Figure 20C:
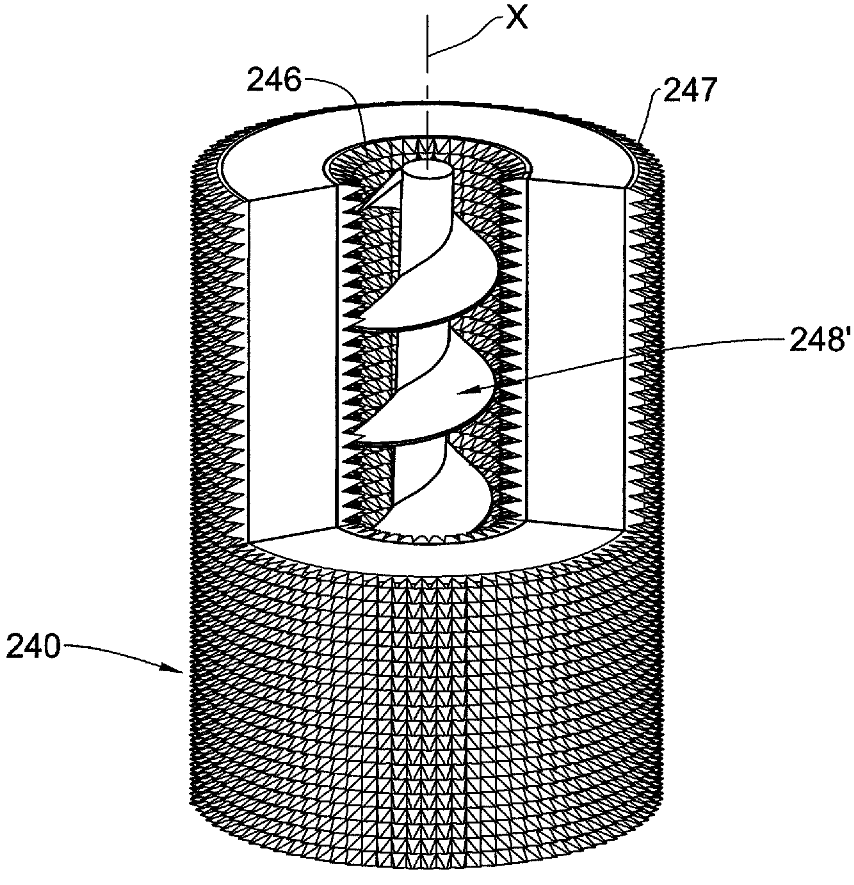
FIG. 20C is a schematic isometric partial cross-sectional view of the cylindrical component shown in FIG. 20A, with a spiral element located therein.

FIG. 20C shows the core of the vessel 200' with the spiral 240' passing therein, configured for causing progression of the work medium through the pressure vessel 200' and the entire generator system 1.

Turning now to FIGS. 21A to 21G, a method for producing the inner layer is shown, including the following steps:

(a) providing a generally planar plate 1000' having a first face $F_1$ and an opposite second face $F_2$;

(b) pre-forming the micro-structures 1100 on the first face $F_1$ using two pressing wheels $W_1$, $W_2$ one of which is formed with a corresponding surface MS for forming the micro-structures 1100;

(c) providing a mold M formed with a non-through going cavity C corresponding in size and shape to the plate 1000', the cavity C having a base surface and an opening at a surface of the mold M;

(d) placing the plate 1000' in the cavity such that the second face $F_2$ is mated against the base surface and the first face $F_1$ is facing the opening of the cavity C, such that there remains a space between the first face $F_1$ and the opening;

(e) introducing a filler material F into the cavity C so as to fill the space, including spaces formed between the micro-structures MS;

(f) letting the filler material F solidify so as to form a single plate constituted by the plate 1000' and solidified filler material F, having a first face constituted by the filler material and a second face $F_2$ constituted by the second face of the original plate 1000';

(g) deforming the single plate by a pressure block PB and a deformation mold

D, to obtain at least a partially cylindrical shape of diameter Dm, such that the second face $F_2$ of the single plate 1000' constitutes and outer surface of the cylinder and the first face of the single plate constituted an inner surface of the cylinder;

(h) removing the filler material F from the single plate 1000', thereby resulting in the original plate 1000 having micro-structures MS formed on the inner surface thereof; and (i) performing a final finish on the inner surface with the micro-structures.

Figure 20D:
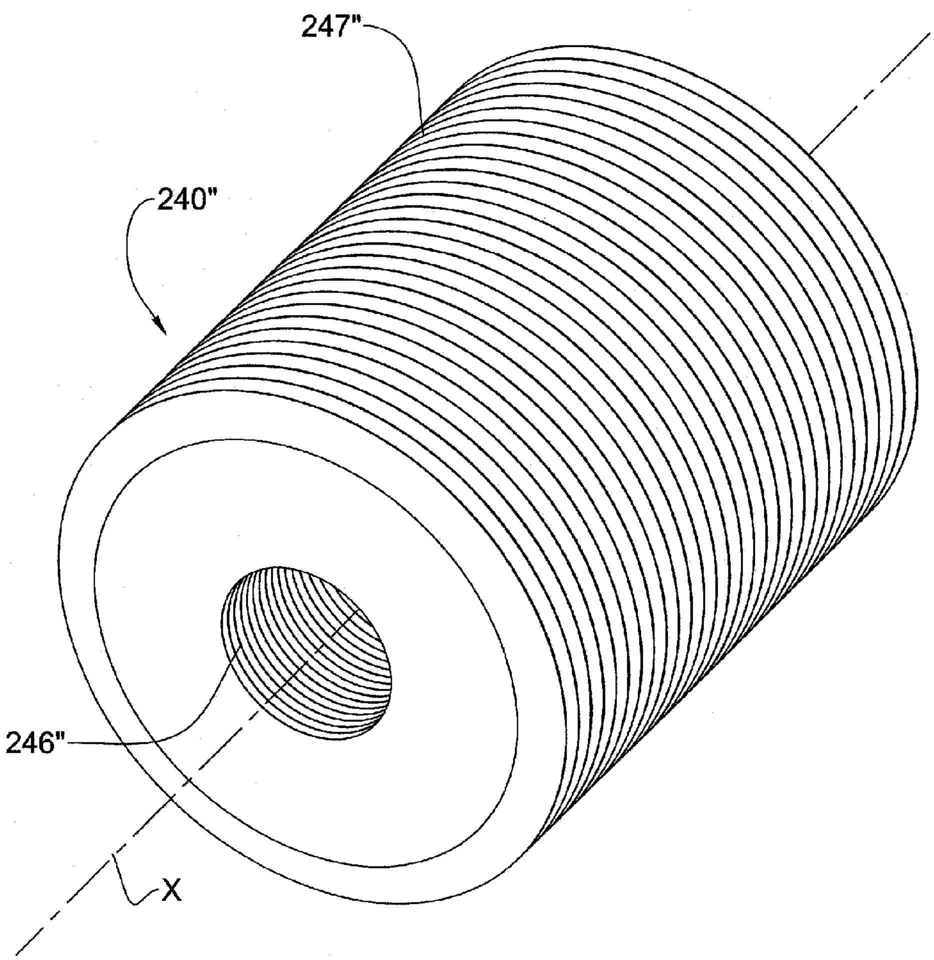
FIG. 20D is a schematic isometric view of another example for a cylindrical component to be used in the generator of the present application.
Figure 20E:
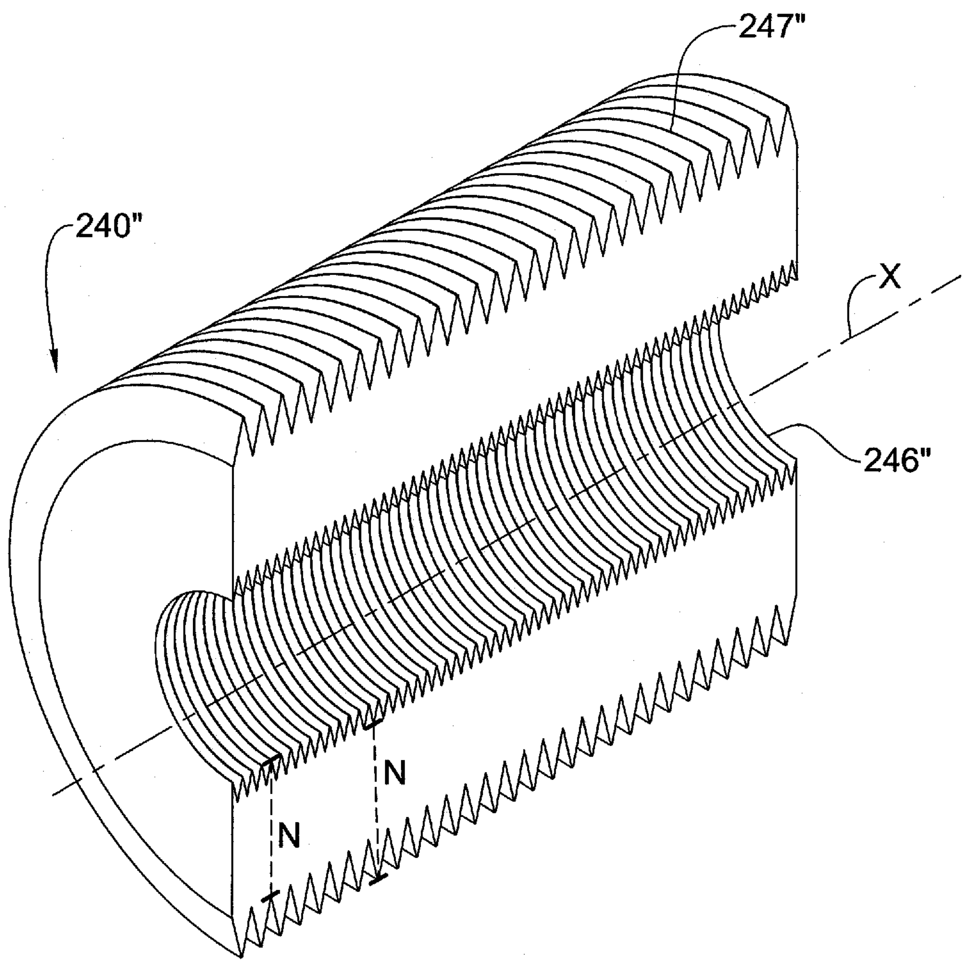
FIG. 20E is a schematic cross-sectional view of the cylindrical component shown in FIG. 20D taken along a central axis thereof.
Figure 21A:
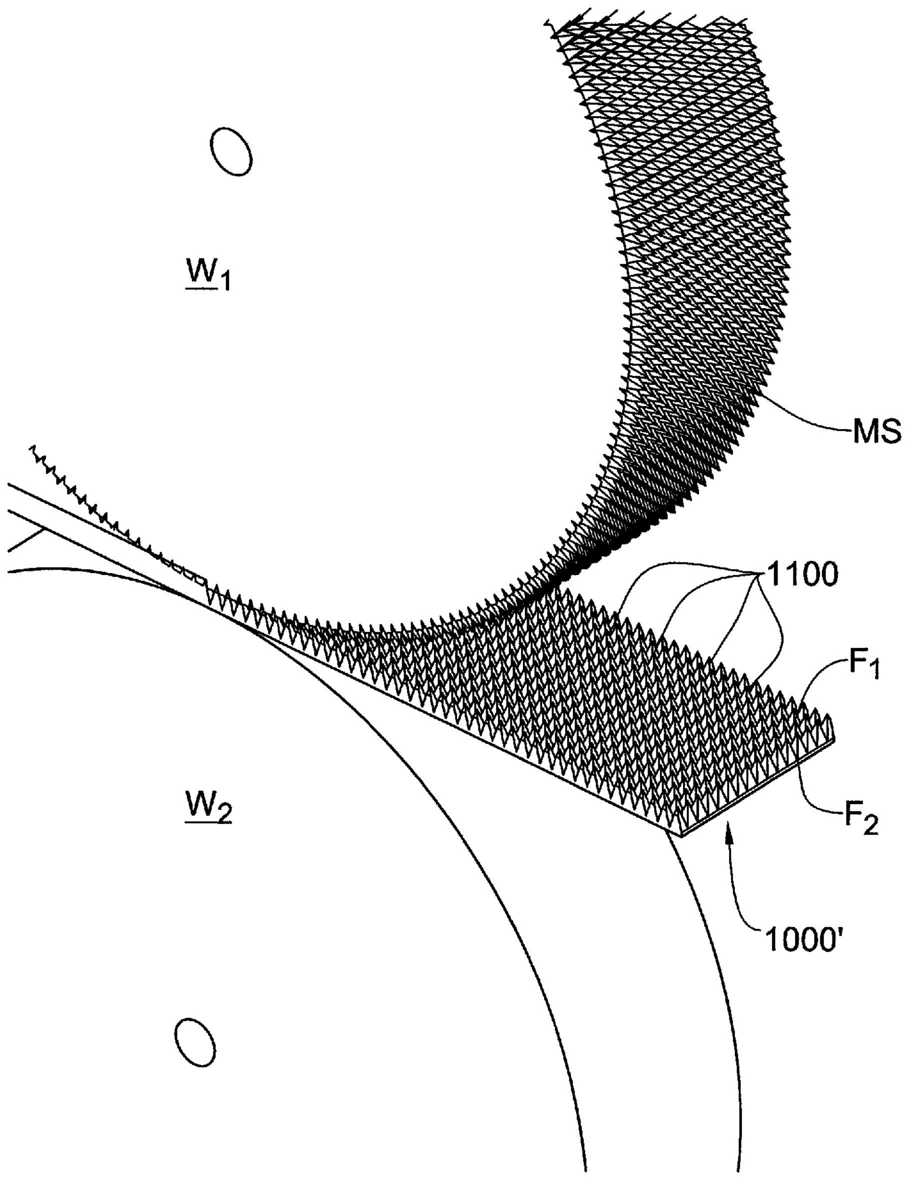
FIGS. 21A to 21G are respective schematic isometric views of various stages of producing the cylindrical component shown in FIGS. 20A and 20B.
Figure 21B:
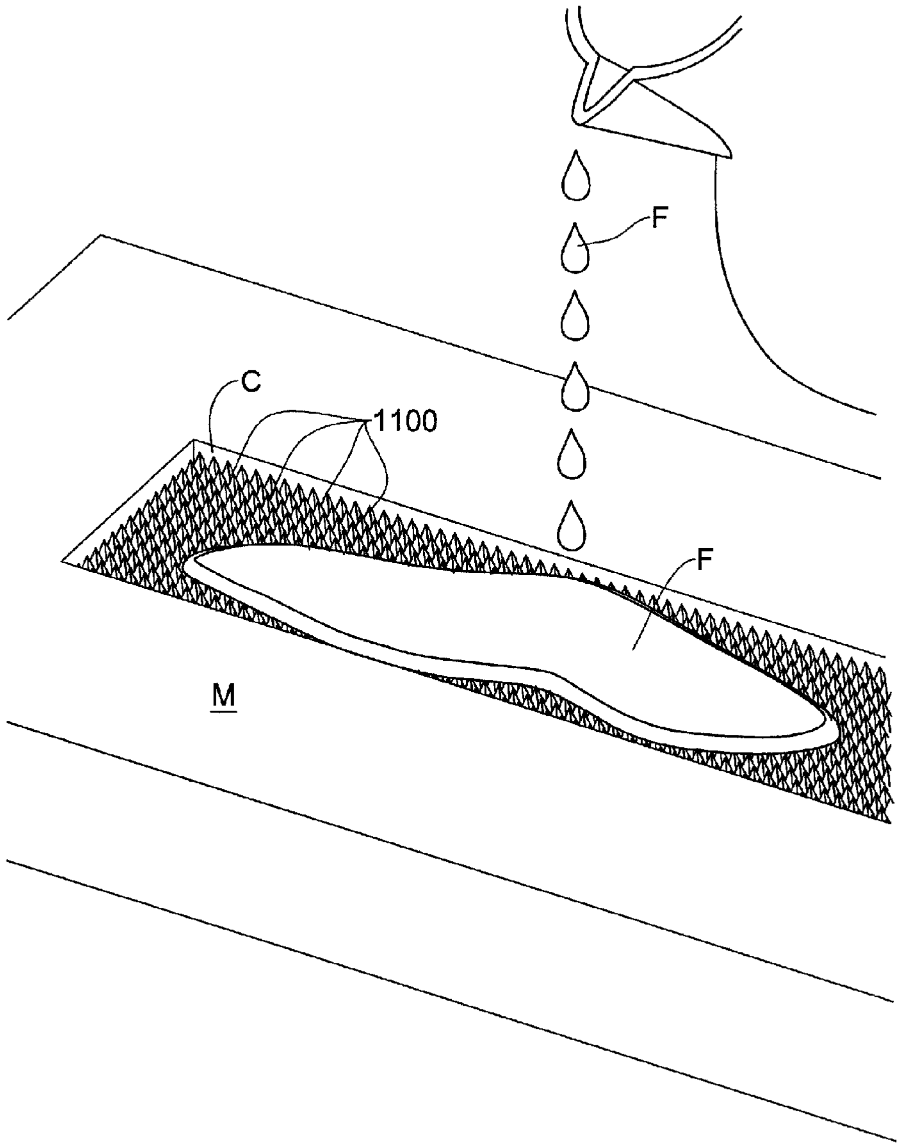
Figure 21C:
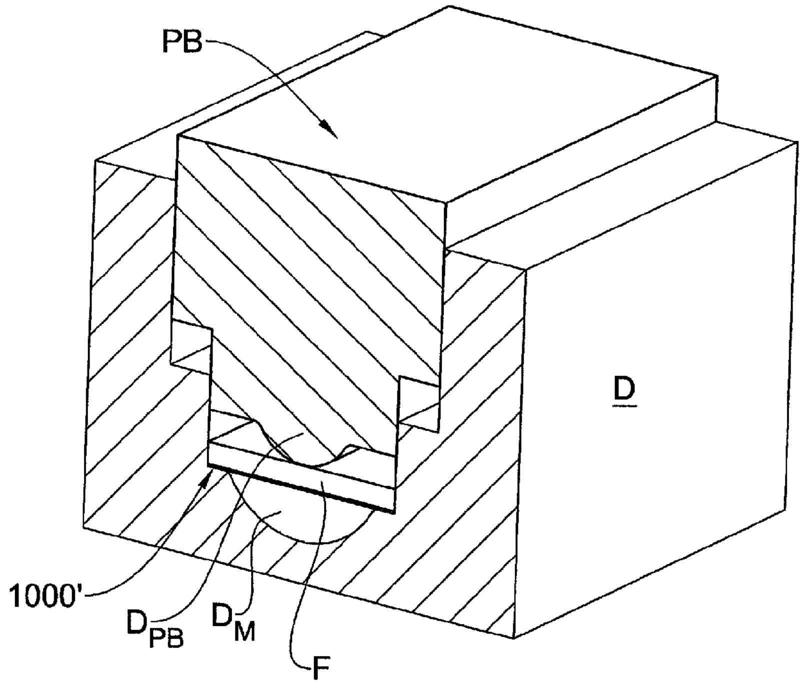
Figure 21D:
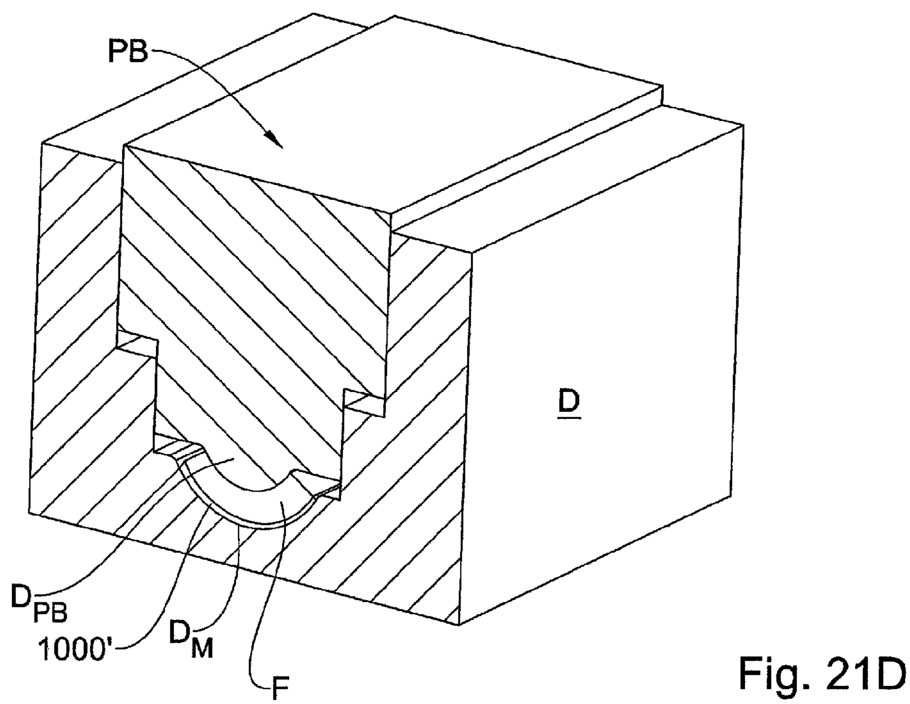
Figure 21E:
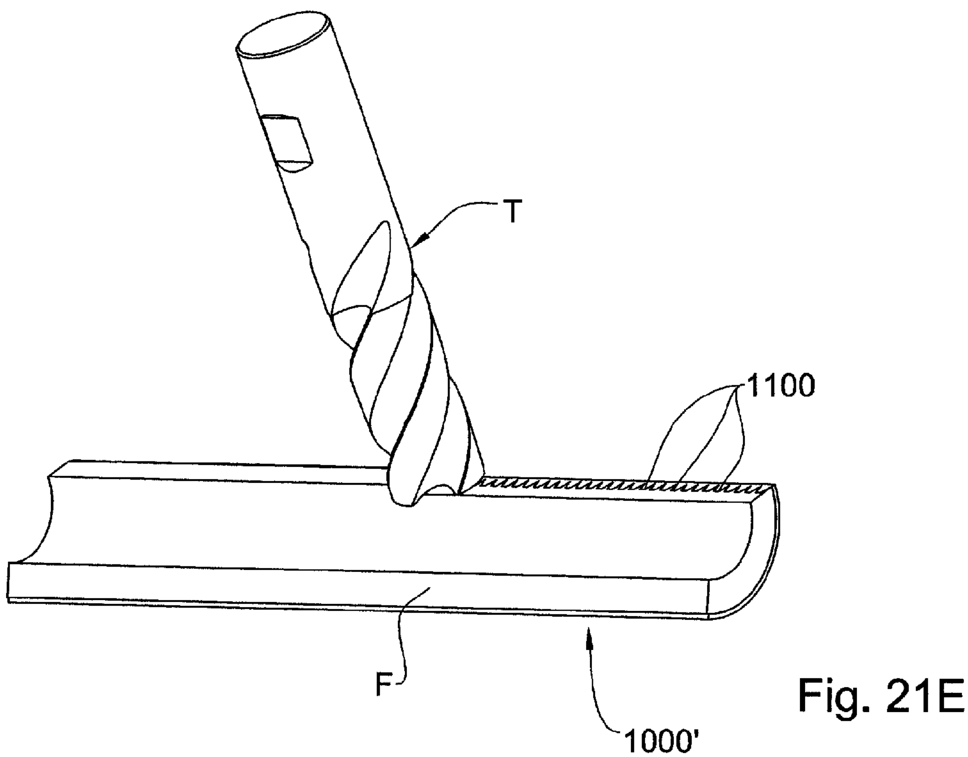
Figure 21F:
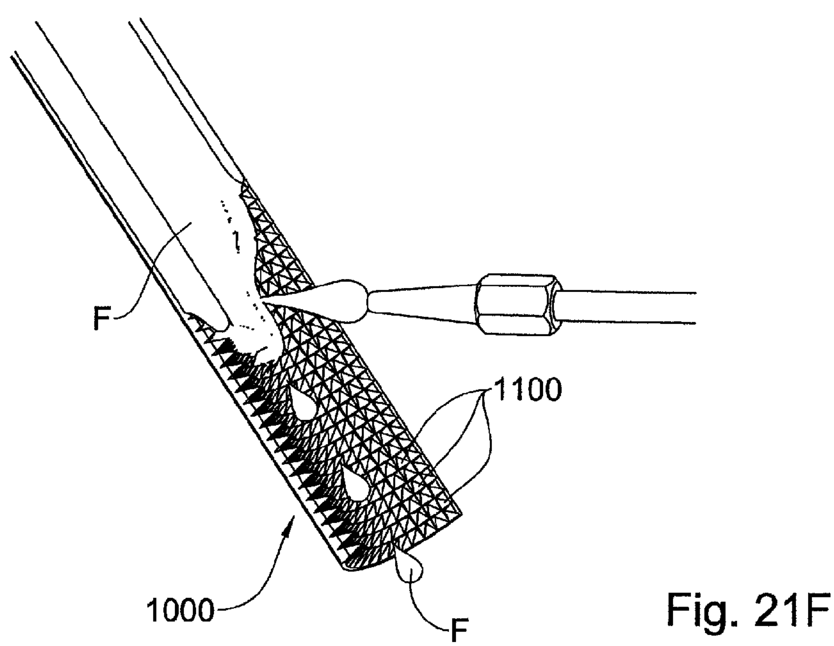
Figure 21G:
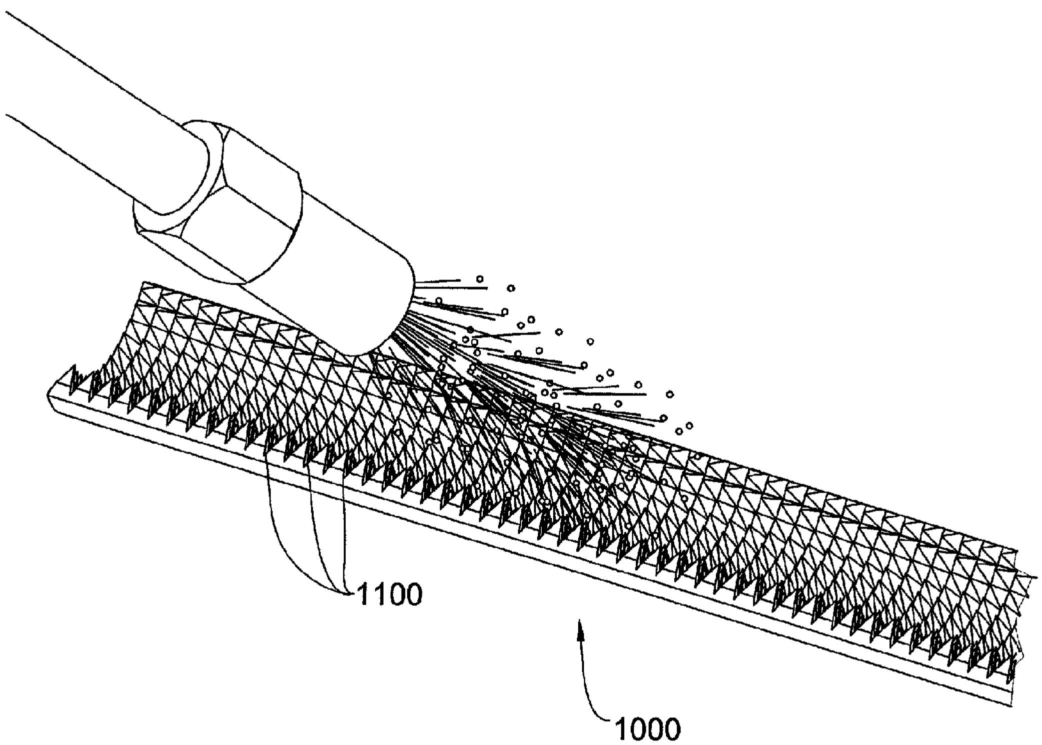

With reference to FIGS. 20D and 20E, another example of a core is shown generally designated as 240", which formed, both on its inner surface and on its outer surface, with ridges 246" and 247" respectively. This core 240" can be made of tungsten or other materials (see FIGS. 26A, 26B), and its design provides for a more robust core 240".

It is noted that the ridges 246" and 247" are designed such that the peak of one is opposite the trough of another and vise versa, so that the thickness in each point along the central axis X is generally the same (N).

The ridges 246", 247" can be parallel as in the present example, or, alternatively, be in the form of one spiraling ridge (as in a thread). One advantage of the latter example is the simplicity of production—the external ridges 247" can be made by turning and the internal ridges 246" can be formed by a tap.

Figure 22A:
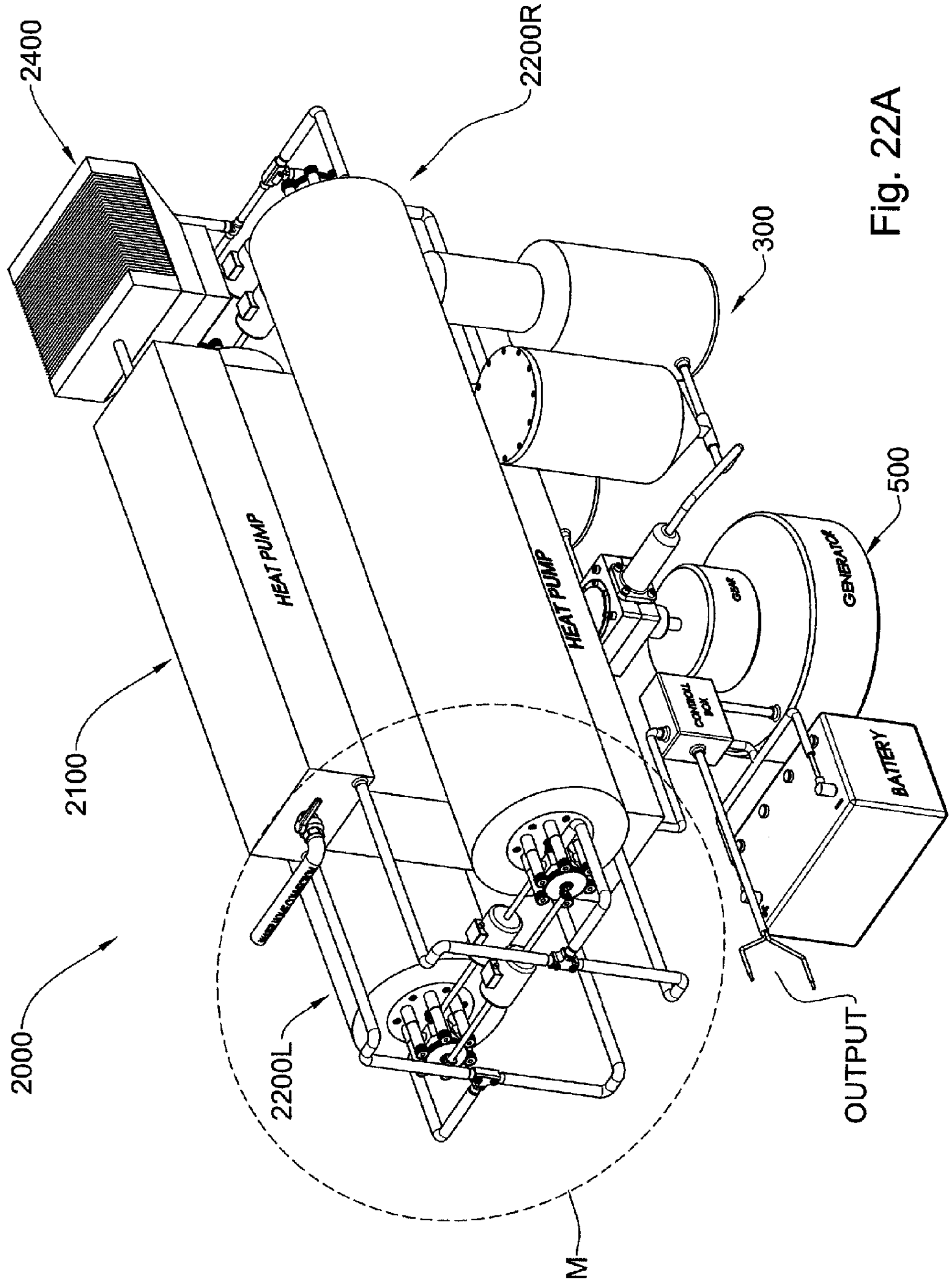
FIGS. 22A and 22B are respective schematic front and rear isometric views of a generator according to another example of the present application.
Figure 22B:
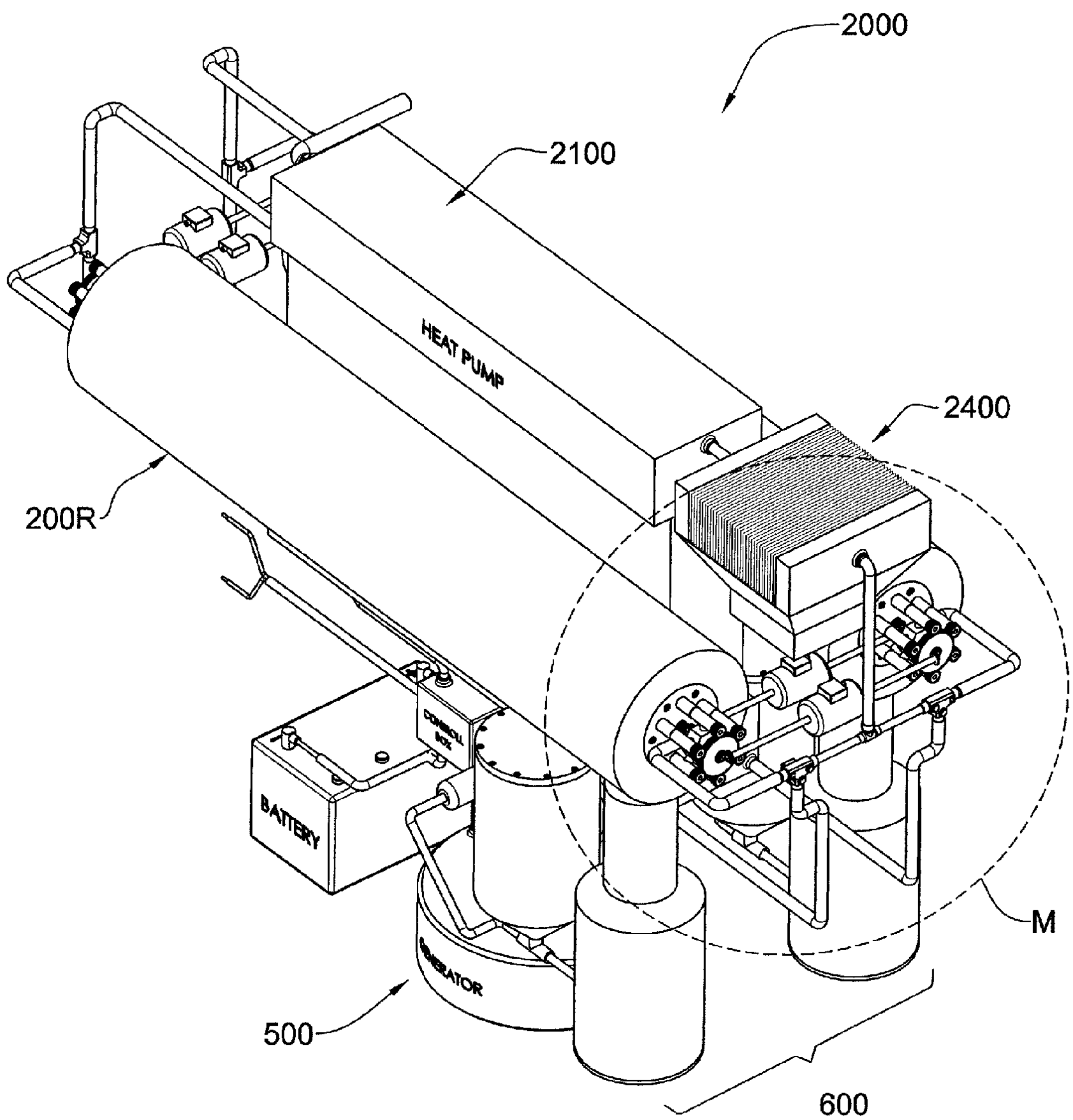
Figure 22C:
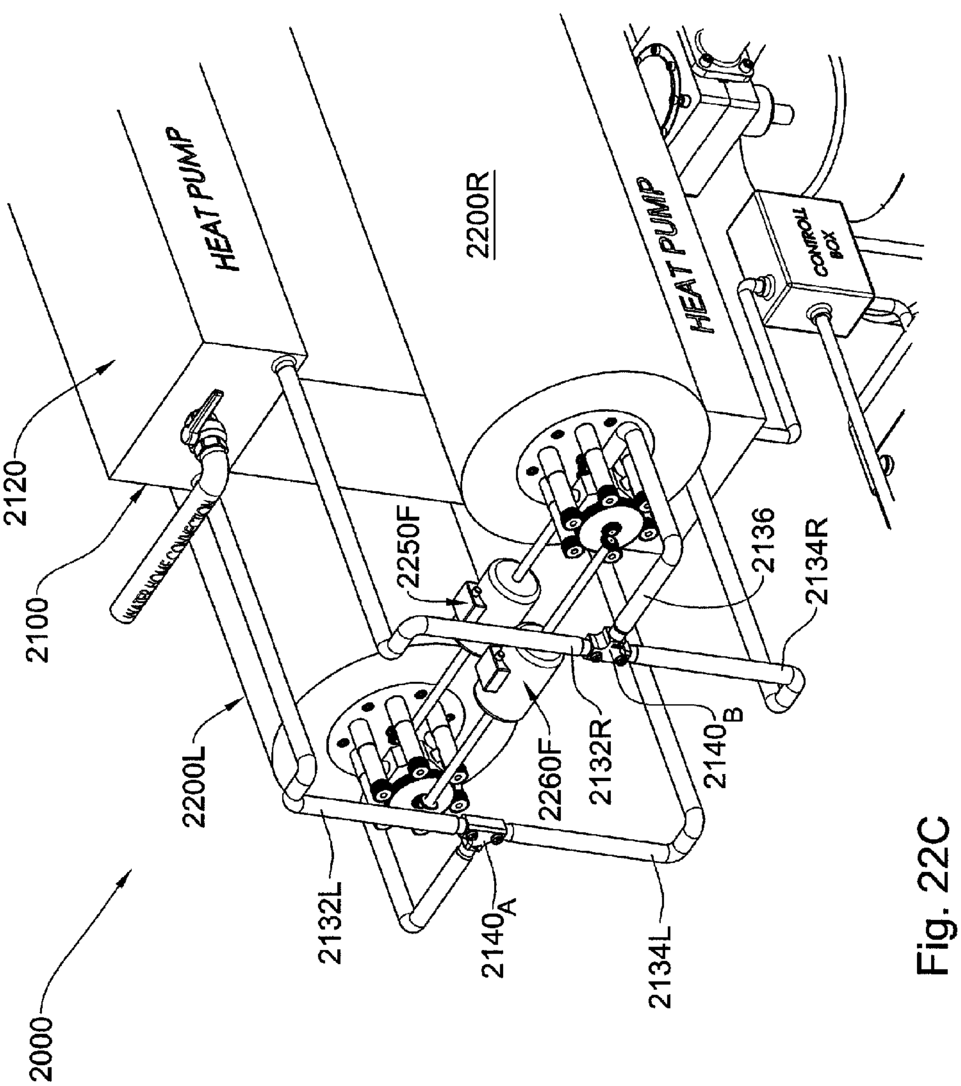
FIG. 22C is a schematic enlarged view of detail M shown in FIG. 22A.

Turning now to FIGS. 22A and 22B, still another example of the generator is shown, generally designated as 2000 which is generally similar in construction to the generator 1 previously described, but differs from it mainly by the design of the work medium sub-system 2100 (as opposed to the work medium sub-system 100).

The work medium subs-system 2100 is in the form of a cascade arrangement 2150 which comprises a high temperature reservoir 2110 and a low temperature reservoir 2120, without an intermediate work medium reservoir as in the previous examples.

Each of the pressure vessels 2200R, 2200L is provided at its inlet end with a respective inlet line 2136R, 2136L, regulated by respective valves 2140B and 2140A, and at its outlet end with a respective inlet line 2146R, 2146L, regulated by respective valves 2140D and 2140C.

An outlet end of the high temperature reservoir 2110 is connected to the valves 2140B and 2140A via respective lines 2134R, 2134L, and an inlet end of the high temperature reservoir 2110 is connected to the valves 2140D and 2140C via respective lines 2144R, 2144L.

An outlet end of the low temperature reservoir 2120 is connected to the valves 2140B and 2140A via respective lines 2132R, 2132L, and an inlet end of the low temperature reservoir 2120 is connected to the valves 2140D and 2140C via respective lines 2142R, 2142L.

In the present generator (as in previously described examples), in the initial position, the pressure fluid within the pressure vessel is at the temperature $T_{ENV}$ which is roughly the temperature of the environment. The initial steps of the operation cycle of the presently described generator can be described as follows:

(a) passing high temperature water from the high temperature reservoir 2110, at a temperature $T_H$ through the pressure vessel so as to heat up the pressure fluid contained therein. This results in heating the pressure fluid to a temperature of $T_{hot}>T_{ENV}$ (however $T_{hot}<T_H$) and simultaneously in cooling of the high temperature work medium to a temperature $T_{H\text{-}Cooled}<T_H$;

(b) passing low temperature work medium from the low temperature reservoir 2120, at a temperature $T_C<T_{ENV}$ through the pressure vessel so as to cool down the heated pressure fluid contained therein. This results in cooling the pressure fluid from a temperature of $T_{hot}$ to a temperature $T_{cold}>T_C$, and simultaneously in heating the low temperature water to a temperature $T_{C\text{-}Heated}>T_C$.

Thereafter, steps (a) and (b) repeat themselves, with the difference being that the pressure fluid now constantly fluctuates between the temperatures $T_{hot}$ and $T_{cold}$.

Simultaneously with the performance of step (a), the heated low temperature work medium, which is now at a temperature of $T_{C\text{-}Heated}>T_C$, is cooled down by performing a heat exchange process with the environment which is at a temperature $T_{ENV}<T_{C\text{-}Heated}$. This process is regulated by a radiator unit 2400 (shown FIGS. 22A, 22B). In addition, simultaneously with the performance of step (b), the cooled high temperature work medium, which is now at a temperature of $T_{H\text{-}Cooled}<T_H$, is heated up by the A/C system, bringing it back to the temperature $T_H$.

It is appreciated that while step (a) takes place in one pressure vessel (for example vessel 2200R), the second pressure vessel 2200L undergoes step (b). Thus, the pressure vessels keep alternating—while the pressure fluid in one heats up, the pressure fluid in the other is cooled down and vise versa.

Turning now to FIGS. 23A to 23F, the main difference in the design of the work medium sub-system 2100 is that the A/C previously used to provide the high/low temperature reservoirs at the respective condenser/evaporator sections of the A/C is now replaced by a cascade arrangement 2150, having several grades $G_1$ to $G_7$, each operating as a basic A/C compression/expansion mechanism as will now be explained. The arrangement is such that the cascade 2150 has a first end-grade $G_1$ which provides the 'low' for the low temperature reservoir 2120 and a second end-grade $G_7$ which provides the heat for the high temperature reservoir 2110.

Each of the grades $G_{(n)}$ comprises a compressor $C_{(n)}$, a condenser section $\mathbf{2152}_{(n)}$, an expansion valve $\mathbf{2154}_{(n)}$, an evaporator section $\mathbf{2156}_{(n)}$ and a return pipe $\mathbf{2158}_{(n)}$ to the compressor $C_{(n)}$, where (n) denotes the number of the grade G.

Each of the grades $G_1$ to $G_7$ comprises a compressible fluid (gas or liquid), and is designed to operate between a high fluid temperature $T_{H(n)}$ at the respective condenser section $\mathbf{2152}_{(n)}$ and a low temperature $T_{C(n)}$ at the respective evaporator section $\mathbf{2156}_{(n)}$.

The arrangement is such that the condenser section $\mathbf{2152}_{(n)}$ of one grade $G_{(n)}$ and the evaporator section $\mathbf{2156}_{(n)}$ of a subsequent grade $G_{(n+1)}$ are thermally coupled to provide a heat exchange process. Specifically, the arrangement is of concentric tubes where the condenser section $\mathbf{2152}_{(n)}$ is constituted by the inner tube and the evaporator section $\mathbf{2156}_{(n)}$ is constituted by the outer tube.

Figure 23A:
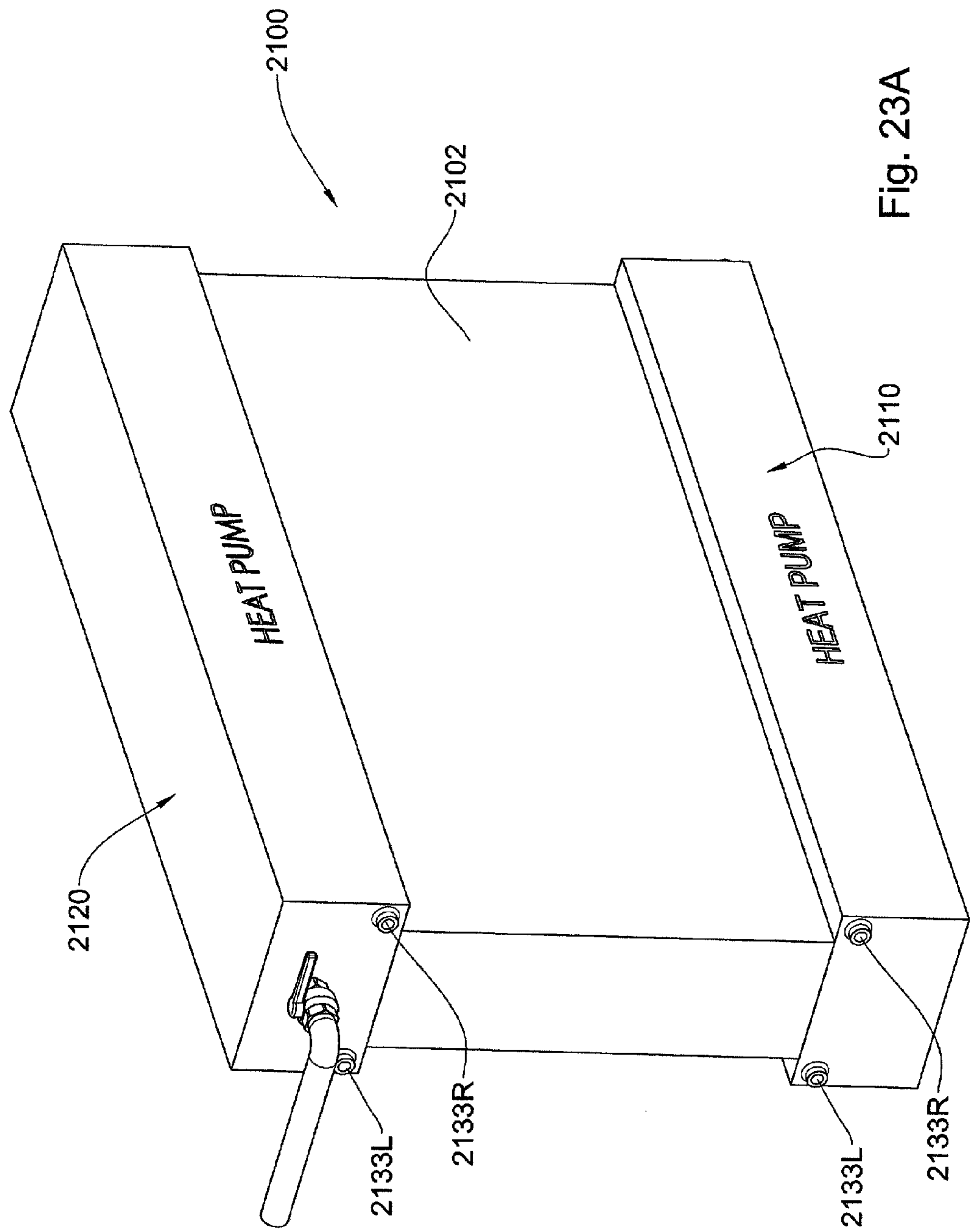
FIG. 23A is a schematic isometric view of a work medium sub-system used in the generator shown in FIG. 22A.
Figure 23B:
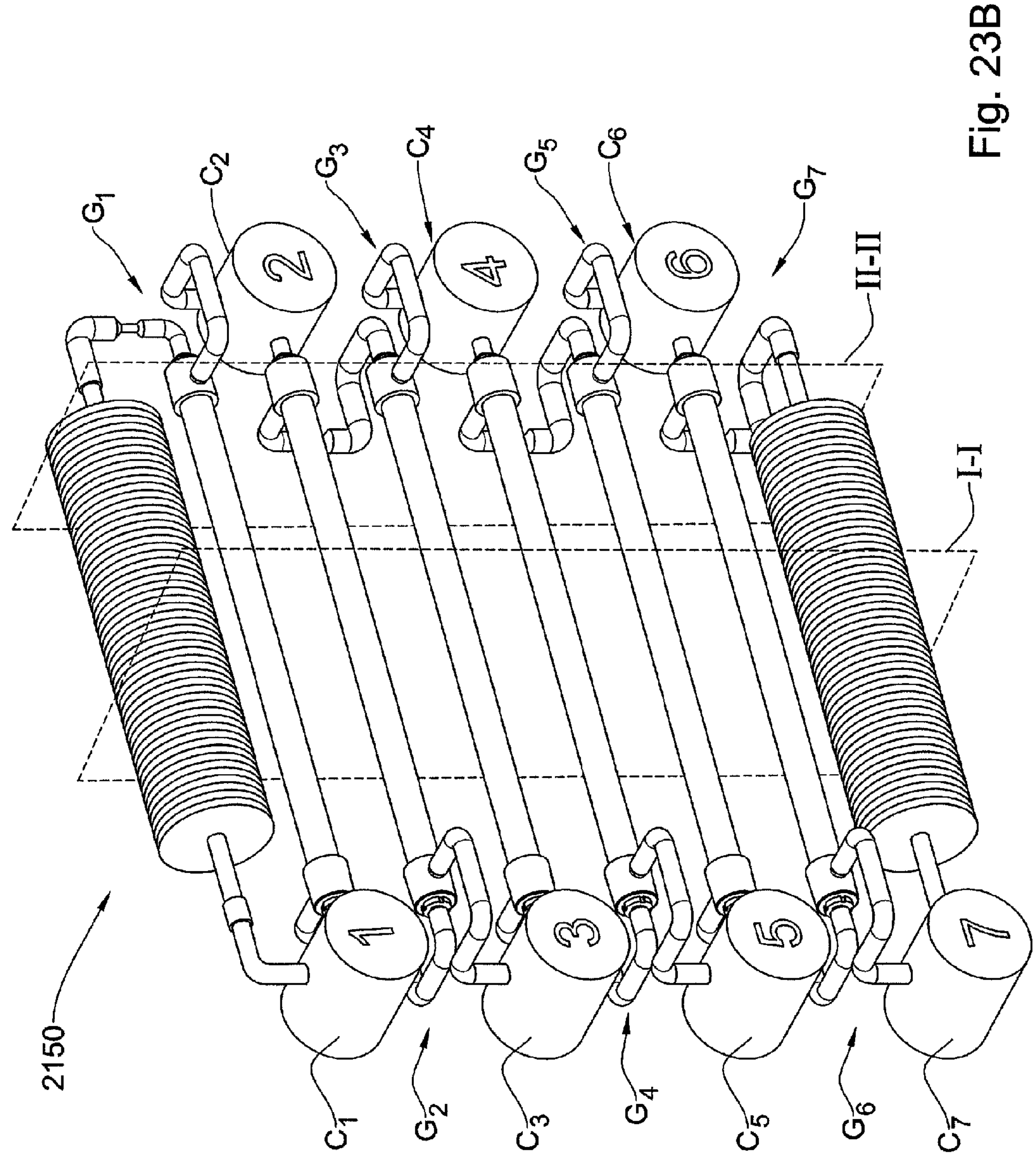
FIG. 23B is a schematic isometric view of the work medium sub-system shown in FIG. 23A, with the housing thereof being removed for clearer view.
Figure 23C:
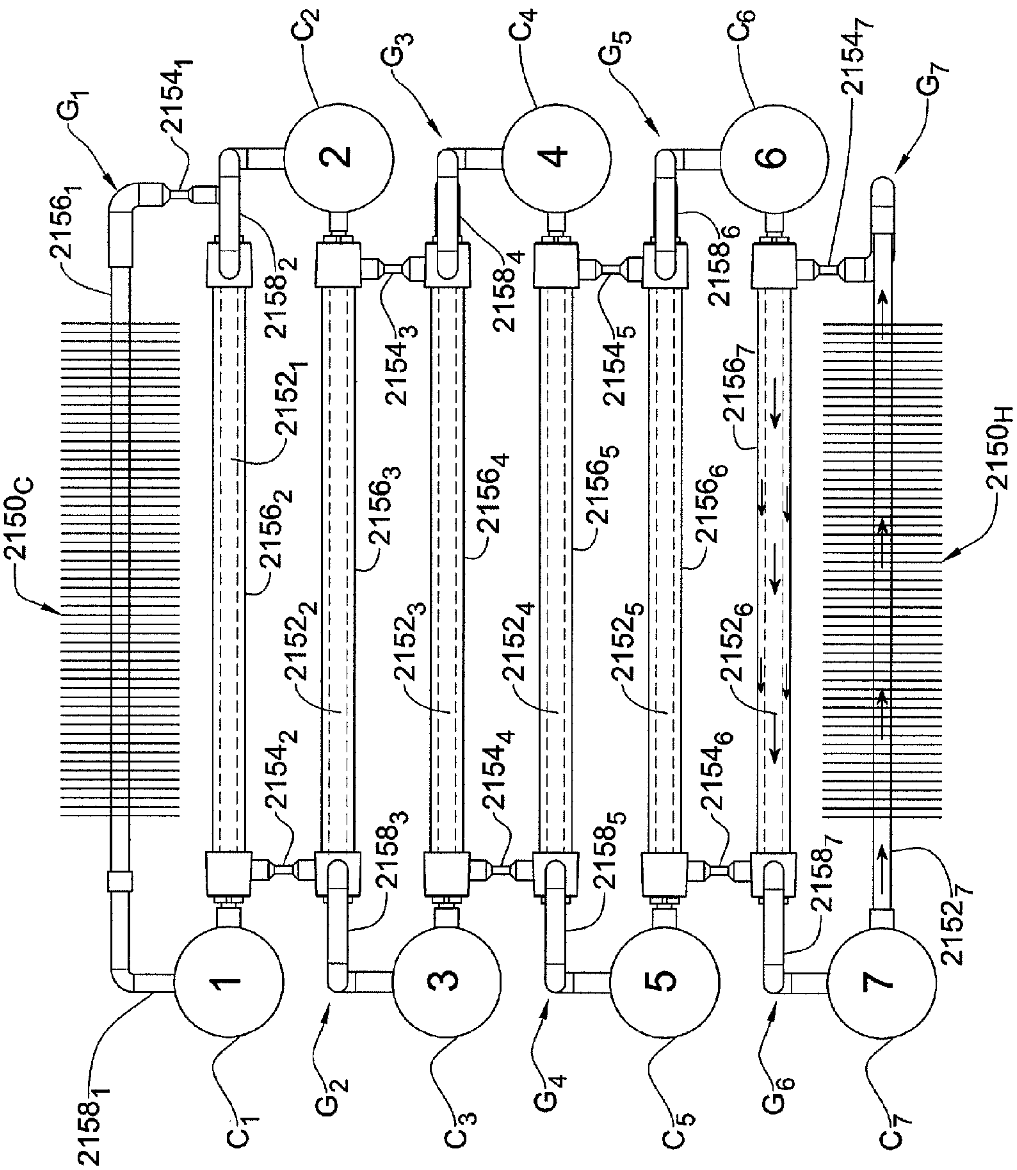
FIG. 23C is a schematic right-side view of the work medium sub-system shown in FIG. 23B.
Figure 23D:
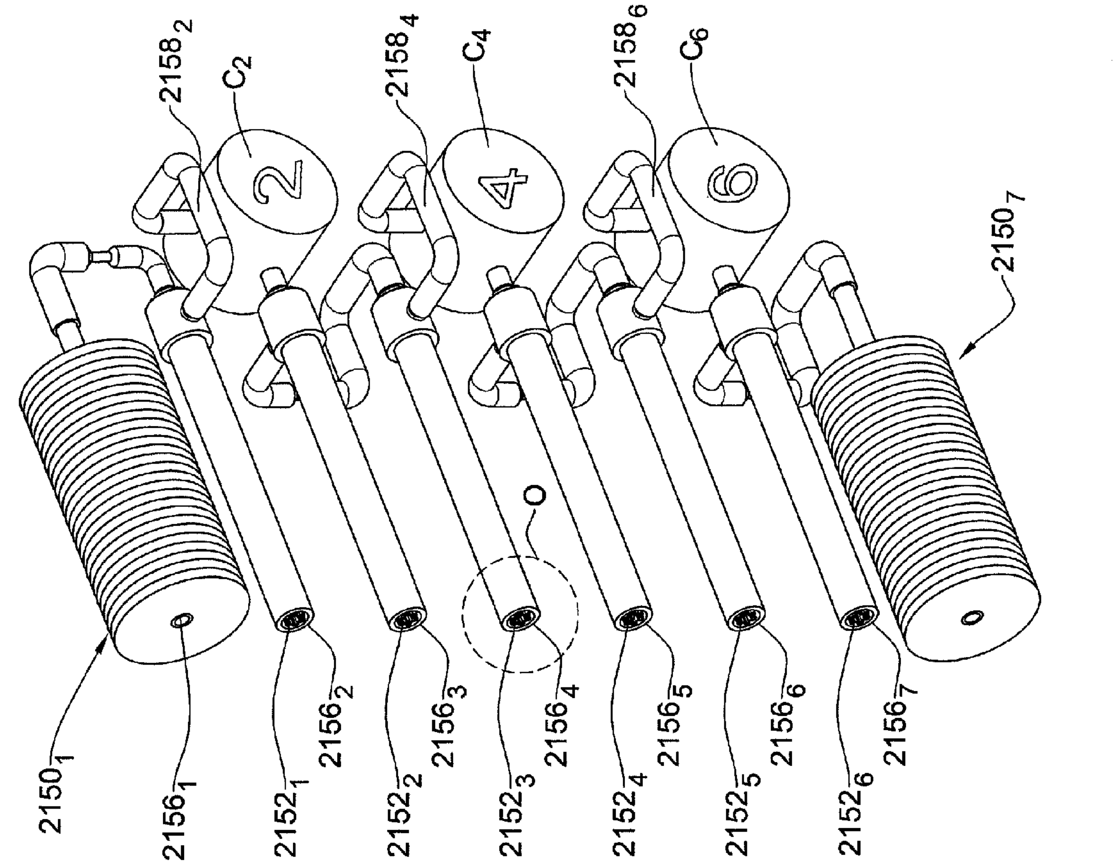
FIG. 23D is a schematic cross-sectional view of the work medium sub-system shown in FIG. 23A, taken along a plane I-I shown in FIG. 23B.
Figure 23E:
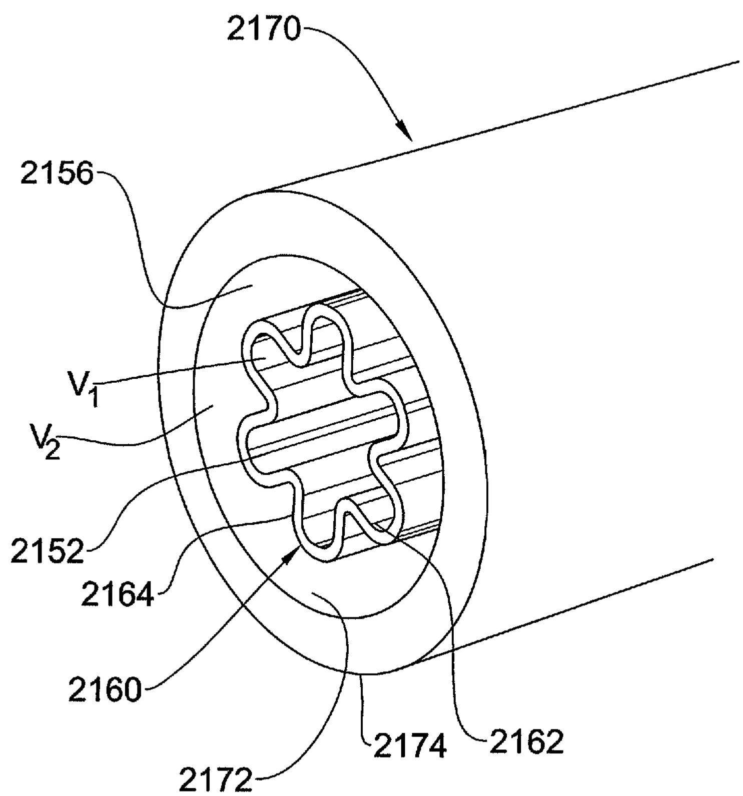
FIG. 23E is a schematic enlarged view of detail O shown in FIG. 23D.
Figure 23F:
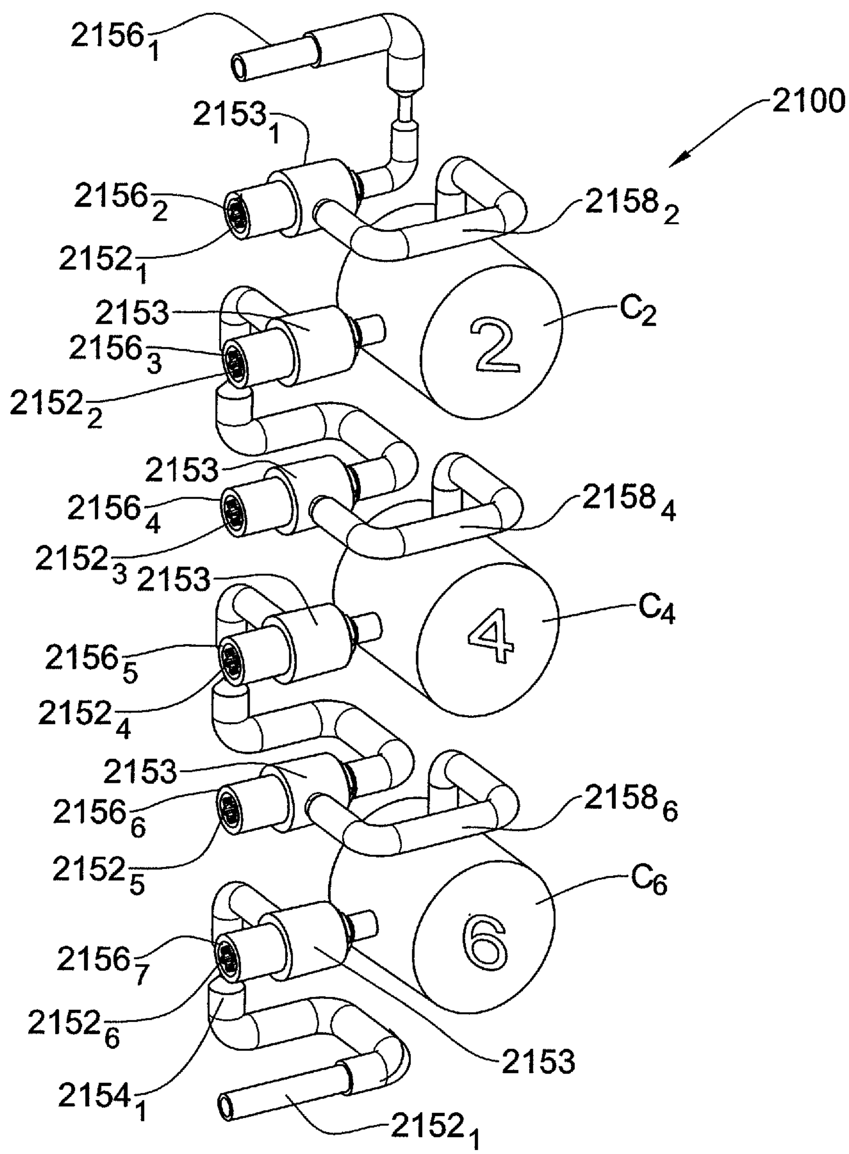
FIG. 23F is a schematic cross-sectional view of the work medium sub-system shown in FIG. 23A, taken along a plane shown in FIG. 23B.
Figure 24A:
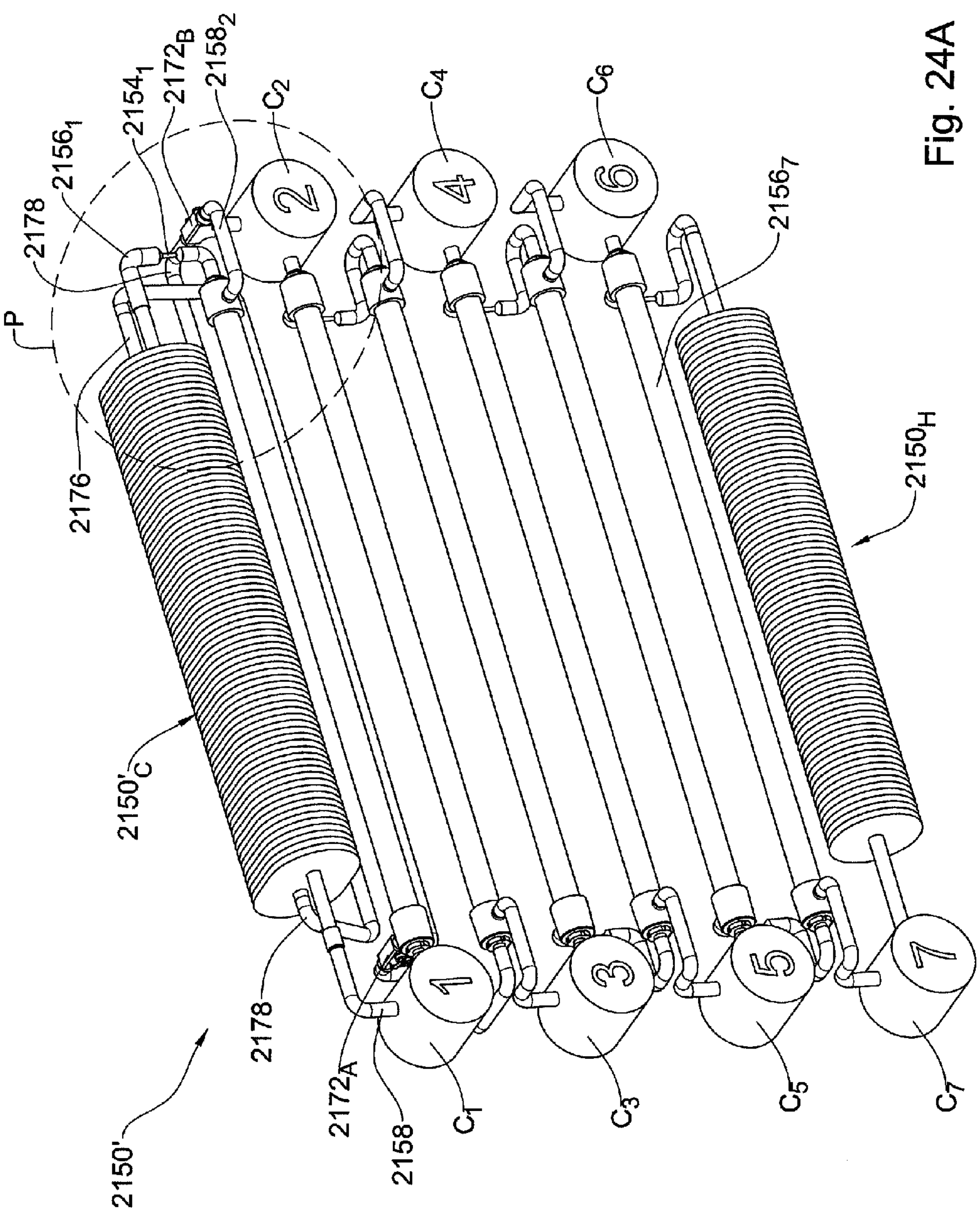
FIGS. 24A and 24B are respective schematic front and rear isometric views of another example of a work medium sub-system used in the generator of the subject matter of the present application.
Figure 24B:
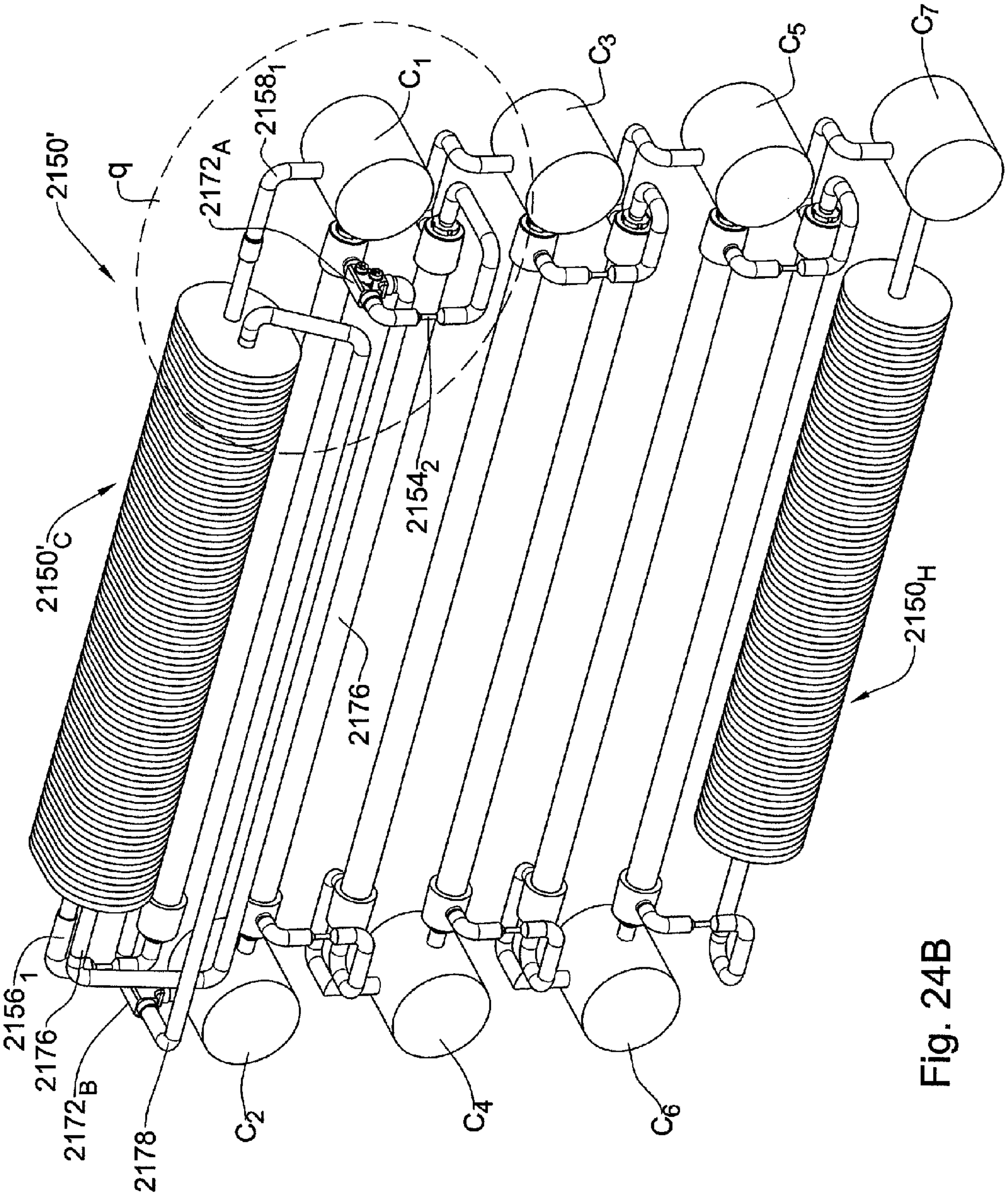
Figure 24C:
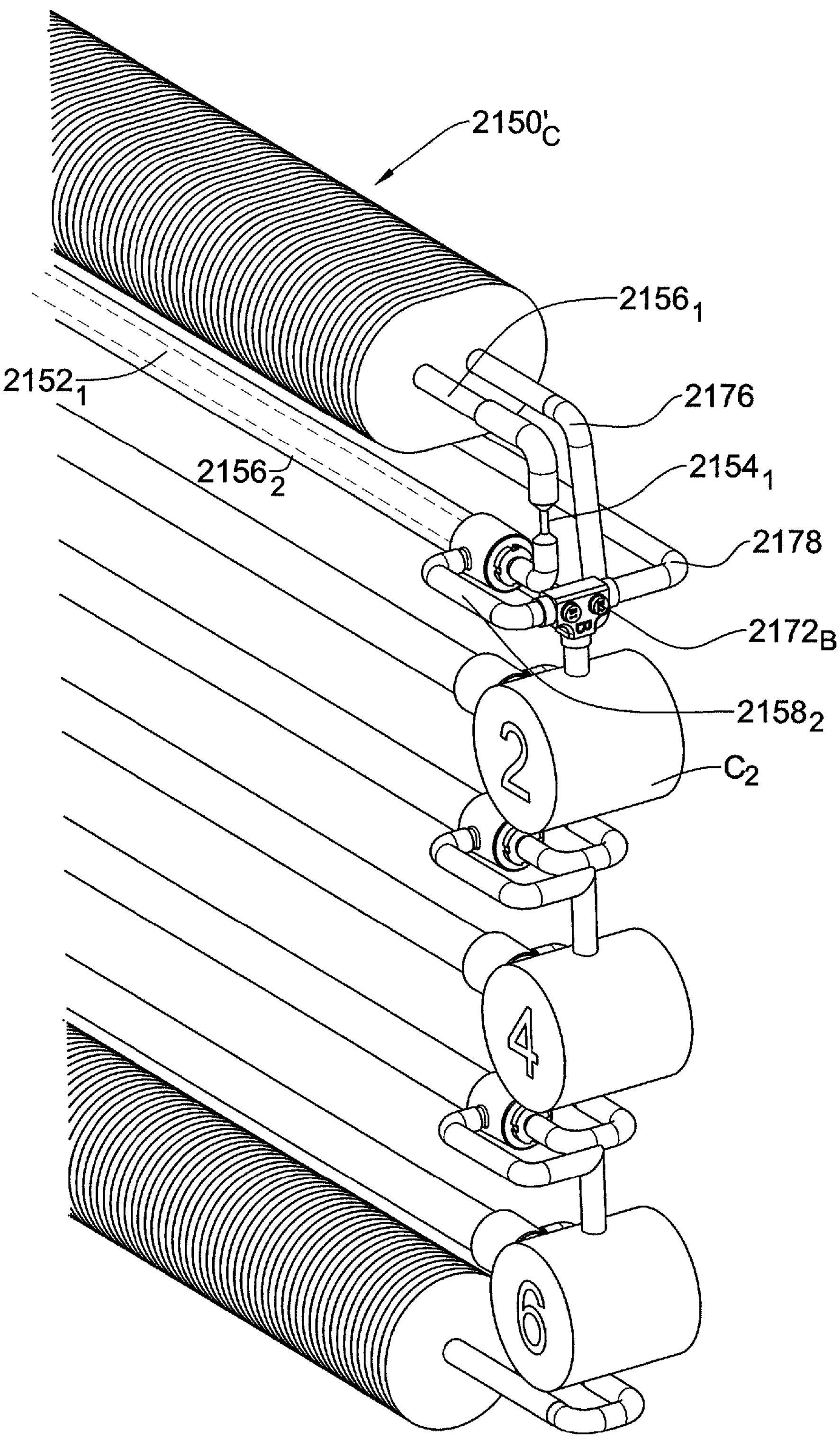
FIGS. 24C and 24D are respective schematic enlarged views of details P and Q taken from FIGS. 24A and 24B respectively.
Figure 24D:
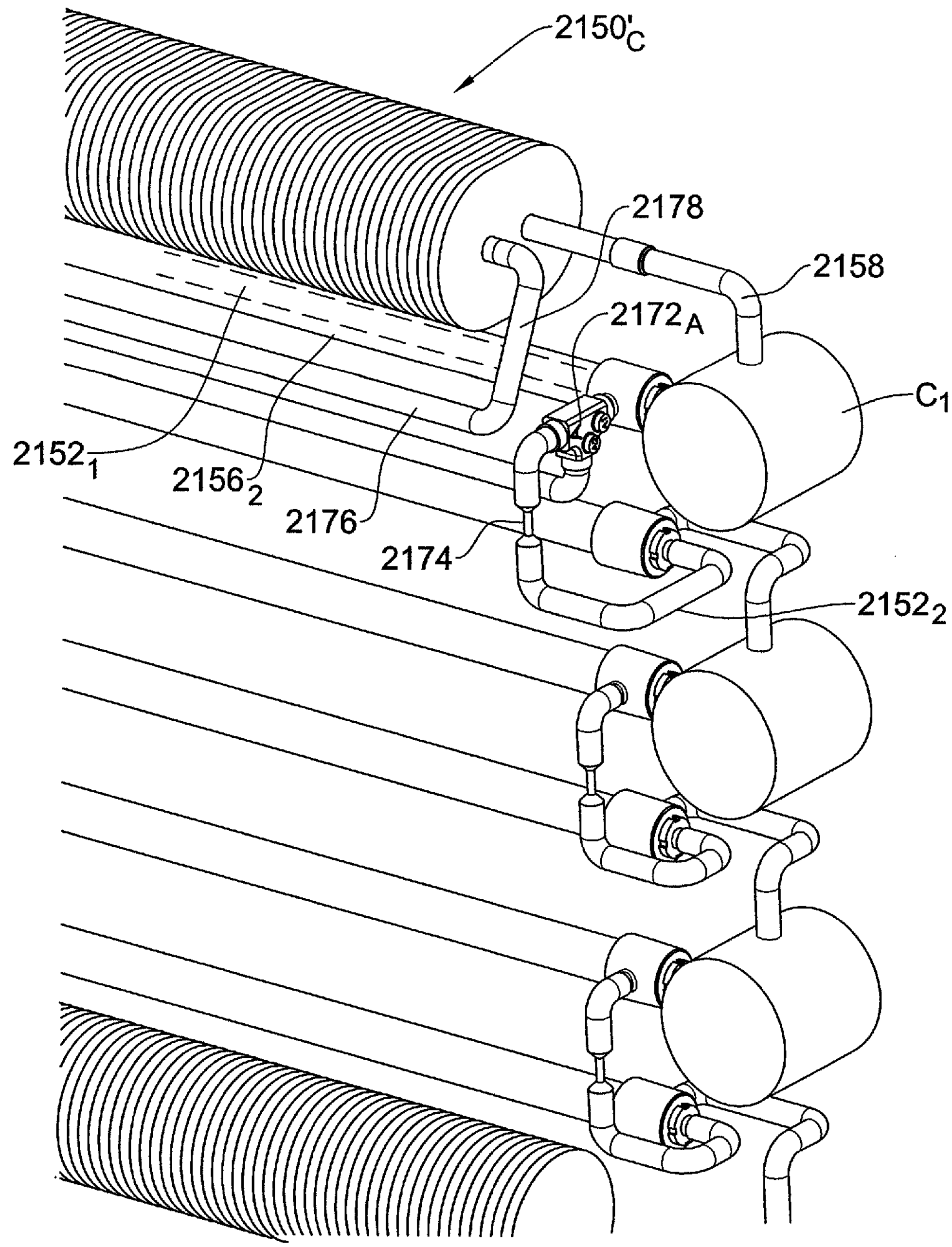

Under this arrangement, compressed fluid from one grade $G_{(n)}$ flows within the inner tube and performs a heat exchange process with the expanded fluid from the subsequent grade $G_{(n+1)}$ which flows between the inner surface of the outer tube and the outer surface of the inner tube (see FIG. 23E).

The cascade arrangement 2150 is designed such that the temperature $T_{C(n)}$ of the fluid in the evaporator section $\mathbf{2156}_{(n)}$ of one grade $G_{(n)}$ is lower than the condensation temperature of the fluid flowing in the subsequent grade $G_{(n+1)}$, and necessarily lower than the temperature $T_{H(n+1)}$ of the fluid in the condenser section $\mathbf{2152}_{(n+1)}$ of that grade $G_{(n+1)}$. As a result, a heat exchange process takes place where the expanded fluid of one grade $G_{(n)}$ takes up the heat from the compressed fluid of the subsequent grade $G_{(n+1)}$.

However, it is appreciated that the temperature $T_{C(n+1)}$ of the cooled-down fluid of the subsequent grade $G_{(n+1)}$.

An example of the temperatures $T_{C(n)}$, $T_{H(n)}$ and $T_{COND}$ are shown below:

| (n) | $T_{H(n)}$ | $T_{C(n)}$ | $T_{COND}$ |
|---|---|---|---|
| 1 | 27 | 0 | |
| 2 | 57 | 27 | 30 |
| 3 | 90 | 57 | 60 |
| 4 | 116 | 90 | 93 |
| 5 | 155 | 116 | 119 |
| 6 | 197 | 155 | 158 |
| 7 | 245 | 197 | 200 |

In practice, the evaporator section $\mathbf{2156}_1$ of the first grade $G_1$ is submerged within the low temperature reservoir 2120 bringing the low temperature water to a temperature of about 3° C., and the condenser section $\mathbf{2152}_7$ of the seventh grade is submerged within the high temperature reservoir 2110 bringing the high temperature water to a temperature of about 242° C. It is appreciated that the high/low temperatures of the high/low temperature reservoirs 2110, 2120 never reach the temperature of the respective condenser/evaporator sections $\mathbf{2152}_7$, $\mathbf{2156}_1$, and are always slightly lower/higher respectively.

It is observed from FIGS. 22A and 22B, that the generator 2000 is fitted with a front and a rear driving motor 2250F and 2250R respectively configured for driving the cores of the pressure vessels 2200, and with a front and a rear driving motor 2260F and 2260R configured for driving the spiral for circulating the work medium within the generator 2000.

The use of front and rear motors for driving the same element facilitates lower loads exerted on the revolved element (core or spiral) which are positioned within a high pressure environment. Should only one motor be used, the core and/or spiral will tend to bend within the pressure vessel, which can lead to damage of the mechanical integrity of the system.

Figure 22D:
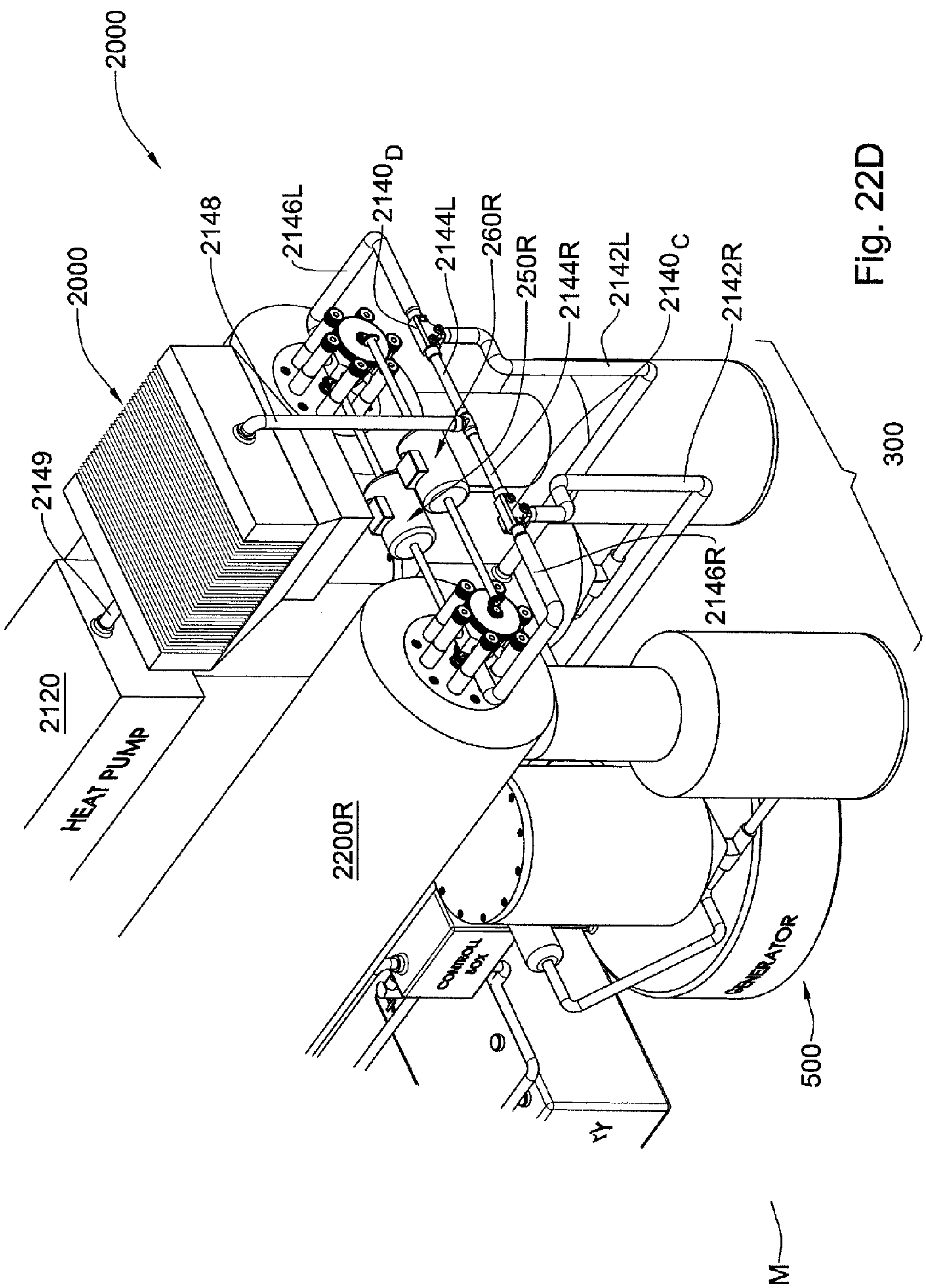
FIG. 22D is a schematic enlarged view of detail N shown in FIG. 22B.

Reverting now to FIG. 22D, the radiator unit 2400 is shown positioned along the lines 2146R, 2146L leading from the pressure vessels 2200R, 2200L to the low temperature reservoir 2120. The purpose of the radiator unit 2400 is to provide for a heat exchange process between the heated low temperature water flowing in these lines (at a temperature of $T_{C\text{-}Heated}$) and the ambient air of the environment.

The radiator unit is fitted with a fan (not shown) and control unit (not shown) configured for regulating the operation of the fan, so that the low temperature water leaving the radiator remain essentially at a constant temperature. For example, if $T_{C\text{-}Heated}$ is about 50° C., it is required to lower this temperature down to about 20° C. to allow the first grade $G_1$ to perform efficiently. Thus, the control unit is used to maintain the low temperature water leaving the radiator at a temperature of about 20° C.

The control unit can comprise a sensor associated with line 2149 of the low temperature water emitted from the radiator and configured for measuring its temperature. Should this temperature exceed the predetermined temperature (in this particular example 20° C.), the control unit will cause the fan to revolve faster in order to increase the heat-exchange rate within the radiator unit 2400. Alternatively, should this temperature be lower than the predetermined temperature (in this particular example 20° C.), the control unit will cause the fan to revolve slower in order to decrease the heat-exchange rate within the radiator unit 2400.

Turning now to FIGS. 24A to 24D, another example of a cascade arrangement is shown generally designated as 2150', and configured for adjusting its operation mode to the ambient temperature of the outside environment.

The difference between the currently described cascade arrangement 2150' and the cascade arrangement 2150 previously described with respect to FIGS. 23A to 23F lies in the design of the first and second grade $G_1$, $G_2$, and in particular, in the bypass arrangement 2170 associated therewith.

In general, it can be that at different times, the ambient temperature of the environment increases to an extent when it exceeds the temperature of the compressed fluid in the condensation section $\mathbf{2152}_2$ of the second grade $G_2$. In such case, the low temperature water emitted from the radiator unit after performing a heat exchange process therewith will also be at a temperature exceeding that of the compressed fluid in the condensation section $\mathbf{2152}_2$ of the second grade $G_2$.

As a result, the evaporator section $\mathbf{2156}_1$ of the first grade $G_1$ will be submerged in a very hot environment. Since each grade is fitted with a compressor of predetermined power and is design for a predetermined temperature difference A, the compressor $C_1$ simply will not be able to remove so much heat from the evaporator section $\mathbf{2156}_1$ rendering the operation of the first grade $G_1$ inefficient.

In order to overcome this, a bypass arrangement 2170 is used, configured to bypass the first grade $G_1$ and connect the low temperature reservoir 2120 with the evaporator of the second grade $G_2$.

Specifically, the bypass arrangement 2170 comprises two valves $\mathbf{2172}_A$, $\mathbf{2172}_{13}$ associated with the evaporator section of the second grade $G_2$ and the compressor $C_2$ of the second grade respectively. The bypass arrangement 2170 has an expansion valve 2174 leading to an evaporator section 2176 which is in the form of a tube leading into the low temperature reservoir 2120, and an outlet lien 2178 leading out of the low temperature reservoir 2120.

Under a normal operation mode, when the temperature of the environment is lower than the temperature of the compressed fluid in the second grade $G_2$, ports $A_1$ and $B_1$ are open and ports $A_2$ and $B_2$ are closed, and the cascade arrangement 2150 operates in a manner identical to that of the cascade arrangement 2150.

Once the temperature of the ambient air of the outside environment rises beyond the temperature of the compressed fluid in the second grade $G_2$, ports $A_1$ and $B_1$ are closed and ports $A_2$ and $B_2$ are open to allow the following:

Compressed fluid from the condenser section $\mathbf{2152}_2$ of the second grade $G_2$ passes to the expansion valve 2174 allowing the fluid to expand and cool down. After passing through the expansion valve 2174, the expanded fluid progresses along the line 2176 to pass into the low temperature reservoir 2120 where it cools down the water and is emitted (slightly heated) through line 2178 leading to the compressor $C_2$.

It is appreciated that whereas in the normal operation mode the temperature difference between the low temperature reservoir 2120 and the high temperature reservoir 2110 was about 240° C. (between 3° C. provided by the 0° C. of the first grade evaporator $\mathbf{2156}_1$ and 242° C. provided by the 242° C. of the seventh grade condenser $\mathbf{2152}_7$), the temperature difference now is about 210° C. between 30° C. provided by the 27° C. of the second grade evaporator $\mathbf{2156}_2$ and 242° C. provided by the 242° C. of the seventh grade condenser $\mathbf{2152}_7$.

In other words, while reducing the overall temperature difference of the cascade arrangement 2150', the efficiency remains generally the same, on account of eliminating from the process the operation of the first grade $G_1$ of the cascade arrangement 2150'.\

Figure 25A:
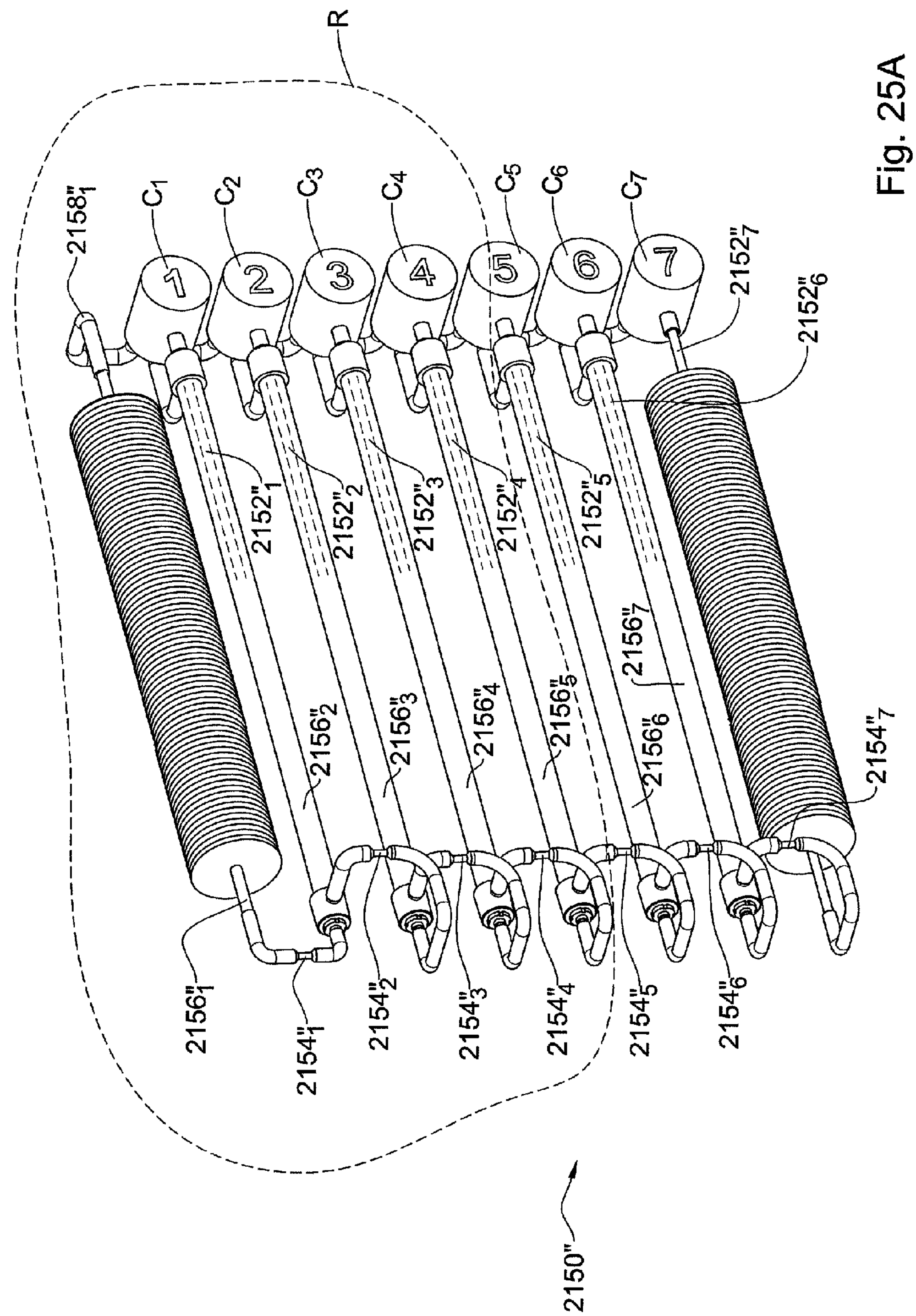
FIG. 25A is a schematic isometric view of another example of a work medium sub-system used in the generator of the subject matter of the present application.
Figure 25B:
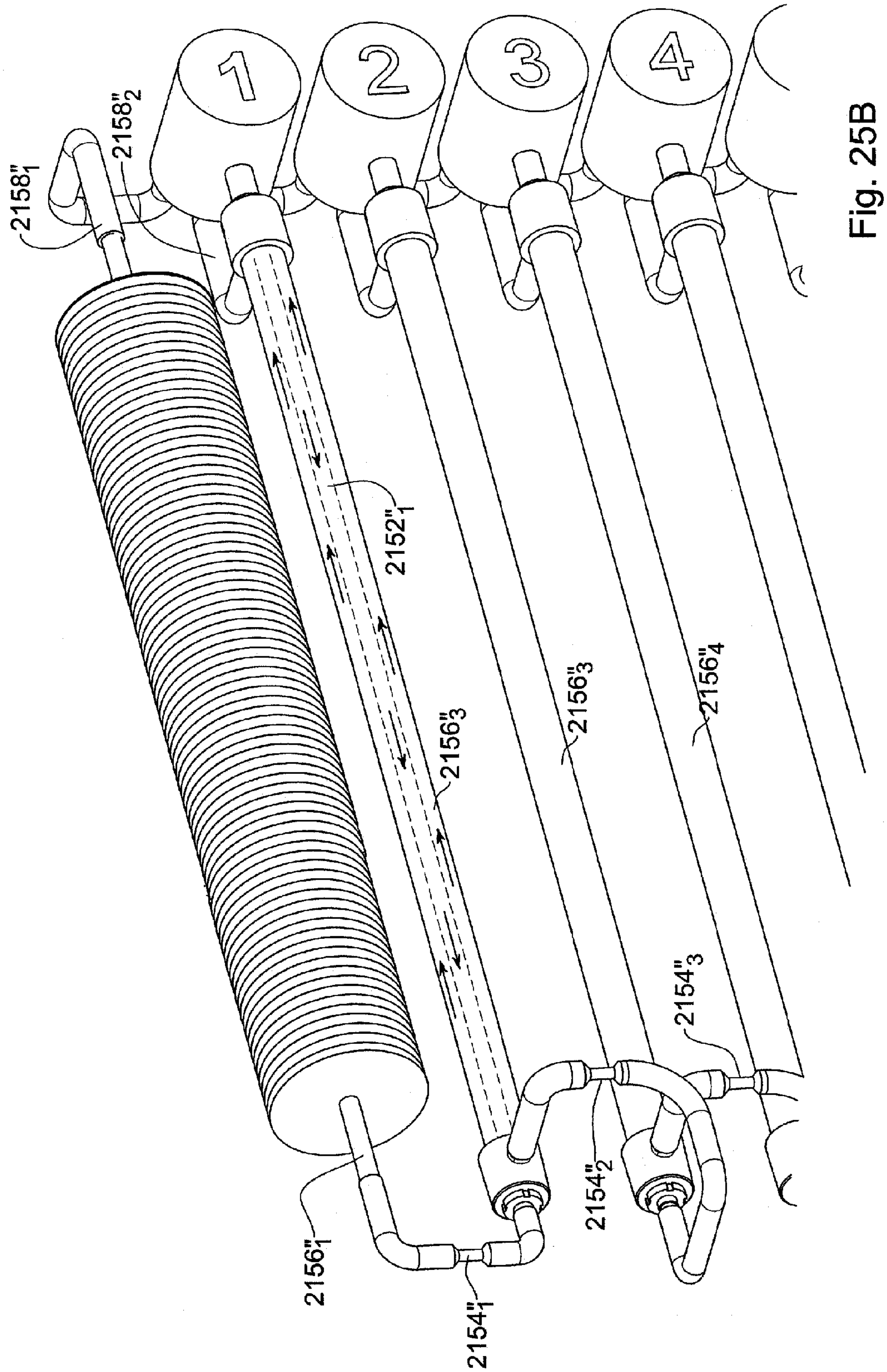
FIG. 25B is a schematic enlarged view of detail R taken from FIG. 25A.
Figure 27A:
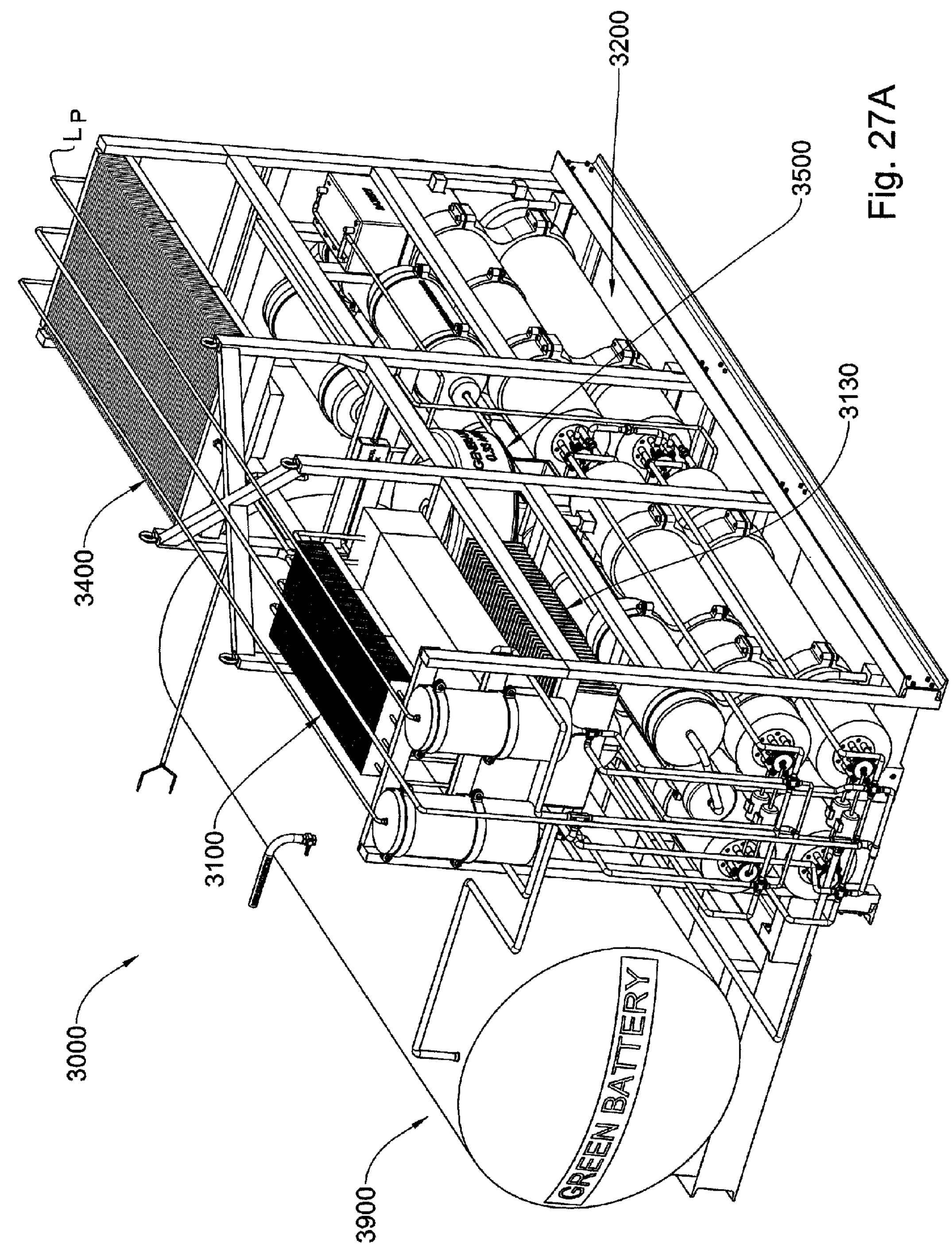
FIG. 27A is a schematic isometric view of a generator according to another example of the subject matter of the present application.
Figure 27B:
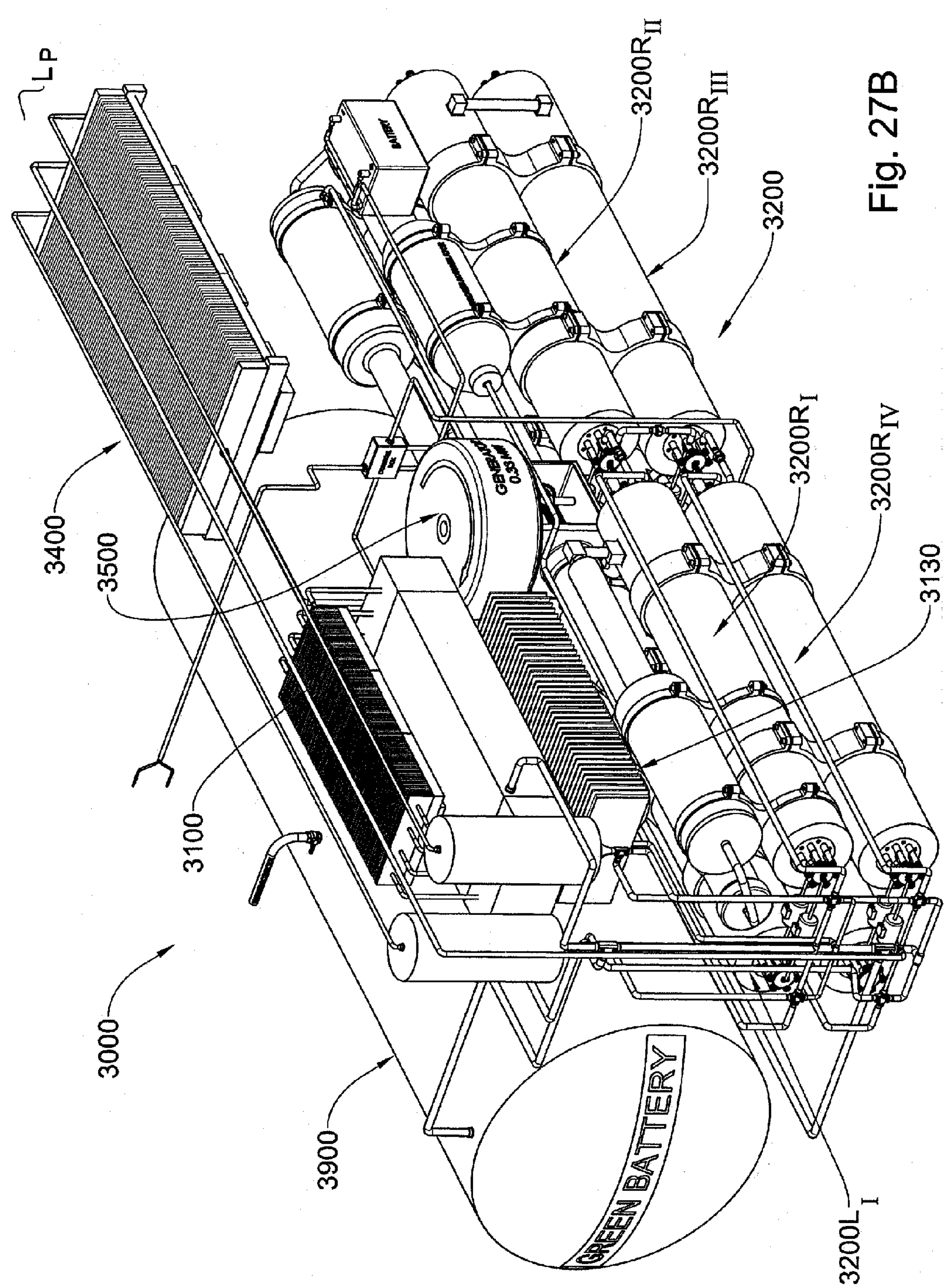
FIG. 27B is a schematic isometric view of the generator shown in FIG. 27A, with the supporting structure being removed for a clearer view.
Figure 27C:
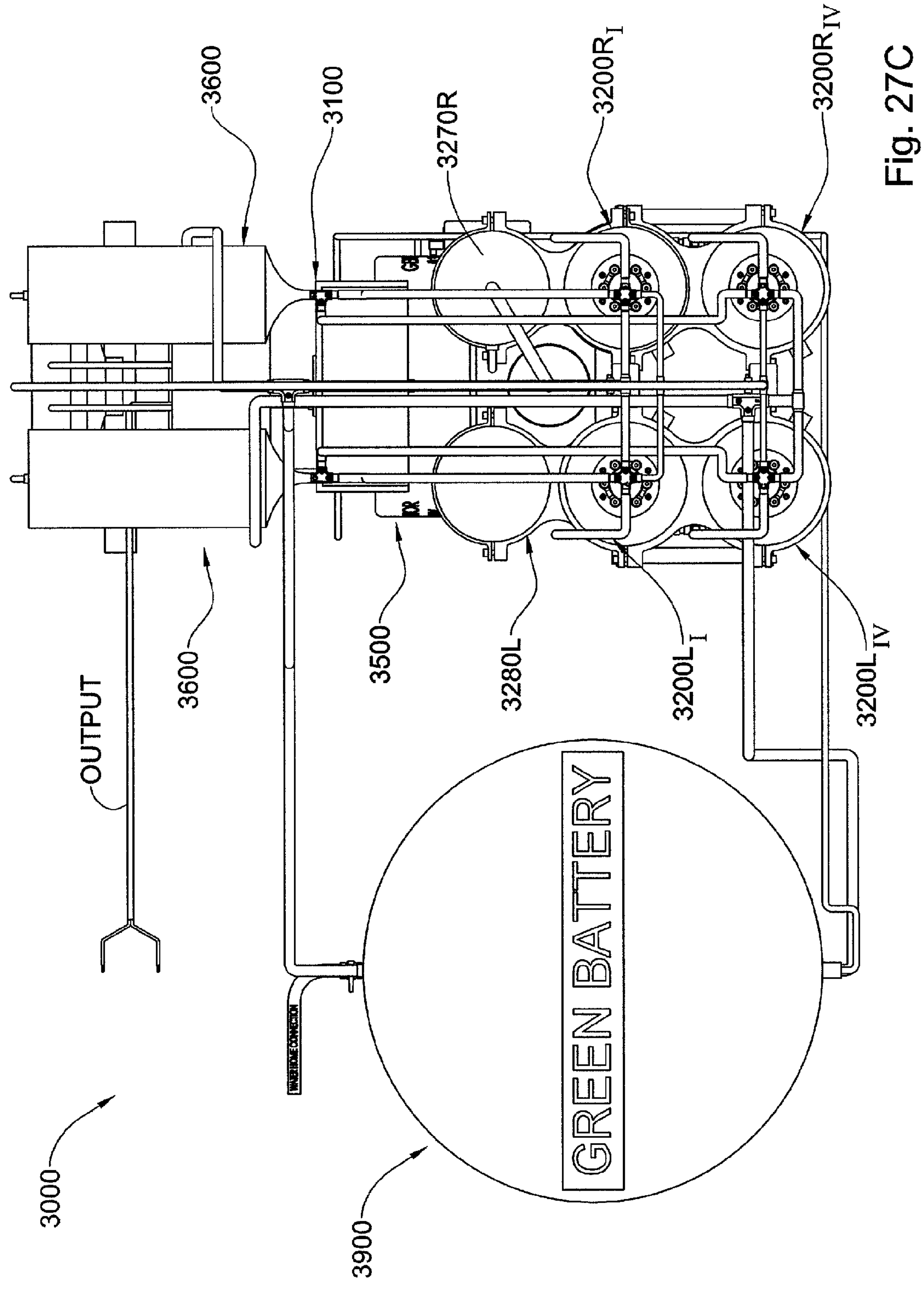
FIGS. 27C to 27E are respective schematic front, rear and side views of the generator shown in FIG. 27B.
Figure 27D:
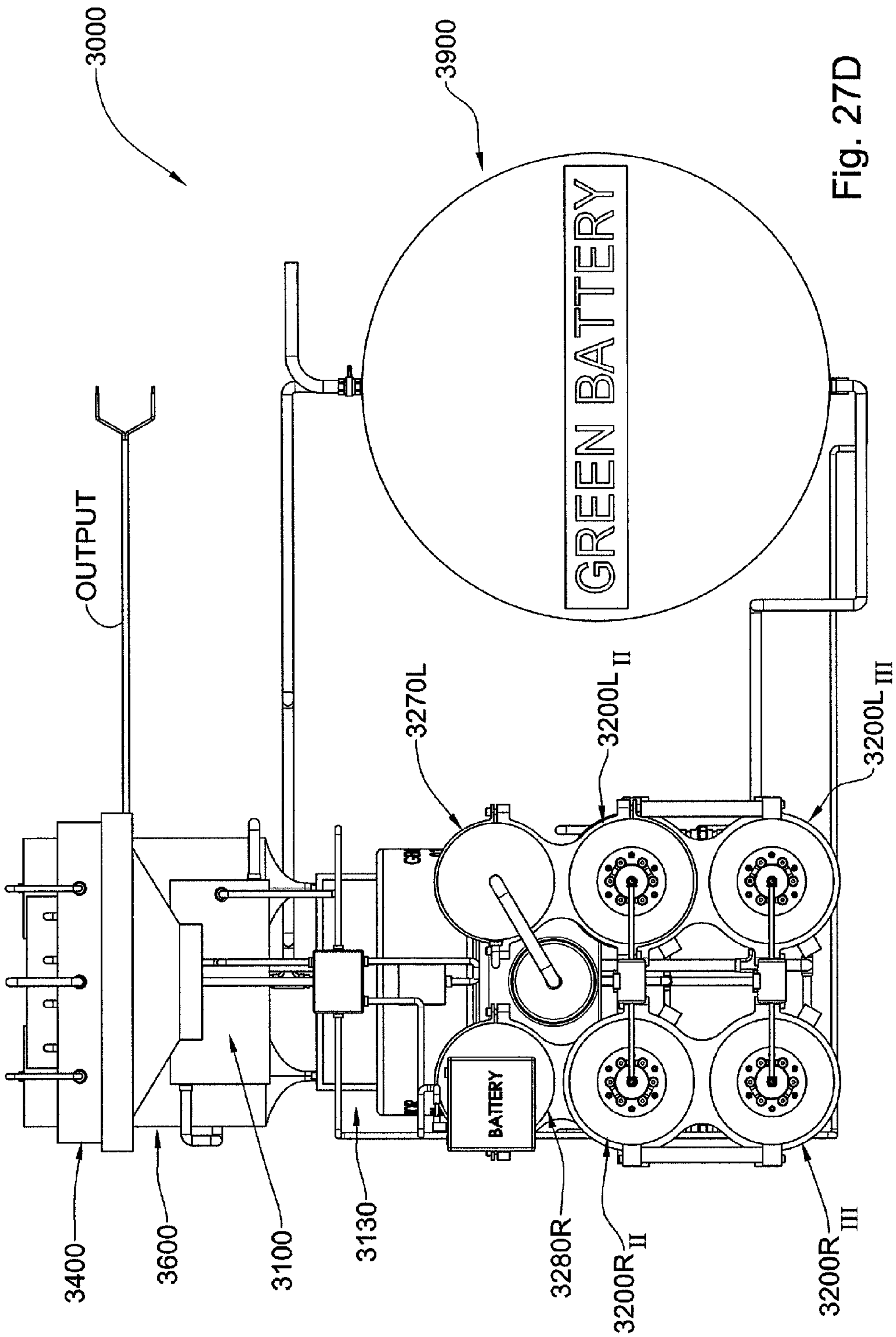
Figure 27E:
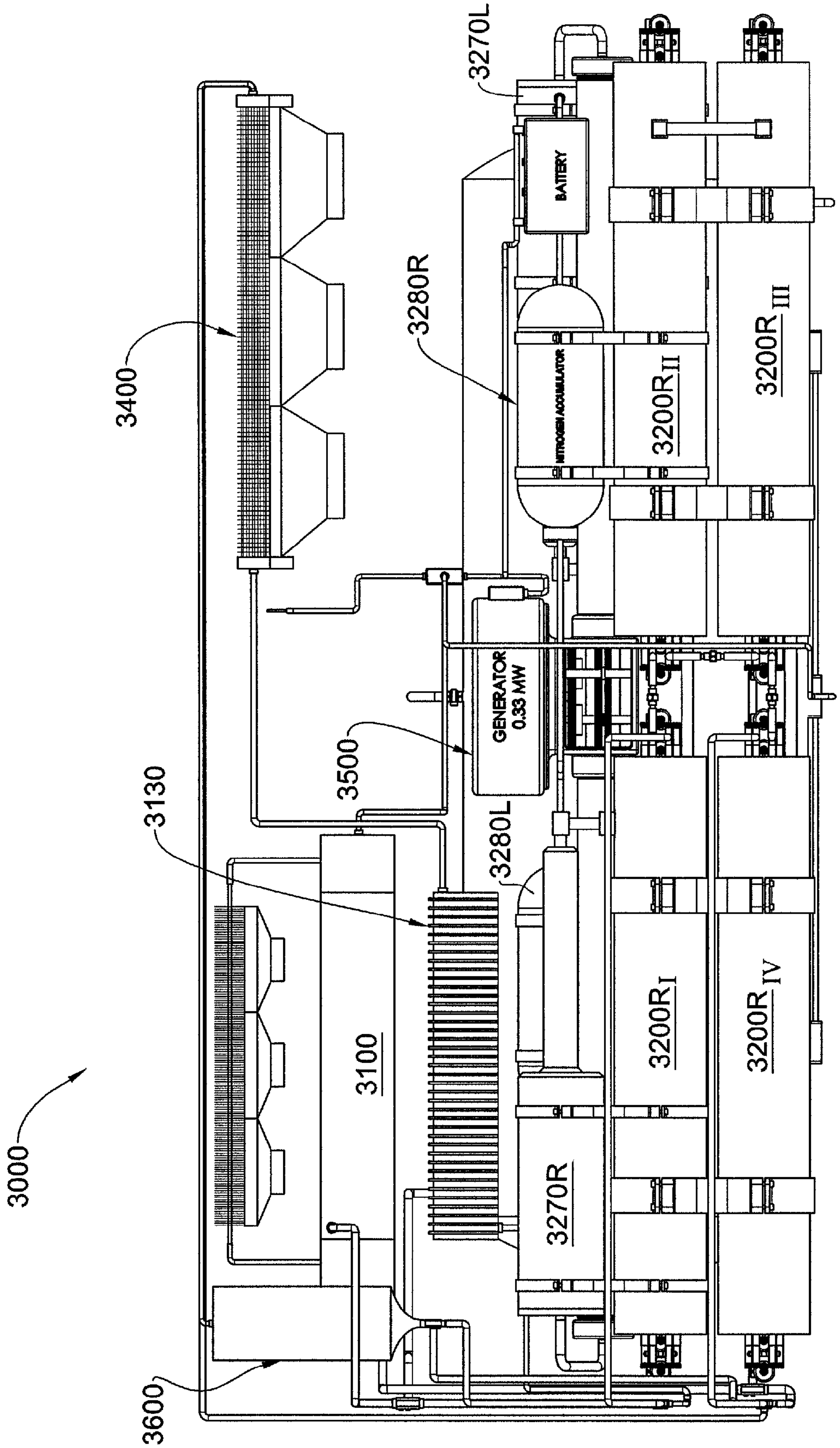

Turning now to FIGS. 25A and 25B, another example of a cascade arrangement is shown generally designated as 2150", which is similar to the previously described cascade arrangement 2150, with the difference being in that the flow of the fluids in the heat exchanger of each grade is now in opposite directions (as opposed to parallel flow in the previously described example).

Specifically, compressed fluid of the first grade $G_1$ flows through its respective condenser section $\mathbf{2152}_1$" in one direction, while expanded fluid of the second grade $G_2$ flows through its respective evaporator section $\mathbf{2156}_2$" in the opposite direction. As well known, counterflow heat exchangers provide for higher efficiency of the heat exchanger and consequently for a more efficient operation of the cascade arrangement 2150".

It is also noted that while the present example of the cascade arrangement 2150" is shown without a bypass arrangement 2170 (see FIGS. 24A to 24D) as in the previous example of cascade arrangement 2150', such a bypass arrangement 2170 can be fitted to the presently described cascade arrangement 2150".

Turning now to FIGS. 27A to 27E, yet another example of a generator is shown, generally designated as 3000. In general, the structure of the generator 3000 is generally similar to that of the previously described generators, however, with the following differences:

Multiple pressure vessels—each side (left/right) of the generator comprises four pressure vessels, each being of similar structure to the pressure vessels described with respect to previous examples;

Linear core connection—each vessels comprises six cores, but contrary to previous examples, the cores are connected linearly to one another so as to form a long work medium flow path (six times as long in comparison to a parallel connection as previously disclosed);

Linear vessel connection (work medium)—the cores of the four pressure vessels of each side are linearly connected to one another so as to form an even longer work medium flow path;

Linear vessel connection (pressure medium)—the compartments of the four pressure vessels on each side containing the high pressure medium are also in fluid communication with one another via high-pressure connections, thereby forming a long pressure medium flow path;

External low temperature reservoir—the low temperature reservoir constituted by the evaporator of the A/C unit is exposed to the environment and is not used for circulation of work medium therethrough.

In operation, a full cycle of one side of the generator can include the following steps (taking into account that the opposite side undergoes the same steps only at a shift):

a) High temperature work medium is passed from the condenser end of the A/C unit along the length of twenty four cores (six cores in each of the four pressure vessels), thereby increasing the temperature of the pressure medium to its maximal operating temperature, and simultaneously being cooled down to a lower temperature;

b) From the last core of the fourth pressure vessel, the cooled down high temperature work medium is returned to the condenser end of the A/C unit after passing through a radiator for expelling therefrom at least an additional part of the heat remained therein;

c) Intermediate temperature work medium at an ambient temperature from the intermediate reservoir is passed through all twenty four cores of the four pressure vessels, thereby lowering the temperature of the pressure medium below the maximal operating temperature, and simultaneously being heated to a higher temperature;

d) From the last core, the intermediate work medium flows into the gradient tanks to be stored there, so that the first portion of intermediate temperature work medium to enter the gradient tank is at the highest temperature and the last portion to enter the gradient tank is at the lowest temperature;

e) Intermediate temperature work medium at an ambient temperature from the intermediate reservoir is passed through all twenty four cores of the four pressure vessels, thereby further lowering the temperature of the pressure medium to the minimal operative temperature, and simultaneously being heated to a higher temperature;

f) From the last core, the intermediate work medium flows back into the intermediate work reservoir, passing through the radiator to expel any additional heat to the environment;

g) Heated intermediate temperature work medium from the gradient tank is passed through the cores of the four pressure vessels, thereby gradually heating the pressure medium to a temperature above the minimal operative temperature yet still below the maximal operative temperature. Gradual heating is achieved by using a LIFO arrangement where the last portion to enter the gradient tank (which is also of the lowest temperature) is first to flow through the cores;

h) From the last core, the intermediate temperature work medium flows into the intermediate reservoir while passing through the radiator unit to expel any additional heat to the environment;

i) Repeating from step (a).

In particular, steps (a) and (b), and (e) and (f) can last for a first period of time and steps (c) and (d), and (g) and (h) can last for a second period of time which is greater than the first period of time. Specifically, the second period of time can be twice as tong as the first period of time. Under a particular example, the first period of time can be about 5 seconds and the second period of time can be about 10 seconds.

Figure 28A:
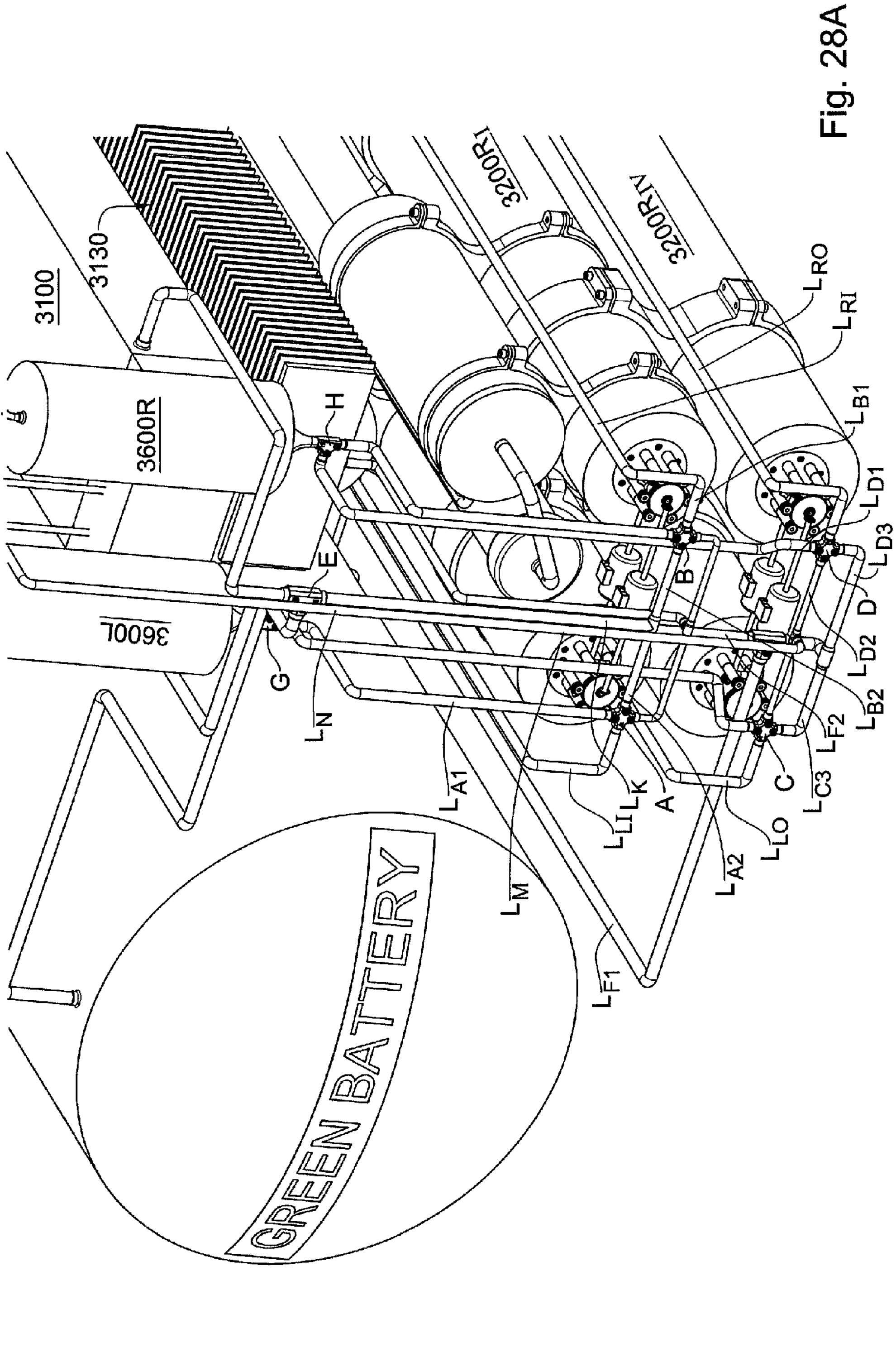
FIG. 28A is a schematic isometric view of the piping junctions of the front of the generator shown in FIGS. 27A to 27E.
Figure 28B:
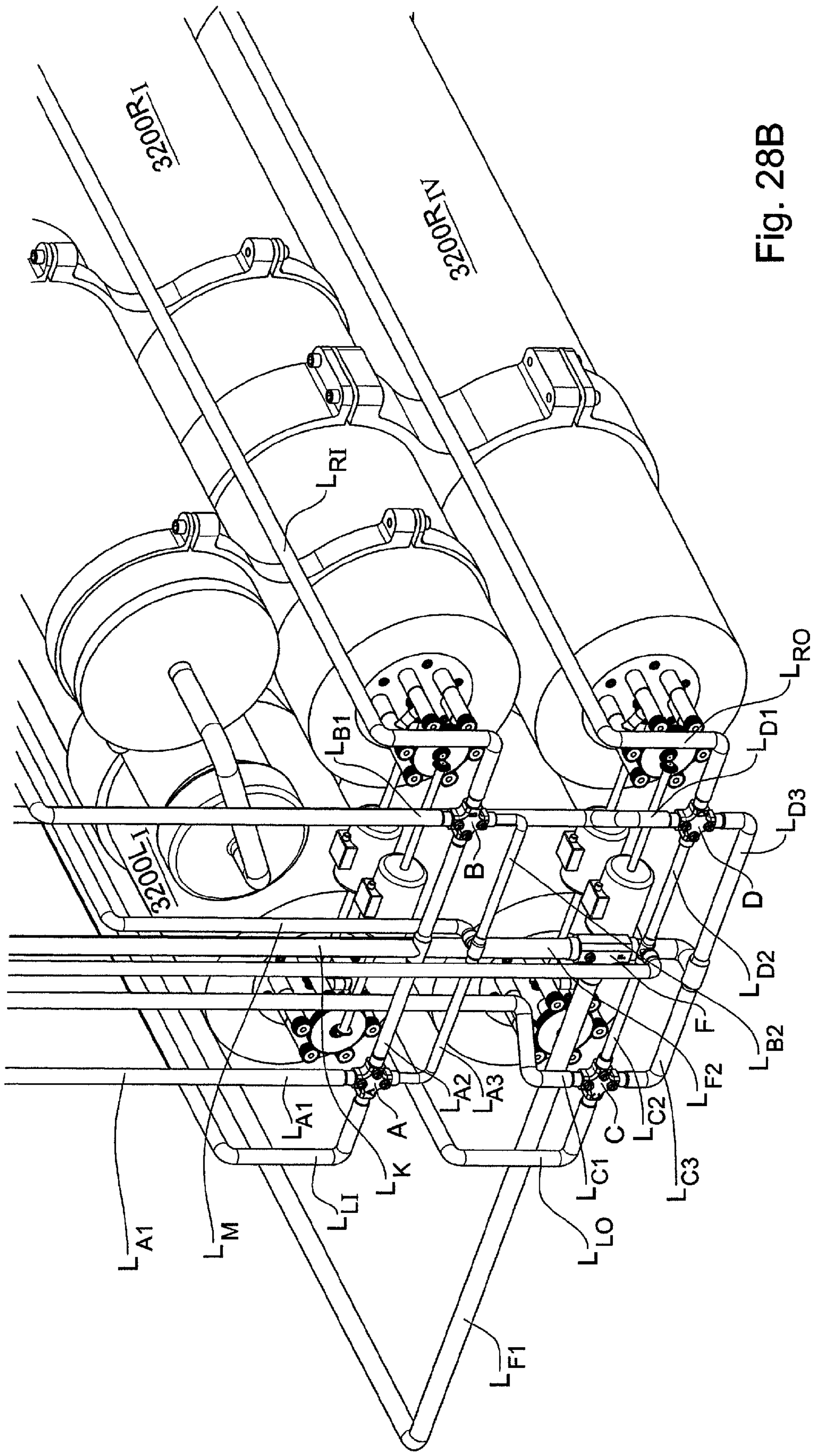
FIG. 28B is a schematic enlarged view of the piping junctions shown in FIG. 28A.

With particular reference being made to FIGS. 28A and 28B, the steps are carried out as follows:

Steps (a) and (b): High temperature work medium flows from the high temperature reservoir into valve E: enter via E2, exit via E and line $L_E$=>line $L_{B2}$ into valve B: enter via B2, exit via B and line $LR_I$=>exit cores via line $LR_O$ and into valve D: enter via D, exit via D3 and line $L_{D3}$=>line $L_F$ into valve F: enter via F, exit via F1 and line $L_{F1}$ back to the high temperature water reservoir.

Steps (c) and (d): Intermediate temperature work medium flows from the intermediate temperature reservoir via line $L_M$ into valve B: enter via B3, exit via B and line $LR_I$=>exit cores via line $LR_O$ and into valve D: enter via D, exit via D1 and line $L_{D1}$=>line $L_H$ into valve H: enter via H1, exit via H into the gradient tank. Water previously stored in the gradient tank will be pushed through line $L_P$ (shown FIG. 27A) and the radiator 3400 and back into the intermediate reservoir.

Steps (e) and (f): Intermediate temperature work medium flows from the intermediate temperature reservoir via line $L_M$ into valve B: enter via B3, exit via B and line $LR_I$=>exit cores via line $LR_O$ and into valve D: enter via D, exit via D2 and line $L_{D2}$=>line $L_N$ into the radiator unit 3400 and back to the intermediate reservoir.

Steps (g) and (h): Intermediate temperature work medium flows from the gradient tank into valve H: enter via H, exit via H2 and line $L_{B1}$ into valve B: enter via B1, exit via B and line $LR_I$=>exit cores via line $LR_O$ and into valve D: enter via D, exit via D2 and line $L_{D2}$=>line $L_N$ into the radiator unit 3400 and back to the intermediate reservoir.

It is appreciated that valve A is equivalent to valve B, valve C is equivalent to D, and valve G is equivalent to H. Valves E and F are not equivalent, and are each responsible for a different reservoir—valve E for the high temperature work medium reservoir and valve F for the intermediate temperature work medium reservoir.

Figure 29A:
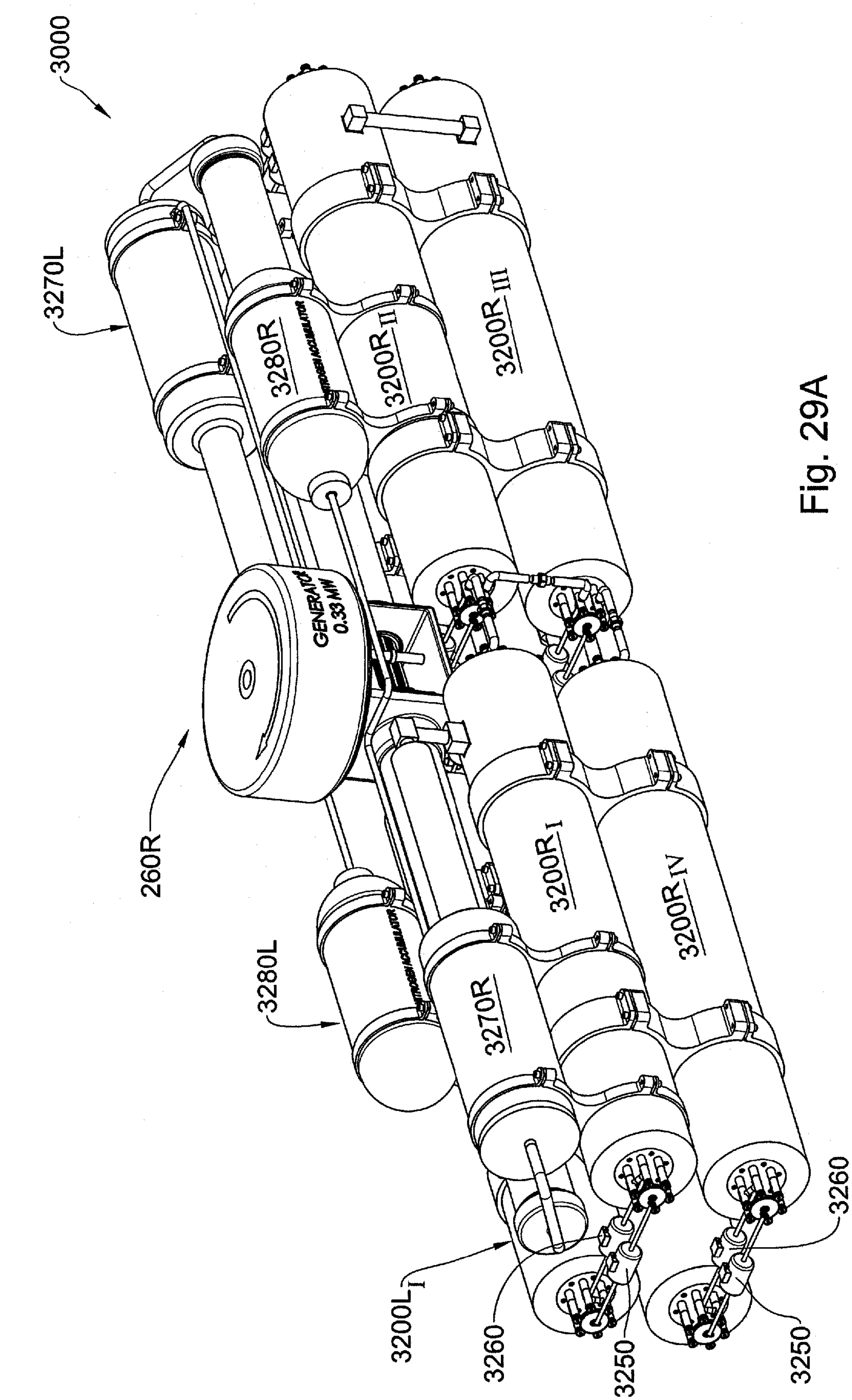
FIG. 29A is a schematic isometric view of the pressure system used in the generator shown in FIGS. 27A to 27E.
Figure 29B:
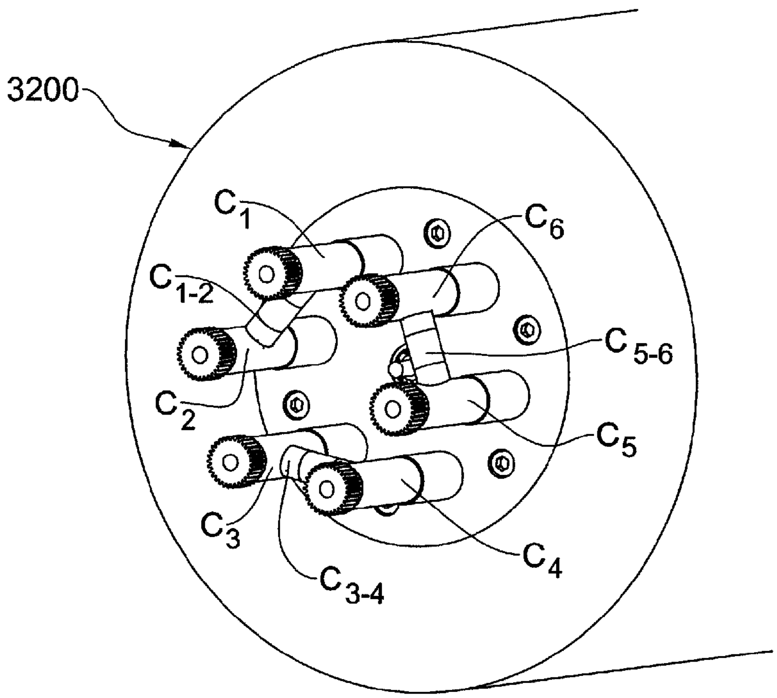
FIGS. 29B and 29C are respective schematic isometric and front views of a front portion of a single cylinder of the pressure system shown in FIG. 29A.
Figure 29C:
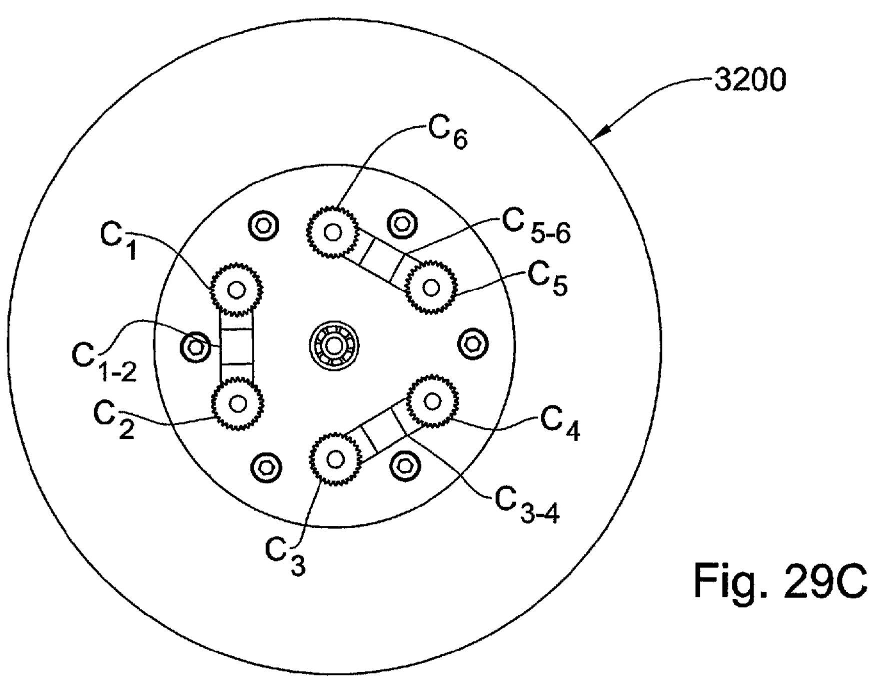
Figure 30A:
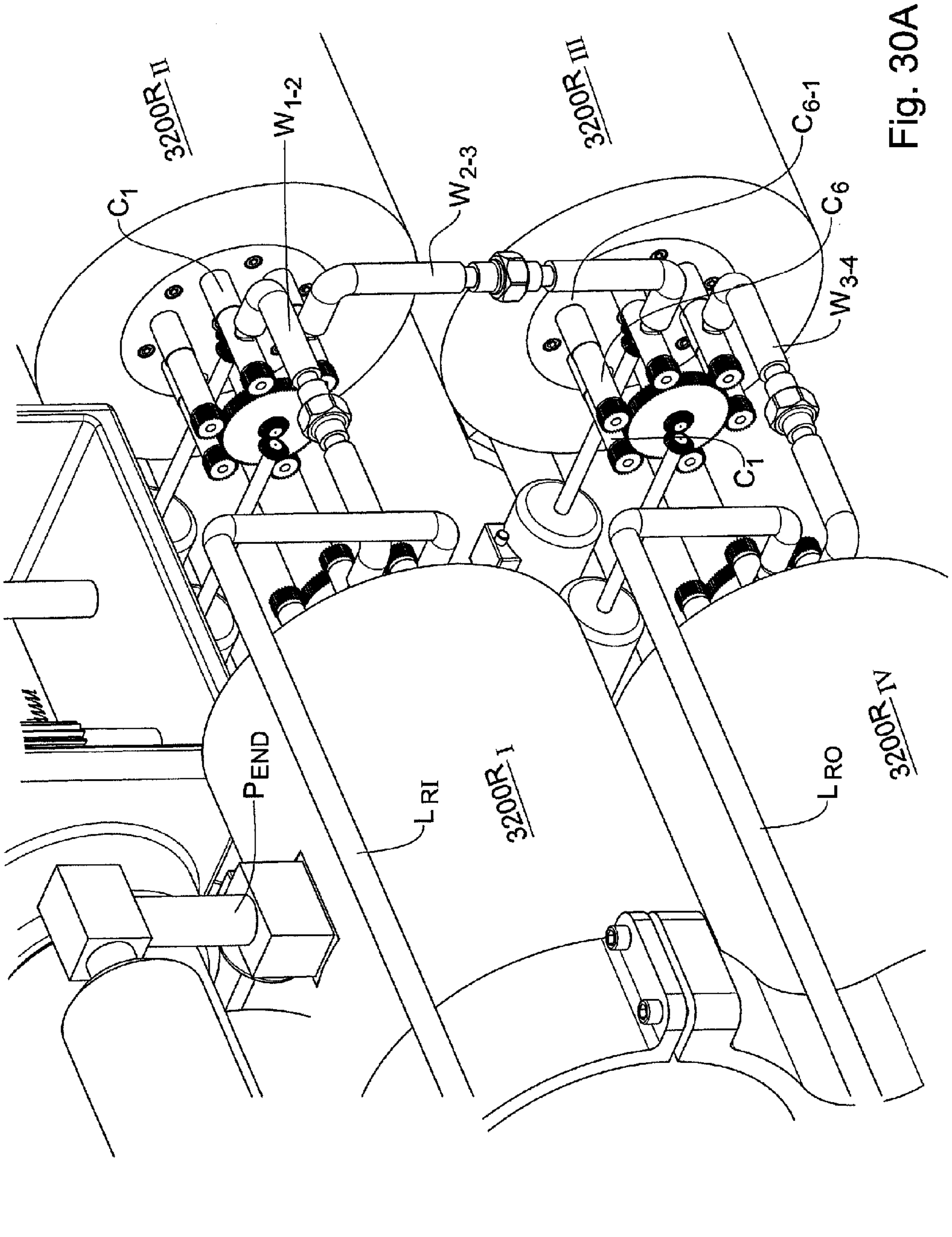
FIGS. 30A to 30C are respective schematic top-isometric, bottom-isometric and side views of a mid portion of the pressure system shown in FIG. 29A.
Figure 30B:
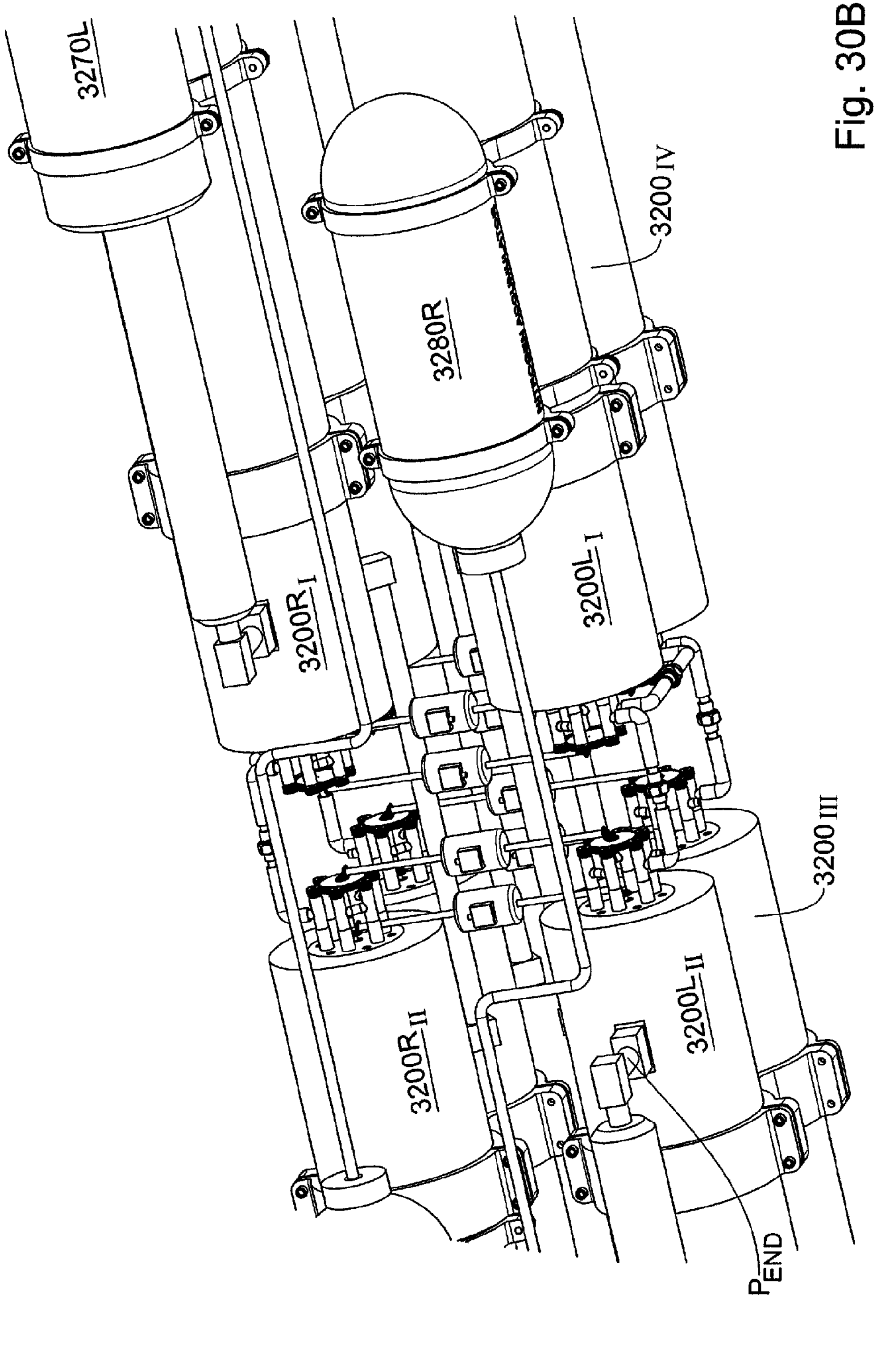
Figure 30C:
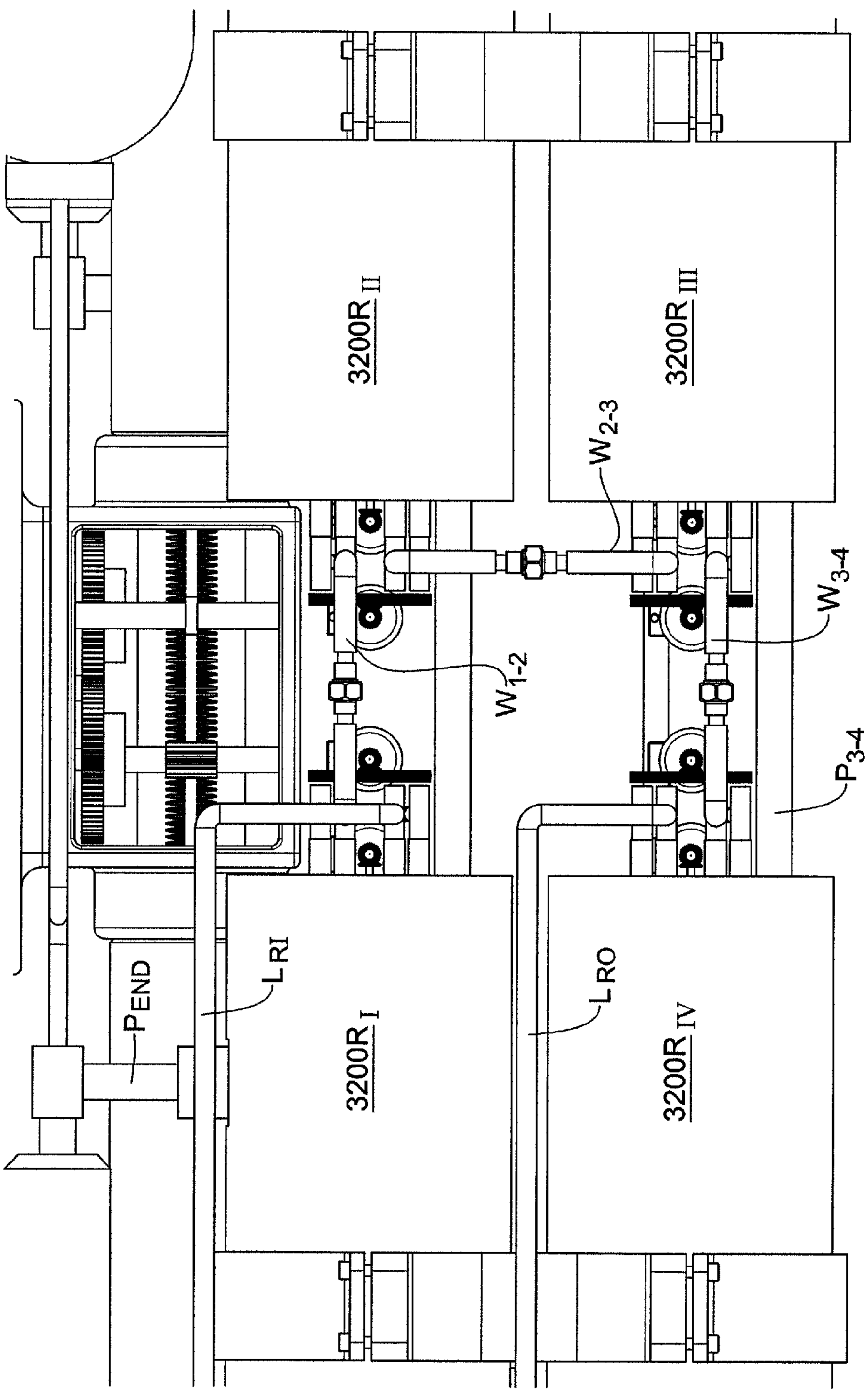

With reference being drawn to FIGS. 29A to 29C, it is observed that the generator 3000 comprises four pressure vessels 3200, each comprising six cores $C_1$ through $C_6$. It is also noted that the cores are inter-connected so as to form a single flow path. In particular, the cores are connected as follows:

At the front end of the pressure vessel 3200, the cores $C_1$ and $C_2$ are in fluid communication via connector $CC_{1-2}$, cores $C_3$ and $C_4$ are in fluid communication via connector $CC_{3-4}$ and cores $C_5$ and $C_6$ are in fluid communication via connector $CC_{5-6}$;

At the rear end of the pressure vessel 3200, the cores are oppositely connected: cores $C_2$ and $C_3$ are in fluid communication via connector $CC_{2-3}$, cores $C_4$ and $C_5$ are in fluid communication via connector $CC_{4-5}$ and cores $C_6$ and $C_1$ are in fluid communication via connector $CC_{6-1}$ (shown FIG. 30A);

Turning now to FIGS. 30A to 30C, the generator 3000 is shown to have a middle-point feed, i.e. the work medium enters the pressure vessels at the area between two consecutive pressure vessels 3200 rather than at the front of the first pressure vessels 3200 as in the previously described examples. It is also observed that all four cores $\mathbf{3200}_{I}$ to $\mathbf{3200}_{IV}$ are inter-connected via pipes $W_{1-2}$, $W_{2-3}$ and $W_{3-4}$.

In particular, the line $L_{RI}$ is connected to the first core $C_1$ of the first pressure vessels $\mathbf{3200}_{I}$. As a result, the flow path of the work medium is as follows:

- entering the first core $C_1$ of the first pressure vessel $\mathbf{3200}_{I}$, passing through all the cores $C_1$ through $C_6$ thereof and exiting the sixth core $C_6$ into connector pipe $W_{1-2}$;
- entering the first core $C_1$ of the second pressure vessel $\mathbf{3200}_{II}$, passing through all the cores $C_1$ through $C_6$ thereof and exiting the sixth core $C_6$ into connector pipe $W_{2-3}$;
- entering the first core $C_1$ of the third pressure vessel $\mathbf{3200}_{III}$, passing through all the cores $C_1$ through $C_6$ thereof and exiting the sixth core $C_6$ into connector pipe $W_{3-4}$; and
- entering the first core $C_1$ of the fourth pressure vessel $\mathbf{3200}_{IV}$, passing through all the cores $C_1$ through $C_6$ thereof and exiting the sixth core $C_6$ into line $L_{RO}$.

Under the above arrangement, all twenty four cores of the pressure vessels $\mathbf{3200}_{I}$ to $\mathbf{3200}_{IV}$ are in fluid communication with each other, forming a long flow path.

Figure 31A:
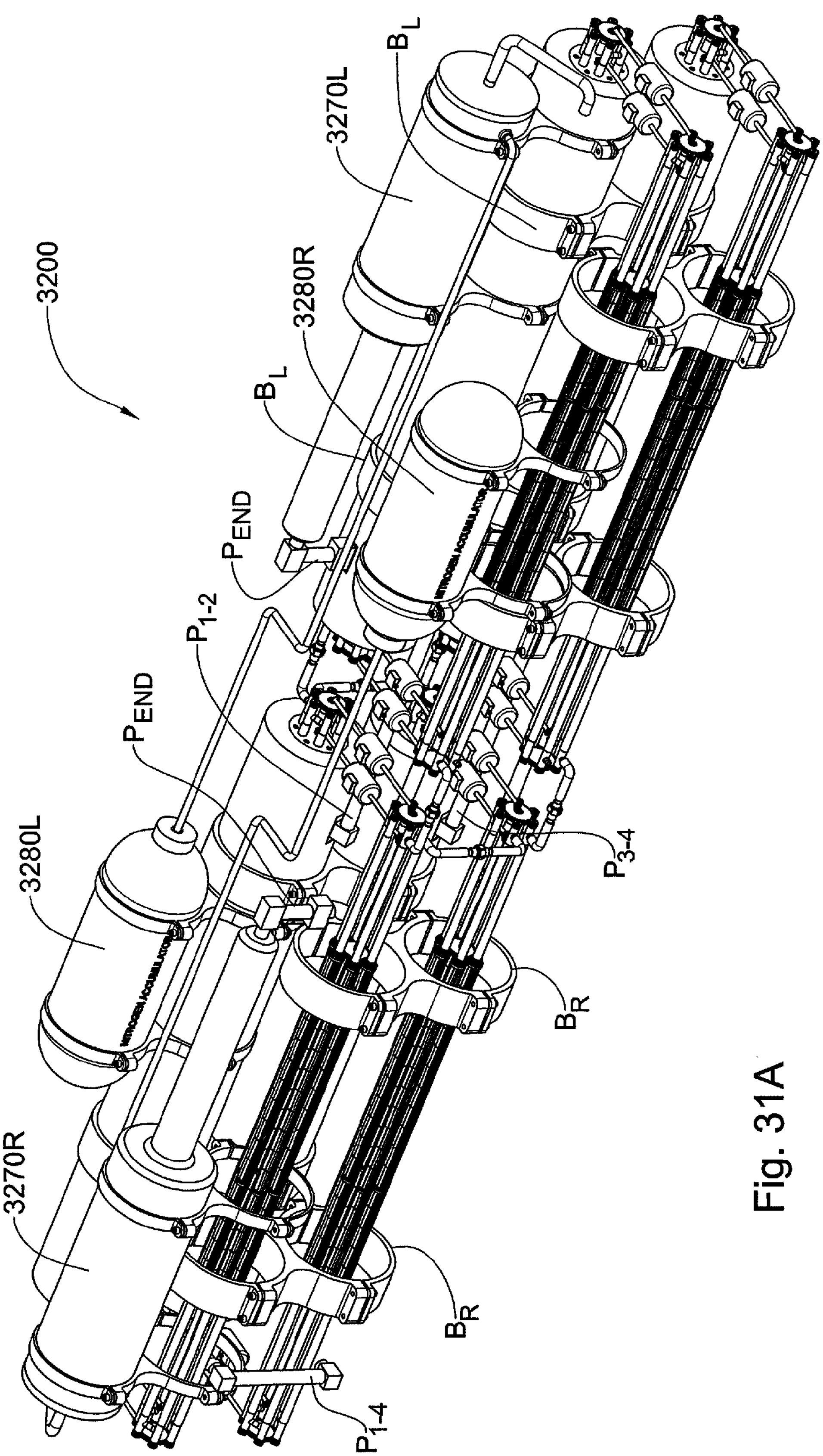
FIGS. 31A and 31B are respective schematic rear-isometric and side views of the pressure system shown in FIG. 29A, with some of the cylinders removed for a clearer view.
Figure 31B:
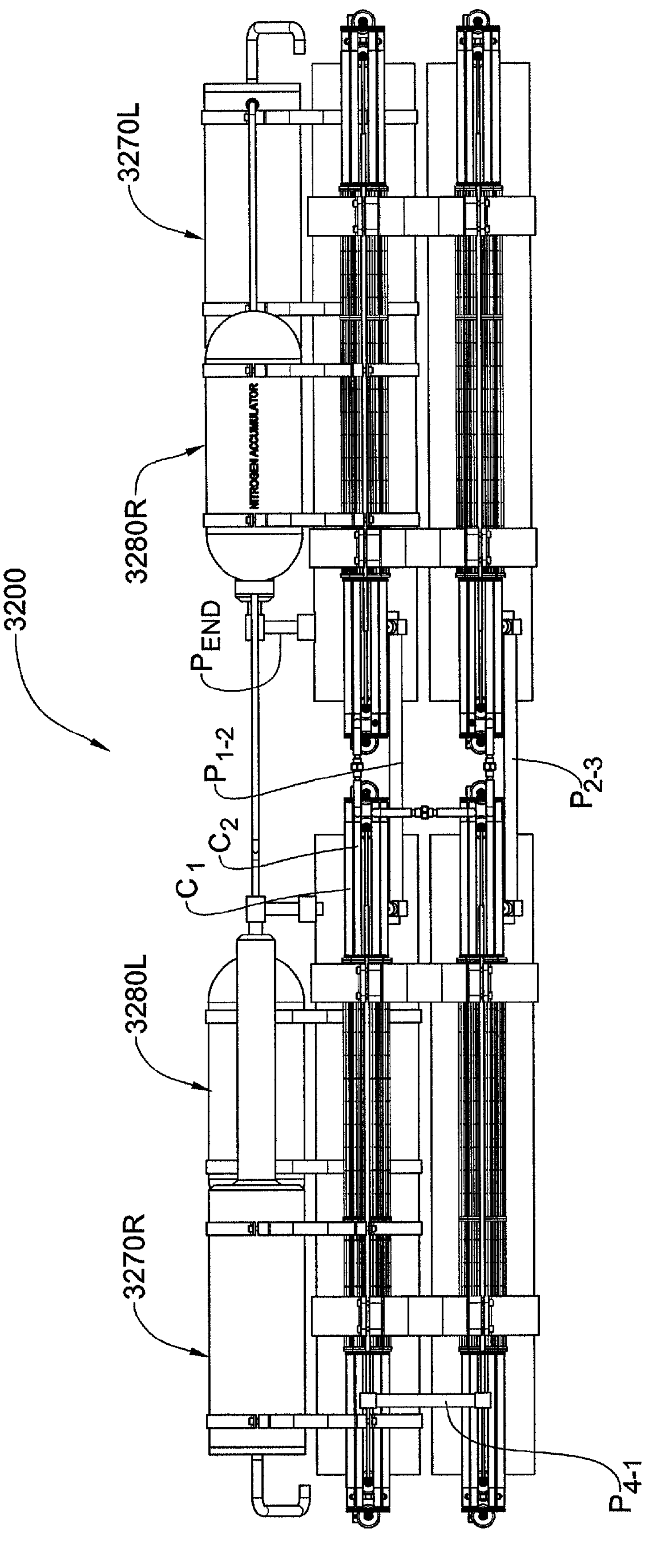

Turning now to FIGS. 31A and 31B, it is observed that the pressure vessels $\mathbf{3200}_{I}$ to $\mathbf{3200}_{IV}$ are also in fluid communication with one another, i.e. the pressure fluid within each one of these vessels is in fluid communication with the pressure fluid in the other vessels. Fluid communication is provided by high-pressure connectors $P_{1-2}$, $P_{2-3}$ and $P_{4-1}$. One of the four pressure vessels is fitted with an outlet high-pressure connector $P_{END}$, through which the high pressure medium is provided to the piston units 3270R, 3270L.

Figure 32A:
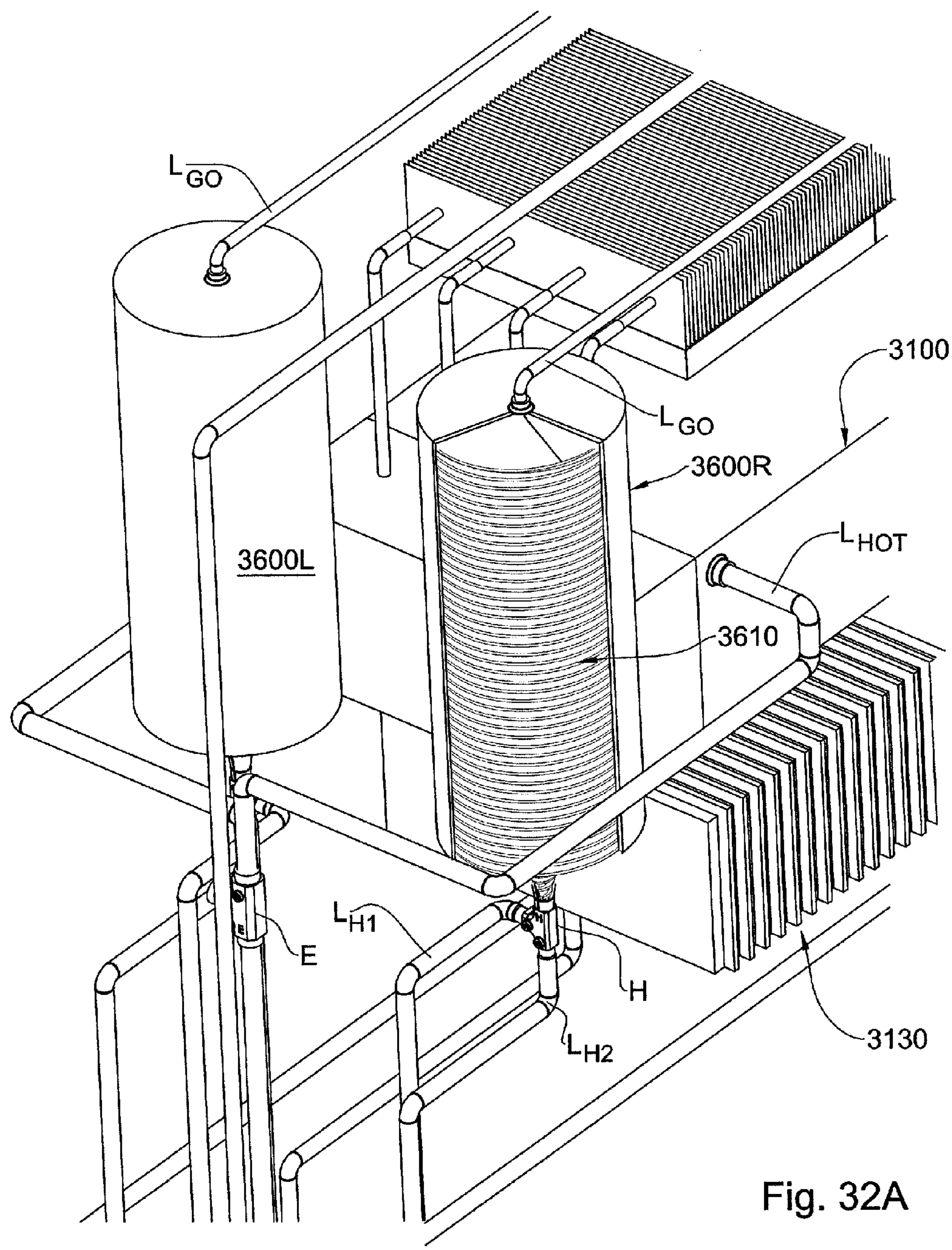
FIGS. 32A and 32B are two schematic isometric views of gradient tanks used in the generator shown in FIGS. 27A to 27E.
Figure 32B:
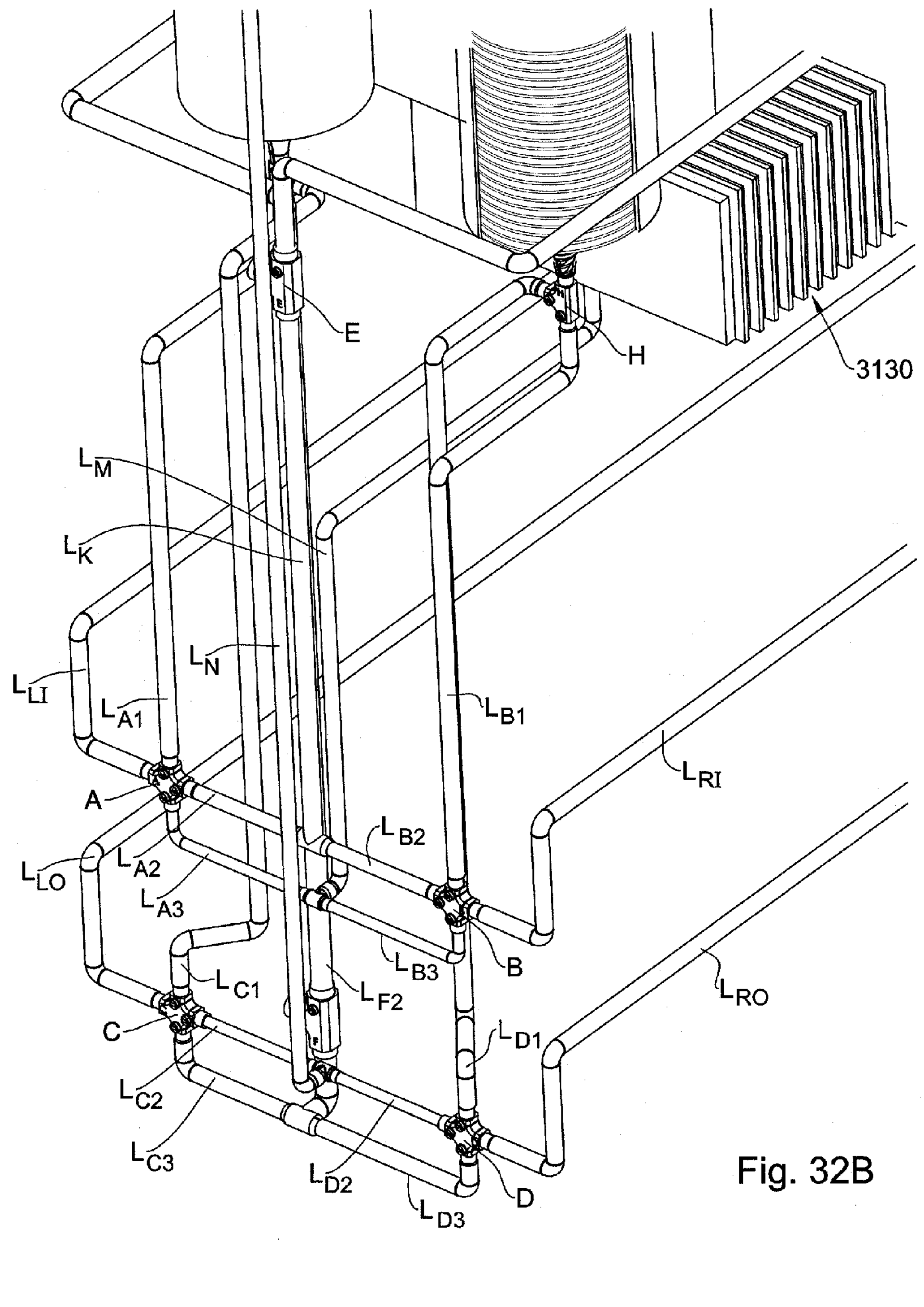

Turning now to FIGS. 32A and 32B, the generator 3000 is shown to comprise two gradient tanks 3600L, 3600R, each being in fluid communication with pressure vessels 3200 via appropriate piping. In particular, each of the gradient tanks 3600R, 3600L is fitted with a corresponding valve H, G respectively, configured for providing the gradient tanks 3600R, 3600L with heated/cooled work medium as previously described with respect to steps (c) and (d) above.

Each of the gradient tanks 3600L, 3600R is of generally similar construction to the gradient tanks 600, 1600 and 2600 previously described. In particular, it is formed with a flow labyrinth 3610 configured for maintaining a temperature difference between consecutive portions of work medium entering the gradient tank.

In addition, it is observed that each of the gradient tanks 3600R, 3600L is connected at the top to a pipeline $L_{GO}$, configured for allowing a medium contained within the gradient tank to be pushed out when work medium enters the gradient tanks via valves H and G.

Figure 33A:
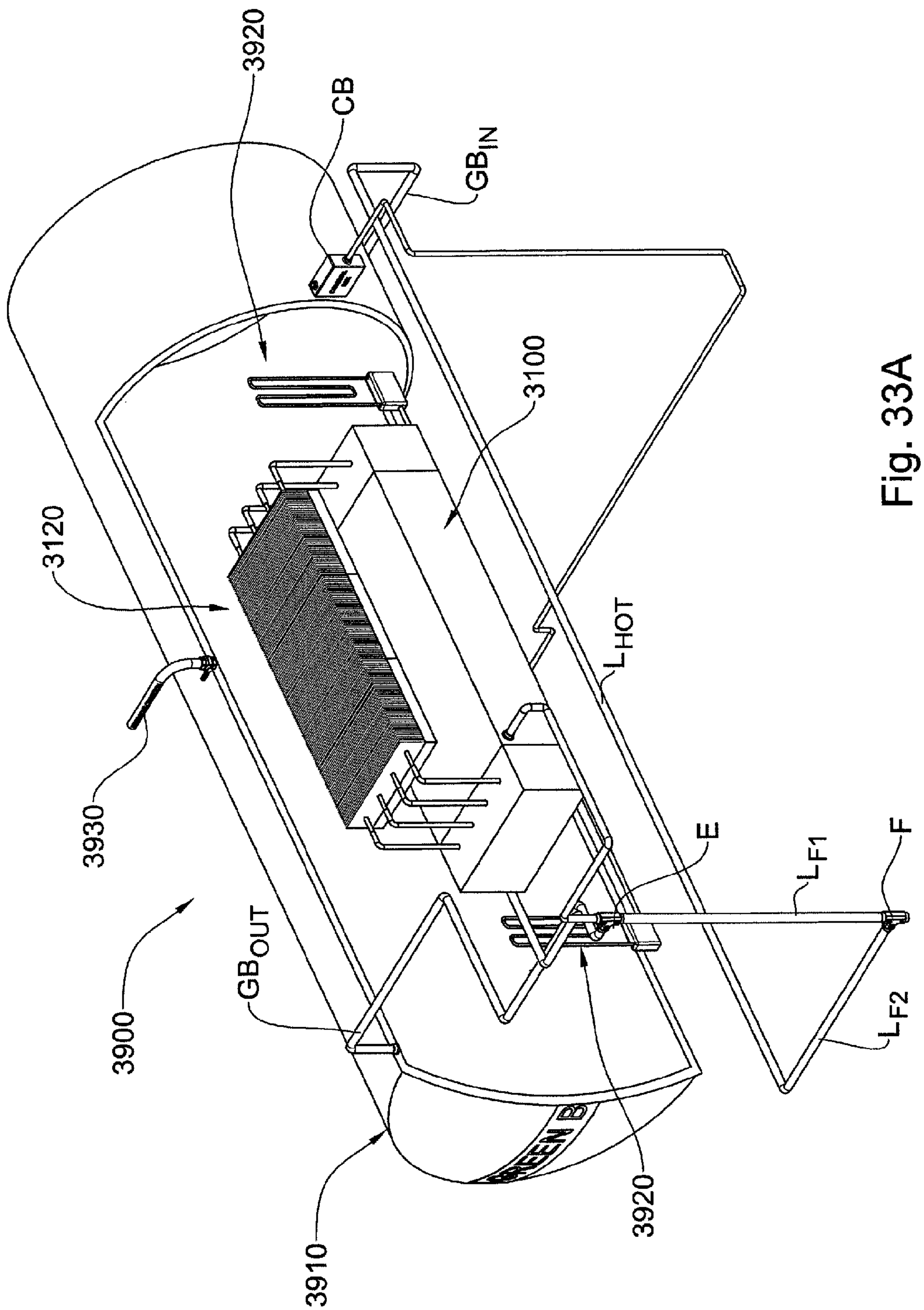
FIG. 33A is a schematic isometric view of an accumulator arrangement used in the generator shown in FIGS. 27A to 27E when connected to reservoirs of the generator.
Figure 33B:
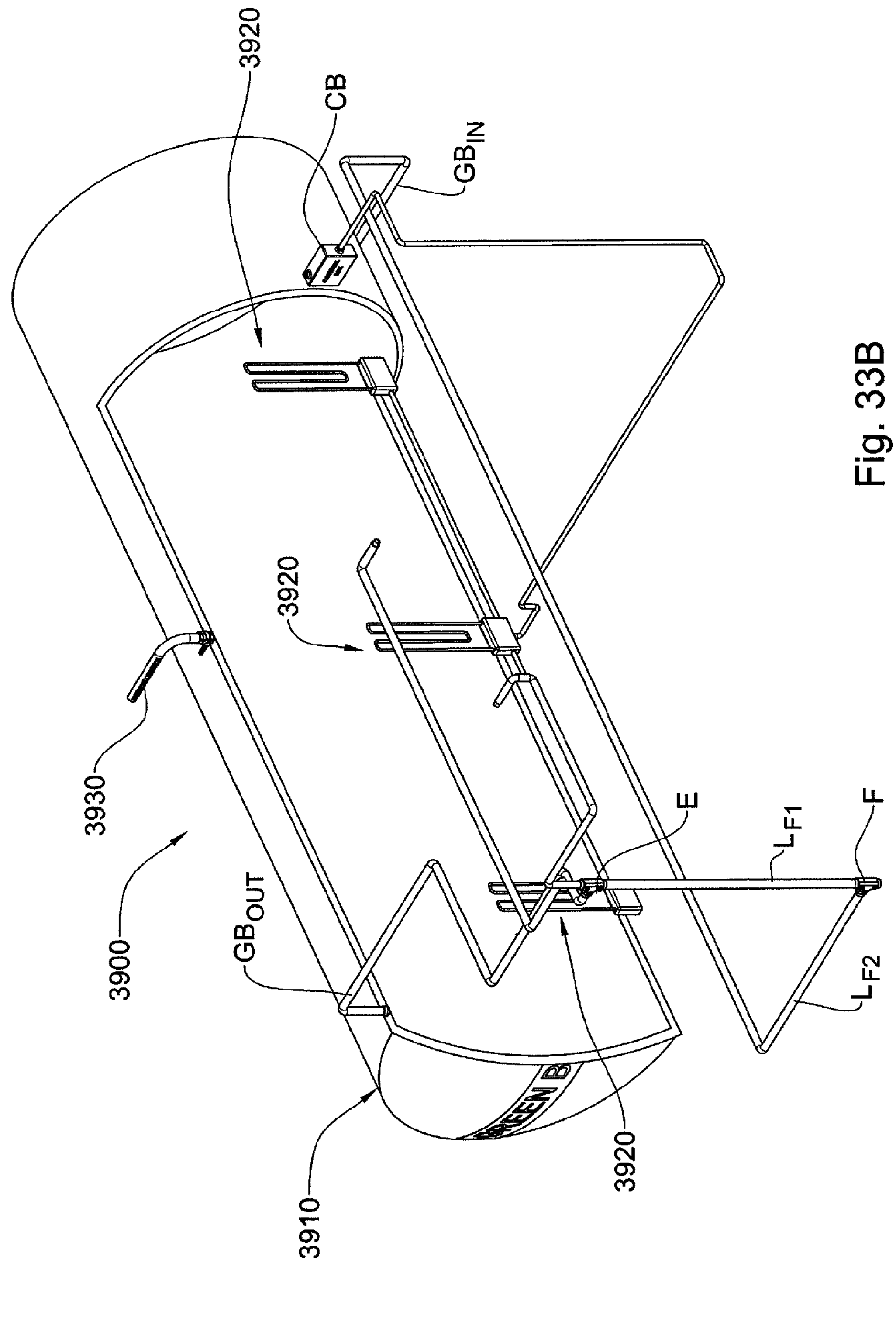
FIG. 33B is a schematic isometric view of the accumulator arrangement shown in FIG. 33B.
Figure 33C:
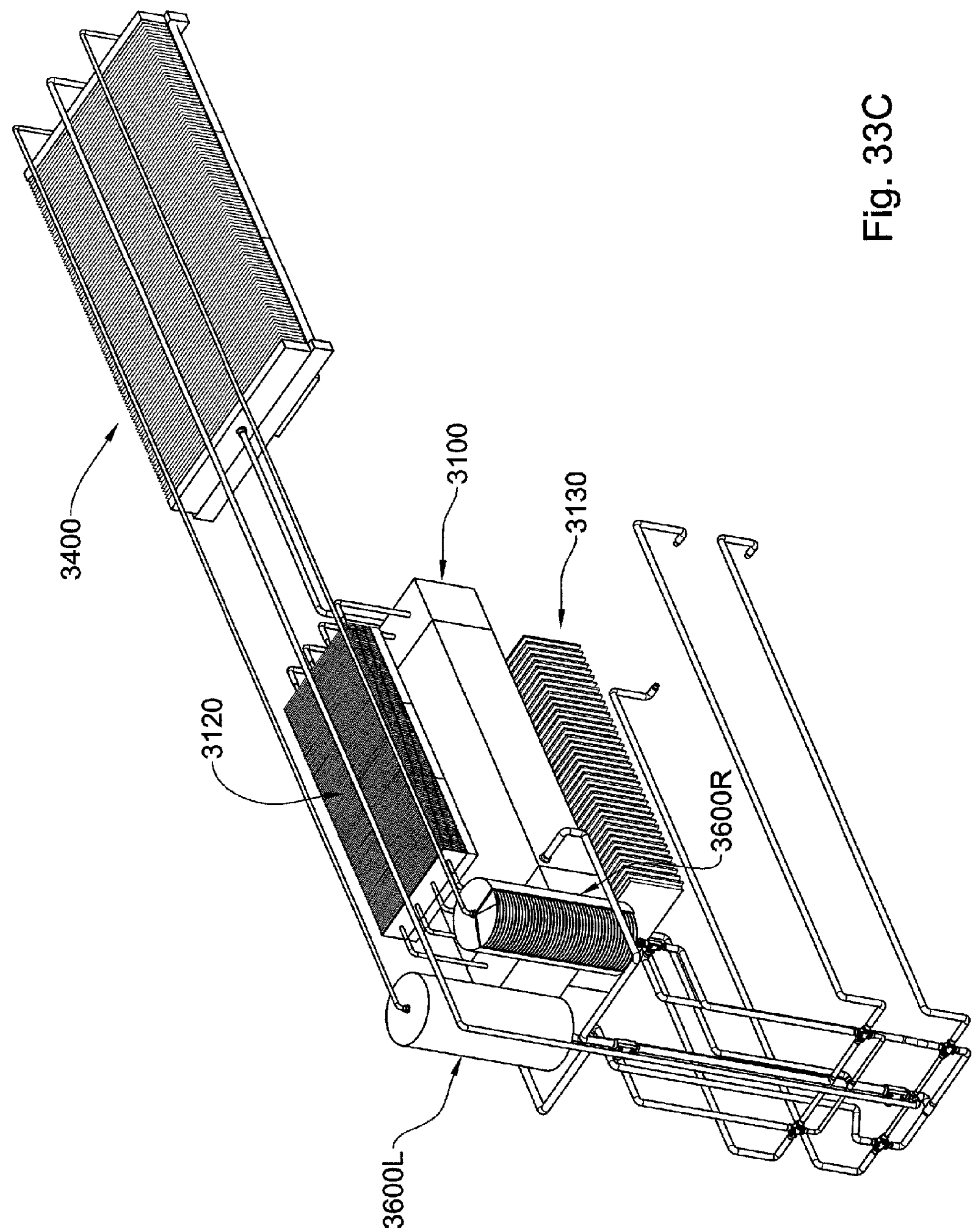
FIG. 33C is a schematic isometric view of the accumulator arrangement shown in FIG. 33B.

With reference being made to FIGS. 33A and 33B, an accumulator arrangement is disclosed generally designated as 3900, configured for storing some of the energy produced by the above generator. The accumulator arrangement 3900 comprises a casing 3910 which contains a storing medium (not shown) configured for being heated by heating elements 3920 located within the casing 3910. Specifically, the heating elements 3920 are operated using some of the electrical power generated by the generator 3000, so as to heat the storing medium.

As a result, throughout a given amount of time, the storing medium within the casing 3910 is gradually heated to a temperature similar to that of the high temperature work medium within the high temperature reservoir 3110. Upon reaching such a temperature, the valves A to G of the generator 3000 are selectively switched so that high temperature storing medium from the casing 3910 is circulated through the generator 3000 instead of high temperature work medium from the high temperature reservoir 3110, defining an auxiliary operation mode.

In particular, the arrangement is such that in the auxiliary mode, steps (a) and (b) are performed thereby as follows:

Steps (a) and (b): high temperature storing medium flows from outlet $GB_{OUT}$ of the casing 3910 of the accumulator arrangement 3900 into valve E: enter via $E_1$, exit via E and line $L_K$=>line $L_{B2}$ into valve B: enter via B2, exit via B and line $LR_I$=>exit cores via line $LR_O$ and into valve D: enter via D, exit via D3 and line $L_{D3}$=>line $L_F$ into valve F: enter via F, exit via F1 and line $L_{F1}$ back to the casing 3910 through $GR_{IN}$.

It is appreciated that while the generator 3000 operates in the auxiliary mode, the high temperature reservoir 3110 is circumvented by the piping as described above, and therefore does not take part in the operation of the generator 3000. This allows temporarily shutting down the A/C unit and thereby reducing overall power consumption of the generator 3000.

Figure 34:
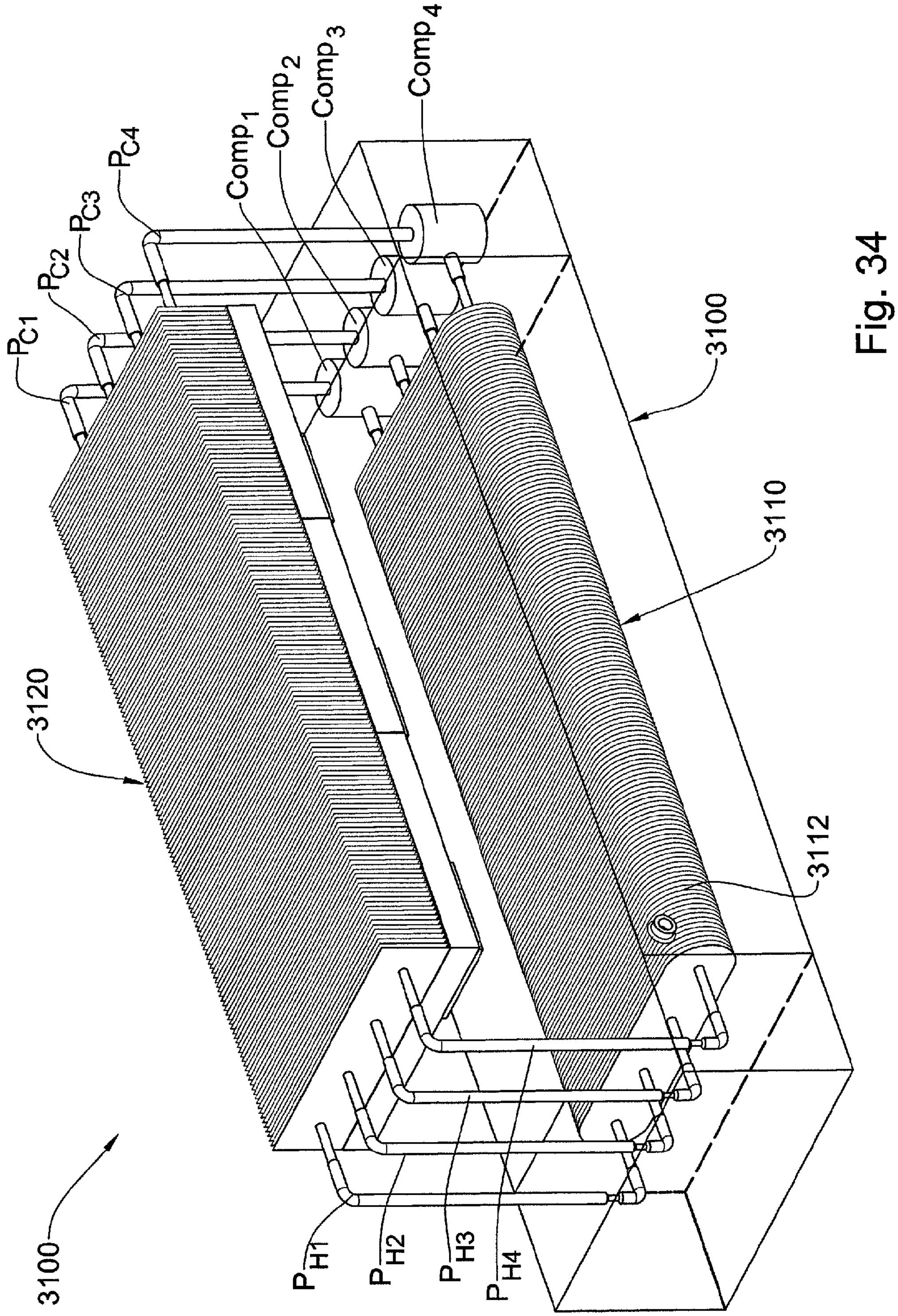
FIG. 34 is a schematic isometric view of a heat pump used in the generator shown in FIGS. 27A to 27E.
Figure 35A:
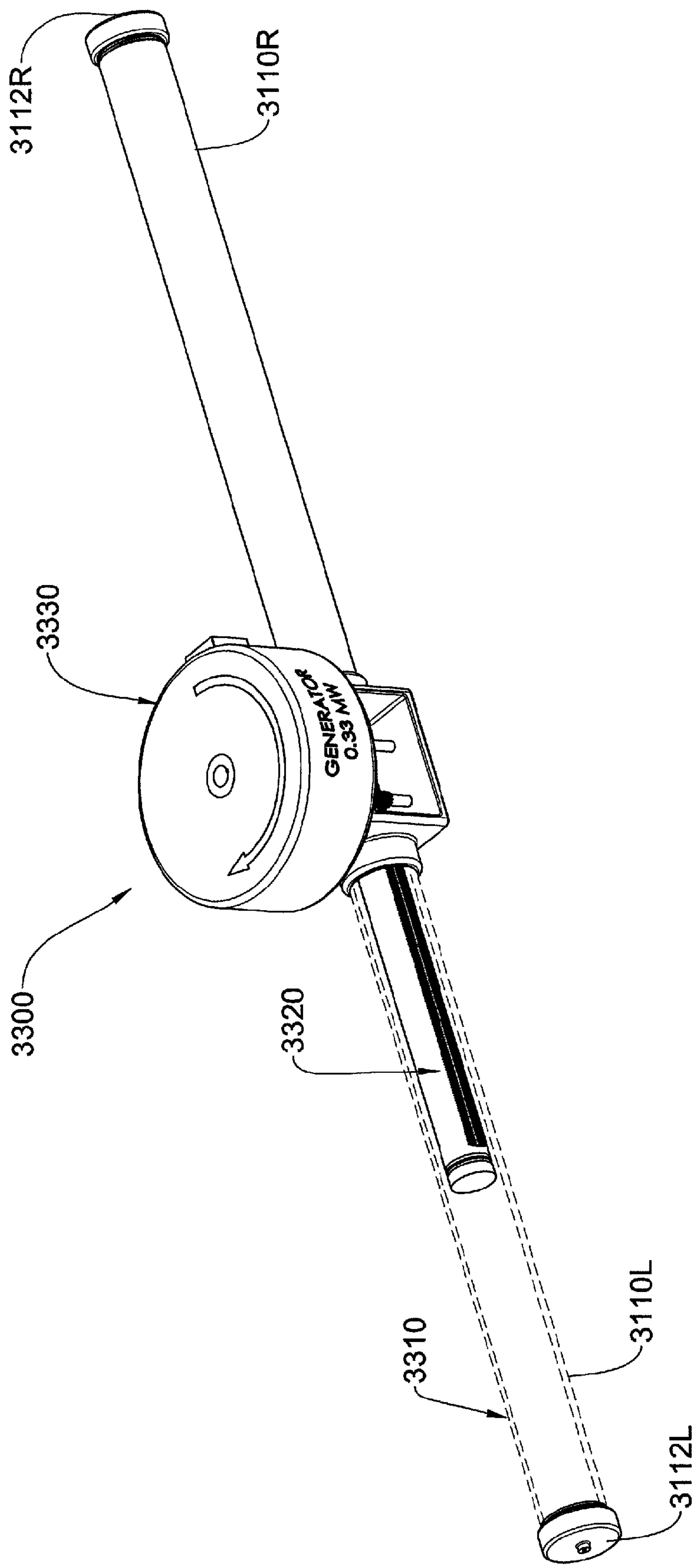
FIG. 35A is a schematic isometric view of a gear assembly used in the generator shown in FIGS. 27A to 27E.
Figure 35B:
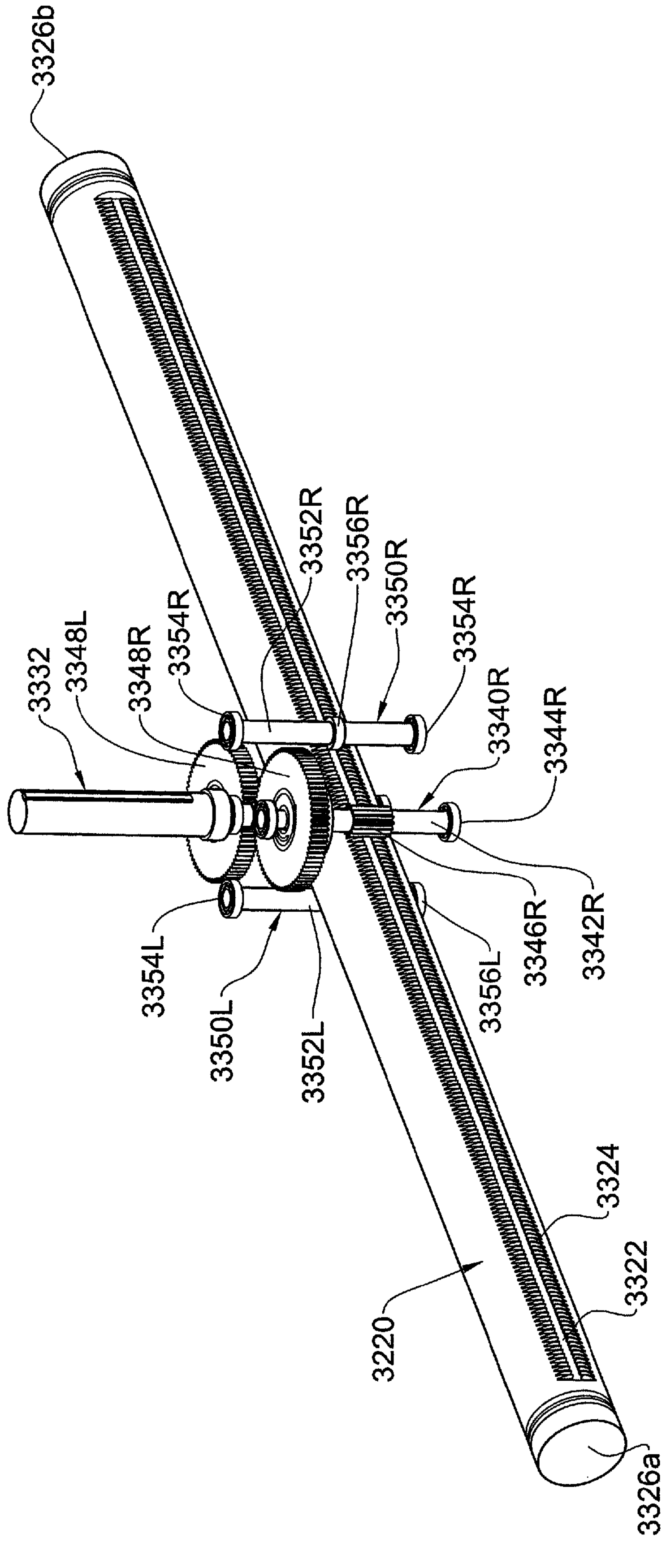
FIG. 35B is a schematic isometric view of the gear assembly shown in FIG. 35A, with a casing thereof being removed.
Figure 35C:
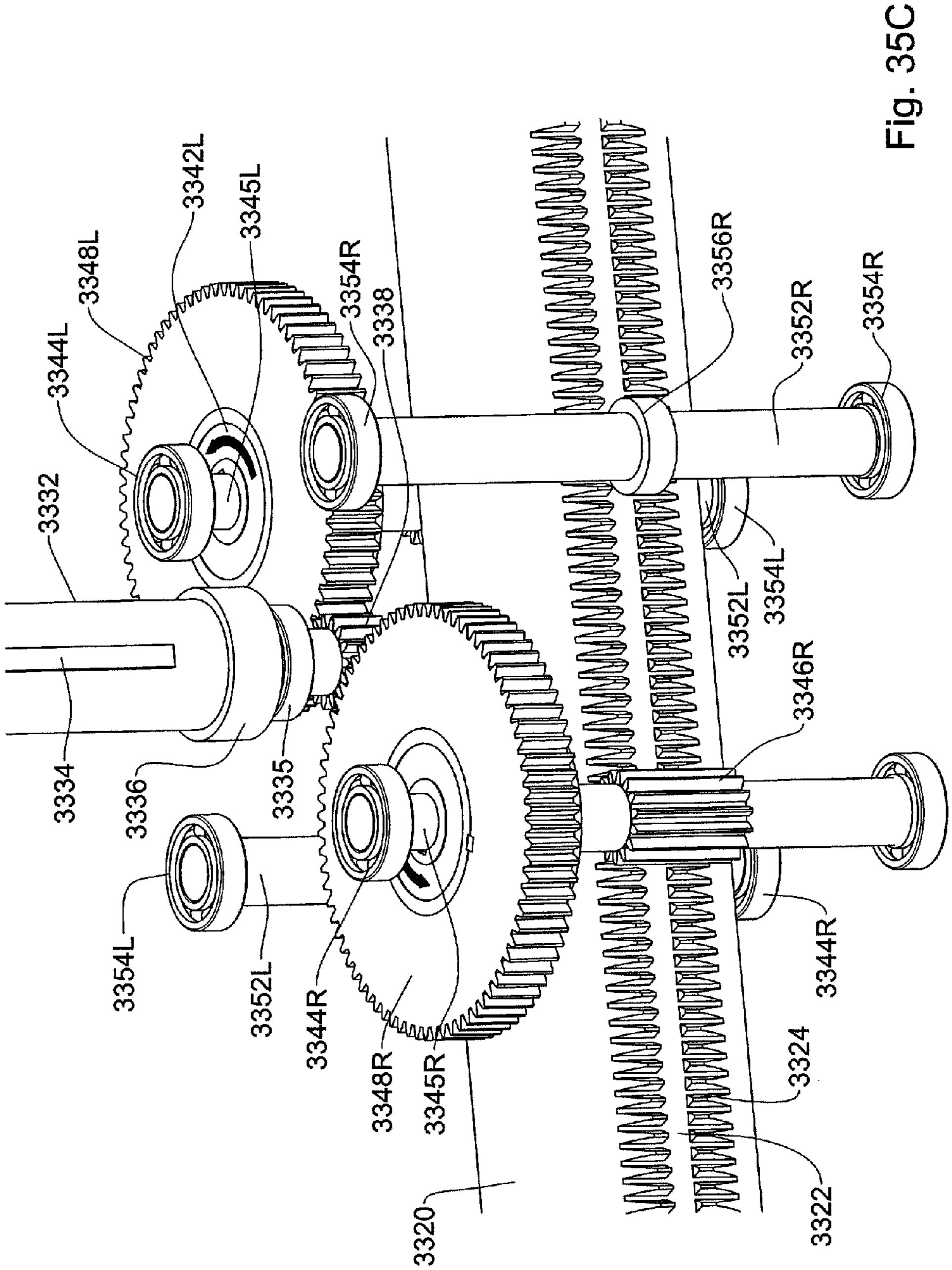
FIGS. 35C to 35E are respective schematic enlarged isometric, side and top views of a mechanism of the gear assembly shown in FIGS. 35A and 35B.
Figure 35D:
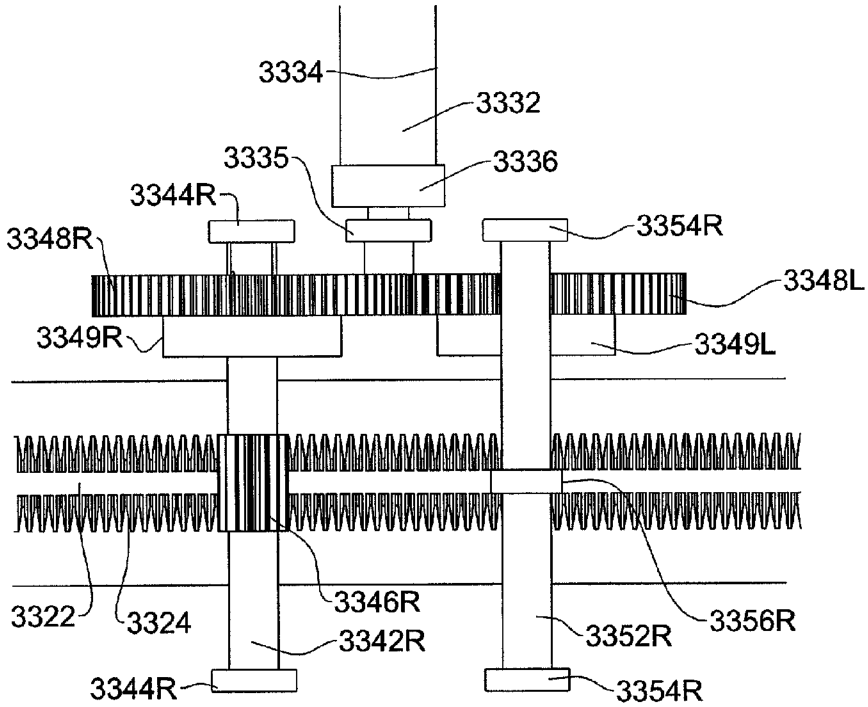
Figure 35E:
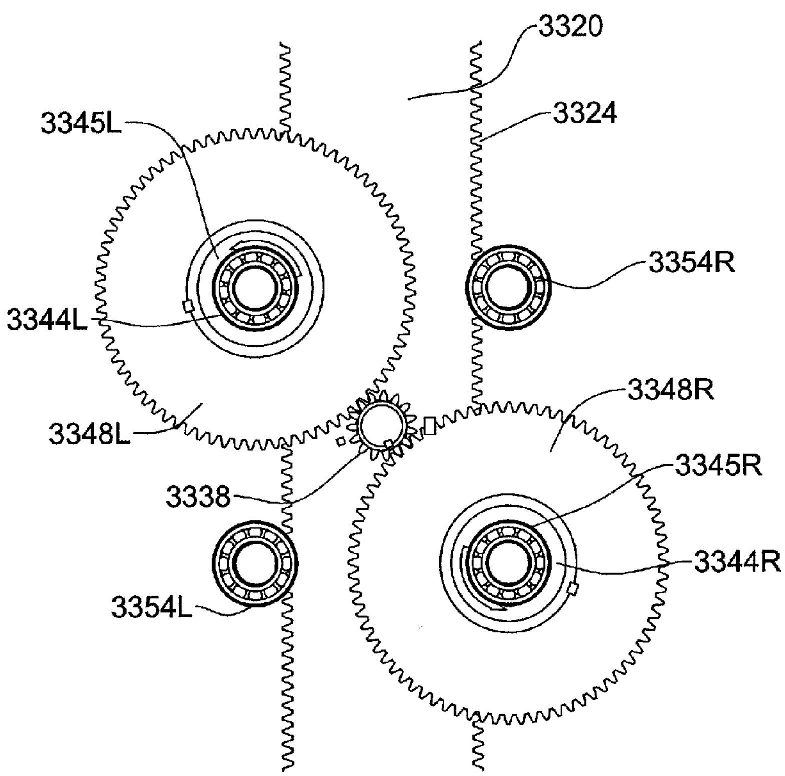

Turning now to FIG. 34, the A/C unit is in the form of a work medium sub-system 3100 having a condenser end 3112, an evaporator end 3122, a compressor arrangement CP and an expansion valve arrangement EV. The evaporator end 3122 is exposed to the environment so as to be in thermal communication therewith and absorb heat therefrom. The condenser end 3112 is located within a housing constituting the high temperature reservoir 3110 containing the high temperature work medium (not shown).

The compressor arrangement CP and the expansion valve arrangement EV are in fluid communication with both the condenser end 3112 and the evaporator end 3122, and operate to generate a standard cooling cycle in which a carrier medium (not shown) is compressed by the compressor arrangement CP, passes through the condenser end 3112 and expands via the expansion valve arrangement EV into the evaporator end 3122.

It is observed that the compressor arrangement CP comprises four compressors ($CP_1$ to $CP_4$), and the expansion valve arrangement EV comprises corresponding four expansion valves ($EV_1$ to $EV_4$), to form four working couplets $CP_I$-$EV_1$, $CP_2$-$EV_2$, $CP_3$-$EV_3$ and $CP_4$-$EV_4$. Each of the compressors $CP_1$ to $CP_4$ has a different power consumption and provides a different compression ratio, and each of the expansion valves $EV_1$ to $EV_4$ are respectively configured for providing a different expansion degree.

The arrangement is such that the work medium subsystem 3100 is operated by at least one couplet at a time, the couplet being chosen according to the required temperature difference between the high temperature reservoir and the cold temperature reservoir, and according to the temperature of the outside environment.

The CP-EV couplets can be configured for operation during specific times of day/year. More specifically, one couplet can be configured for operation during summer days, another for summer nights, a third for winder days and a fourth for winter nights, providing for a more efficient operation of the generator 3000.

In addition, the above arrangement provides at least three backup compressors when one of the four compressors malfunctions. For example, if the summer night compressor malfunctions, the winter day compressor can be used while the summer night compressor is being repaired.

Turning now to FIGS. 35A to 35E, a linear gear mechanism generally designated as 3300 is shown, replacing the previously described power assembly 300. The linear gear 3300 comprises a housing 3310 within which a rack 3320 is configured for engagement with pinion arrangements 3340R, 3340L of the gear mechanism 3300.

Each of the ends 3310R, 3310L is formed with a corresponding opening 3312R, 3312L respectively, being in fluid communication with an auxiliary work medium pumped into and out of the housing 3310 during operation of the generator 300 owing to pressure changes in the pressure medium contained in the pressure vessels 3200R, 3200L. As a result, the rack 3320 is caused to reciprocate under alternating pressure between a first end 3310R and a second end 3310L of the housing 3310.

Due to the engagement of the threaded portion 3324 of the rack 3320 with the pinions 3348R, 3348L of the pinion arrangements 3340R, 3340L, reciprocation of the rack 3320 within the housing 3310 entails revolution of the pinions 3348R, 3348L about their axis, thereby converting linear movement into rotational movement, which is eventually transferred to a drive shaft 3332.

It is observed that each of the shafts 3342L, 3342R carrying the pinions 3348R, 3348L is also fitted with bearings 3345L, 3345R at both ends thereof, so that rotation of the pinions 3348R, 3348L is uni-directional only. Specifically, and with particular reference to FIG. 35C, when the rack 3320 displaces to the left, the shaft 3342R on which the pinion 3348R is mounted, revolves about its axis, entailing revolution of the pinion 3348R. However, at the same time, while shaft 3342L on which the pinion 3348L is mounted also revolves about its axis, the pinion 3348L itself remains stationary due to the bearing 3345L. Similarly, during displacement of the rack 3320 in the opposite direction, the pinion 3348L revolves while the pinion 3348R remains stationary.

In order to stabilize the shafts 3342L, 3342R, yet still allow them to freely rotate during displacement of the rack 3320, additional bearings 3344L, 3344R are fitted to each of the shafts 3342L, 3342R.

Thus, since both pinions 3348R, 3348L are engaged with a gear 3338 of the generator shaft, any displacement of the rack 3320, in any of the two directions, will entail revolution of the gear 3338 and consequently of the shaft 3332. Revolution of the shaft 3332 can be converted to electricity in any known manner.

In addition, in order to stabilize the rack 3320 in its reciprocating movement within the housing, the gear mechanism 3300 is provided with two delimiting rollers 3350R, 3350L, each being positioned in front of a respective pinion arrangement 3340L, 3340R respectively. The rollers 3350R, 3350L, are configured for engaging the rack so as to delimit its movement only to the axial direction.

Each of the delimiting rollers 3350R, 3350L comprises a shaft 3352R, 3352L respectively, on which a roller member 3356R, 3356L is mounted. In addition, each end of the shaft 3352R, 3352L is fitted with bearings 3354R, 3354L respectively, which are similar to the bearings 3344L, 3344R of the pinion arrangements 3340R, 3340L. In assembly, the roller members 3356R, 3356L are engaged with a non-threaded portion 3322 of the rack 3320, so as to allow only axial movement thereof.

It is also noted that the drive shaft 3332 itself, is also provided with a bearing 3335, allowing it to freely rotate by inertia, even if the rack 3320 has already stopped reciprocating.

It is appreciated that the rack and pinion arrangement of the linear gear assembly 3300 provides for several significant advantages:

- any displacement of the rack 3320 entails revolution of the drive shaft 3332, even if a stroke in one direction is not similar in length to the stroke in the opposite direction;
- Due to the bearing 3335 of the drive shaft 3332, upon a single stroke of the rack 3320 in one direction, and after the rack as finished its movement in that direction, the drive shaft continues to further revolve, thus allowing to generate additional power even within movement of the rack;
- The linear gear arrangement 3300 is more accurate than the previously described power assembly due to its simple constructions and use of a single rack 3320;
- It provides a much higher transmission ratio than the previously described power assembly; and Turning now to FIGS. 36A to 36D, yet another example of a generator is shown generally designated as 4000. In essence, the generator 4000 is similar to the previously described generator 3000, however with several differences, some of which are as follows:

- Comprises only two pressure vessels 4200R, 4200L (not eight), each being longer that the pressure vessels 3200;
- Operates on front feed and rear egress, i.e. work medium enters the pressure vessels 4200R, 4200L from a front end thereof and exits at a rear end thereof;
- Propulsion of the work medium through the generator is performed by pumps;
- Provided with a combined valve 4140R, 4140L configured for having two operational modes;
- Comprises an accumulator arrangement 4900 divided into two compartments and having a heat pump operating therebetween; and
- The gear mechanism 4300 thereof comprises roller-gears instead of regular gears.

Figure 36A:
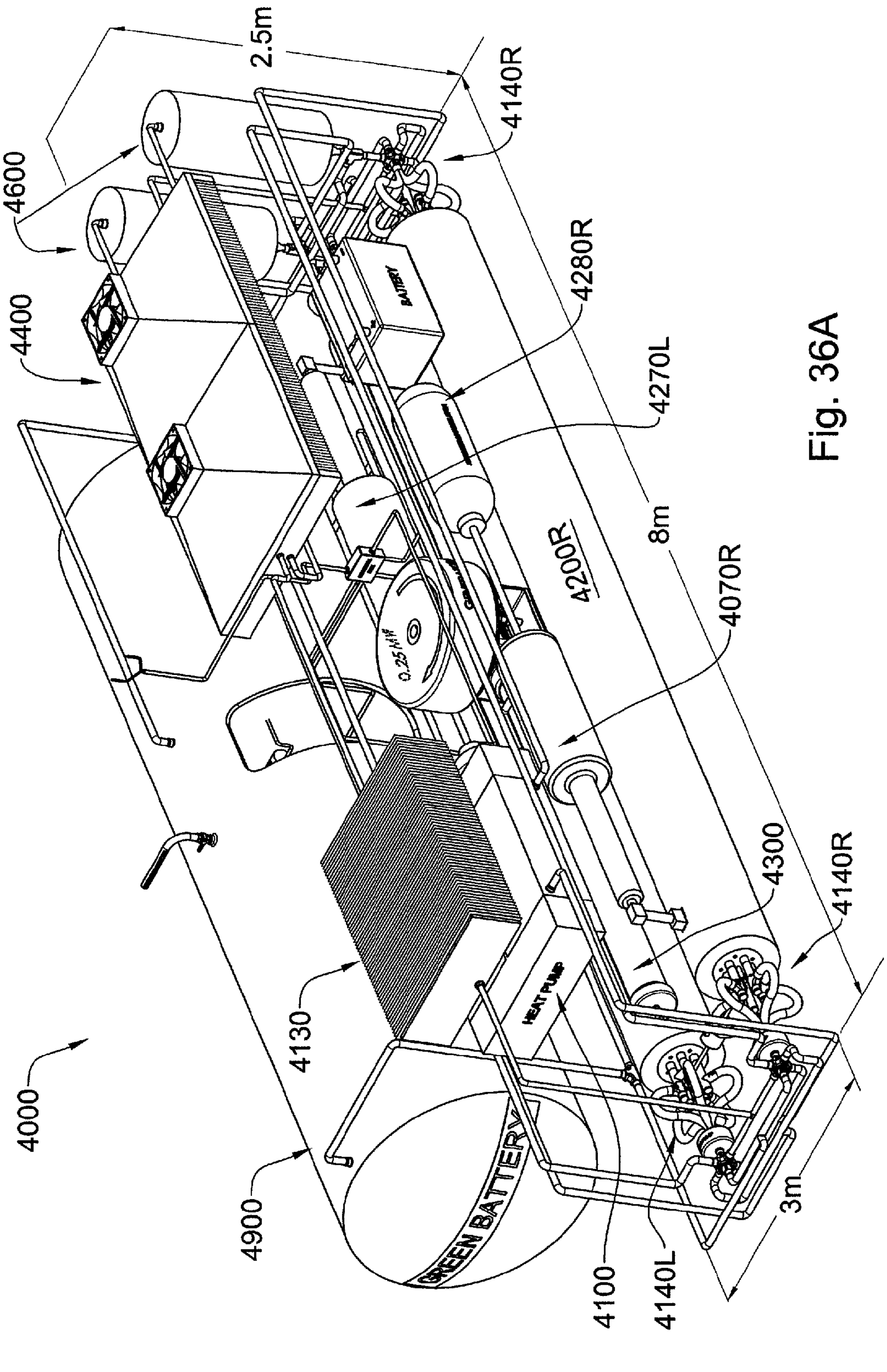
FIGS. 36A and 36B are respective schematic isometric and side views of a generator according to still another example of the subject matter of the present application.
Figure 36B:
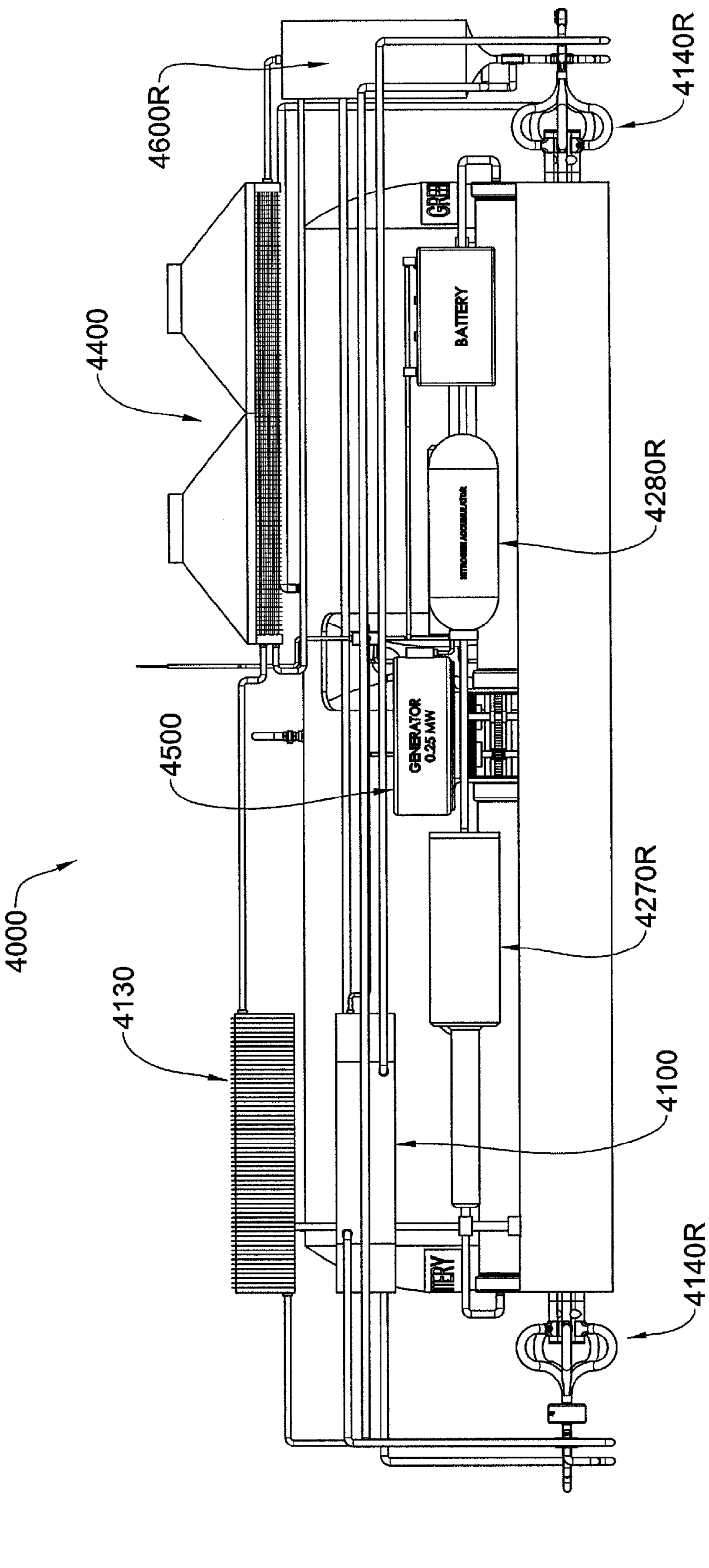
Figure 36C:
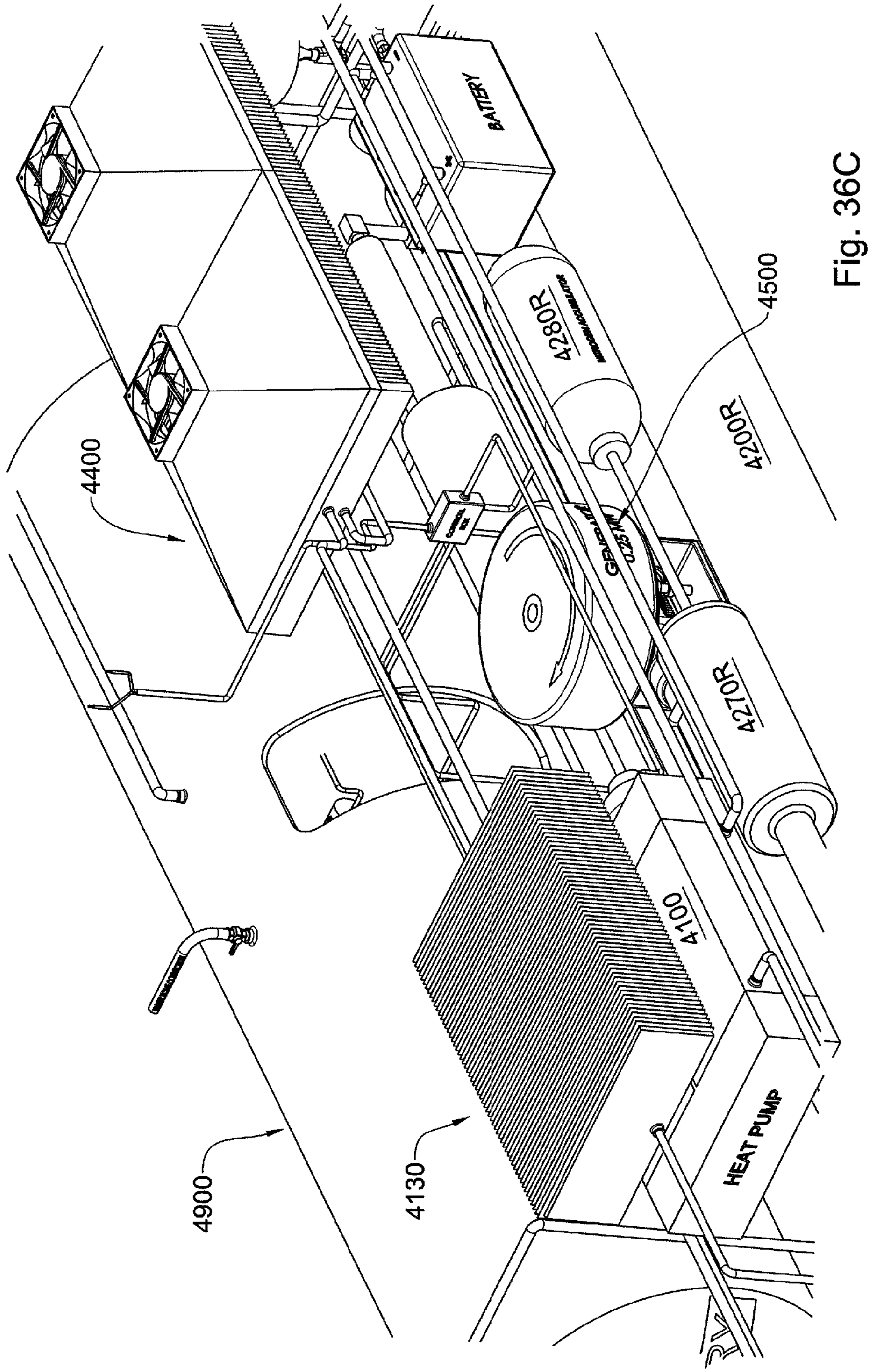
FIG. 36C is a schematic enlarged isometric view of the generator shown in FIGS. 36A and 36B.
Figure 36D:
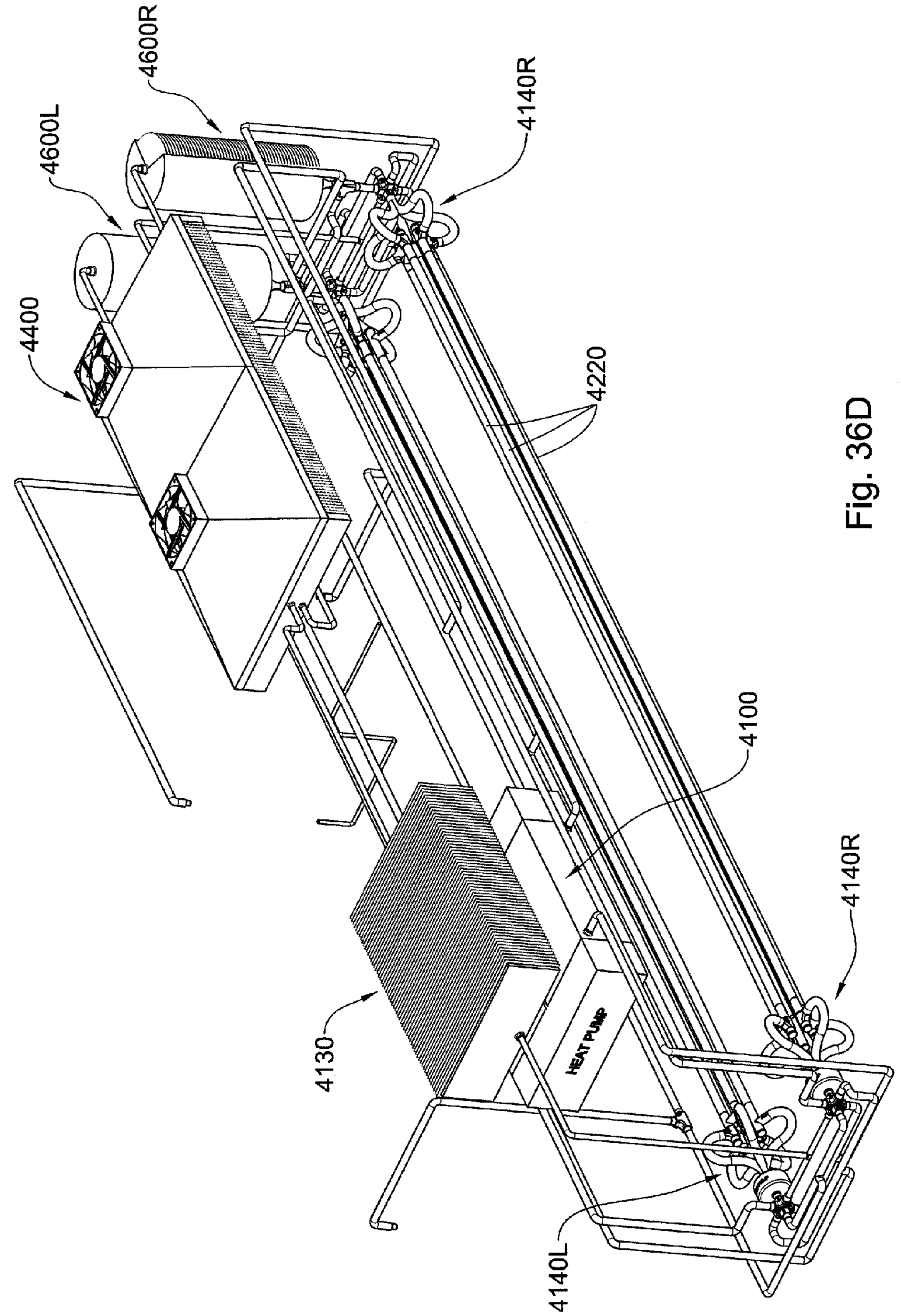
FIG. 36D is a schematic isometric view of the generator shown in FIGS. 36A and 36B, with the pressure vessels thereof being removed for clearer view.

With reference to FIG. 36A, it is observed that the generator 4000 comprises a work medium sub-system 4100, pressure vessels 4200, a generator assembly 4300, a radiator 4400, gradient tanks 4600L, 4600R and an accumulator arrangement 4900.

Figure 37A:
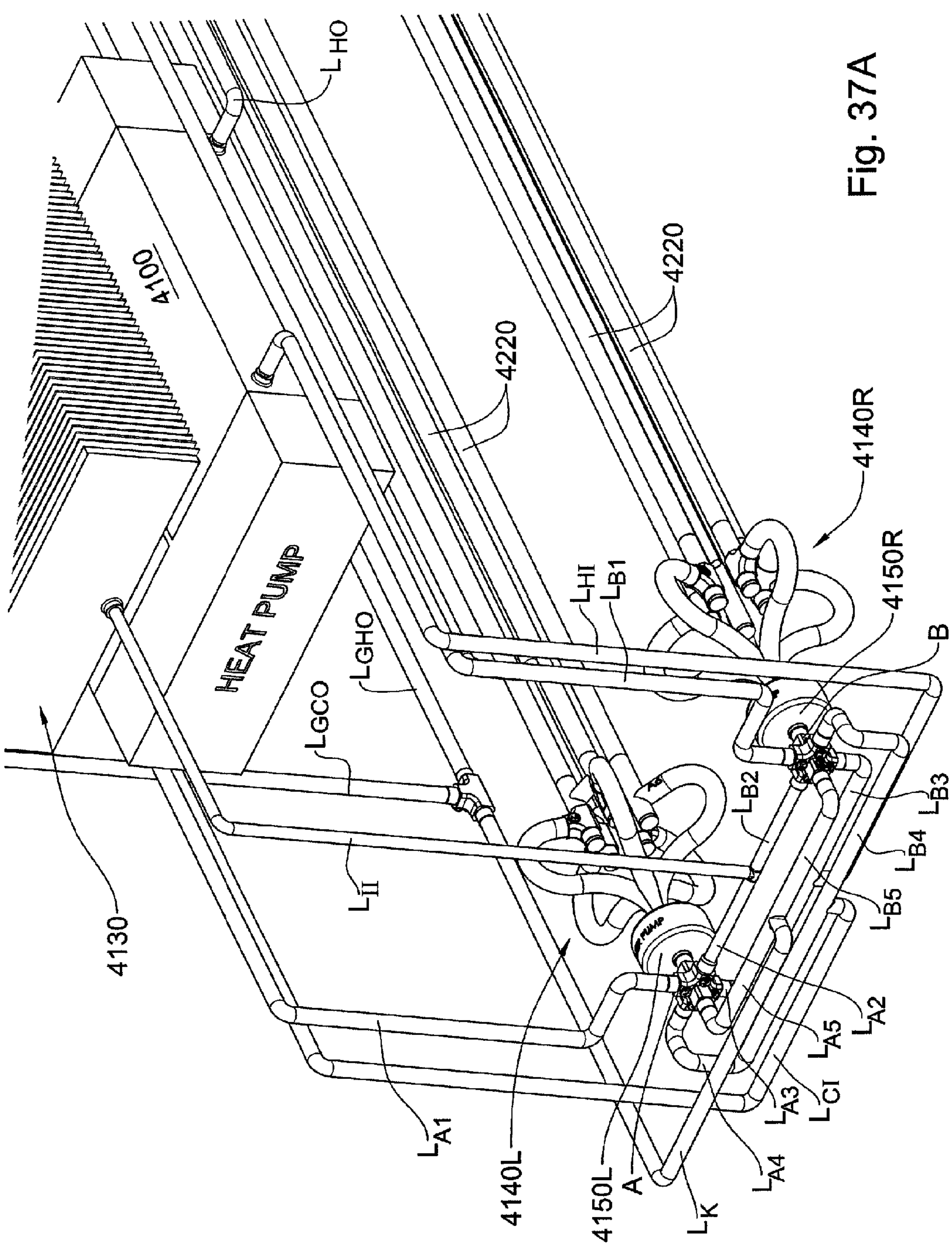
FIG. 37A is a schematic enlarged isometric view of the piping junction shown in FIG. 36D.
Figure 37B:
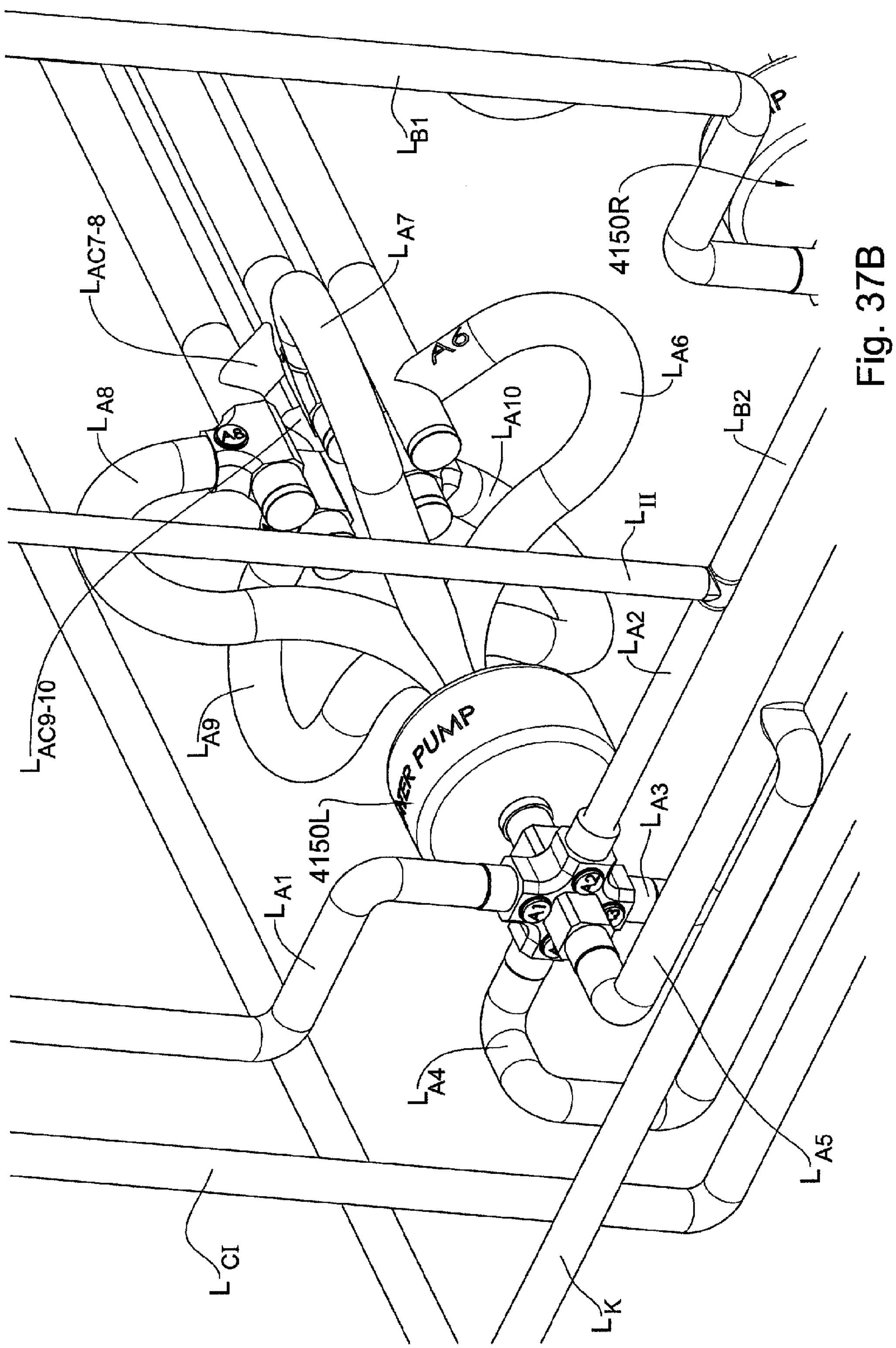
FIG. 37B is a schematic further enlarged isometric view of a front right side of the piping junction shown in FIG. 37A
Figure 37C:
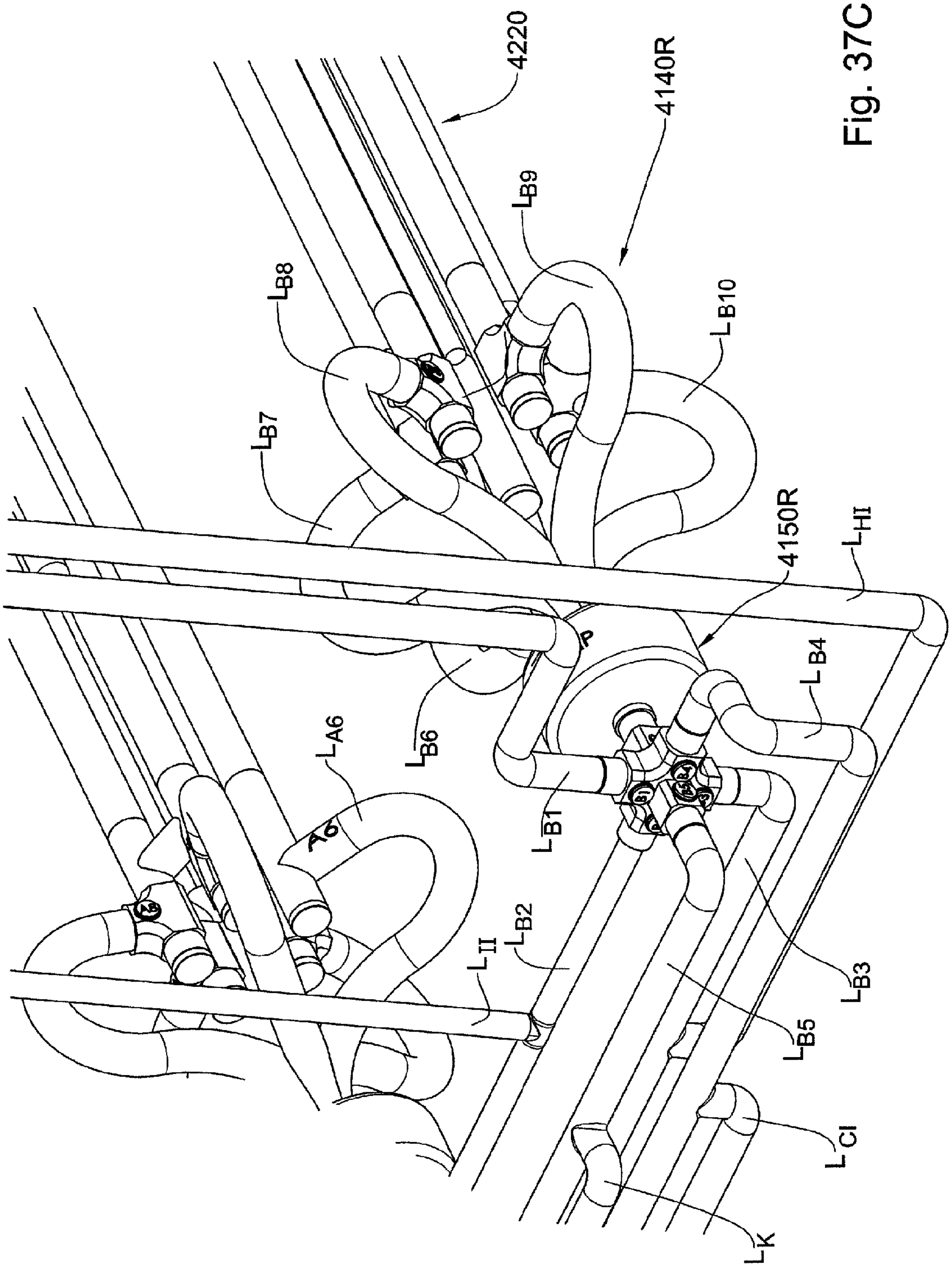
FIG. 37C is a schematic further enlarged isometric view of a front left side of the piping junction shown in FIG. 37A.
Figure 37D:
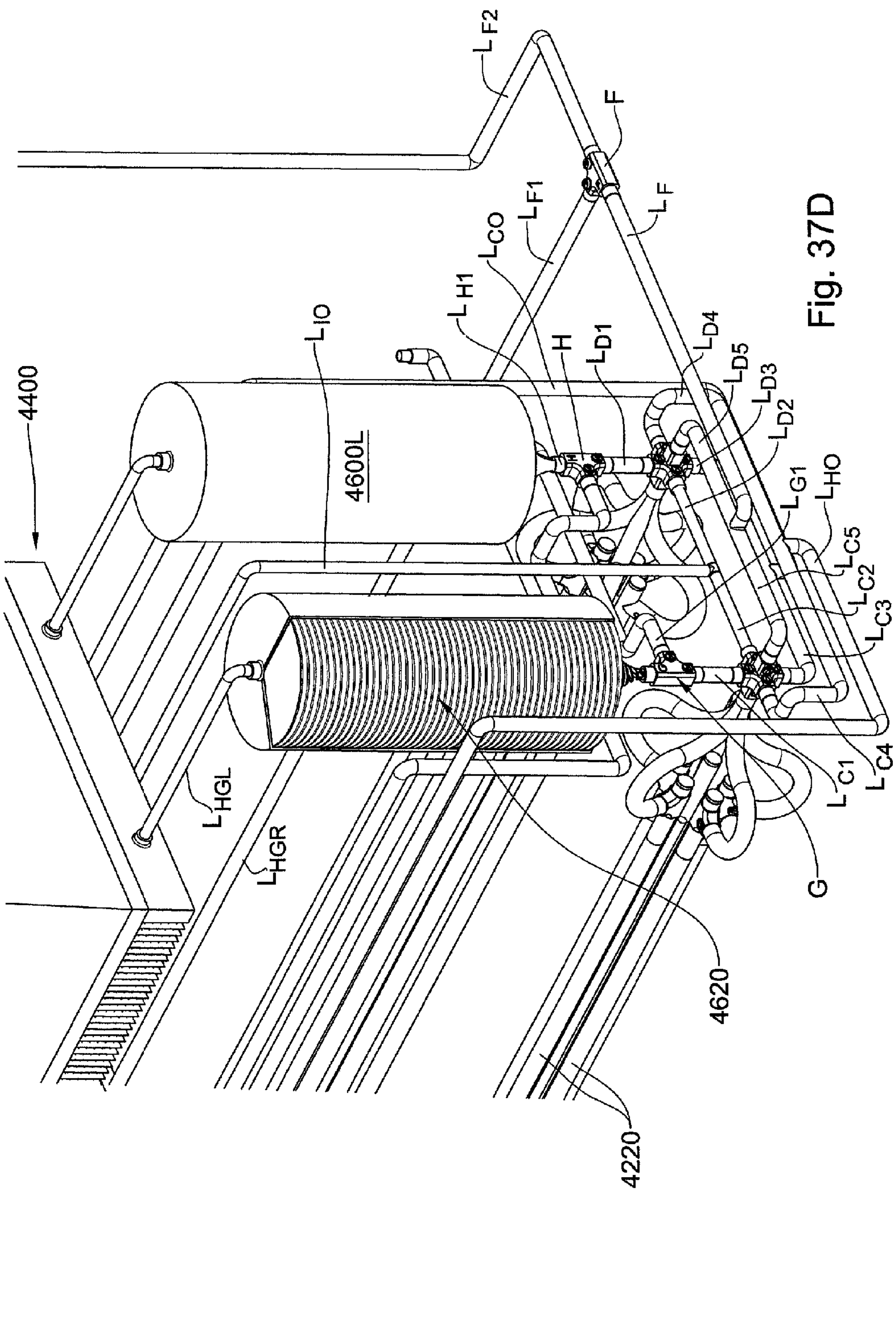
FIG. 37D is a schematic isometric view of a rear-end of the generator shown in FIGS. 36A and 36B.
Figure 37E:
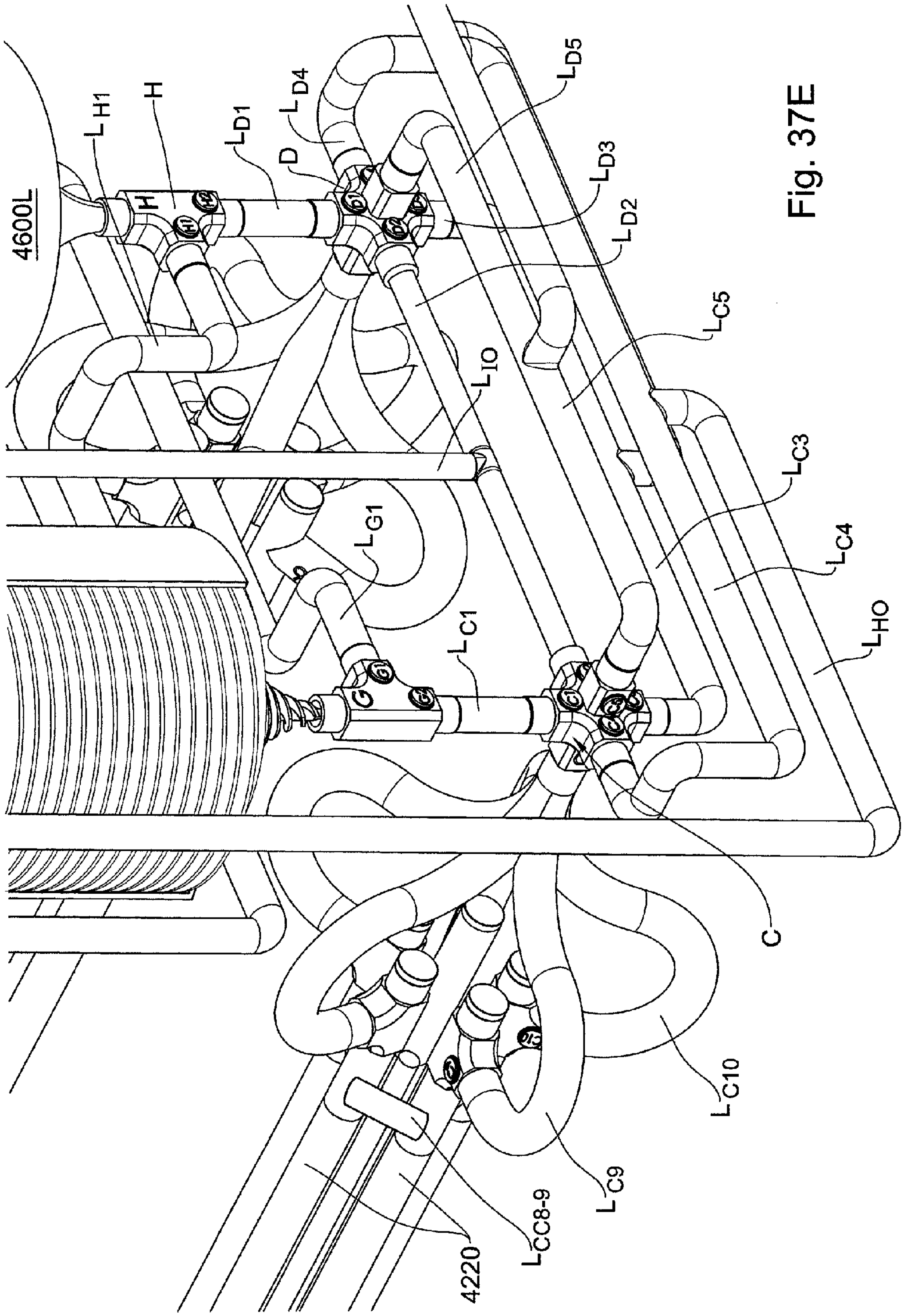
FIG. 37E is a schematic enlarged isometric view of the piping junction shown in FIG. 37C.

Turning now to FIGS. 37A to 37D, the generator 4000 comprises four core distribution arrangements 4140L, 4140R (two of each), each pressure vessel 4200 being fitted with a core distribution arrangement 4140L, 4140R at each end thereof. It is noted that each of the pressure vessels 4200L, 4200R comprises five cores 4220, and each of the valves 4140L, 4140R is connected to the cores 4220 via five distribution lines (e.g. $L_{A6}$ to $L_{A10}$ for the front end of the left pressure vessel 4200L as shown in FIG. 37B), and five corresponding regulator valves (e.g. $A_6$ to $A_{10}$).

It is also noted that the cores 4220 of each pressure vessel 4200L, 4200R are inter-connected to form a single flow path via connectors (e.g. $L_{AC7\text{-}8}$ and $L_{AC9\text{-}10}$ for the front end of the left pressure vessel 4200L as shown in FIG. 37B and $L_{DC8\text{-}9}$ and $L_{DC10\text{-}6}$ for the rear end of the left pressure vessel 4200L).

The distribution arrangements 4140L, 4140R and the regulator valves are design to allow selective parallel/linear flow through the cores 4220. In other words, the cores 4200 can operate in parallel, i.e. unidirectional flow of work medium through all cores 4220 from one end of the pressure vessel 4200 to the other, or alternatively, form a single (and considerably long) flow path through which the work medium progresses.

As will become apparent with respect to operation of the generator 4000, it can be beneficial, at certain stages of operation thereof to use a parallel flow configuration, while during other stage is can be beneficial to use a linear flow configuration.

The different stages of operation of the generator will now be described with reference to FIGS. 37A to 37D. The steps are provided below starting from an initial position of the pressure vessels 4200L, 4200R in which the pressure medium within the right pressure vessel 4200R has reached its maximal temperature (e.g. 42.5° C.), while the pressure medium within the left pressure vessel 4200L has reached its minimal temperature (e.g. 7.5° C.). The stages will be described below with respect to the right pressure vessel 4200R, understanding that the same applies to the left pressure vessel 4200L at a phase shift:

High temperature energy absorption and storage: Intermediate temperature work medium (e.g. 25° C.) flows from the intermediate temperature reservoir via line $L_{II}$ into valve B: enter via B2, exit via B into pump 4150R and through there to the distribution arrangement 4140R into line $L_{B6}$=>pass through all cores (linear flow configuration)=> exit cores via line $L_{C10}$ and into valve C: enter via C, exit via C1 and line $L_{C1}$=>into valve G: enter via G2 into the gradient tank. Water previously stored in the gradient tank will be pushed through line $L_{HGL}$ (shown FIG. 37D) and back into the intermediate reservoir 4130 through the radiator 4400. At this point, the hottest portion of the intermediate work medium in the gradient tank 4600R (top of the tank) can be about 40° C. and the coldest portion of the intermediate work medium in the gradient tank 4600R (bottom of the tank) can be about 27.5° C. The temperature of the pressure medium at this point can be about 30° C.

High temperature energy recovery: Intermediate temperature work medium flows from the gradient tank 4600R into valve G: enter via G, exit via G1 and line $L_{G1}$ ($L_{A1}$) into valve A: enter via A1, exit via A and into pump 4150L and through there to the distribution arrangement 4140L into line $L_{A6}$=>pass through all cores (linear flow configuration)=> exit cores via line $L_{D10}$ and into valve D: enter via D, exit via D2 and line $L_{D2}$=>into the radiator unit and back to the gradient tank 4600L. During this step, the work medium in the right gradient tank 4600R gradually heats the pressure medium in the left pressure vessel 4200L while the intermediate work medium in the left gradient tank 4600L (ranging between about 22.5° C. to 10° C.) gradually cools the pressure medium in the right pressure vessel 4200R to about 15° C.

Substantial cooling: low temperature work medium (e.g. 0° C.) flows from the low temperature reservoir via line La into valve B: enter via B4, exit via B into pump 4150R and through there to the distribution arrangement 4140R into line $L_{B6}$=>pass through all cores simultaneously (parallel flow configuration)=>exit cores via all line $L_{C6-10}$ and into valve C: enter via C, exit via C3 and line $L_{C3}$=>back into the low temperature reservoir 4120, optionally through the radiator 4400 (even partly). This can reduce the temperature of the pressure medium in the right pressure vessel 4200R to about 7.5° C.

low temperature energy absorption and storage: Intermediate temperature work medium (e.g. 25° C.) flows from the intermediate temperature reservoir via line $L_{II}$ into valve B: enter via B2, exit via B into pump 4150R and through there to the distribution arrangement 4140R into line $L_{B6}$=>pass through all cores (linear flow configuration)=>exit cores via line $L_{C10}$ and into valve C: enter via C, exit via C1 and line $L_{C1}$=>into valve G: enter via G2 into the gradient tank. Water previously stored in the gradient tank will be pushed through line $L_{HGL}$ (shown FIG. 37C) and back into the intermediate reservoir 4130 through the radiator 4400. At this point, the coldest portion of the intermediate work medium in the gradient tank 4600R (top of the tank) can be about 10° C. and the hottest portion of the intermediate work medium in the gradient tank 4600R (bottom of the tank) can be about 22.5° C. The temperature of the pressure medium at this point can be about 20° C.

low temperature energy recovery: Intermediate temperature work medium flows from the gradient tank 4600R into valve G: enter via G, exit via G1 and line $L_{G1}$ ($L_{A1}$) into valve A: enter via A1, exit via A and into pump 4150L and through there to the distribution arrangement 4140L into line $L_{A6}$=>pass through all cores (linear flow configuration)=> exit cores via line $L_{D6-10}$ and into valve D: enter via D, exit via D2 and line $L_{D2}$=>line $L_{IO}$ into the radiator unit and back to the gradient tank 4600L. During this step, the work medium in the left gradient tank 4600L gradually heats the pressure medium in the right pressure vessel 4200R to about 35° C. while the intermediate work medium in the right gradient tank 4600R (ranging between about 22.5° C. to 10° C.) gradually cools the pressure medium in the left pressure vessel 4200L to about 15° C.

Substantial heating: high temperature work medium (e.g. 50° C.) flows from the high temperature reservoir 4110 via line $L_{HI}$ into valve B: enter via B3, exit via B into pump 4150R and through there to the distribution arrangement 4140R into line $L_{B6}$=>pass through all cores simultaneously (parallel flow configuration)=>exit cores via line $L_{C10}$ and into valve C: enter via C, exit via C4 and line $L_{C4}$=>back into the high temperature reservoir 4110 optionally through the radiator 4400 (even partly). This can increase the temperature of the pressure medium in the right pressure vessel 4200R to about 42.5° C.

Each of the above described six steps can last for a predetermined amount of time, e.g. five seconds. However, under other arrangements, it can be beneficial that each steps lasts for a different period of time.

In order to control the operation of the generator, a controller can be provided which is configured to monitor any one of the following:

Flow rate through the piping of the generator 4000;

The operational mode of the valve (which are open/closed, parallel/linear configuration etc.); and The duration of each step.

Figure 38:
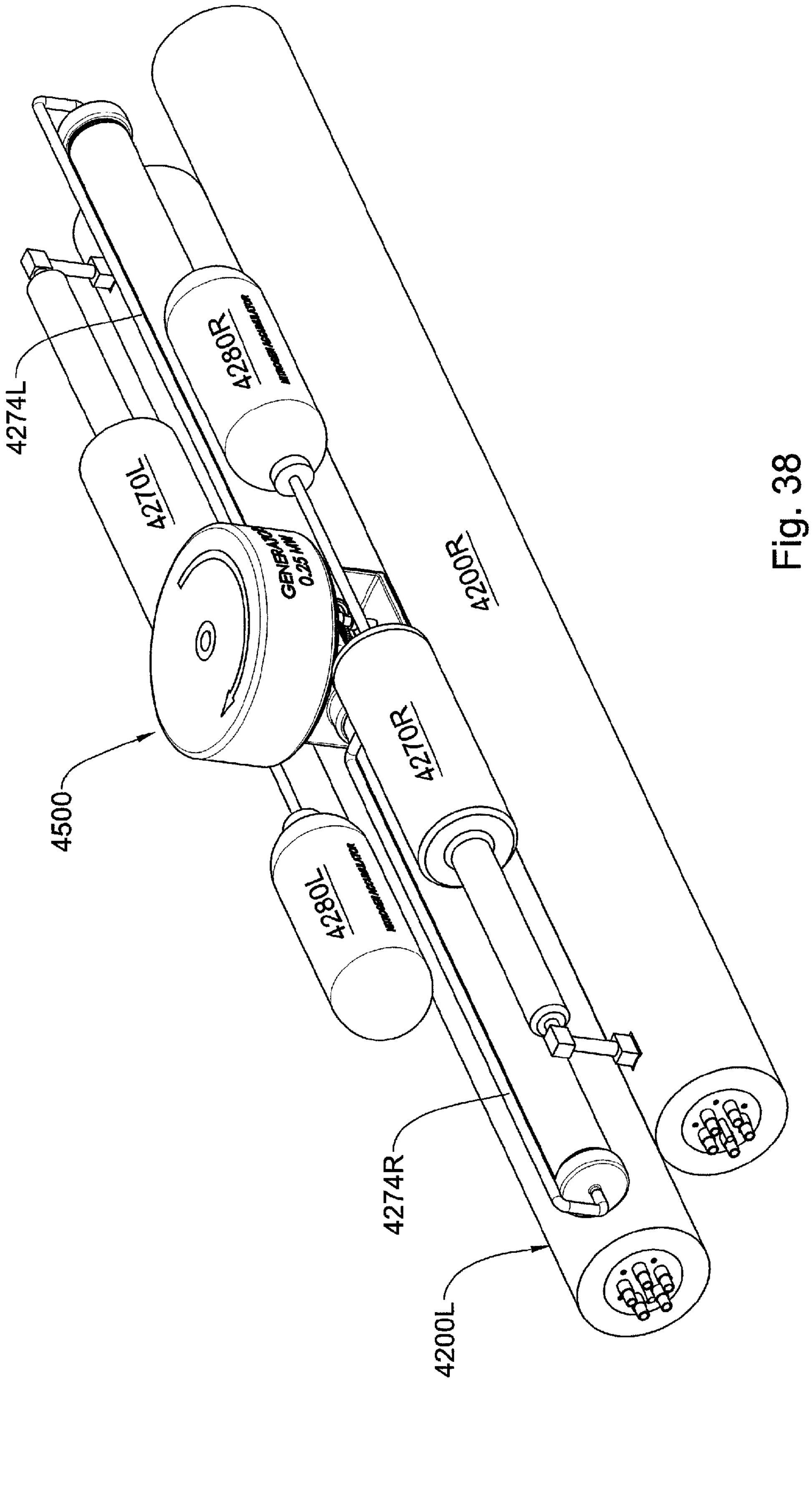
FIG. 38 is a schematic isometric view of the pressure system used in the generator shown in FIGS. 36A and 36B.

With reference being drawn to FIG. 38, the generator 4000 comprises a pressure system which is similar to that previously described with respect to the generator 3000. Each pressure vessel 4200L, 4200R is fitted with a work piston 4270L, 4270R and a compensation piston 4280L, 4280R respectively. Each of the work pistons 4270L, 4270R is attached via lines 4274L, 4274R to the housing of the gear mechanism 4300, so as to eventually cause reciprocation of the rack 4320 (shown FIG. 47) therein.

Figure 39:
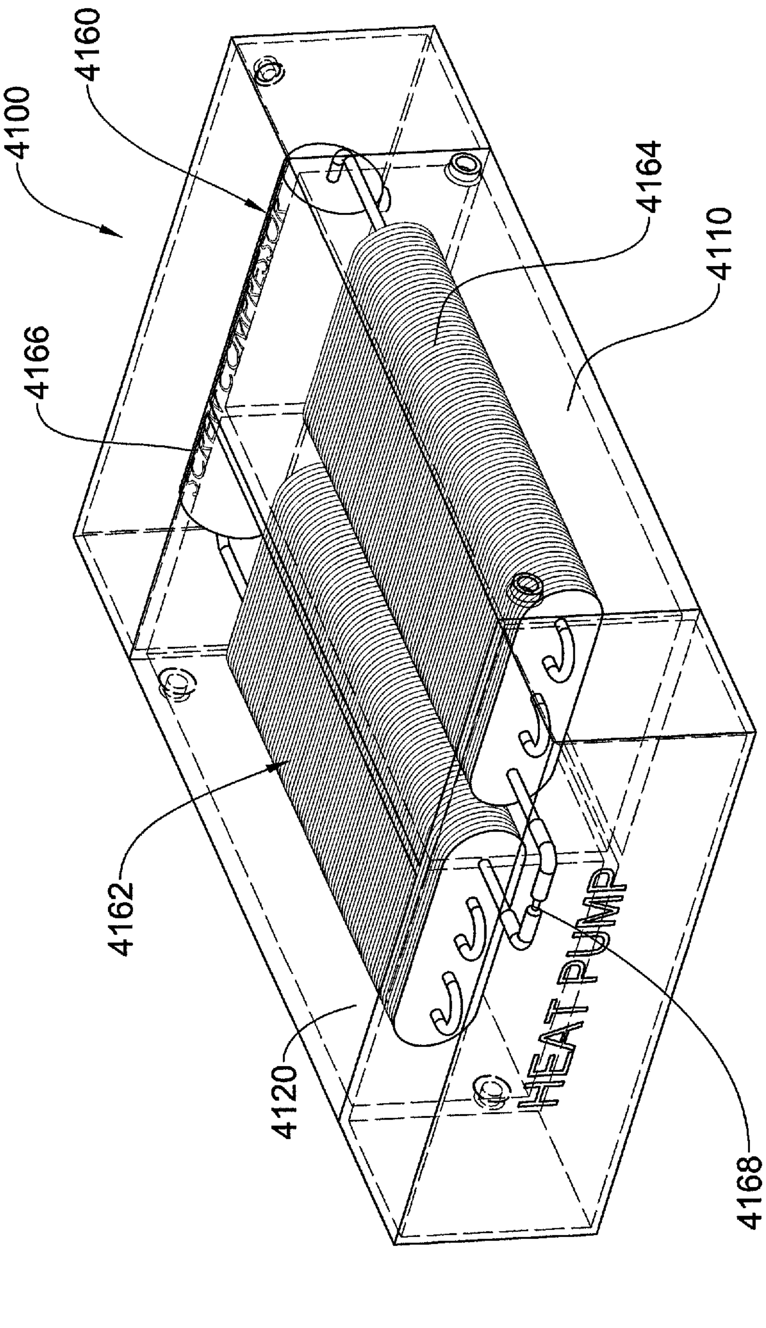
FIG. 39 is a schematic isometric view of a heat pump used in the generator shown in FIGS. 36A and 36B.
Figure 40A:
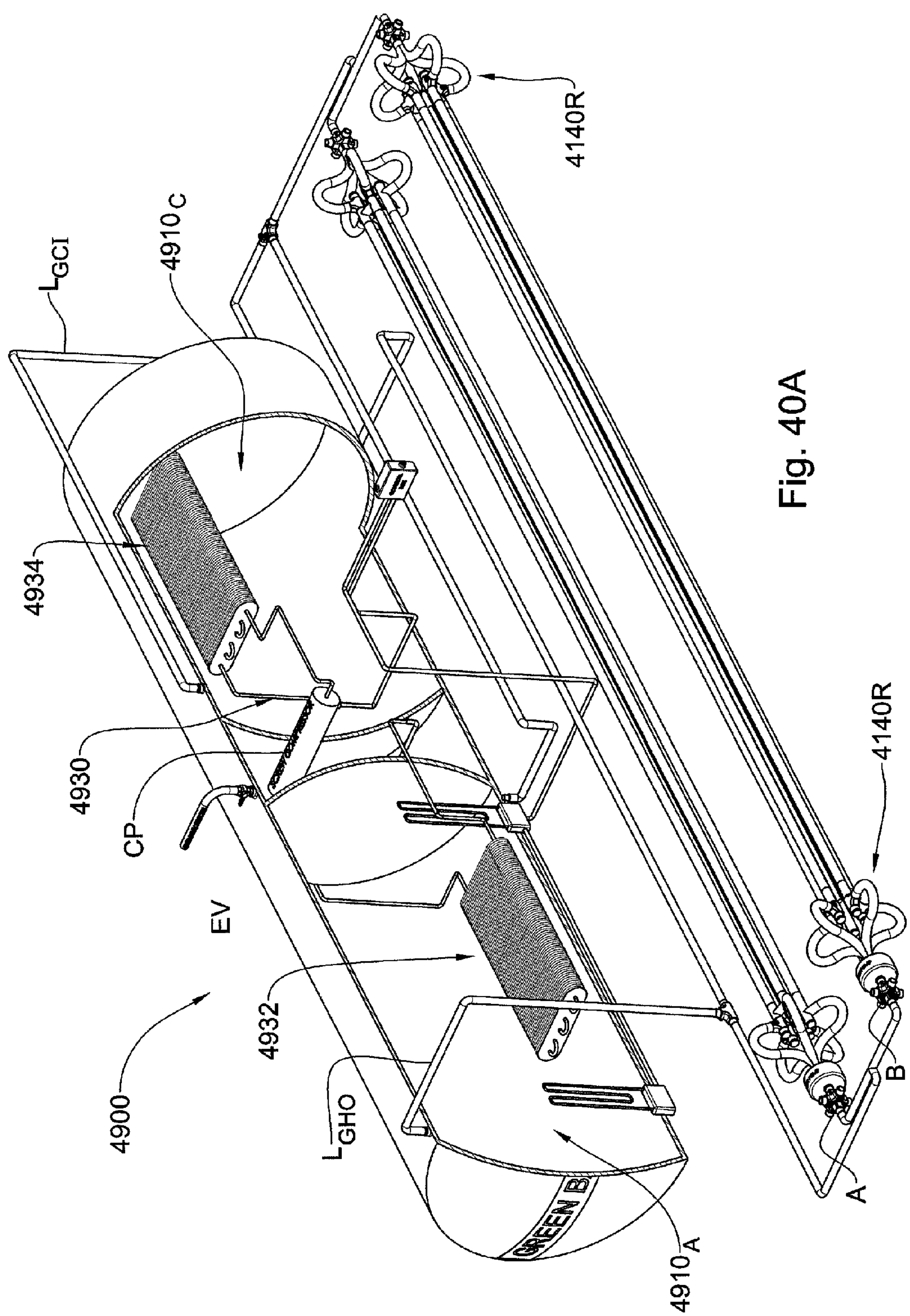
FIG. 40A is a schematic isometric view of an accumulator arrangement used in the generator shown in FIGS. 36A to 36D.
Figure 40B:
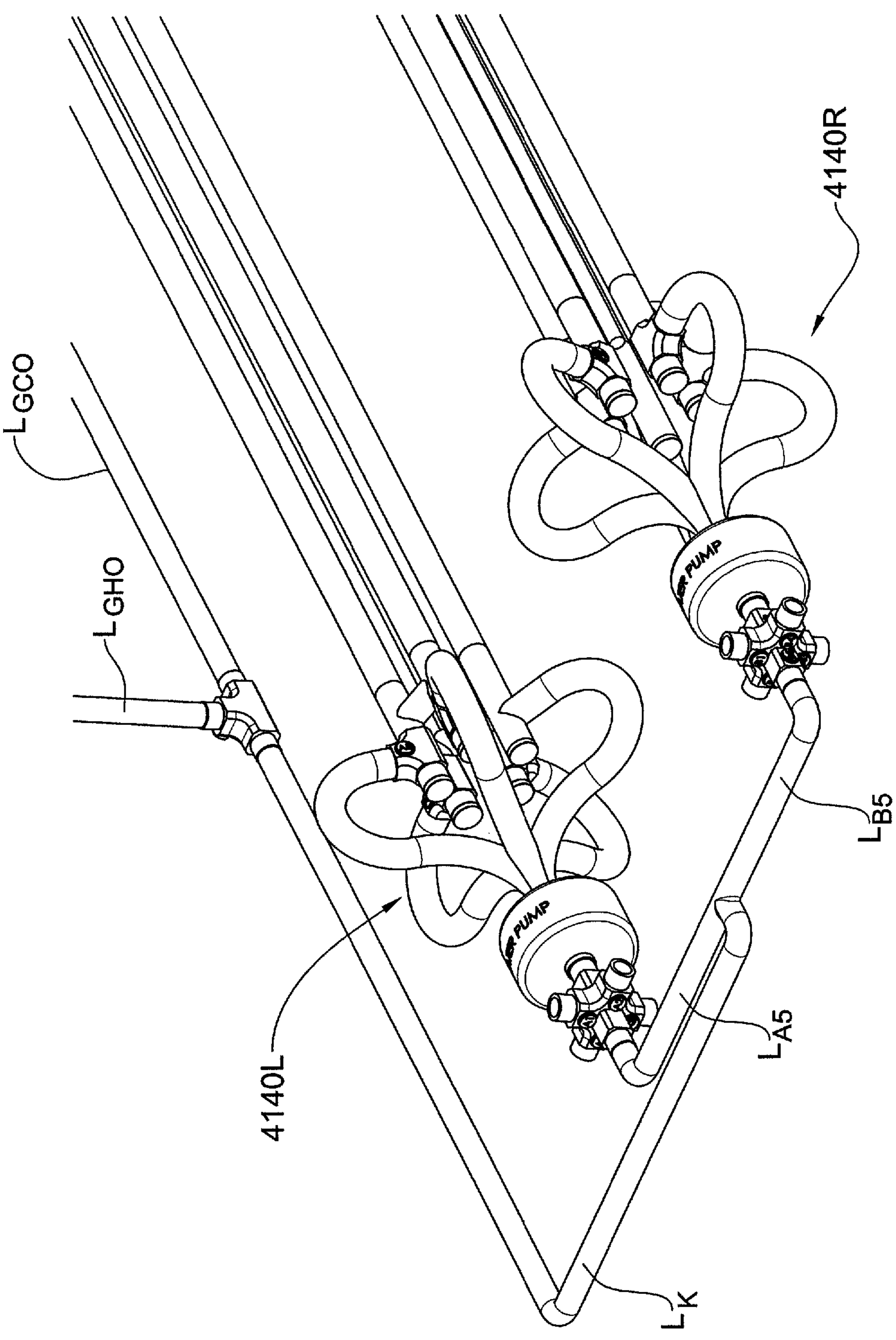
FIG. 40B is an enlarged view of a piping system of the accumulator arrangement shown in FIG. 40A.
Figure 40C:
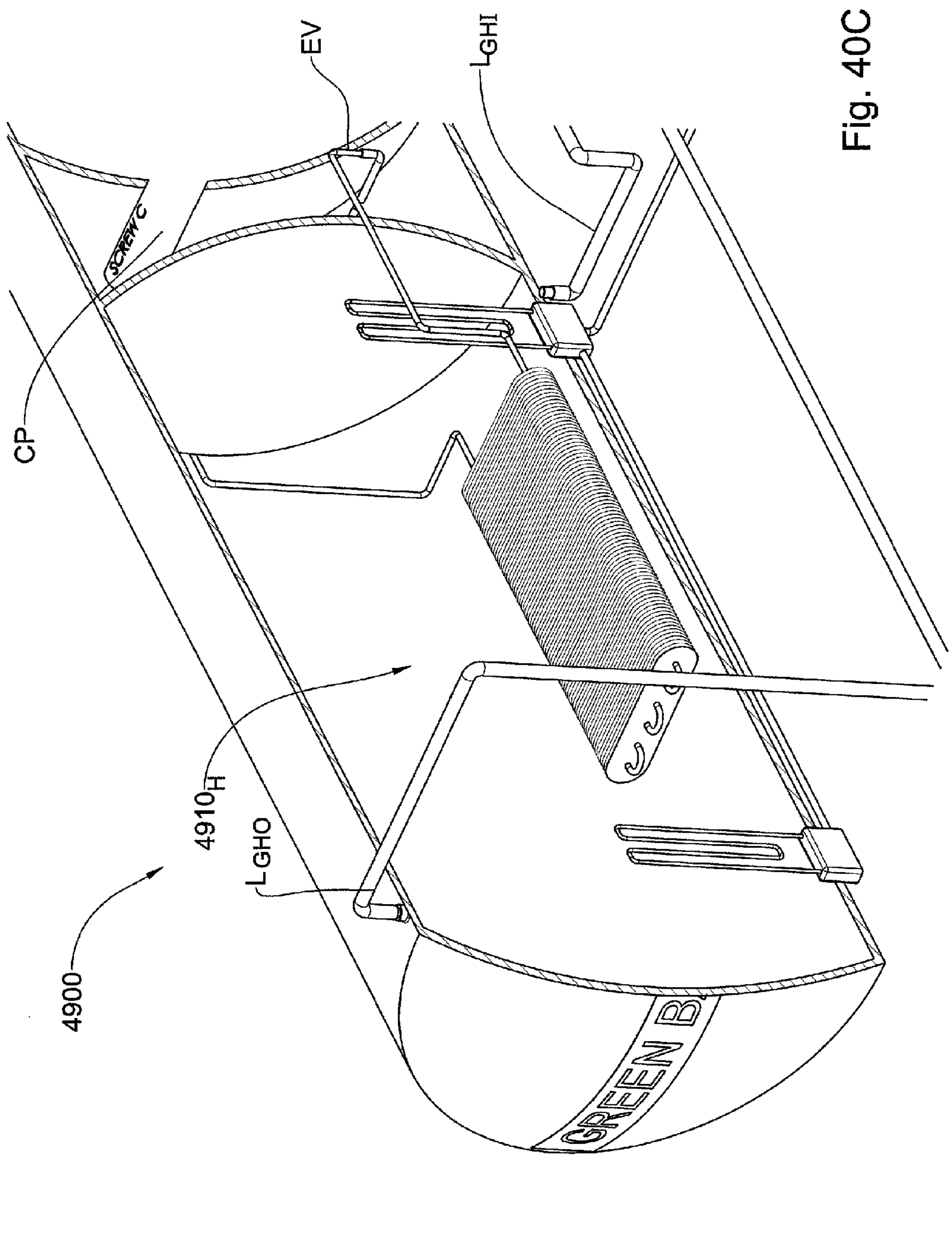
FIGS. 40C and 40D are schematic enlarged isometric views of compartments of the accumulator arrangement shown in FIG. 40A.
Figure 40D:
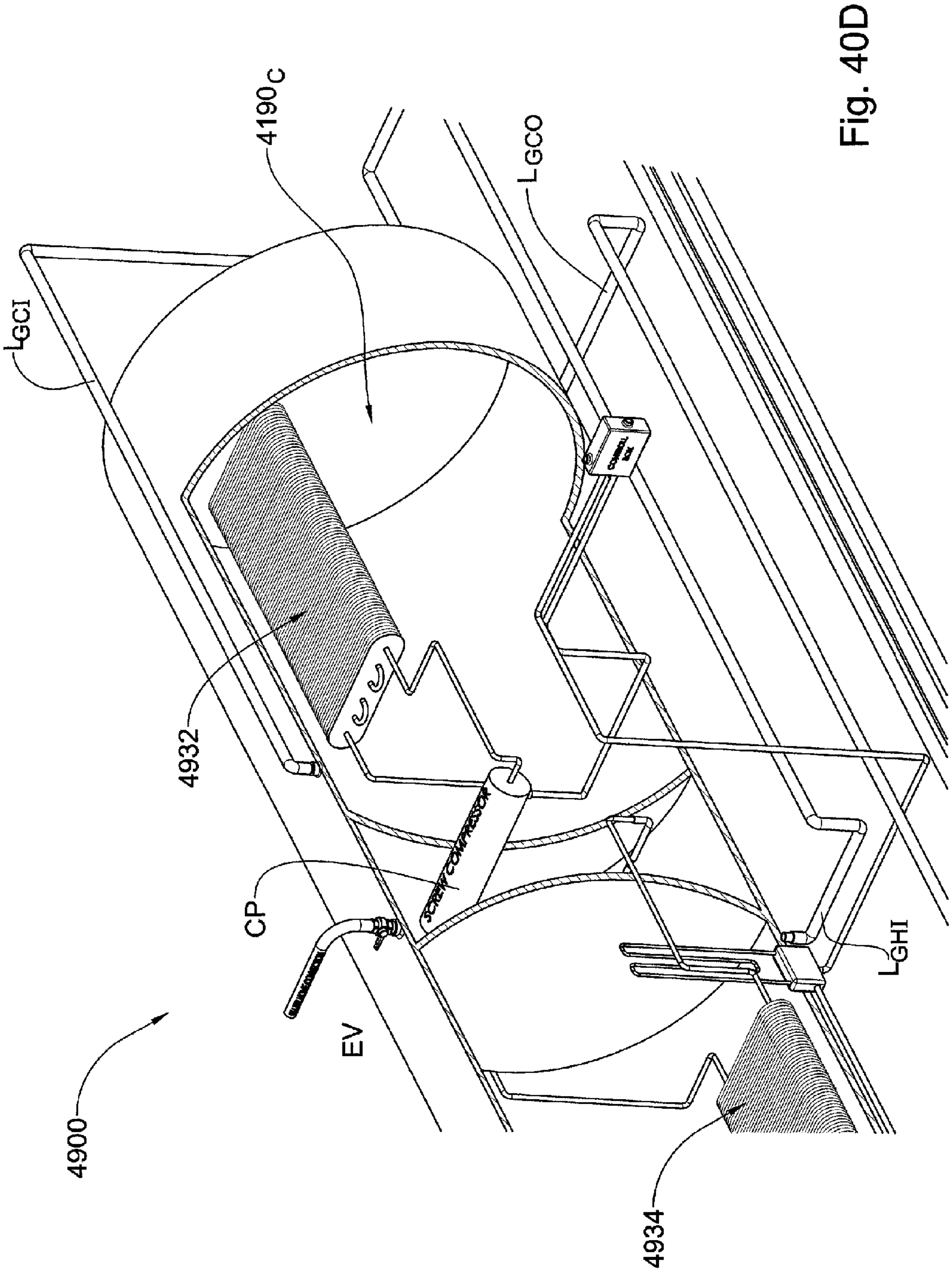
Figure 41A:
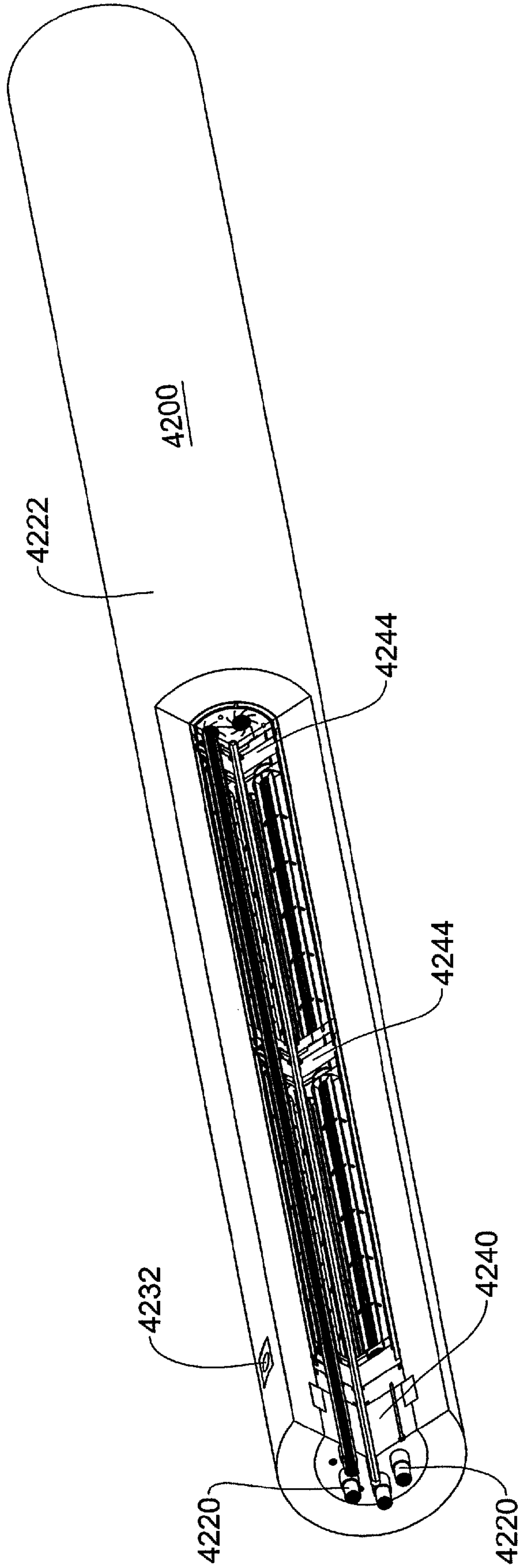
FIG. 41A is a schematic isometric view of a single cylinder used in the generator shown in FIGS. 36A and 36B.
Figure 41B:
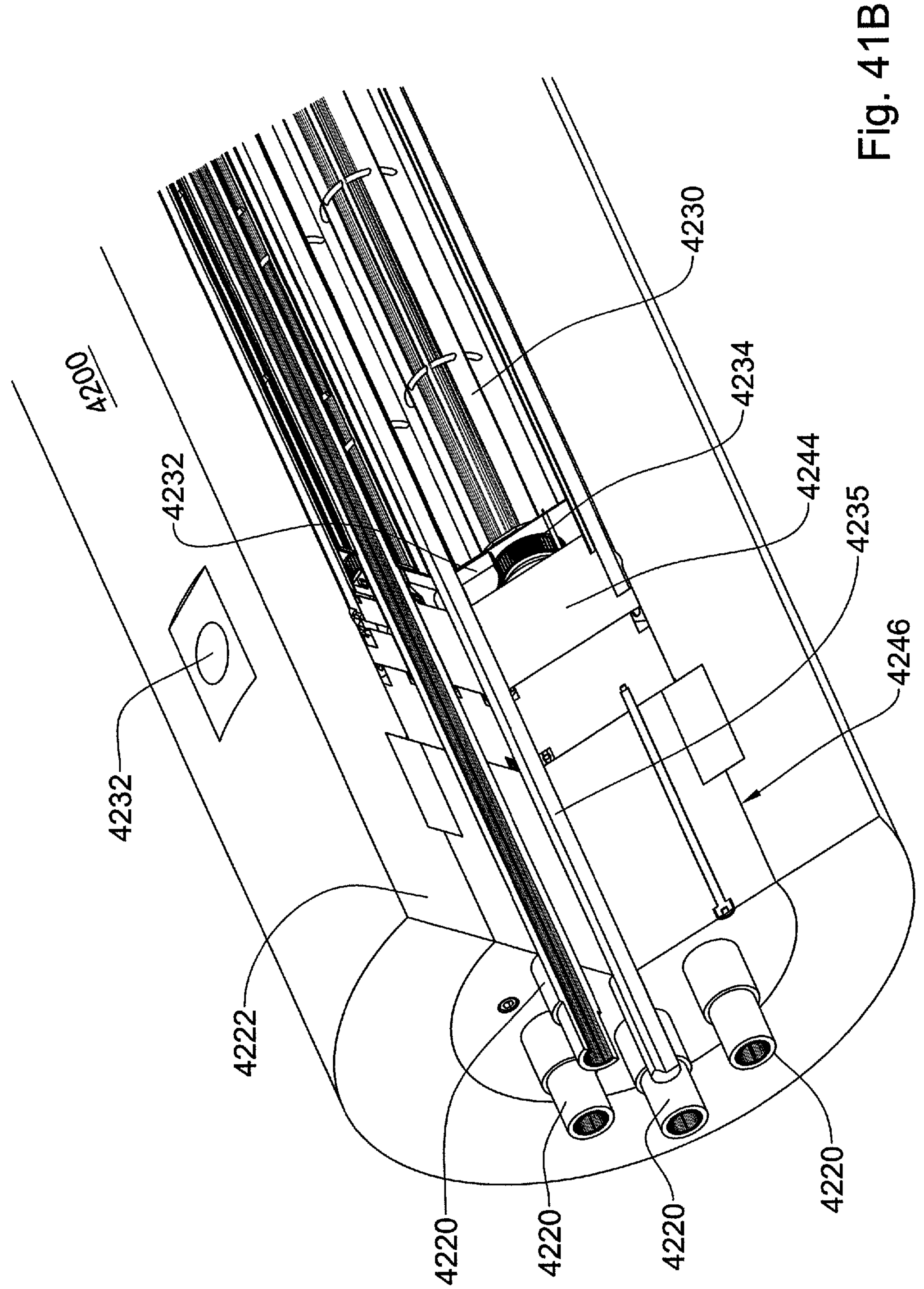
FIG. 41B is a schematic isometric enlarged view of a front end of the cylinder shown in FIG. 41A.
Figure 41C:
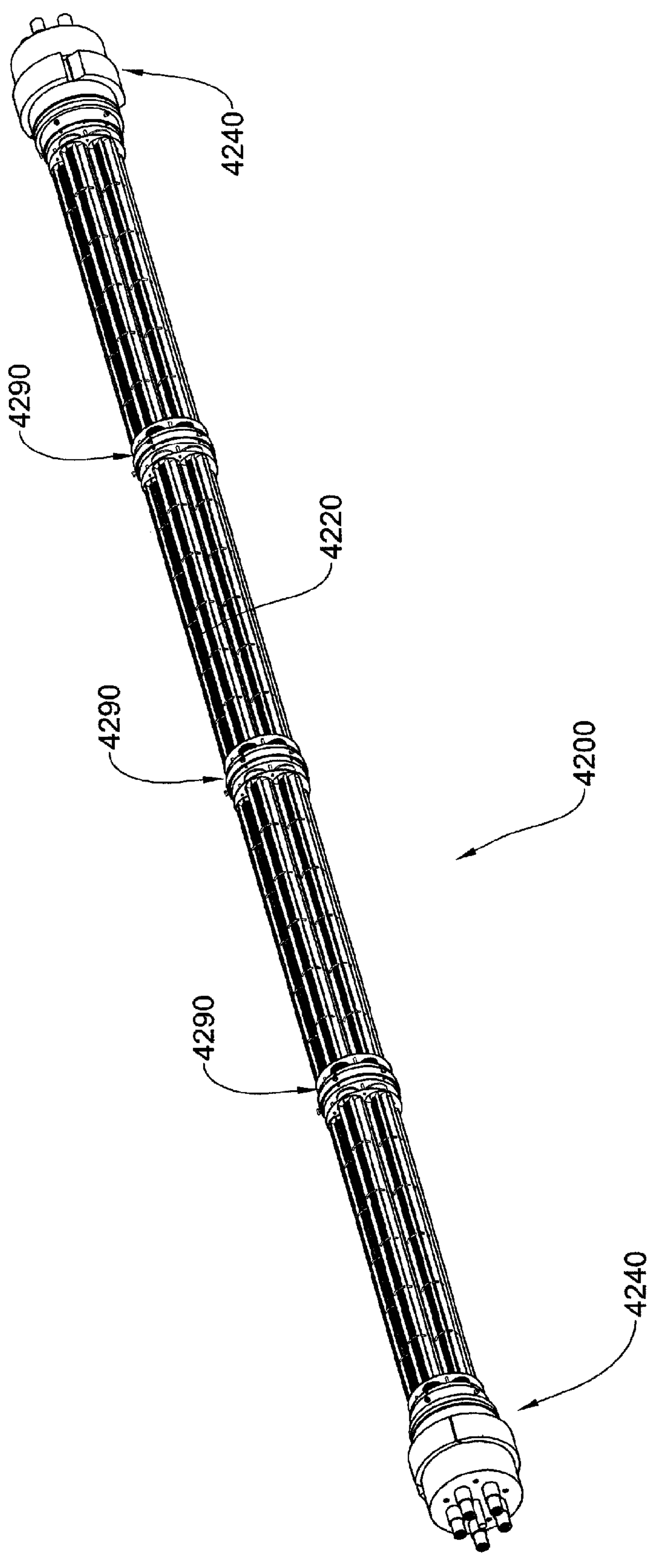
FIG. 41C is a schematic isometric view of the single cylinder shown in FIG. 41A, with a housing thereof being removed.
Figure 41D:
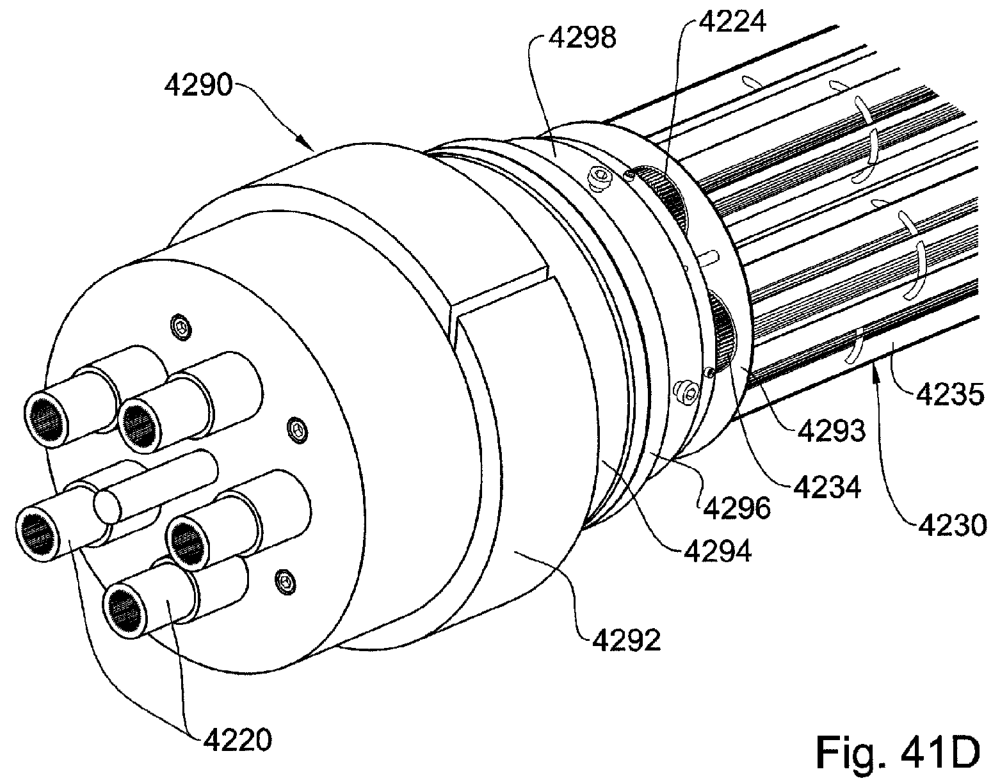
FIG. 41D is a schematic isometric enlarged view of a front end of the cylinder shown in FIG. 41C.
Figure 41E:
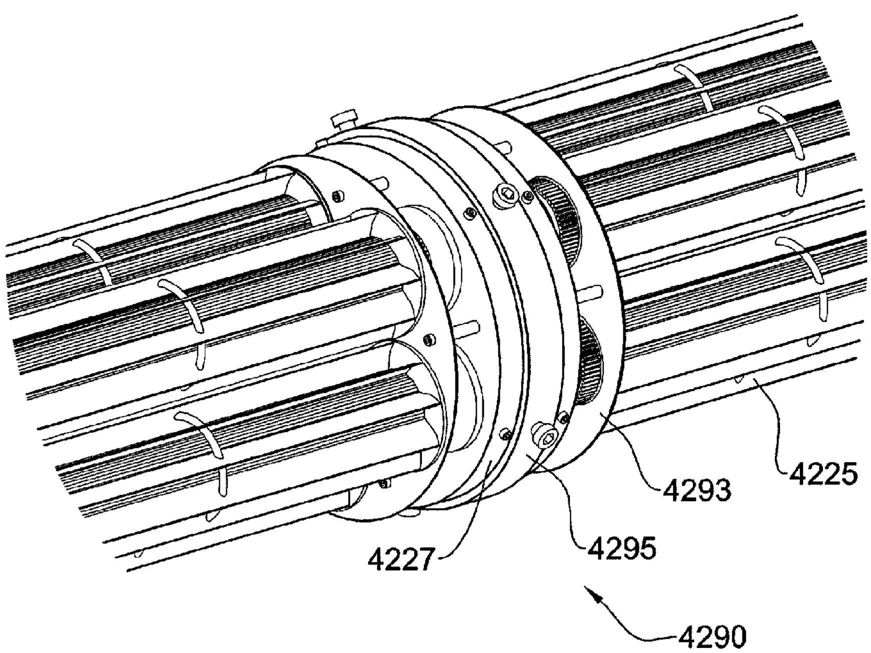
FIG. 41E is a schematic isometric enlarged view of a mid-portion of the cylinder shown in FIG. 41C.

Turning to FIG. 39, a work medium sub-system 4100 is shown being in the form of a heat pump which is generally similar to the sub-system 3100 previously described, with the difference being that it does not make use of four different compressors but rather a single screw compressor which can operate under varying compression ratios and power consumption, and being thus able to adjust its operation to the conditions of the environment.

Turning now to FIGS. 40A to 40D, the generator 4200 further comprises an accumulator arrangement 4900, which is similar in purpose to the accumulator arrangement 3900 previously described. However, it is observed that the accumulator arrangement 4900 comprises a high temperature compartment $\mathbf{4910}_H$ and a low temperature compartment 4910, and is connected to an auxiliary heat pump 4930 of which the condenser end 4932 is located in the first compartment $\mathbf{4910}_H$ and the evaporator end 4934 is located in the first compartment $\mathbf{4910}_C$.

In particular, each of the compartments $\mathbf{4910}_H$, $\mathbf{4910}_C$, has a respective inlet GHI, GCI and outlet GHO, GCO, to which corresponding inlet and outlet lines $L_{GHI}$, $L_{GCI}$, $L_{GHO}$, $L_{GCO}$ are attached respectively. It is observed that the outlet GHO is located at a top end of the compartment $\mathbf{4910}_H$, while the inlet GHI is located at a bottom end of the compartment $\mathbf{4910}_H$. In contrast, the outlet GCO is located at a bottom end of the compartment $\mathbf{4910}_C$, while the inlet GCI is located at a top end of the compartment $\mathbf{4910}_C$.

The above arrangement allows for withdrawing high temperature work medium from a high temperature zone of the high temperature compartment $\mathbf{4910}_H$, and returning the work medium to a low temperature zone of the high temperature compartment $\mathbf{4910}_H$. Correspondingly, this arrangement allows withdrawing low temperature work medium from a low temperature zone of the low temperature compartment $\mathbf{4910}_C$, and returning the temperature work medium to a high temperature zone of the low temperature compartment 4910.

Thus, some of the energy provided by the generator can selectively be provided to the auxiliary heat pump 4930 instead of simple heaters (as in the previously described example), thereby providing not only an auxiliary high temperature reservoir at 4910H, but also yielding a low temperature reservoir at $\mathbf{4910}_C$.

In operation, once the auxiliary work medium in the compartments $\mathbf{4910}_H$ and $\mathbf{4910}_C$ reaches temperatures which are similar to those of the high/low temperature reservoirs respectively, it can be used in operation of the generator while the main heat pump temporarily ceases its operation.

In addition, the high temperature compartment $\mathbf{4910}_H$ is provided with heaters which are configured for directly heating the storage fluid contained within the compartment $\mathbf{4910}_H$. It is appreciated that during operation of the auxiliary heat pump 4930, the storage medium within the high/low temperature compartment can reach a heating/cooling limit (i.e. reaching a maximal/minimal temperature limit). In such an event, the operation of the auxiliary heat pump 4930 can be interrupted, and heater are then used to further heat the storage medium in the high temperature compartment $\mathbf{4910}_H$.

Under the above arrangement, once the auxiliary heat pump 4930 is interrupted, the work medium in the high temperature compartment $\mathbf{4910}_H$ can be used as a high temperature work medium, while the work medium in the low temperature compartment $\mathbf{4910}_C$ is used as the low/intermediate work medium.

Turning now to FIGS. 41A to 41E, the structure of the pressure vessel 4200 and the cores therein will be described. The pressure vessel 4200 comprises and external housing 4222 accommodating therein the five cores 4220. The pressure vessel 4200 is also provided with a sealing arrangement comprising seals 4242, 4244 and 4246, configured for preventing leaks from the pressure vessel 4200, and maintaining a high pressure of the pressure medium, Each core 4220 is fitted, within the pressure vessel 4200 with a stirring assembly 4230, configured for revolving about the core 4220 for providing better mixing of the pressure medium and thereby a more efficient heat transfer between the pressure medium and the work medium flowing within the cores 4220 during operation of the generator 4200.

The stirring assemblies 4230 are generally similar to those previously described, and comprise a drive gear 4234 engaged with a center gear 4232 mounted on a central shaft 4235 and driven by an external motor.

It is also observed that since the pressure vessel 4200 is considerably long (its length is much greater than its nominal diameter), support arrangements 4290 are provided along the pressure vessel 4200 configured for supporting the cores 4220. In essence, these support arrangements 4290 comprise support discs 4293 formed with holes for receiving therethrough the cores 4220. Each such support arrangement 4290 is also fitted with sealing members 4295, 4297 for preventing any undesired leakage.

Reference is now made to FIGS. 42A to 45C, in which various examples of core structures are shown. It is noted that these examples show the structure of the front end of the core.

With particular reference being made to FIGS. 42A to 42E, a core 4220' is shown comprising a core body 4221' and a central core cavity 4222' accommodating a static flow axle.

It is observed that closer to the front end, the first portion 4223' of the flow axle is smooth and does not occupy the entire cross-section of the cavity 4222'. In addition, it is observed that the core body 4221' at the front portion is formed with a roughened surface 4226' only on an inner side thereof. To the contrary, the second portion 4224' of the flow axle is formed as a spiral occupying the entire cross-section of the cavity 4222'. In addition, it is observed that the core body 4221' at the second portion is formed with a roughened surface 4226' both on an inner and on an outer side thereof. It is also observed that the flow axle is hollow and is formed with inner channels $\mathbf{4223}_O$.

It is noted that the ridges formed with the roughened surface 4226' both on an inner and on an outer side thereof are aligned with one another, so that a peak of a ridge on the outer surface is aligned against a trough on the inner surface. This provides the core with a uniform thickness at any given cross-section taken perpendicular to an axis of the core.

One reason for the above design lies in the location of the first portion within the pressure vessel. As can be observed from FIGS. 41A to 41E, the first portion of the core is located at the area of the seals 4242, 4244, 4246, thereby not taking place in the heat exchange process with the pressure medium. As such, it is not required to have the same structure as the second portion, and costs can be reduced by maintaining it in a simplified design as shown.

Figure 42A:
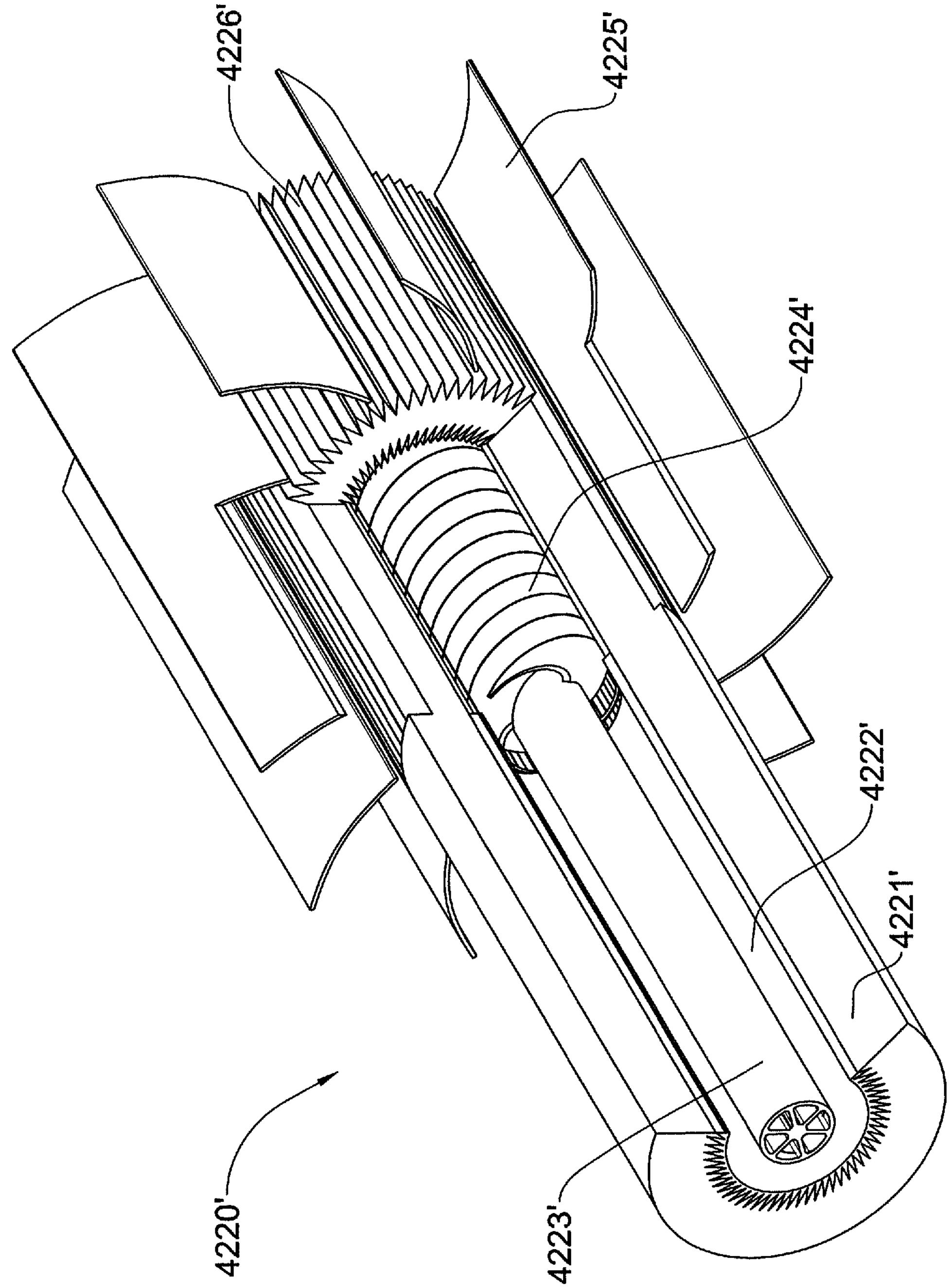
FIG. 42A is a schematic isometric view of a portion of a core used in a pressure vessel of the generator shown in FIGS. 36A and 36B according to another example of the subject matter of the present application.
Figure 42B:
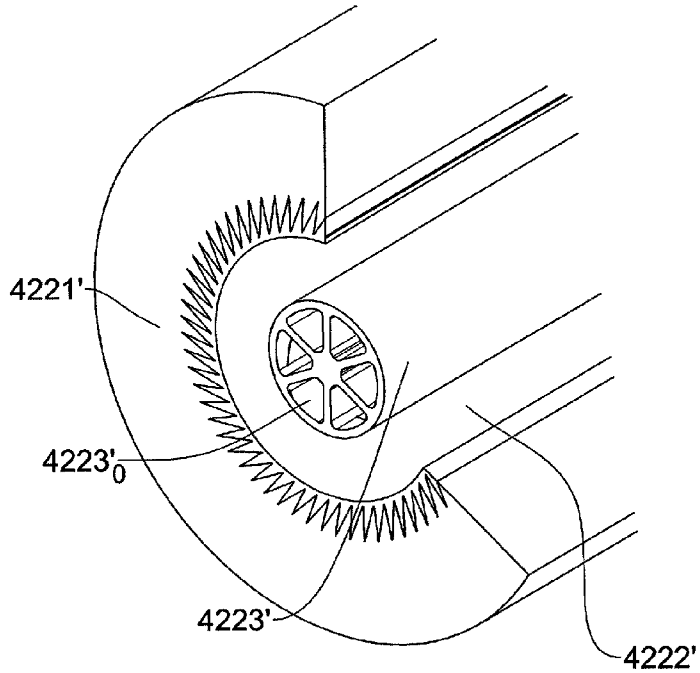
FIG. 42B is a schematic enlarged isometric view of a front portion of the core shown in FIG. 42A.
Figure 42C:
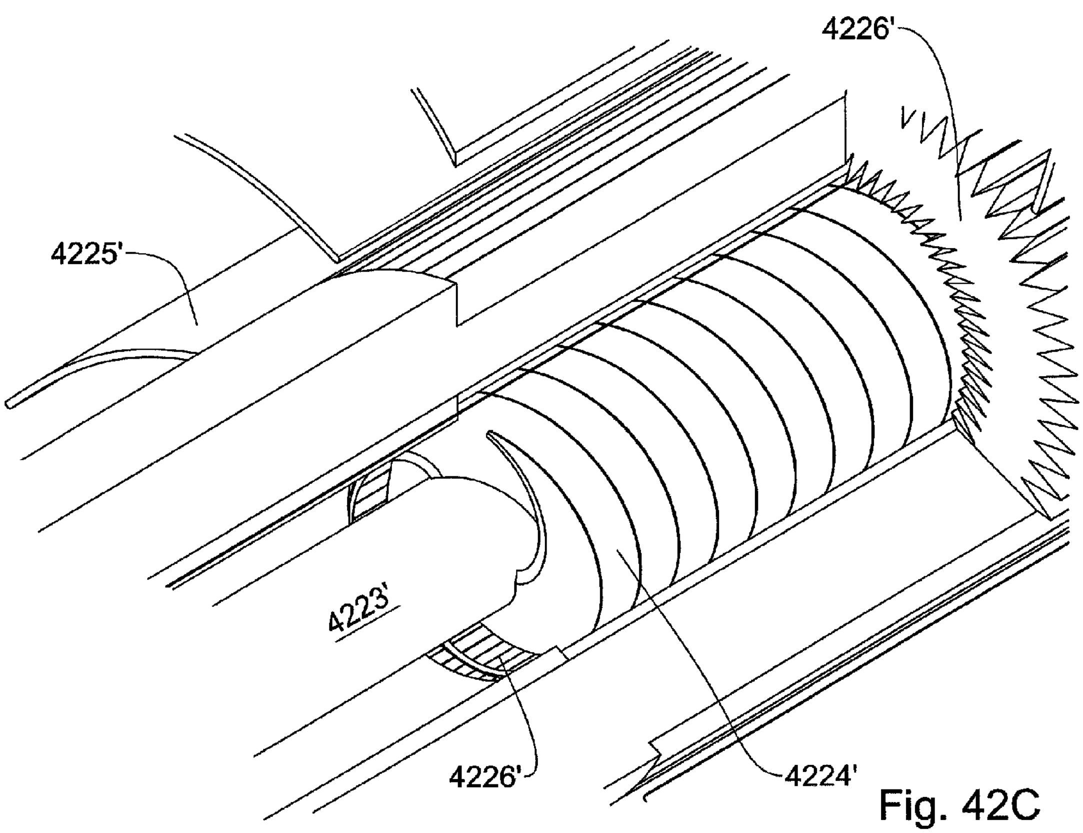
FIG. 42C is a schematic enlarged isometric view of a rear portion of the core shown in FIG. 42A.
Figure 42D:
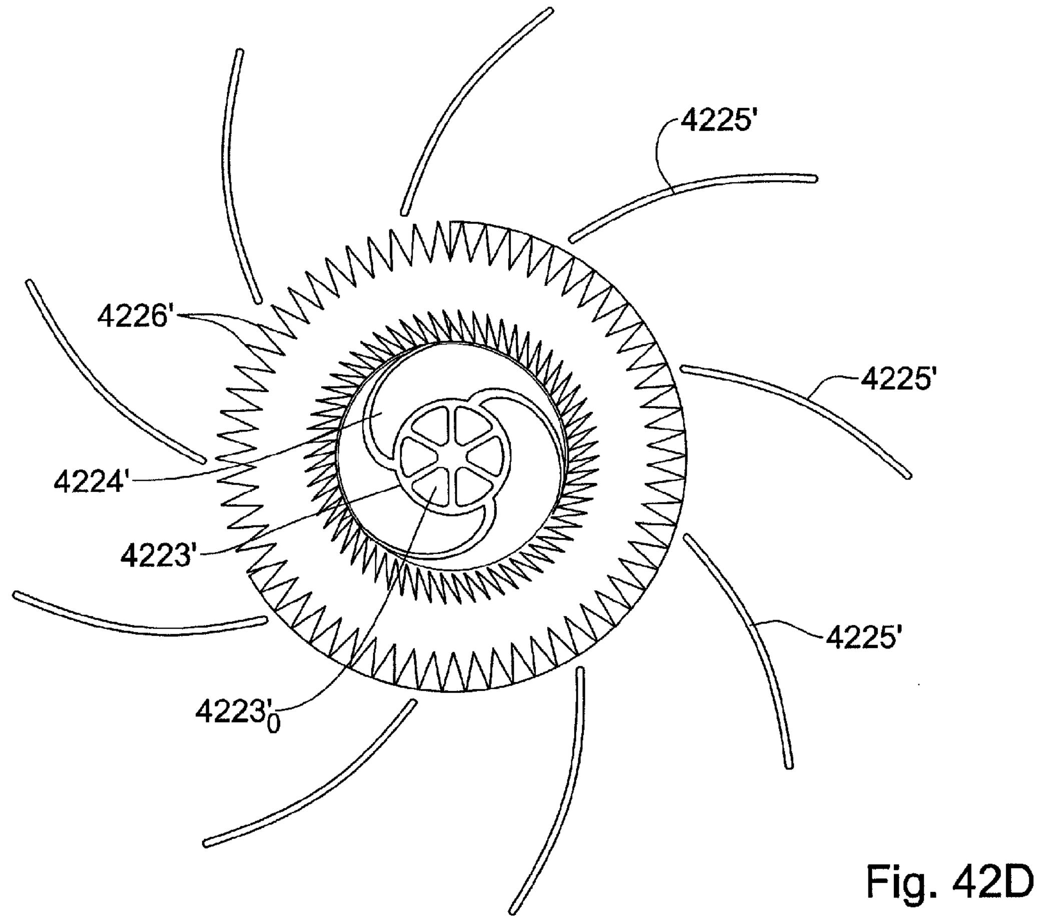
FIG. 42D is a schematic rear view of the core shown in FIG. 42A.
Figure 42E:
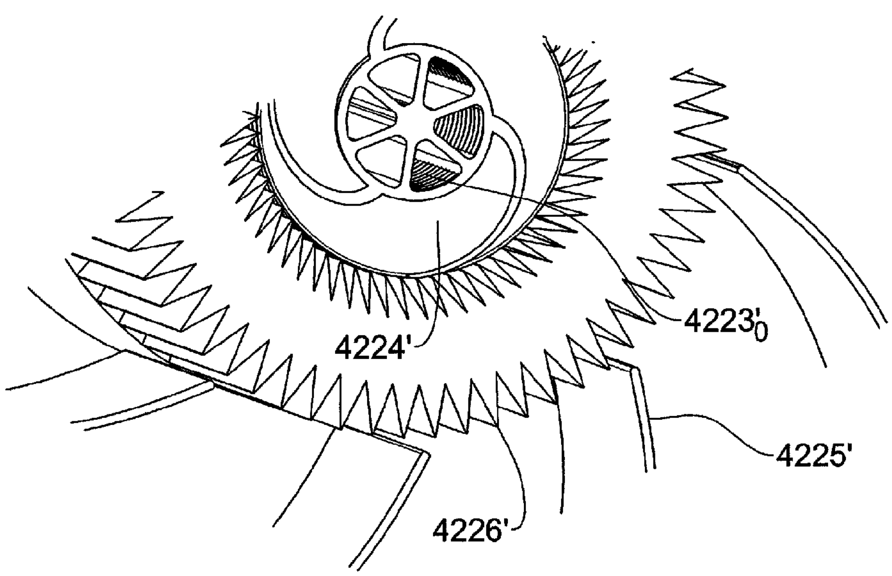
FIG. 42E is a schematic enlarged isometric view of a rear portion of the core shown in FIG. 42C.

With particular reference being drawn to FIG. 42D, it is observed that the roughened surface 4226' is in the form of teeth which do not extend completely radially from the center of the core. Rather, the teeth extend at a slight angle, so that the work medium flowing through the core 4220 is swirled by the direction of the teeth and penetrates in between the teeth, allowing for a better heat exchange process.

Figure 43:
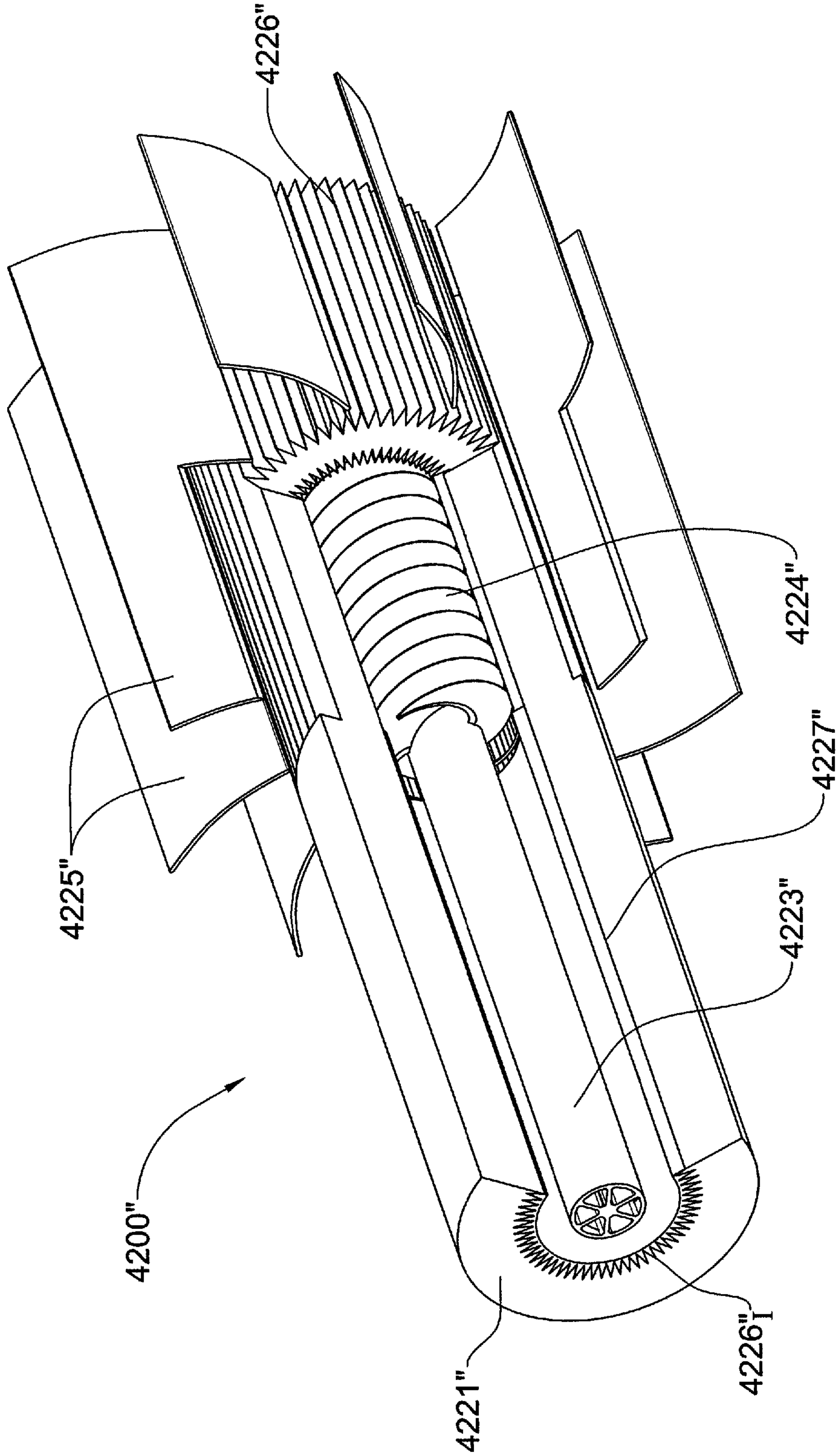
FIG. 43 is a schematic isometric view of a portion of a core used in a pressure vessel of the generator shown in FIGS. 36A and 36B according to yet another example of the subject matter of the present application.
Figure 44A:
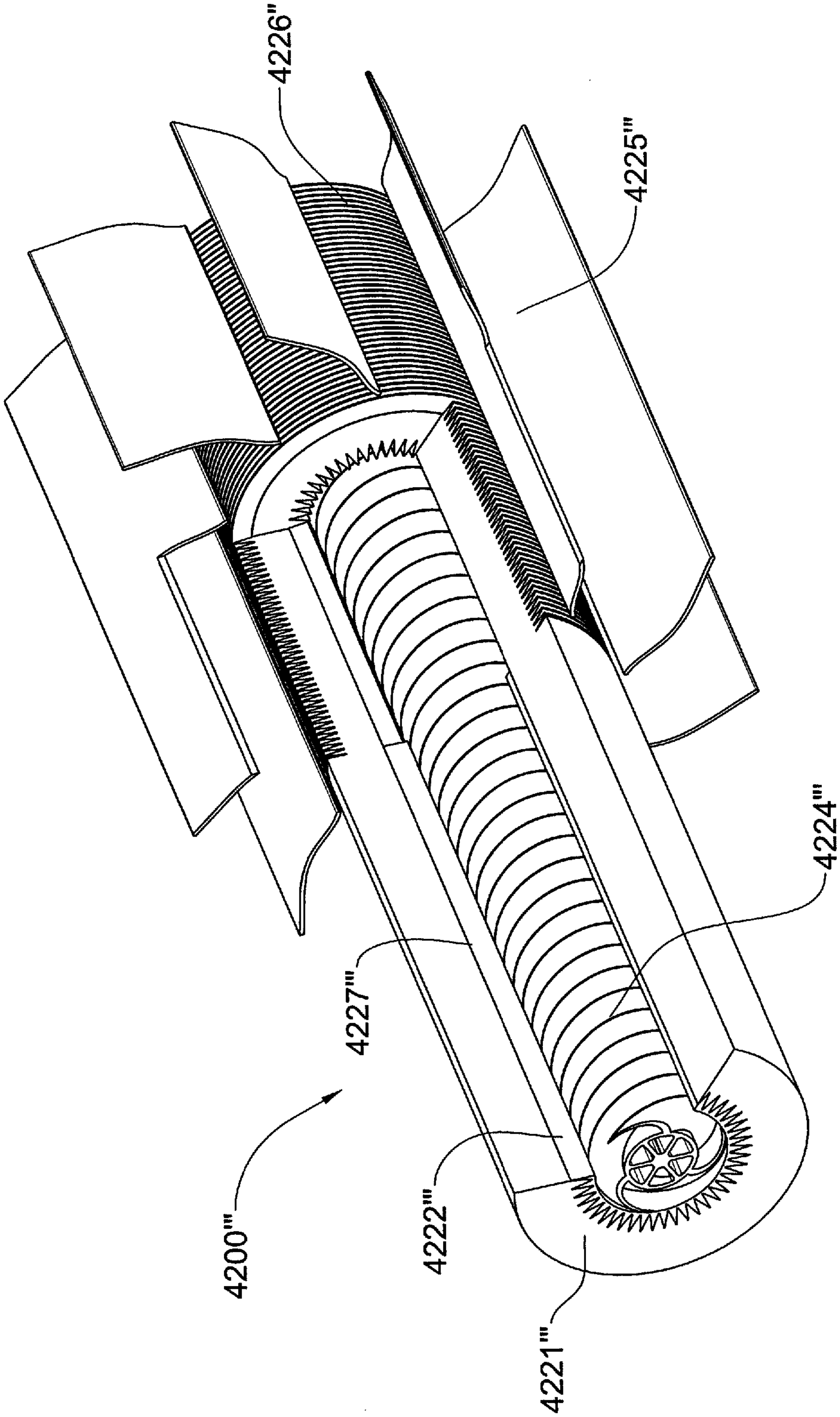
FIG. 44A is a schematic isometric view of a portion of a core used in a pressure vessel of the generator shown in FIGS. 36A and 36B according to still another example of the subject matter of the present application.
Figure 44B:
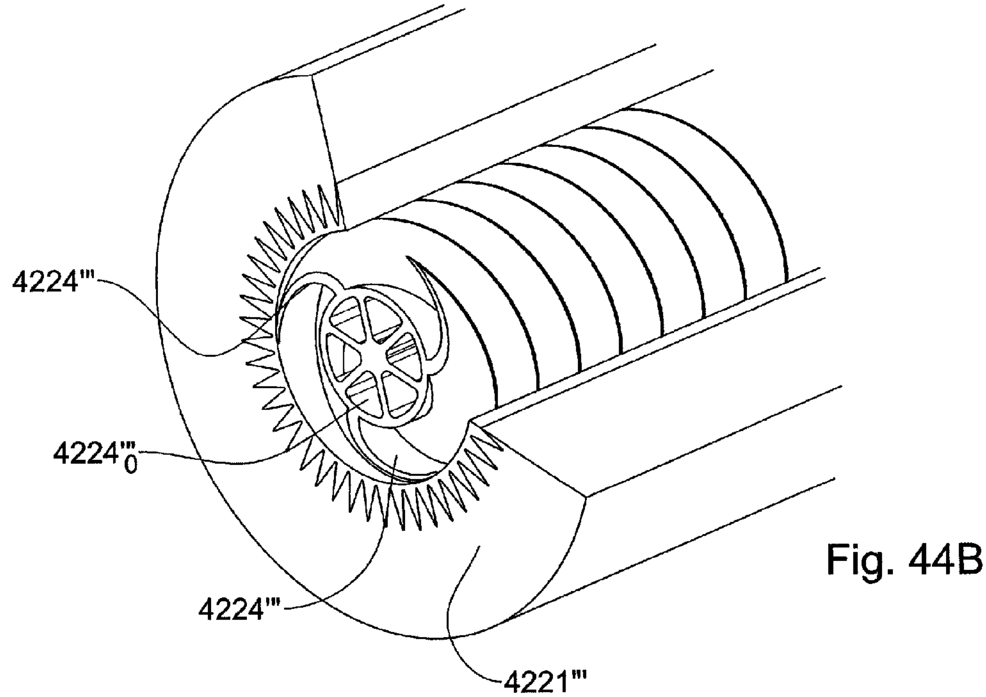
FIG. 44B is a schematic enlarged isometric view of a front portion of the core shown in FIG. 44A.
Figure 44C:
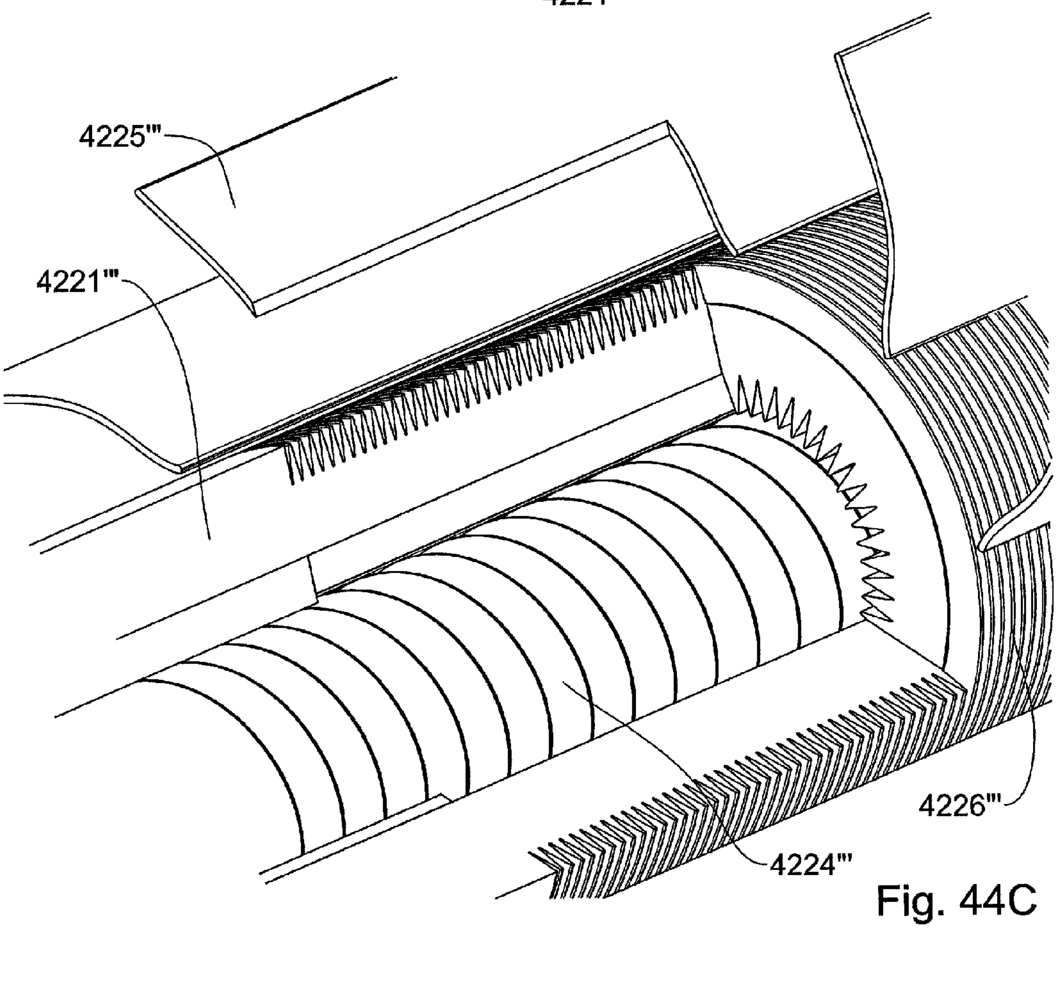
FIG. 44C is a schematic enlarged isometric view of a rear portion of the core shown in FIG. 44A.
Figure 45A:
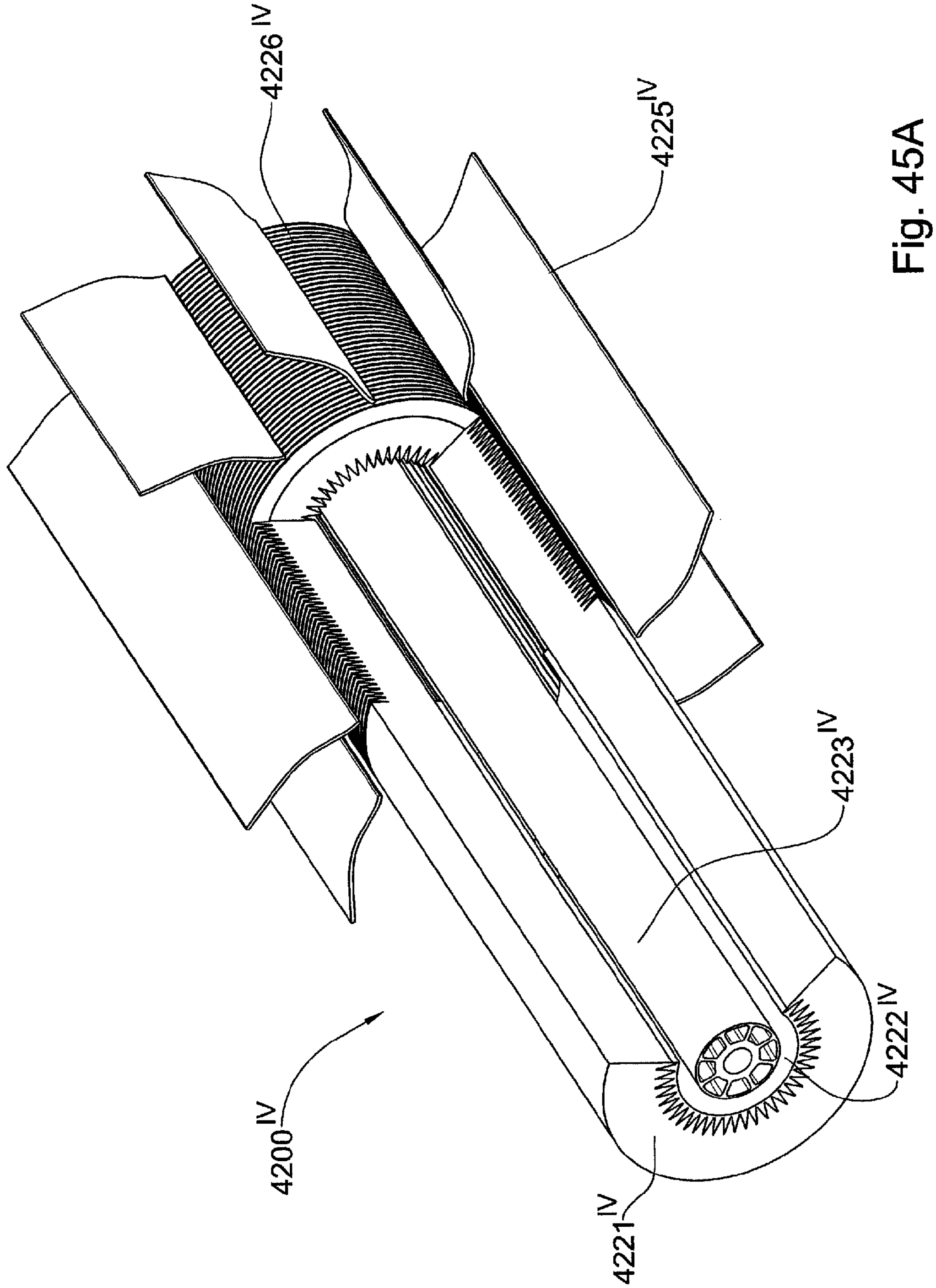
FIG. 45A is a schematic isometric view of a portion of a core used in a pressure vessel of the generator shown in FIGS. 36A and 36B according to still another example of the subject matter of the present application.
Figure 45B:
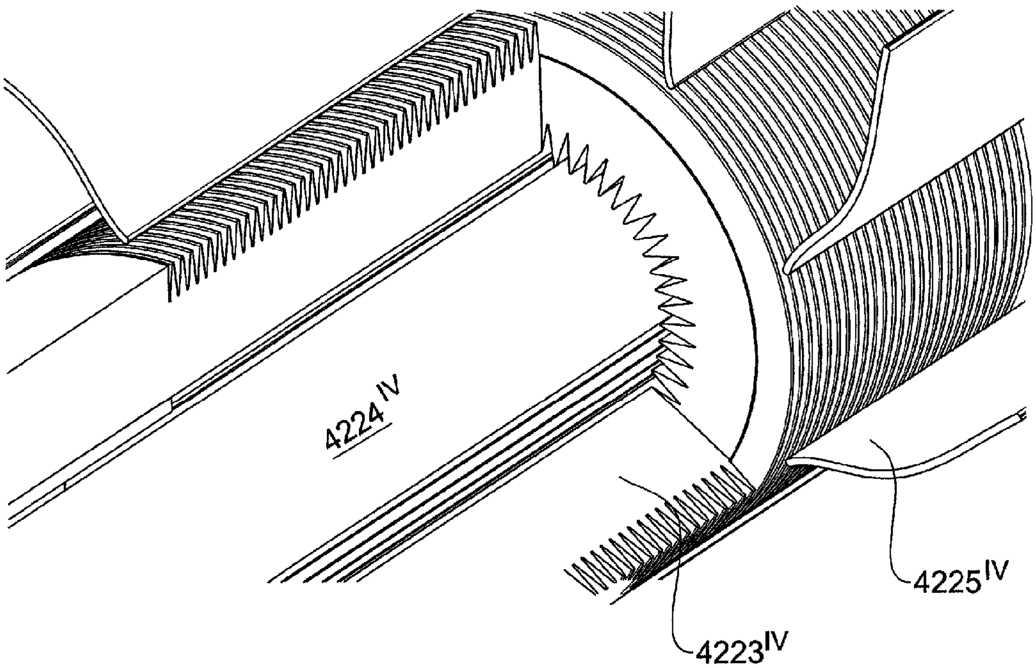
FIG. 45B is a schematic enlarged isometric view of a rear portion of the core shown in FIG. 44A.
Figure 45C:
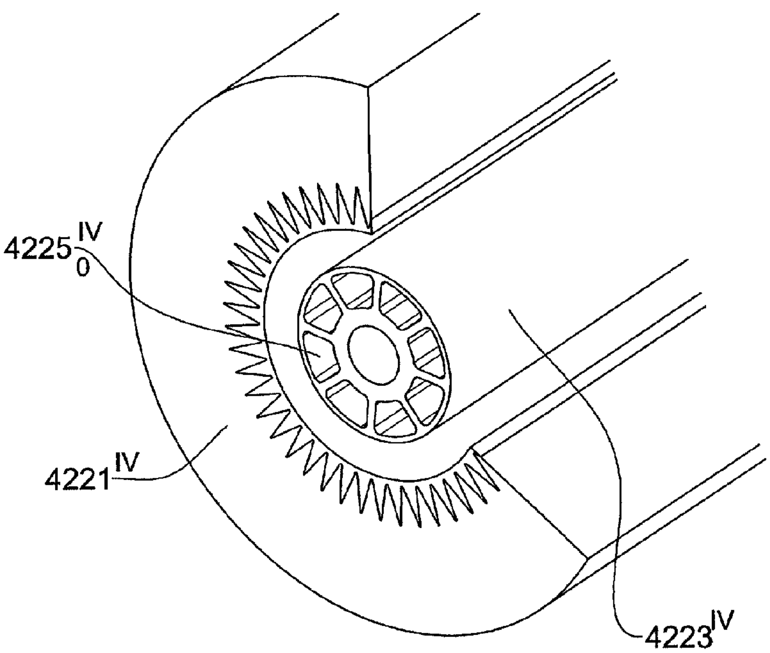
FIG. 45C is a schematic enlarged isometric view of a front portion of the core shown in FIG. 44A.

Attention is now drawn to FIG. 43, in which a core 4220" is shown having a similar design to that shown in FIGS. 42A to 42E, with the difference being that the first portion of the core 4220" is isolated using an isolating sleeve 4227", so that work medium passing through the first portion doesn't waste its energy on heating/cooling that portion of the core which does not participate in the heat exchange process.

Turning now to FIGS. 44A to 45C, two additional cores 4220''' and $\mathbf{4220}^{IV}$ are shown, being of similar design to that of the previously described cores 4220' and 4220'' (similar elements have been designated with similar reference numerals with the addition of corresponding primes). The main difference between the cores 4220'' and $\mathbf{4220}^{IV}$ and the previously describe cores lies in the design of the roughened surface, which is in the form of rings rather than in the form of conical/pyramidal protrusions. Such a design is slightly easier and less costly to manufacture.

Turning now to FIGS. 46A to 46D, an assembly of the pressure vessel 4200 is shown. It can be observed that the cores 4220 and all the mechanical elements relating thereto (fan arrangements, gears, drive-shaft etc., herein 'core assembly') are all enclosed by sleeve members $\mathbf{4200}_S$. The sleeve members $\mathbf{4200}_S$ are formed of a rigid material and have a sufficient thickness to provide mechanical support to the entire core assembly. For example, the sleeve member $\mathbf{4200}_S$ can be made of steel and have a thickness of several millimeters.

Under the above arrangement, it is possible to first fully assembly the entire core assembly and enclose it with the sleeve members $\mathbf{4200}_S$ and only then slide the enclosed assembly into the pressure vessel casing 4200. In addition, for servicing and maintenance purposes, it is possible to remove the enclosed core assembly from the pressure vessel 4200 (for example by sliding it out), remove the appropriate sleeve member $\mathbf{4200}_S$ and perform the required maintenance.

Figure 46A:
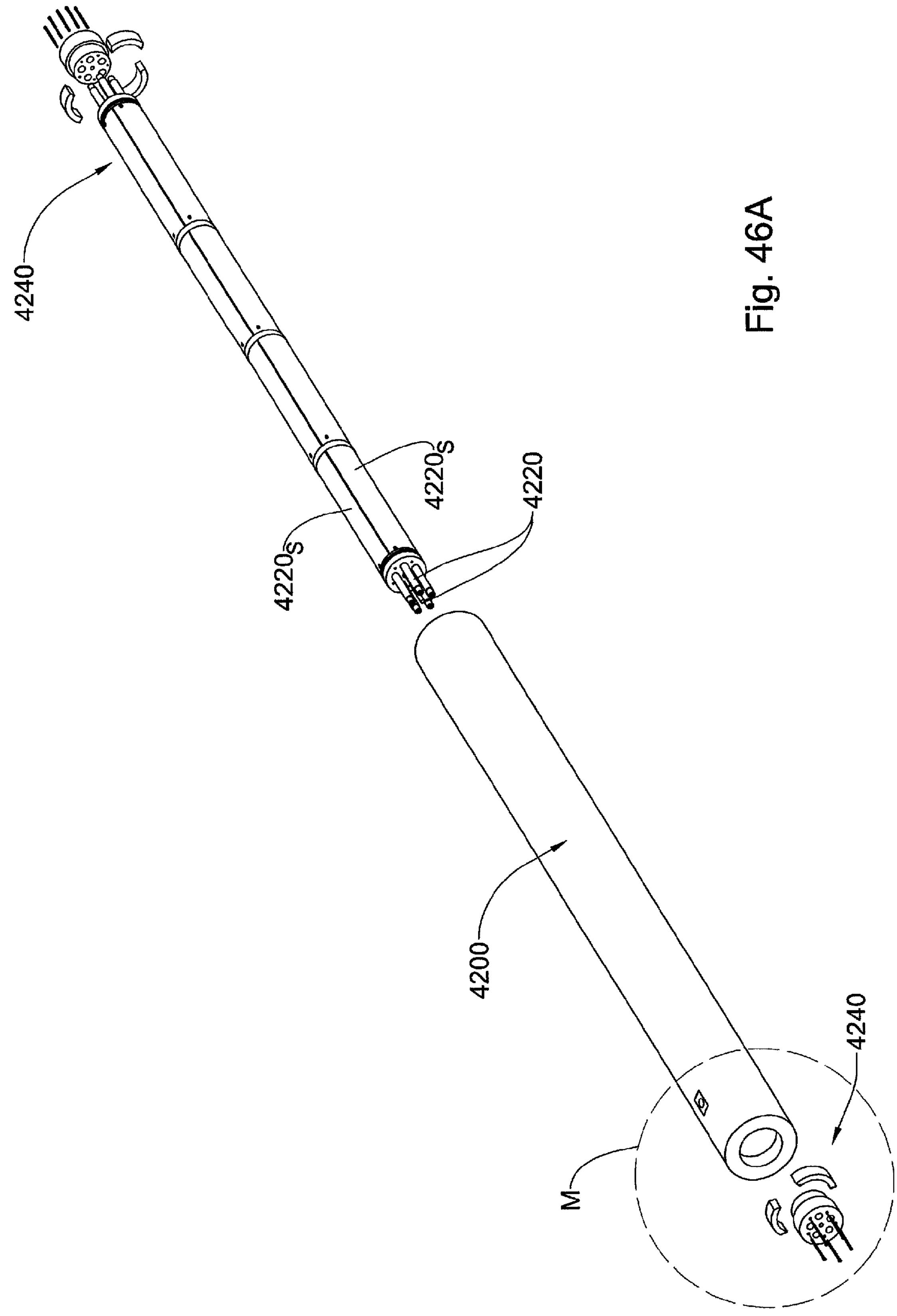
FIG. 46A is a schematic isometric exploded view of a pressure vessel used in the generator shown in FIGS. 36A and 36B.
Figure 46B:
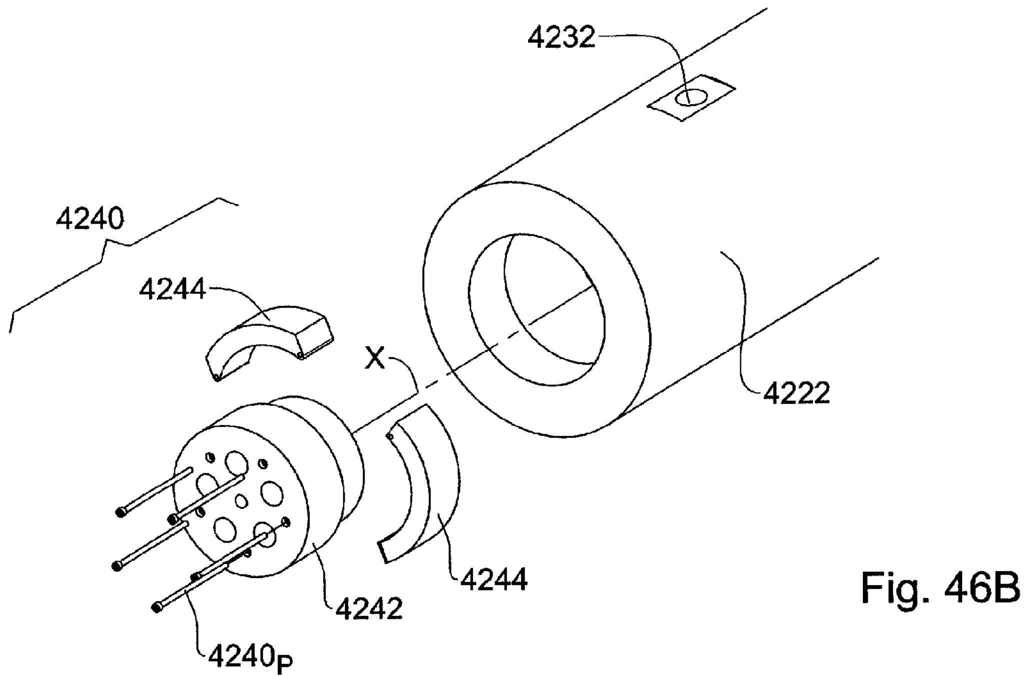
Figure 46C:
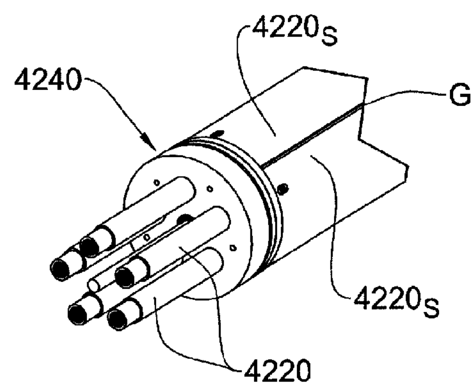
Figure 46D:
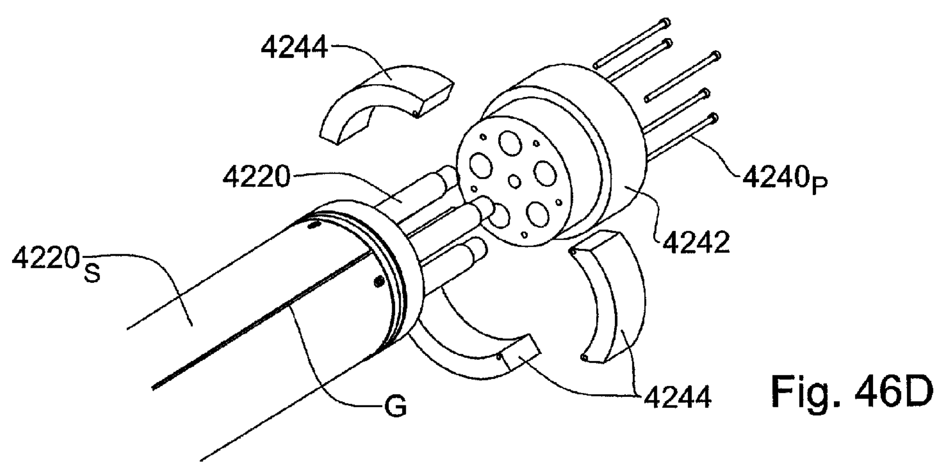

It is also observed that the sleeve members $\mathbf{4200}_S$ have a semi-circular cross section (i.e. have a half-pipe shape), and when two such members enclose a section of the core assembly, there remains a gap G therebetween (see FIGS. 46C, 46D). The gap G provides fluid communication of the pressure medium between an inner zone defined between the sleeve members 4200S and the core assembly, and an outer zone between the sleeve members 4200S and casing 4222 of the pressure vessel 4200.

It is also noted that the seal arrangement comprises seals 4244 which are essentially made of three separate pieces, and once inserted into the sleeve $\mathbf{4220}_S$ and mounted onto the cores 4220, these are pressed closer to one another to provide the necessary seal for the pressure vessel 4200.

Figure 47:
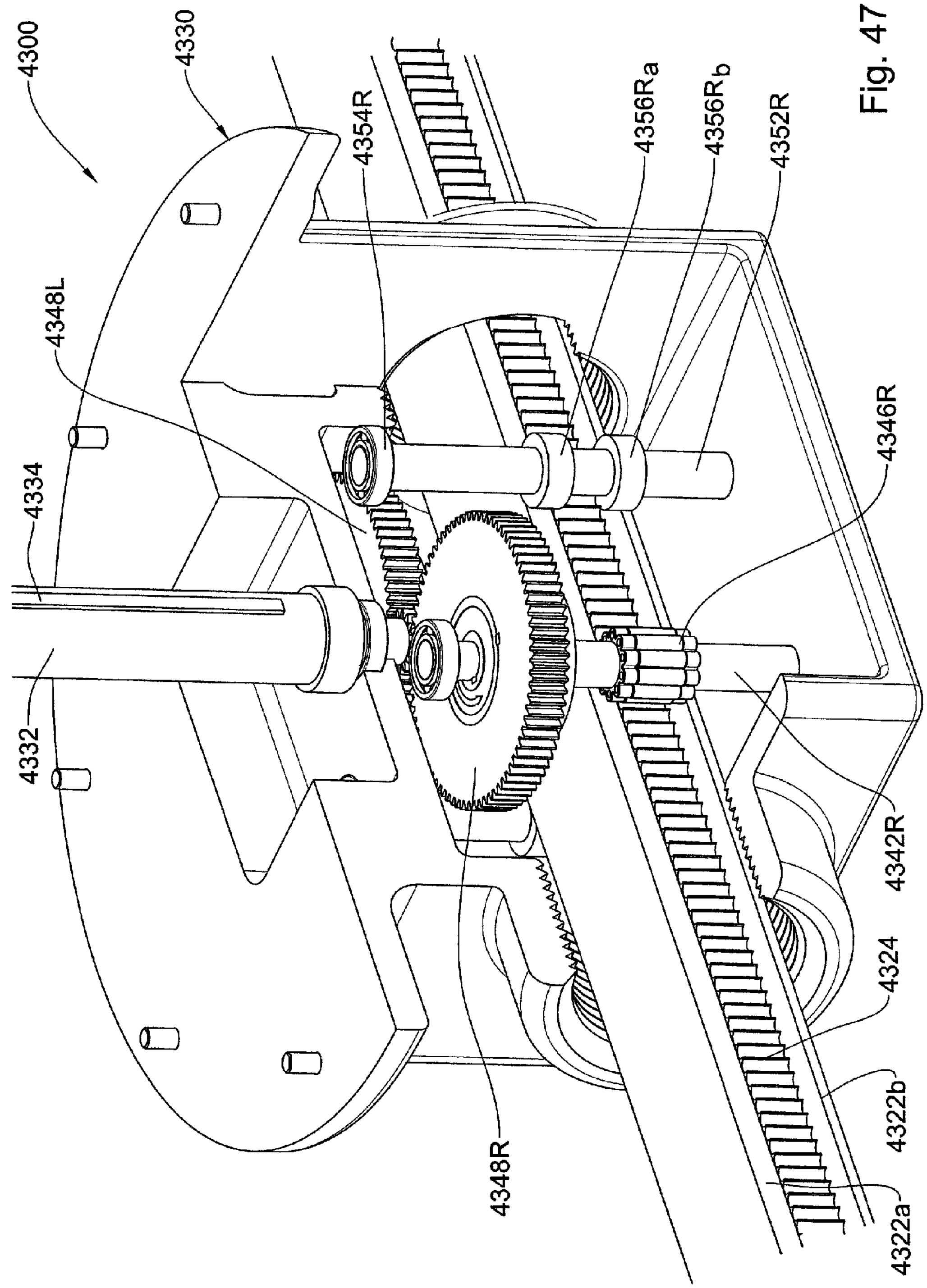

Turning now to FIG. 47, an improvement of the gear mechanism 4300 is shown, in which the gear mechanism 4300 comprises roller-pin pinions 4348R, 4348L which are engaged with the rack 4320, and gears 3349R, 3349L which are engaged with the drive shaft 4332. Roller-pin pinions 3348R, 3348L provide a much higher efficiency over regular gear engagement due to an increased contact surface and simplified teeth shape. In all other aspects, the gear mechanism 4300 operates much the same way.

However, the roller-pin pinions 4348R, 4348L provide the gear with the advantage of reduced friction, since the roller-pin pinions 4348R, 4348L are free to revolve about their own axis.

Figure 48A:
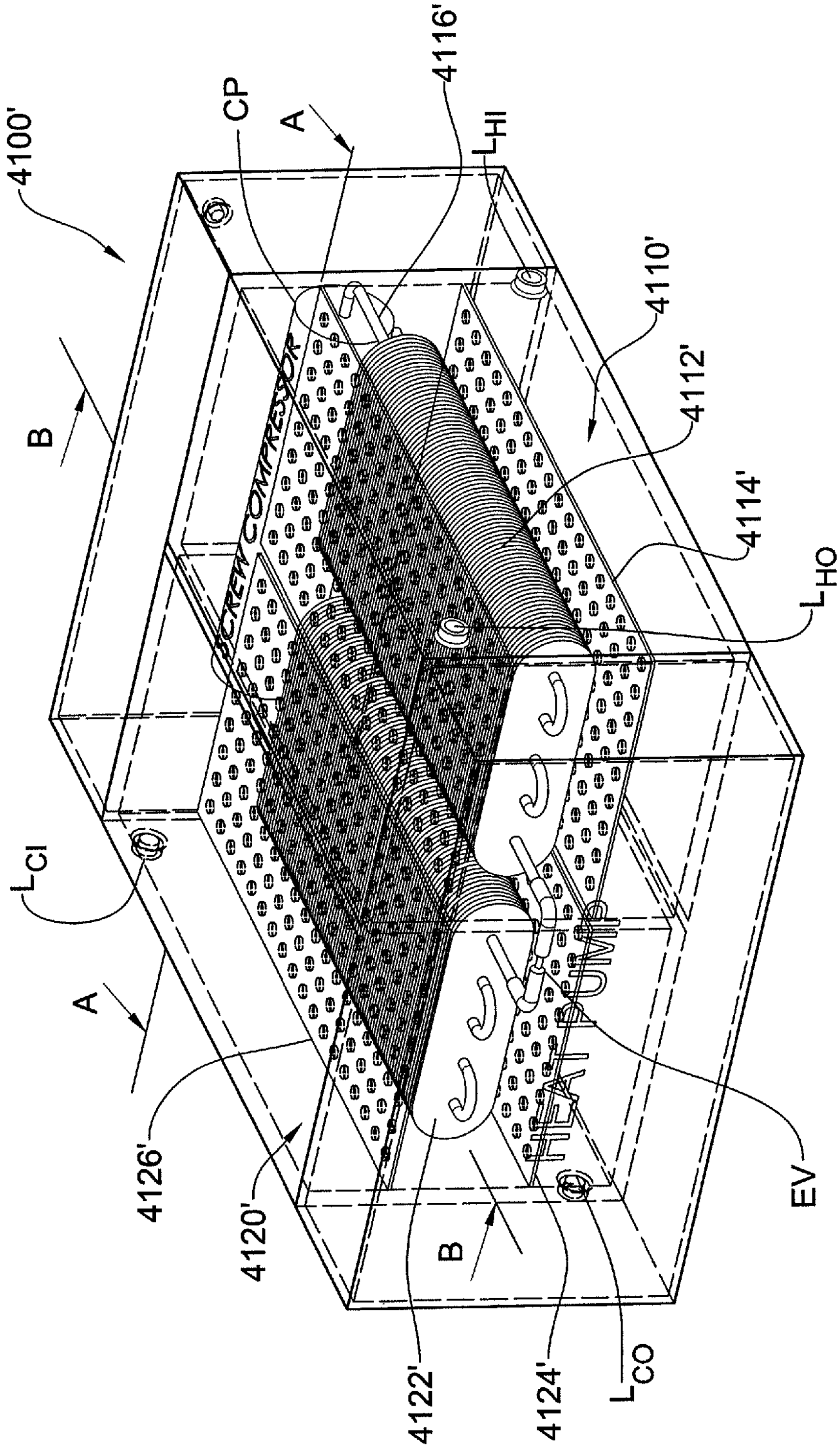
Figure 48B:
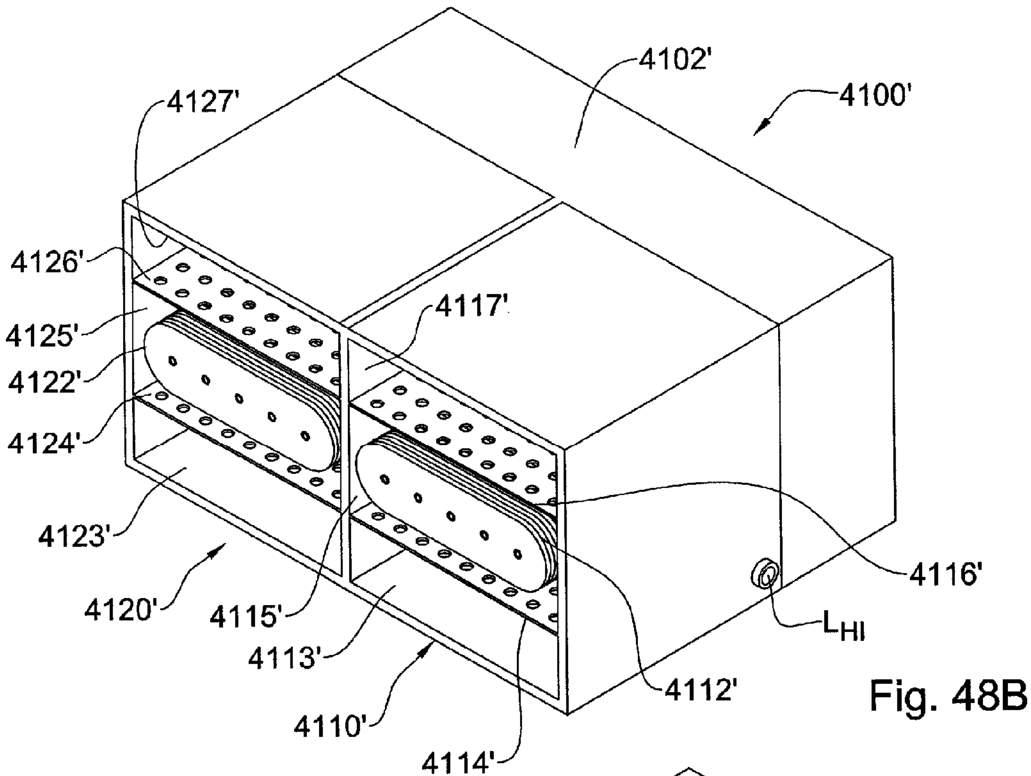
Figure 48C:
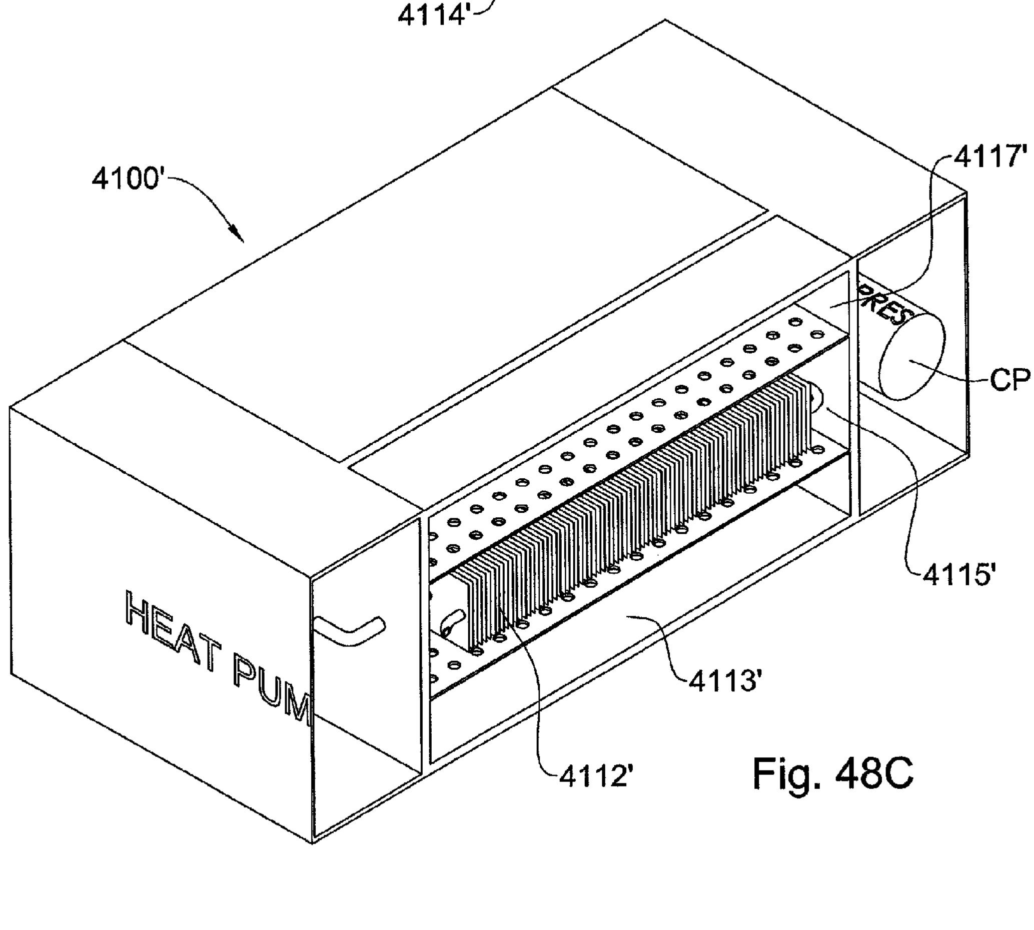

Turning to FIGS. 48A to 48C, another example of a work medium sub-system 4100' is shown in which each of the high/low temperature reservoirs 4110, 4120 respectively, has been divided into several compartments. The compartments are in fluid communication with one another, yet they still delay mixing between the work medium exiting the sub-system 4100 towards the pressure vessels 4200L, 4200R, and work medium entering the sub-system 4100 after performing its heat exchange process. Such an arrangement can provide a more efficient configuration of the generator.

Turning now to FIGS. 49A to 49H, a pressure vessel 4200' is shown having a length L which is much greater than the diameter D thereof. The pressure vessel 4200' also comprises support assemblies 4920' as described previously with respect to FIGS. 41A to 41D, however, contrary thereto, in the present example each core 4220' is not a single core, but rather is formed of core segments. Each two consecutive segments are adjoined with one another at the support assembly 4290' located therebetween.

In order to adjoin two core segments, an insert is introduced between the segments and is respectively received within the cores so as to provide fluid communication therebetween. It is also observed from FIG. 49B that the core segments are fully contained within the pressure vessel and that at the ends of the pressure vessel, only the inserts are protruding. The insert 4299' itself can be made of a material not requiring high heat transfer coefficients, e.g. plastic.

When adjoined at the support assembly 4290' by the insert, two consecutive core segments have a certain degree of freedom for movement with respect to one another. In order to reduce the displacement of the cores with respect to one another, the support assembly 4290' comprises bearings 4293' which allow the fan arrangements of the cores to freely revolve about themselves.

Figure 49A:
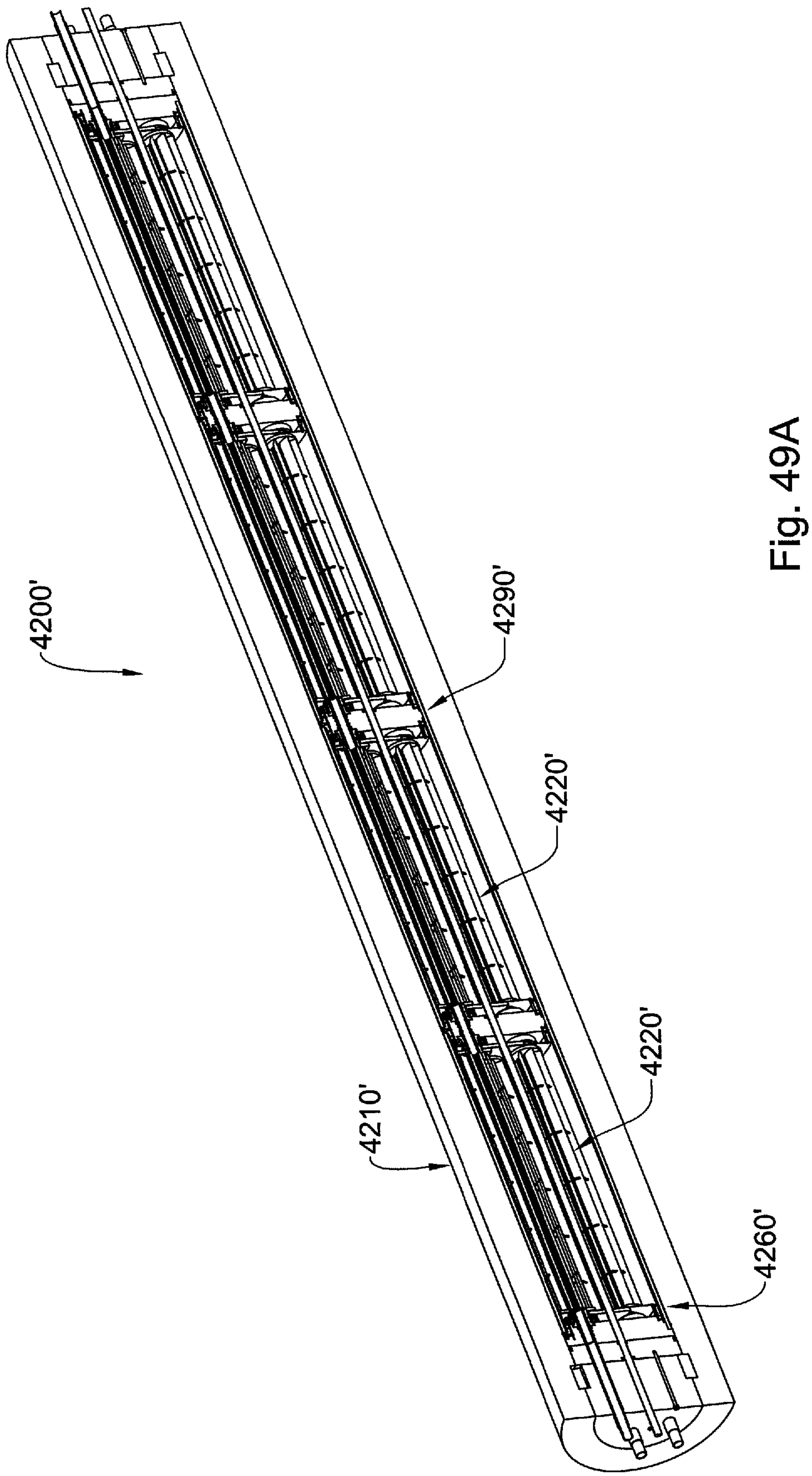
Figure 49B:
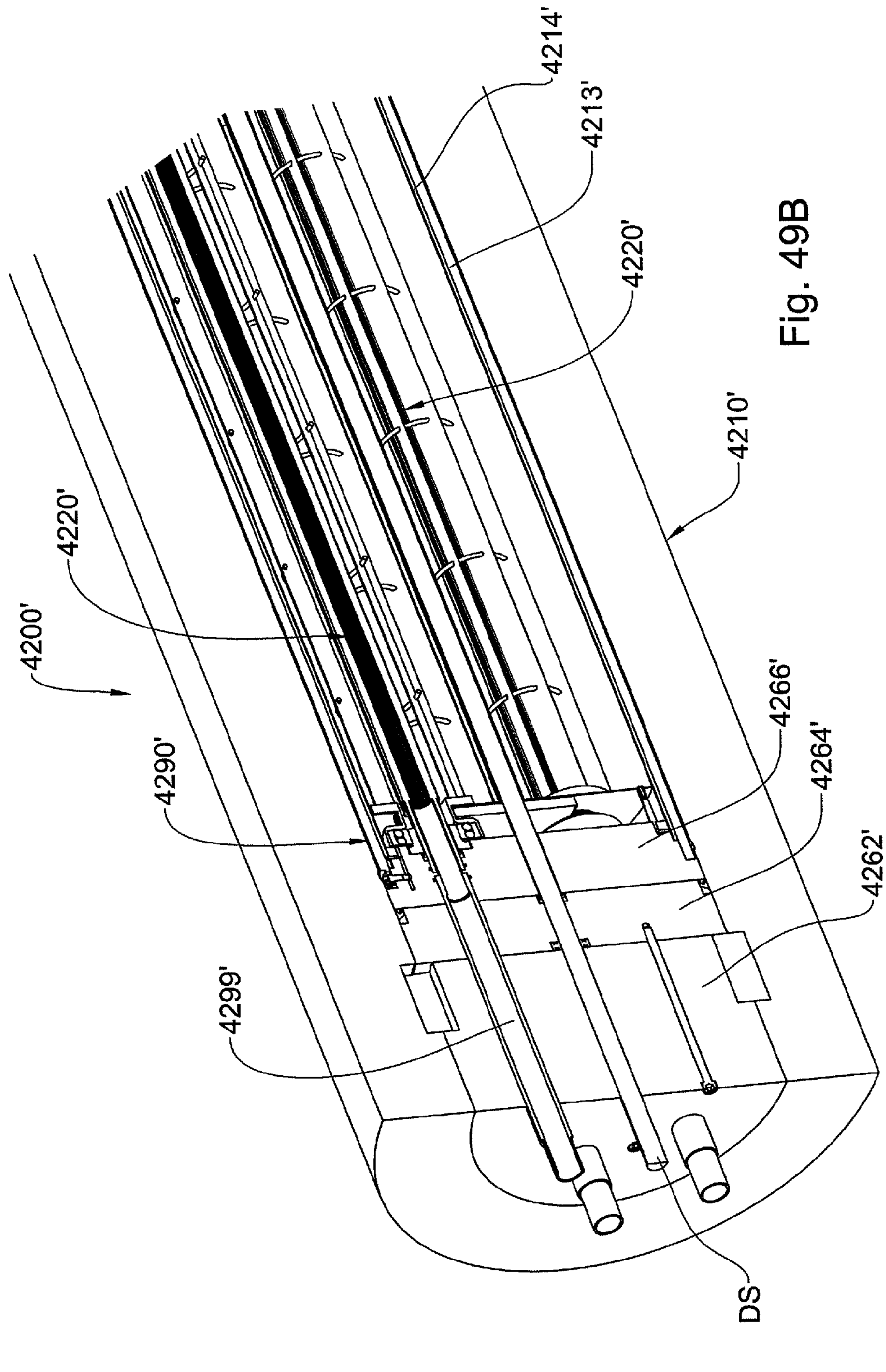
Figure 49C:
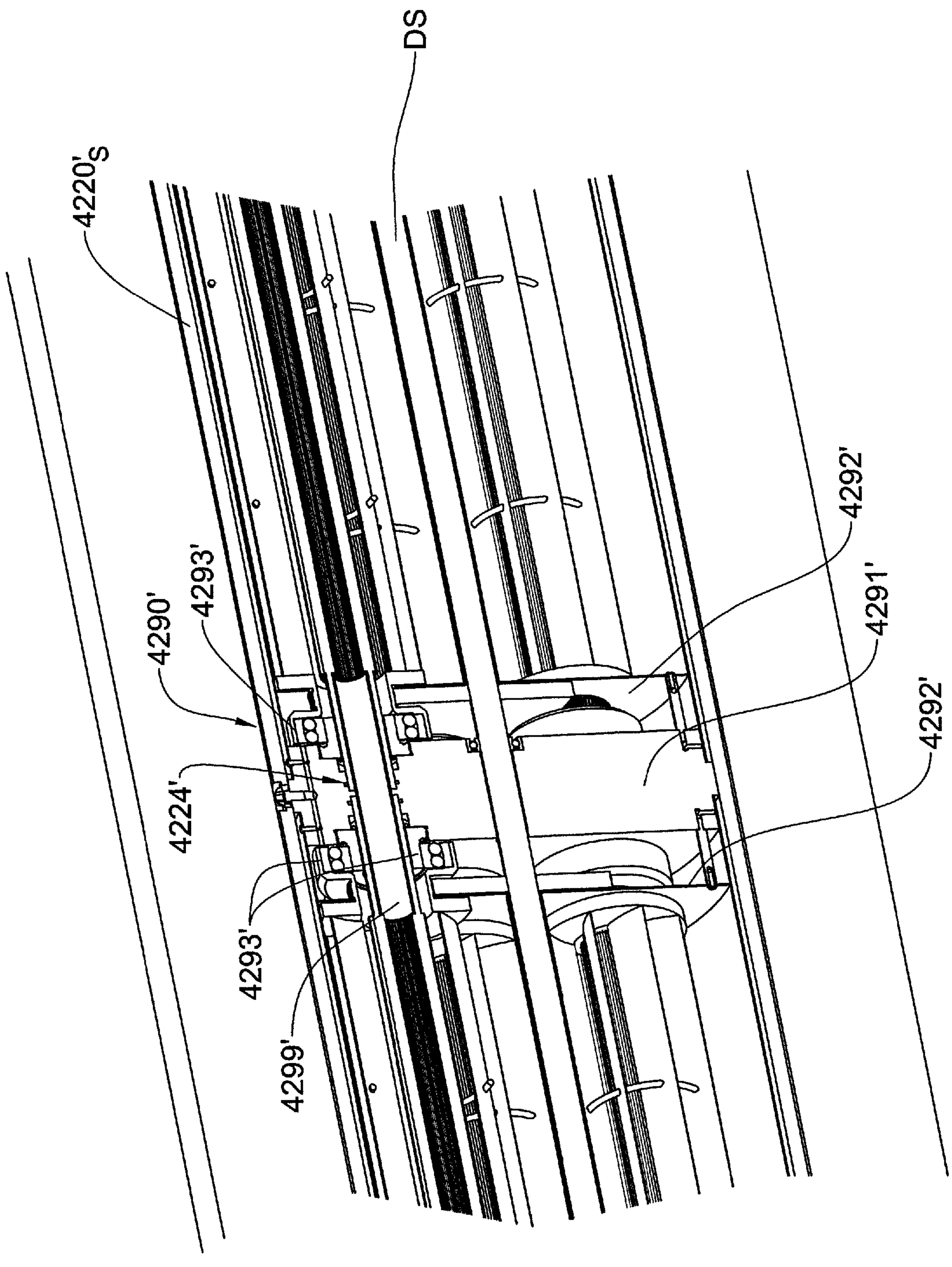
Figure 49D:
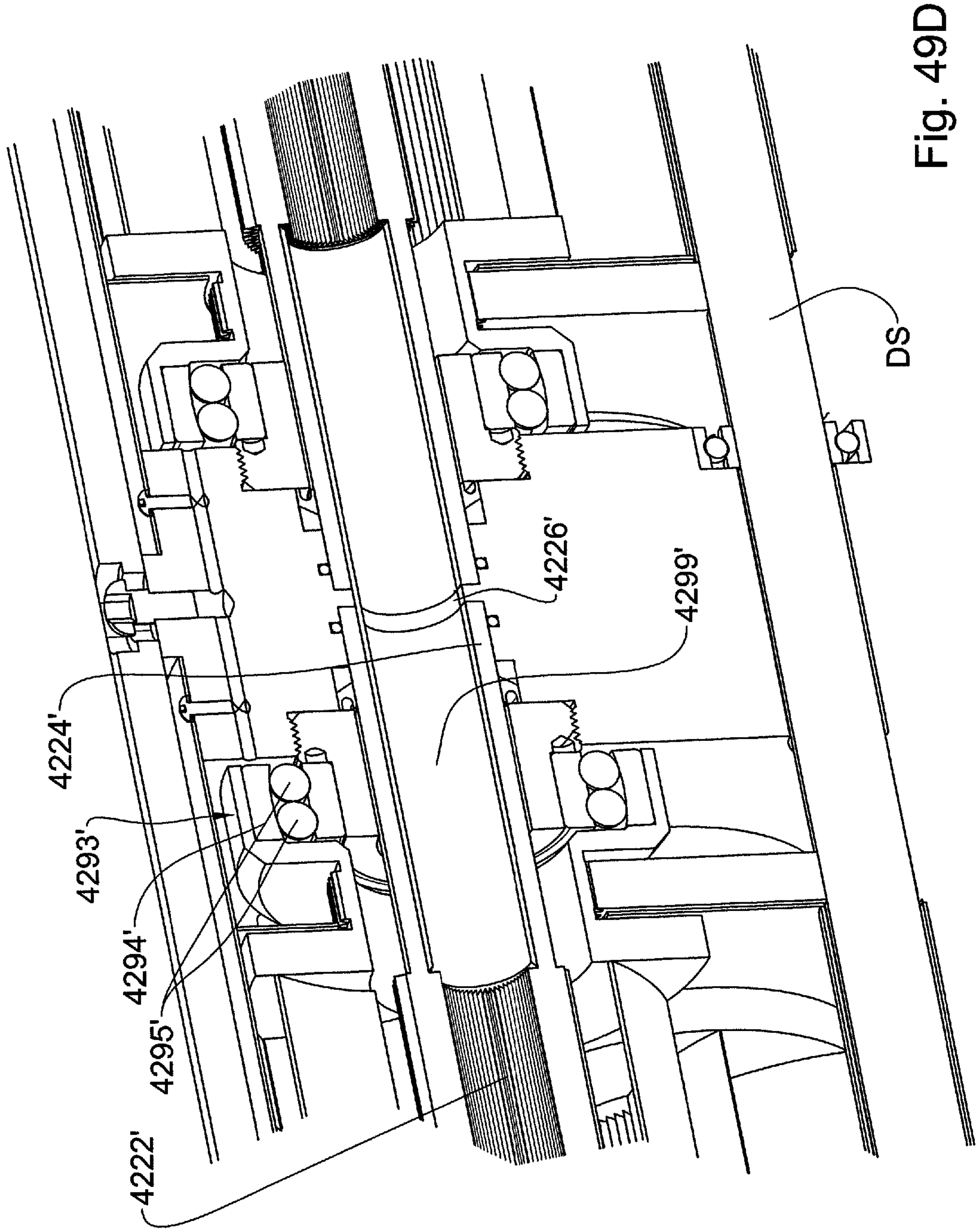
Figure 49E:
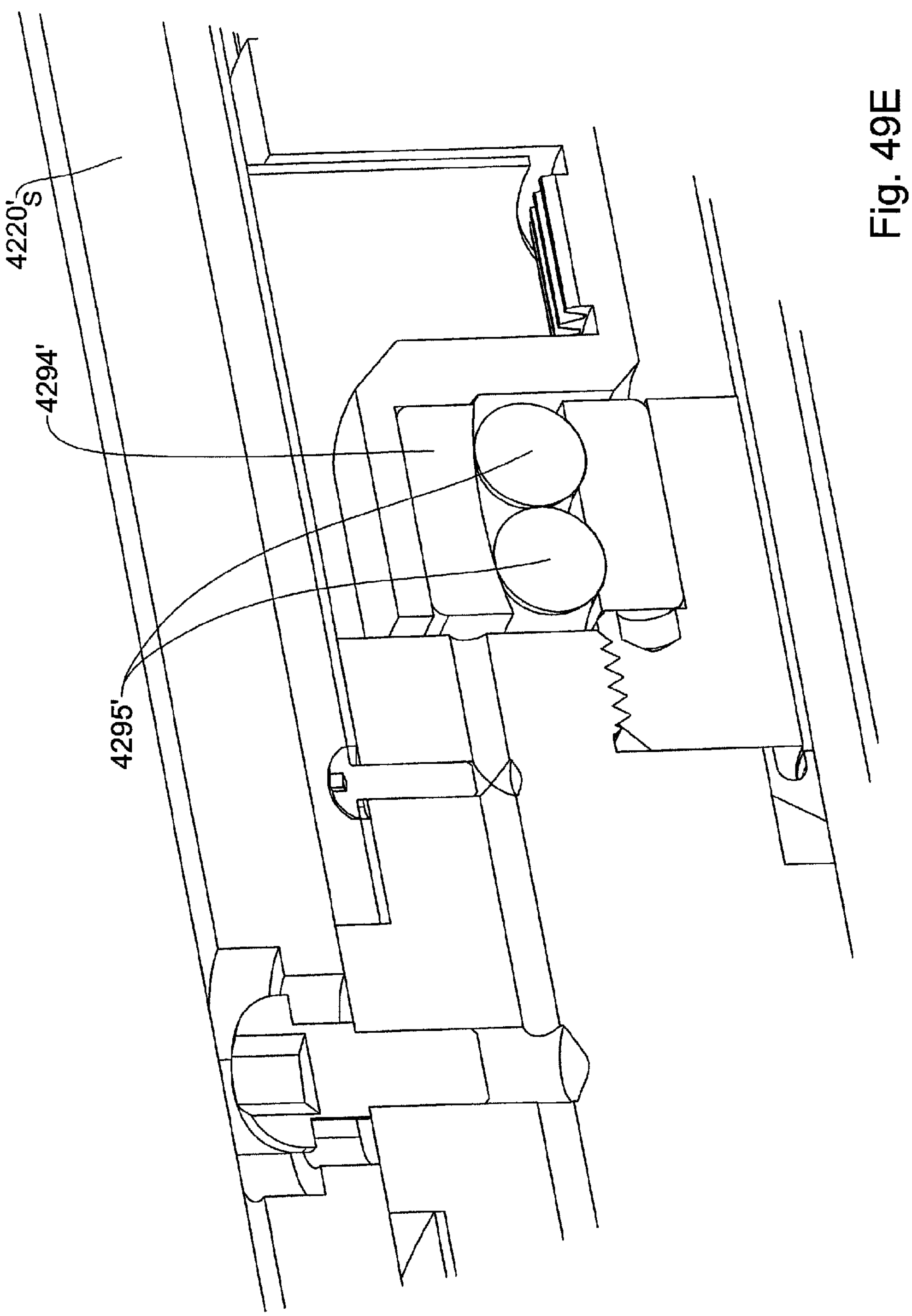

With particular reference being drawn to FIG. 49D, the bearings 4293' are of a self-aligning type, in which the housing 4294' of the bearing balls 4295' is of a curved shape, providing the cores, and the fan arrangements mounted thereon, with a certain, yet controllable, degree of freedom.

Figure 49F:
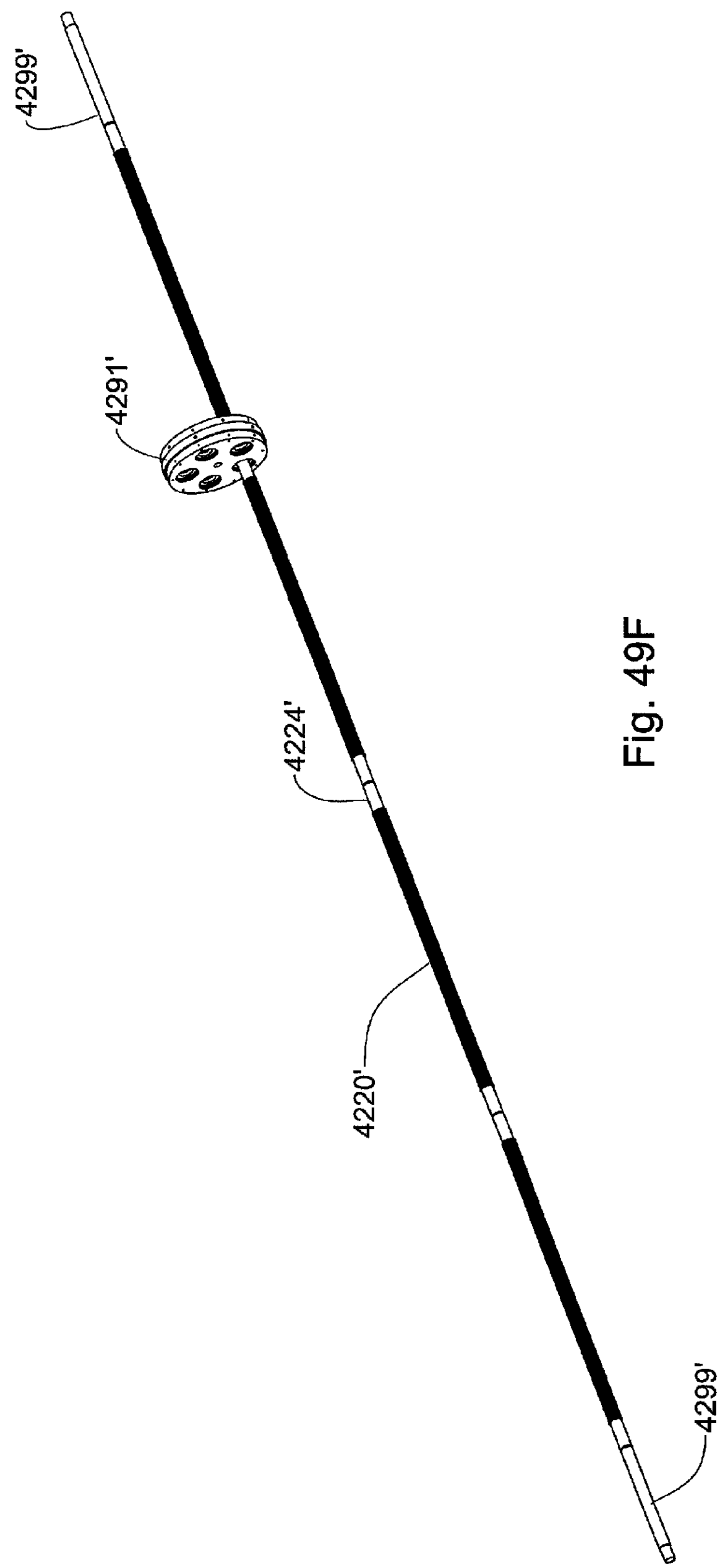
Figure 49G:
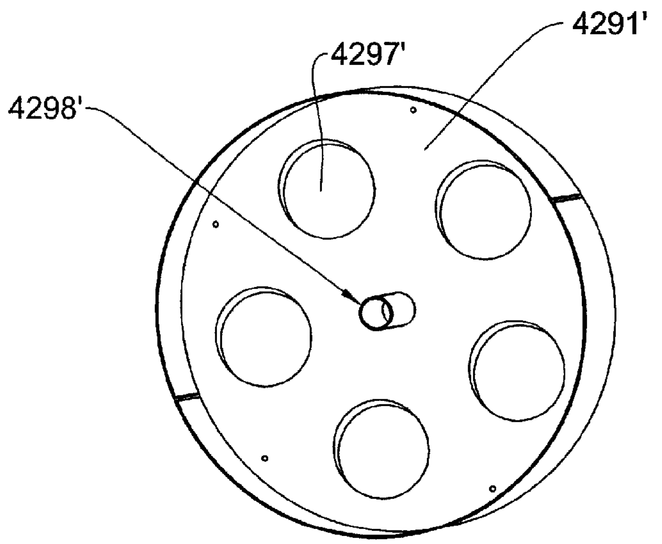

With reference being made to FIGS. 49F and 49G, the support assembly 4290' is more clearly shown having the shape of a disc formed with several openings, corresponding in number to the number of the cores and the drive shaft DS.

Figure 49H:
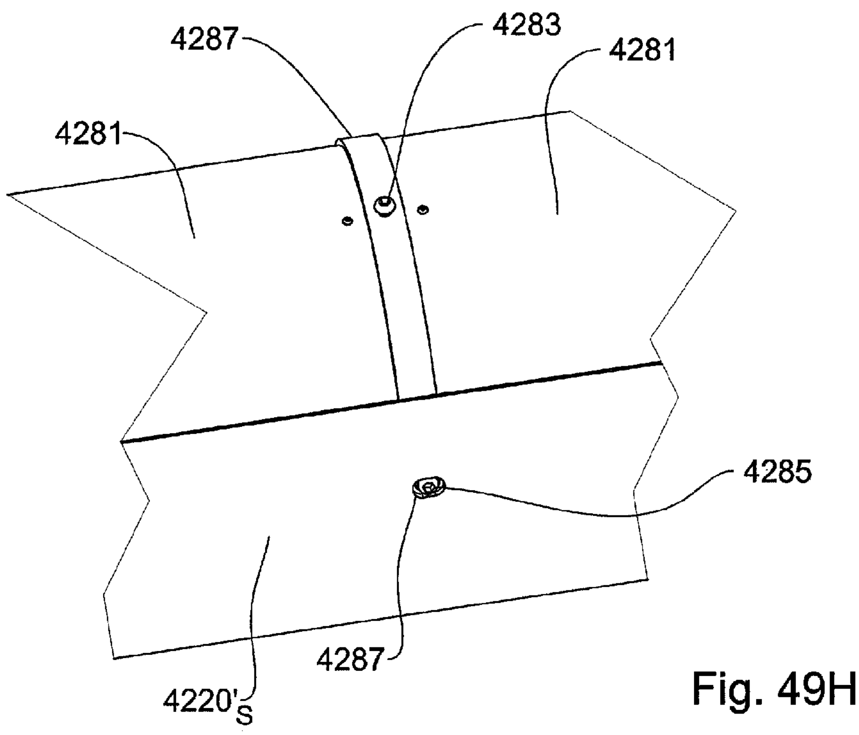

Attention is now drawn to FIG. 49H, in which the sleeve member $\mathbf{4200}_S'$ is shown attached to the core assembly by bolts 4285 via an opening 4287. It is observed that the opening 4287 is not circular, but rather slightly prolonged. It should be understood that the enclosed core assembly is first introduced into the pressure vessel 4200', and only then is the pressure vessel pre-loaded with the high pressure (e.g. 6000 atm.). Under such pressure, the pressure vessel may elongate slightly, and therefore the openings holding the bolts should provide for a certain degree of freedom. This arrangement holds true not only for bolts of the sleeve member $\mathbf{4200}_S'$ but for other bolted elements within the pressure vessel.

In addition, at least for a majority of bolt attachments within the pressure vessel (i.e. attachments having a bolt or screw threaded into a threaded hole), it can be beneficial to form a hole within the thread which provides fluid communication between the portion of the threaded hole not occupied by the bolt, so as to equalize the load on both sides of the bolt (its head and it end), in order to reduce sheer forces.

With respect to all of the above examples, configurations and arrangements of the generator of the present application, the following calculations can apply:

Basic data:

in general, the generator 4000 can be configured to provide approx. 2.24 times the input power, i.e. $W_{OUTPUT}=2.24W_{INPUT}$. Naturally, if some of the output power is provided back to the operation of the generator, the net output power is about $1.24W_{INPUT}$ ($2.24W_{INPUT}-W_{INPUT}$);

the average efficiency of standard heat pumps can be in the range of 50-70%, i.e. for a COP 10 which should theoretically provide $W_{OUTPUT}=10W_{INPUT}$, the actual output is in the range of 5-7$W_{INPUT}$. For purpose of this calculation, an efficiency of 55% will be assumed;

the COP chosen for the present calculation is 8 and the temperature difference between the high temperature work medium and the low temperature work medium is about 40° C.;

the generator can convert approx. 30% of the heat provided to the pressure medium into output energy via the motor assembly, i.e. for an amount of heat Q provided to the pressure medium, approx. 0.3Q is converted to actual output (based on the properties of Ethyl Bromide under a pre-loading of about 6000 atm.);

the energy recovery arrangement provides for a recovery of approx. 50-66% of the remainder of the amount of heat within the pressure medium;

Under the above parameters, the generator can operate as follows:

Providing 1.00 kWh of electrical energy in the heat pump of the generator (to generate the 40° C. difference between the high and the low temperature reservoir) will provide for 4.40 kWh of heat energy, which is the amount of heat provided to the pressure medium. Theoretically a 40° C. temperature range at appropriate temperatures and a COP 8 should yield more power, however, due to the 55% efficiency of the heat pump the output is 1 kWh×8×55%=4.40 kWh.

Since only 30% of the heat provided to the pressure medium is eventually converted to output energy, the above calculation yields approx. 1.32 kWh of electrical energy. This yields that the remainder of the heat within the pressure medium is about 4.40−1.40=3.00 kWh (1.4 is used instead of 1.32 to take into account various heat losses within the system).

Recovering 60% of the remainder of the amount of heat within the pressure medium yields a recovery of 1.80 kWh (3.00×0.6=1.80 kWh). Therefore, is out of 4.40 kWh provided to the pressure medium 1.80 is recovered, this yields that the additional heat that should be provided to the pressure medium with each operation cycle of the generator is 4.40−1.80=2.60.

In other words, in each cycle, an amount of heat of approx. 2.60 kWh is provided by the heat differential module and an amount of heat of approx. 1.80 is provided by the recovery arrangement, yielding the amount of heat of 4.40 kWh which is required for operation of the generator at a production of 1.32 kWh.

Under the above arrangement, in order to provide the required 2.60 kWh of heat, the heat pump of the heat differential module now requires only 0.59 kWh (rather than 1 kWh), under the COP=8 as suggested above. This yields that at startup of the operation of the generator, i.e. at the first cycles of operation thereof, 1 kWh is provided as input power, but is quickly reduced to 0.59 kWh during continuous operation of the generator once the recovery arrangement takes effect.

In summary, in continuous operation of the generator (after startup), in order to provide a 1.32 kWh output energy, the generator requires a constant feed of 0.59 kWh, thereby yielding the input/output ratio of 1.32/0.59=2.24:1.

It should be noted that it is possible to operate the generator under a lower temperature range, for example 30° C. rather than 40° C., thereby possibly increasing the net output for each operation cycle of the generator (1.67 kWh instead of 1.32 kWh). However, this may also yield a lower number of cycles per hour, thereby reducing the overall energy production of the generator.

The above calculations are provided with respect to specific parameters which depend on materials, COP, temperature range etc., and taking into account various losses, heat leaks, compensation factors etc. These parameters can be varied to achieve different end results by the operation of the generator which may exceed (and also possible be lower than) the results presented above.

Turning now to FIGS. 50A and 50B, yet another example of a generator is shown, generally designated as 5000, and is shown associated with a solar installation configured for providing the high temperature fluid thereto. In contrast to previously described generators (1, 2000, 3000 and 4000), the present generator is configured for receiving high temperature fluid from an external source which operates as the heat differential module. In the present example, the temperature differential module is a solar installation, but it is appreciated that it can also be a power plant, coal burning installations and the like.

The generator 5000, similar to previously described generators comprises two pressure vessels 5200, a generator unit 5500, a conversion unit 5300, gradient tanks 5600, radiators 5400 and a storage tank 5900. However, contrary to previously described generators, the generator 5000 does not comprise a heat differential module (e.g. 4100). This is because the generator 5000 is configured for operating with a given heat source e.g. solar heated fluid, heated fluid from a power plant etc.

Another difference between the generator 5000 and previously described generators is that the pressure fluid contained within the pressure vessels 5200 is a gas (not liquid), and is not maintained at a pressure of approx. 100 atm. (as opposed to 6000 atm. in previously described examples).

One effect of this change (from liquid to gas) is that it eliminated the use of gas pistons used to compensate for the incompressible nature of liquid used in the previously described examples.

Turning now to FIGS. 52A and 52B, the gradient tanks 5600 and the storage tank 5900 are in fluid communication with the pressure vessel via appropriate piping lines $L_{A2}$ and $L_{F1}$. It is also noted that the gradient tank 5600 is in fluid communication with the radiator units 5400 via pipe-lines $L_R$, since the fluid contained therein needs to be constantly cooled-down as will now be explained.

The operation of the generator 5000 will now be explained:

an initial position in which the gas in the pressure vessel 5200 is fully heated, i.e. it reached its maximal temperature of approx. 225° C.;

the temperature of the environment is approx. 25° C.;

the temperature of the high temperature fluid in the storage tank 5900 is approx. 250° C.; and the temperature of the low temperature fluid is approx. 30° C.;

In the initial position, low temperature fluid from the gradient tank 5600 passes through the radiator 5400 and is emitted via valve K into line $K_2$. During this stage, the low temperature fluid cools down a little bit further via a heat exchange process with the slightly cooler environment, so as to ensure that the fluid enters the pressure vessel 5200 at low temperature.

From there, it enters port B2 to enter the core 5240 of the pressure vessel 5200 to perform a heat exchange process with the high temperature gas. As a result of this heat exchange process, the gas delivers its heat to the low temperature fluid which subsequently heats up. The gas can thus be cooled down to approx. 50° C.

The heated low temperature fluid is emitted from the pressure vessel 5200 via valve A and is diverted, via port $A_2$ to the port F. From there, the heated low temperature fluid is provided via valve F and port F2 back into the gradient tank 5600. In particular, first quantum of heated low temperature fluid is emitted from the pressure vessel 5200 at a relatively high temperature of approx. 200° C. while the last quantum of heated low temperature fluid is emitted from the pressure vessel 5200 at a lower temperature, so that the gradient tank 5600 contains heated low temperature fluid with a temperature gradient ranging from 50° C. at the bottom 5612 of the tank 5600 to 200° C. at the top of a gradient spiral 5620 contained within the tank. However, it is important to note that the tank 5600 still has some additional space at the top thereof 5614 above the gradient spiral 5620 which still contains low temperature fluid at it original low temperature.

It is noted that each quantum of low temperature fluid that passes through the pressure vessel 5200 heats up to a different degree, and therefore, at the end of circulation of the low temperature fluid, the gradient tank will contain quantums of fluid, where at the top of the tank 5600 there is fluid at the highest temperature and at the bottom of the tank, at the lowest temperature.

Once heating of the pressure vessel 5200 is to be performed, before passing high temperature fluid from the storage tank 5900, the gradient fluid in the gradient tank 5600 is passed through the pressure vessel 5200 but in a reverse quantum order, i.e. entering via line LA2 and distributor A. In this manner, the first quantum of gradient fluid to enter the pressure vessel 5200 is at a lowest temperature, causing the gas in the pressure vessel 5200 to heat up gradually (since each quantum passing is of a slightly higher temperature). The cycle time for this stage can be, for example, about 30-60 seconds.

During the above operation, circulation of the fluid is not restricted to high speed flow, and can be performed at a slow rate. However, during the end of this stage, circulation can be accelerated in order to provide a more effective cooling when the gas temperature approaches the low temperature. In particular, the circulation is not required to be at high flow speed to allow the low temperature fluid to absorb the heat from the gas within the vessel 5200.

At a second stage of operation, preliminary heating of the gas within the pressure vessel 5200" takes place using the heated low temperature fluid within the gradient tank 5600 (this concept is similar to the previously discussed heat gradient recovery configuration).

During this stage, the heater up low temperature fluid from the gradient tank 5600 is provided to the pressure vessel 5200 starting from the last quantum (i.e. the lowest temperature quantum) at the bottom of the tank 5600 and ending with the highest temperature quantum at the top of the gradient spiral 5620. As a result, the cooled down gas within the vessel 5200 gradually heats up due to a gradual beat exchange process with the gradiented low temperature fluid.

The cooled-down low temperature fluid proceeds with flowing through the radiator 5400 to further cool down and is returned to the top end of the gradient tank 5600.

At the end of the above described stage, the gas within the pressure vessel 5200 has re-heated to an intermediate temperature of about 175° C., and is now ready for the third stage of being heated by the high temperature fluid within the storage tank 5900.

Thereafter, the third stage begins during which the gas within the pressure vessel 5200 is further heated up by the high temperature fluid. Specifically, high temperature fluid flows from the top of the tank 5900 into valve B and port $B_1$ into the vessel 5200". Within the vessel, a heat exchange process takes place during which the gas is heated to about 225° C., while the high temperature fluid is cooled down. The cooled down high temperature fluid is returned to a bottom of the storage tank 5900 via valve A and port $A_1$.

It is important to note that this stage should be performed while gradually increasing the flow speed of the high temperature fluid so as to provide constant heat transfer between the fluid and the gas.

One difference between the present generator 5000 and previously described generators is that during the third heating stage, low temperature fluid from the gradient tank is circulated in a closed loop through the radiator to guarantee that all the fluid within the gradient tank 5600 is indeed at low temperature which is required during the next stage of operation (first stage). This is performed via valves K and F and ports K1, and F1 and F2 respectively.

Turning now to FIGS. 51 and 53A to 53E, the core 5240 of the pressure vessel 5200 is shown comprising a sub-structure having a central conduit 5242 and radial supports 5241. The radial supports 5241 further have extensions 5246 extending beyond a ring 5249 encompassing the conduit 5242 and supports 5241. The entire sub-structure is contained within a grill 5243.

With particular reference to FIG. 53B, it is observed that in operation, although the sub-structure is filled with fluid (via orifices e formed in the plate 5247), the flow of fluid takes place between the sub-structure and the grill 5243. In other words, the cross-sectional area in which the fluid actually flows is the annular ring formed between the sub-structure and the grill 5243. However, the sub-structure is filled with the fluid which provides it with mechanical stability and integrity.

It is also noted that the plate 5247 can be made of an insulating material in order to prevent heat transfer between the fluid contained within the sub-structure and the fluid flowing between the sub-structure and the grill 5243.

Turning now to FIGS. 53A to 53C, the pressure vessel 5200 differs from previously described vessels in its inner construction. Specifically, the differences lie in division of the pressure vessel 5200 into compartments and the revolution of the core.

With particular reference to FIGS. 54B and 54C, the pressure vessel 5200 is divided into a main compartment 5212 and an auxiliary compartment 5214, the former containing the core 5240 and the latter containing a driving motor 5260 configured for revolving the core 5240.

It should be noted that although the vessel 5200 is divided into compartments, they are still in fluid communication with each other, so that gas is contained within both compartments. As a result, the temperature of the fluid contained within the auxiliary compartment is expected to be the average between the high temperature and the low temperature, e.g. (225+50/2=137.5° C.).

It should also be noted that since the gas in the auxiliary compartment 5214 is not required to be heated/cooled as part of the power generating process, the amount of gas which is used for the process is only that contained within the main compartment 5212, thus reducing the amount of gas and increasing the efficiency.

In operation, the driving motor 5260 operates a first gear 5262 which interacts with a second gear 5264 which is associated with the grill 5243 of the core 5240. The entire core 5240 is supported by a steel axel 5223. It is important to note that during operation of the generator 5000, only the grill 5243 is configured for revolving about the central axis of axle 5223, while the plastic sub-structure (5241, 5246 and 5249) remains stationary.

One advantage of the above construction is that the driving motor 5260 is contained within the pressure vessel 5200, eliminating the need for sealing means required when driving an element within the pressure vessel using a motor located outside it.

It is also appreciated that due to the elimination of sealing means, the revolution speed of the core 5240 can be considerably increased without exhausting additional power (compared to a case where the motor is located outside the vessel).

In addition to the above, the following should be noted:

- the sub-structure is made of an insulating material, so that the majority of heat transfer takes place between the passing fluid and the grill 5243;
- the grill 5243 is configured, due to its shape, to withstand the pressure of the gas of the pressure vessel 5200 even when the core is not filled with a fluid; and
- the pressure within the core 5243 can be slightly higher than that of the gas facilitating reduction in leakage of the gas outside the pressure vessel 5200.

In connection with the above described generators 5000, the following should be indicated:

- the storage tank 5900 can be configured to receive high temperature fluid from an external source, e.g. a power-plant, a coal-burning station, nuclear facility, solar installation, geothermal power, dams, water generated electricity etc.;
- the fluid within the storage tank 5900 can be configured to be heated by an external power source, for example, solar installation, power station, generator etc. Thus, in effect, the storage tank operates like a battery—storing electricity in the form of high temperature fluid which can later be used (for example during the night) to produce energy by the generator 5000;
- the above installations emit high temperature fluid as waste fluid which may be used to generate electricity. At present, this high temperature fluid is used to directly provide heat to certain facilities (e.g. for preventing freezing of in cold countries or for pre-heating processes related with the operation of the facility itself);
- using the high temperature fluid in the present generator, allows generating additional electricity, thereby a facility as suggested above working in conjunction with the described generator would gain higher efficiency in producing electricity. For example, a fossil-fuel (coal) power plant operates at an efficiency of up to 60%, whereby using the generator allows extracting about an additional 75% of the remaining 40%;
- it is also appreciated that during the night-time, the efficiency of the generator can be slightly increased due to the increase in the temperature difference between the high temperature fluid and the outside environment;
- the generator can even be used for operating in space in conjunction with a solar installation for providing heat to the high temperature fluid. One of the advantages of such an operation lies in the quick cooling down of the gradient fluid via the outside environment;
- although the gradient tank is configured for use with liquids (since gas have a higher tendency of mixing, even within the gradient spiral), the system can still utilize steam as a high temperature fluid, and once it cools down via heat exchange with the gas within the pressure vessel, at least some of it is condensed and can be used as low temperature fluid within the generator;
- use of the high temperature fluid can be performed when the high temperature fluid is at the critical point in terms of temperature and pressure. In this manner, it is possible to utilize the latent heat stored within the high temperature fluid; and
- it is also possible to increase the diameter of the cored and increasing the pressure without changing the diameter of the pressure vessel. Thus, the surface area of the core is effectively increased and can yield a better efficiency of the generator;
- in general, the generator can be configured for generating 0.5 MW of electricity per cubic meter of fluid.

Turning now to FIG. 54A, another example of a generator is shown, being generally designated as 6000. The difference between the generator 6000 and the previously described generator 5000 lies in the following:

- the high temperature fluid from the external source is used to heat up a portion of the fluid contained within the generator instead of being passed through the pressure vessels 6200 itself; and
- the storage tank 5900 is eliminated.

In operation, high temperature fluid $H_{in}$ enters a heating chamber 6700 via an inlet port 6710, and performs a heat exchange process with a portion of the fluid contained within the piping of the generator 6000. As a result, the high temperature fluid is cooled down and emitted from the heating chamber 6700 via an outlet 6714.

With particular reference to FIG. 54B, it is observed that some of the piping of the generator 6000 passes through the heating chamber 6700, specifically, entering the chamber 6700 via line $L_{A2}$ and port Po and being emitted, at a higher temperature after heat exchange with the high temperature fluid, via port Pi and line $L_{B2}$.

However, it is appreciated that the generator 6000 can be configured for operating in conjunction with a storage tank 6900 (not shown), which can be configured for containing that portion of the fluid to be used as a high temperature fluid for heating the gas within the pressure vessels 6200.

Alternatively, it is also appreciated that fluid at a high temperature from an external source (power station etc.) can be used directly as the high temperature fluid of the generator 6000.

Turning now to FIG. 55A, yet another example of a generator is shown, being generally designated as 6000'. The generator 6000' is similar to the previously described generator 6000, with the following major differences:

- the generator 6000' comprises a storage tank;
- the generator 6000' comprises a combustion chamber 6700' based on fuel or some other means of combustion;
- the combustion chamber 6700' is used for heating the fluid contained within the storage tank 6900' and raising its temperature to be used as the high temperature fluid; and
- vents 6740' are provided, configured for supplying the combustion chamber 6700' with heated air for increasing the efficiency of the combustion process.

Turning now specifically to FIG. 55B, the heating cycle is shown in which the storage tank 6900' is associated with the combustion chamber via an outlet line $L_{out}$ and an inlet line $L_{in}$, leading fluid from the storage tank 6900' to the combustion chamber and returning heated fluid from the combustion chamber 6700' back to the storage tank 6900' respectively.

In particular, the combustion chamber 6700' is provided with fuel (or any other means of flammable/combustible material) via inlet 6710'. The fuel is then burnt within the combustion chamber 6700' so that the heat emitted by the combustion process is provided to the fluid from the storage tank via a heat exchanger (not shown).

Turning now to FIG. 55C, an air heating cycle is shown comprising vents 6740' extending and providing fluid communication between the combustion chamber and the radiator unit 6400'.

In construction, gradient tank 6600' is connected to the radiator unit via appropriate piping, in particular, lines $L_R$ and $L_K$ leading from the gradient tank 6600' to the radiator unit 6400' and from the radiator unit 6400' to port K respectively.

In operation, heated fluid from the gradient tank 6600' flows during its cooling cycle (i.e. the cycle performed in order to return the heated low temperature fluid to its low temperature via heat exchange with the environment) through line $L_{K1}$ and into port K, then passing through line $L_K$ to reach the radiator unit 6400'.

In the radiator unit, heat exchange is performed with the environment during which the heated low temperature fluid returns to its low temperature, while air from the environment is heated up. The cooled down low temperature fluid then flows back to the gradient tank 6600' via line $L_R$, while the heated air is directed via the vents 6740' into the combustion chamber in order to increase the efficiency of the combustion process. It is appreciated that using slightly higher temperature air within the combustion chamber provides a higher efficiency in burning fuel.

Under the above arrangement, the same vents 6740' used for cooling of the gradient fluid via heat exchange process with the environment are the same vents facilitating provision of heated air to the combustion chamber 6700', thereby fulfilling a dual purpose.

Turning now to FIG. 55D, a residual heating cycle is shown comprising a chimney arrangement 6760', 6770' and 6780' which is associated, via relevant piping, to the gradient tank 6600'. specifically, the gradient tank 6600' is configured for entering the middle portion 6770' of the chimney arrangement via line $L_{P2}$ end being emitted therefrom via line $L_{B1}$.

In operation, when using heated low temperature fluid within the gradient tank 6600' in order to heat the gas within the pressure vessel 6200' (before being heated by the high temperature fluid), the heated low temperature fluid first passes into the middle portion 6770' of the chimney where it is heated by heat from the exhaust gasses of the combustion chamber. This process can add several degrees of heat to the gradient fluid, after which it is emitted via line $L_{B1}$ and enters the pressure vessel 6200'.

It is appreciated that once the temperature difference between the quantum of fluid emitted from the gradient tank 6600' and that of the exhaust gasses is sufficiently small, the heat exchange process between the two becomes less effective (taking too long), and it is therefore beneficial to stop the residual heating cycle and use the gradient fluid directly within the pressure vessel 6200'.

Turning now to FIG. 56A, yet another example of the generator is shown, generally designated as 6000", being similar to the generator 6000', with the major difference lying in the construction of the heat exchanger which is absent in the generator 6000".

In construction, the generator 6000" comprises a heat exchanger in the form of two heating vessels 6800", vertically oriented with respect to the generator 6000". The heating vessels 6800" are consecutively arranged to be in fluid communication with exhaust gas emitted from the combustion chamber. The pressure vessels 6800" are also associated with appropriate piping extending to and from the storage tank 6900".

In essence, the pressure vessels 6800" are an arrangement configured for extracting the heat from the exhaust gasses of the combustion chamber and providing this heat to the fluid contained within the storage tank 6900" via the above piping.

Turning now to FIGS. 56B to 56E, the arrangement is such that the lower heating vessel 6800" is connected to the combustion chamber via an inlet vent 6762" and to the upper heating vessel 6800" via an outlet vent 6764". The upper heating vessel 6800" is further connected to a chimney 6770", 6780" (similar to chimney 6770', 6780' previously described) via a vent 6766".

It is observed that the storage tank 6900" is connected to an inlet line Lin configured for providing fluid from the storage tank to the top of the upper heating vessel 6800", and is further connected to an outlet line Lout configured for providing back heated fluid from the lower heating vessel 6800" into the storage tank 6900".

In operation, fuel is burnt in the combustion chamber 6700", emitting high temperature exhaust gasses. The gasses pass up the heating vessels 6800" which the fluid from the storage tank 6900" passes in the opposite direction via appropriate piping.

It is interesting to note that the heating vessels 6800" have a similar construction to that of the pressure vessels 6200". The fluid to be heated passes within the core 6840" of the heating vessel 6800" while the exhaust gasses pass between the core 6840" and the hull 6820" of the vessel 6800".

As in the pressure vessels 6200", the core 6840" is configured for revolving using appropriate motors 6850", and hence posses most of the heat transfer qualities provided by the construction of the pressure vessels 6200" which was already discussed before.

With reference to FIG. 56E, it is observed that the chimney 6780" comprises a regulating throttle 6782", configured for regulating the pressure within the heating vessels and combustion chamber 6700".

It is appreciated that the more the throttle 6782" obstructs the exhaust gasses from the chimney, the higher the pressure within the vessels 6800" and the more efficient the heat transfer between the exhaust gasses and the passing fluid. This can contribute to a shorter heating vessel 6800". However, increasing the pressure by closing the throttle 6782" also creates a higher pressure within the combustion chamber 6700", which requires more powerful vents to create an efficient burning process. Thus, a certain optimization should be performed in order to provide, on the one hand, a decent heat exchange process and on the other hand, eliminate excessive use of power for the vents. Such optimization can be performed by the controller previously described with respect to other examples of the generator.

It is also appreciated that the arrangement described with reference to FIGS. 56A to 57D, provides an extended space in which the exhaust gasses are free to move. In other words, the heating vessels 6800" can also be considered as a chimney of sorts, however, comprising an arrangement (via the core) for effectively transferring the heat from the gasses into the fluid to be heated.

It is also appreciated that the longer the vessels 6800", the better the heat transfer. In particular, the reason for the vertical orientation of the vessels 6800" lies in the natural tendency of hot air and gasses to rise up, thereby utilizing the inherent qualities of the gasses for the purposes of the generator 6000". Alternatively, it should be noted that the heating vessels 6800" can be oriented horizontally.

Additional reference is made to FIG. 57E, in which another example of a core is shown, generally designated 6240''' which can be used in conjunction with the previously described examples 6000, 6000', 6000" and others. The core 6240''' is considerably longer than those disclosed in the above examples, for which purpose, radial supports 6270''' and longitudinal supports 6280''' have been provided.

Each of the radial supports 6270''' comprises a tin casing 6272''' containing therein the frame 6274''' of the support. Each of the longitudinal supports 6274''' is in the form of a long bar 6284''' contained within a tin casing 6282'''. In both of the supports 6270''' and 6280''', the tin casings 6272''' and 6282''' respectively contribute for the reduction of heat losses by isolating the supports from the pressure fluid in which the core 6240''' is submerged.

With particular reference to FIG. 58, it is appreciated that the generator 6000" comprises a similar residual heat arrangement as that described with reference to the generator 6000'. However, it is appreciated that due to the construction of the generator 6000", and in particular due to the orientation of the vessels 6800", the chimney is now located at a greater height.

Furthermore, according to a specific example (not illustrated herein), the entire residual heat arrangement can be eliminated, leaving only the top portion 6780" for accommodating the throttle 6782". Eliminating the chimney may provide additional space which can be utilized, for example, for an additional heating vessel.

The generator 6000" described above can be used as a motor for various transportation means, e.g. marine vessels, automobiles, trains etc. In this connection, one of the advantages of such a generator is its continuous operation (fuel is constantly burned within the combustion chamber 6700").

Among other advantages of the generator 6000" described above, is the advantage of being able to use of the generators 6000, 6000' and 6000" in conjunction with an existing power generating station, thereby using its residual heat for the operation of the generator.

Turning now to FIGS. 59A to 59E, a cross-sectional slice of a pressure vessel 7200 is shown, having a core 7240 which can be used in a majority of the previously described pressure/heating vessels.

In particular, the core 7240 comprises, similar to previously described cores 6240, 6240' and 6240", a substructure and a grill 7243. The sub structure is comprises a middle conduit 7242, radial supports 7241, a support ring 7249 and radial sub structure winglets 7246, radially extending beyond the support ring 7249. In the present example, the winglets 7246 are an extension of the radial supports 7241.

In addition, the core 7240 also comprises a set of external fins 7247, radially extending with respect to the core 7240 and located outside the grill 7243.

With specific reference being made to FIGS. 59C to 59E, it is noted that there extends a first gap G1 between the winglets 7246 and the grill 7243, and a second gap G2 between the fins 7247 and the grill 7243.

The grill 7243 is formed with a plurality of ridges extending circularly about the central axis thereof. It is appreciated that these ridges increase the overall surface area of the grill 7243 and thereby contribute to a more efficient heat exchange process between the grill and the fluid/gas. It is also noted that in the figures, the ridges are shown to be of greater size (proportional to the dimensions of the grill 7243) than they really are. This is done for illustrative purposes since using the actual number and dimensions of the ridges will result in the grill appearing black (due to the ridges areal density).

The grill 7243 is configured for revolving about the central axis thereof, while both the winglets 7246 and the fins 7247 are configured for remaining static. Under this arrangement, when the grill 7243 revolves, it carries with it a layer of fluid (gas/liquid) adjacent to its inner and outer surfaces, thereby circulating it. The winglets 7246 and fins 7247 on the other hand, prevent circulation of that portion of the circulated layer which is farther from the grill 7243, whereby a very effective and localized heat exchange process takes place on the boundary of both the inner and outer surfaces of the grill 7243.

Turning now to FIGS. 60A to 60E, another cross-sectional portion of a pressure vessel 7200' is shown, having a core 7240' which can also be used in a majority of the previously described pressure/heating vessels.

It is observed that the main difference between the core 7240' and the previously described core 7240 lies in the orientation of the winglets 7246 and fins 7247. Specifically, the winglets 7246' are tipped slightly counter clockwise while the fins 7247 are tipped in the exact opposite direction (clockwise).

Under this arrangement, the grill 7243' is configured for revolving in a clockwise direction. As a result, when a quantum of gas contained between the pressure vessel 7200' and the grill 7243' comes in contact with the grill 7243', it performs a heat exchange process with the fluid circulating between the grill 7243' and the support ring 7249'. Thereafter, due to revolution of the grill 7243', that quantum is urged away from the grill 7243' due to the fin 7247', which directs the heated quantum of gas to perform a heat transfer process with the remainder of the gas located far from the grill 7243'. Simultaneously, the circulated fluid contained between the support ring 7249' and the grill 7243' is held back from circulating by the winglets 7246'.

It is however appreciated that the direction of revolution of the grill 7243' can also be set to a counter clockwise direction, whereby gas is urged towards the grill 7243' while the fluid within the core 7240' is urged away from the support ring 7249'.

Turning now to FIGS. 61A to 61C, another generator system is shown generally designated as 8000 and is based on the provision of high temperature work fluid from a solar installation S operating in conjunction with the generator system 8000.

As in previous systems, the generator system 8000 comprises pressure vessels 8200, pistons 8300, radiators 8400, a gear mechanism 8500, gradient tanks 8600 and a storage unit 8900 (similar elements have been designated by numbers upped by 1000 compared to the previous example).

Turning to FIGS. 62A to 62D, the main difference in the design of the present generator system 8000 lies in the design of the pressure vessels 8200. Specifically, each pressure vessel 8200 comprises an outer core 8230 and an inner core 8240, both being located within the external shell 8202 of the pressure vessel 8200.

The arrangement is such that there are formed three spaces within the pressure vessel 8200—the intermediate space $SP_A$ between the cores 8230, 8240 and the inner space $SP_B$ of the inner core 8240 and outer space $SP_B$ between the outer core 8230 and the shell 8202 which are in fluid communication with one another. Fluid communication can be provided using a 100 mm tube or pipe (not shown) which allows balancing the pressure between the $SP_B$ spaces.

In this particular example, the diameters of the cores 8230, 8240 are chosen such that the volume of the inner space of the inner core 8240 is about the same as the volume of the outer space between the outer core 8230 and the shell 8202.

The intermediate space SPA between the cores 8230 and 8240 can be very small, ranging between 5 mm to 20 mm. The importance of this distance will be discussed later on with respect to the operation of the pressure vessels 8200.

Each of the cores 8230, 8240 is provided with its respective motor 8250, 8260 respectively, configured for rotating the cores in opposite directions, i.e. the inner core 8240 is configured for rotating CW while the outer core 8230 is configured for rotating CCW.

Thus, in operation, work medium (e.g. water) is passed through the space $SP_A$ and is configured for performing a heat exchange operation with the pressure medium (e.g. Helium) contained in the spaces $SP_E$ during rotation of the cores.

In this respect, it is appreciated that the small gap G formed between the cores defining the space $SP_A$, provides for several advantages during the operation of the pressure vessel 8200:

- during rotation of the cores, the narrow gap increases the turbulence within the work medium passing through the gap SPA, thereby making the heat exchange process more efficient; and
- The narrow gap also allows reducing the boundary layers formed on the surfaces of the cores allowing further increase in efficiency;

It is appreciated that while reducing the gap between the cores allows reducing the boundary layers, it also increases the amount of energy required to pass fluid through the gap. Thus, a certain optimum should be obtained between the effectiveness of the narrow gap G and the energy required for circulating the work fluid.

During rotation of the cores, the work medium (water) and the pressure medium (Helium) adhere to the surfaces of the cores and are spun around therewith. As a result of centrifugal forces, the mediums are urged radially outwardly, so that convection is greater between the mediums and the inner surface of each core than between the mediums and the outer surface of each of the cores.

In order to increase heat transfer in compliance with the above described operation of the cores, the arrangement of the cores can be as follows:

- The cores can rotate at about 1000 RMP (for a core of a diameter of about 650 mm); and
- The cores can be made of a material possessing both high mechanical strength and high conductivity e.g. copper, aluminum and magnesium. 4340 steel can also be used despite its lower conductivity since it can be rotated faster due to its mechanical and structural properties and so compensate for its conductivity properties).

The surfaces of the cores can be formed with an increased surface area, for example, in the form of a rough surface quality of teeth 8238, 8248 formed on the core surface.

However, in this connection, the difference in conductivity between the inner and outer surfaces of the cores 8230, 8240 can be compensated either by providing different surface characteristics to each such surface. In particular, the inner surfaces can be formed with bigger teeth (deeper slots between two neighboring teeth). It is also appreciated that flatter, smaller teeth are easier to manufacture and also add less weight to the core than bigger teeth.

Alternatively, compensation of the centrifugal effects can be performed by controlling the rotation speeds of each core so that, for example, the outer core revolves slightly faster than the inner core 8240.

In particular, this effect is more evident with respect to the outer surface of the outer core 8230. Within the gap G of the space SPA, the narrowness thereof doesn't allow sufficient escape of fluid medium from between its teeth.

In connection with the above, the heat exchange process within the pressure vessel 8200 is such that the majority of heat from the work medium is transferred to the pressure medium and vise versa. For example, this can account for approx. 75% of recycled energy which would otherwise be wasted on heating of the cores themselves.

The above arrangement of the core can make it particularly useful as a heat exchanger in other installations which can replace the common radiator fin-based heat exchanger, thereby overcoming the common problem of clogging between neighboring fins of the radiator.

Attention is now drawn to FIGS. 63A and 63B in which the pressure vessel 8200 is shown to include an extension 8700 turning it into a T-shaped vessel. The extension comprises a piston contained within the main shell and is divided into three spaces 8702, 8704 (within the piston) and 8706 (between the piston and the pressure vessel 8200). by a piston 8730.

The space 8702 is in fluid communication with the work piston 8300 via an outlet 8740 while the space 8706 is in fluid communication with the pressure vessel 8200.

It is appreciated that the extension increases the overall volume of the pressure medium by at least about 1.5 time, entailing an increase in the production of energy by the generator compared to a generator only having a straight pressure vessel (as in previous examples). Such a generator system may be able to provide, for example 20 MW of electricity (but can go up to 100 MW, 200 MW or even more).

In addition, the T-shaped pressure vessel allows for a more efficient circulation of the pressure medium (in this case Helium) since the revolving outer core 8230 constantly draws helium into the vessel 8200 on one side (depending on the direction of revolution) and emits the helium back to the T-shaped chamber 8700 in the opposite direction (this is opposed to previous examples in which the pressure medium which performed work remained in the same space after expanding).

In order to increase this circulation, a ventilation device 8726 is provided in the space 8706. It is noted that the ventilation device 8726 is not located along a central axis of the space 8706 but is rather offset towards the direction in which the revolving cores withdraw the helium from the space 8706.

With additional reference to the above figures, in the present example, as in previous examples, the expansion of the pressure medium is translated into motion of a work piston 8300 which drives an intermediate pressure medium (in this case oil) into the gear mechanism 8500. In particular, the diameter ratio between the T-shaped extension 8700 and the piston 8300 is about 5:1 entailing a considerable displacement of the piston 8320 of the work piston 8300 compared to the displacement of the piston 8720.

For example, the T-shape of the pressure vessel can be of diameter 1250 mm (similar to the pressure vessel) and the vessel itself can be 3000 mm long. Respectively, the work piston can be of diameter 250 mm.

In addition, the piston 8730 comprises a seal (not shown) which is located at about the middle point of the piston 8730 and therefore almost does not come into contact with the high temperature helium circulating within the T-shaped extension 8700.

In connection with all of the above, it is appreciated that all components coming in contact with the work fluid or pressure fluid can be isolated from the inside and/or outside (except for the core components which take part in the heat exchange process), with a material having low heat conductivity (about 0.1 W/m-k). However, piping leading fluid to be cooled can be without insulation while piping leading heated fluid can be insulated from the inside.

In order to increase the efficiency of the heat exchange process, at least one of the following features can be provided:

- The teeth of one core are at an offset with respect to the teeth of another core (ridge facing trough), thereby allowing reducing the gap between the cores; and
- Forming one core with a CW spiral and the opposite core with a CCW spiral.

Operation of the generator system 8000 will now be described:

In general, operation is performed in three pulses, lasting about 20 seconds altogether, as described below:

Cooling—From a position in which the piston 8730 is at an upwards position (after being displaced upward by heated expanded helium), cooling of the helium takes place by passing increasingly cooled work fluid from the gradient tank 8600 as follows: cooled work fluid is pumped form the top of the tank 8600 passing through the radiators 8420 and into junction K from which it is passed into the core via junction B. Thereafter, the heated work fluid is passed out of the core 8200 via junctions A and F into the gradient tank. This pulse takes about 10 sec.

Primal heating—heated work fluid is passed from the gradient tank 8600 from the bottom thereof via junctions F and A into the core 8200 and evacuated therefrom via junctions B and K into the top portion of the gradient tank. This lasts about 7 seconds bringing the helium up to an intermediate temperature. It is noted that it cannot bring the helium back to its original temperature (no infinite heat exchange).

Final heating—high temperature work fluid from the top portion of the storage chamber 8900 is provided to the core via junction B and is evacuated therefrom via junction A to the bottom portion of the storage chamber 8900. This can take about 3 seconds and requires rapid circulation of the high temperature work fluid from the tank 8900.

It is noted that during this period, the work fluid contained within the gradient tank 8600 can be further cooled via circulation which does not include the pressure vessel 8200, e.g. from the bottom of the tank 8600 to the radiator 8400 via junction K and back to the gradient tank via junction F.

Needless to note that during this operation at one side of the generator system 8000, the opposite side of the generator system performs the exact opposite stages. In other words, while the helium in one pressure vessel heats up, the helium in the other pressure vessel cools down and vise versa.

It is appreciated that in the present example, as well as in all other described examples, it can be beneficial to use counterflow, i.e. the work fluid progresses along one direction within the pressure vessel while the pressure medium progresses in the opposite direction. Furthermore, the above described core can be used in other examples of the generator previously and hereinafter described.

Attention is now drawn to FIGS. 65A and 65B in which another example of a generator is shown, generally designated as 9000. The generator 9000 is generally similar to the generator 8000 previously described with the main differences lying in:

- The configuration suited for use with a solar installation;
- the design of the pressure vessel 9200 and cores;
- the diameter of the gear 9500;
- the manner of transferring the pressure medium from the cores to the gear;
- the stages of operation; and
- the storage chamber 9900 being used as a heat absorbing body.

These differences will now be discussed in detail:

Attention is now drawn to FIGS. 66 to 67C. Contrary to the previous design of two oppositely revolving cores, the present design comprises a plurality of core units 9240 which are consecutively arranged within the pressure vessel 9200.

Each core unit comprises an outer shell 9242, an inner shell 2940, a perforated plate 9270, and a flow limiter 9280, thereby generating a maze through which the pressure fluid is to pass.

The arrangement is such that all the cores are immersed in work fluid (water) while the pressure fluid passes through the pressure vessel 9200. In particular, with reference to FIG. 66D, it is observed that the pressure fluid is configured to occupy the majority of the space of the cores but is spread throughout due to the design of the perforated plate and flow limiter 9280.

Similarly to the previous example of rotating cores, the gap G in the present example is realized between the revolving core units and the housing of the pressure vessel 9200, leading to a similar effect of high turbulence and sheering of boundary layers.

The above design allows increasing the length of the path through which the work fluid and pressure fluid should pass during the heat exchange process, i.e. increasing the overall surface through which heat exchange is performed, thereby increasing its efficiency.

Similarly to previous examples, the present cores revolve and make use of the centrifugal forces generated during rotation. In this particular example, the core units revolve together as a single body. However, this is not compulsory as each unit can be allowed to revolve independently.

In addition, it is important to note that, during cooling, passing fluid through the pressure vessel serves not only for cooling of the helium but also for generating a work fluid at a gradient temperature. Thus, lengthening the flow path entails that the first portion of work fluid to exit the pressure vessel will be at the required temperature (slightly lower than the pressure medium) without slowing down the velocity of the flow.

Reverting to FIGS. 66A to 66E, in operation, pressure fluid is provided to the pressure vessel 9200 via an inlet Pi1 and it removed therefome via outlet Po1. Simultaneously, work fluid is provided to the pressure vessel 9200 via an inlet Pi2 and is removed therefrom via outlet P02.

Turning now to FIG. 69, it is first noted that the space 9350 accommodating the piston 9520 comprises separate piping for the inlet and the outlet of helium into and from the piston arrangement 9300. This is opposed to previous examples in which the pressure medium simply increased and decreased in volume within the same space.

As a result of the above and due to the increase in the dimensions of the piston 9300, the majority (about ⅔) of the helium is contained within the piston 9300 and piping and not within the core 9200.

It is also noted that the inlet opening is located at the edge of the piston 9300 while the outlet opening configured for removing helium from the piston 9300 is located deep in die the piston. This urges the helium to reach the piston 9320 before leaving the housing 9300 (otherwise, if the outlet had been located at the edge as well, the high temperature helium would exit the housing 9300 immediately as it came in.

It is appreciated that although the gear operates on increase/decrease of volume of the helium, the above reference to circulation refers to circulation of helium of certain temperature (e.g. high temperature helium) which allows a more rapid and effective heat exchange within the volume of the helium itself.

The above arrangement allows using a smaller, more effective core since the majority of the helium is not located within the core and so the losses therefrom are considerably smaller. This is due to the fact that increase/decrease in the core temperature does not entail increase/decrees in volume of the pressure medium. In particular, the percentage of pressure medium within the core (with respect to the overall amount of pressure medium) can dictate the decrease in losses.

It is appreciated that increase in the diameter of work pistons 9300 provides a greater volume for the pressure medium, reducing the percentage of pressure medium contained within the pressure vessel, thereby making the generator 9000 more efficient. In addition, the blowers 9260 constantly circulate the helium within the pressure vessel and gear piston 9300 making the operation more efficient.

Since the piston 9520 is configured to reciprocate within the piston housing 9320, there is a risk that if the piston has a seal thereon, the seal will simply wear out due to the constant reciprocation at high temperature. In addition, using a seal over insulation may also cause rapid wearing of the seal and even more, the reciprocation of the insulation could damage the properties of the insulation.

In order to elegantly avoid the problem, the piston is provided with a thin shell 9350 mounted thereon and configured for reciprocation therewith. The piston 9320 comprises a seal which seals it with respect to the thin shell so that this seal does not move with respect to the shell.

As a result, a portion of the housing 9320 overlapped by the thin shell 9350 can be without insulation while the portion closer to the helium inlet is still insulated. In particular, the gap between the shell and the housing can be small enough (e.g. approx. 2-3 mm) and sufficient for preventing heat losses through convention with the helium in the overlapped portion.

In order to prevent heat losses from the piston housing due to its large surface area, the above insulation of the portion closer to the helium inlet should be sufficient to prevent these losses. However, it is important to note that the thin shell itself is insulated from the inside.

Operation of the generator system 9000 will now be described in detail:

The system operates in four pulses including three heating pulses and a long cooling pulse as follows:

Cooling pulse—cooled work fluid is passed from the top portion of the gradient tank 9600 into the pressure vessel 9200 via the radiator unit 9400 and then through junctions K and B. After being heated, the work fluid is emitted from the vessel 9200 via junctions A and E back into the gradient tank 9600 by virtue of the pump.

Once half the work fluid of the gradient tank 9600 has been passed through the cores, the flow changes so that work fluid is taken from one of the secondary gradient tanks 9630, 9640 via junctions R, K and B and back to the gradient tank via junctions A and E after passing through the core. This pulse takes about 10 sec.;

First heating pulse—work fluid is first passed from the secondary gradient tank into the pressure vessel 9200 until all the work fluid therein is used—approx. 5 sec.;

Second heating pulse—work fluid from the main gradient tank 9600 is used to further heat up the pressure medium (helium) within the cores 9240—approx. 2.5 sec;

Final heating pulse—high temperature fluid from the storage unit 9900 is passed through the pressure vessel 9200—about 2.5 sec.

It is appreciated that a plurality of n secondary gradient tanks can be used (not only two) so that for each of the gradient tanks an n-th second pulse would be provided. For example, for four secondary gradient tanks, each could have a pulse of approx. 1 sec. In essence, splitting the gradient tank into a plurality of secondary tanks is equivalent to forming a single gradient tank with perfect insulation between various portions thereof.

As previously described with respect to system 8000, during the heating pulse, the work fluid in the gradient tanks can be cooled using an independent circulation including the radiator units 9400 and not involving the pressure vessel 9200.

It is appreciated that the storage unit 9900 can be associated with a solar installation configured for heating the water contained therein. In particular, the storage unit 9900 can be constructed with high insulation similar to a thermos, having an internal mirror, vacuum insulation and/or external dark color (e.g. black) configured for preventing heat from escaping from the unit 9900. Alternatively, high temperature work fluid can be provided directly from the solar installation (not shown) via junctions B and A respectively.

With respect to both systems 8000 and 9000 previously described, the cores can be formed with internal and external spirals forming ridges and grooves thereby increasing the surface area of the cores, thereby increasing the efficiency of the heat exchange process.

In particular, the arrangement can be such that the spirals of surfaces facing each other are shifted with respect to one another so that the ridges of one surface are facing the grooves of the opposite surface as shown in FIG. 68C.

In connection with systems 8000 and 9000 described above, it is appreciated that they can be used in conjunction with a system configured for generating high temperature fluid based on heat exchange with high temperature gasses as previously described in systems 6000 and 7000.

Attention is now drawn to FIGS. 70A to 70E showing a different design of the generator system, generally designated as 10,000 comprising a fuel unit 10,100, a gas-heat transfer arrangement 10,200, a gradient spiral arrangement 10,300, a pressure vessel 10,400, a work piston arrangement 10,500, a gear mechanism 10,600, a cooling and recycling arrangement 10,700 and a chimney 10,800.

In general, each of the above components is configured for performing the following:

- Fuel unit 10,100 is configured for burning fuel for generating high temperature gasses to perform a heat exchange process with the work fluid;
- The gas-heat transfer arrangement 10,200 is configured for performing a heat exchange process between high temperature gassers provided by the fuel unit 10,100 and the work fluid (water);

Gradient spiral 10,300 is configured for circulation of work medium therein and for maintaining a temperature difference between different portions of work medium contained therein;

Pressure vessel 10,400 is configured for performing a heat exchange process between the work medium and the pressure medium for causing increase/decrease in the volume of the latter;

Work piston arrangement 10,500 is configured for transforming increase/decrease of volume of the pressure medium into linear movement;

Gear mechanism 10,600 is configured for transforming linear movement into energy/electricity;

cooling and recycling arrangement 10,700 is configured both for cooling of work fluid contained within the gradient spirals 10,300 and for pre-heating gasses of the fuel unit 10,100; and chimney 10,800 is configured for exhausting cooled down gasses.

In operation, fuel is burned in the fuel unit 10,100 whereby the high temperature gasses resulting from the combustion are provided to the gas heat transfer system 10,200. It is noted that the high temperature gasses are provided to the transfer system 10,200 via a pipe so as to enter the system 10,200 at a far end from the fuel unit and progress towards the chimney 10,800.

During the progress through the transfer system 10,200, a heat exchange process takes place with work fluid passing through the transfer system 10,200 in an opposite direction so as to generate a high temperature work fluid at an end close to the gear mechanism 10,500.

The design of both the main and the secondary spirals 10,320 and 10,340 respectively, is such that the overall volume of each spiral is commensurate to the required volume of work fluid required for proper cooling/heating of the pressure medium. In principle, the spirals 10,320, 10,340 are equivalent to the reservoirs discussed in connection with previous examples. It is noted that the diameter of the tubes 10,322, 10,342 forming the spirals 10,320, 10,340 is greater than the diameter of the tube passing through the core of the pressure vessel 10,400. On the one hand, it is desired to make the seals of the core tube as small as possible in order to minimize losses due to escaped heat. On the other hand, using the same diameter for the spirals 10,320, 10,340 will require increasing the overall length of the spiral to accommodate the required amount of work fluid.

Thus, a trade-off is performed in which the spiral tubes are of larger diameter than the core tube (an appropriate adapter can be used to connect the two). The adapted can be rotatable to properly connect the revolving core tube and the stationary spiral tube. In addition, the adapter can include any required seals to allow proper operation thereof.

It is noted that the spiral tubes are insulated from the inside in order to prevent heat losses to the tube itself. As the spiral contains, during certain stages of its operation, high temperature work fluid, if not insulated, the spiral tube itself can absorb the heat, therefore damaging efficiency of the system 10,000. It is appreciated that internal insulation can also be used in all embodiments in similar conditions.

Attention is now drawn to FIGS. 73C to 73F in which the operation of the system will be explained in detail:

In the initial position, the first pressure vessel 10,400*a* contains pressure medium at high temperature Ttop and the second pressure vessel 10,400*b* contains pressure medium at a low temperature of $T_0$.

The first main spiral 10,320*a* has work fluid at temperature Ttop while the second main spiral 10,320*b* has work fluid at gradient temperature ranging from Ttop at an end far from the pressure vessel 10,400*b* and T0 at an end close to the pressure vessel 10,400*b*.

The first auxiliary spiral 10,340*a* has work fluid at gradient temperature ranging from Ttop at an end close to the pressure vessel 10,400*a* and Tmid at an end remote therefrom while the second auxiliary spiral 10,340*b* has work fluid at temperature T0.

During a first stage of operation, the transfer of work fluid from the transfer system 10,200 is blocked and the entire work fluid is circulated in a CW direction in the outer piping. In other words, the fluid contained within the first auxiliary spiral 10,340*a* is transferred to the pressure vessel 10,400 to perform a first stage cooling of the pressure medium from Ttop to close to Tmid. During this time, the remaining work fluid is circulated so that the work fluid contained in the first main spiral 10,320*a* is moved to the second main spiral 10,320*b*, and the work fluid originally in the second pressure vessel and second main spiral 10,320*b* is moved to the second auxiliary spiral 10,340*b*. The work fluid originally contained within the second auxiliary spiral is pushed forward to circulate within the outer piping.

The remainder of the work fluid is circulated within the pipes and some of the heat contained therein is evacuated using the radiator arrangement 10,700. This heat does not go to waste but rather is pumped to the combustion chamber in order to provide higher temperature air for the combustion process.

It is important to note that during this time, no work fluid is circulated within the gas heat transfer system 10,200. However, since the gas heat transfer system continues its operation, the work fluid contained therein keeps heating up.

In addition, as the work fluid circulates along the outer piping, cool work fluid at temperature T0 reaches the pressure vessel 10,400 and reduces the temperature of the pressure medium eventually to T0. It is important to note that this cool work fluid passes through the radiator system 10,700 thereby reducing its temperature to T0.

Following the first stage of operation, the first auxiliary spiral 10,340*a* is at T0, the pressure vessel 10,400*a* is also at T0, the first main spiral 10,320*a* is of gradient temperature ranging from T0 to Ttop.

From this position, the main spiral 10,320*a* remains stationary while work fluid is circulated from the gas heat transfer system 10,200 in the top loop so that at least part of the work fluid contained within the second main spiral moves into the pressure vessel 10,400*b*, sufficient to bring the pressure medium to temperature Ttop. The work fluid of the pressure vessel is pushed into the second auxiliary spiral 10,340*b* etc.

During this stage of operation, the work fluid in the bottom loop does not circulate. However, the pressure vessel remain active, i.e. the core still revolves and performs a heat exchange process between the work fluid and the pressure medium contained therein, thereby further cooling the latter despite lack of circulation of the work fluid.

Following the second stage, the pressure medium in the second pressure vessel reaches Ttop and the work medium in the second auxiliary spiral 10,340*b* has a gradient temperature from Ttop to Tmid.

Thereafter, circulation through the gas heat transfer system 10,200 is again blocked and gradient work fluid from the first main spiral is transferred to the first pressure vessel. Thus, all the work fluid is circulated in a CCW direction about the system in the outer piping.

This results in bringing the pressure medium in the first pressure vessel 10,400*a* to temperature Tmid. In this position, the first main spiral 10,320*a* comprises only high temperature fluid and the first auxiliary spiral 10,340*a* is at gradient from Tmid to T0.

In order to bring the pressure medium to the required high temperature Ttop, the final stage of heating takes place in which the top loop is blocked (no circulation through the second main and auxiliary spirals) and high temperature fluid is provided from the gradient spiral 10,320*a* to the pressure vessel. High temperature work fluid from the transfer system 10,200 replaces, at least partially, the high temperature fluid which was transferred to the pressure vessel, sufficient to bring the system 10,000 back to its initial position shown in FIG. 73C.

In connection with the above, it is appreciated that the work fluid passing through the pressure vessel performs constant reciprocation passing more fluid from the main spiral to the pressure vessel in one direction that cooled work fluid in the other direction. In other words, high temperature fluid is pushed through the pressure vessel in one direction and thereafter, low temperature fluid is pushed in the opposite direction, so, looking at a portion of work fluid passing through the system, it can be observed to gradually travel through its respective loop.

It is also appreciated, that since a portion of the heat introduced into the pressure vessel is always converted into mechanical energy by virtue of expansion of the helium (pressure medium), the overall temperature of the pressure medium is constantly reduces, requiring more high temperature work fluid (at Ttop) to bring the pressure medium to Ttop. In other words, the amount required to bring the pressure medium to Ttop when a portion of it is converted to mechanical energy is greater in comparison with a system in which the pressure medium does not expand and/or a portion of the heat thereof is not converted to work.

Turning now to FIGS. 71A to 72D, the gas heat transfer arrangement 10,200 comprises four fire vessels 10,210 each comprising a housing 10,212 and a revolving inner core 10,220 and a revolving outer shell 10,230.

High temperature gasses are passed through the center of the fire vessel while work fluid is passed through the gap formed between the shell 10,230 and the housing, leading to positive effects on turbulence and boundary layers as previously described. It is appreciated that the fire vessels revolve constantly and do not have to revolve at a high revolution speed as the cores of the pressure vessel which be compensated by length in view of their generally simpler design.

Within the fire vessels 10,210 the pressure for the work fluid vessels is maintained at about 221 atm and is equivalent to the pressure of the work fluid in the remaining components of the system 10,000.

It is appreciated that the fire vessels 10,210 are not required to be of the same design or of the same materials, and, for example, insulation of the fire vessels can be greater closer to the fuel unit 10,100. In addition, the revolution speed can vary from one fire core to the other.

It is noted that when the temperature of the combustion gasses falls lower than approx. 150° C. damage by sulfuric compounds increases considerably. The cores themselves can be made of materials which are resistant to corrosion and damaging effects from the high temperature gasses, especially from sulfuric compounds.

The fire cores are insulated both from the inside and from the outside as they are under constant supply of high temperature gasses and/or work fluid (unlike the pressure vessels which are only insulated on the inside due to constant increase/decrease in the temperature of the fluid contained therein. It is appreciated that the fire vessels operate constantly, even when work fluid is not circulated therethourgh by virtue of constant burning of fuel in the fuel unit and circulation of gasses due to the blowers 10,250 which constantly intake gasses from the outside by the radiator arrangement 10,700.

It is appreciated that providing the ambient heated air through the radiator system 10,700 increases the efficiency of the fuel unit and also maintains pressure (the pressure of intake can be about 10-20 atm). Maintaining the above pressure is beneficial for increasing the efficiency of heat transfer within the fire cores, i.e. making sure that enough high temperature gasses at sufficient amount are contained within the cores in a ny give moment. The above pressure is gradually built up by the intake of the radiator 10,700, the burning of the fuel (increase in gas volume and consequently its pressure) and the blower 10,250.

On the one hand, increasing the pressure of the gasses increases the efficiency of the heat exchange process between the high temperature gasses and the work fluid. On the other hand, increase of the pressure requires providing more power to the blower, and so a balancing trade-off is required.

In addition, the rotation axes of the fire cores can be cooled using a separate cooling system in order to extend their lifespan, allowing the seals and bearings to perform better at lower temperatures. Such cooling can be performed via dedicated cooling apertures at the external portion of the axes (projecting from the fire vessels).

The fire vessel can be made of aluminum and/or copper and/or magnesium, or even steel having a high heat transfer coefficient (compared to iron). However, taking into account that the pressure of the work fluid is 221 atm while the pressure within the core is about 10-20 atms, the material should be such that can withstand the mechanical load on the core. Obviously, an optimization and compromise between the two requirements should be taken into consideration.

In construction of the core 10,222, the working surfaces (inner and/or outer) are formed with teeth as previously described to increase surface area. In addition, the formation of teeth/ridges along the surface provide the fire core with higher mechanical integrity allowing it to withstand the pressure difference between the external pressure of 221 atm and the internal pressure of 10-20 atm.

In addition, the core can comprise winglets configured for revolving (together with the core due to the winglets 10,224 being integrally formed therewith) and circulating the gasses and pushing them towards the external shell 10,232. This circulatory motion can result in a more efficient process allowing reducing the length of the fire vessels 10,210.

The winglets 10,224 are not required to be insulated since the inner temperature of the fire core (at any given location) is generally uniform and at high temperature. Therefore, heating of the winglets does not reduce the heat of the inner space of the fire cores.

In connection with the operation of the gas heat transfer system 10,200, it is appreciated that the gasses reaching the chimney 10,800 are already extremely cooled down (about 10 degrees higher than ambient temperature), being gradually cooled down during passage through the fire cores, so that the damages to the chimney and other damaging effects of exhausting the gasses are reduced.

In the current system 10,000, it is possible to generate electricity with work fluid at a temperature of about 370 deg. centigrade (and even lower to about 100-200 deg.), much lower than in common power stations, in which the desire is to reach a higher temperature as possible (due to steam generation considerations). In this connection, the heat transfer between the work fluid and the fire vessels is maximized, allowing to use the majority of heat generated by the burning of fuel.

Due to the efficient heat recovery of the system 10,000, it is possible to operate the system at temperatures which are much lower than in common power stations. It is appreciated that, in general, the higher the temperature, the higher percent of heat energy is transformed into mechanical energy. In this respect, the present generator 10,000 allows converting a high percent of the heat energy into mechanical energy but at low temperatures due to its efficient heat recovery.

The pressure vessel 10,400 and the piston 10,600 are similar to those described in connection with system 9000.

In addition, the system 10,000 can comprise cooling tanks 10,720 containing work fluid at a T0 temperature. The purpose of these tanks is to make sure that the work fluid that passes through the auxiliary spirals and the radiator arrangement 10,700 indeed reaches a T0 temperature eventually.

In particular, during operation, Tmid temperature work fluid passes through the radiator 10,700 which removes heat therefrom, thereafter mixing with the work fluid of T0 and, at least a part of it is returned to the auxiliary spiral via the radiator 10,700—it is this double pass through the radiator which allows the work fluid to reach the required T0.

Mixing of the work fluid in the cooling tanks 10,720 provides for averaging the temperature of the work fluid eventually progressing towards the gas heat transfer arrangement 10,200, reducing heat fluctuations in the work fluid emitted from the transfer system 10,200 and introduced into the main spirals 10,320.

The tanks 10,720 are not isolated and are configured for performing a natural heat exchange process with the ambient air around in order to remain at T0.

It is appreciated that the generator system 10,000 can also be implemented in any installation including an arrangement configured for producing high temperature gasses. Examples of such installations can either be in mobile installations such as cars, ships, trains etc. or in stationary installations such as power stations, reactors and other industrial facilities.

Turning now to FIGS. 74A to 75B, a variation of the previously described system 10,000 is shown, generally designated as 10,000'. In this example, the difference is that the radiator system 10,700 was reduced down to a single radiator 10,700' and the cooling tanks 10,720 have been reduced to a single cooling tank 10,720'.

In addition, during operation, the flow path of the work fluid is slightly modified and is performed in two stages:

At a first stage, heated work fluid emitted from the first auxiliary spiral 10,340*a*' is provided through junction A to the radiator 10,700' (via the upper piping) while the lower passage (A2) remains closed. Similarly, in junction B, B1 is open and B2 is closed.

Thus, after passing through junction A and the radiator 10,700', the work fluid continues through junction B to the second auxiliary spiral 10,340*b*' in a CCW loop about the system.

Thereafter, A1 and B1 are closed and A2 and B2 are opened. Under this arrangement, work fluid from the first auxiliary spiral 10,340*a*' flows through the radiator 10,700' and via junction B to the fire vessels 10,200'.

Needless to say that following the above stages of operation, the direction is reversed (as shown in FIGS. 75A and 73B) and the exact opposite is performed (i.e. flow from junction B to junction A in a CW direction about the system).

Turning now to FIGS. 76A to 76D, another example of a generator is shown generally designated as 11,000 and is configured for constituting a part of an air conditioning system.

In general, the system 11,000 also comprises a radiator system 11,700, main and secondary spirals 11,320, 11,340 respectively, pressure vessels 11,400, pistons 11,300 and a gear mechanism 11,500.

However, contrary to the previously described example, the heating of the work fluid is now performed by means of an air conditioning system rather than by means of high temperature gasses produced as a result of burning fuel.

In particular, the air conditioning system 11,900 is configured for evacuating high temperature air from an enclosure (room), as known per se, wherein the work fluid of the air conditioning system (e.g. Freon) is configured for performing a heat exchange process with the work fluid of the system 11,000, thereby providing it with the required high temperature.

The work fluid of the A/C system can be chosen to have a low boiling point (e.g. 150K) but can be compressed so that its temperature rises to about 450K. This is performed in order to increase the temperature difference between the ambient temperature of the environment and the high temperature of the work fluid, thereby increasing efficiency.

In assembly, the gear mechanism is now connected to a compressor 11,500 which is configured for operating in conjunction with an additional, smaller motor 11,910, for providing additional power to the compressor for cooling/heating cycle of the air conditioning system 11,000.

In particular, the compressor 11,500 can provide a part of the power required for compressing the work fluid while the motor 11,910 of the air conditioning system completes the required remainder of the power. For example, the compressor of the system 11,000 can provide about 70% power while the motor 11,910 can provide the remaining 30%. The system can comprise a controller configured for receiving data regarding the power provided by the compressor and regulating the motor for completing the required remainder so that the compressor revolves at a generally constant speed. However, it is appreciated that even without the controller, the system can still operate since fluctuations in the revolution velocity of the compressor are not critical.

In operation, once the work fluid of the air conditioning system 11,900 is compressed and heated, it is configured for passing through a condenser array which serves to facilitate heat exchange between the work fluid of the A/C system 11,900 and the work fluid of the system 11,000 via appropriate piping (see also FIGS. 80A and 80B).

In passing through the condenser array 11,200, the work fluid of the A/C system is cooled down while the work fluid of the system 11,000 is heated up to the required temperature for performing the heat exchange process with the helium within the pressure vessel 11,400. The work fluid of the A/C system can then proceed to the expansion valve E.V. and expand within the evaporator, facilitating cooling of the enclosure.

In operation, when the right hand side of the system is being heated, gradient temperature work fluid is pumped into the pressure vessel 10,400 in order to heat up the helium therein. In junction B, B1 is open and B2 is closed, A1 is open and A2 is closed, so that fluid is passed through the radiator and into junction A in a CW direction flow about the system.

Thereafter, only the right side pump continues in its operation so as to draw high temperature work fluid from the condenser array 11,200. In this position, B1 is open and B2 is closed and A2 is open and A1 is closed so that fluid is passed into the condenser array 11,200.

During this stage, the pressure vessel 11,400 of the left side has no flow going through it and it simply continues performing a natural heat exchange process for further cooling down the helium therein.

Turning now to FIG. 76D, the work fluid of the A/C system is pumped through the condenser array by virtue of the compressor 11,500. The condenser array 11,200 comprises a plurality of vessels 11,200 each having a housing 11,210 (insulated from the inside) accommodating a plurality of pipes 11,240 configured for passage therethrough of the A/C system work fluid entering through inlet 11,230. The work fluid of the system 11,000 is configured for entering the housing 11,210 via inlet 11,220 and passing within the housing about the tubes in order to perform the heat exchange process.

It is appreciated that the flow direction of the A/C fluid within the condenser array 11,200 is opposite to the flow direction of the work fluid of the system 11,000. As previously described, the pressure of the pressure medium and of the work fluid of the system 11,000 remains about 221 atm.

In addition, with reference to FIG. 76C, the system 11,000 can comprise an auxiliary cooling arrangement 11,700' which is configured for heating of the work fluid of the A/C system before entering the compressor by withdrawing heat from the work fluid of the system 11,000.

The auxiliary cooling arrangement can further comprise a one way valve 11,710' located between the radiator 11,700' and the evaporator. During the heat exchange within the radiator 11,700', the work fluid of the A/C system increases its temperature and expands. The one way valve allows preventing this expansion from countering the expansion through the expansion valve.

It is appreciated that at least in the three previous examples of generators 10,000, 10,000' and 11,000, the spirals (both main and auxiliary) constitute, during certain stages of the operation of the generator, a gradient tank maintaining a gradient temperature of the work fluid contained therein, and are equivalent, in function, to previously described gradient tanks.

Turning now to FIGS. 77A and 77B, two ways of performing heat exchange process with the helium (or any other pressure medium within the pressure vessel) are shown. In both examples, the pressure medium is first cooled up by a gradient temperature work medium and thereafter with an additional amount of work fluid at temperature T0.

However, in the first example, the gradient temperature work fluid is provided to the pressure vessel with the lowest temperature portion first, gradually cooling the pressure medium until reaching the highest gradient temperature portion. Thereafter, the helium is further cooled by the additional amount of T0.

It is observed that as a result of the above process, the temperature profile of the work fluid after passing through the pressure vessel is such that it has a varying, fluctuating temperature gradient. Specifically, it is possible to find a portion (a) of the work fluid of temperature T" which is lower than Ttop and another portion (b) of work fluid, closer to the pressure vessel than (a) which has a temperature T"' higher than T.

In the second example shown, the gradient temperature work fluid is provided to the pressure vessel from the highest temperature to the lowest and then with the additional amount of work fluid at T0.

It is observed that as a result, the temperature profile of the gradient work fluid after passing through the pressure vessel is cooler at the side closer to the pressure vessel and constantly growing in temperature as moving away from the pressure vessel. In other words, if a portion (a) of the work medium is closer to the pressure vessel than portion (b), it will also have a lower temperature.

It is appreciated that the first portion of gradient temperature (the hottest portion) is configured to reach the end of the pressure vessel (i.e. complete heat exchange process with the pressure medium) at a temperature which is slightly lower than that of the pressure medium. In order to control and maintain this requirement, velocity of fluid flow and/or revolution of the core can be regulated.

Without such regulation, the temperature of the portion will have a greater temperature difference, which will entail complementing the difference in heat energy by increasing the amount of fuel burnt in the combustion chamber.

It is appreciated that, when the work fluid of the generator is constituted by water, it may be beneficial to maintain the water at their critical point (i.e. critical water)—at a temperature of about 374° C. and at a pressure of 221 atm. Using the water in these conditions highly increases the efficiency of heat transfer with the pressure medium.

It is appreciated that it is possible to add a solar arrangement configured for heating work fluid, which may be provided to the system at any stage of operation thereof. For example, work fluid can be partially re-heated by the solar installation before being returned to a gas heat transfer system, a storage unit etc. Specifically, for the gas heat transfer system, it may be beneficial to provide the heated work fluid to the transfer system at a point in which the work fluid passing therethrough is of the same temperature. Alternatively, it can be provided directly to the pressure vessels or to the high temperature storage.

In addition to all of the above, the system can comprise a control arrangement which comprises a sensor measuring the amount of electricity produced by the generator and a controller associated with the sensor to provide a desired value of the amount of electricity, forming together a feedback loop.

The controller is configured for regulating at least:

heating/cooling time;

revolution speed of the cores; and pressure provided by pumps/blowers.

Those skilled in the art to which subject matter of the present application pertains will readily appreciate that numerous changes, variations, and modification can be made without departing from the scope of the subject matter of the present application, mutatis mutandis.

The invention claimed is:

1. A generator comprising:

a heat differential module comprising:

a first source of a work medium at high temperature;

a second source of a work medium at low temperature; and a heat mechanism in fluid communication with the first and second sources, configured for maintaining a temperature difference therebetween by at least one of the following:

providing heat to the work medium at said first source; and removing heat from the work medium at said second source;

a pressure module comprising a pressure medium which is in selective fluid communication with the work medium from the first, high temperature source and the work medium from the second, low temperature source, for alternately performing a heat exchange process with the high/low temperature work medium, to have its temperature fluctuate between a minimal operative temperature and a maximal operative temperature corresponding to the high and low temperature of the respective work medium;

a conversion module in mechanical communication with the pressure medium, the conversion module is configured for utilizing temperature fluctuation of the pressure medium for the production of output energy; and a heat recovery arrangement in thermal communication with at least one of the heat differential module and the pressure module, the heat recovery arrangement is configured for receiving at least a portion of the heat energy of the high and low temperature work medium which was not transferred to the pressure medium during said heat exchange process, and redirecting said heat energy back to one of the heat differential module and the pressure module;

wherein provision of heat to the work medium is performed by way of a heat exchange process with an auxiliary high temperature fluid; and wherein the heat recovery arrangement includes at least one temperature gradient tank in fluid communication with an outlet end of the pressure module and configured for maintaining a temperature difference between at least two work medium quantities simultaneously contained therein.

2. The generator according to claim 1, wherein one of the first, high temperature source or the second, low temperature source is in thermal communication with outside environment.

3. The generator according to claim 1, wherein the pressure module comprises more than one pressure vessel, each being in fluid communication with the heat differential module.

4. The generator according to claim 1, wherein the at least one temperature gradient tank is formed with a flow path labyrinth, configured for preventing mixing between the at least two portions.

5. The generator according to claim 4, wherein the labyrinth flow path exhibits a maximal cross-sectional dimension that is considerably smaller than a total length thereof.

6. The generator according to claim 1, further comprising a heat storage unit configured for storing at least a portion of the output energy, wherein the heat storage unit comprises both heating elements and an auxiliary heat pump and wherein the heat storage unit is used as a source for high/low temperature medium to an external user, the heat storage unit comprising a storing medium, and wherein the portion is used for heating and/or cooling of the storing medium.

7. The generator according to claim 1, wherein the first, high temperature source is provided via an external installation.

8. The generator according to claim 7, where the external installation is one of the following:

a power plant, and wherein the high temperature fluid is residual heated water and/or steam discharged by the power plant;

a solar installation configured for providing high temperature fluid to the generator; or a combustion chamber configured for providing heat to the work fluid.

9. The generator according to claim 1, further comprising at least one heating vessel configured for facilitating heat exchange between the work fluid and the heated fluid of the external installation, and wherein the heating vessel comprises a core.

10. The generator according to claim 1, further comprising a radiator configured for cooling fluid contained within the gradient tank via a heat exchange process with the environment.

11. The generator according to claim 10, wherein the heat exchange process is performed between ambient air and fluid contained within the gradient tank, and wherein the radiator comprises a vent associated with a combustion chamber, configured to provide ambient air heated by the heat exchange process to the combustion chamber.

12. The generator according to claim 1, wherein said pressure vessels comprises a housing formed with extensions projecting from an inner surface thereof into the housing and a plurality of core units consecutively arranged along a central axis thereof, each core unit comprising an outer shell and an inner member, the core units dividing the space of the housing into an inner space defined within the core units and an outer space defined between an external surface of the outer shells and an internal surface of the housing, the core units being arranged such that at least a portion of the outer shell of two neighboring core units form a gap therebetween configured for accommodating said extension forming a first convoluted flow path within the outer space.

13. The generator according to claim 1, further comprising a blower configured for circulating the work medium within the pressure vessel in order to provide a more efficient heat transfer process.

14. The generator according to claim 1, wherein said pressure vessel is of cylindrical shape and is formed with an additional extension providing the pressure vessel with a T shape in its longitudinal cross-section, said pressure vessel comprising a revolving core configured for withdrawing the pressure medium from the extension, circulating it within the pressure vessel and discharging it back to the extension.

15. The generator according to claim 1, wherein said work medium is configured for obtaining its high temperature via a heat exchange with another gas medium.

16. The generator according to claim 1, further comprising:

a heating arrangement for producing high temperature auxiliary work medium;

a heat exchanger configured for performing a heat exchange process between said auxiliary work medium and said work medium;

a first pressure module and a second pressure module;

a first main gradient container and a first auxiliary gradient container, each associated with said first pressure module;

a second main gradient container and a second auxiliary gradient container, each associated with said second pressure module;

each of the first and second auxiliary gradient containers being in fluid communication with said heat exchanger;

at least one heat recovery arrangement associated with at least one of said first auxiliary gradient container and said second auxiliary gradient container for expelling heat therefrom, said heat recovery arrangement further being associated with said heating arrangement for providing expelled heat thereto; and a distribution point associated with a central conduit and with the first and second main gradient containers.

17. The generator according to claim 16, further comprising three fluid circles including:

a peripheral flow circle constituted by all the components excluding said heating arrangement and said heat exchanger;

a first flow circle constituted by said heating arrangement, said heat exchanger, said first main gradient container, said first pressure module and said first auxiliary gradient container; and a second flow circle constituted by said heating arrangement, said heat exchanger, said second main gradient container, said second pressure module and said second auxiliary gradient container.

18. A method for generating output energy using the generator of claim 1, the method comprising:

0) performing a heat exchange process between said work medium to said auxiliary work medium for increasing the temperature of said work medium at said first source;

I) providing high temperature work medium at temperature $T_H$ to the pressure module and causing it to perform a heat exchange process with the pressure medium thereby raising the temperature of the pressure medium to a maximal operative temperature $T_{PMAX}$ and consequently lowering the temperature of the high temperature work medium to $T_{H\text{-}COOLED}$;

II) returning the high temperature work medium of temperature $T_{H\text{-}COOLED}$ to perform step (0) so as to raise its temperature back to $T_H$;

III) providing low temperature work medium at temperature $T_L$ to the pressure module to perform a heat exchange process with the pressure medium thereby lowering the temperature of the pressure medium to a minimal operative temperature $T_{PMIN}$ and consequently raising the temperature of the low temperature work medium to $T_{L\text{-}HEATED}$; and IV) returning the low temperature work medium of temperature $T_{L\text{-}HEATED}$ to the second, low temperature source while expelling heat from the low temperature work medium to lower its temperature back to $T_L$, wherein $T_L < T_{PMAX}$, $T_{PMIN} < T_H$;

(III') performed between steps (III) and (IV), during which, upon exiting the pressure module the low temperature work medium is provided to the gradient tank and stored therein; and (V") performed between steps (V) and (I), during which the heated low temperature work medium is provided from the gradient tank to the pressure module to perform a heat exchange process with the pressure medium thereby raising the temperature of the pressure medium to an intermediate operative temperature $T_{PINTER}$ and consequently lowering the temperature of the stored low temperature work medium closer to $T_L$.

19. The method according to claim 18, wherein the generator further comprises at least one gradient tank, and wherein the method further comprises:

(I") performed between steps (I) and (II) of the method, during which, upon exiting the pressure module the high temperature work medium is provided to the gradient tank and is stored there; and (II") performed between steps (II) and (III) of the method, during which the cooled high temperature work medium stored in the gradient tank is provided to the pressure module to perform a heat exchange process with the pressure medium thereby lowering the temperature of the pressure medium to an intermediate operative temperature $T_{PINTER}$ and consequently raising the temperature of the stored low temperature work medium closer to $T_L$.

20. The method according to claim 19, wherein steps (III') and (I") are performed in a LIFO manner in which the first portion of work medium provided to the gradient tank is the last to be emitted therefrom to the pressure module during steps (V") and (II") respectively.

21. A method for generating output energy using the generator of claim 17, said method comprising:

a first main step of blocking said first, high temperature source and passing work fluid in a CCW direction only about the peripheral circle;

a first auxiliary step of blocking said first flow circle and circulating work medium in a CCW direction about the first flow;

a second main step of blocking said first, high temperature source and passing work fluid in a CW direction only about the peripheral circle; and a second auxiliary step of blocking said second flow circle and circulating work medium in a CW direction about the second flow circle;

wherein in each of the main steps, a greater volume of work medium is circulated through the pressure vessels than during the auxiliary steps.

22. The method according to claim 21, wherein the amount of work medium passed through the pressure medium during the main steps exceeds the amount of work medium circulated through the pressure vessels during the auxiliary steps by about 1.5.

23. The method according to claim 21, wherein, during the auxiliary steps, cooling of the pressure medium within the pressure vessels is performed by providing therein work medium at gradient temperature from the highest temperature portion to the lowest temperature portion.

24. method according to claim 21, wherein, during the auxiliary steps, heating of the pressure medium within the pressure vessels is performed by providing therein work medium at gradient temperature from the lowest temperature portion to the highest temperature portion.

25. The method according to claim 21, wherein during each of the main steps, an additional amount of high temperature work medium is provided into the peripheral fluid cycle.

* * * * *